United States Patent [19]

Frederiksen

[11] 4,301,503

[45] Nov. 17, 1981

[54] HOME COMPUTER AND GAME APPARATUS

[75] Inventor: Jeffrey E. Frederiksen, Arlington Heights, Ill.

[73] Assignee: Bally Manufacturing Corporation, Chicago, Ill.

[21] Appl. No.: 910,964

[22] Filed: May 30, 1978

Related U.S. Application Data

[63] Continuation-in-part of Ser. No. 812,662, Jul. 5, 1977, which is a continuation of Ser. No. 635,406, Nov. 26, 1975, abandoned.

[51] Int. Cl.$^3$ .............................................. G06F 3/153

[52] U.S. Cl. .................................................... 364/200

[58] Field of Search ... 364/200 MS File, 900 MS File, 364/410, 705; 273/85 R, 85 G, 101.1, 101.2, 102.2 R, DIG. 28; 340/720, 723, 724, 725; 358/900

[56] References Cited

U.S. PATENT DOCUMENTS

| | | | |
|---|---|---|---|
| 2,847,661 | 8/1958 | Althouse . | |
| 3,017,625 | 1/1962 | Evans et al. . | |
| 3,046,676 | 7/1962 | Hermann et al. . | |
| 3,122,607 | 2/1964 | Balding . | |
| 3,135,815 | 6/1964 | Spiegel . | |
| 3,345,458 | 10/1967 | Cole et al. . | |
| 3,388,391 | 6/1968 | Clark . | |
| 3,422,420 | 1/1969 | Clark . | |
| 3,435,136 | 3/1969 | Bachmann et al. . | |
| 3,462,639 | 8/1969 | French . | |
| 3,497,760 | 2/1970 | Kiesling . | |
| 3,577,130 | 5/1971 | Rice et al. | 364/900 |
| 4,116,444 | 9/1978 | Mayer et al. | 273/DIG. 28 X |
| 4,142,180 | 2/1979 | Burson | 340/724 X |
| 4,177,462 | 12/1979 | Chung | 340/723 X |

OTHER PUBLICATIONS

"II Cybernetic Frontiers" Brand, Random House, 1974, pp. 54–60.

"Space War", Kuhfeld, Analog Science Fiction/-Science Fact, pp. 67–79.

Gun Fight Computer Service Manual for the Midway 8080 Microprocessor Game Series, 1976.

Standardized Test Procedure for Midway's Processor Boards, Jul., 1976.

Marcus, A., "A Prototype Computerized Page-Design System", Visible Language, vol. 5, Summer, 1971.

Noll, A. M., "A Computer Technique for Displaying n-Dimensional Hyper-Objects", Comm. of the ACM, vol. 10, 8/67.

Kolb, E. R., "Computer Printing Forecast for the '70's", Datamation, 12/1/70.

Andersson, P. L., "Phototypesetting-A Quiet Revolution", Datamation, 12/1/70.

Bonsiepe, G., "A Method of Quantifying Order in Typographic Design", The Journ. of Typographic Research, 7/68.

Sutherland, I. E. et al., "A Characterization of Ten Hidden-Surface Algorithms", Computing Surveys, vol. 6, 3/74.

Bell Lab Record, vol. 47, 5 & 6/69.

Newell, M. E. et al., "A Solution to the Hidden Surface Problem", Proceedings of ACM Nat. Conf., 1972.

Gelernter, H. L. et al., "An Advanced Computer-Based Nuclear Physics Data Acquisition System", Nuclear Instruments and Methods, 9/67.

Knowlton, K. C., "A Comp. Technique for Providing Animated Movies", Proceedings AFIPS, 1964, SJCC, vol. 25.

Ophir, D. et al., "Brad: The Brookhaven Raster Display", Comm. of the ACM, vol. 11, 6/68.

Mermelstein, P., "Comp.-Generated Spectogram Displays for On-Line Speech Research", IEEE Transactions on Audio and Electroacoustics, 3/71.

Denes, P. B., "Computer Graphics in Color", Bell Lab. Record, vol. 52, 5/74.

Noll, A. M., "Scanned-Display Computer Graphics", Comm. of the ACM, vol. 14, 3/71.

Kajiya, J. T. et al., "A Random-Access Video Frame Buffer", Proc. of the Conf. on Comp. Graphics, Pattern Recognition, and Data Struc., 5/14–16/75.

Denes, P. B., "A Scan-Type Graphics System for Interactive Computing", Proc. of Conf. on Comp. Graphics, Pattern Recog., and Data Struc., 5/14–16/75.

*Primary Examiner*—Gareth D. Shaw
*Assistant Examiner*—Thomas M. Heckler

*Attorney, Agent, or Firm*—Fitch, Even, Tabin, Flannery & Welsh

[57] ABSTRACT

A home computer system provides a video processor for use with a television receiver. The video processor can selectively perform a variety of modifications to pixel data under the direction of the CPU of the computer system before the pixel data is stored in a random access memory to effectively increase the speed or data handling power of the system.

36 Claims, 167 Drawing Figures

Fig. 8.

| PORT ↓ | 7 | 6 | 5 | 4 | 3 | 2 | 1 | 0 | ← BIT |
|---|---|---|---|---|---|---|---|---|---|
| 10H | | | | TRIG | RIGHT | LEFT | DOWN | UP | PLAYER 1 |
| 11H | | | | TRIG | RIGHT | LEFT | DOWN | UP | PLAYER 2 |
| 12H | | | | TRIG | RIGHT | LEFT | DOWN | UP | PLAYER 3 |
| 13H | | | | TRIG | RIGHT | LEFT | DOWN | UP | PLAYER 4 |
| 14H | | | = | + | − | × | ÷ | % | KEYPAD |
| 15H | | | | | | | | ↓ | KEYPAD |
| 16H | | | 0 | 2 | 5 | 8 | MS | ↑ | KEYPAD |
| 17H | | | CE | 1 | 4 | 7 | MR | C | KEYPAD |
| 1CH | ← POT → | | | | | | | | PLAYER 1 |
| 1DH | ← POT → | | | | | | | | PLAYER 2 |
| 1EH | ← POT → | | | | | | | | PLAYER 3 |
| 1FH | ← POT → | | | | | | | | PLAYER 4 |

Fig. 7A.

| PDB7 PDB6 | PDB5 PDB4 | PDB3 PDB2 | PDB1 PDB0 | BYTE ↓ |
|---|---|---|---|---|
| P3 | P2 | P1 | P0 | 0 |
| P7 | P6 | P5 | P4 | 1 |
| P11 | P10 | P9 | P8 | 2 |
| P15 | P14 | P13 | P12 | 3 |

ORIGINAL

Fig. 7B.

| PDB7 PDB6 | PDB5 PDB4 | PDB3 PDB2 | PDB1 PDB0 | BYTE ↓ |
|---|---|---|---|---|
| P15 | P11 | P7 | P3 | 0 |
| P14 | P10 | P6 | P2 | 1 |
| P13 | P9 | P5 | P1 | 2 |
| P12 | P8 | P4 | P0 | 3 |

ROTATED

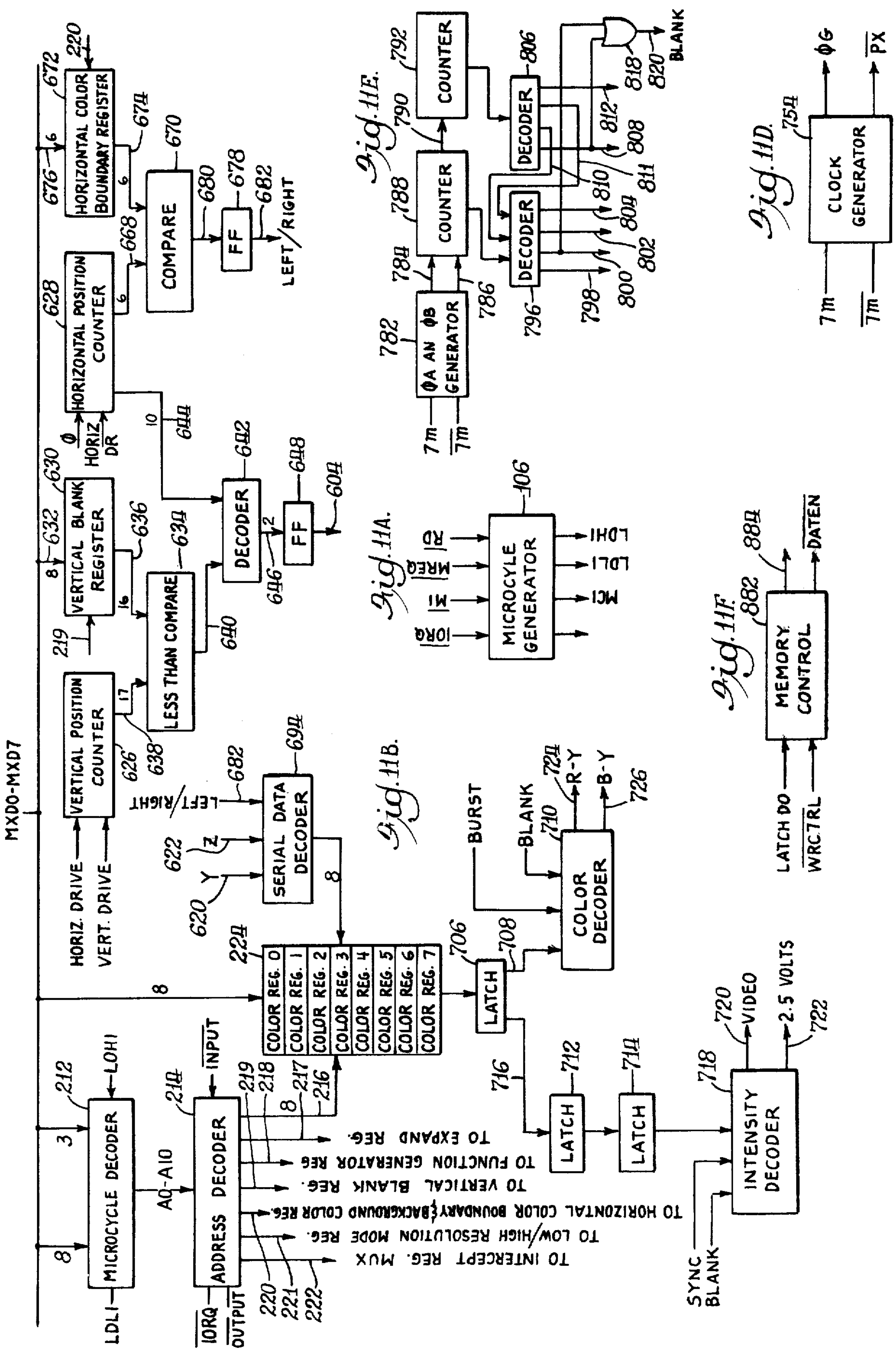

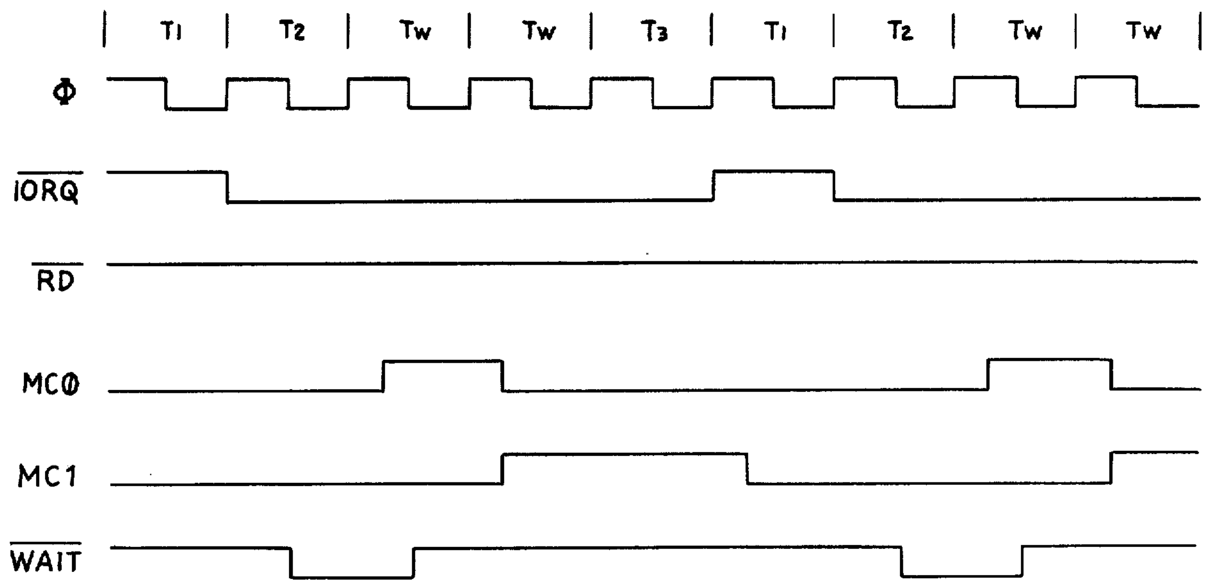
Fig. 12F.
Fig. 12G.
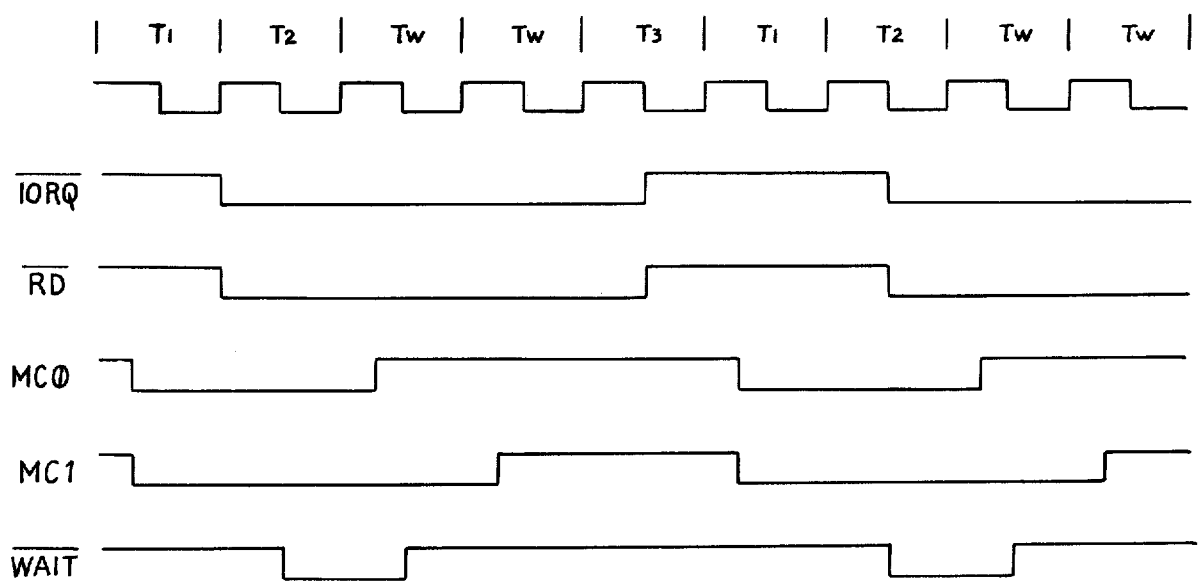

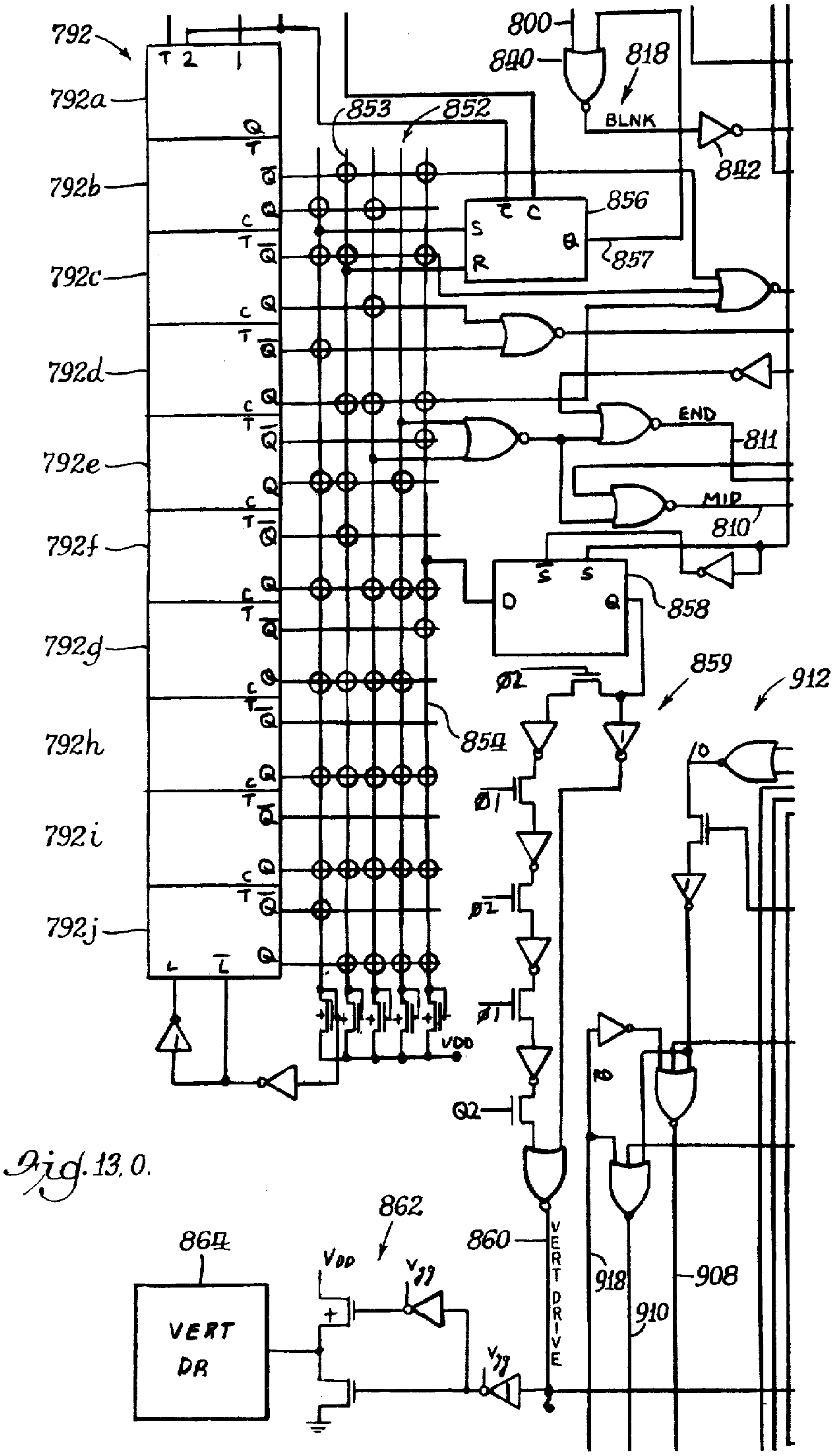
Fig. 13.0.

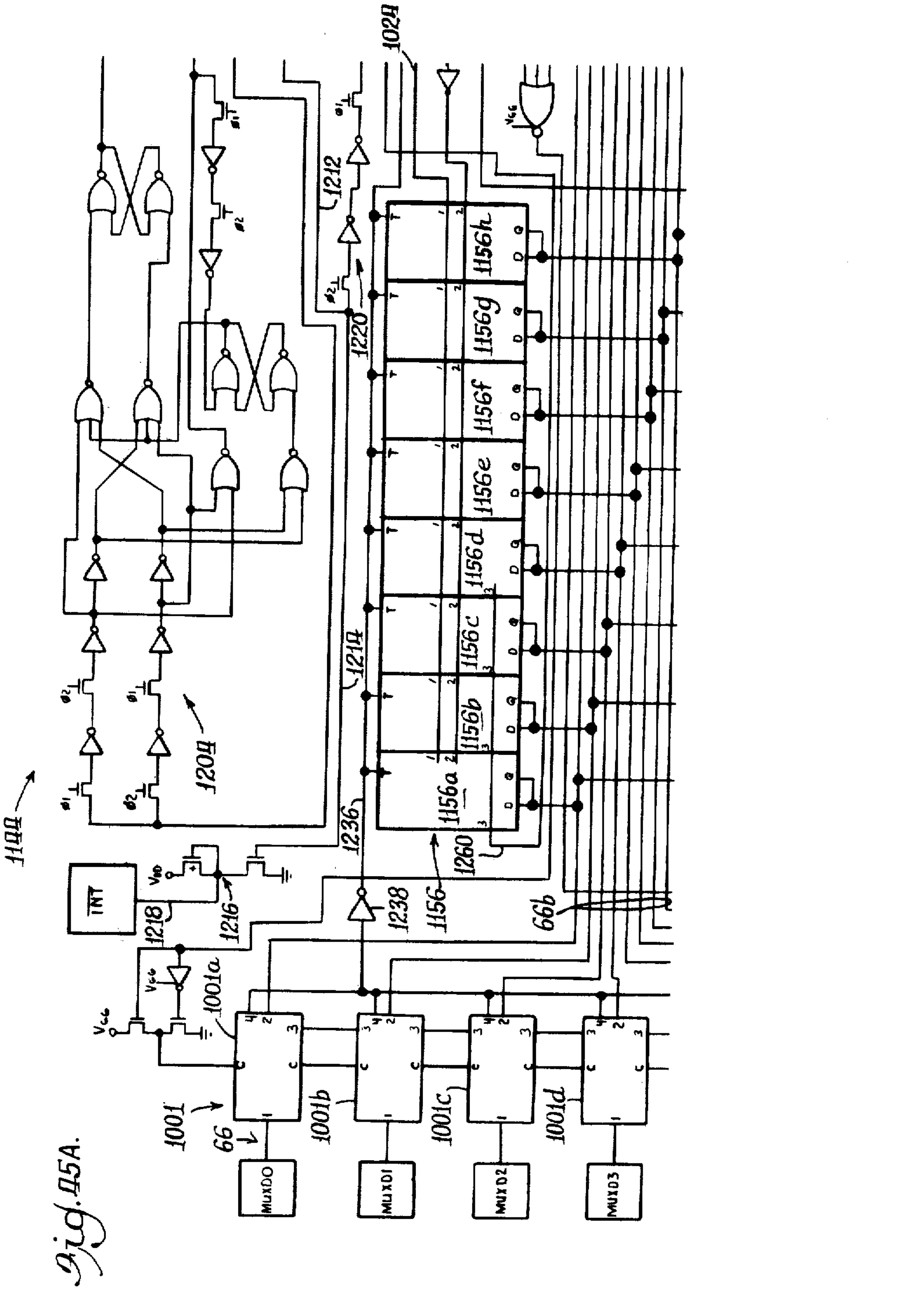

1570
1572
1574
1578
1411
1549
1550
1548
1558
1488f
1488e
1488d
1488c
1488b
1488a
1482b
1482a
1486
1546
1547
1490
1496
1474
1560
1407
1472
1478
1478h
1478g
1478f
1478e
1478d
1478c
1478b
1478a

HOME COMPUTER AND GAME APPARATUS

This application is a continuation-in-part of co-pending application Ser. No. 812,662, filed July 5, 1977, which is a streamline continuation of co-pending application Ser. No. 635,406 filed Nov. 26, 1975, abandoned.

The present invention relates to computers and more particularly to home computers and game apparatus adapted for use with cathode ray tube display apparatus, such as television receivers or monitors.

Video games typically employ a television receiver or monitor (hereinafter often referred to as merely "television") to display the game symbols and figures. Each player usually has a control which may be manipulated to cause the game symbols on the screen to interact in accordance with the rules of the particular game being played, often under the direction of a small computer, or microcomputer. Similarly, the television may be used as a display for a computer used as a calculator.

Each frame of the picture displayed on the television screen is comprised of a plurality of picture elements (pixels) which are rapidly and sequentially displayed in a raster scan of the television screen. One type of video game employs a random-access-memory (RAM) to store digital data representative of each picture element to be displayed on the screen. The digital data stored in the RAM is read synchronously with the raster scanning of the picture elements of the television screen. The digital data is converted to signals suitable for the television receiver or monitor and supplied to the television to define the particular pixels being displayed. A programmed microprocessor (a type of computer) may be used to update or modify the data stored in the RAM and hence modify the picture displayed on the television screen in response to signals transmitted from the player controls, in accordance with the microprocessor program.

It is an object of the present invention to provide an improved computer particularly adapted for home use and having the capability of performing various game functions as well as normal computer and calculating functions. It is a further object to provide such a computer that is economical to manufacture. It is a still further object to provide such a computer adapted for use with interchangeable program storage devices.

These and other objects of the invention are more particularly set forth in the following detailed description and in the accompanying drawings of which:

FIGS. 7A and 7B illustrate further examples of modifications performed on pixel data;

FIG. 8 is a diagram illustrating the particular data that can be read at a plurality of input ports;

FIGS. 11A–11F are a block diagram of the data chip of the video processor of the system;

Figure 13A:
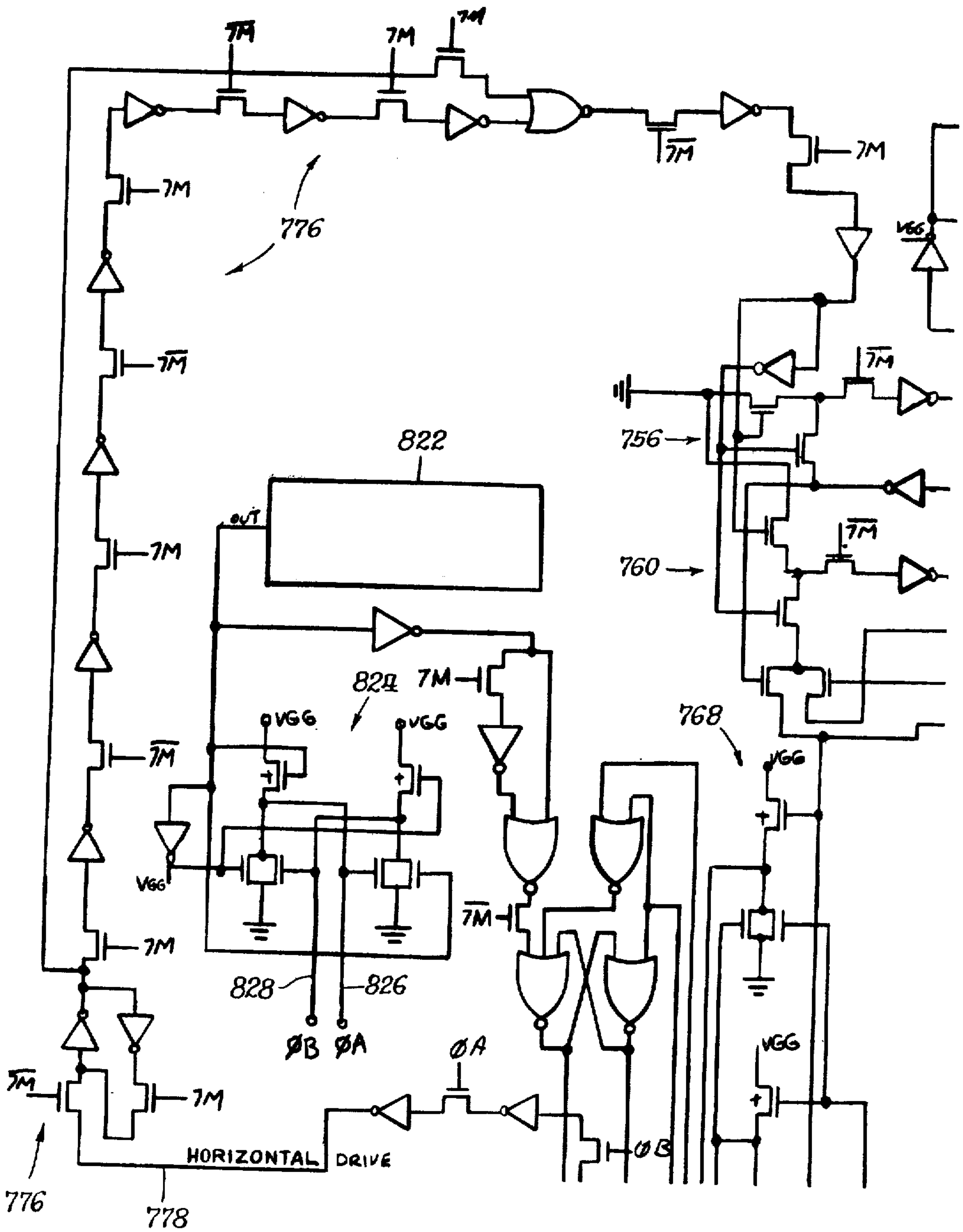
Figure 13B:
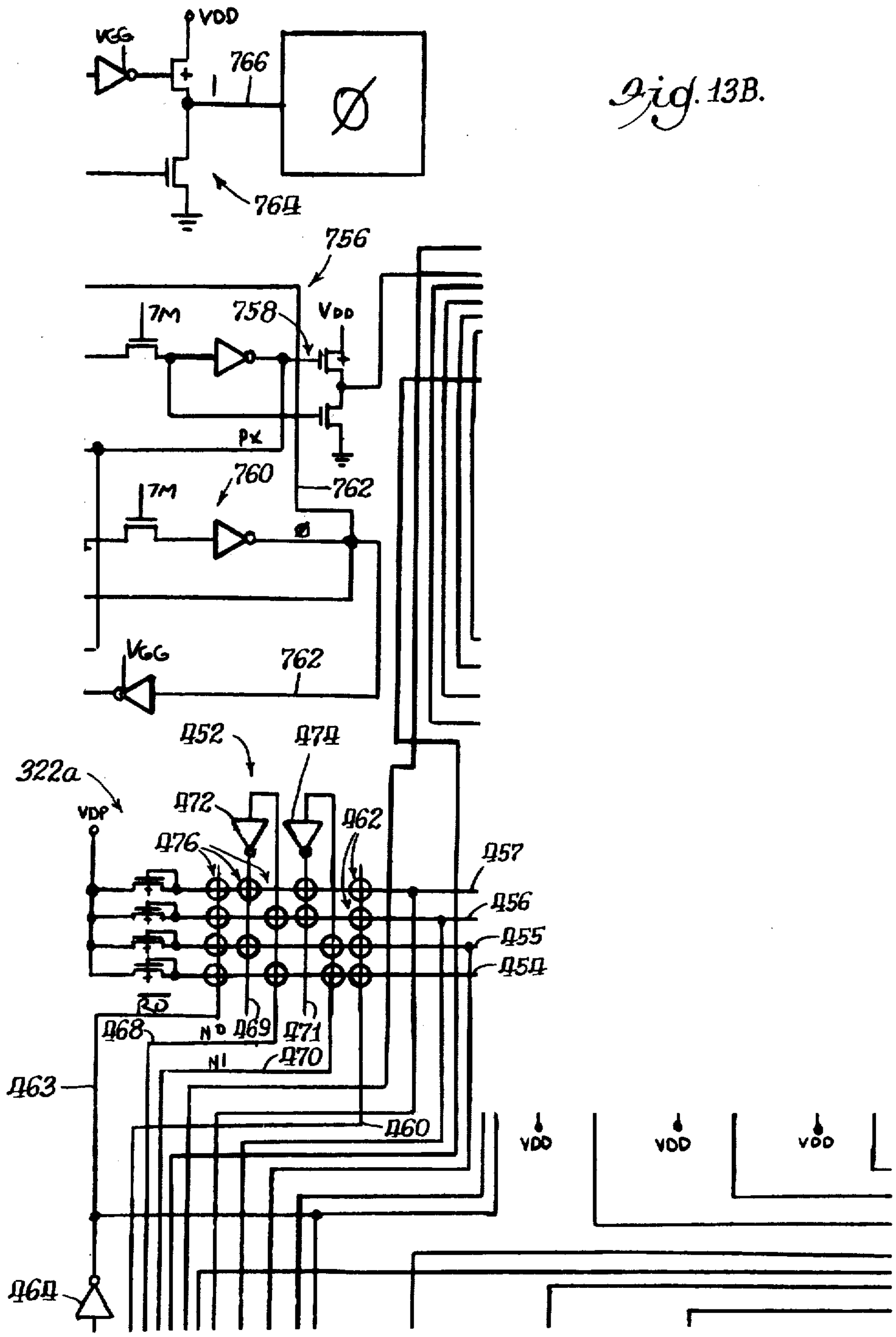
Figure 13C:
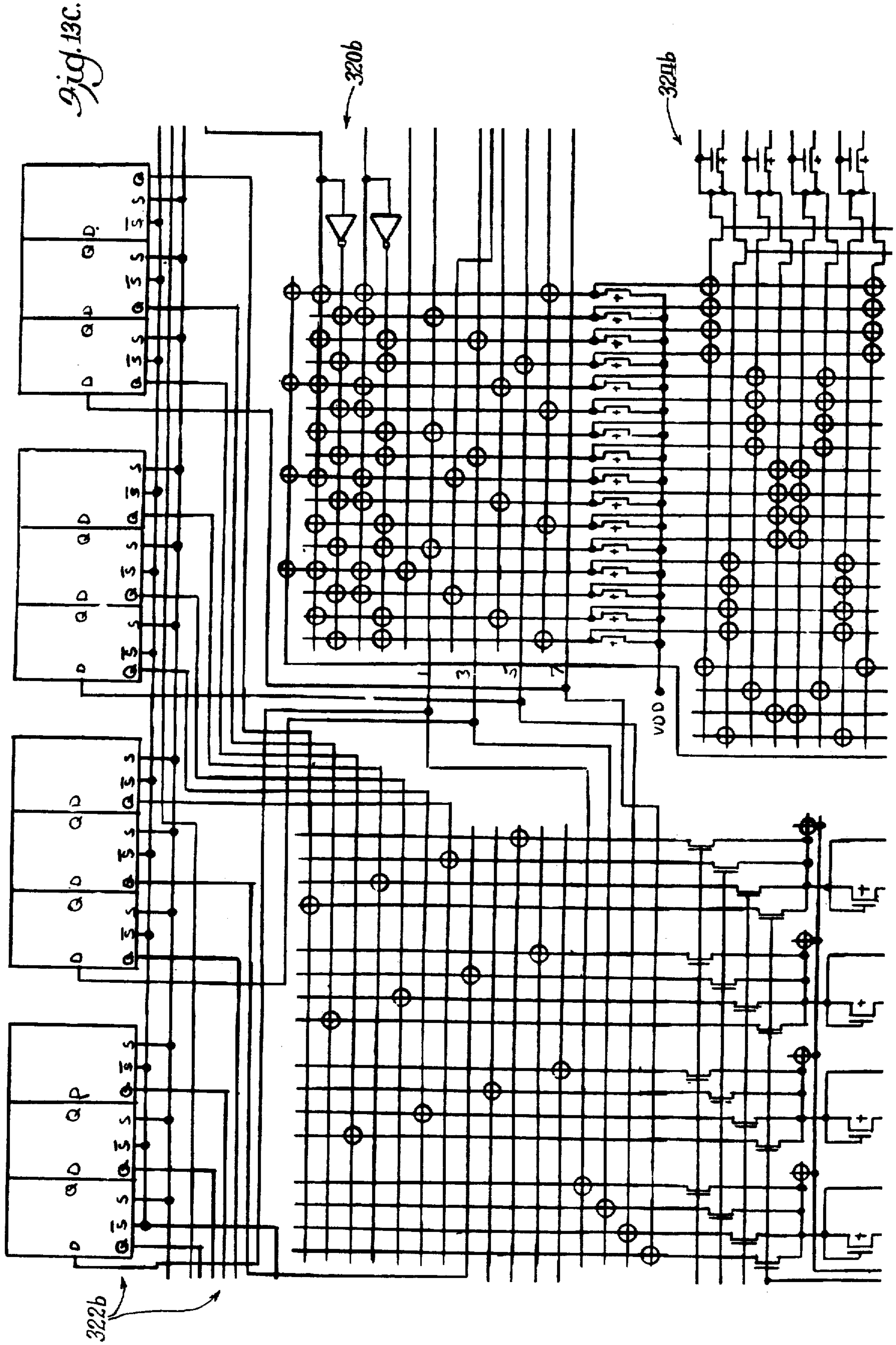
Figure 13D:
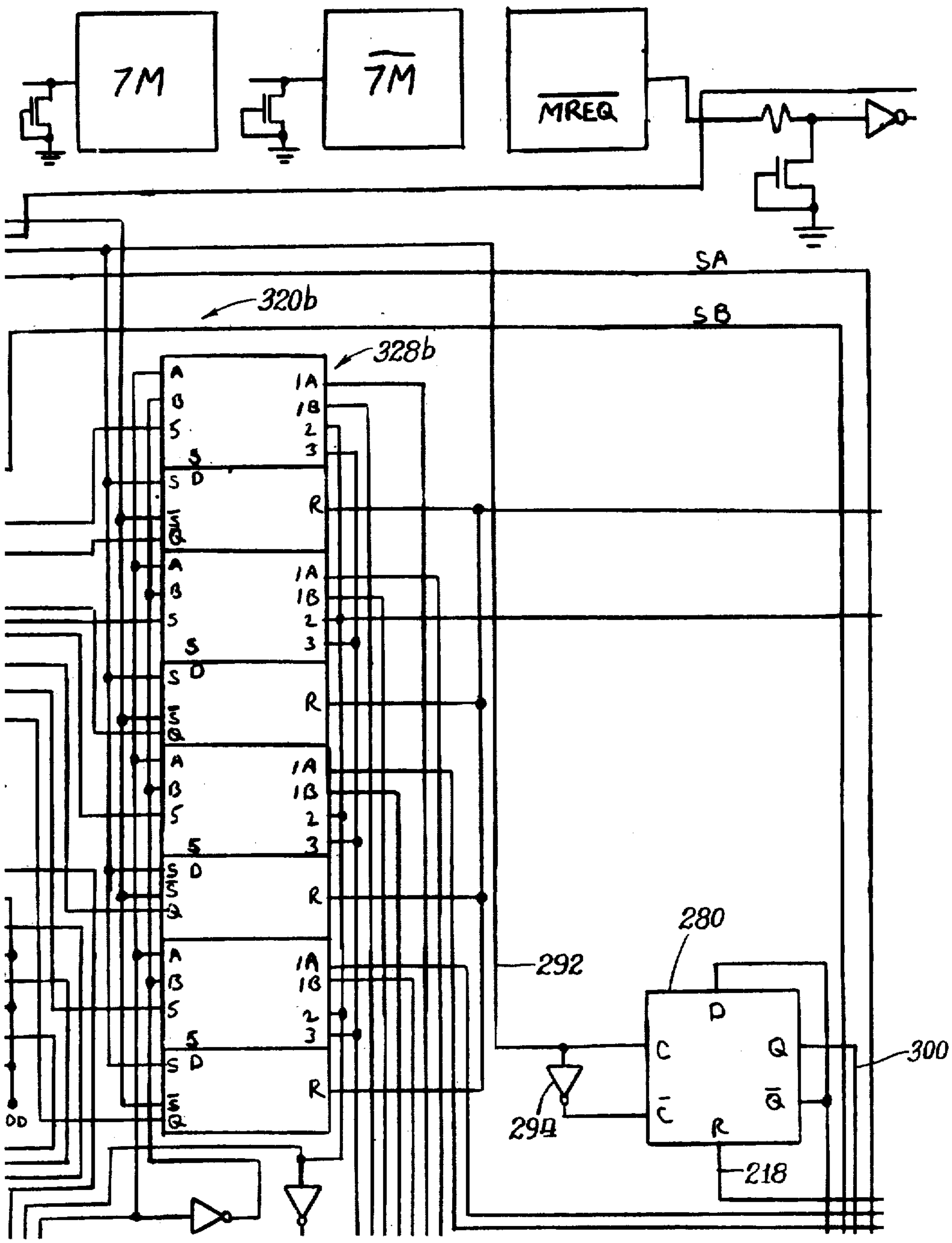
Figure 13E:
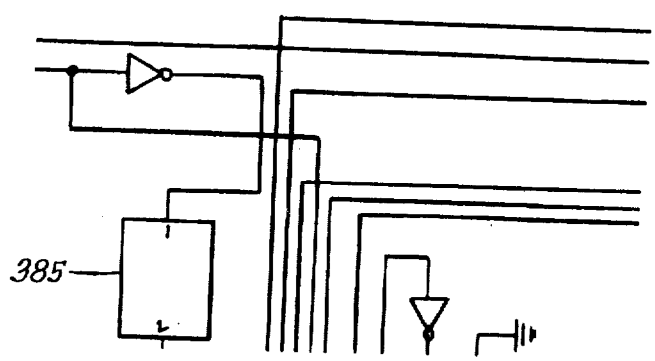
Figure 13F:
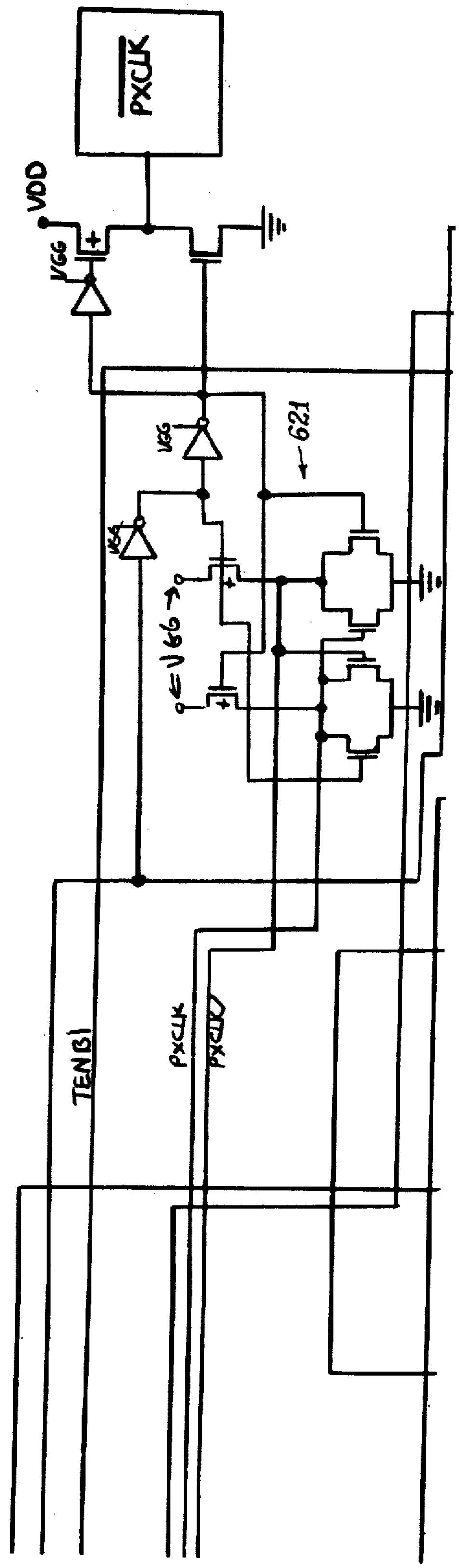
Figure 13G:
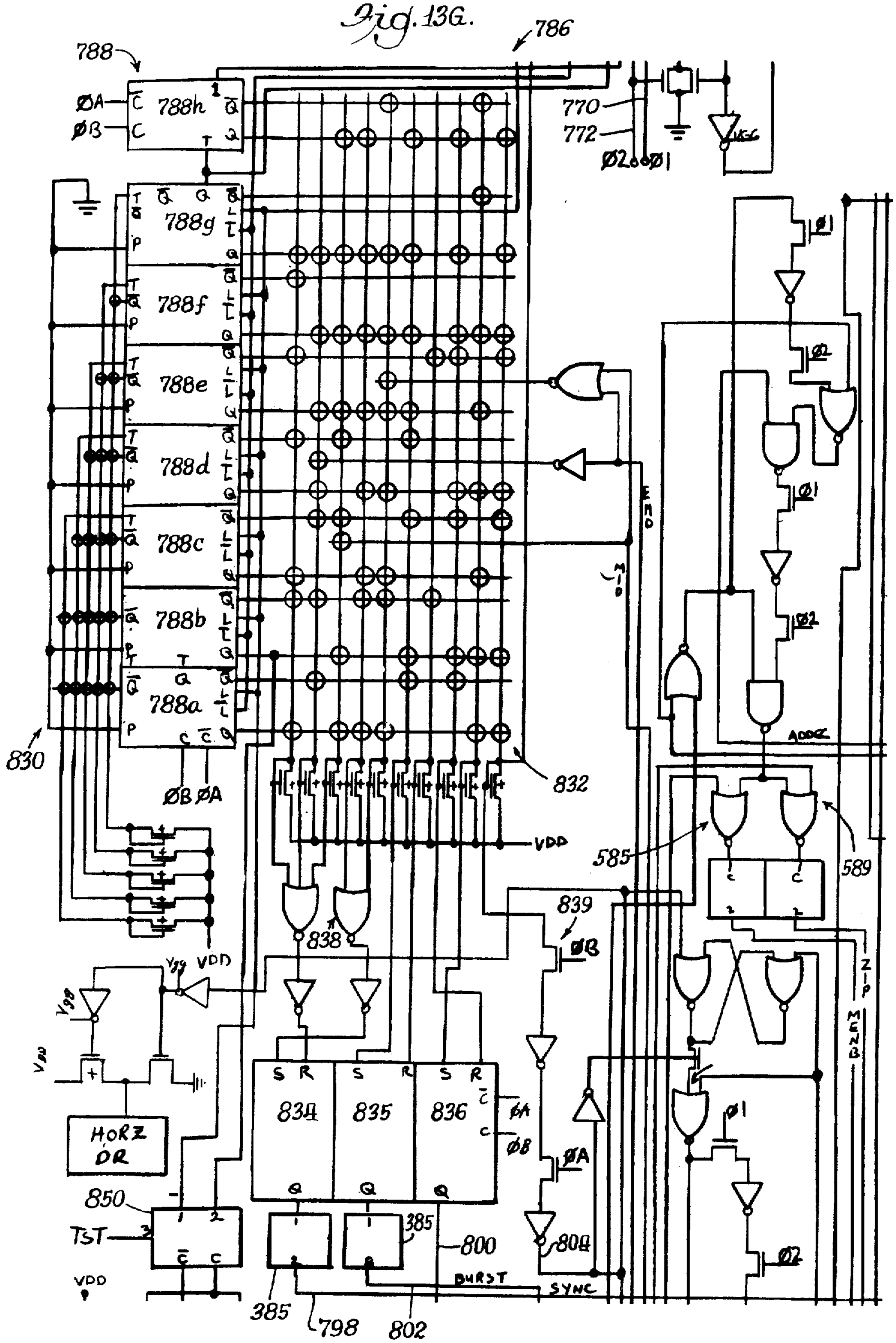
Figure 13H:
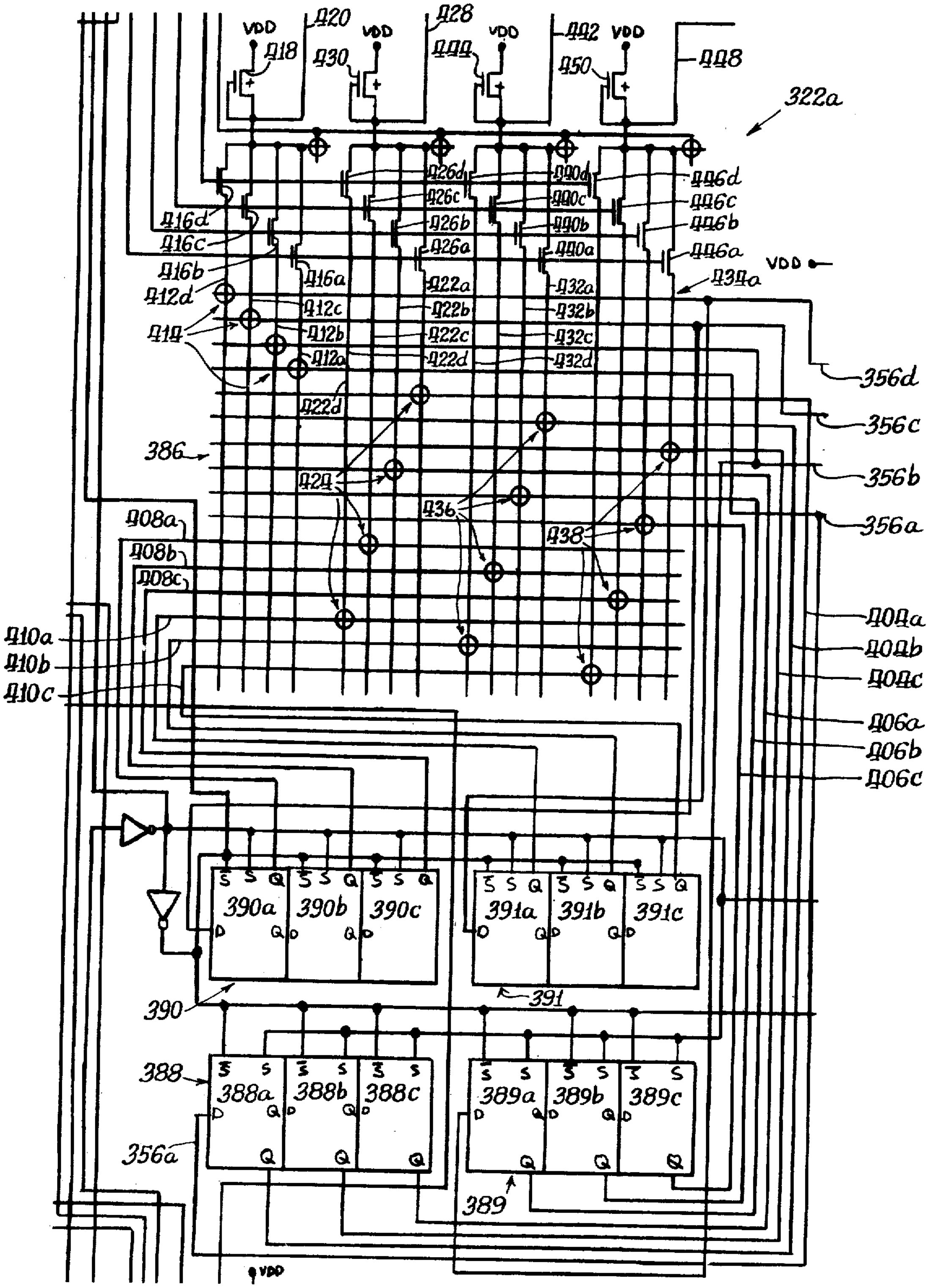
Figure 131:
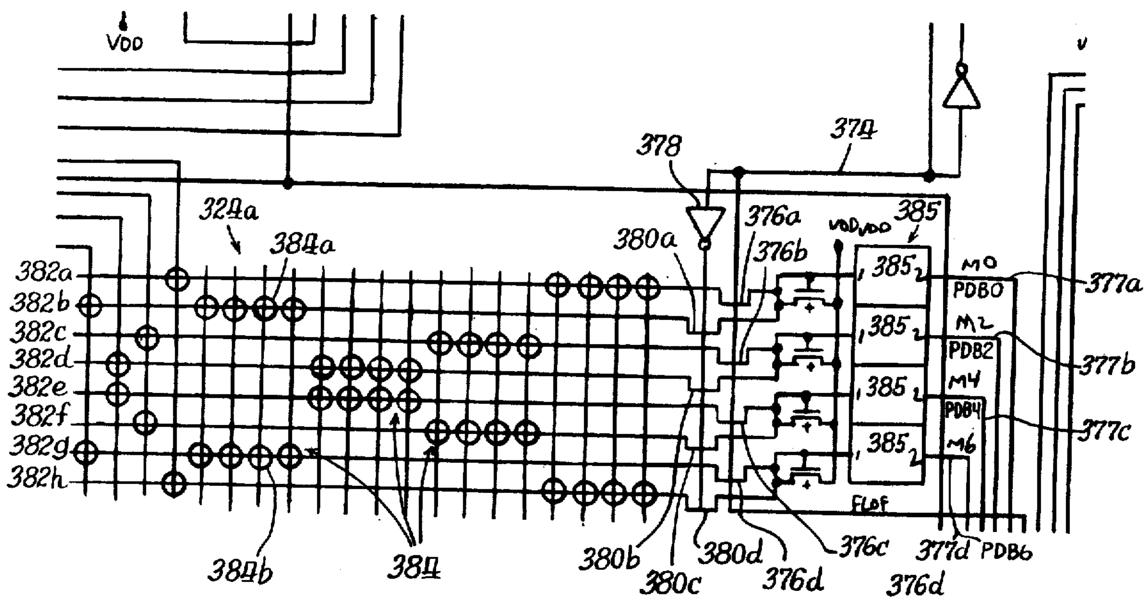
Figure 13J:
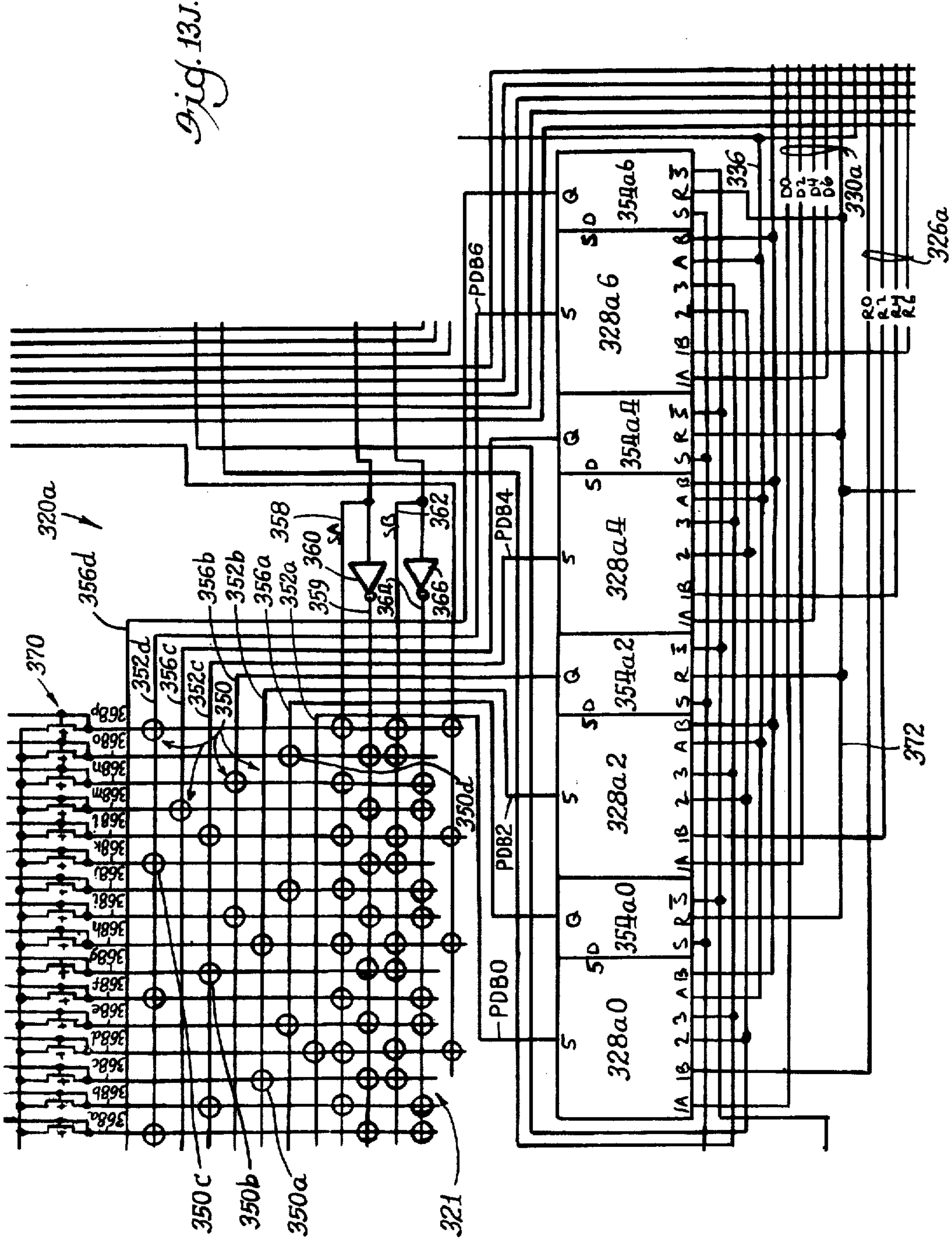
Figure 13K:
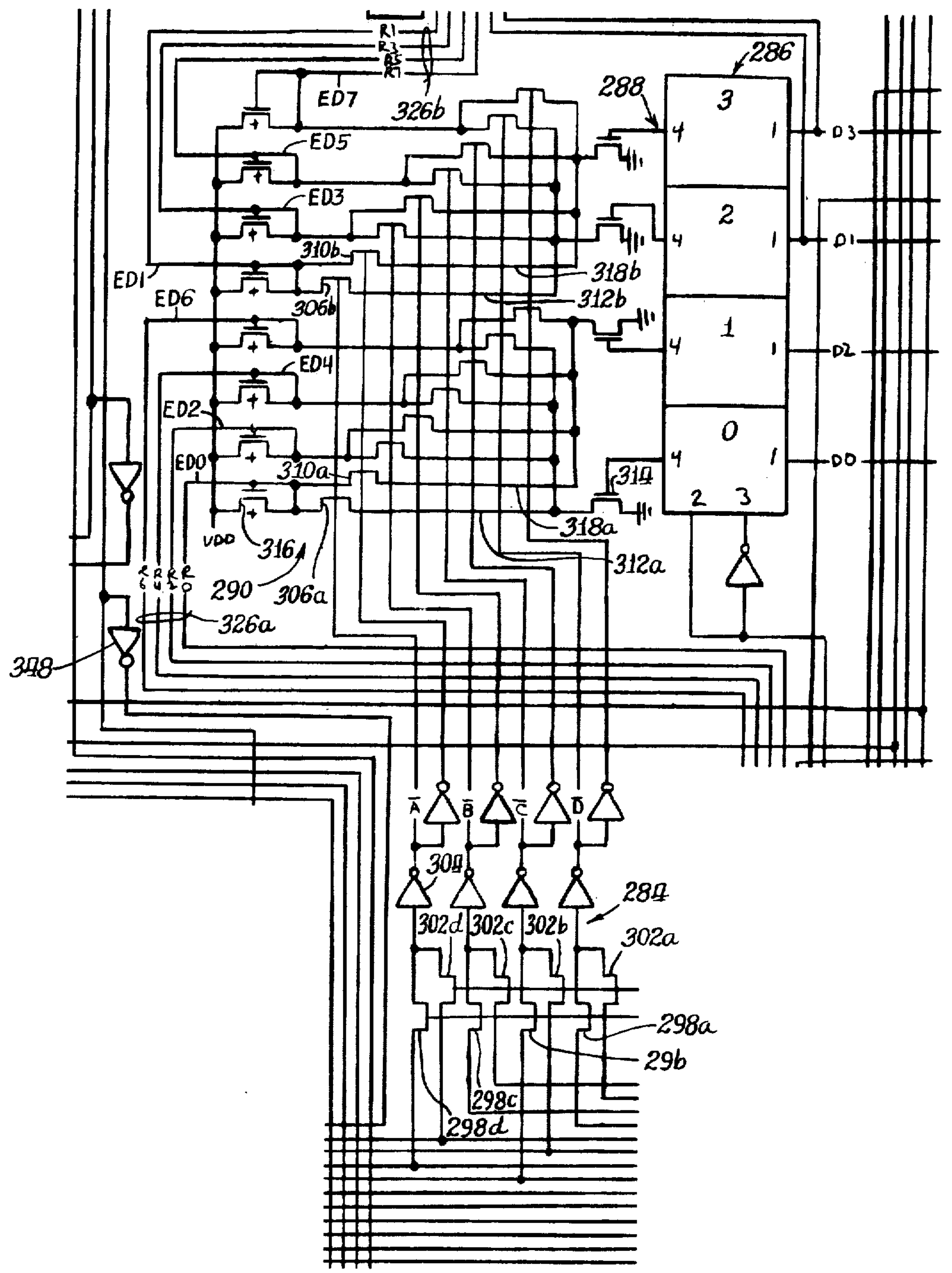
Figure 13L:
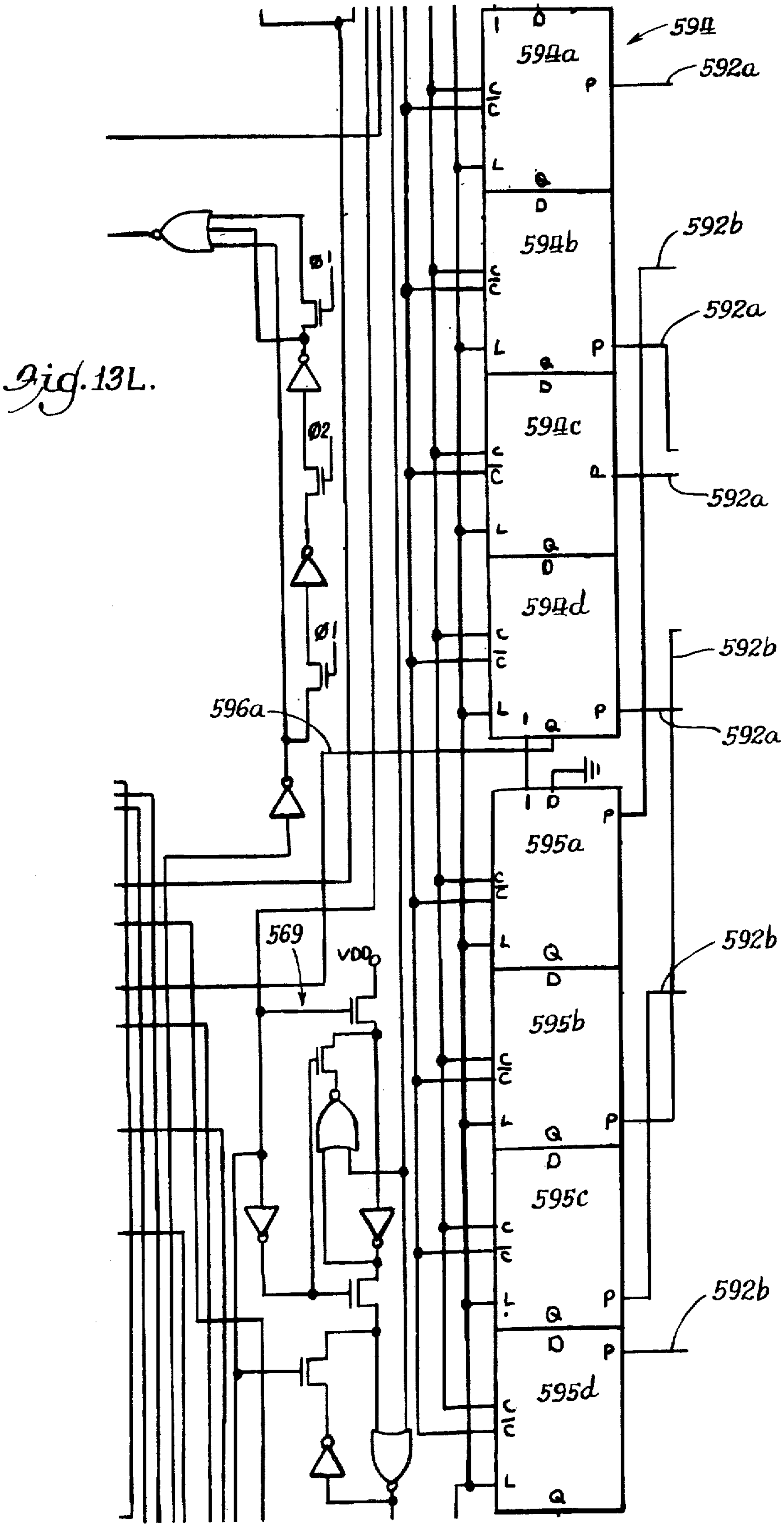
Figure 13M:
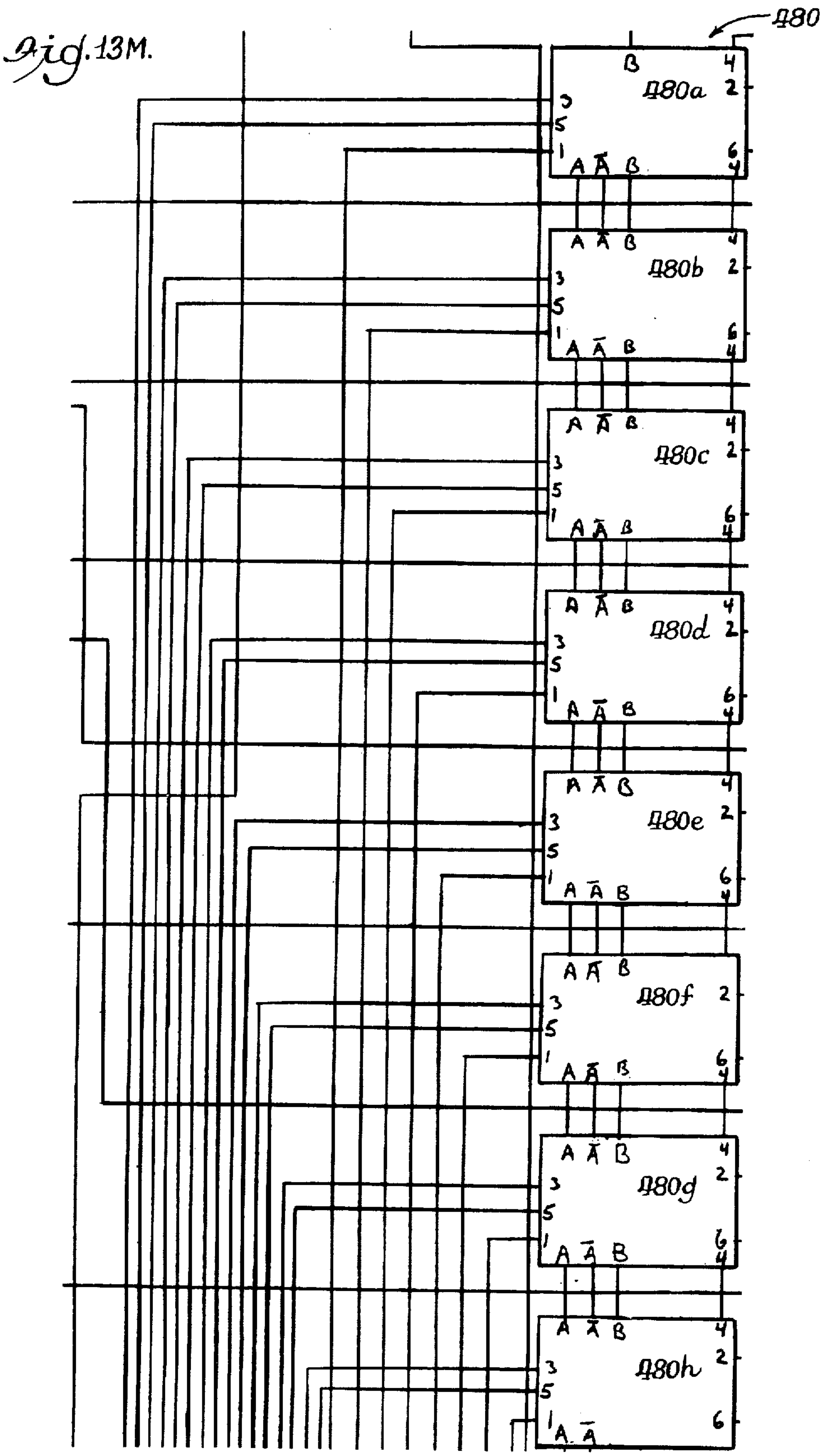
Figure 13N:
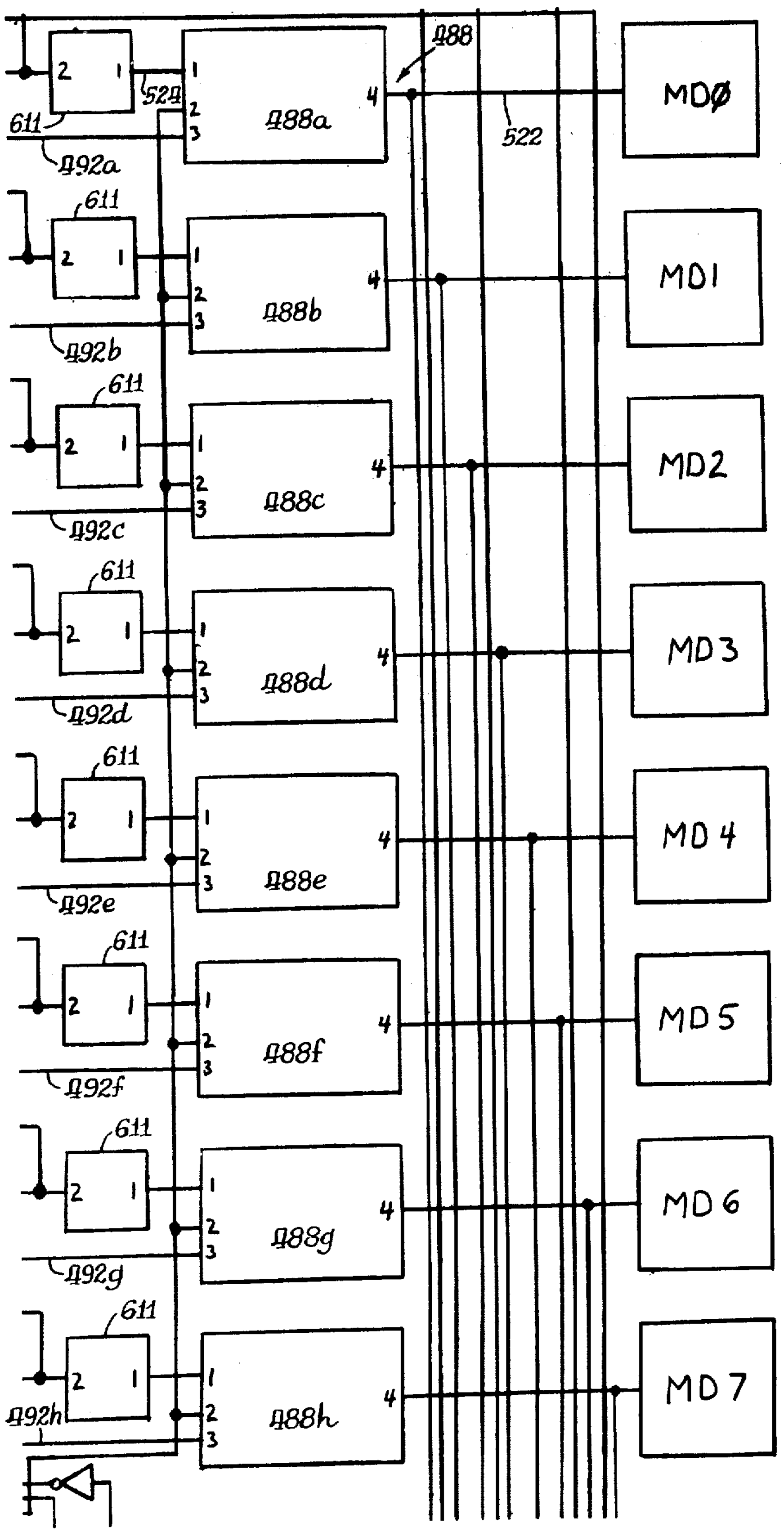
Figure 13P:
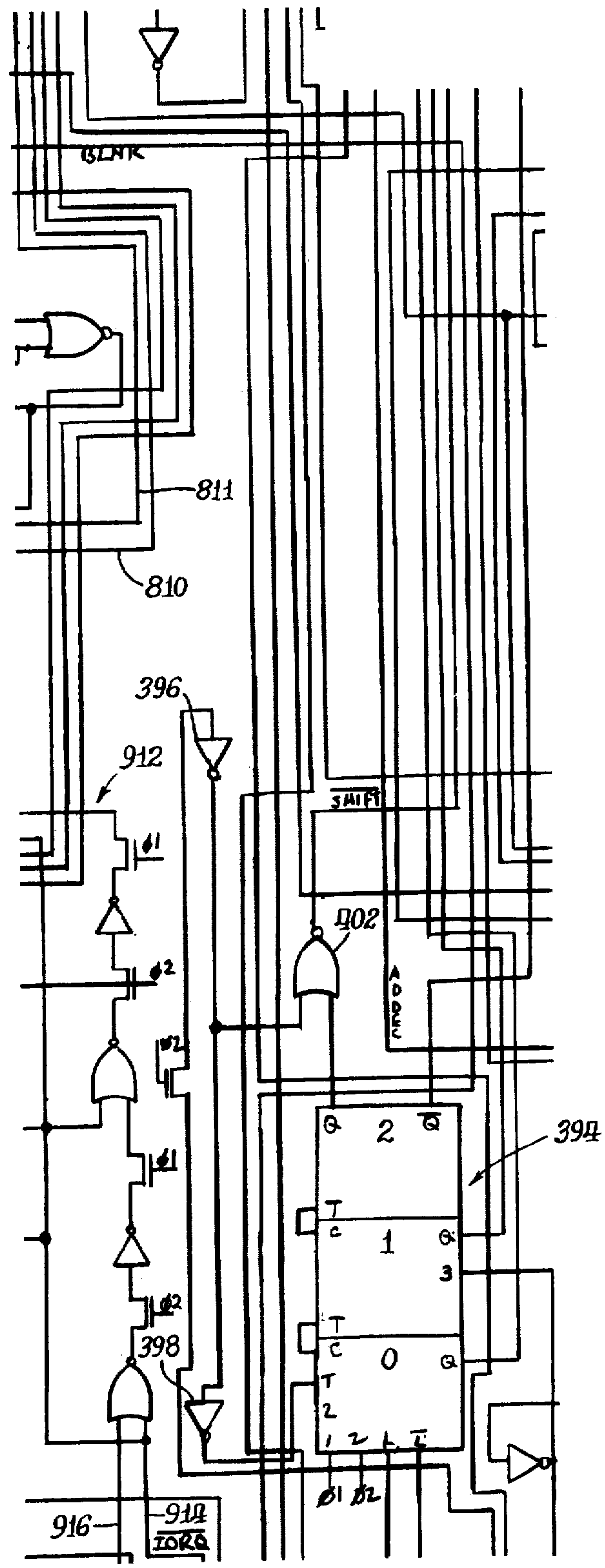
Figure 13Q:
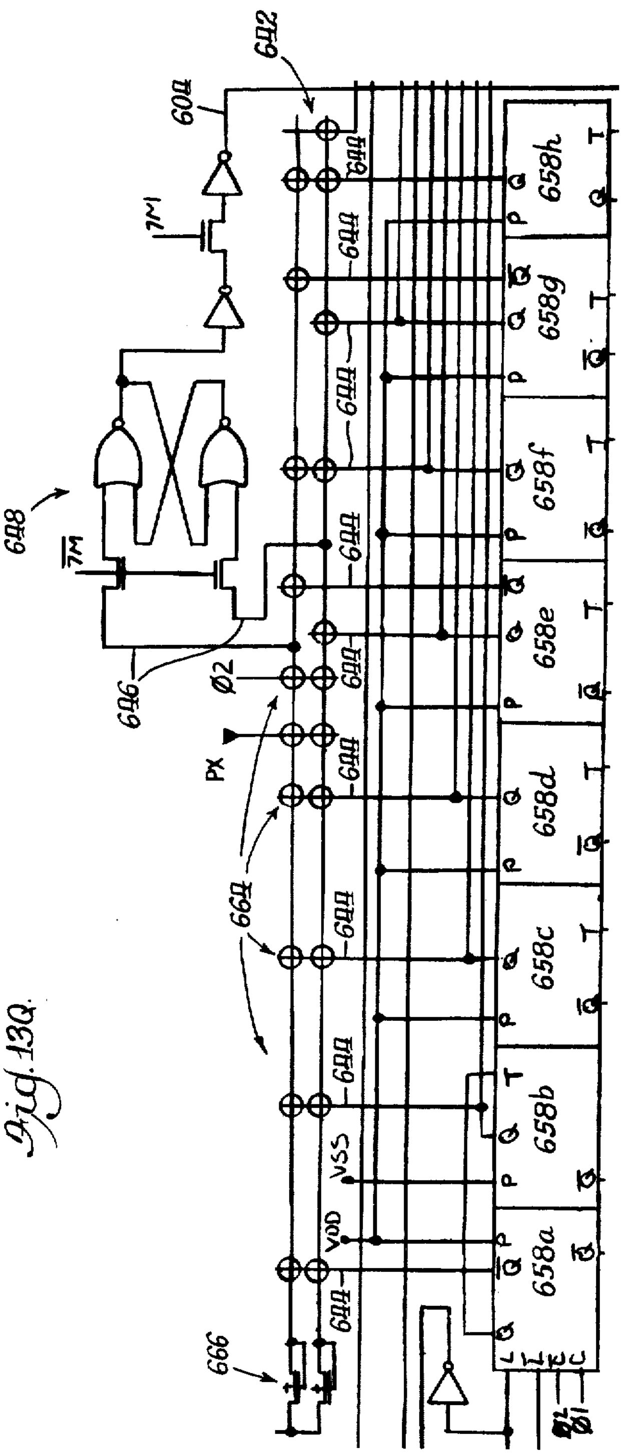
Figure 13R:
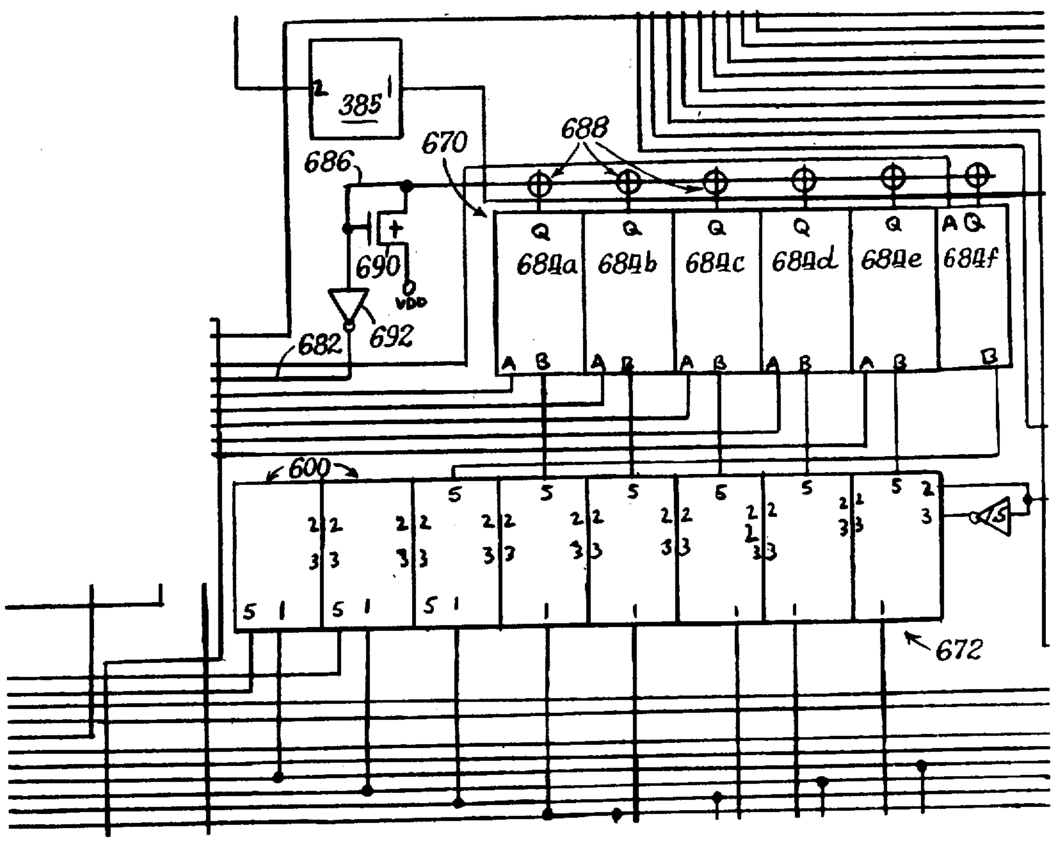
Figure 13S:
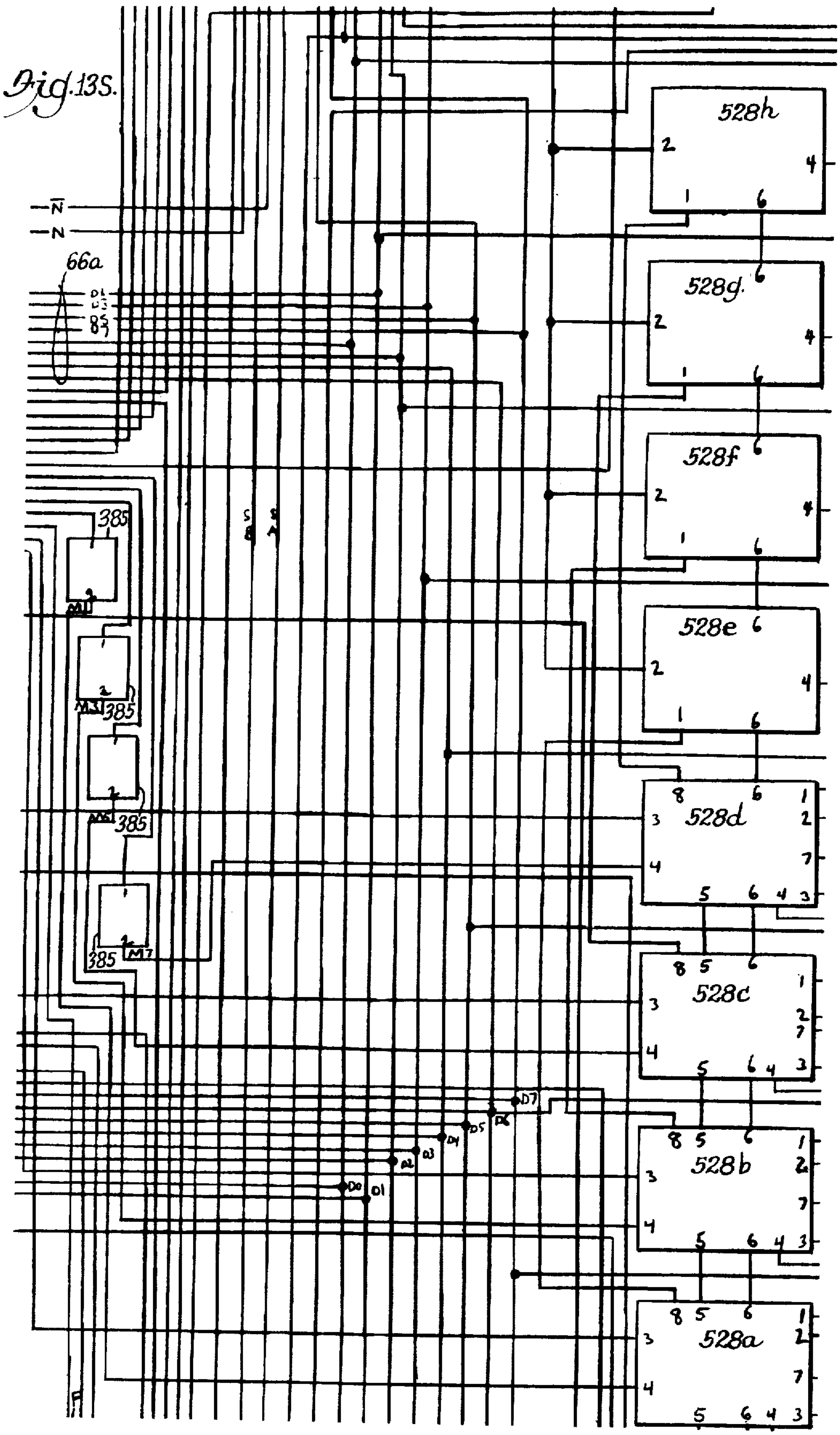
Figure 13T:
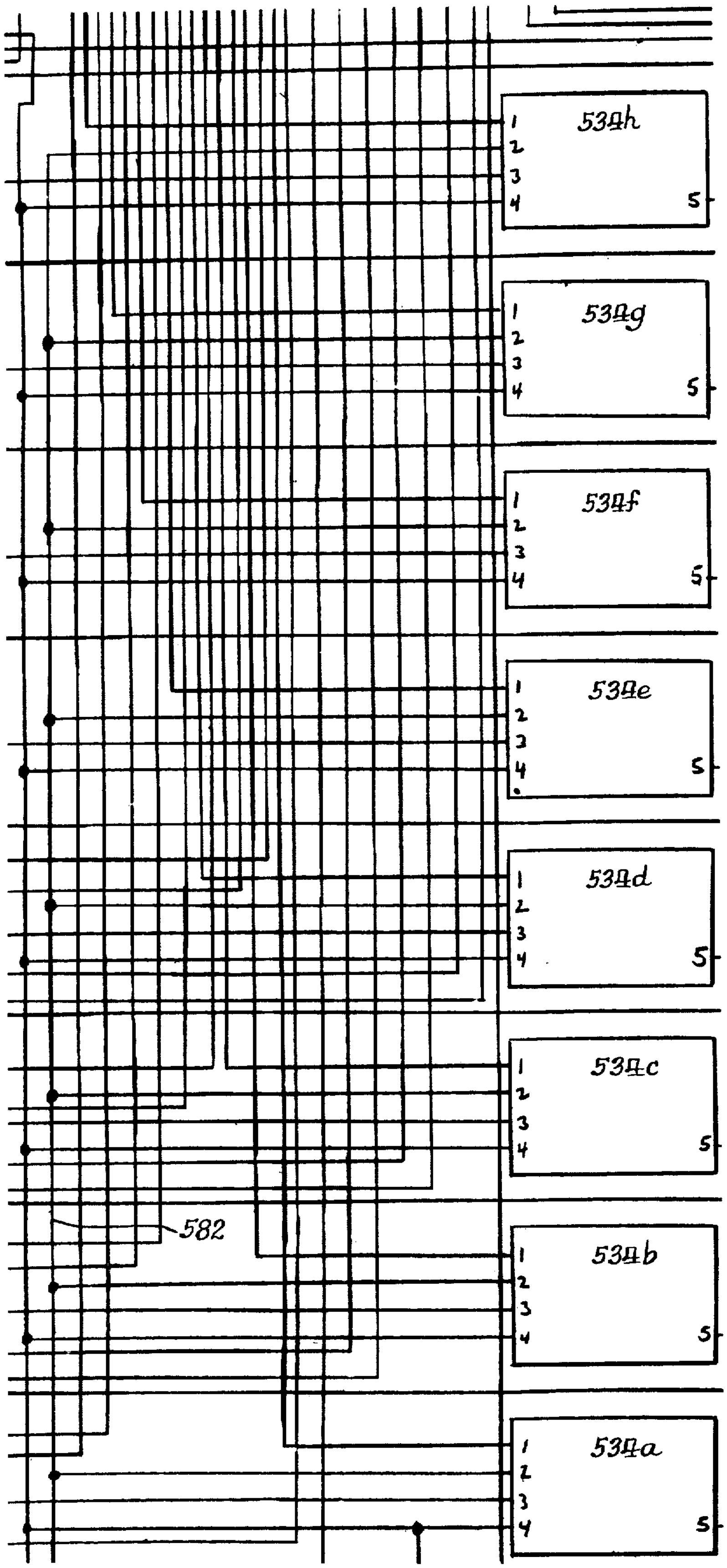
Figure 13U:
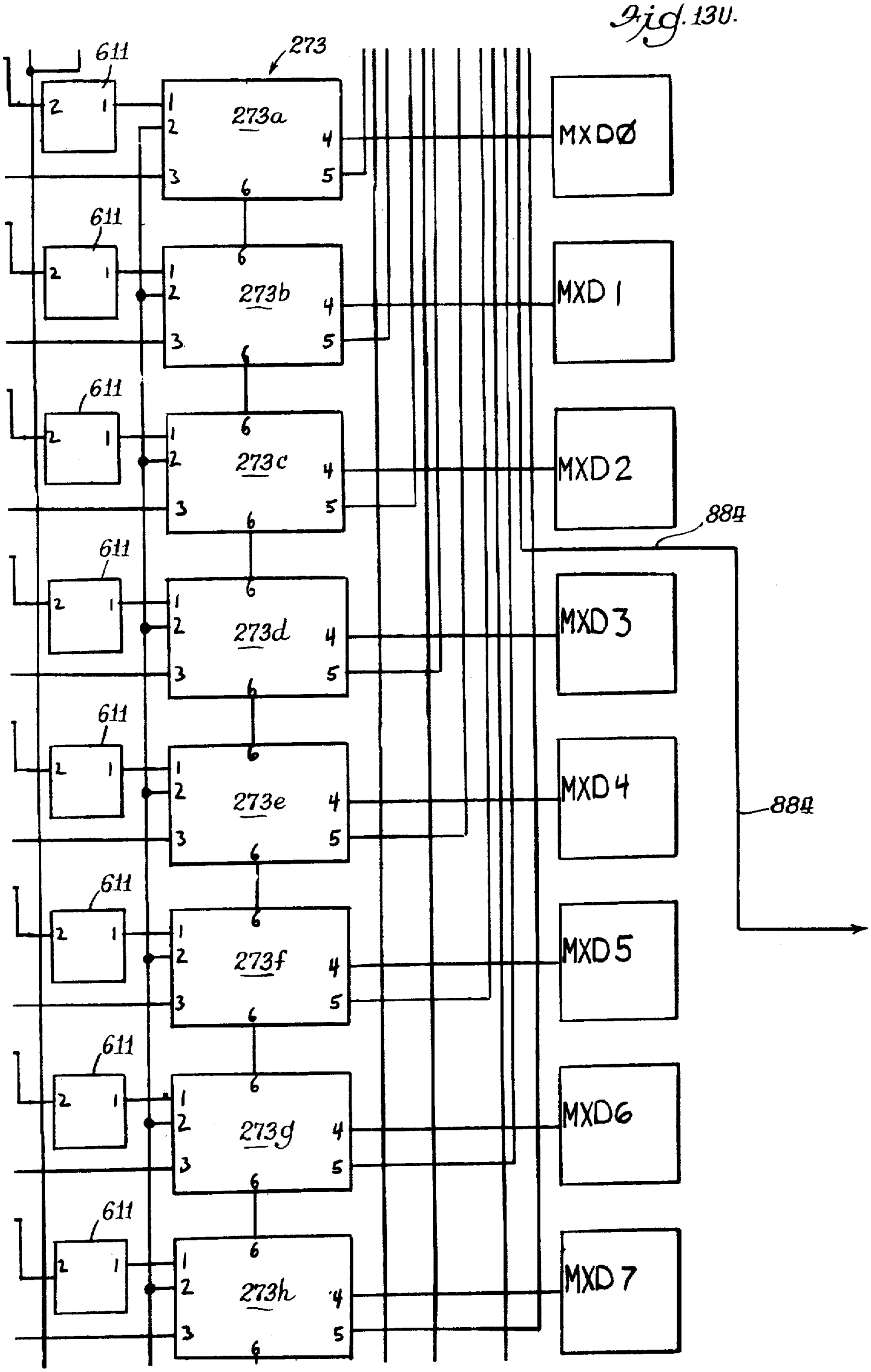
Figure 13V:
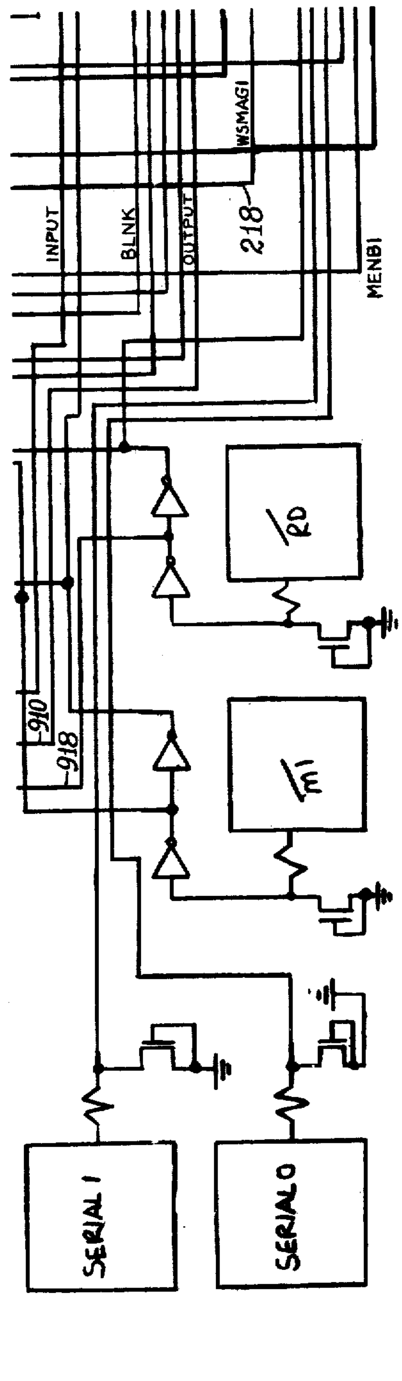
Figure 13W:
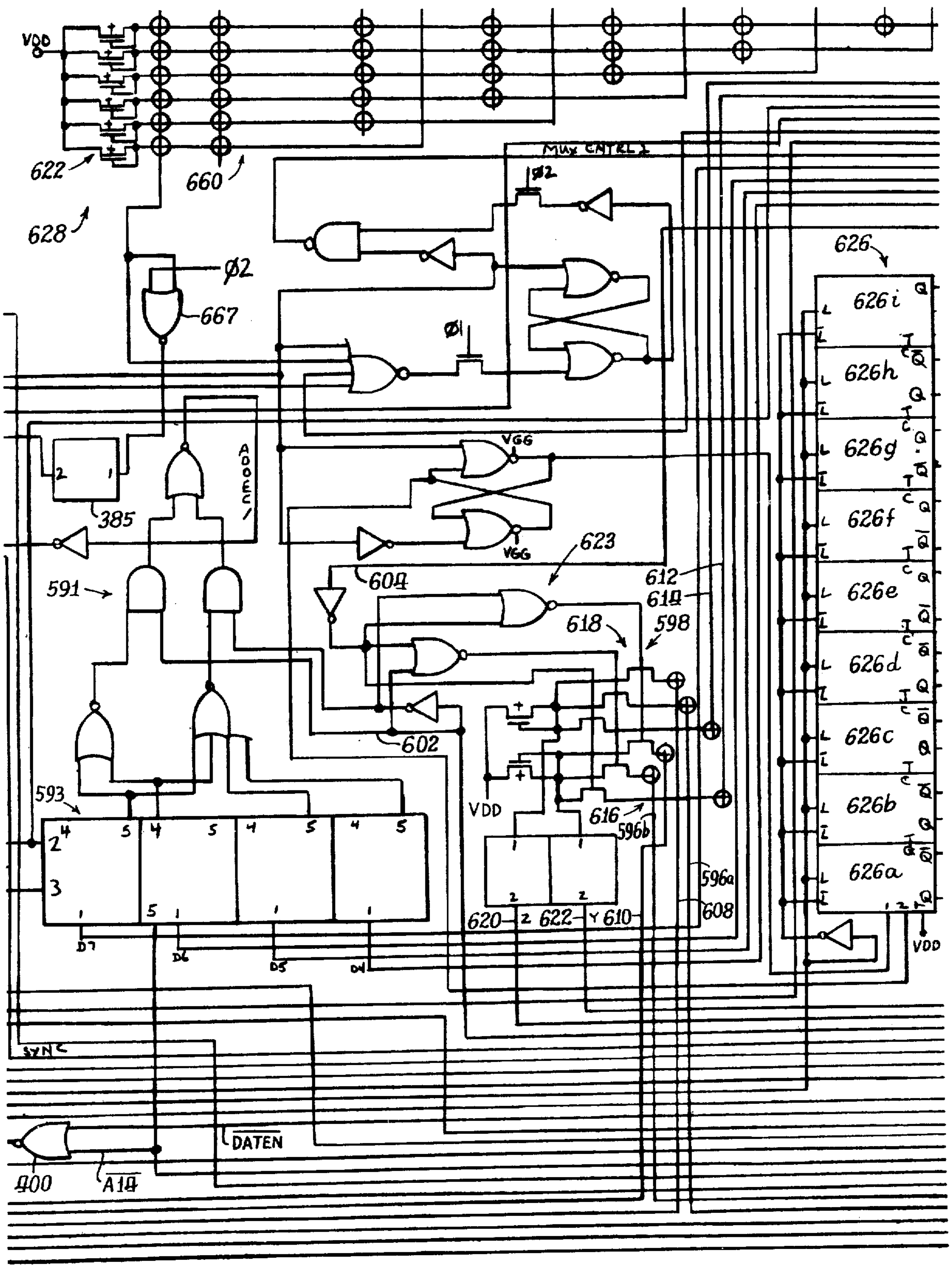
Figure 13X:
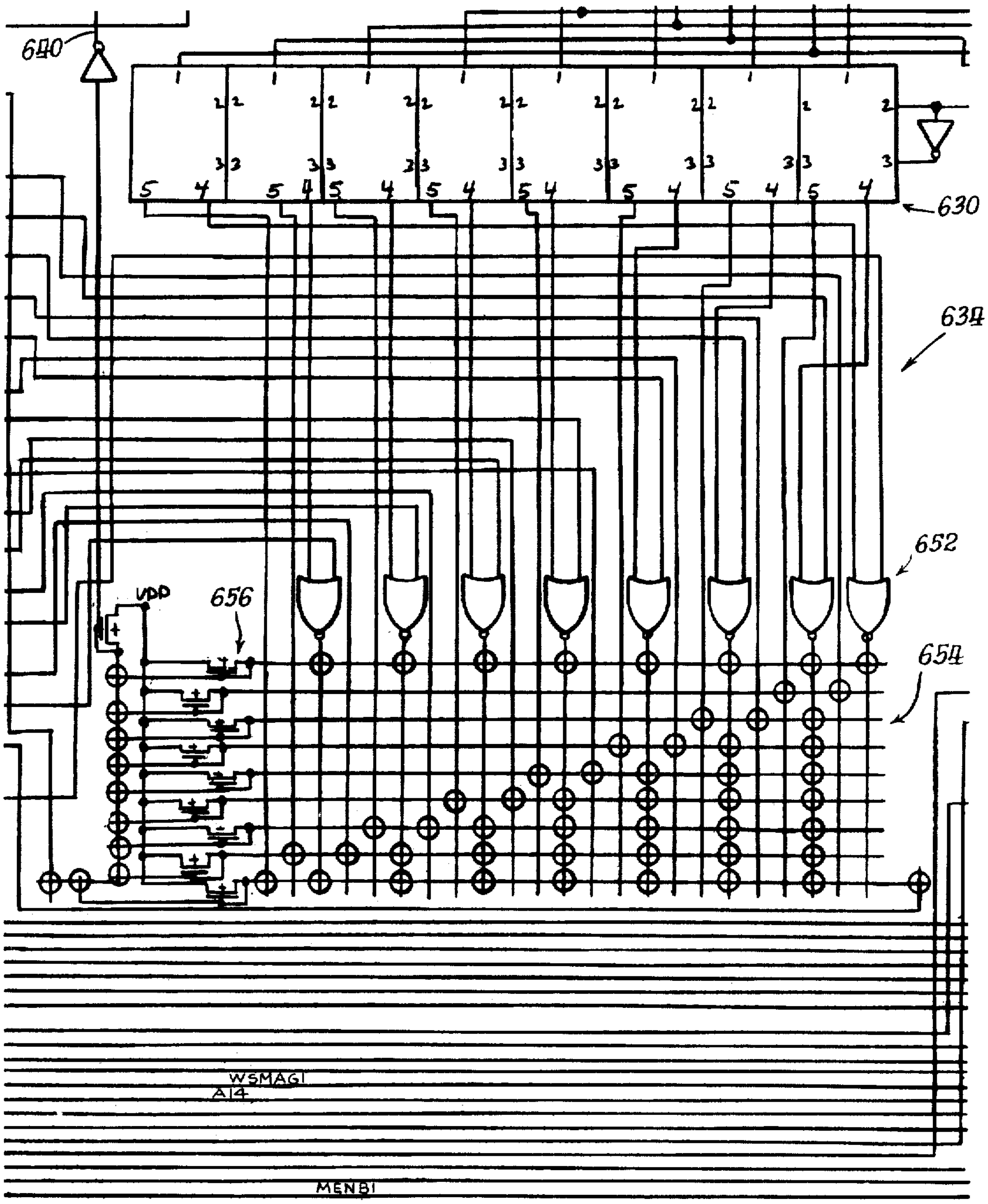
Figure 13Y:
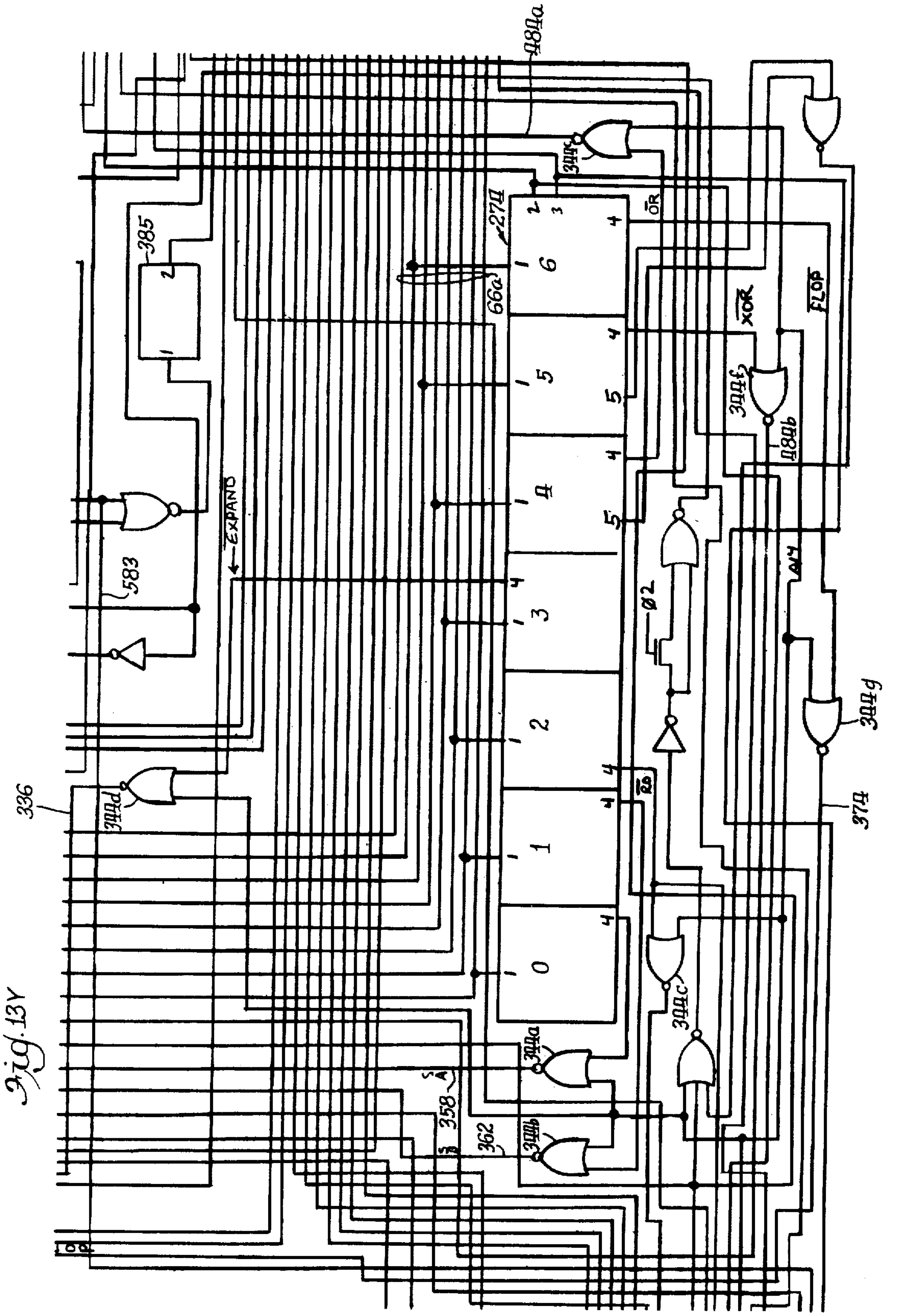
Figure 13Z:
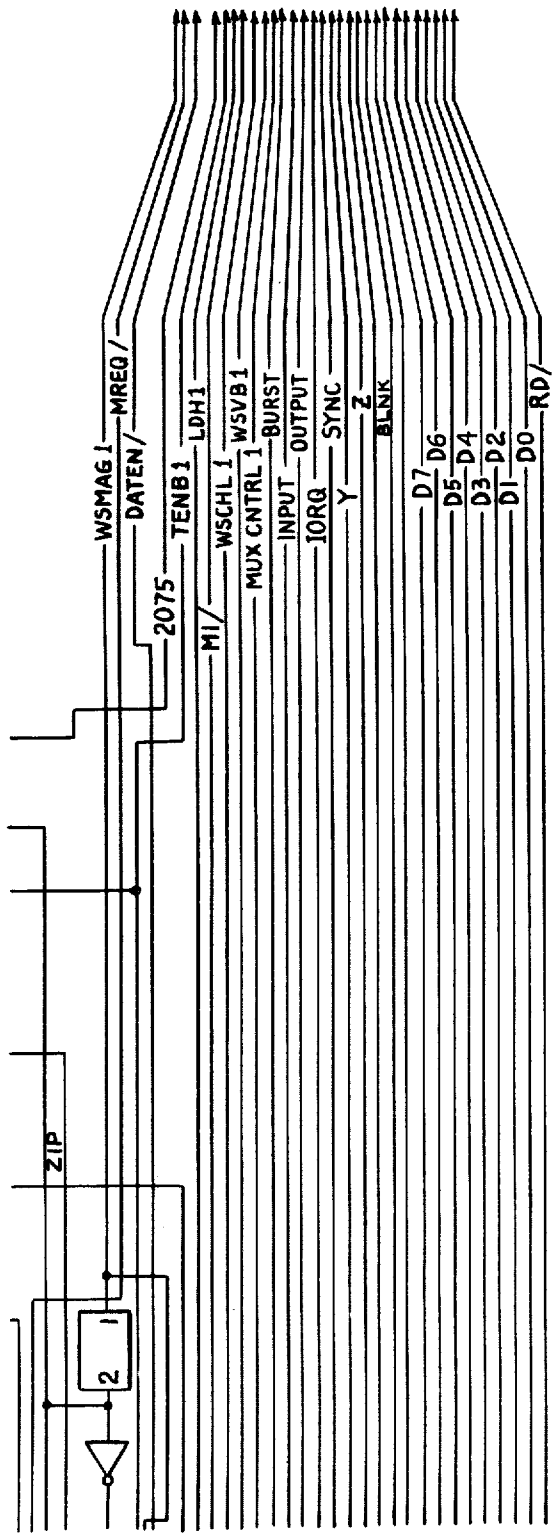
Figure 13A:
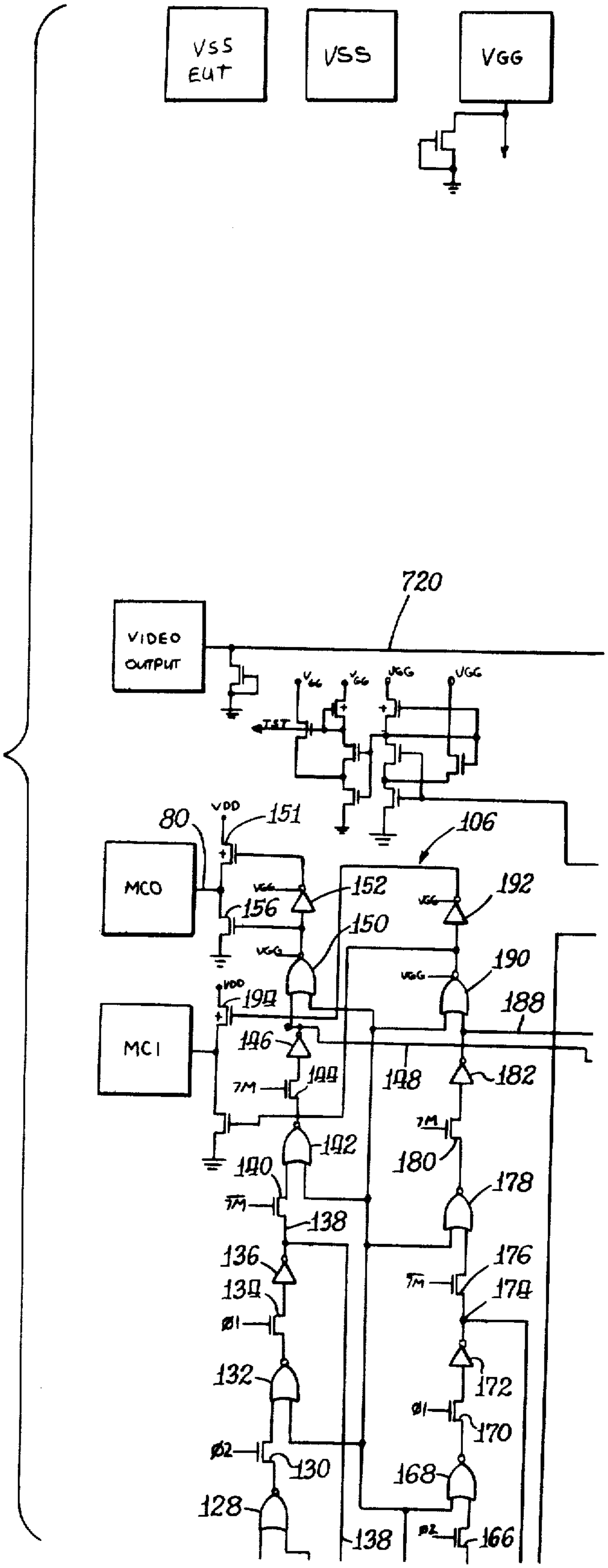
Figure 13B:
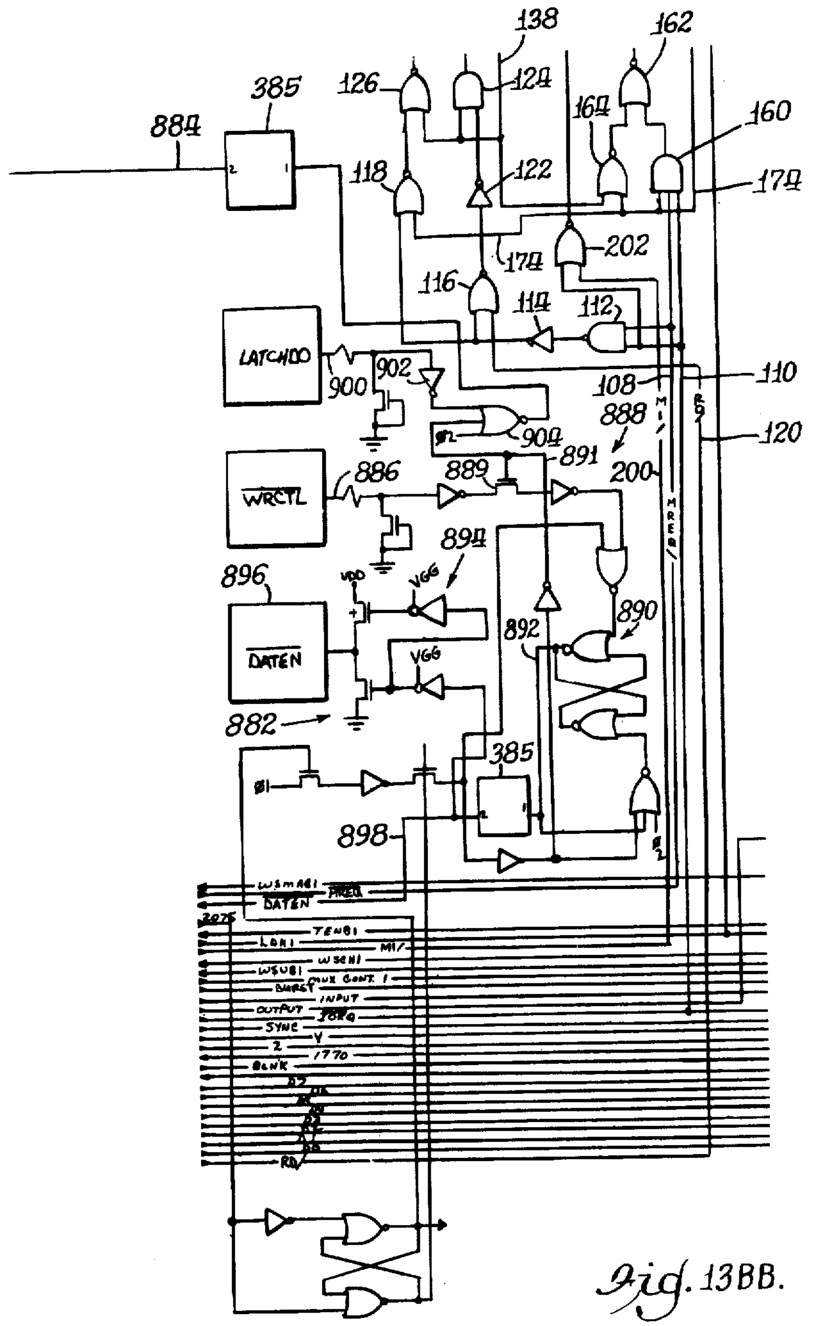
Figure 13C:
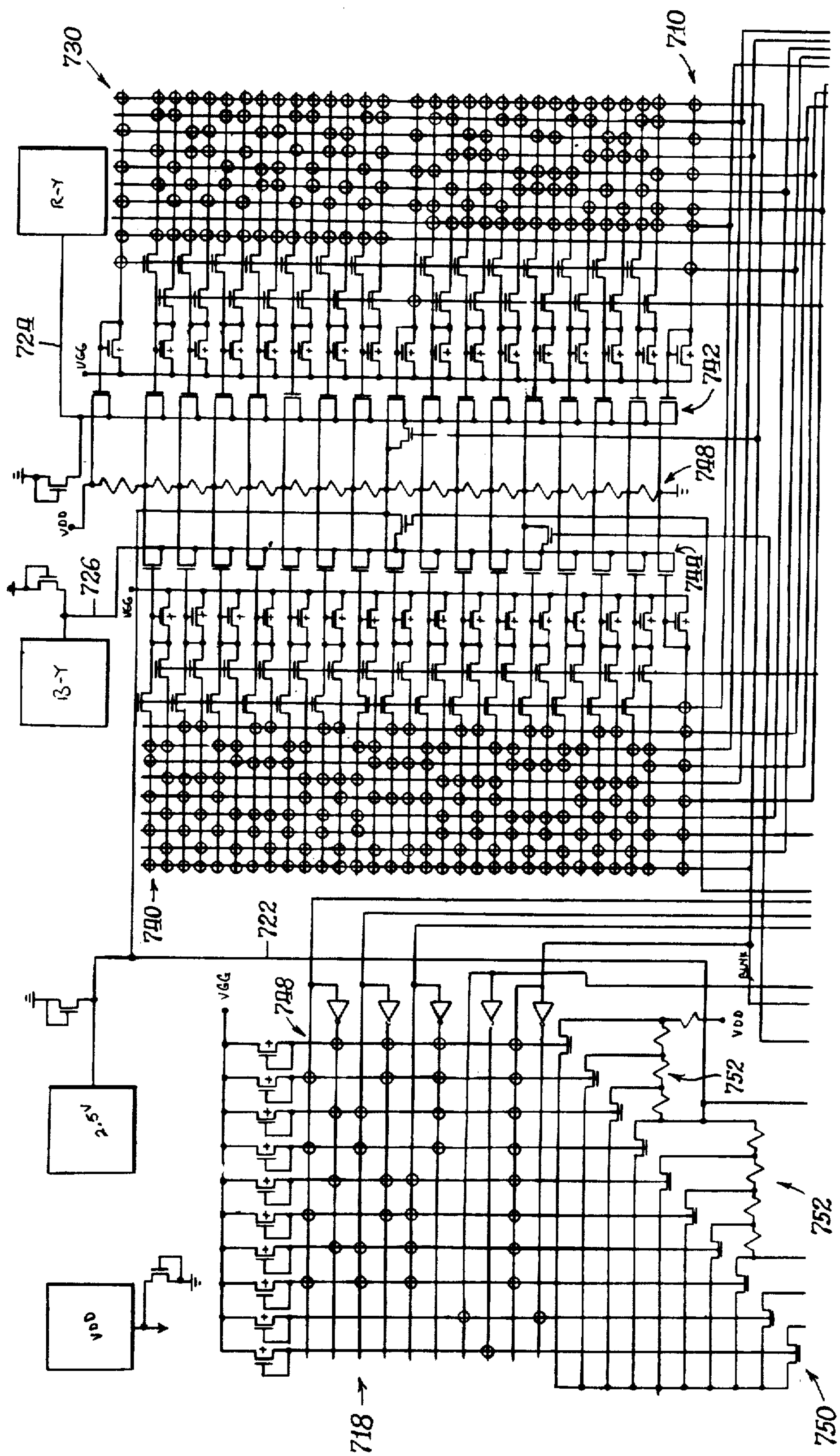
Figure 13D:
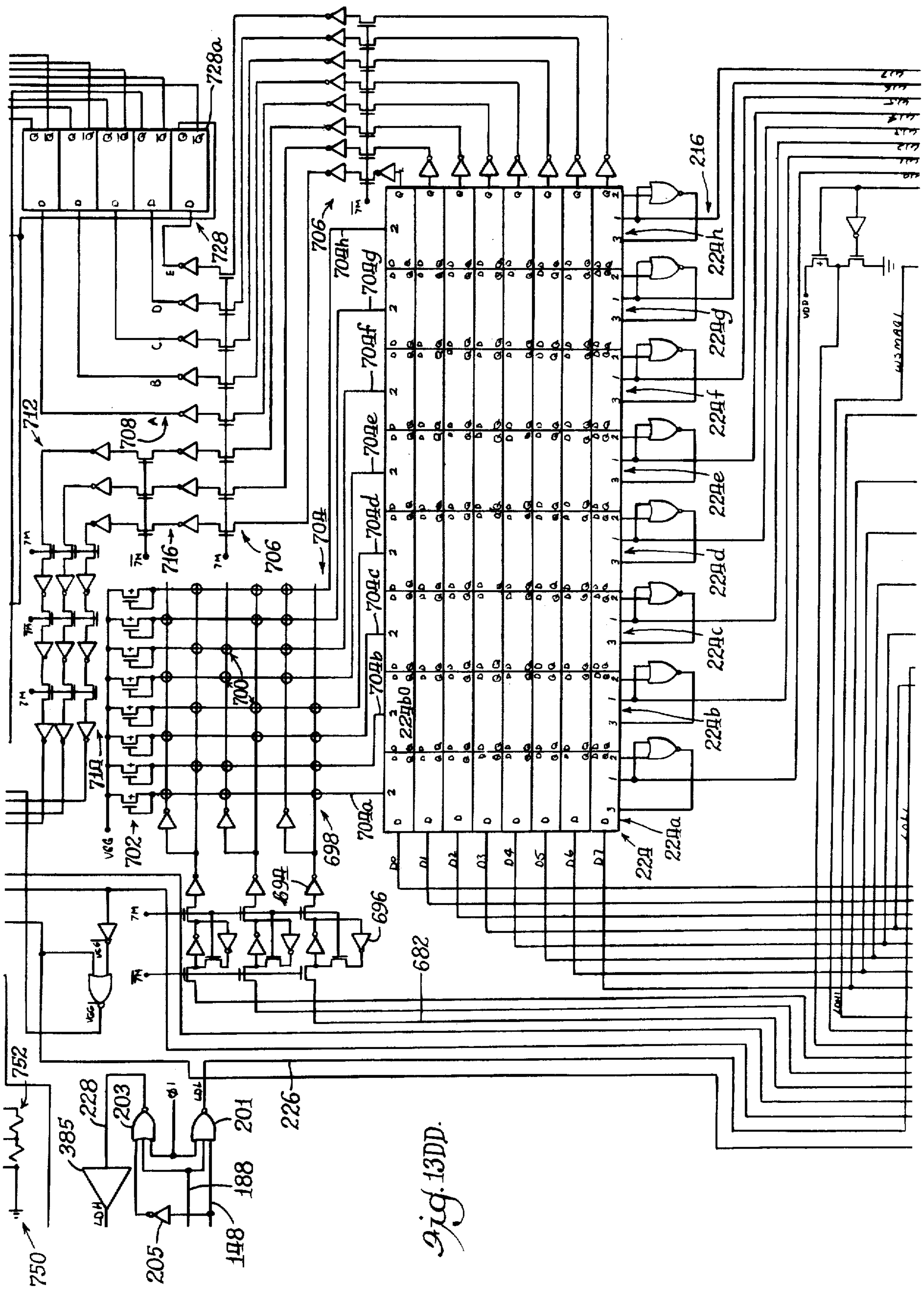
Figure 13E:
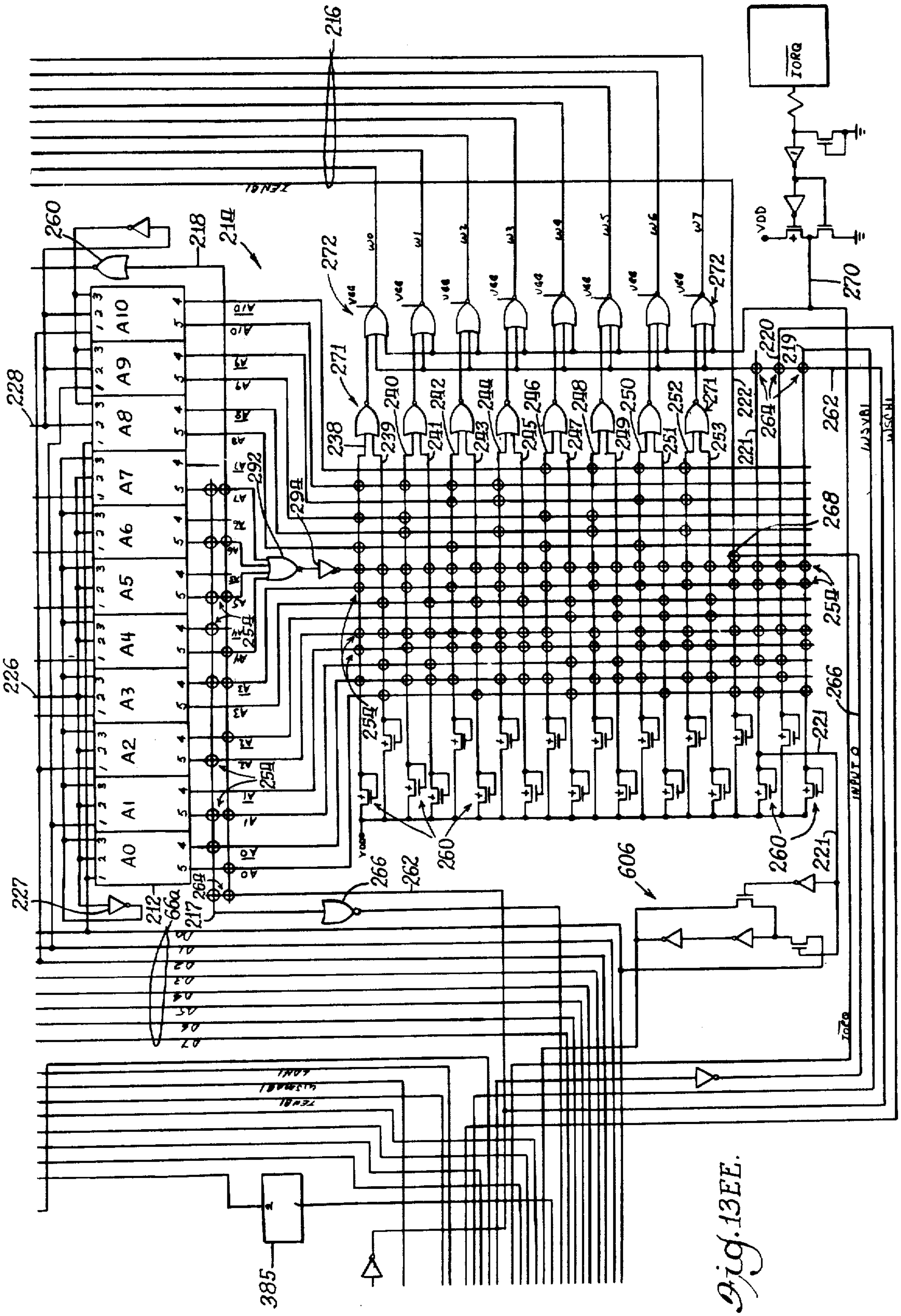
Figure 14:
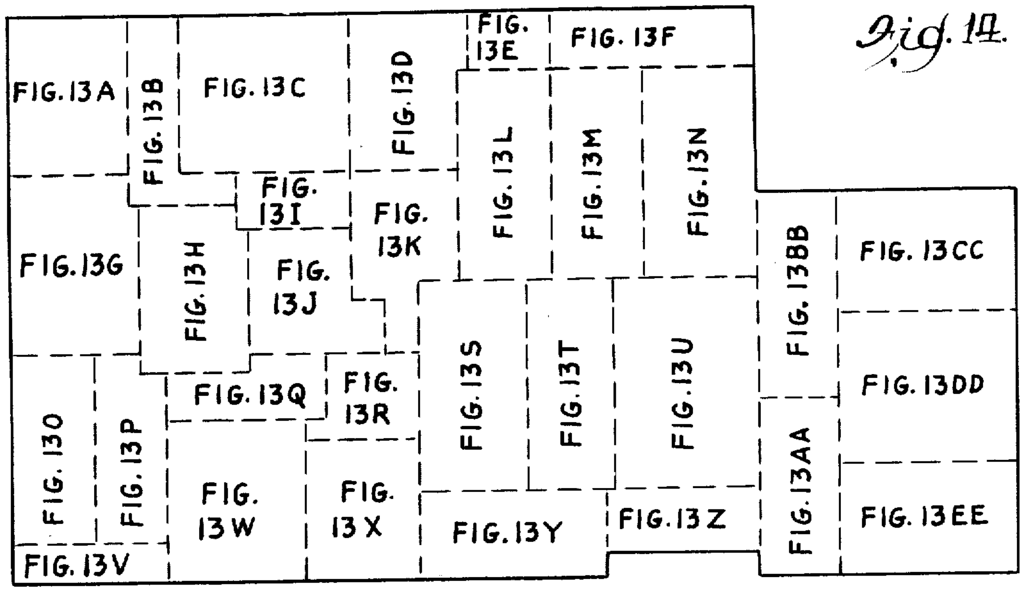

FIGS. 13A–Z and 13AA–EE illustrate an example of a circuit implementing the block diagram of FIGS. 11A–F;

FIG. 14 is a composite diagram illustrating the relationship of FIGS. 13A–EE viewed as whole;

FIGS. 15–39 are diagrams showing blocks of FIGS. 13A–EE in greater detail.

Figure 46:
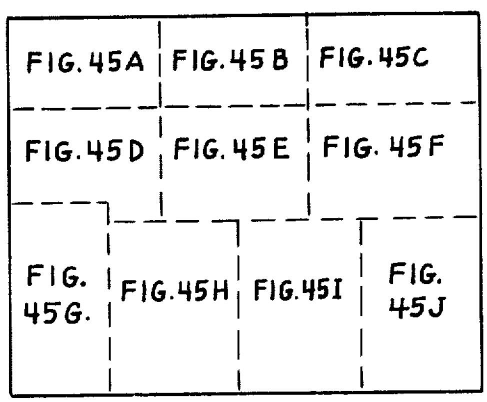
Figure 74:
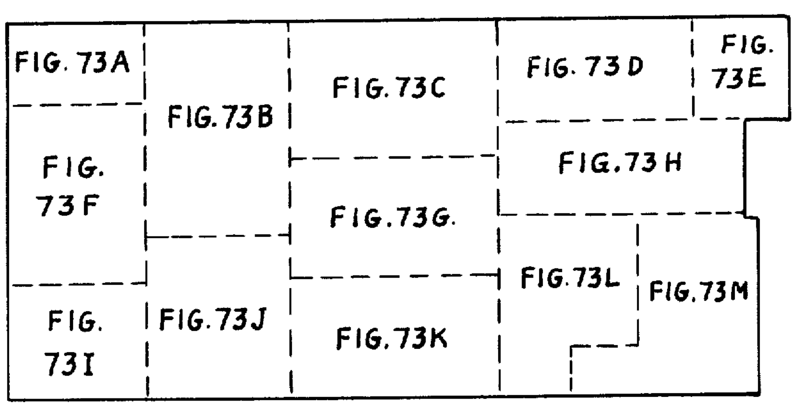
Figure 41:
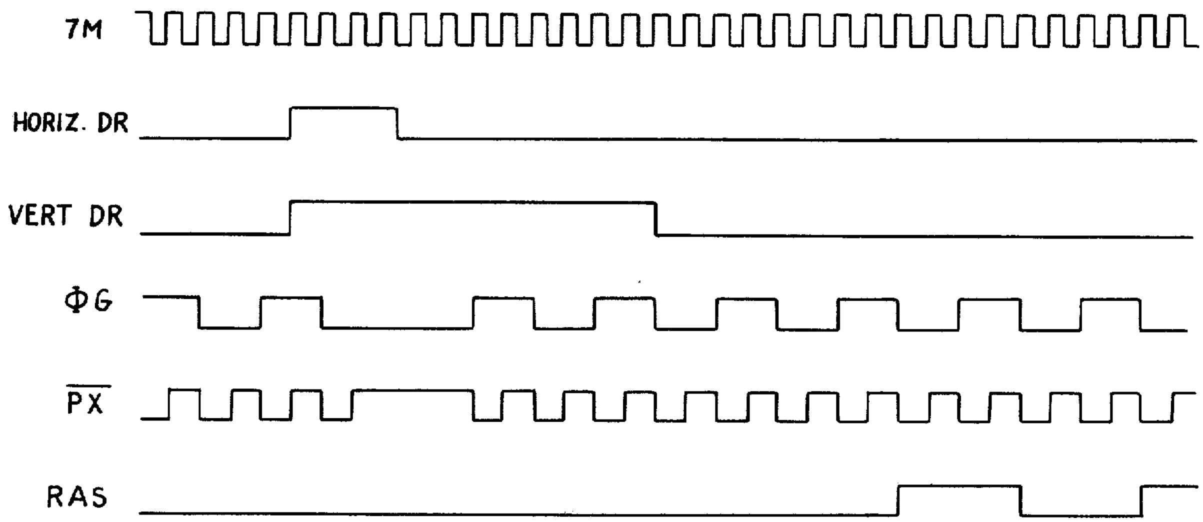
Figure 43:
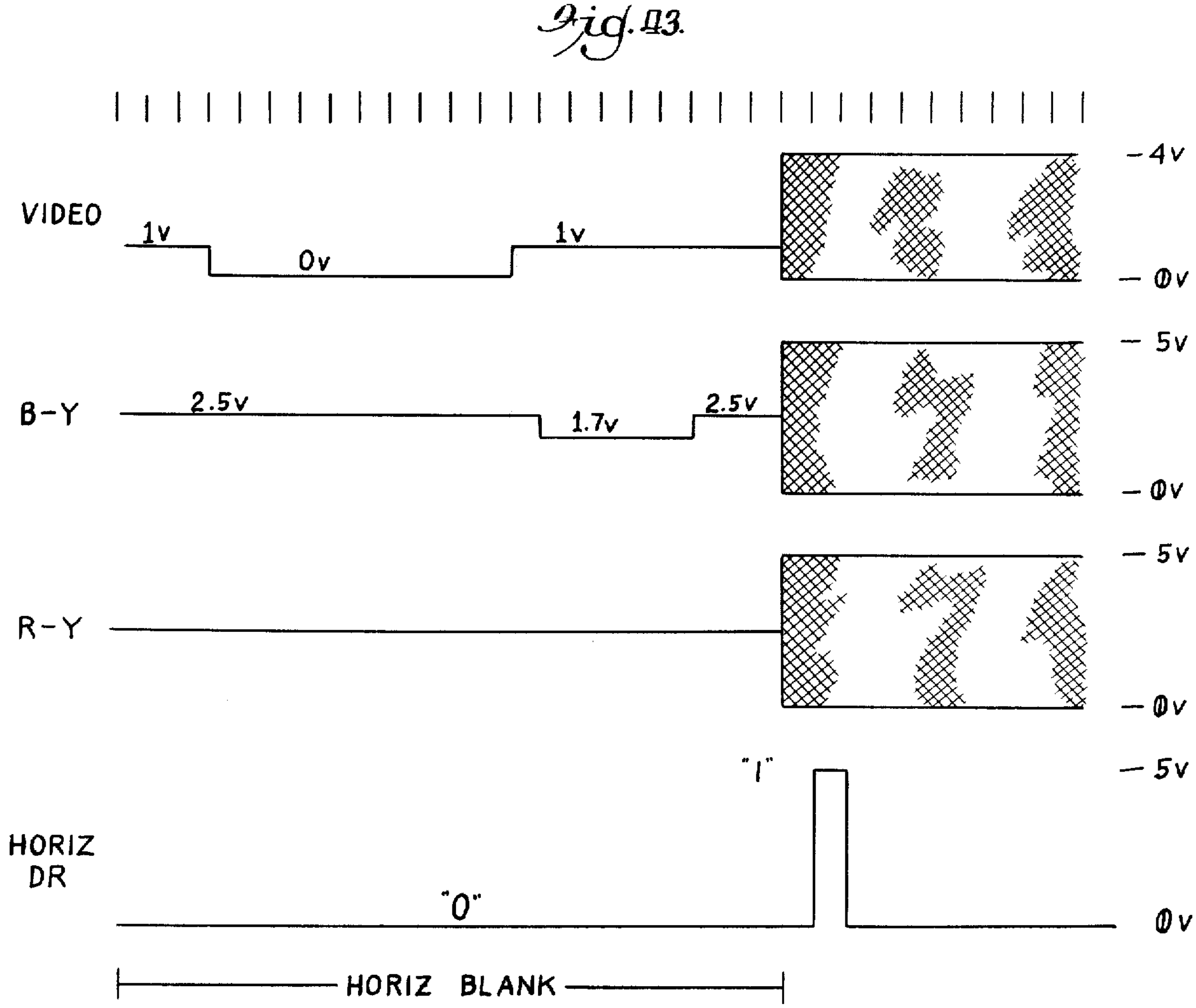
Figure 12:
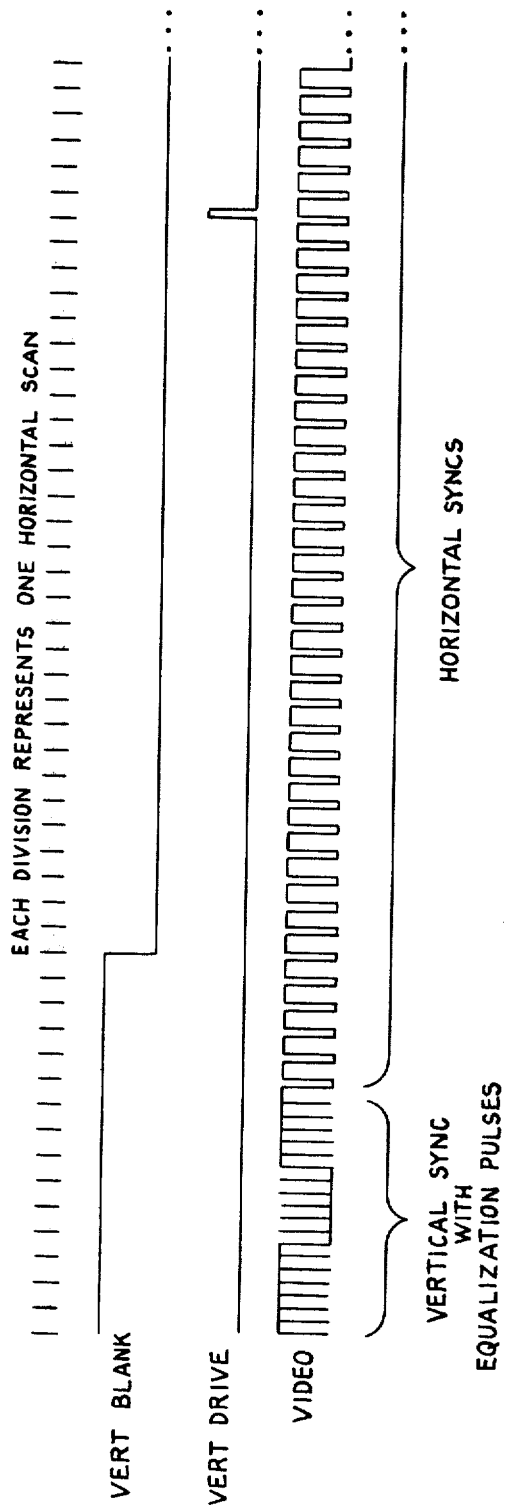
Figure 44:
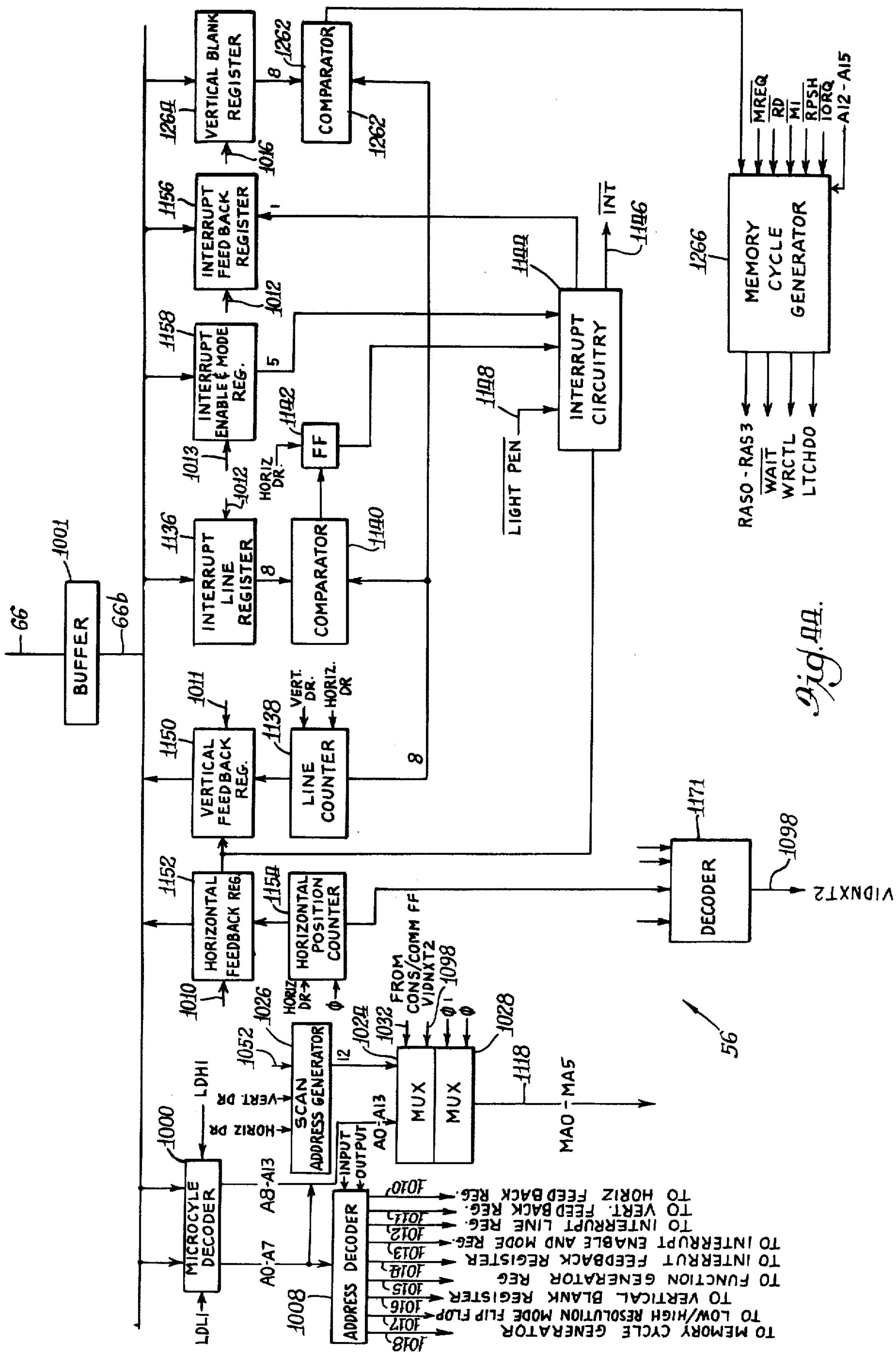
Figure 45B:
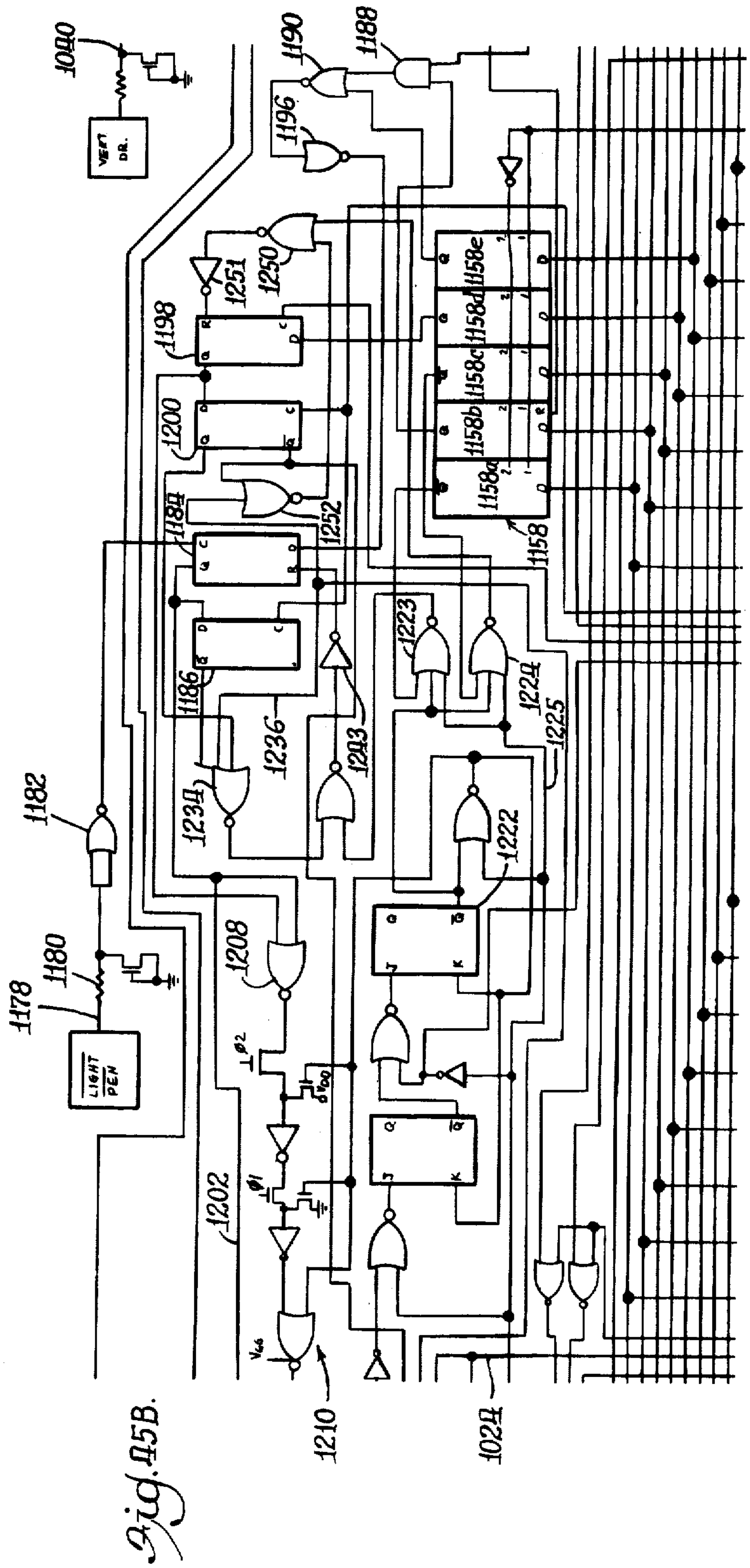
Figure 15C:
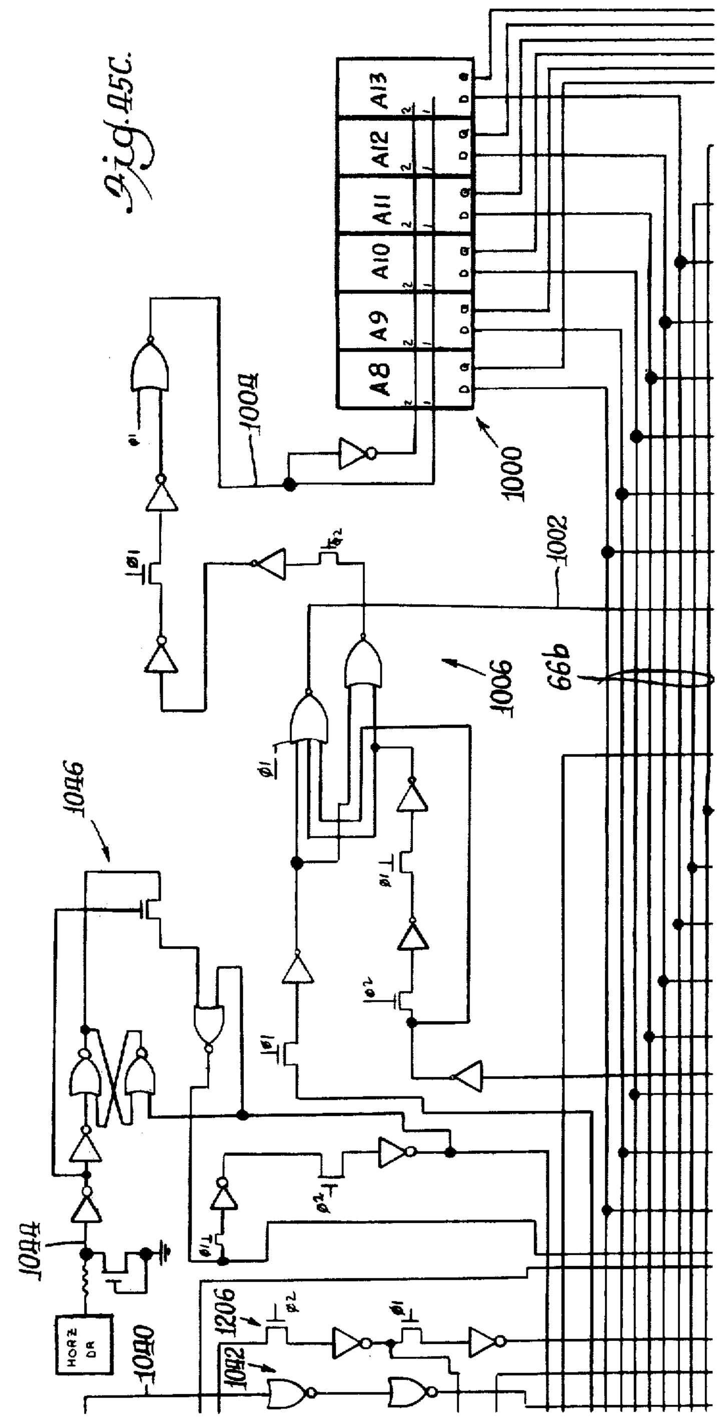
Figure 45D:
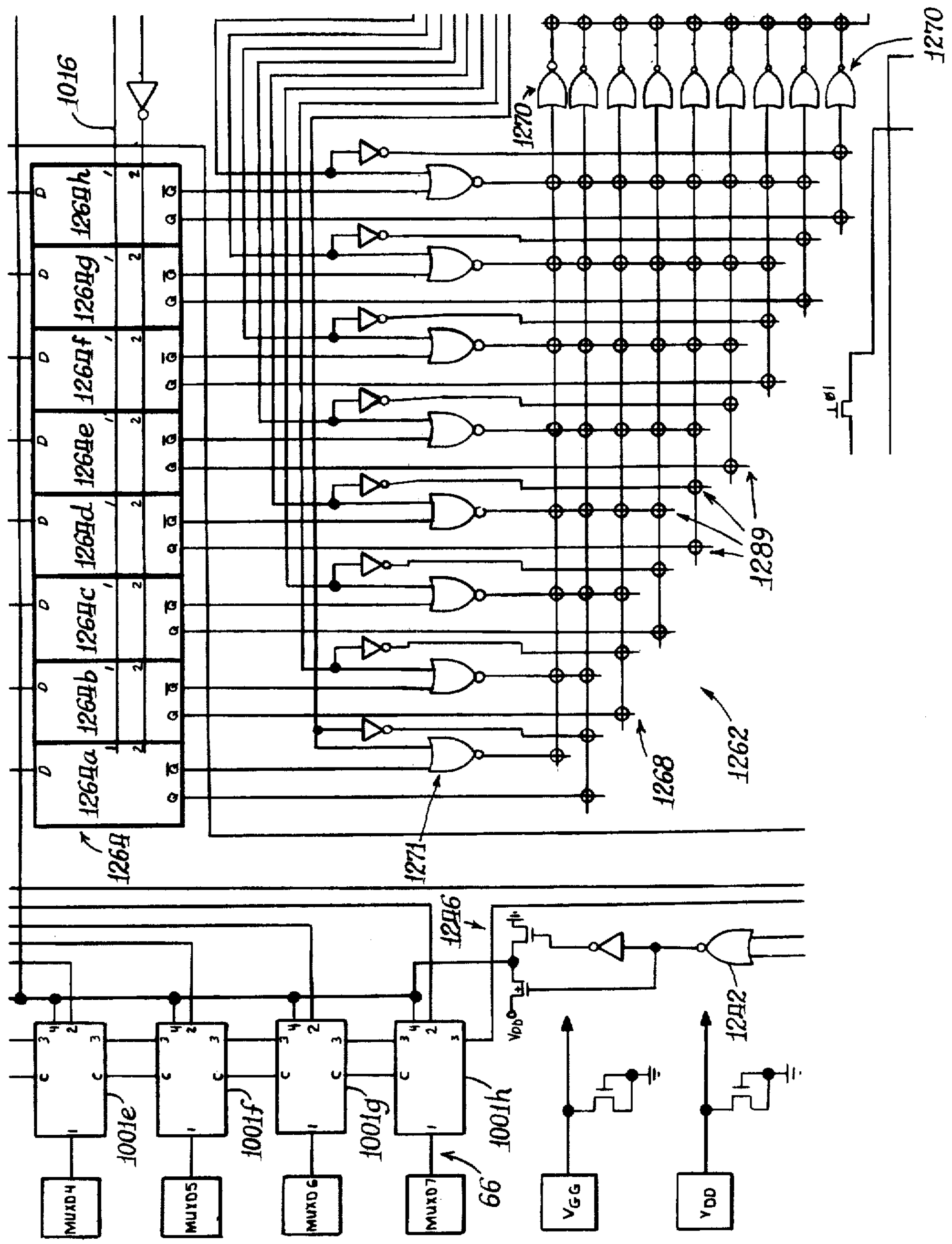
Figure 15E:
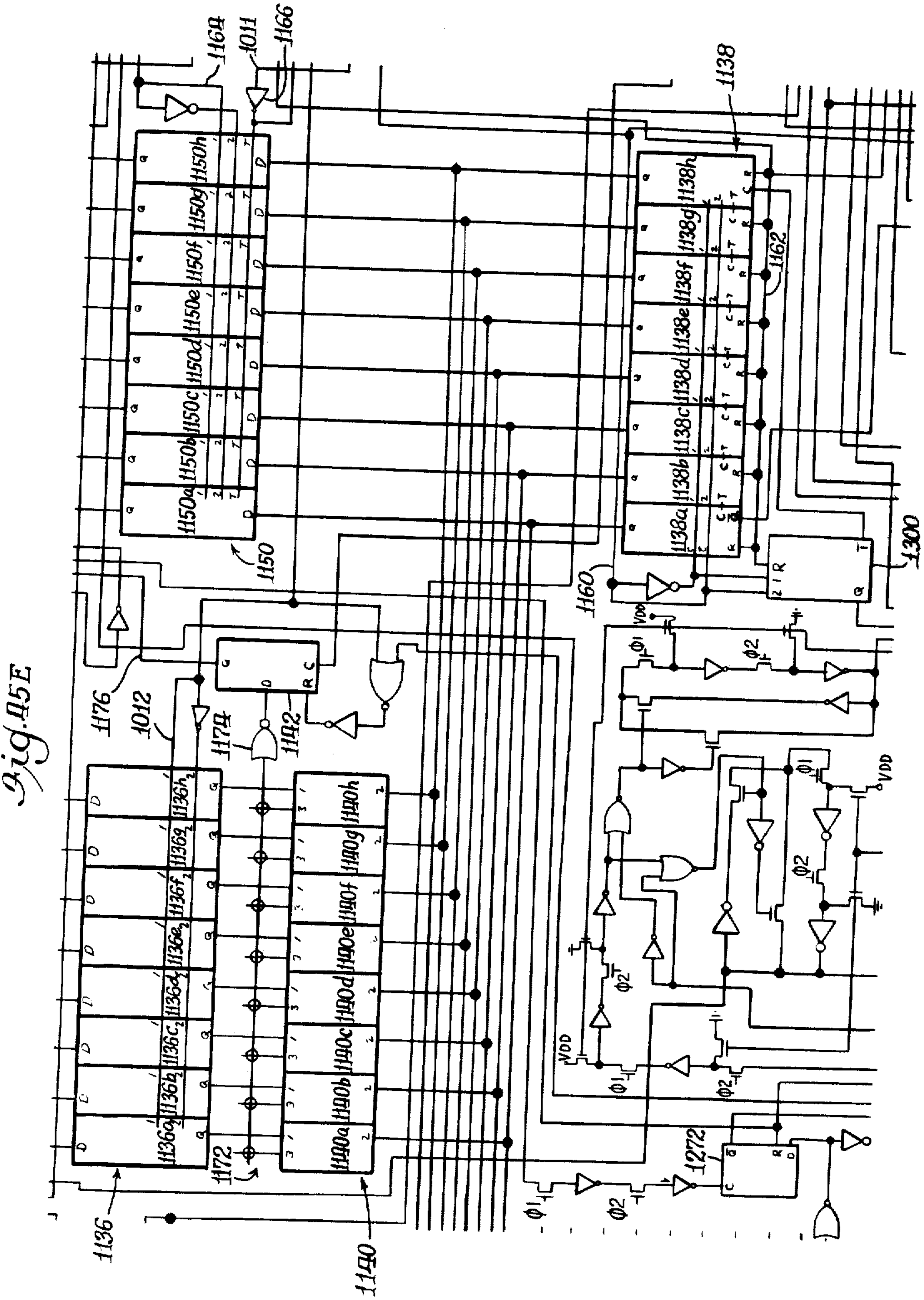
Figure 45F:
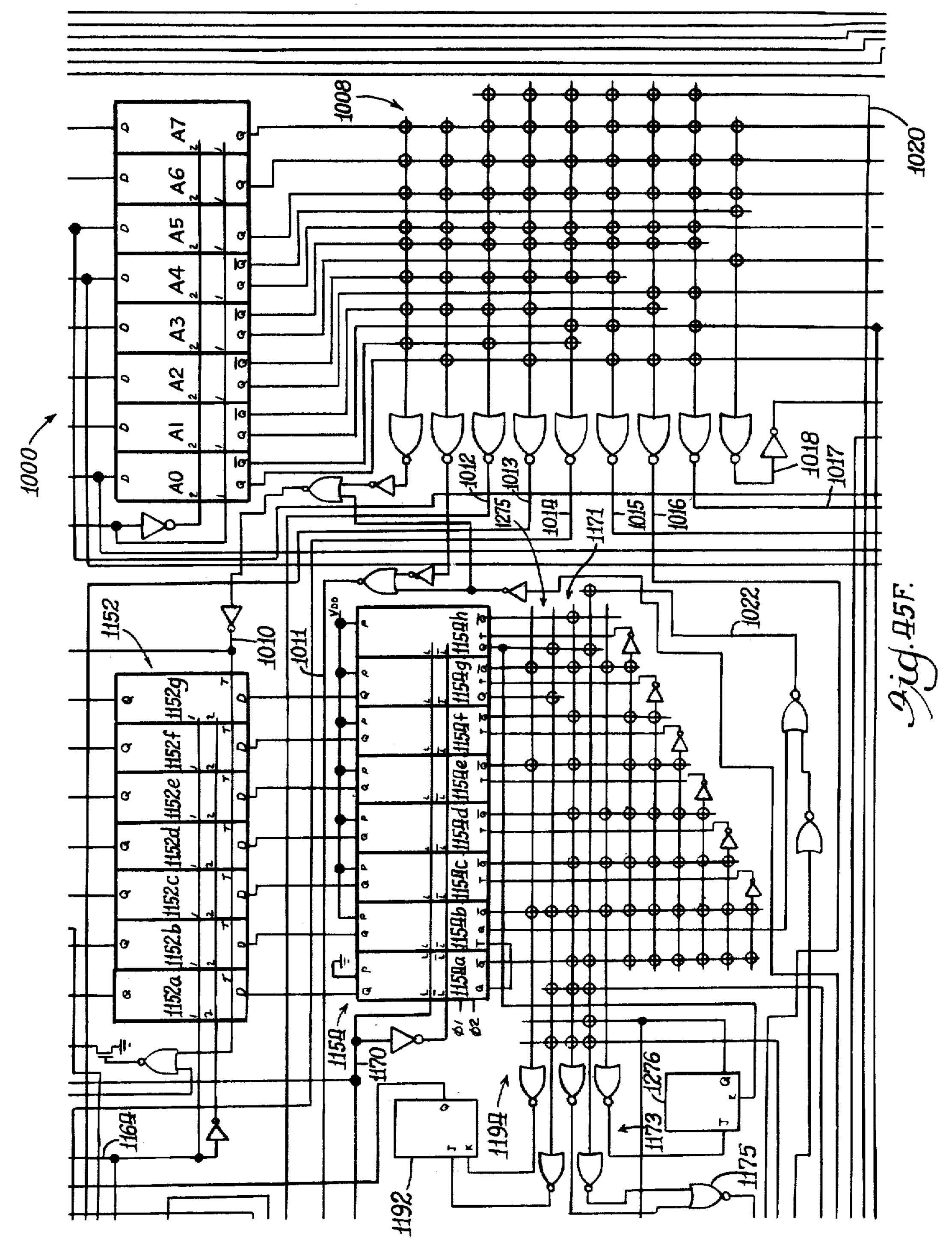
Figure 45G:
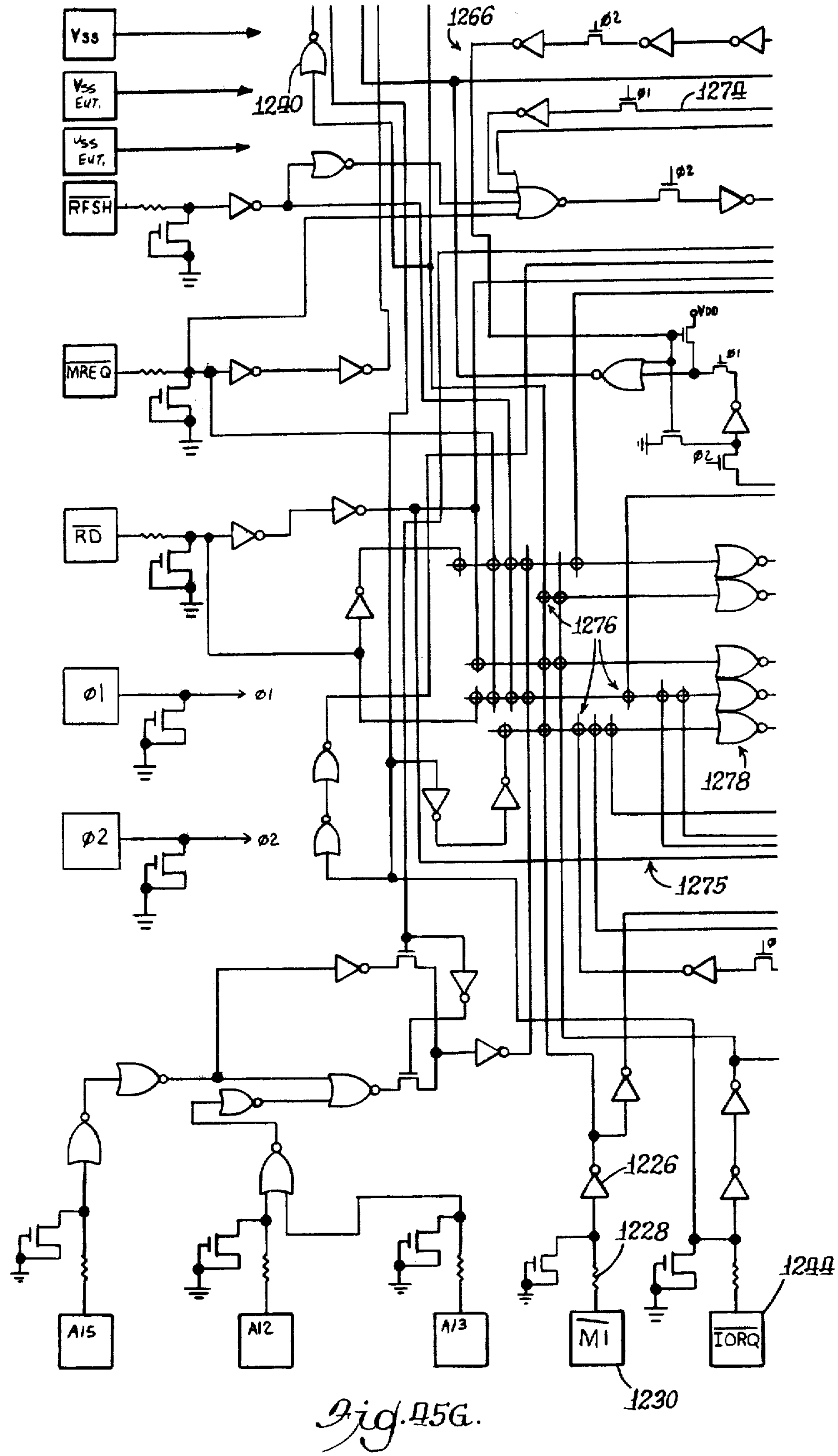
Figure 45H:
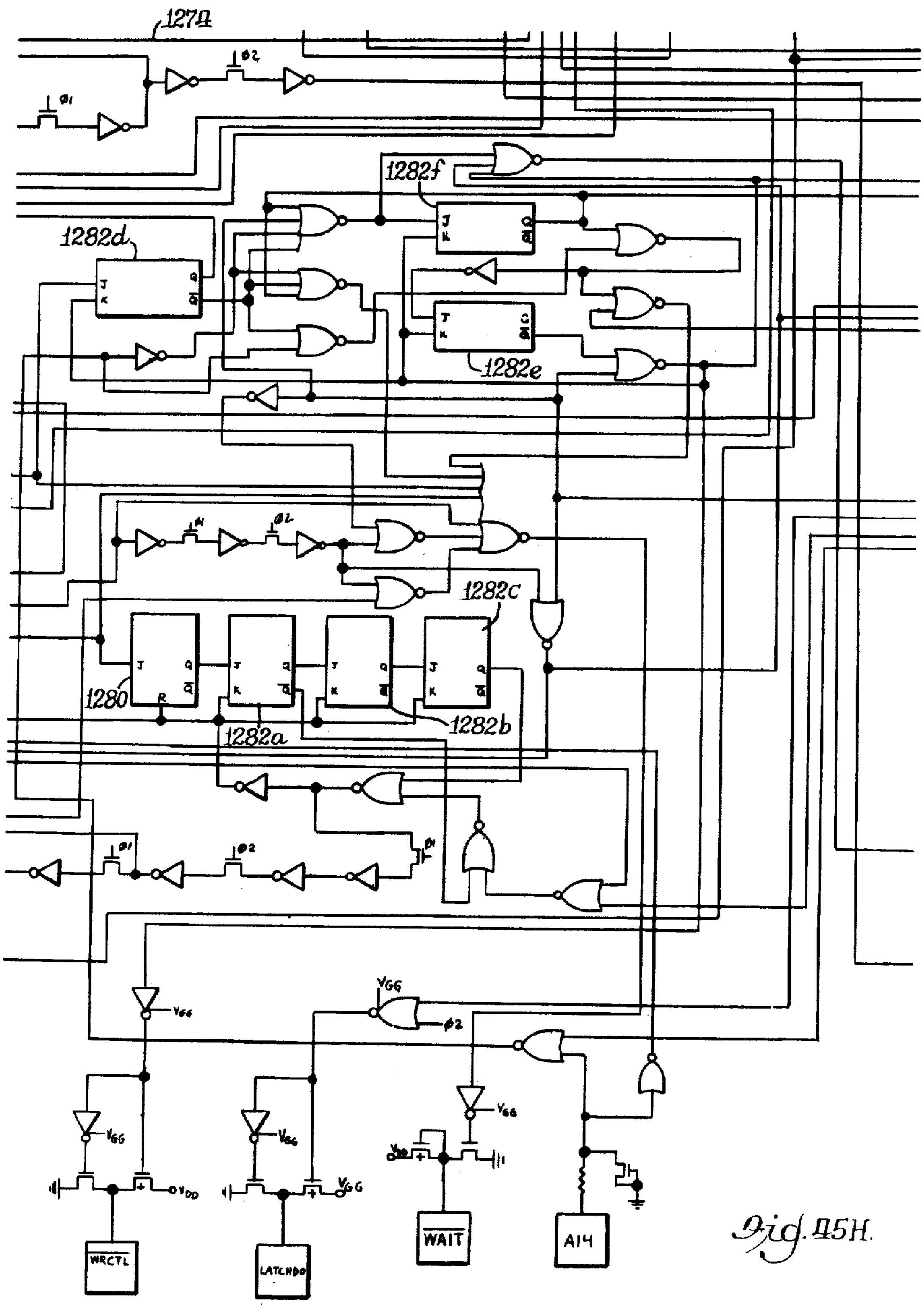
Figure 451:
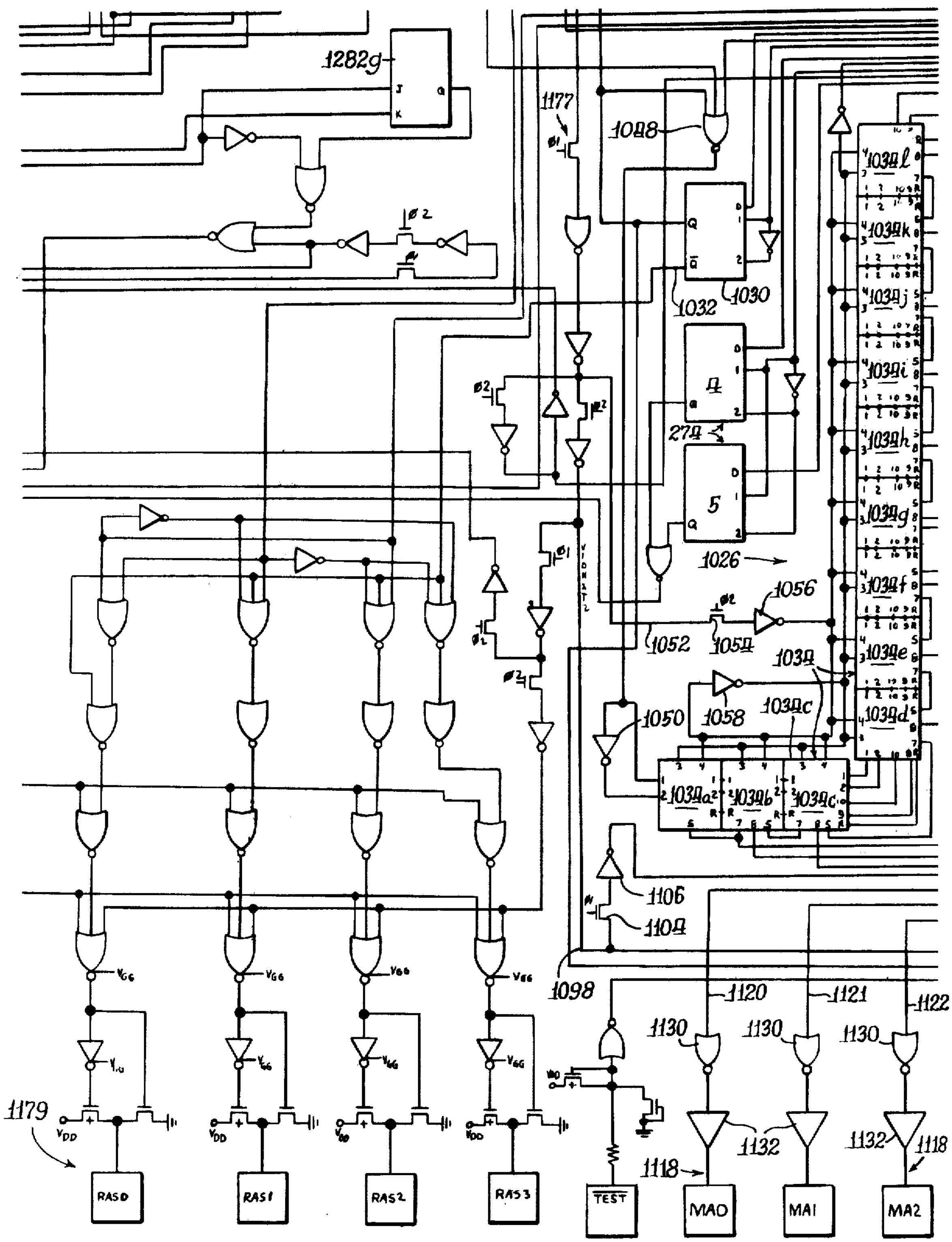
Figure 45J:
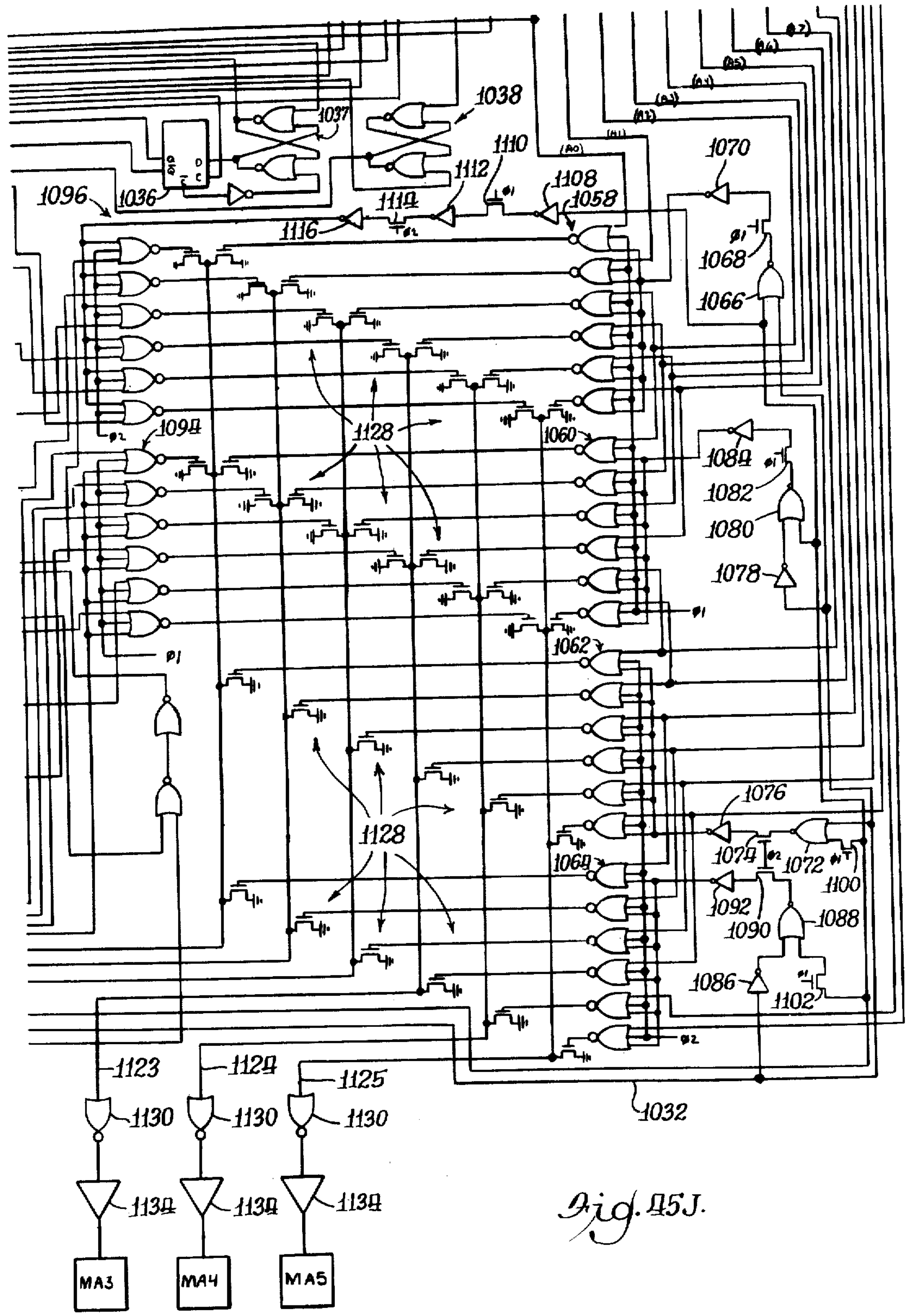
Figure 67:
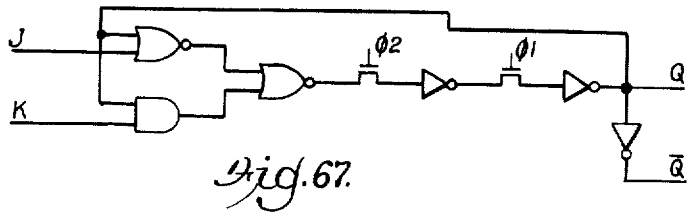
Figure 47:
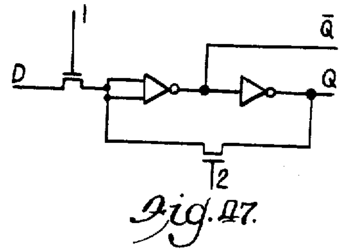
Figures 71A, 72:
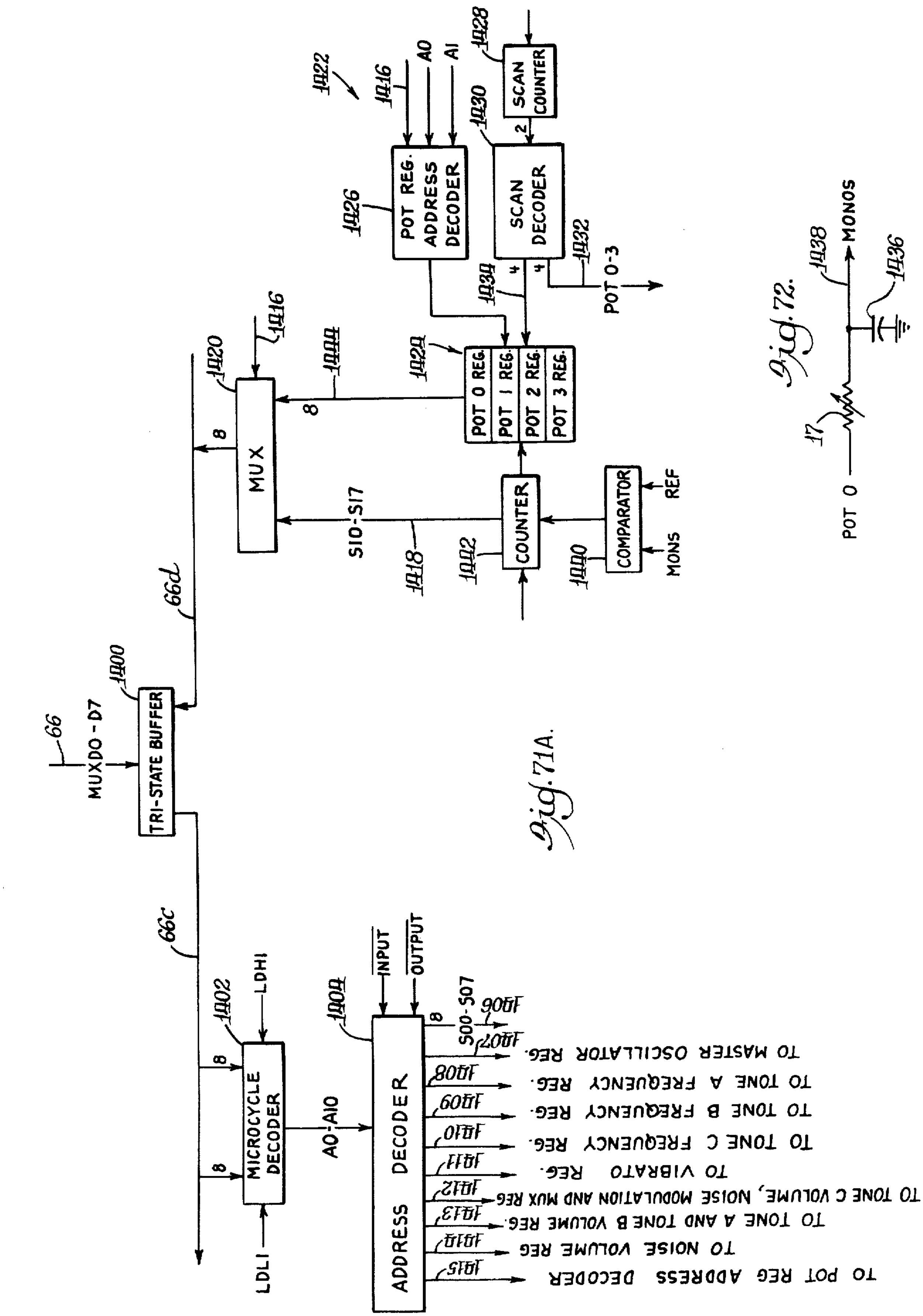
Figure 71B:
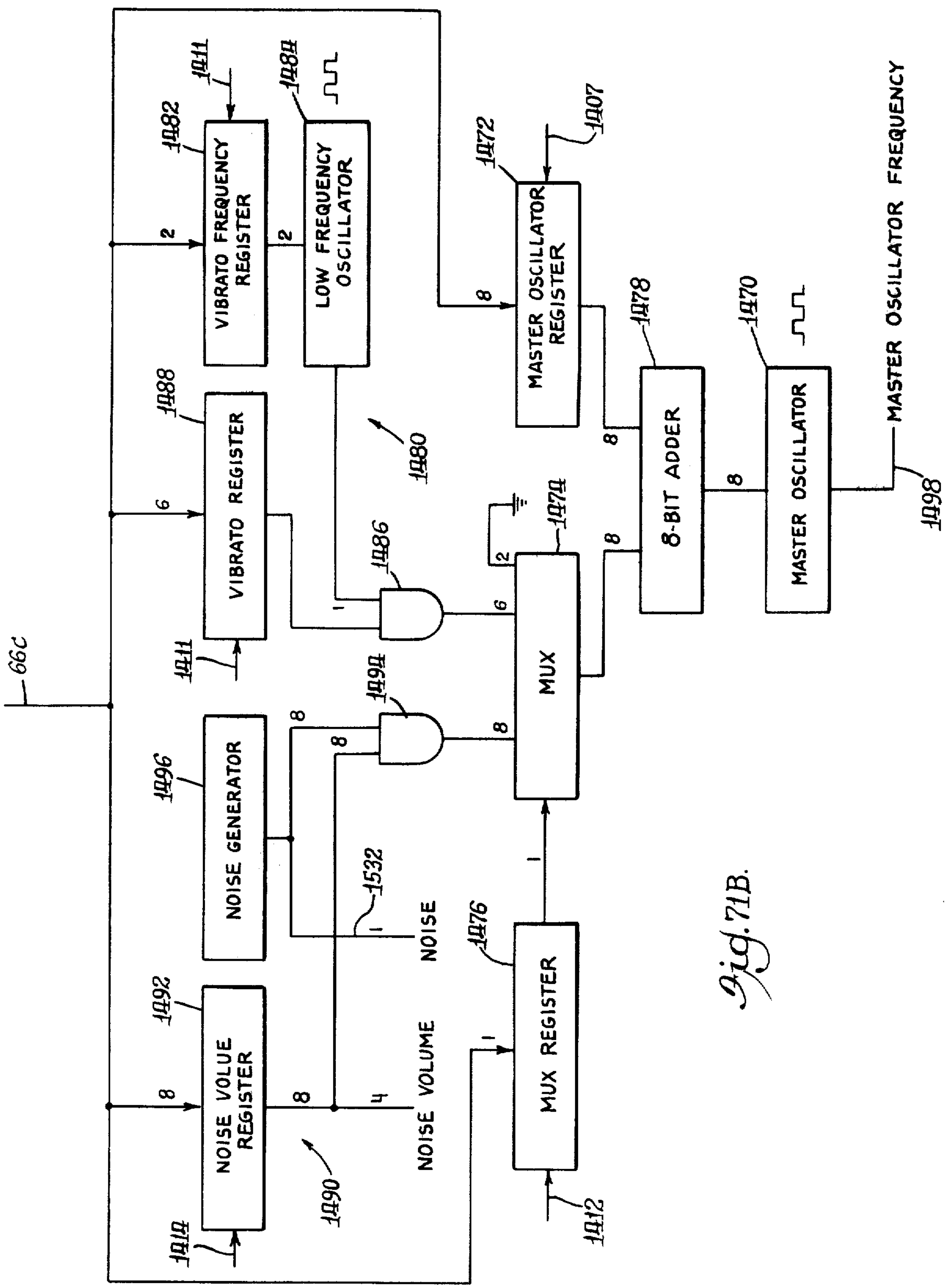
Figure 71C:
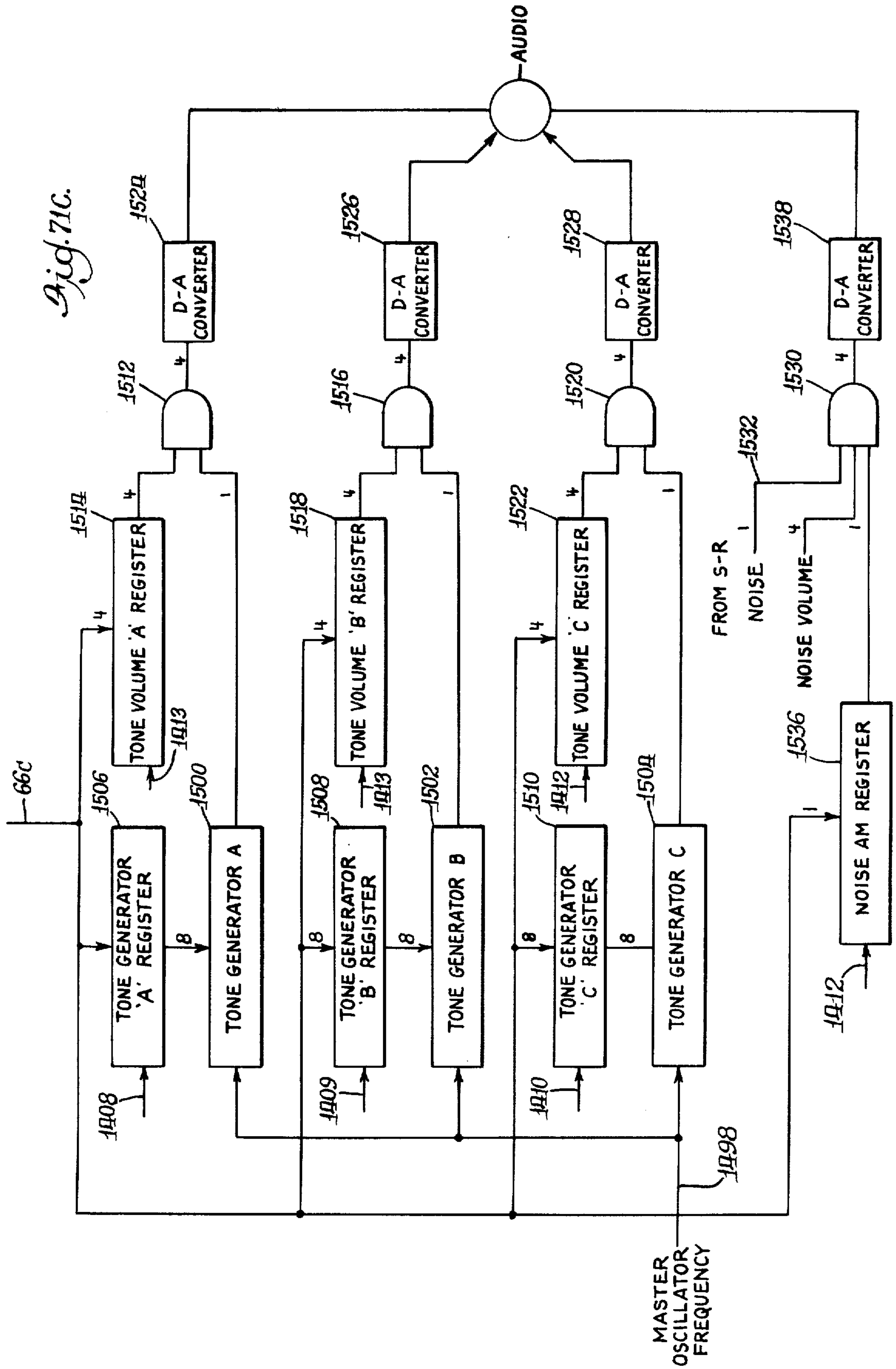
Figure 73A:
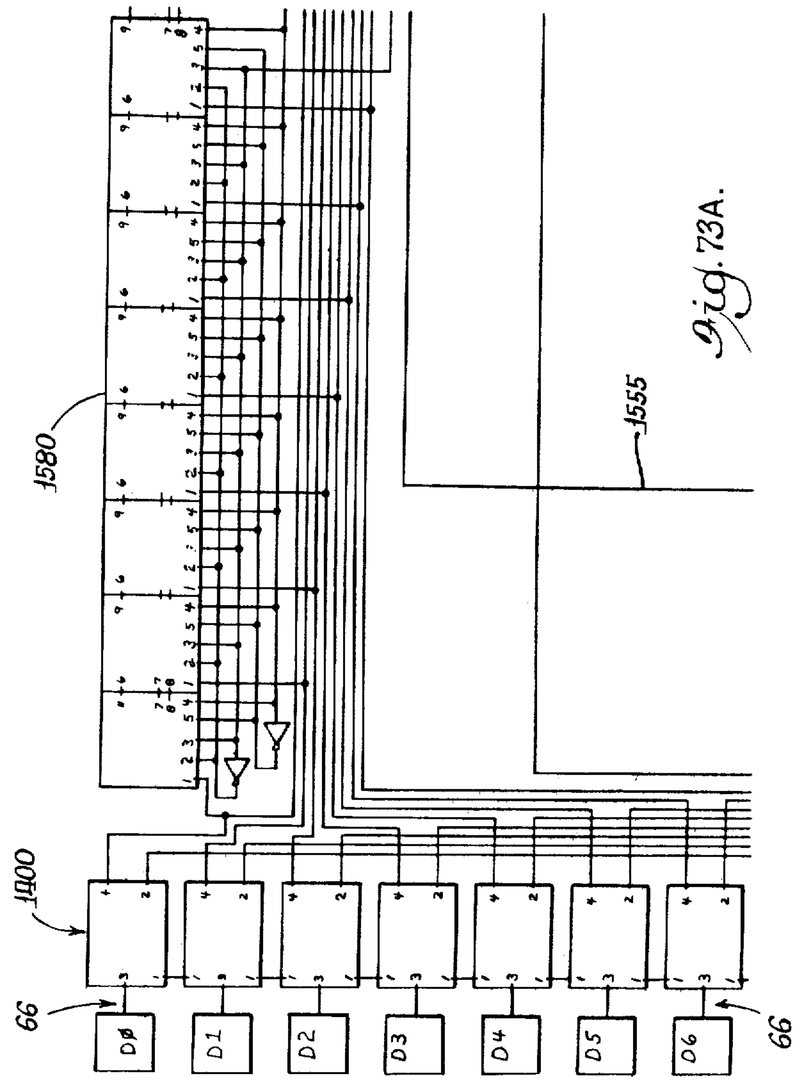
Figure 73B:
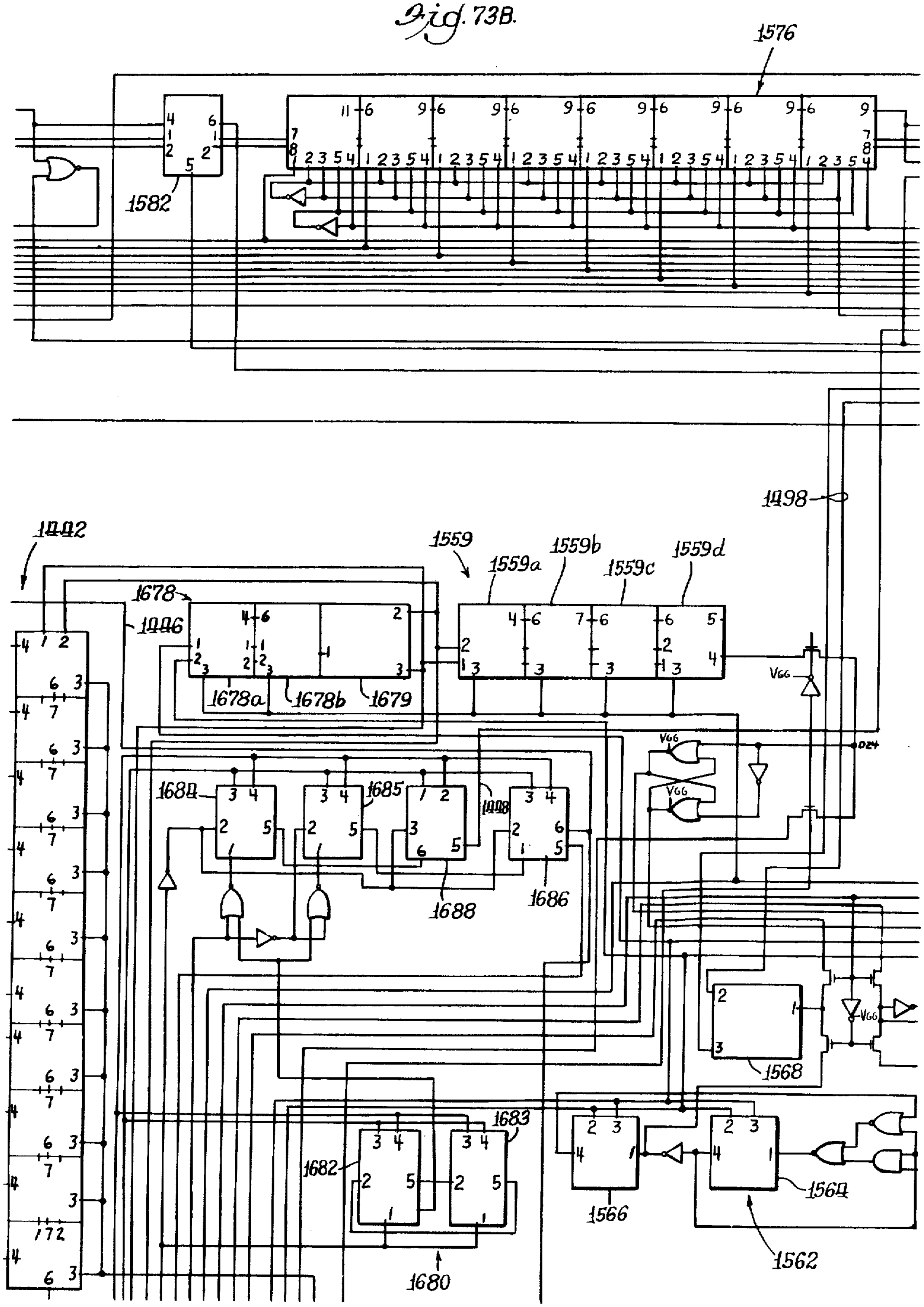
Figure 73C:
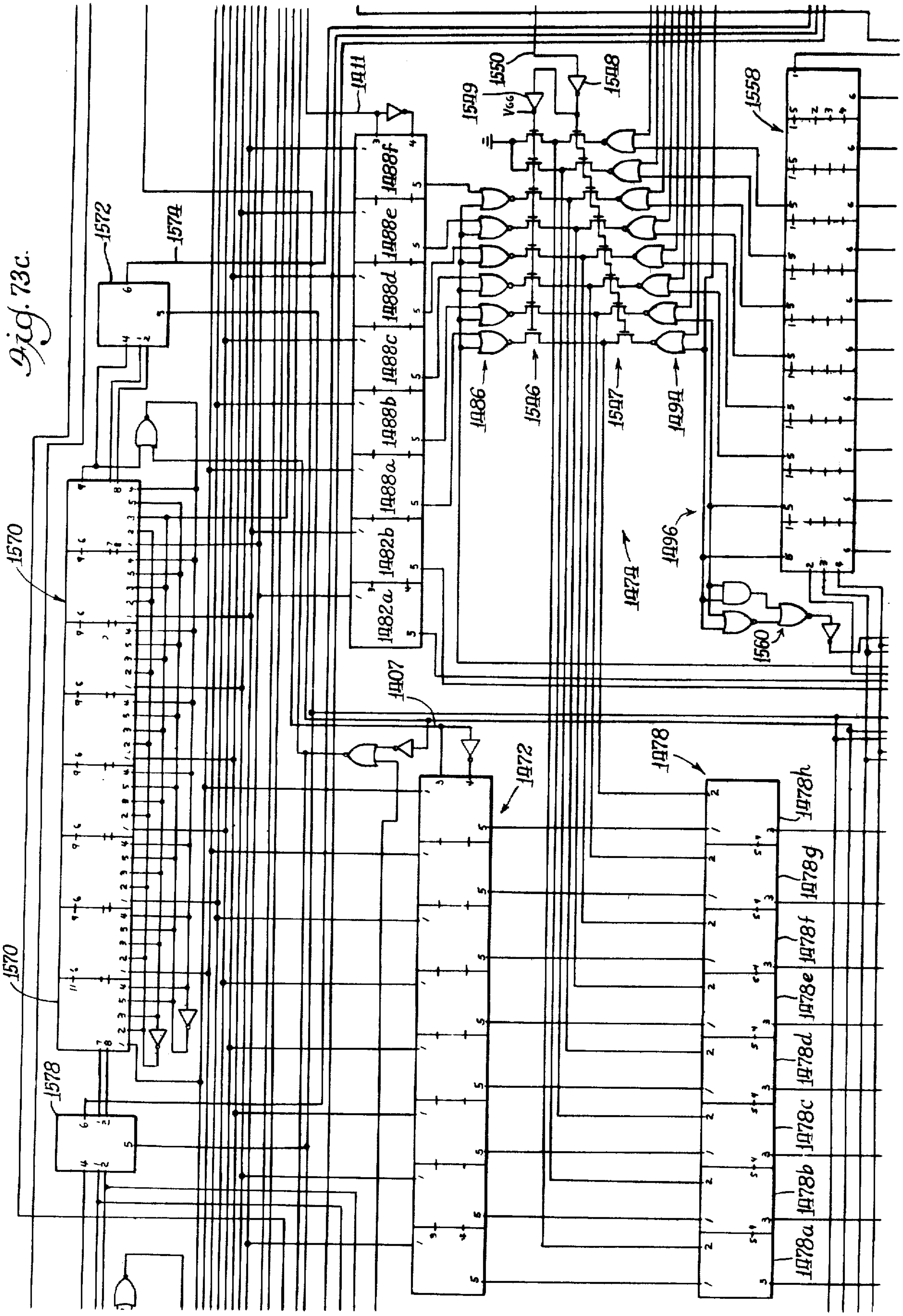
Figure 73D:
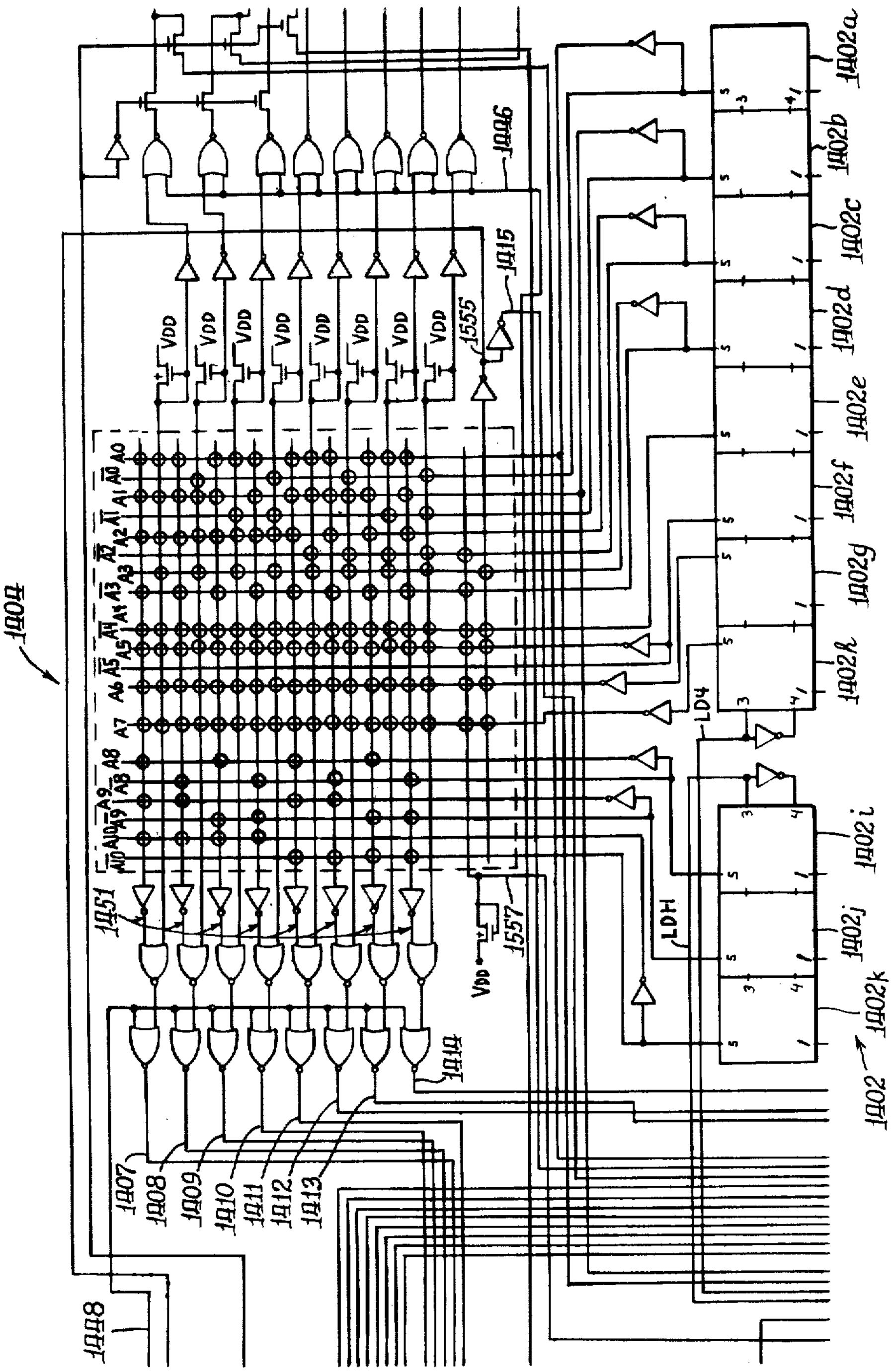
Figure 73E:
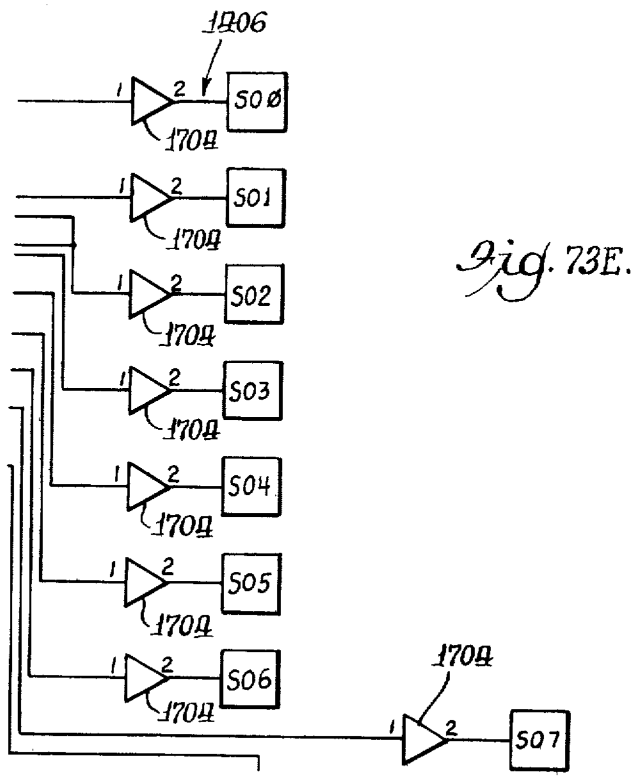
Figure 73F:
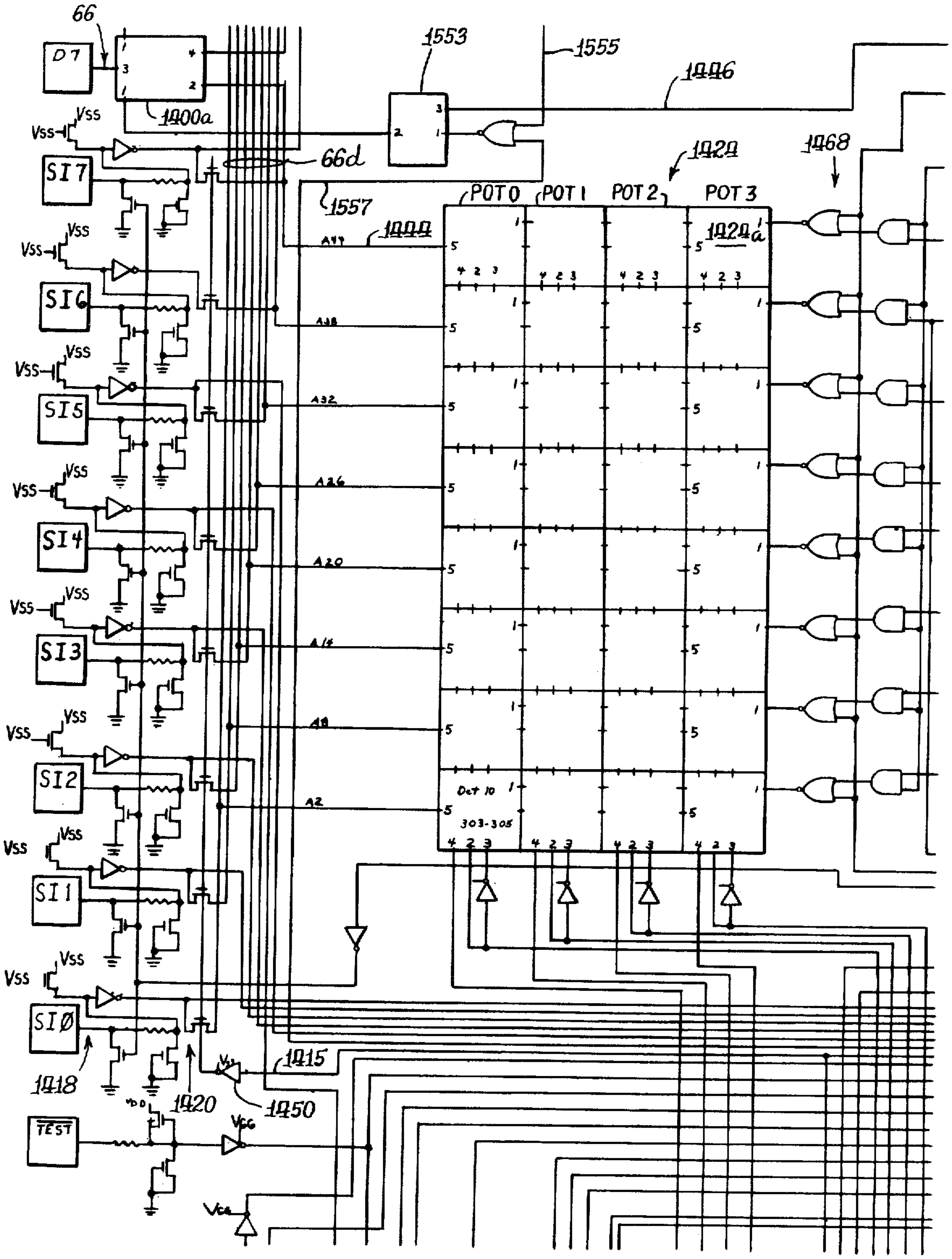
Figure 73G:
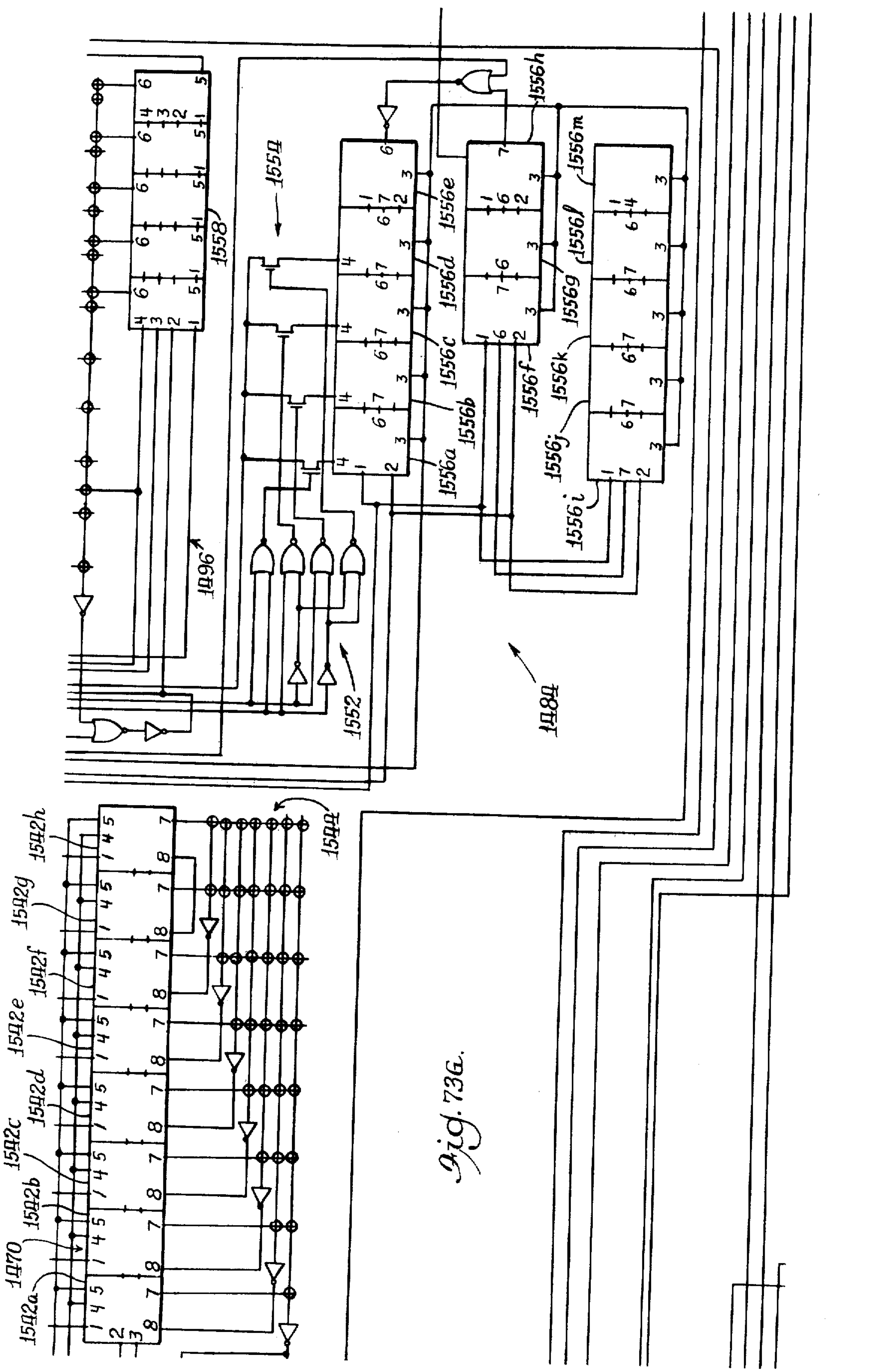
Figure 73H:
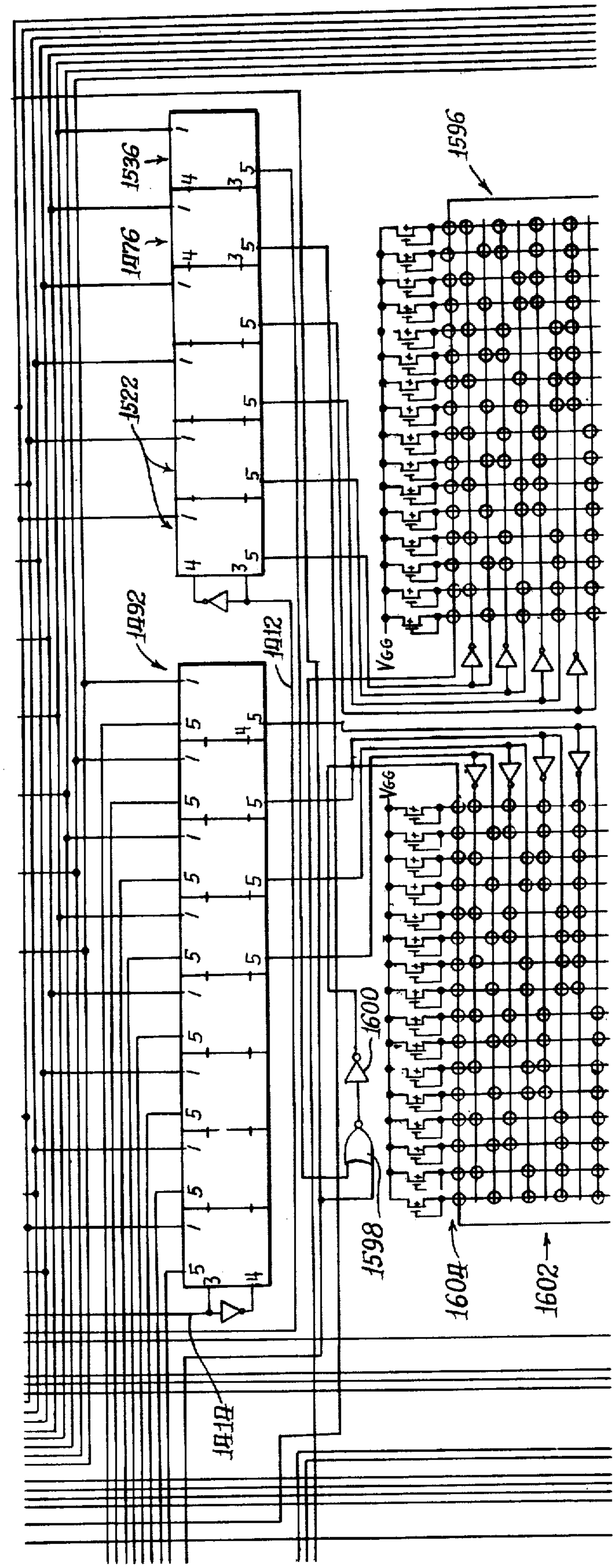
Figure 73I:
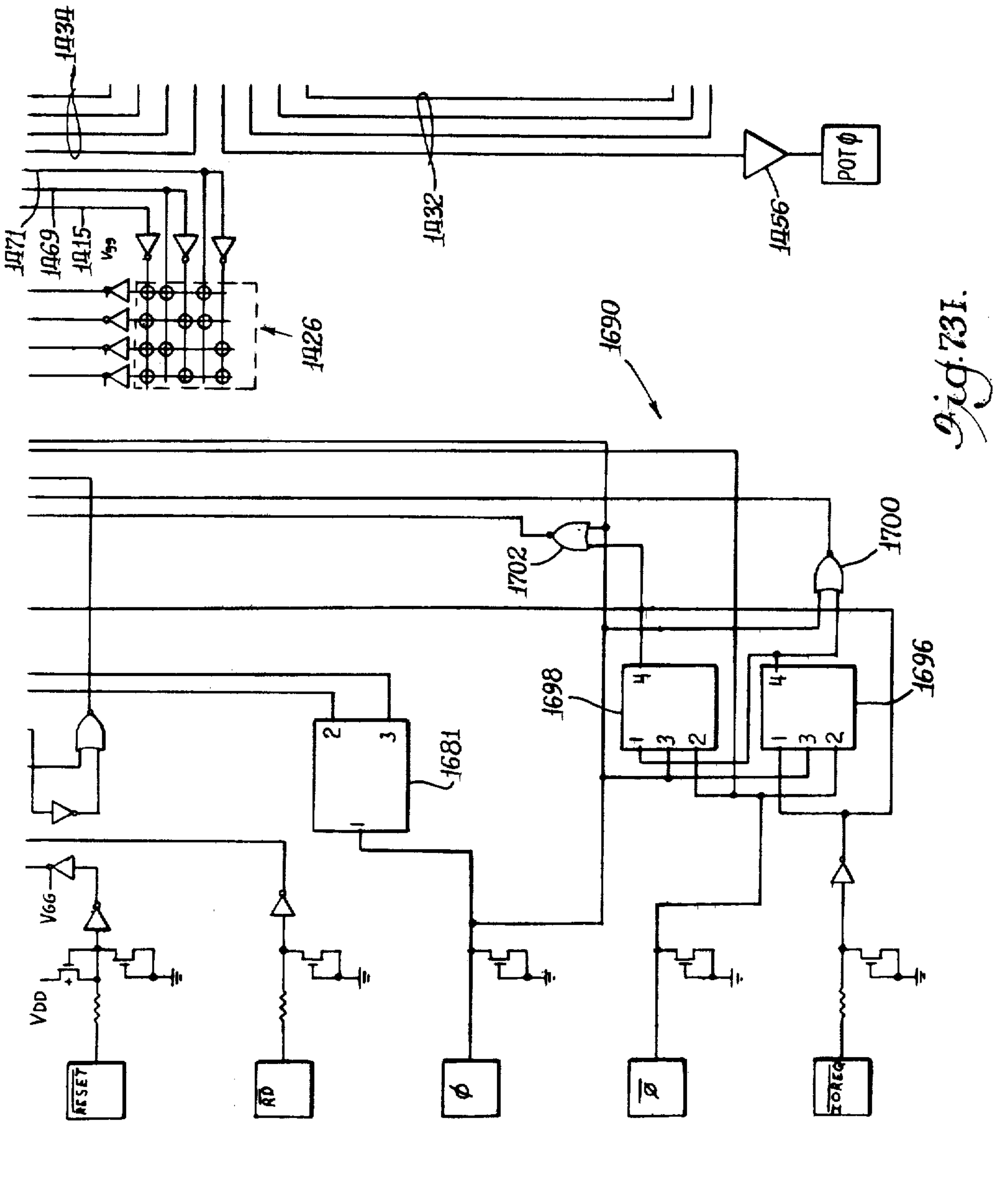
Figure 73J:
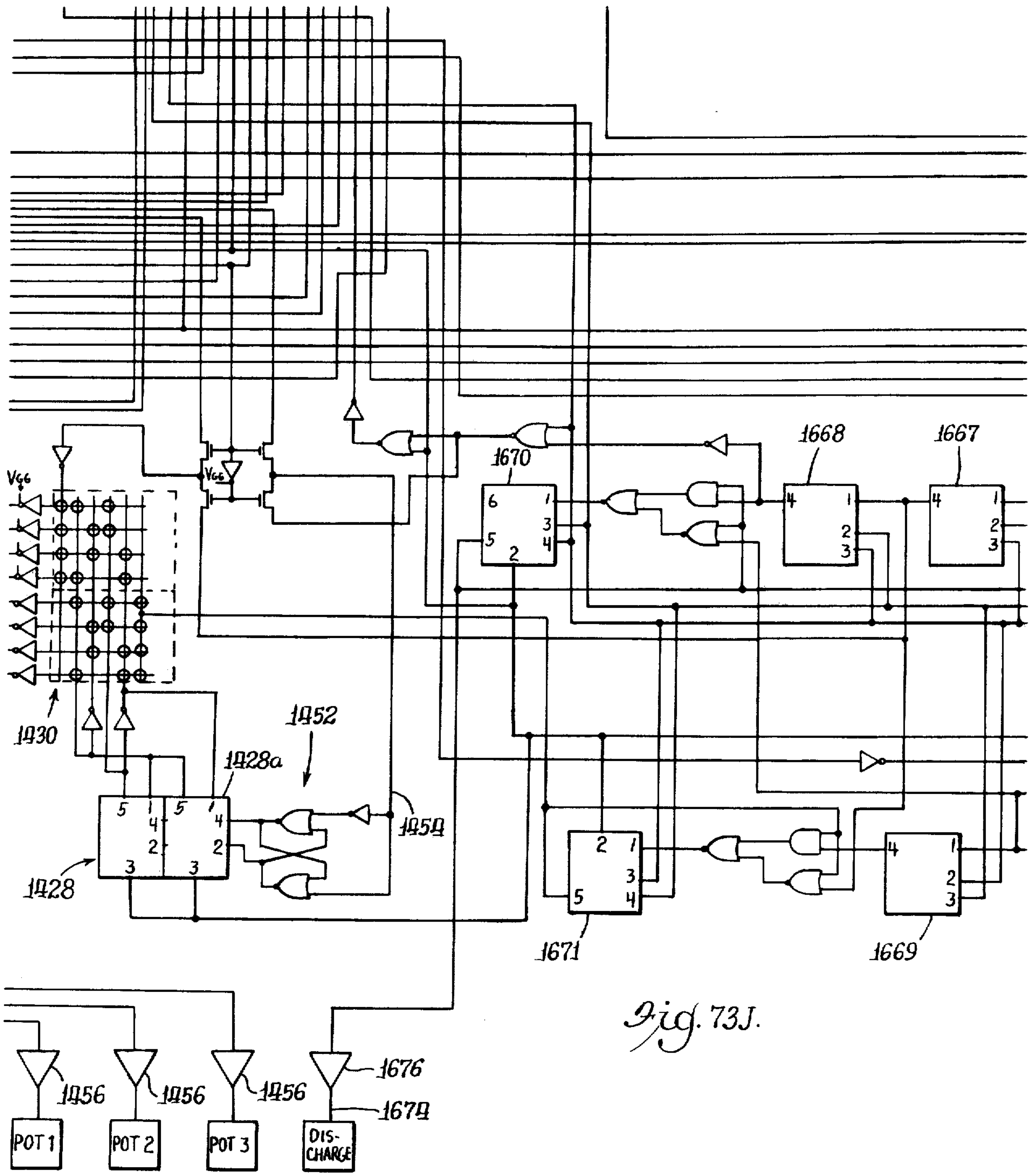
Figure 73K:
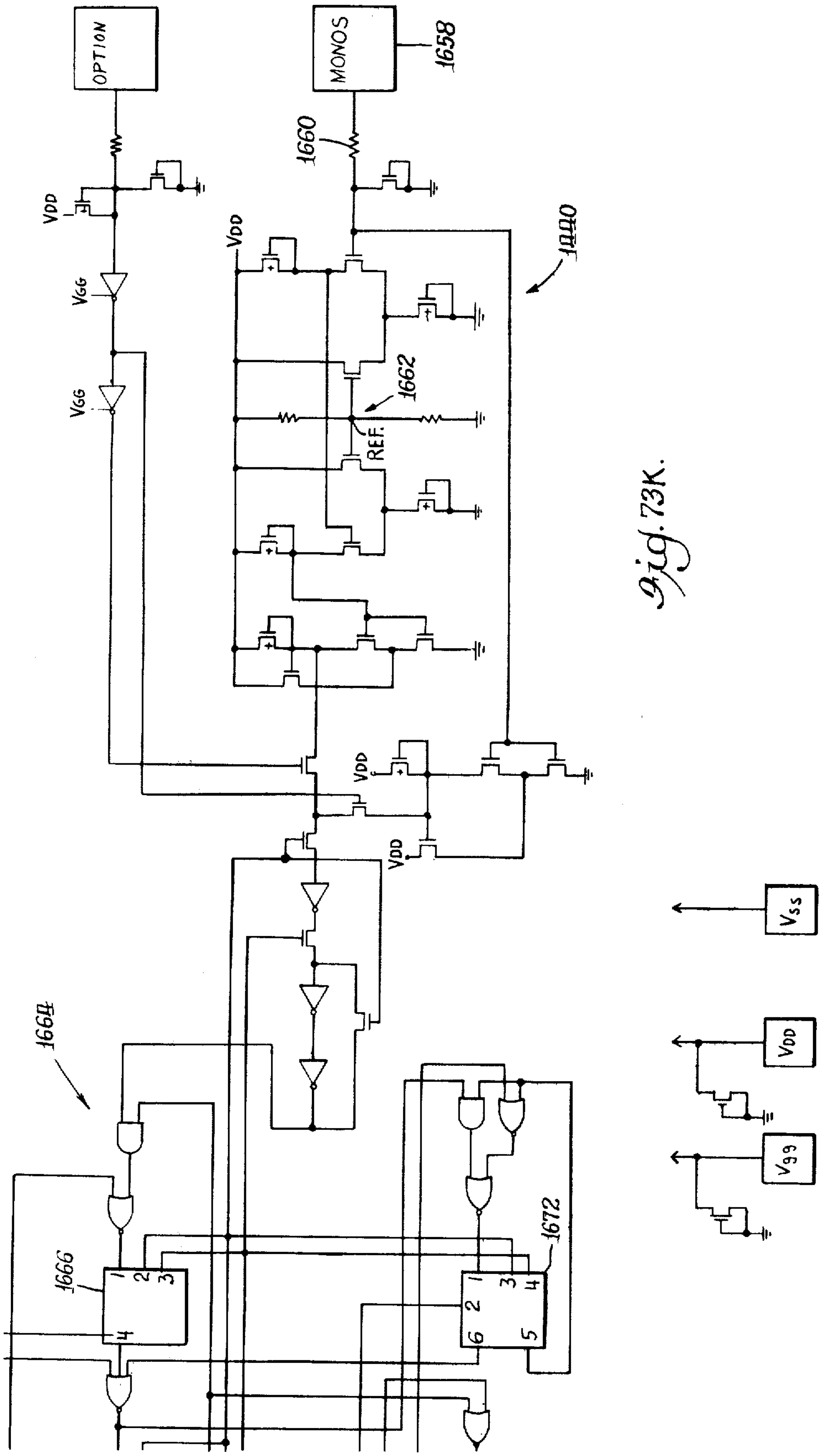
Figure 73L:
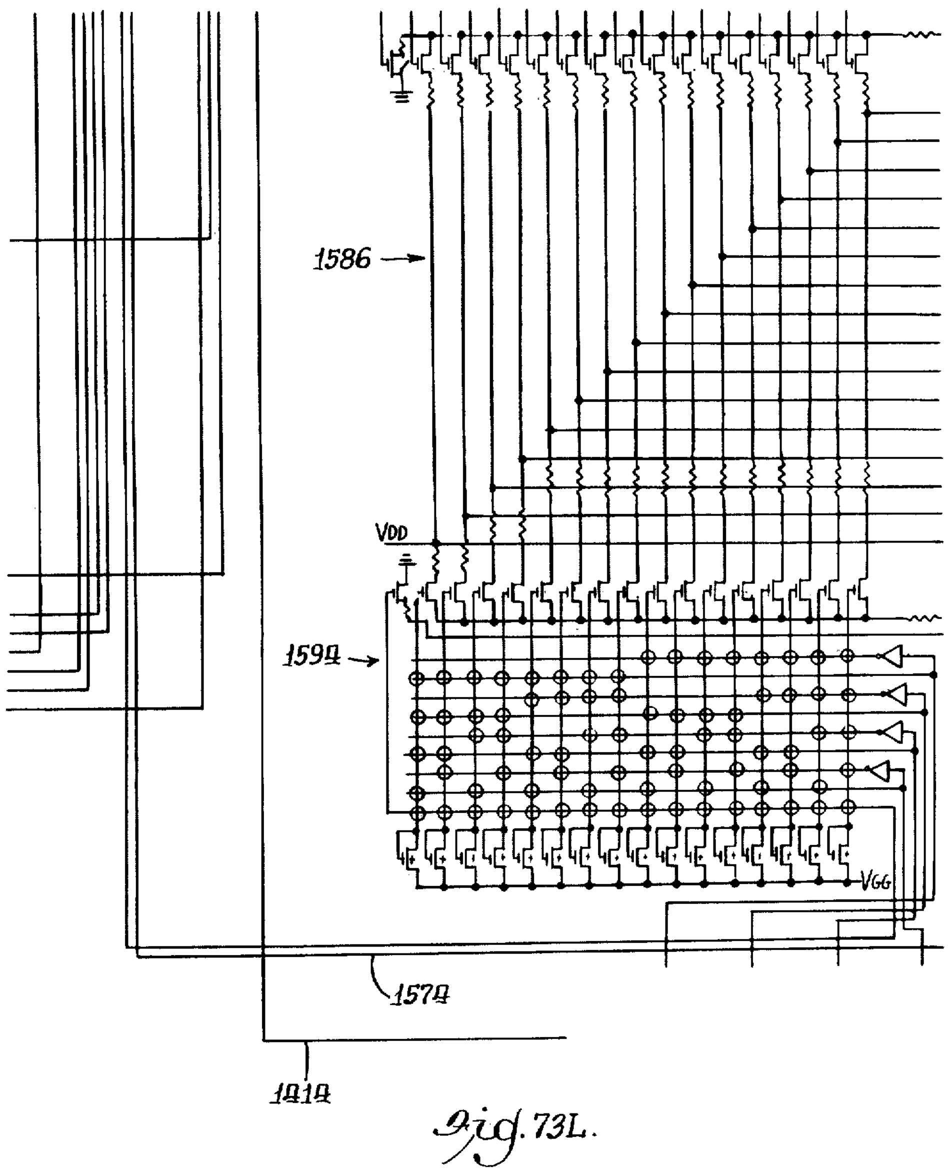
Figure 73M:
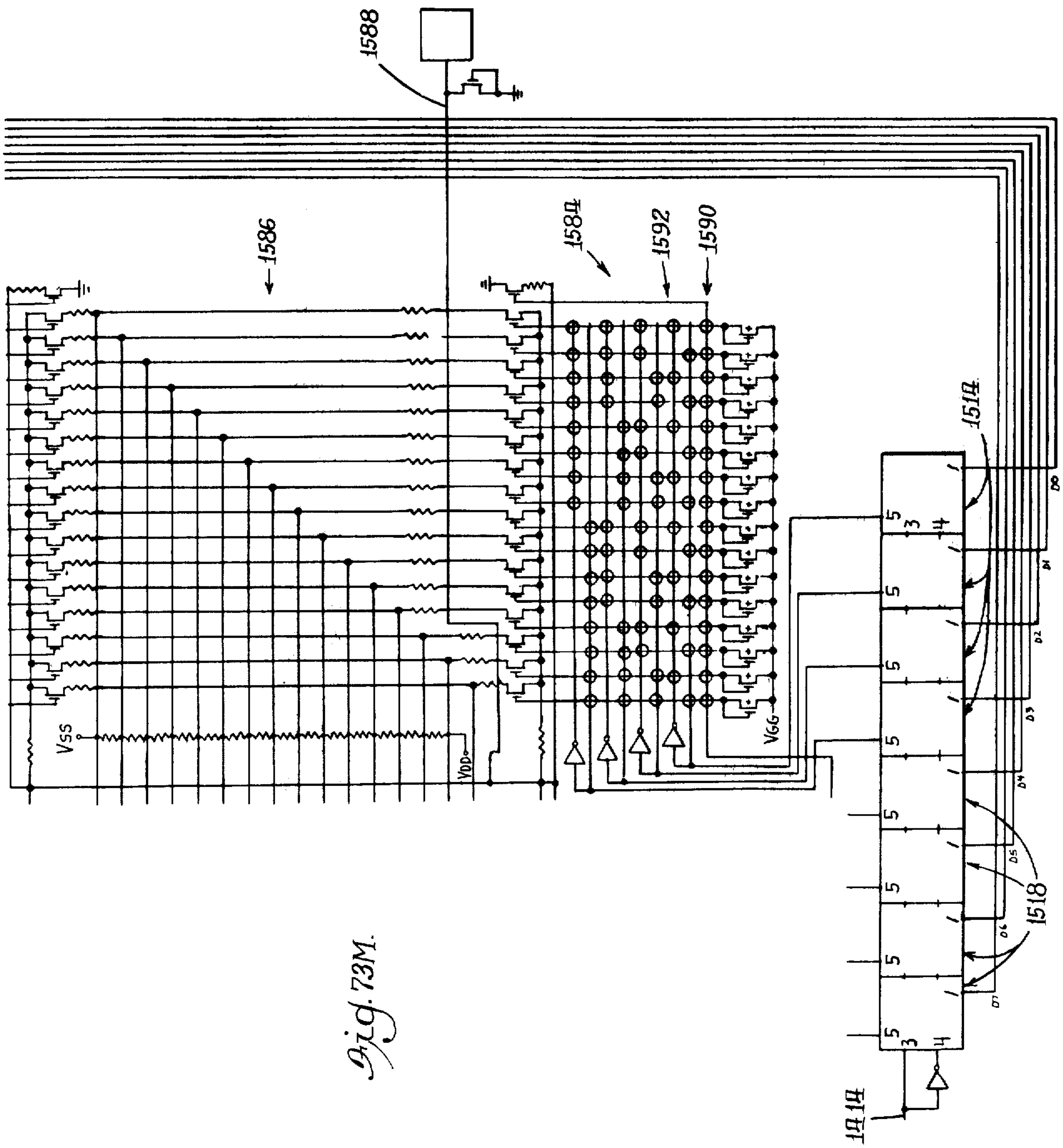
Figure 85:
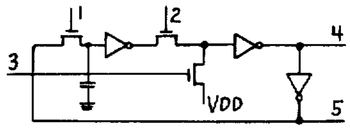

FIG. 40 illustrates the pixel data contained in registers of a rotator circuit of the video processor;

FIGS. 41–43 illustrate the relationship among control, clock and synchronization signals of the system;

FIG. 44 is a block diagram of the address chip of the video processor;

FIGS. 45A–J show a more detailed circuit of the address chip;

FIG. 46 illustrates a composite view of FIGS. 45A–J;

FIGS. 47–70 are diagrams showing blocks of FIGS. 45A–J in greater detail;

FIGS. 71A–C are block diagrams of the input/output chip;

FIG. 72 illustrates a circuit for the generation of an input signal;

FIGS. 73A–M show a more detailed circuit of the input/output chip;

FIG. 74 is a composite view of the FIGS. 73A–M; and

FIGS. 75–97 are diagrams showing blocks of FIGS. 73A–M in greater detail.

The preferred embodiments of the present invention are hereinafter described. In general, the system comprises a display for providing discrete picture elements for presentation of movable symbols and a display memory for storage of digital signals representative of picture elements of the display. The system further comprises a computer having a program memory for receiving digital input signals and supplying digital output data signals and other digital output signals representative of picture elements in response to the input signals and program memory. A video processor means is operatively connected to the computer and display memory for selectively performing a plurality of modifications to the picture element output signals from the computer in response to the output data signals and also for transferring the modified picture element signals to the display memory. The video processor means is also operatively connected to the display for supplying signals thereto in response to the digital picture element signals stored in the display memory whereby the picture elements represented therein are displayed.

Figure 1:
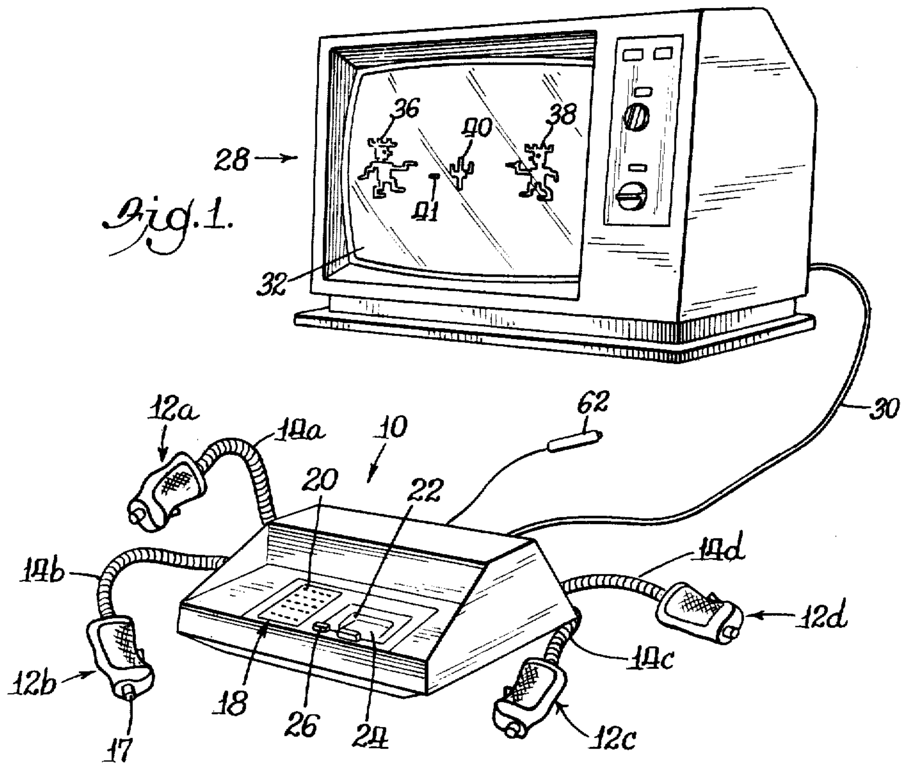
FIG. 1 is a perspective view of a specific embodiment of the present invention.

The system shown in FIG. 1 comprises a computer console 10 having four player-operated control handles **12*a–d* connected by coiled line cords 14*a–d*, respectively, to the computer console 10. Thus, the console 10 can accommodate up to four players at a time. Each control handle has a trigger switch 16 and a top mounted joy-stick 17 for actuating four directional switches. The joy-stick 17 has a rotatable knob mounted thereon which controls a potentiometer. The console 10** further has a keypad 18 which has a plurality of keys or push-buttons such as indicated at 20, and a slot 22 for receiving a removable cartridge or cassette 24 containing stored programs. The console 10 further has a cassette eject button 26 for ejecting the cassette whereby the cassette 24 may be easily replaced with a different cassette containing different programs.

A display for presenting movable symbols is shown as a standard color television receiver 28 which is connected to the computer console 10 by a line 30. The television (TV) has a cathode ray tube screen 32 on which a plurality of movable symbols such as the cowboys 36 and 38 are presented for a "Gunfight" game. The picture presented on the screen 32 is made up of the cowboy symbols 36, 38, and a cactus symbol 40 superimposed on a background each in one or more of a variety of color and intensities and comprises a plurality of discrete picture elements or pixels.

A symbol's action is controlled in part by a control handle. For example, the cowboy 36 may be moved up, down, left, right, up and to the left, up and to the right, etc., by proper movement of the joy-stick 17. The direction of the cowboy's shooting arm may be controlled by rotating the potentiometer control knob of the joy-stick 17 and the gun may be fired by pulling the trigger 16. Should the bullet 41 strike the cowboy 38, the cowboy 38 will be caused to fall by a computer system contained within the console 10. In addition, suitable music such as the "Funeral March" will be played by the computer through the television 28.

Figure 2:
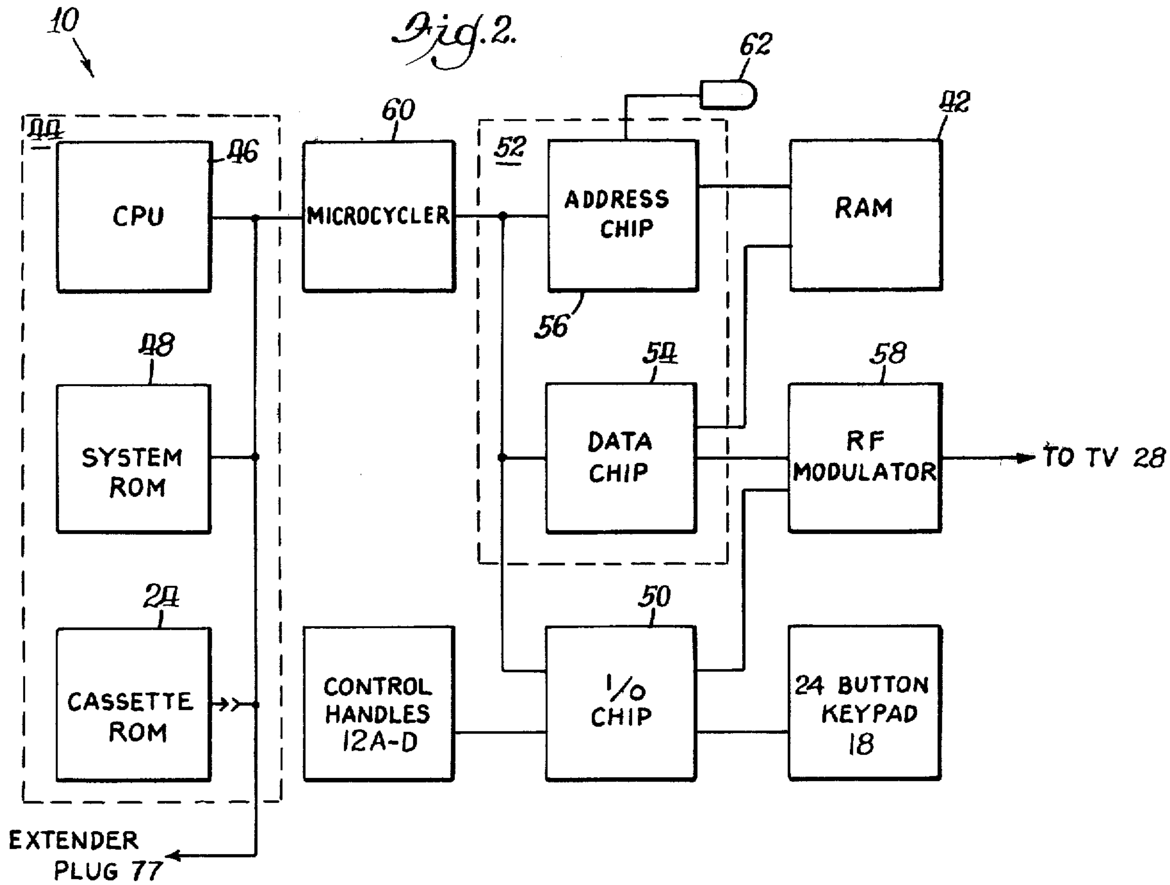
FIG. 2 is a block diagram of a computer system of the embodiment of FIG. 1.

A schematic block diagram of the computer system of FIG. 1 is shown in FIG. 2 to comprise a display memory for storage of digital signals representative of picture elements of the display (or pixel data) which is shown as a display random-access-memory (RAM) 42. The system further comprises a digital computer 44 which is shown to include a central processing unit (CPU) 46 which may be a microprocessor, for example. The computer 44 has a program memory which includes a system read-only-memory (ROM) 48 and a cassette ROM 24 connected to the CPU 46. The program memory contains instructions to direct the CPU 46 and the symbols and figures stored in digital form for the particular computer functions and games.

The cassette ROM 24 may be easily removed by pressing the ejector button 26 (FIG. 1) and replaced by another cassette in order to change a portion of the program memory. This greatly enhances the flexibility of the system in that a potentially endless variety of games and functions may be performed by the computer console 10 and TV display 28.

The computer 44 is operatively connected to an input/output (I/O) chip 50 and a video processor 52 comprising an address chip 56 and a data chip 54 through a microcycler interface 60. The control handles **12*a-d* and the keypad 18 are connected to the I/O chip and provide signals in response to manipulation by the players or operators to the I/O chip 50. The digital computer 44 receives the input signals from the I/O chip 50 in digital form and supplies digital output data signals and digital pixel data signals in response to the input signals and the program memory. The I/O chip 50 has a music processor which provides audio signals in response to output data signals from the computer to play melodies or generate noise through the TV 28**.

The data chip 54 of the video processor 52 selectively performs a plurality of modifications to the pixel data signals from the computer in response to the output data signals from the CPU. The video processor is operatively connected to the display RAM 42 and transfers the modified or unmodified pixel data to the display memory 42 at address locations corresponding to address signals transmitted by the address chip 56. The computer 44 transmits the addresses to the address chip 56 which relays the addresses to the display RAM 42.

The video processor 52 is also operatively connected to the TV display 28 to supply signals to the display modulated by a radio frequency (RF) modulator 58 in response to the pixel data stored in the display RAM 42. The address chip 56 internally generates addresses for sequentially reading the pixel data stored in the display RAM 42 whereby the pixels represented in the display memory are displayed.

The microcycler 60 interfaces the computer 44 to a peripheral device such as the video processor 52 and the input/output chip 50. The computer provides a plurality of address signals on a plurality of address lines, a plurality of data signals on a plurality of data lines, and a plurality of control signals on a plurality of control lines to the microcycler 60. The purpose of the microcycler 60 is to combine the address lines and the data lines from the CPU 46 into one data bus 66 to the video processor 52 and the I/O chip 50.

The computer system is shown having an additional input device light pen 62, which provides an additional input signal to the computer 44. The light pen 62 is sensitive to light and may be used as a pointer by a player or operator to identify points on the TV screen 32 as will be more fully explained later.

The illustrated apparatus is a full-color video game and home computer system based on a mass-RAM-buffer technique in which two bits of the display RAM 42 are used to define the color and intensity of the pixel on the screen 32. The display RAM 42 has eight bits or a byte at each memory address or location at which data may be read or rewritten. In this manner, the picture on the screen is defined by the contents of the display RAM which can be easily changed by modifying the contents of the display RAM. Data which defines pixels will be referred to as "pixel data".

The specific system of the illustrated embodiment uses a Zilog Z-80 microprocessor as the CPU 46 of the computer 44. The system ROM 48 contains software or programming for a plurality of games. The cassette ROM 24 is a solid state cassette which provides additional memory whereby additional games may be played. These ROM's also contain pixel data which represents various game figures and symbols.

Figure 3B:
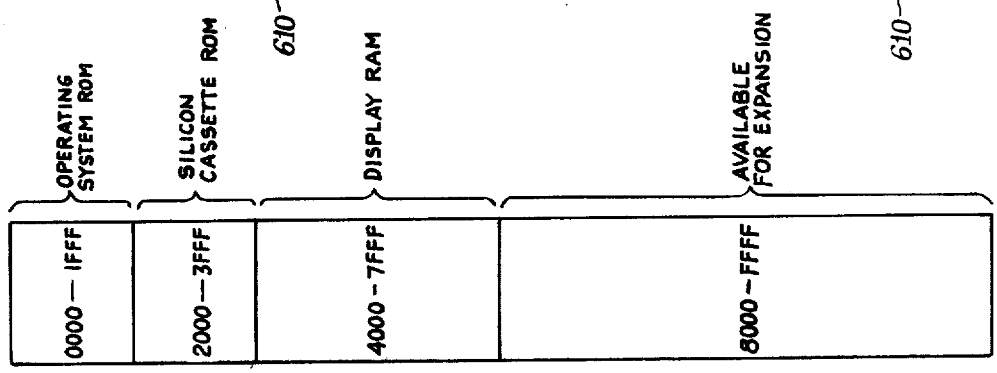
FIGS. 3A and 3B are charts illustrating the memory address allocations for low and high resolution alternative modes of operation.
Figure 3A:
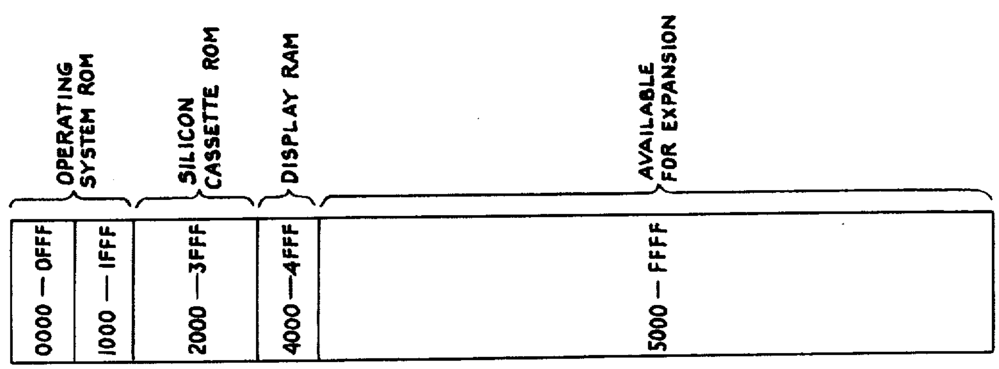

The system may be operated in a high resolution or low resolution mode. The high resolution mode generates a greater number of pixels per unit screen area resulting in a higher resolution. In both the low and high resolution modes, the operating system ROM 48 is allocated the first 8K of memory space; that is, approximately the first eight thousand memory addresses correspond to the system ROM 48 as shown in FIGS. 3A and 3B. Thus, addresses 0000-1FFF (hexadecimal) are addresses for the memory locations of the system ROM. The cassette ROM 24 has the next 8K of memory space, or memory addresses 2000-3FFF (hexadecimal, hereinafter "H") in both modes. The display RAM memory space begins at 16K or memory address location 4000H. In the low resolution mode, the display screen RAM has 4K bytes; in the high resolution, 16K bytes.

The CPU can transfer the pixel data of a pattern or figure stored in either the system or cassette ROM to the display RAM via the video processor. As noted before, the video processor may perform a variety of modifications to the pixel data before it is written into the display RAM. The modifications are performed by what will be called a "function generator" which is located on the data chip 54 of the video processor 52. The modifications are performed by the function generator when the address bit A14 of the address of the data is a 0. Thus, the address of data to be modified by function generator and written into the display RAM will be less than $2^{14}$ or 3FFF H. Consequently, the address of the data to be modified will be between 0000 H and 3FFF H for the high resolution embodiment and between 0000 H and 0FFF H for the low. However, when the data is written the system actually writes the modified data in the display RAM at locations corresponding to addresses 4000- and 4FFF H for the low resolution model and 4000 H-7FFF H for the high resolution model. The system distinguishes a memory read from ROM addresses 000-1FFF H from a memory write to modified data display RAM addresses 0000-1FFF by circuitry external to the ROM and RAM chips shown in FIGS. 10A and B.

All memory space above 32K (memory location 8000 H) is available for expansion. In the low resolution mode, memory addresses 5000–8000 H are also available for expansion.

Figure 4A:
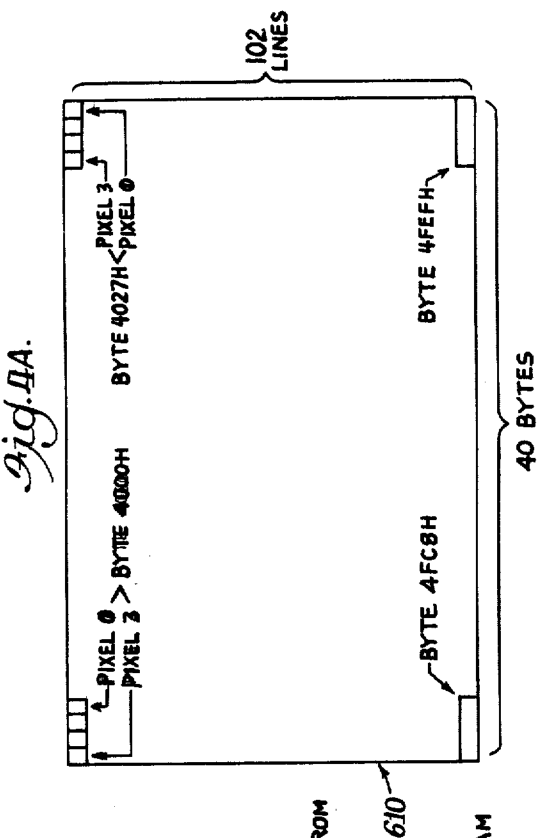
FIGS. 4A and 4B are diagrams illustrating the correspondence between the memory address locations in the display memory with the pixels of the display screen for the low and high resolution modes, respectively.

In the illustrated computer system, two bits of display RAM 42 are used to define a pixel on the screen. Thus, an 8-bit byte of the display RAM defines 4 pixels on the screen. In the low resolution mode, 40 bytes are used to define a line of data as shown in FIG. 4A. This gives a horizontal resolution of 160 pixels. The vertical resolution is a 102 lines. The areas 610 of the screen defined by the display RAM 42 therefore requires $102 \times 40 = 4080$ bytes. More of the RAM 42 can be used for scratch pad by blanking the screen before the 102nd line is displayed as will be described more fully later.

Figure 4B:
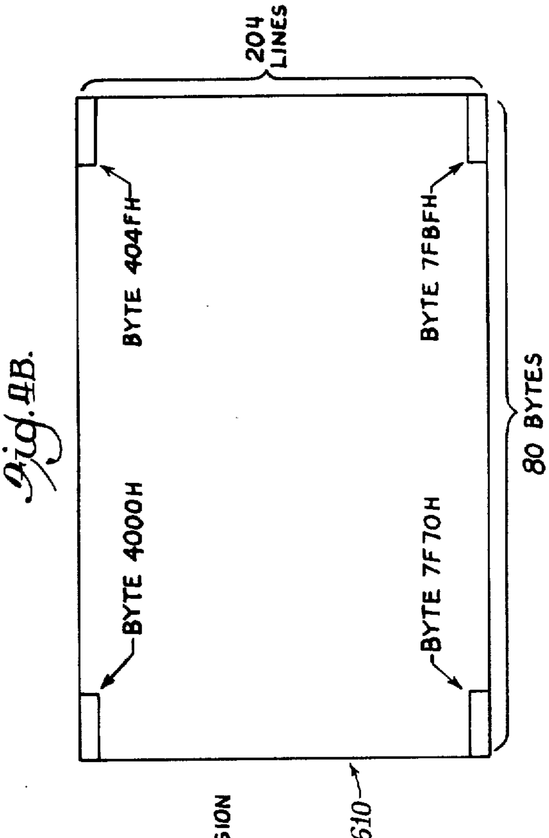

In the high resolution mode, there are 80 bytes or 320 pixels per line as shown in FIG. 4B. The vertical resolution is 204 lines thus requiring 16,320 bytes of display RAM. This leaves 64 bytes of RAM for scratch pad memory.

In both the high and low resolution modes, the first byte of the display RAM 42 (address 4000 H) corresponds to the upper lefthand corner of the area 610 of the display screen 32 defined by the display RAM. The last byte of the first line in the low resolution mode has address 4027 H with the last byte of the first line in the high resolution mode having address 404F H. In the low resolution mode, the highest display address (4FFF H) corresponds to a byte which corresponds to the lower righthand corner of the screen. Thus, as the RAM addresses increase, the position on the screen associated with the addressed bytes moves in the same directions as the TV scan: from left to right and from top to bottom.

The address chip 56 of the video processor 52 sequentially generates the addresses 4000 H to 4FFF H (7FFF H for the high resolution mode) as the screen is being scanned so that each byte defining 4 pixels is read in order to supply information necessary to display the corresponding 4 pixels of the picture. The 4 pixels associated with each byte are displayed with Pixel 3 defined by bits 6 and 7 shown on the left displayed first. Thus bits 6 and 7 of byte 4000 H define the pixel in the extreme upper lefthand corner of the screen area corresponding to the display RAM.

As noted earlier, two bits are used to represent each pixel on the screen. These two bits, along with a left/-right bit (which will be more fully explained later) map the associated pixel to one of eight different "color" registers 0-7. Thus, two bits from the display memory together with the left/right bit identify or select one of the eight different color registers. If the two bits from the display memory have the binary value 00, the color register selected will be color register 0 or 4 depending upon the left/right bit. Similarly, bits having the binary value 01 select register 1 or 5 depending on the left/-right bit, etc.

Each color register is an 8-bit register for storage of output data from the computer. The binary bits in a selected color register define the color and intensity characteristics of the associated pixel to be displayed on the screen. The intensity of the pixel is defined by the three least significant bits of a color register, with 000 for darkest and 111 for lightest. The colors are defined by the 5 most significant bits. Thus each color register can define 1 of $2^3$ intensity levels and 1 of $2^5$ different colors. The CPU can change the data stored in the color registers which will cause the colors and intensities of subsequent pixels displayed to also change.

Figure 5:
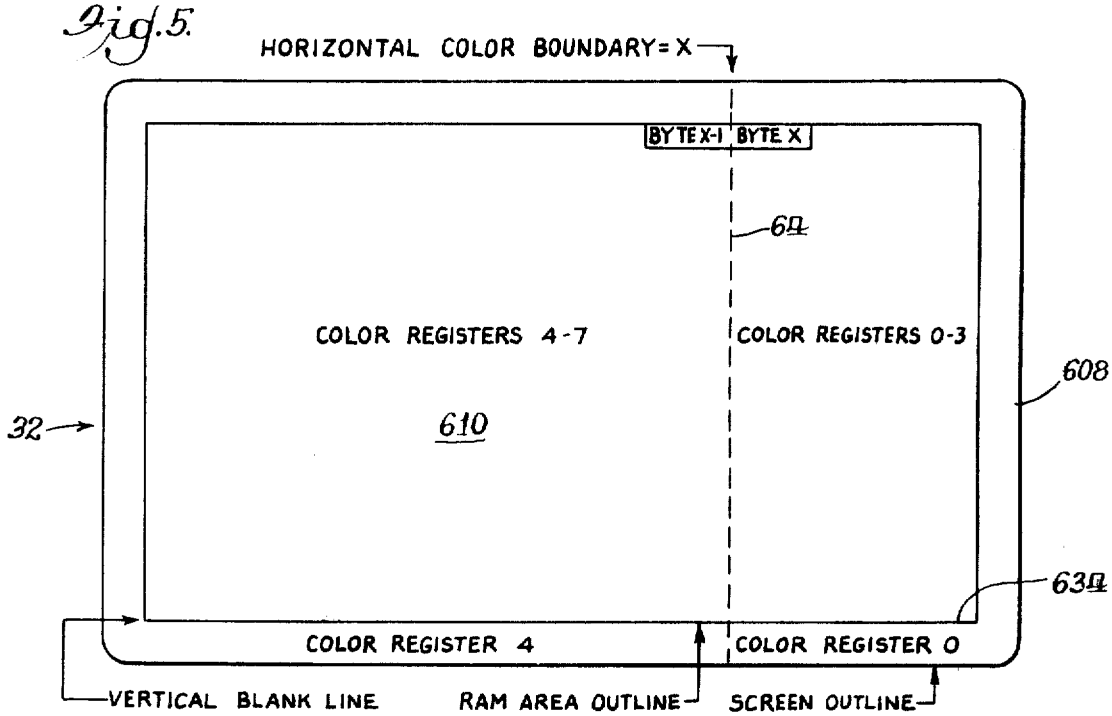
FIG. 5 is a diagram illustrating the correspondence of color registers 0–7 with particular display screen areas.

A horizontal color boundary register defines the horizontal position of an imaginary vertical line 64 on the screen 32, referring now to FIG. 5. The boundary line 64 can be positioned between any two adjacent bytes in the low resolution mode. The line is immediately to the left of the byte whose address is sent to the horizontal color boundary register. For example, if the horizontal color boundary is set at 0 by the computer, the line will be just to the left of the byte 0 if it is set to 20, the line will be between bytes 19 and 20 which corresponds to the center of the screen.

The left/right bit is an additional register identifying signal supplied by the video processor in response to the data stored in the horizontal color boundary register. If a byte is to the left of the boundary, the left/right bit of the four pixels associated with that byte is set to 1. The left/right bit is set to 0 for pixels associated with a byte to the right of the boundary line 64. Color registers 0–3 are selected by a left/right bit=1, i.e., for the pixels to the right of the boundary line, and registers 4–7 are selected for the pixels to the left of the boundary. Thus, if a byte read from the display RAM 42 has the values 00 11 10 00, and was to the right of the boundary line, for example, the four pixels will be defined by color registers 0, 3, 2, and 0, respectively. However, if the byte was located to the left of the horizontal color boundary line, the four pixels will be defined by color registers 4, 7, 6, and 4 respectively.

In the high resolution mode, if a value X is sent to the horizontal color boundary register, the boundary line will be between bytes having addresses 2X and 2X-1 which corresponds to the same position on the screen as the low resolution mode but between different bytes. Thus, for example, if the value 20 is sent, the boundary will be between 39 and 40, corresponding to the center of the screen. To put the entire screen, including the rightside background, to the left of the boundary line 64, the horizontal color boundary line register should be set to 44.

If just four color registers are used, all the information necessary to generate the color and intensity of a particular picture may be stored utilizing only two bits of storage together with the color registers. However, the left/right bit and eight registers give added flexibility. The color and intensity pattern of a picture stored in memory may be quickly modified in one step by selective placement of the horizontal color boundary. For example, if the entire screen is to the right of the horizontal color boundary, the colors and intensities of the pixels will be selected from color registers 0–3. One the other hand, placing the entire screen to the left results in the colors and intensities of color registers 4–7 being utilized. In this manner, the colors and intensities of the entire picture may be altered by merely changing the address of the horizontal color boundary.

On most television screens, the area 610 defined by the display RAM will be somewhat smaller than the total screen area. Thus there will generally be extra space on all four sides of the display screen not defined by the display RAM. The color and intensity of this area is defined by a two-bit "background" color register. These two bits along with the left/right bit combine to identify one of the 8 color registers which determines the color and intensity of the particular background area. For example, if the two bits contained in the background color register have the value 00 the color and intensity of the background area to the right of the boundary line 54 will be defined by the color register 0, with the area to the left defined by the color register 4, as shown in FIG. 5.

As described earlier, the function generator is enabled to modify pixel data when the data is to be written to a memory address "X" less than 4000 H (A14=0) and that a modified form of the data is actually written to memory location X+4000 H in the display RAM. A register hereinafter called the function generator register determines how the data is modified.

The functions performed on the pixel data are: "expand", "rotate", "shift", "flop", "logical-OR" and "exclusive OR". As many as four of these functions can be used at any one time and any function can be bypassed. However rotate and shift as well as logical-OR and exclusive OR are not done at the same time. The modified pixel data is stored in the display RAM whereby the pixels associated with the pixel data appear similarly modified when displayed.

Referring back briefly to FIG. 2, the microcycler has an 8-bit data bus 66 connecting the microcycler to the video processor 52 and I/O chip 50. The expand function expands the 8 bits contained on the microcycler data bus into 16 bits where each bit of the 8 bits represents one pixel. In other words, it expands 1-bit pixel data into 2-bit pixel data. For example, a 0 on the data bus is expanded into one 2-bit pixel data value and a 1 on the data bus into another 2-bit pixel data value. Accordingly, the pixel data before being expanded is encoded at a first level which can be decoded into pixel data encoded at a second level. Thus, the pixel data on the 8-bit microcycler data bus is encoded at the first level as 1-bit pixel data and when expanded, it is encoded into pixel data at the second level, i.e., 2-bit pixel data. In this manner, two-color patterns can be stored in a ROM in half the space.

The generator functions shift, flop and rotate can be thought of as operating on the pixel data as a whole rather than the individual bits of each pixel. Each byte of the display RAM 42 can be though of as four 2-bit locations, each location corresponding to a pixel and storing one of four pixel data values (0–3) although the pixels are, of course, actually elements of the picture displayed on the screen. The four pixel data values of the first byte, byte 0, will be referred to as P0, P1, P2 and P3. P0 is composed of the first two bits (or least significant bits) of the byte.

Figure 6:
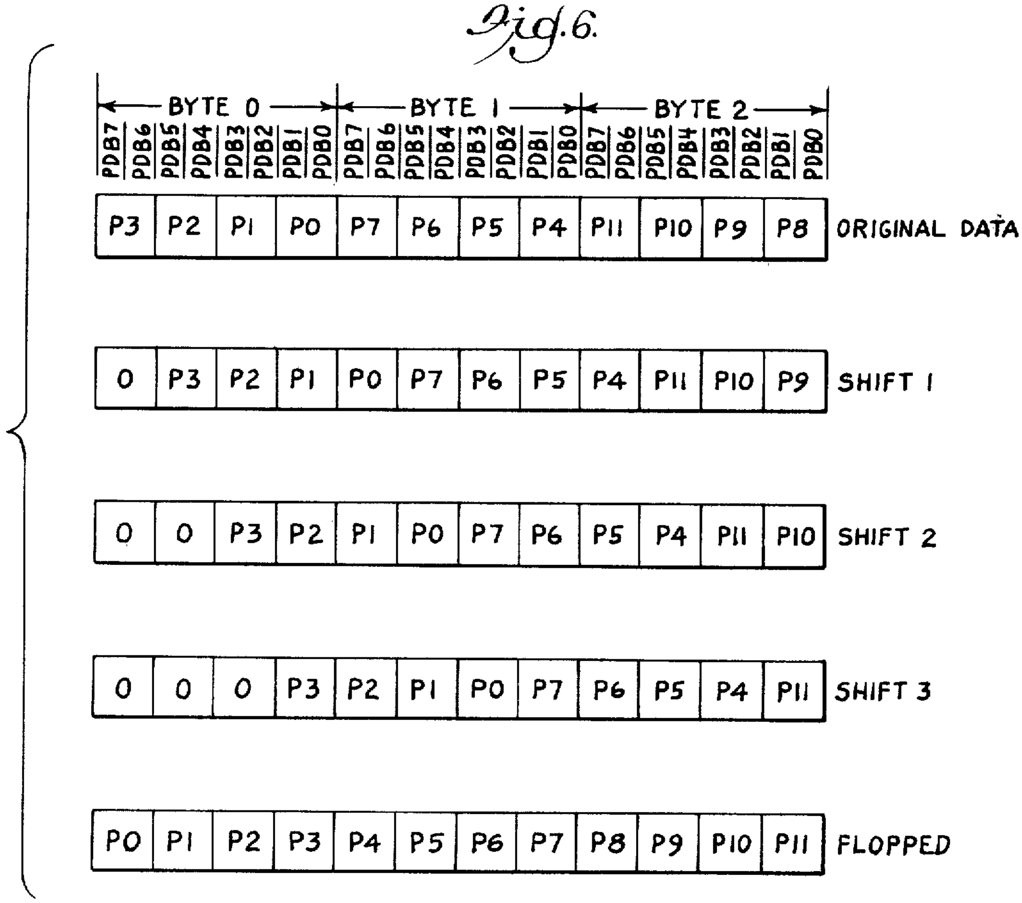
FIG. 6 is a diagram illustrating examples of modifications performed on pixel data.

The shift function shifts the pixel data 0, 1, 2 or 3 pixel locations to the right. FIG. 6 illustrates the effect of the above mentioned shifts upon the 3 bytes. The pixel data values are shifted relative to each other wherein the pixels that are shifted out of one byte are shifted into the next byte with the corresponding pixels on the screen appearing shifted a similar amount when displayed. Zeros are shifted into the first byte of a sequence.

The output of the flop function is a mirror image of its input, the original data. The pixel locations interchange pixel data values relative to each other, i.e., the first and fourth pixel location of each flopped byte exchange pixel data values as to the second and third as shown in FIG. 6. The four pixels associated with the flopped byte will similarly appear flopped relative to each other when displayed on the screen.

The rotate function rotates a four pixel by four pixel block of data 90° in clockwise direction such that the pixel data values are rotated relative to each other. FIGS. 7A and 7B illustrate an example of rotation. The sixteen pixel data locations correspond to sixteen contiguous pixels displayed on the screen.

The logical OR and exclusive OR functions operate on a byte as 8 bits rather than four 2-bit pixel data. When the OR function is used in writing pixel data to the display RAM, the input pixel data is logical OR-ed with the contents of the display RAM location being accessed. The result of the logical OR is sent to the display RAM at the above location. The exclusive-OR function operates in the same way except that the data is exclusive OR-ed instead of logical OR-ed.

The illustrated system can accommodate up to four player control handles **12*a*–12*d* (FIG. 1) at once. Each handle has five switches (i.e., the trigger switch, and four joy-stick directional switches) and a potentiometer. The switches are ready by the CPU 46 via input ports through the I/O chip 50 (FIG. 2). These input ports are diagrammatically shown in FIG. 8 as input ports 10-1F H where the port number indicates its hexadecimal address. Thus the port at which the player control handle switches for player 1 are read has a hexadecimal address of 10**H.

The trigger switch for each player control handle is read at bit 4 and the four directional switches of the joy-sticks are read at bits 0–3. The signals from the potentiometers are converted to digital information by an 8-bit analog to digital converter (FIG. 71A). The four potentiometers are read at input ports 1C-1F H (FIG. 8). All zeros are fed back when the potentiometer is turned fully counterclockwise and all 1's are fed back when turned fully clockwise.

The 24-button keypad 18 is read at bits 0–5 of ports 14-17H. The input data is normally zero and if more than one button is depressed, the data should be ignored.

Figure 9:
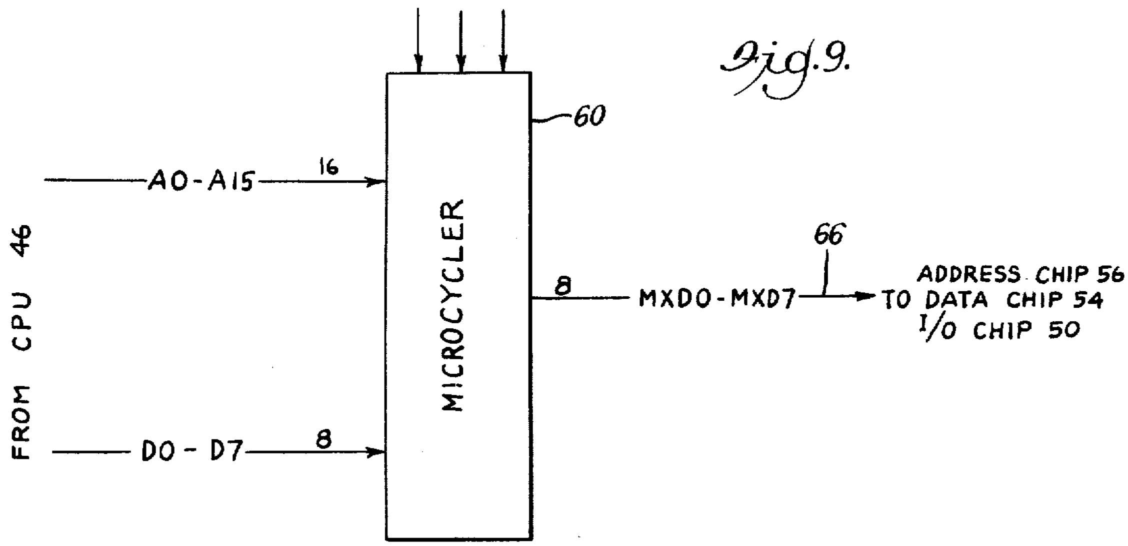
FIG. 9 is a block diagram of a microcycler interface employed in the system.

The microcycler functions as an interface between the CPU and the peripheral devices. The CPU 46 of FIG. 2 has a 16-bit address bus and an 8-bit data bus connecting the CPU to the microcycler 60. Referring now to FIG. 9, the microcycler 60 combines the 16-bit address bus, A0-A15, and the 8-bit data bus, D0-D7, from the CPU 46 into one 8-bit microcycle data bus 66, MXD0-MXD7, connected to the address chip 56, the data chip 54, and the I/O chip 50. One advantage of the microcycler is that the number of connector pins of the integrated circuit chips may be reduced since there are fewer connecting lines.

The microcycle data bus can have any of four modes which are defined by the contents or data carried by the microcycle data bus 66. Its mode is controlled by control signals MC0 and MC1 which are generated by the data chip from a plurality of CPU control signals which will be more fully explained later. The microcycle data bus mode is also controlled by a CPU control signal $\overline{\text{RFSH}}$ which indicates that the lower 7 bits of the address bus contains a "refresh" address for refreshing the RAM dynamic memories. The CPU control signals are discussed more fully in the Zilog Z80-CPU Technical Manual and is hereby incorporated by reference as if fully disclosed herein. The microcycle modes are shown below:

TABLE 1

| $\overline{\text{RFSH}}$ | MC1 | MC0 | Microcycle Data Bus Contents |
|---|---|---|---|
| 0 | 0 | 0 | A0-A7 from the CPU |
| 0 | 0 | 1 | A0-A7 from the CPU |
| 0 | 1 | 0 | A0-A7 from the CPU |
| 0 | 1 | 1 | A0-A7 from the CPU |
| 1 | 0 | 0 | A0-A7 from the CPU |
| 1 | 0 | 1 | A8-A15 from the CPU |
| 1 | 1 | 0 | D0-D7 from the CPU |
| 1 | 1 | 1 | D0-D7 to the CPU |

As can be seen above, when the $\overline{\text{RFSH}}$ signal is a logical zero or low state, the microcycler will allow the address bits A0-A7 from the CPU to be conducted through regardless of the state of MC0 or MC1 in order to refresh the RAM. However, when $\overline{\text{RFSH}}$ is a logical 1 (inactive), MC0 and MC1 determine the contents of the microcycle data bus MXD0-MXD7.

Figure 10:
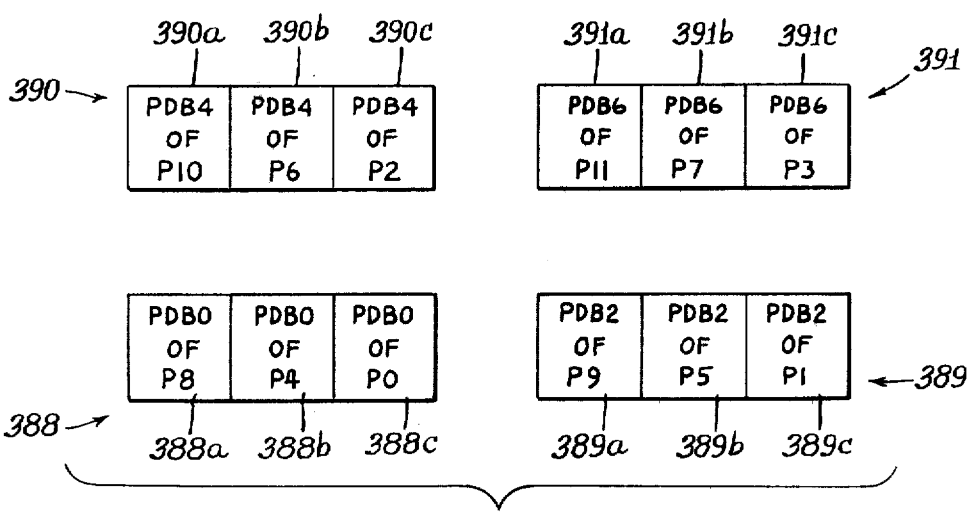
FIGS. 10A, 10B and 10C are a schematic diagram of the interconnections of the integrated circuit chips of the system.
Figure 10A:
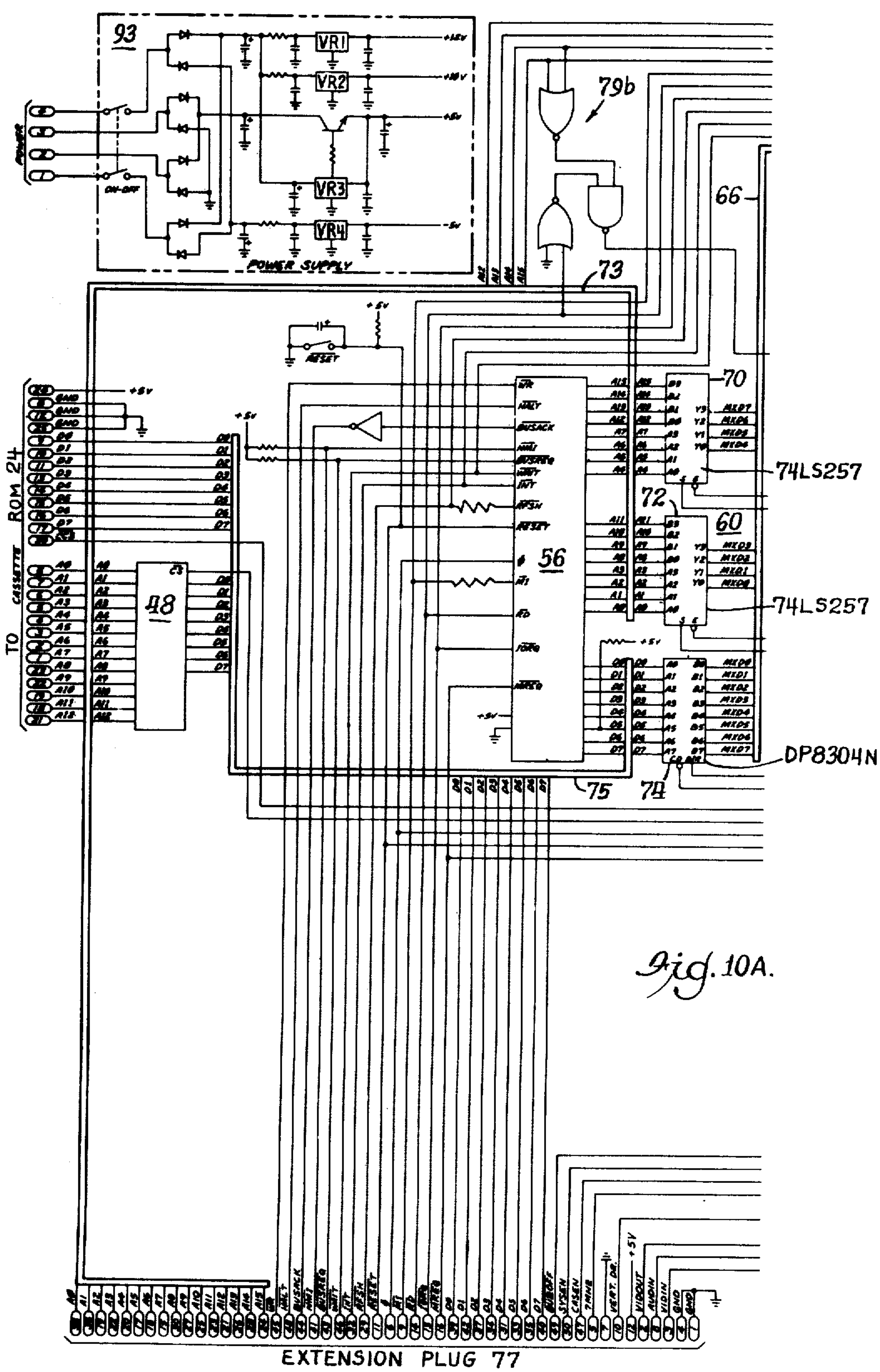
Figure 10B:
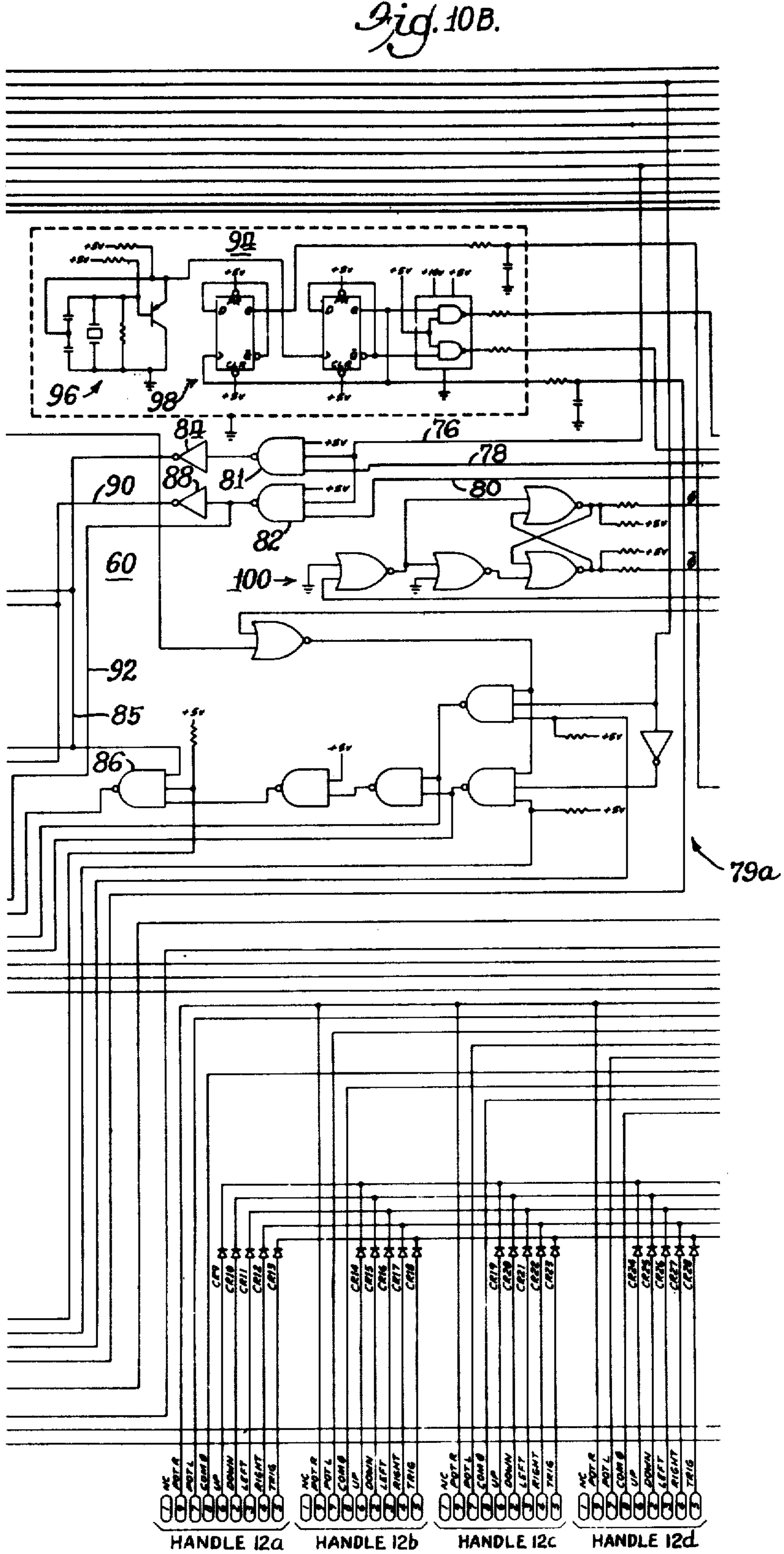
Figure 10C:
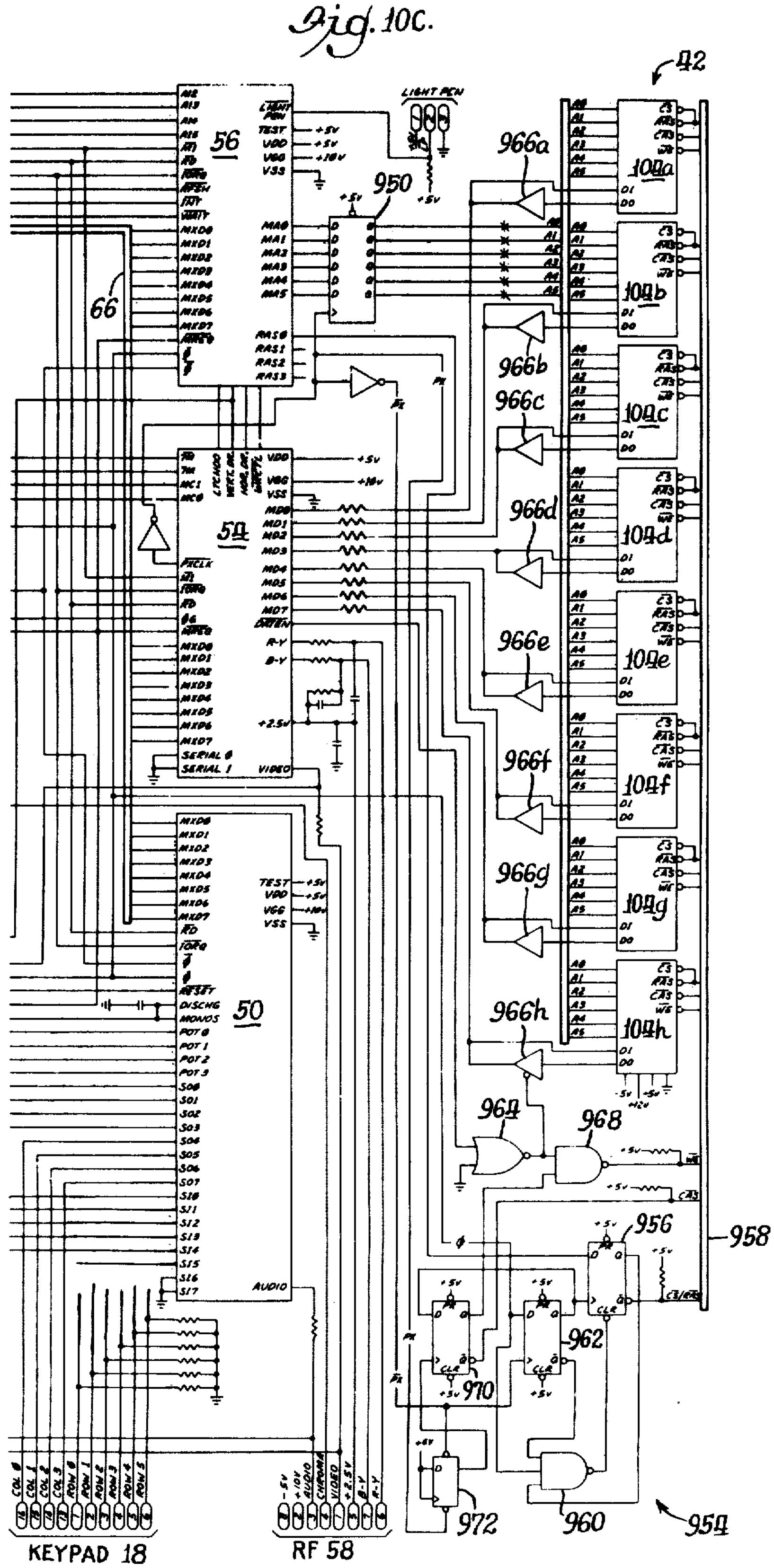

The microcycler as well as the interconnection of the various integrated circuit chips of the low resolution mode system are shown in greater detail in FIGS. 10A-C. The microcycler 60 comprises two 8-line to 4-line multiplexers 70 and 72, having four output lines MXD4-MXD7 and MXD0-MXD3, respectively, and each having 4A and 4B input lines, an enable input E and a select input S.

The address lines A0-A3 and A8-A11, from a CPU address bus 73 from the CPU 56 are connected to the A and B input lines of the address multiplexer 72, respectively. Similarly, the address bus lines A4-A7 and A12-A15 are connected to the 8 input lines of the address multiplexer 70. The address multiplexers 70 and 72 can selectively conduct either the "low address" bits A0-A7, or the "high address" bits A8-A15, to the microcycle data bus MXD0-MXD7 when enabled. The multiplexers have common industry designation number 74LS257.

The microcycler further comprises an 8 line bidirectional data gate 74 having 8 input/output lines connected to a CPU data bus 75 from the CPU 56, 8 input/output lines connected to the microcycle data bus MXD0-MXD7, a direction input DIR and an enable input CD. The data gate 74 can conduct data either from the CPU data bus 75 to the microcycle data bus 66 or from the microcycle data bus 66 to the CPU data bus 75 as determined by the state of the DIR input when enabled.

These three logic elements 70, 72, and 74, function as a 24-line to 8-line multiplexer to sequentially conduct groups of address signals and groups of data signals to the microcycle data bus, in response to the control signals MC0 and MC1 and the CPU control signal $\overline{\text{RFSH}}$. Alternatively, the gate 74, of the microcycler further functions as a gate for conducting data signals from the microcycle data bus to the CPU data bus.

The microcycle data bus 66 is connected to the MXD0-MXD7 inputs of the address chip 56, data chip 54 and I/O chip 50. The microcycler 60 had input lines 76, 78, and 80 for the control signals $\overline{\text{RFSH}}$, MC1 and MC0 respectively. The input line 76 operably connects the CPU 56 $\overline{\text{RFSH}}$ output to the inputs of a pair of NAND gates 81 and 82. The output of the NAND gate 81 is inverted by an inverter 84 whose output is connected by a line 85 to the enable input 'E' of the multiplexers 70 and 72 and is also connected to the input of a NAND gate 86 whose output is connected to the enable input CD of the gate 74. Thus, when the CPU 56 prepares to refresh the RAM, the refresh control signal, $\overline{\text{RFSH}}$, will go to the low state causing the output of the NAND gate 81 to go high which is inverted by the inverter 84. A low state at the enable input E of the multiplexers 70 and 72 causes these logic elements to be enabled whereby address signals can be conducted to the microcycle data bus 66. A low state on the line 85 also causes the output of the NAND gate 86 to go high which is presented to the enable input CD of the gate logic element 74 causing the gate 74 to be disabled whereby the outputs of the logic gate 74 are forced to an off state.

The output of the NAND gate 82 is connected to an inverter 88 having an output line 90 connected to the select inputs S of the multiplexers 70 and 72. Thus, when the refresh multiplexer control signal $\overline{\text{RFSH}}$ is low, the output of the NAND gate 82 is high. Consequently, the output of the inverter 88 is low. A low state presented at the selector input S causes address bits presented at the A inputs to be conducted to the multiplexer data bus. Thus when $\overline{\text{RFSH}}$ is low, the low address, A0-A7, is conducted to the microcycle data bus for use in the refresh cycle.

The input lines 78 and 80 connect data chip 54 MC1 and MC0 outputs to the inputs of NAND gates 81 and 82, respectively. When the control signal $\overline{\text{RFSH}}$ is high, i.e., a refresh is not being done, the outputs of the NAND gates 81 and 82 are determined by the microcycler control signals MC1 and MC0, respectively, from the data chip 54. Thus, when the control signal MC1 is in a low state, the output line 85 is also in a low state which enables the multiplexer logic elements 70 and 72 and disables the gate logic element 74 as wnen the $\overline{\text{RFSH}}$ signal is low. Thus, either the low address or the high address will be conducted onto the microcycler data bus as determined by the control signal MC0. When the control signal 'MC0' is in a low state, the output line 90 is also low which causes the low address to be conducted onto the microcycler data bus. If MC0 is at a high state, the high address is conducted to the microcycler data bus.

Control signal MC1 (and $\overline{\text{RFSH}}$) at a high state results in a high state at control line 85 which disables the multiplexers 70 and 72 and enables the gate 74. Thus, the data on the data bus 75 for bits D0-D7 from the CPU 56 will be gated onto the microcycler data bus MXD0-MXD7, or the data on the microcycler data bus will be gated onto the data bus of the CPU, depending upon the direction input DIR. The direction input DIR is connected by a line 92 to the output of the NAND gate 82. Thus, the state of the control signal MC0 (with $\overline{\text{RFSH}}$ high) determines the direction that the gate 74 will gate the data. For example, if MC0 is in a low state, the output of the NAND gate 82 will be high resulting in the contents of the data bus D0-D7 being gated onto the microcycler data bus; if MC0 is high, the contents of the microcycler data bus will be gated onto the data bus D0-D7 to the CPU 56.

A power supply indicated generally at 93 supplies +15 v, +10 v, +5 and −5 v to the system. A clock circuit 94 comprising a 14.31818 MHz oscillator 96 and divider stages 98, provides a 7 MHz clock signal 7M, and an inverted 7 MHz clock signal $\overline{7M}$, to the 7M and $\overline{7M}$ inputs, respectively, of the data chip 54. A clock signal ΦG, generated by the data chip 54 from the $\overline{7M}$ and $\overline{7M}$ clock signals, is outputted to a buffer 100 having output lines for clock signals Φ and $\overline{\Phi}$. The clock signals Φ1 and $\overline{\Phi}$2 are connected to the Φ and $\overline{\Phi}$ inputs of the address, data and I/O chips.

The CPU address bus 73 and data bus 75 are connected to the system ROM 48 having inputs A0-A12 and D0-D7 for the address and data bits, respectively. The address bus 73 and data bus 75 are also connected to the cassette ROM 24 (not shown) and the extension plug 77 (for expanding the system).

The system ROM chip 48 has a chip select input $\overline{CS}$ connected to the output of the chip select logic indicated at 79*a* and *b* with the cassette ROM chip select input $\overline{CCS}$ also connected to the output of the chip select logic 79*a* and *b*. The outputs of the logic 79*a* and *b* are functions of the CPU control signals MEMORY REQUEST ($\overline{MREQ}$) and READ ($\overline{RD}$), the address bits A13-A15 and the memory disable signals SYSEN, CASEN, AND $\overline{BUZOFF}$ from the extender plug 77.

DATA CHIP

The CPU control signal lines MEMORY REQUEST, INPUT/OUTPUT REQUEST, READ, and MACHINE CYCLE 1 are operatively connected to the data chip inputs $\overline{MREQ}$, $\overline{IORQ}$, $\overline{RD}$, and $\overline{M1}$, respectively, from the CPU 56. Two more control lines carrying control signals generated by the address chip 56 are connected to the data chip inputs LTCHDO, and $\overline{WRCTL}$, respectively. The data chip had a VDD input connected to a +5 volts source, a VGG input connected to a +10 volt source, and a DVSS input connected to ground. Two more inputs SERIAL 0 and SERIAL 1 are grounded since they are used in the high resolution mode.

The data chip 54 has a plurality of outputs including the memory data inputs and outputs MD0-MD7, connected by a memory data bus 102 to the display RAM 42. The data chip input/output MD0 is operatively connected to the data input, D1, and data output D0, ports of the RAM chip 104*a*, with other memory data input/outputs, MD1-MD7 of the data chip similarly connected to seven RAM chips 104*b-h*. The data chip also has analog video outputs R-Y, B-Y, VIDEO and +2.5 volts reference operatively connected to the RF modulator 58 (not shown). The data chip has clock signal outputs, VERTICAL DRIVE (VERT. DR.) and HORIZONTAL DRIVE (HORZ. DR.), connected to the address chip 56. Finally, the data chip has control signal outputs MC0 and MC1 connected to the microcycler (as noted before) and an output $\overline{DATEN}$ used to generate the write enable signal, $\overline{WE}$, for the RAM chips.

A schematic block diagram of the data chip 54 is shown in FIGS. 11A–11F. The microcycle generator 106 of FIG. 11A generates the microcycle control signals MC0 and MC1 from the CPU control signals $\overline{IORQ}$, $\overline{MREQ}$, $\overline{RD}$, and $\overline{M1}$. Also generated are microcycle decoder control signals LOAD LOW (LDL1) and LOAD HIGH (LDH1) for loading the low and high address bits respectively.

A more detailed schematic diagram of the data chip is shown in FIGS. 13A–EE with a composite diagram of these figures shown in FIG. 14. The microcycle generator has an input line 108 for the $\overline{MREQ}$ control signal and an input line 110 for the $\overline{IORQ}$ control signal, both of which are connected to the inputs of a NAND gate 112 whose output is connected by an inverter 114 to the inputs of a pair of NOR gates 116 and 118. The microcycle generator has an input line 120 for the CPU control signal $\overline{RD}$ which is connected to the other input of the NOR gate 116. The output of the NOR gate 116 is connected by an inverter 122 to the input of an AND gate 124.

The output of the NOR gate 118 is connected to the input of a NOR gate 126 whose output is connected to the input of a NOR gate 128 with the output of the AND gate 124 connected to the other input of the NOR gate 128. The output of the NOR gate 128 is connected by a gating transistor 130 which acts as a delay to the input of a NOR gate 132. The gate of the transistor 130 is connected to the clock signal line Φ2. Φ2 is the complement of the clock signal Φ and a clock signal Φ1 is Φ uncomplemented.

The output of the NOR gate 132 is connected by a gating transistor 134 (which also acts as a delay) to an inverter 136 having an output line 138. The gate of the "delay" transistor 134 is connected to the clock signal Φ1.

The output line 138 is connected to the inputs of the AND gate 124 and the NOR gate 126 and is also connected by a delay transistor 140 to the input of a NOR gate 142. The gate of the transistor 140 is connected to the clock signal $\overline{7M}$. The output of the NOR gate 142 is connected by a delay transistor 144 to an inverter 147 having an output line 148. The gate of the transistor 144 is connected to the 7M clock signal.

The output line 148 of the inverter 146 is connected to an input of a NOR gate 150 whose output is connected to an inverter 152. A transistor 154 is connected to the voltage source VDD and to ground by a transistor 156. The gate of the transistor 154 is connected to the output of the inverter 152 and the gate of the transistor 156 is connected to the output of the NOR gate 150. The junction of the transistors 154 and 156 at the line 80 carries the microcycle control signal MC0.

The $\overline{MREQ}$ and $\overline{IORQ}$ input lines, 108 and 110, are connected to the input AND gate 160 whose output is connected to a NOR gate 162. The output line 138 of the inverter 136 is also connected to the input of a NOR gate 164 whose output is connected to the input of the NOR gate 162. The output of the NOR gate 162 is connected by a delay transistor 166 to a NOR gate 168. The gate of the transistor 166 is connected to the Φ2 clock signal. The output of the NOR gate 168 is connected by a delay transistor 170 to an inverter 172 having an output line 174. The gate of the transistor 170 is connected to the Φ1 clock signal.

The output line 174 is connected to an input of the AND gate 160 and inputs of the NOR gates 118 and 164 and is also connected by a delay transistor 176 to a NOR gate 178. The gate of the transistor 176 is connected to the $\overline{7M}$ clock signal. The output of the NOR gate 178 is connected by a delay transistor 180 to an inverter 82 having an output line 188. The gate of the transistor 180 is connected to the clock signal 7M.

The output line 188 of the inverter 182 is connected to a NOR gate 190 whose output is connected to an inverter 192. A gating transistor 194 is connected to the voltage source VDD and to a transistor 196 which is connected to ground. The output of the inverter 192 is connected to the gate of the transistor 194 and the output of the NOR gate 190 is connected to the gate of the transistor 196. The junction of the transistors 194 and 196 at the line 78 carries the microcycle control signal MC1.

The state of the control signal MC1 is the same as the output of inverter 192 since a high state (logical 1) output of the inverter 192 will turn on the transistor 194 causing the MC1 line 78 to also go high. Similarly, a high output from the NOR gate 190 (when inverter 192 is at a low state) causes the transistor 196 to turn on which causes the MC1 control signal line 78 to also go low. The state of the MC0 control line 80 is similarly the same as the state of the inverter 152.

The microcycle generator has another input 200 for the CPU control signal $\overline{\text{M1}}$ which is connected to the input of a NOR gate 202 having another input connected to the input line 110 for the CPU control signal $\overline{\text{IORQ}}$. The output of the NOR gate 202 is connected to the inputs of the NOR gates 168, 132, 178, 142, 190 and 150.

The $\overline{\text{M1}}$ CPU control signal is active when low (logical 0) and indicates that the current machine cycle is an operation code fetch cycle of an instruction execution. Thus, the $\overline{\text{M1}}$ control signal is normally high (logical 1) whenever the CPU is accessing a peripheral device such as a video processor. Hence, the NOR gate 202 having a logical 1 presented at the input will output a logical 0. This logical 0 is presented at the inputs of the NOR gates 132, 168, 142, 178, 150 and 190 resulting in these NOR gates operating as inverters whenever the $\overline{\text{M1}}$ control signal is high.

Similarly, whenever $\overline{\text{M1}}$ goes low indicating that the current machine cycle is the fetch cycle of an instruction execution, $\overline{\text{IORQ}}$ will normally be high with the same effect upon the above-mentioned NOR gates with an exception. $\overline{\text{IORQ}}$ and $\overline{\text{M1}}$ will both go low during an "interrupt acknowledge" cycle. With these two control signals both at a low state, the NOR gate 202 will output a high state causing the NOR gate 150 to produce a low state forcing the control signal MC0 to a high state or 1. In a similar fashion, the output of the NOR gate 190 is forced to a low state which also forces the control signal MC1 to a high state.

Referring back to the microcycle modes set out in Table I, it is seen that where MC0 and MC1 are both a logical 1, the microcycler will gate data from the microcycler data bus to the CPU data bus. This data was placed on the microcycler data bus by the peripheral device initiating the interrupt and will be used by the CPU in its response to the interrupt signal.

The "MEMORY REQUEST" control signal, $\overline{\text{MREQ}}$, is active when low and indicates that the address bus of the CPU holds a valid address for a memory read or a memory write operation. The "INPUT-/OUTPUT REQUEST" control signal $\overline{\text{IORQ}}$, is also active when low and indicates that the lower half of the address bus holds a valid I/O address for a I/O read or write operation. The read control signal, $\overline{\text{RD}}$, is active when low and indicates that the CPU wishes to read data from the memory or an I/O device. When high, $\overline{\text{RD}}$ indicates the CPU wishes to write data to memory or an I/O device.

The generation of the microcycler control signals MC0 and MC1 as a function of the CPU control signals, $\overline{\text{MREQ}}$, $\overline{\text{IORQ}}$, and $\overline{\text{RD}}$ together with clock signals Φ1 and 7M, are illustrated for a plurality of read and write operations in FIGS. 12A–G. An example of MC0 and MC1 as functions of $\overline{\text{MREQ}}$ $\overline{\text{RD}}$, and the clock signals Φ1 and 7M, is shown for a memory write operation in FIG. 12A.

A clock state, T, is defined by one complete period of the clock signal Φ. At the beginning of the initial clock state T1, the CPU control signals $\overline{\text{MREQ}}$ $\overline{\text{RD}}$ are at the same state as the previous clock state which is a high state with the microcycler control signals MC0 and MC1 also at the same state as the previous clock state which is a low state. During T1, after the clock signal $\phi$ goes low, $\overline{\text{MREQ}}$ goes low which indicates that the CPU address bus holds a valid address for the memory write operation.

Referring to FIG. 13, the NAND gate 112 has the control signals $\overline{\text{MREQ}}$ and $\overline{\text{IORQ}}$ presented at its inputs which are both inactive or a logical 1 at the beginning of T1. When $\overline{\text{MREQ}}$ goes low, the output of the NAND gate 112 goes high which is inverted by the inverter 114 presenting a low state to one input of the NOR gate 118 and to one input of the NOR gate 116. The other input of the NOR gate 118 is connected by the line 174 to the output of the inverter 172.

Since $\overline{\text{M1}}$ is at a high state, the NOR gates 142, 178, 150 and 190 function as inverters. Thus the output of the inverter 172 at line 174 is at the same state as the previous MC1 state since there are an even number of "inverters" between the line 174 and the gate of the output transistor 194 (except insofar as the 7M and $\overline{\text{7M}}$ delay transistors 176 and 180 delay any change in MC1 resulting from a change in the output of the inverter 172 of line 174).

Thus since MC1 is at a low state, the line 174 connected to the input of the NOR gate 118 is at a low state with the other input of the NOR gate 118 at a low state, as noted before. This produces a high state at the output of NOR gate 118 which results in a low state at the output of the NOR gate 126.

The control signal $\overline{\text{RD}}$ is at a high state indicating a write operation which causes the NOR gate 116 to output a low state which is inverted by the inverter 122 to produce a high state. The line 138 is at the same state (except for a delay) as the previous MC0 state (in a manner similar to that for the line 174) which causes the output of the AND gate 124 to be low. The NOR gate 128 thus has a low state presented at both of its inputs which results in a high state produced at its output.

Figure 12A:
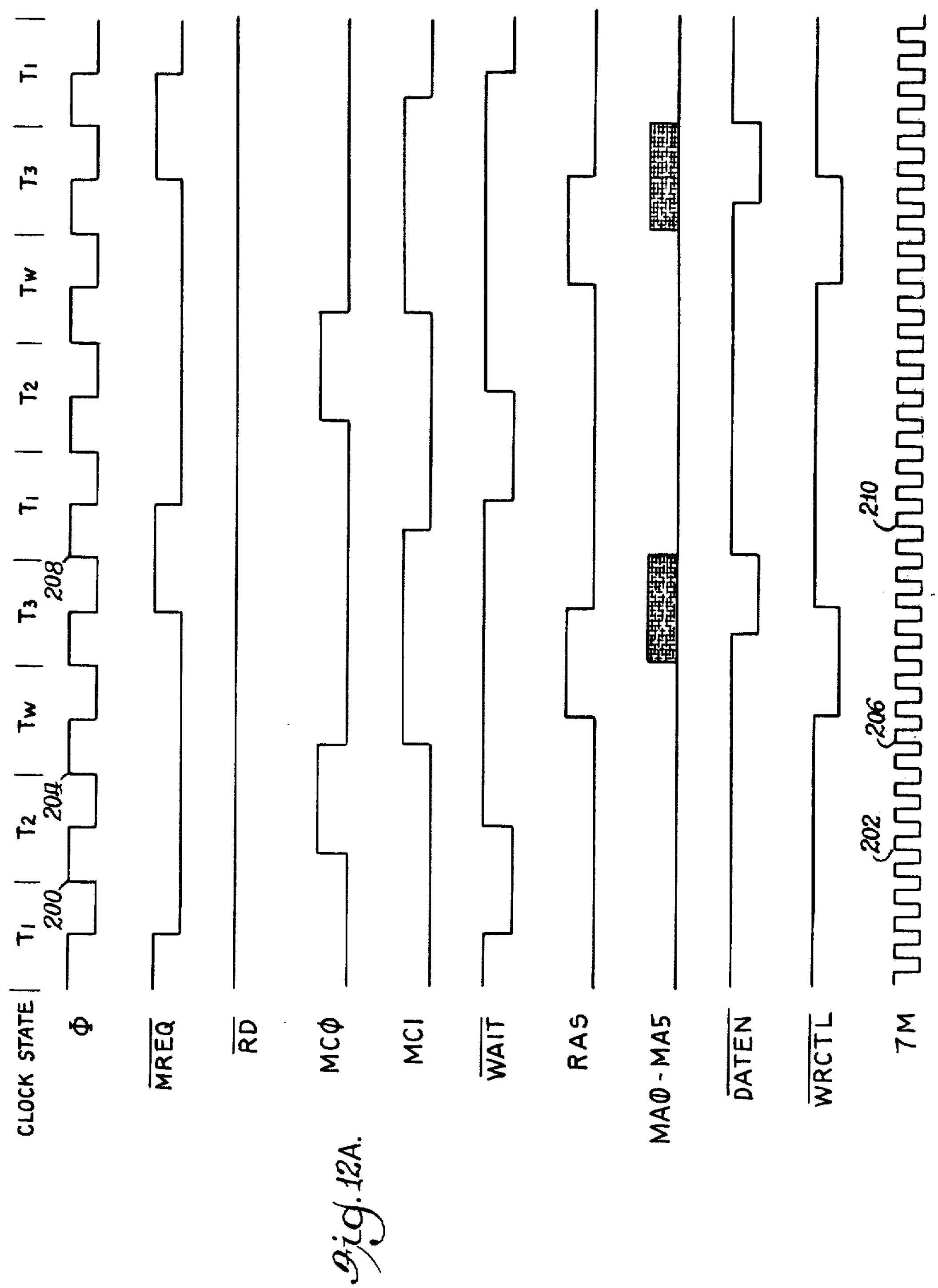
FIGS. 12A–12G are timing diagrams of various control signals of the system for various read and write operations.

This output is conducted when the clock signal Φ2 goes high and is inverted by the NOR gate 132. The transistor 134 conducts this output when the clock signal $\phi$1 goes high resulting in the output of the inverter 136 going high. Thus the output of the inverter 136 assumes the same state as the NOR gate 128 on the positive edge 200 (i.e., going from a low state to a high state) of the clock signal Φ (FIG. 12A).

The high state at the output of the inverter 136 is conducted by the transistor 140 when the clock signal $\overline{\text{7M}}$ goes high which is inverted by the NOR gate 142 and conducted by the transistor 144 when the clock signal 7M goes high. The logical 0 is then inverted by the inverter 146, NOR gate 150, and inverter 152 to produce a high state at the output of the inverter 152 which turns on the transistor 154 to produce the high state at the line 86 which is the MC0 control signal line. Referring back to FIG. 12A, it is seen that the control signal MC0 goes to a high state on the positive edge 202 of the clock signal 7M which follows the positive edge 200 of the clock signal Φ occurring after the CPU control signal $\overline{\text{MREQ}}$ goes low.

When MC0 changes from a low state to a high state, the contents of the microcycle data bus changes from the low address, A0-A7, to the high address, A8-A15. Thus the 16 address bits from the CPU are transmitted to the video processor and I/O chip in 2 eight-bit groups or slices.

The output of the inverter 136 rising to a high state causes the NOR gate 164 having an input connected to the output line 138 of the inverter 136 to fall to a low state. The output of the AND gate 160 is also low since $\overline{\text{MREQ}}$ is low causing the output of the NOR gate 162 to go high. This high output appears at the output of the inverter 172 at the line 174 on the positive edge 204 (FIG. 12A) of the clock signal Φ marking the start of the clock state Tw.

The high state then appears at the gate of the transistor 194 on the positive edge 206 of the clock signal 7M (FIG. 12A) causing the control signal MC1 to rise to a logical 1. The $\overline{\text{RD}}$ signal is at a high state (indicating a write operation) which causes the NOR gate 116 to output a "zero" which is inverted by the inverter 122. The output of the inverter 136, which is at a high state, is returned to the AND gate 124 causing the AND gate to output a "one" which causes the NOR gate 128 to output a "zero". This low state appears at the output of the inverter 136 on the positive edge 204 of the clock signal Φ (FIG. 12A). The low state then appears at the MC0 control signal line 80 on the positive edge 206 of the 7M clock signal (FIG. 12A).

With MC0 at a low state and MC1 at a high state, the contents of the CPU data bus are gated onto the microcycle data bus. Thus data placed on the CPU data bus is transmitted to the peripheral devices on the microcycle data bus.

During clock state T3, $\overline{\text{MREQ}}$ returns to a high state. Since $\overline{\text{MREQ}}$ as well as the output of the inverter 172 at line 174 and $\overline{\text{IORQ}}$ are at a high state, the output of the AND gate 160 is high which causes the output of the NOR gate 162 to go low. This low output appears at the line 172 on the positive edge 208 of the Φ1 clock signal at clock state T1. The low state at line 172 appears at the gate of the output transistor 194 (with a high state at the gate of the transistor 196) at the positive edge 210 of the clock signal 7M causing the microcycle control signal MC1 to go low. The microcycler is now ready to transmit the low address of the next address presented at its inputs. The relationship of the microcycler control signals MC0 and MC1 to the CPU control signals and system clock signals Φ and 7M is shown for a variety of other read and write operations in FIGS. 12B–G.

The microcycler further comprises a NOR gate 201 having inputs connected to outputs of the inverters 146 and 182 and to the clock signal Φ1. A NOR gate 203 also has inputs connected to the output of the inverter 182, to the output of the inverter 146 by an inverter 205, and to the clock signal input Φ. An output line 226 of the NOR gate 201 carries the microcycle decoder control signal LDL1 which is a logical 1 when the outputs of the inverters 146 and 182 are a logical 0 (corresponding to both MCO and MC1 a logical 0), together with Φ1 a logical 0. An output line 228 of the NOR gate 203 carries the signal LDL1 which is a logical 1 when MC0 is a logical 1, MC1 a logical 0 and Φ1 a logical 0.

Each of the address, data, and I/O chips has a plurality of registers. Each of these registers is individually addressable by the CPU for inputting or outputting data contained in the register.

Figure 11C:
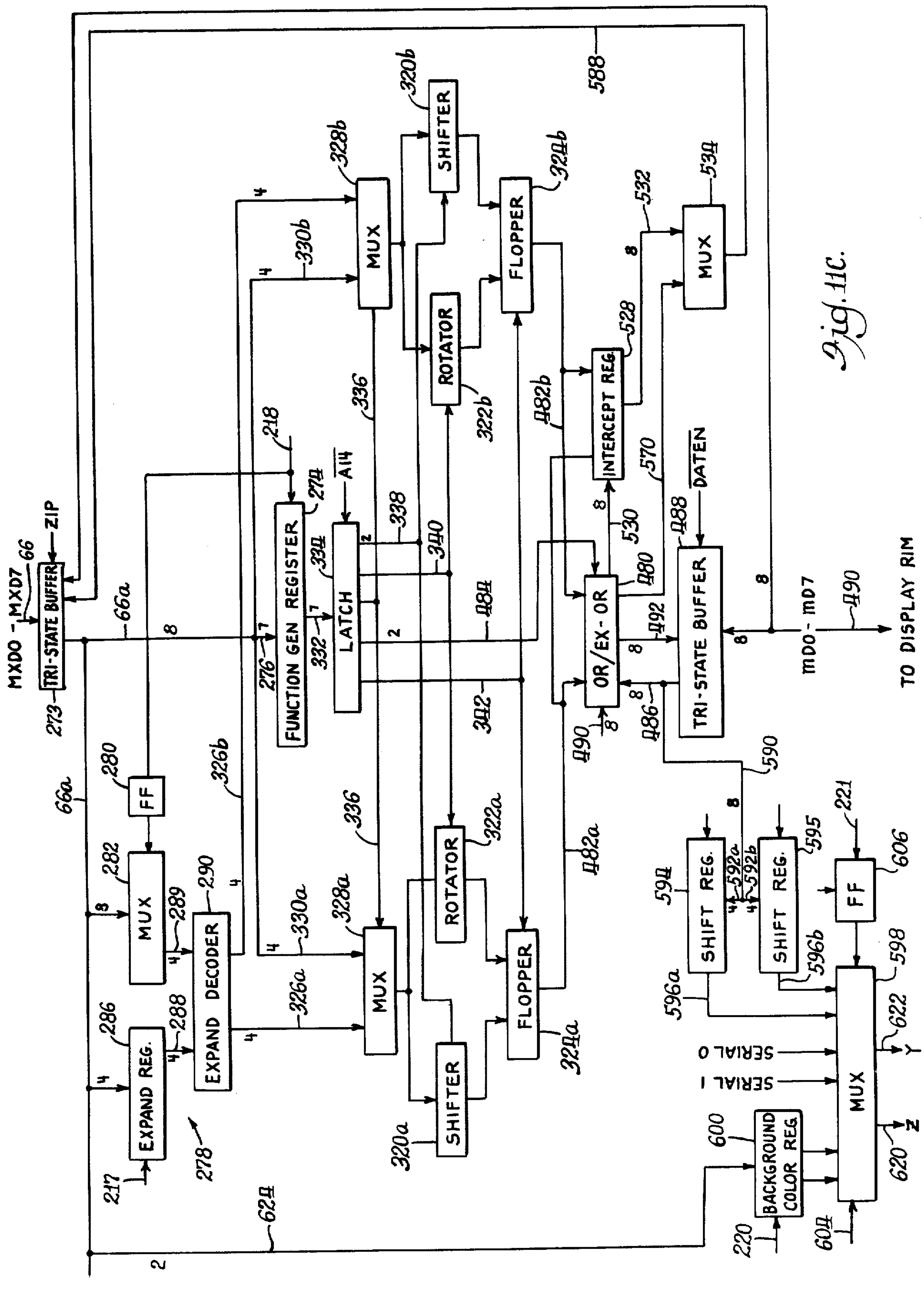

The data chip is shown in FIG. 11B to the microcycle decoder 212 which assembles 11 address bits A0-A10 from the low address bits, A0-A7, and high address bits, A8-A15, transmitted from the microcycle data bus. The microcycle decoder 212 has an eight bit input line connected to all the bits of an eight-bit data chip data bus **66*a* and a three-bit input line connected to the lower 3 bits of the data bus 66*a*. The microcycle data bus 66 is connected to the data bus 66*a* by a tristate buffer 273 (FIG. 11C). (Other buffers shown in the more detailed schematic FIG. 13 are omitted from the FIGS. 11A–F** for clarity).

The microcycle generator 106 (FIG. 11A) generates control signals LDL1 and LDH1 to signal that the microcycle data bus contains the low address bits or the high address bits, respectively. The microcycle decoder 212 is operatively connected to the microcycle generator to input these control signals such that the decoder latches up the low address bits from the eight bit input lines when LDL1 is high and subsequently the high address bits A8-A10 on the three bit input line when the control signal LDH1 is a high. The 11 bits latched in the microcycle decoder are utilized to address the registers on the data chip. The microcycle decoder has an 11 bit output bus A0–A10 which is connected to an address decoder 214 which decodes the address bits to activate one of a plurality of register select lines 216–222. Register select line 216 actually represents eight register select lines for eight different "color" registers 224.

In addition to the proper address, the register select lines 216–221 require the concurrence of a data chip generated control signal, $\overline{\text{OUTPUT}}$, in order to be activated. The eight color register select lines 216 further require a CPU generated control signal $\overline{\text{IORQ}}$. The register select line 222 requires the concurrence of another data chip generated control signal $\overline{\text{INPUT}}$, to be activated. The $\overline{\text{INPUT}}$ and $\overline{\text{OUTPUT}}$ signals are functions of Z-80 CPU control signals including $\overline{\text{MREQ}}$, $\overline{\text{IORQ}}$, $\overline{\text{RD}}$ and $\overline{\text{M1}}$ and are generated to compensate for any delay caused by the microcycler.

The register select lines 216–221 are operatively connected to eight color registers 0–7 , an "expand" register, "function generator" register, "vertical blank" register, "horizontal color boundary" and "background color" register and "low/high resolution mode" register, respectively. The line 222 is operatively connected to a multiplexer, which when activated causes the multiplexer to select the output of an "intercept" register. In this manner, the CPU may select any particular register of the data chip by transmitting an address corresponding to the register which is transmitted in two groups, the low and high addresses, by the microcycler to the microcycle decoder which reassembles the address bits into address bits A0–A10. These bits are then decoded and the corresponding register select line is activated which enables the addressed register to input or output data to the CPU via the microcycle data bus.

The microcycle decoder 212 and address decoder 214 are shown in greater detail in FIG. 13. The microcycle decoder 212 comprises an 11-bit latch with the eight least significant bits A0–A7 each having an input connected to the D0–D7 lines, respectively, of the data bus 66*a*. Each of the A0–A7 bits of the latch also have an input connected to the LDL1 control signal line 226 and an input connected the line 226 through an inverter 227. The most significant bits A8–A10 each have an input connected to the D0–D2 lines, respectively, of the data bus 66*a* and each has an input connected to the LDH1 control signal input line 228 directly, and an input connected to the line 228 through an inverter 229.

The A0 bit has output lines A0 and its complement $\overline{A0}$ with the A1 bit having outputs A1, $\overline{A1}$, etc. all connected to the address decoder 214.

An example of a bit circuit of the latch of the microcycle decoder is shown in FIG. 13. The input of the A0 bit circuit of the latch is connected to a gating transistor 230 whose gate is connected to the LDL1 control signal line 226. The 1 input is also connected to the D0 line of the data bus 66*a* which carries (among others) address bits A0 and A8. Transistor 230 is connected to an inverter 232 whose output is the $\overline{A0}$ output line of the A0 latch which is also connected to an inverter 234 whose output is the A0 output line. The output of the inverter 234 is connected to a gating transistor 236 whose gate is connected to the output of inverter 227 (FIG. 13) which carries $\overline{LDL1}$. The output of the transistor 236 is connected to the input of the inverter 232.

The bit on the D0 line of the data bus 66*a* is presented to the input of the transistor 230 which is gated by the LDL1 control signal when the D0 line carries the address bit A0. The inverter 232 inverts the address bit A0 and outputs the bit as address bit $\overline{A0}$. The output of the inverter 232 is inverted by inverter 234 whose output is the address bit A0. The bit A0 is stored in the A0 bit of the latch in this manner.

The address decoder is shown in FIG. 13 to comprise a programmed logic array (PLA) having a plurality of input lines A0–A10 and $\overline{A0-A10}$ connected to the corresponding output lines of the microcycle decoder 212. A plurality of output lines 217–222 and 238–253 are selectively coupled to the PLA input lines by a plurality of pull-down transistors, each of which is represented by a small circle 254.

Figure 16:
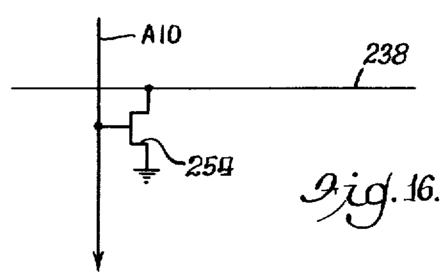
Figure 32:
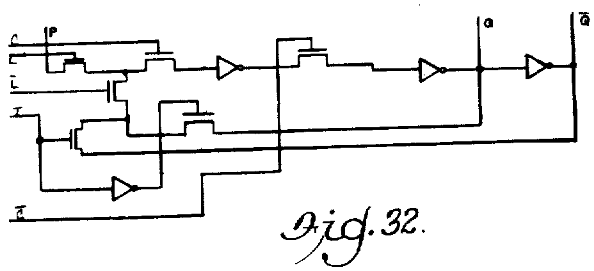
Figure 34:
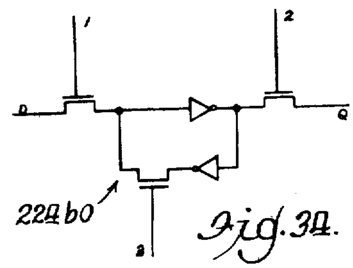

An example of these pull-down transistors, the transistor coupling the input line A10 to the output line 238 is shown in greater detail in FIG. 16. If the address bit A10 equals 1, i.e., a high state, the A10 address line will cause the pull-down transistor 254 to turn on which "pulls down" the output line 238 to ground.

Each output line 217–222 and 238–253 is connected to the voltage source VDD by a pull-up transistor 260 referring back to FIG. 13. A logical 1 on any address bit input line coupled to an output line will cause that output line to be grounded which is a low state or logical 0.

The input lines of the PLA are selectively coupled to the output lines by the pull-down transistors 254 such that a particular output line will produce a logical 1 only when a predetermined address consisting of a predetermined combination of 1's and 0's are presented on the address input lines A0–A10 and $\overline{A0-A10}$.

The output lines 217–221 are coupled to the $\overline{OUTPUT}$ control signal line 262 by pull-down transistors 264 so that in addition to the proper address, the $\overline{OUTPUT}$ control signal must be low in order for one of these control lines to output a logical 1. For example, if the address bits A7, A6, A5, A4, A3, A2, A1 and A0 (A7 being the most significant) have the values 0, 0, 0, 1, 1, 0, 0 and 1, respectively, the control line 217 will be a logical 1, if the $\overline{OUTPUT}$ control signal is also low. Since the PLA output line 217 is the "expand" register select line, the expand register will be selected if the address bits A7–A0 have the value 00011001 or 19H. Thus 19H is the hexadecimal address of the expand register. If any of the address bits A7–A0 are different from the values just listed, the expand register will not be selected. For example, if the address bit A7 is a 1 instead of a 0, the pull-down transistor 254 associated with the A7 input line and the PLA output line 217 will be turned on which pulls the output line 217 to a logical 0.

The output line 222 has an associated address 8H and, as seen in FIG. 11B, is the "intercept" register select line. The intercept register select line 222 is coupled to an $\overline{INPUT}$ control signal line 266 by a pull-down transistor 268 so that in addition to the address 8H, the $\overline{INPUT}$ control signal must be low in order for the register select line 222 to be at a logical 1 state which will select the intercept register.

The output lines 238 and 239 are connected to the input of a NOR gate 270 whose output is connected to a NOR gate 272. The other inputs of the NOR gate 272 are the control signal line 262 and a $\overline{IORQ}$ control signal line 270. Thus, either of two hexadecimal addresses, BH or OH, will cause the output of the NOR gate 270 to go low which will cause the output of the inverter 272 to go high if the control signal $\overline{OUTPUT}$ and the control signal $\overline{IORQ}$ are both low.

The output lines 240 and 241, 242 and 243, etc. are also connected to a plurality of NOR gates 271 which are connected to a plurality of NOR gates 272 which also have inputs connected to the $\overline{OUTPUT}$ control signal line 262 an $\overline{IORQ}$ control signal line 270. The output lines 216 of the NOR gates 272 are the register select lines for the color registers 224, as seen in FIG. 11B.

Thus, either the hexadecimal address 8H or BH will select color register 0. There is an extra address for each color register to accommodate a color block transfer operation which will be described in more detail later.

Thus, the CPU may address or select a particular register in order to input or output data from or to that register by transmitting the register's associated address together with the proper CPU control signals. The microcycler transmits this address in two groups, the low and high addresses, which are then reassembled by the microcycler decoder 212. The address latched in the microcycler decoder is decoded by the address decoder 214 which activates a register select line. The register select line enables the associated register to input from or output data to the microcycle data bus. The hexadecimal addresses for the input and output ports or registers for the Address, Data and I/O chips are set forth in Table II below:

TABLE II

| OUTPUT PORTS | | INPUT PORTS | |
|---|---|---|---|
| PORT ADDRESS | FUNCTION | PORT ADDRESS | FUNCTION |
| ΦH | Color Register Φ | 8H | Intercept Feedback |

TABLE II-continued

| OUTPUT PORTS PORT ADDRESS | FUNCTION | INPUT PORTS PORT ADDRESS | FUNCTION |
|---|---|---|---|
| | | | Multiplexer |
| 1H | Color Register 1 | | |
| | | EH | Vertical Feedback Register |
| 2H | Color Register 2 | | |
| 3H | Color Register 3 | FH | Horizontal Feedback Register |
| 4H | Color Register 4 | | |
| | | 1ΦH | Player 1 Handle |
| 5H | Color Register 5 | | |
| | | 11H | Player 2 Handle |
| 6H | Color Register 6 | | |
| 7H | Color Register 7 | 12H | Player 3 Handle |
| 8H | Low/High Resolution Register | 13H | Player 4 Handle |
| | | 14H | Keypad Column Φ (right) |
| 9H | Horizontal Color Boundary Register | | |
| | Background Color Register | 15H | Keypad Column 1 |
| | | 16H | Keypad Column 2 |
| AH | Vertical Blank Register | 17H | Keypad Column 3 (left) |
| BH | Color Block Transfer | | |
| CH | Function Generator Register | | |
| DH | Interrupt Feedback Register | | |
| EH | Interrupt Enable and Mode Register | | |
| FH | Interrupt Line Register | | |
| 1ΦH | Master Oscillator Register | | |
| 11H | Tone A Frequency Register | | |
| 12H | Tone B Frequency Register | | |
| 13H | Tone C Frequency Register | | |
| 14H | Vibrato Register | | |
| 15H | Tone C Volume, Noise Modulation and MUX registers | | |
| 16H | Tone A Volume and Tone B Volume Registers | | |
| 17H | Noise Volume Register | | |
| 18H | Sound Block Transfer | | |
| 19H | Expand Register | | |

The functional generator of the video processor can perform a variety of functions or modifications to the pixel data as the data is written to the display RAM by the CPU from the system or cassette ROM. The function generator is enabled when the address of the data is less then 4,000H (address bit A14 equal to 0). The function generator is contained on the data chip 54 and is shown in FIG. 11C to comprise a 7-bit function generator register 274 which is connected to the data bus 66*a* by a 7-bit input line 276. The data chip data bus 66*a* is operatively connected to the microcycler data bus 66 by the tri-state buffer 273 shown in FIG. 13 to comprise 8 units 273*a–h*. (Buffer unit 273*a*, typical of the units 273*a–h*, is shown in greater detail in FIG. 17). The output 1 of each unit is connected to the data bus 66*a* by a buffer 611 (logically similar to that shown in FIG. 18).

The data contents of the register 274 determine how the pixel data is to be modified. The CPU 46 (FIG. 2) may output data to the register 274 by transmitting the address CH to the microcycle decoder 212 and address decoder 214 of FIG. 11B which activates the function generator register select line 218. When the register select line 218 is activated, the function generator register 274 is enabled to input (or latch up) the 7 bits of data transmitted by the CPU. The bits of the data contained within the function generator register 274 relate to different modifications of the pixel data as shown below in Table III:

TABLE III

| | | |
|---|---|---|
| Bit | 0 | Least Significant Bit of Shift Amount |
| | 1 | Most Significant Bit of Shift Amount |
| | 2 | Rotate |
| | 3 | Expand |
| | 4 | OR |
| | 5 | Exclusive-OR |
| | 6 | Flop |

The order in which the functions are performed is as follows: expansion is done first; rotating or shifting; flopping; and logical-OR or exclusive-OR. The video processor performs the modifications in response to the data stored in the function generator register. A logical 0 or 1 in the bits 2–6 determine whether or not the corresponding function is performed. Bits 0 or 1 of the function generator register determine the amount, if any, of the shift. As many as four of these functions can be used at any one time and any function can be omitted. However, rotate and shift as well as logical-OR and exclusive-OR cannot be done at the same time.

The expand function expands the 8 bits contained on the microcycle data bus 66 four bits at a time into 16 bits. It expands a 0 on the microcycle data bus into one 2-bit pixel and a 1 into another 2-bit pixel. Thus, two-color patterns can be stored in the system or cassette ROM in half the memory space.

The expand function is performed by an expander indicated generally at 278. During each write operation to the display memory using the expander 278, either the upper half (D4–D7) or the lower half (D0–D3) of the data bus 66*a* is expanded but the expand function may be bypassed, as will be more fully explained below. The half that is expanded is determined by an expand flip-flop 282 having a reset input connected to the function generator register select line 218 and an output connected to a multiplexer 282. The flip-flop 280 is reset by an output to the function generator register 274 and is toggled after each write operation to the display RAM in which the function generator is utilized. The multiplexer 282 is responsive to the flip-flop to select either the upper half, or lower half, of the bits contained on the data bus 66*a* and output the selected bits on a 4-bit multiplexer data bus 284 for expansion. The upper half of the data bus 66*a* is expanded when the flip-flop 280 is at a low or zero state, and the lower half is expanded when the flip-flop toggles to the high state.

A 4-bit "expand" register 286 having a 4-bit output line 288 determines the pixel values into which the data contained on the multiplexer data bus 284 can be expanded. A 0 on the multiplexer data bus will be expanded by an expand decoder 290 connected to the expand register output bus 288 and multiplexer output bus 284 into the pixel value determined by bits 0 to 1 of the expand register 286. A 1 on the multiplexer data bus will be expanded into the pixel value determined by bits 2 and 3 of the expand register 286. Thus, the pixel data on the multiplexer data bus is encoded at the first level to identify either the 0 and 1 or 2 and 3 bits of the expand register. In this manner, the data from the computer is decoded into pixel data encoded at the second level, i.e., the pixel data stored in the expand register, which is transmitted when the particular bits of the expand register are selected and identified. The second level pixel data is stored in the display RAM after other modifications, if any, are performed. The pixel data stored in the RAM, when read, is utilized together with the left/right bit to select a color register to generate the pixels of the display as explained hereinbefore.

The expand register 286 has an address 19H at which the CPU may access the expand register in order to change the contents. The address 19H (together with an $\overline{\text{OUTPUT}}$ signal) transmitted to the address decoder 214 (FIG. 11B) causes the expand register select line 217 to be activated which enables the expand register 286 to receive data on the data bus 66*a*. In this manner, the pixel data values into which data is expanded may be changed.

The expander 278 is shown in greater detail in FIG. 13. The expand flip-flop 280 has a reset input R connected to the function generator register select line 218 so that the flip-flop is reset with each output of data to the function generator register 274. The flip-flop has a clock input C connected to a clock input line 292 and a clock input $\overline{C}$ also connected to the clock signal input line 292 through an inverter 294. (The line 292 carries a clock signal, $\overline{\text{SHIFT}}$, which will be more fully explained hereinafter.)

An output $\overline{Q}$ is connected to a D input of the flip-flop 280 so that the flip-flop toggles with each clock signal which occurs with each write to the display RAM. The output $\overline{Q}$ is also connected by a line 296 to the gates of four transistor switches 298*a–d* of the multiplexer 282. An output Q of the flip-flop is connected by a line 300 to the gates of four transistor switches 302*a–d*. (The flip-flop 280 is shown in greater detail in FIG. 19).

The inputs of the transistor switches 298*a–d* are connected to the four most significant bits (the upper half) of the data bus 66*a* with the transistor switches 302*a–d* connected to the four least significant bits (the lower half) of the data bus 66*a*. If the state of the expand flip-flop 280 is a logical 1, the transistor switches 302*a–d* will conduct the lower half of the data bus 66*a* to the expander. Otherwise, a logical 0 will cause the transistor switches 298*a*–298*d* of the multiplexer 282 to conduct the upper half of the data bus 66*a*.

The output of the transistor switches 302*d* and 298*d* are connected by an inverter 304 to the gates of a pair of transistor switches 306*a* and 306*b* of the expander decoder indicated generally at 290. The output of the inverter 304 is also connected by an inverter 308 to the gates of a pair of transistor switches 310*a* and 310*b*.

A line 312*a* is connected to grond by a transistor 314 whose gate is connected to the output of bit 0 of the expand register 286. (The logic design of each bit of the expand register is similar to that of the bit of the latch of the microcycle decoder 212 shown in FIG. 15). The line 312*a* is connected to the voltage source VDD by the transistor 306*a* and a pull-up transistor 316.

If the state of bit 0 of the expand register 286 is a logical 1, the transistor 314 is turned on which pulls the line 312 to ground or logical 0, otherwise it is a logical 1. Thus the contents of bit 0 of the expand register controls the logic state of the line 312 wherein the logic state of the line 312 is the complement of bit 0 of the expand register 286. In a similar manner, the logic state of a line 312*b* connected to the transistor switch 306*b* is the complement of the value of bit 1 of the expand register 286.

Also the logic state of a pair of lines 318*a* and 318*b* are the complements of the bits 2 and 3, respectively, of expand register 286. The lines 318*a* and 318*b* are connected to the transistor switches 310*a* and 310*b*, respectively.

If the input of the inverter 304 (either bit 0 or bit 4 of data bus 66*a*, depending upon flip-flop 280) is a logical 0, the transistors 306*a* and 306*b* ae turned on, which selects the lines 312*a* and 312*b* which contain the complemented values of bits 0 and 1 of the expand register. On the other hand, if the input of the inverter 304 is a 1, the transistors 310*a* and *b* are turned on which selects the lines 318*a* and 318*b* containing the complemented values of the bits 2 and 3. The transistors 306*a* and 310*a* are connected to a common output line referred to as expand data bit 0 or EDB0. Similarly, the transistors 306*b* and 310*b* are connected to output line EDB1; thus a bit from the multiplexer 280 at inverter 304 is expanded into the logic states of lines ED0 and ED1, or simply bits ED0 an ED1. A 0 is expanded into bits ED0 and ED1 which are defined by the complement of bits 0 and 1 of the expand register and a 1 is expanded into bits ED0 and ED1 defined by the complement of bits 2 and 3 of the expand register 386.

In a similar manner, the remaining bits of the lower half of the data bus 66*a*, (or remaining bits of the upper half if the upper half of the microcycler data bus is selected by the multiplexer 282) are expanded into the expand data bits ED2 and ED3, ED4 and ED5, and ED6 and ED7 which are also defined by the complement of either bits 0 and 1 or 2 and 3 of the expand register. For example, if the expand register bits 0 and 1 contain the values 1 and 0, respectively, the expand register bits 2 and 3 contain the values 0 and 0, respectively, and the half of the microcycler data bus being expanded has the values 0, 1, 1 and 0. These values will be expanded into the pixel values 01, 00, 00 and 01, respectively.

A pixel is generally represented by 2 bits so that a byte of pixel data having 8 pixel data bits or PDB7–PDB0, represents four pixels with the first pixel represented by pixel data bits PDB0 and PDB1, the second pixel by PDB2 and PDB1, etc. The pixel data bit PDB6 will be referred to as the low bit of the first pixel with PDB7 as the high bit. Similarly, the second pixel has low and high bits PDB4 and PDB5, etc.

The functions shift, rotate, and flop can be thought of as operating on pixels as a whole rather than as individual bits. Accordingly, there is provided a shifter, rotator, and flopper for both of the two bits of data representing pixels. Thus, referring to FIG. 11C, there are provided shifter circuits 320*a* and *b*, rotator circuits 322*a* and *b*, and flopper circuits 324*a* and *b*, for the low pixel data bits (PDB6, PDB4, PDB2 and PDB0) and the high bits (PDB7, PDB5, PDB3 and PDB1), respectively, of a byte of pixel data.

The expand function, as with all the other functions, may be bypassed. Accordingly, the expand decoder 290 has a 4-bit output line 326*a* for the low pixel data bits connected to inputs of a 2-to-1 multiplexer 328*a* and a four-bit output line 326*b* for the high pixel data bits connected to inputs of a 2-to-1 multiplexer 328*b*. The other four inputs of the multiplexer 328*a* are connected to the low bits (D6, D4, D2 and D0) of the data bus 66*a* by a 4-bit input line 330*a* with the other 4 inputs of the multiplexer 328*b* connected to the high bits D7, D5, D3 and D1 by a line 330*b*.

The output of the function generator register 274 is connected by a 7 bit output line 332 to a latch 334 having a control input line for address bit $\overline{\text{A14}}$ connected to the address bus 75 of the CPU. When address bit $\overline{\text{A14}}$ is low, the contents of the function generator register are gated through the latch 334. The output of the latch 334 corresponding to bit 3 of the function generator register is connected to the select inputs of the multiplexers 328*a* and 328*b* by a line 336. Thus, bit 3 of the function generator register controls the multiplexers 328*a* and 328*b*.

If bit 3 is a 0, for example, the multiplexer 328*a* will conduct the low bits of pixel data from the expand decoder 290 but if bit 3 is a 1, the multiplexer 328*a* will conduct the low bits of pixel data from the data bus 66*a*. The multiplexer 328*b* operates in a similar manner for the high bits of pixel data. In this manner, the expand function may be bypassed by placing a 1 in bit 3 of the function generator register.

The output of the multiplexer 328*a* is connected to the inputs of the shifter 320*a* and to the inputs of the rotator 322*a* with the output of the multiplexer 328*b* connected to the inputs of the shifter 320*b* and rotator 322*b*. As noted before, the shift and rotate functions are not performed at the same time. Bits 0 and 1 of the function generator register 274 control the amount of shift, if any, performed by the shifters 320*a* and *b*. The outputs of latch 334 corresponding to the bits 0 and 1 are connected to the shifter 320*a* and 320*b* by a 2 bit line 338.

Bit 2 of the function generator register controls whether a rotate is performed and its corresponding latch output is connected to rotators 322*a* and 322*b* by a line 340. The output of the shifter 320*a* and the rotator 322*a* are connected to the inputs of the flopper 324*a* with the output of rotator 322*b* and shifter 320*b* connected to the input of flopper 324*b*. The output of the latch 334 corresponding to bit 6 of the expand register 274 is connected to the floppers 324*a* and *d* by a line 342 and controls whether a flop function is performed.

The function generator register 274 is shown in FIG. 13 to comprise a 7-bit register having 7 inputs connected to the D6–D0 bits of the data bus 66*a*. (The logic design of each bit of the register 274 is also similar to the bit of the latch of the microcycle decoder 212 shown in FIG. 15). The latch 334 comprises NOR gates 334*a–g* each having an input connected to the address bit line $\overline{\text{A14}}$ and an input connected to an output of bits 6–0 , respectively, of the function generator 274. The function generator register select line 218 is connected by a buffer 385, and by an inverter 346, to the function generator register 274.

The multiplexer 328*b*, rotator 322*b*, shifter 320*b* and flopper 324*b* for the high pixel data bits are constructed and operate in a manner similar to the multiplexer 328*a*, rotator 322*a*, shifter 320*a* and flopper 324*a*, for the low pixel data bits. Therefore, only those modifiers for the low pixel data bits (PDB6, PDB4, PDB2 and PDB0 ) will be described in detail. The high and low pixel data bits are modified at the same time and reassembled before being written to the display RAM.

The output of the NOR gate 334*d* (corresponding to bit 3 of the function generator register) is connected by line 336 to the select input A of the 4 units 328*a*0, 328*a*2, 328*a*4 and 328*a*6 of the multiplexer 328*a*. The line 336 is also connected to the select input B of each multiplexer unit by an inverter 348.

Figure 20:
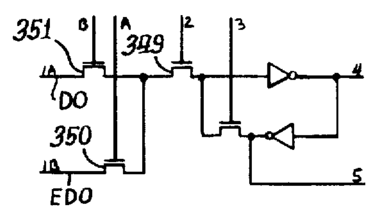
Figure 30:
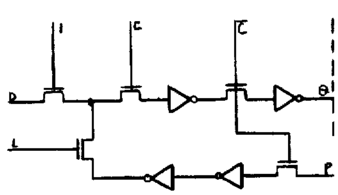

One such multiplexer unit, 328*a*0, is shown in greater detail in FIG. 20. The multiplexer unit 328*a*0 has an input 1A, connected to the unexpanded MDO bit of the data bus 66*a* and an input, 1B, connected to the bit ED0 of the expand data bus 326*a*. The ED0 input is connected to a D type flip-flop shown generally at 349 having outputs 4 and 5, by a transistor switch 350 having a gate connected to the line 336 (not shown). The MD0 input is connected to the D flip-flop 348 by a transistor switch 351 whose gate is connected to the line 336 through the inverter 348 (also not shown). Thus if the line 336 is logical 1 (which is controlled by bit 3 of the function generator register when the address bit $\overline{\text{A14}}$ is a logical 0), the ED0 bit from the expander is conducted to the D flip-flop. The output of this D flip-flop defines pixel data bit PDB0. The output of the eight flip-flops of the multiplexer 328*a* and *b* for the low and high pixel data bits, respectively, together define PDB7–PDB0. Thus if the line 336 is logical 1, the pixel data bits PDB7–PDB0 will be determined by expand bits ED7–ED0. But if the line 336 is a 0, the unexpanded bit from the data bus 66*a* is conducted to the D flip-flop and PDB0 is defined by MD0. In such a manner, bit 3 of the function generator register determines whether the expand function is utilized or whether the pixel data from the microcycle data bus is transferred directly. Each multiplexer unit of multiplexer 328*a* has an output line 352*a–d*, respectively, and carries the low pixel data bits PDB0, PDB2, PDB4 and PDB6, respectively.

The output line of each multiplexer unit is connected to the shifter for the low pixel data bits, indicated generally at 320*a* and the rotator for the low bits, indicated generally at 322*a* in FIG. 13. The shifter 320*a* comprises a programmed logic array (PLA) 321 having a plurality of input lines selectively coupled to a plurality of output lines 368*a–p* by a plurality of pull-down transistors 350. The output lines 352*a–d* of the multiplexer 328*a* are four of the PLA input lines.

Figure 21:
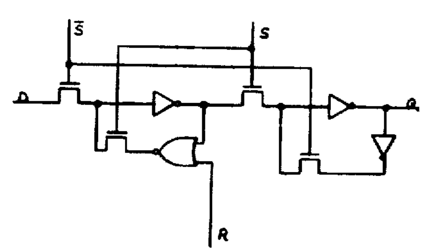

The shifter 320*a* further comprises a register 354*a* having 4 bits 354*a*0, 354*a*2, 354*a*4 and 354*a*6 which are connected to the inputs 356*a–d* of the PLA 321, respectively, (with bit 354*a*0 shown in greater detail in FIG. 21.) The register 354*a* stores the 4 low bits of the last pixel data byte from the CPU to be written to the display RAM which may be the previous byte of the sequence of bytes (such as those shown in FIG. 6) to be shifted. The register 354*a* is also clocked by the signal $\overline{\text{SHIFT}}$.

The NOR gate 344*a* (corresponding to bit 0 of the function generator register) of the latch 334 is connected by a line 358 to another input of the PLA 321. The line 358 is also connected to an input 359 by an inverter 360. NOR gate 344*b* (corresponding to bit 1 of the function generator register) of latch 334 is connected by a line 362 to an input of the PLA, with the line 362 also connected to an input 364 by an inverter 366. Bits 0 and 1 of the function generator register define the least and most significant bits of the shift amount performed by the shifter 320*a*. Each of the output lines 368*a–p* is connected to the voltage source VDD by one of a plurality of pull-up transistors 370.

The actual amount of the shift performed by the shifter 320*a* is the complement of the bits contained within bits 0 and 1 of the function generator register since the NOR gates 344*a* and *b* invert the outputs of bits 0 and 1 when the address bit A14 is low. Thus, if bits 0 and 1 have the value "11", this is complemented to the values "00" resulting in a shift of 0 pixel positions.

A shift of 1 position shown in FIG. 6 will be explained to illustrate the operation of the shifter 320*a*. If the bits 1 and 0 of the function generator register have the value "10", the complement of this is "01" indicating a shift of 1 pixel position. Thus, the line 358 will have the logic value of 1 with the line 362 at a logic value 0. The lines 359 and 364 will, of course, be a logical 0 and 1, respectively. As seen by the placement of the pull-down transistors 350, a logical 1 on the line 358 and the line 364 results in all the output lines being pulled down to logical 0 except output lines 368*c*, 368*g*, 368*k* and 368o since these lines do not have a pull-down transistor coupled to either the input line 358 or 364. The output line 386*c* does have a pull-down transistor 350*a* coupled to the input line 352*b* which carries pixel data bit PDB2 from the multiplexer 328*a*. Thus the logic state of the output line 368*c* is the complement of the logic state of the input line 352*b* (or PDB2) from the output of the multiplexer unit 328*a*2. The pixel data bit PDB0 output of the shifter corresponds to output lines 368*a–d* and the particular value of PDB0 depends upon which of the lines 368*a–d* are selected by the input lines 358 and 362. Here, output line 368*c* was selected, therefore the pixel data bit PDB0 output of the shifter is defined by the PDB2 output of the multiplexer (but complemented). Since PDB0 is the low bit of the two bits representing the first pixel of a byte of pixel data and PDB2 is the low bit of the two bits representing the second pixel, it is seen that the pixel data values outputted by the multiplexer have shifted one pixel position.

Output lines 368*e–h* of the shifter correspond to PDB2 with output lines 368*i–l* and 368*m–p* corresponding to PDB4 and PDB6 respectively. The output line 368*g* is coupled by a pull-down transistor 350*b* to the line 352*c* which carries the bit PDB4 from the multiplexer. Thus output line 368*g* (PDB2 of the shifter) has the complement of the logic state of PDB4 from the multiplexer. Output line 368*k* (PDB4) has the complement of the bit PDB6 from the multiplexer.

The output line 368*o* of the shifter corresponding to PDB6 is coupled by a pull-down transistor 350*d* to the output bit 354*a*0 of the register 354*a*. Register 354*a* stores the low pixel data bits of the previous pixel data byte from the CPU to be written to memory. Bit 354*a*0 contains the pixel data bit PDB0 of the previous byte. Thus the logic state of the output line 368*o* (PDB6) is the complement of the bit PDB0 of the previous byte to be written.

Thus, for example, if the output bits PDB6, PDB4, PDB2 and PDB0 of the multiplexer 328*a* are the low bits of the 8 bits representing the pixel values P7, P6, P5 and P4, respectively, of byte 1 of the sequence of bytes to be shifted shown in FIG. 6, and the output of the register 354*a*0 is the low bit of the 2 bits representing pixel vale P0 of the prior byte of the sequence, it is seen that the low pixel data bits PDB6, PDB4, PDB2 and PDB0 of byte 1 (together with the high pixel data bits PDB7, PDB5, PDB3 and PDB1) represent pixel data values P0, P7, P6 and P5, respectively, after a shift operation of 1 pixel position.

It is assumed that the first byte of pixel data of a sequence of bytes to be shifted is the first byte to be written to the display RAM after an output by the CPU to the function generator register. Accordingly, each bit of the register 354*a* has a reset input connected by a line 372 to the function generator register select line 218 such that the register 354*a* is reset to 0 with each output to the function generator register. Thus zeros are shifted into the first byte of a sequence as shown in FIG. 6. Each sequence is initialized by an output to the function generator register and therefore data should not be sent to the function generator register in the middle of the sequence.

The output pixel data of the shifter are in complemented from (whether shifted or not) and will be recomplemented by the flopper indicated generally at 324*a*. The NOR gate 344*g* has an input connected to the $\overline{\textbf{A14}}$ address bit and an input connected to bit 6 of the function generator register 274 which determines whether the flop function is performed when $\overline{\text{A14}}$ is low. The output of the NOR gate 344*g* is connected by a line 374 to the gates of four transistor switches 376*a–d*. The logic state of the input line 374 is inverted by an inverter 378 whose output is connected to the gates of transistor switches 380*a–d* of the flopper 324*a*. The output lines 368*a–p* of the shifter 320*a* are the input lines of the flopper 324*a*. The flopper 324*a* also comprises a programmed logic array having output lines 382*a–h* coupled to the input lines 368*a–p* by a plurality of pull-down transistors 384.

Figure 22:
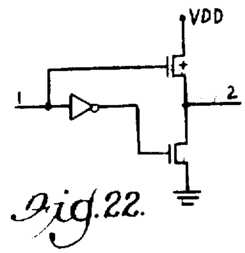
Figure 17:
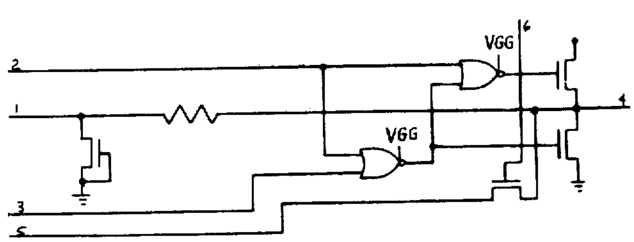
Figure 35:
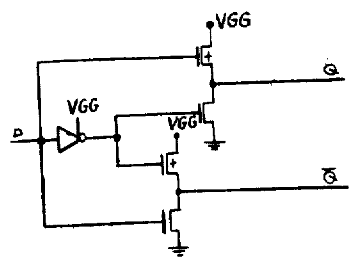

The output lines 382*a* and *b* are connected by the switches 376*a* and 380*a*, respectively, to a buffer 385 having an output line which is the flopper PDB0 output line 377*a*. (A typical buffer 385 logic circuit is shown in FIG. 22).Lines 382*c* and *d* are connected by switches 376*b* and 380*b*, respectively, to a buffer 385 having the flopper PDB2 output line 377*b*, with the lines 382*e* and *f* connected by switches 376*c* and 380*c*, respectively, to a buffer 385 having the flopper PDB4 output line 377*c*, and the output lines 302*g* and *h* connected by switches 376*d* and 380*d*, respectively, to a buffer 385 having the flopper PDB6 output line 377*d*. The input line 368*c*

(containing the complemented output pixel data bit PDB0 of the shifter when set for a shift of 1 pixel position) is coupled to the output line 382*b* by a pull-down transistor 384*a* and to the output line 382*g* by a pull-down transistor 384*b* wherein the logic state of the complemented shifter output bit PDB0 is recomplemented and carried uncomplemented on the flopper output lines 382*b* and 382*g*. A logical 1 state on the input line 374 turns on the transistor switch 376*d* whereby the shifter output bit PDB0 is conducted to the flopper PDB6 output line 377*d*. Thus, the PDB0 output of the shifter 320*a* is flopped to the flopper 324*a* output bit PDB6 when the input line 374 is a logical 1. On the other hand, if the logic state of line 374 is 0, the output of the inverter 378 is a logical 1 which turns on the transistor switch 380*a* which conducts the shifter PDB0 bit to the flopper PDB0 line 377*a* and is not flopped. Thus when the logic state of the input line 374 is 0, the output of the shifter is not flopped. The other inputs of the flopper 324*a* for the bits PDB2, PDB4 and PDB6 are handled in a similar manner.

As an example, if the byte of pixel data being written to the display RAM represents pixel values P7, P6, P5 and P4 as for the byte of original data of FIG. 6 and the shifter is set for zero shifts so that the shifter does not shift the data, then the PDB6, PDB4, PDB2 and PDB0 output bits of the shifter 320*a* are the low bits of the bits representing pixel values P7, P6, P5 and P4, respectively, (but complemented). When bit 6 of the function generator register is a logical 0, the logic states of the pixel data bits will be recomplemented and flopped so that the PDB6, PDB4, PDB2 and PDB0 output bits of the flopper 324*a* (together with the PDB7, PDB5, PDB3 and PDB1 output bits of the flopper 324*b*) represent the pixel data values P4, P5, P6 and P7 after the flop operation as shown in FIG. 6.

The rotation function is performed on the low pixel data bits by a rotator indicated generally at 322*a* and comprises a programmed logic array 386 having 4 input lines connected to the register 354 PDB0, PDB2, PDB4 and PDB6 output lines 356*a–d* and 12 input lines connected to the 12 outputs of four 3-bit shift registers 388–391. The input of the first bit 388*a* of the shift register 388 is connected to the PDB0 input line 356*a* with the inputs of the first bits 389*a*–391*a* of register 389–391 connected to the PDB2, PDB4 and PDB6 lines 356*b–d*, respectively. (A typical bit circuit 388*a* of the bits of the shift registers 388–391 is shown in greater detail in FIG. 23).

The rotator is used to rotate a four by four pixel image 90° in a clockwise direction. The four-by-four pixel image represented in FIG. 7A is shown with the individual pixel data bits PDB0–PDB7 of each of the four data bytes labeled. The rotator is initialized by an output to the function generator register and will reinitialize itself after every 8 writes to the display RAM. To perform a rotation, the following procedure is performed. The top byte or byte 0 of the unrotated image is written to a location in the display RAM. The next byte, byte 1 is written to the first location plus 40, byte 2 to the first location plus 80, and the last byte, byte 3 to the first location plus 120. These four locations correspond to 16 contiguous pixels since 40 bytes represent one line of pixels on the display screen. The process is then repeated with byte 0 rewritten to the first location, byte 1 to the first location plus 40, byte 2 to the first location plus 80 and byte 3 to the first location plus 120. After these 8 writes, the data will appear in the display RAM and (subsequently) the image on the screen rotated 90° from the original as shown in FIG. 7B.

The low 4-bit rotator 322*a* further comprises a 3-bit counter 394 for counting the 8 writes completed in a rotate sequence. (The logic circuitry of the bits 0–3 is shown in greater detail in FIG. 24 with bit 3 excluding that portion shown in phantom.) The counter 394 has a "clear" input, 2, connected to the function generator register select line 218 so that the counter is initialized to 0 with each output to the function generator register 274. A NOR gate 400 having a "$\overline{\text{DATEN}}$" control signal input and an address bit $\overline{\text{A14}}$ input is connected by series connected inverters 396 and 398 to the toggle input of the counter 394. The $\overline{\text{DATEN}}$ control signal is generated by a memory control circuit (FIG. 11F) of the data chip and is activated during memory write cycles. The NOR gate 400 has the input connected to the address bit $\overline{\text{A14}}$ so that the counter is toggled only during memory write cycles in which the data written is to be modified by the function generator.

The output of the third bit (bit 2) of the counter 394 is connected to the input of a NOR gate 402 which also has an input connected to the output of the inverter 396. The output signal of the NOR gate 402, $\overline{\text{SHIFT}}$ is connected to the shift inputs of the shift registers 388–391 and clock inputs of register 354 (as well as flip-flop 280 of the expander). During the first four memory writes of a rotate sequence, the third bit of the counter 394 is 0 (since the counter counts from 000 to 011) therefore, the NOR gate 402 performs as an inverter wherein the $\overline{\text{DATEN}}$ signal from the inverter 396 generates a shift signal at the output of the NOR gate 402 with each of the first four writes to the display RAM of a rotate sequence. With the next or fifth write, however, the third bit of the counter 394 goes to a logical 1 which drives the output of the inverter 402 low for the last four memory writes of a rotate sequence. The $\overline{\text{SHIFT}}$ clock signal is activated with each write to the display RAM (except for the last four writes of a rotate operation) whether or not the rotate function is utilized in a write of data to the display RAM. Thus the $\overline{\text{SHIFT}}$ signal is also used to clock the Expand flip-flop 280 so that the flip-flop 280 toggles with each write opertion to the display RAM.

Each low bit of the first three bytes of a rotate sequence are shifted into the shift registers 388–391 of the low bit rotator 322*a*. Shift register 388 stores the pixel data bit PDB0 of pixels P0, P4 and P8 of the first three bytes, respectively, of the rotate sequence of FIG. 7A. Similarly, shift register 389 contains the low pixel data bit PDB2 of pixels P1, P5 and P9 after the first four memory writes of the rotate operation. The particular pixel data bits for each of the registers 388–391 are shown in FIG. 40.

The programmed logic array 386 of the rotator 322*a* further has inputs 404*a*–404*c* connected to the outputs of bits 388*a*–388*c*, respectively, of the shift register 388. The output of bits 389*a–c* of the shift register 389 are connected to the input lines 406*a–c* with the output of bits 390*a–c* and 391*a–c* of the shift registers 390 and 391 connected to the input lines 408*a–c* and 410*a–c*, respectively. The input lines 356*a–d* from the register 354 are coupled to output lines 412*a–d*, respectively, by four pull-down transistors 414. The output lines 412*a–d* are connected by four transistor switches 416*a–d* to the voltage source VDD by a pull-up transistor 418 and also to a common output line 420 which carries the pixel data bit PDB6 output of the rotator in complemented form.

The input lines 404*a*, 406*a*, 408*a* and 410*a* (from the LSB of the shift registers 388–391) are coupled to output lines 422*a–d*, respectively, by four pull-down transistors 424. The output lines 422*a–d* are connected by four transistors switches 426*a–d*, respectively, to a common output line 428 and to voltage source VDD by a pull-up transistor 430. The output line 428 carries the pixel data bit PDB4 output of the rotator in complemented form. The input lines 404*b*, 406*b*, 408*b* and 410*b* and input lines 404*c*, 406*c*, 408*c* and 410*c* are coupled to output lines 432*a–d* and output lines 434*a–d*, respectively, by pull-down transistors 436 and 438 respectively.

The output lines 432*a–d* are connected by four transistor switches 440*a–d* to a common output line 422 (for pixel data output bit PDB2) and to the voltage VDD by a pull-up transistor 444. The output lines 434*a–d* are connected by four transistor switches 446*a–d* to a common output line 448 (for pixel data output bit PDB0) and to voltage source VDD by a pull-up transistor 450.

The rotator 322*a* has a second programmed logic array 452 having four output lines 454–457 which controls the transistor switches 416, 426, 440 and 446. The output line 457 is connected to the gates of the transistor switches 416*a*, 426*a*, 440*a* and 446*a* with the output line 456 connected to the gates of the transistor switches 416*b*, 426*b*, 440*b* and 446*b*, etc.

The program logic array 452 has an input line 460 connected to the output $\overline{Q}$ of the third bit of the counter 394. The input line 460 is coupled to each of the output lines 454–457 by four pull-down transistors 462. Thus, when the third bit of the counter 394 is a logical 0 (i.e., during the first four writes to the display RAM of the rotate sequence) the output $\overline{Q}$ of the third bit is a logical 1 which pulls down the four output lines 454–457 of the PLA 452 which turns off the transistor switches 416*a–d*, 422*a–d*, etc. These switches are turned off since during the first four writes, the four shift registers 388–391 are being loaded with the proper pixel data bits of the first four writes. The PLA 452 has an input line 463 connected by an inverter 464 to the output of the NOR gate 344*c* of the latch 344. The input line 463 is coupled to the output lines 454–457 by four pull-down transistors 466, respectively. If bit 3 of the function generator register 274 is a logical 1, the logic state at the input line 463 will also be a logical 1 which pulls down the output lines 454–457 to a logical 0 turning off the transistor switches 416*a–d*, 426*a–d*, etc. of the programmed logic array 386. The rotate function may be bypassed in this manner.

The PLA 452 has inputs 468 and 470 connected to the Q outputs first and second bits, respectively, of the three-bit counter 394. The input line 468 is connected to a second input line 469 by an inverter 472. The input line 470 is connected to still another input line 471 by an inverter 474. The input lines 468–471 are coupled to the output lines 454–457 by a plurality of pull-down transistors 476 such that as the counter 394 counts from 4 (100 Binary or B) to 7 (111 B) the output lines 454–457 are successively activated. Thus, when bits 1 and 2 of counter 394 are both 0, the output line 454 is enabled and with bits 1 and 0 equal to 01, respectively, output line 455 is enabled, etc.

As noted before, during the first writes of the rotate sequence, the shift registers 388–391 are loaded with their respective bits of the first three bytes of the rotate sequence of data with the last byte being stored in register 384. This corresponds to counts 0–3 of the counter 394. For counts 4–7 data is no longer shifted into the registers while the CPU re-transmits the four pixel data bytes of the sequence to be rotated. At count (100 B) in which byte 0 is transmitted, the output line 454 is enabled which turns on the transistor switches 416*d*, 426*d*, 440*d* and 446*d*.

Since output line 412*d* is coupled to input line 456*d* from register 384, pixel data bit PDB6 of the previous (and last) data byte of the sequence (i.e., byte 3), appears on the output line 420 (PDB6) of the rotator in complemented form. The pixel data bit PDB6 of byte 3 of the sequence is the lower bit of the pixel value represented by P15. The lower pixel data bit representing the pixel data value P11 stored in the 391*a* bit of the shift register 391 connected by the input line 410*a* is complemented by a pull-down transistor 424 and conducted by the transistor switch 426*d* to the PDB4 output line 428 of the rotator 322*a*. In a similar manner, the low pixel data bits representing pixel data values P7 and P3 stored in the shift register 391 appear on the rotator 322*a* pixel data outputs PDB2 and PDB0, respectively, since the transistor switches 440*d* and 446*d*, respectively, are turned on. Thus, although the CPU transmits byte 0 at count 100 B, the byte representing pixel data values P15, P11, P7 and P3 is actually written to the display RAM at the first location as shown in FIG. 7B.

On the next write to the display RAM, the count of the counter 394 changes to 101 B wherein the PLA 452 in turn causes the transistor switches 416*b*, 426*b*, 440*b* and 446*b* to turn on. The low pixel data bit representing pixel data value P14 carried by input line 356*c* from the register 354 appears in complemented form on the rotator 322*a* output PDB6 line 420. Also, the low pixel data bits representing pixel data values P10, P6 and P2 stored in the register 390 appear in complemented form on the rotator 322*a* PDB4, PDB2 and PDB0 output lines 428, 442 and 448, respectively, and are stored in the first memory location plus 40, as indicated in FIG. 7B. After the last two writes, the low pixel data bits (as well as the high pixel data bits from the rotator 322*d*) representing the pixel data values will appear in the display RAM as shown in FIG. 7B. The flopper 324*a* recomplements the pixel data bits from the rotator 322*a* so that the pixel data bits are stored in uncomplemented form in the display RAM.

Thus, the pixel data that will be written to the display RAM is transmitted by the CPU in the first four "writes" to the display RAM of the four bytes of the rotate sequence and is latched up in the registers 388–391 and 354. The rotate sequence is then re-transmitted (but any data could actually be sent) to the same four addresses of the display RAM with the pixel data latched up in the registers 354 and 388–391 actually being written to those four display RAM addresses represented in FIG. 7B. The rotator, shifter and flopper circuits for the high pixel data bits (PDB7, PDB5, PDB3 and PDB1) are indicated generally at 322*b*, 320*b* and 324*b*, respectively, in FIG. 13. The modifications to the high pixel data bits PDB7, PDB5, PDB3 and PDB1 are performed by the rotator 322*b*, the shifter 320*b* and the flopper 324*b* simultaneously with the modifications performed on the low pixel data bits. Each pixel data value, represented by a high and a low pixel data bit, can be shifted, flopped, or rotated as shown in FIGS. 6 and 7*a* and *b*.

The OR and exclusive-OR functions are performed by an OR/exclusive-OR circuit 480 shown in FIG. 11C to have a four bit input line 482*a* connected to the output of the low pixel data bit flopper 324*a* and a four bit input line 482*b* connected to the output of the high pixel data bit flopper 324*b*. The OR/exclusive-OR circuit 480 has two further inputs connected by a two-bit input line 484 to the latch 334 which latches the complement of bits 4 and 5 of the function generator register 274 when the address bit $\overline{A14}$ is low. These bits determine whether or not the OR or exclusive-OR functions, respectively, are performed.

These functions can be thought of as operating on a byte of pixel data as 8 bits rather than as 4 pixels. When the OR function is used in writing data to the display RAM, the input to the OR/exclusive-OR circuit is ORed with the contents of the display RAM location being accessed by the addressed chip. Accordingly, the OR/exclusive-OR circuit 480 has 8 inputs connected by an 8-bit input line 486 to a tri-state buffer 488 which is connected to an 8-bit memory data bus 490 from the display RAM which carries the memory data bits MD0-MD7.

Pixel data that was stored in the display RAM which is to be used in an OR or exclusive-OR operation, is latched up in the OR/exclusive-OR circuit 480. The OR/exclusive-OR circuit 480 has an 8-bit output line 492 connected to the tri-state buffer 488 on which the resultant pixel data is carried to be stored at the display RAM location from which the pixel data was accessed.

The OR/exclusive-OR circuit 480 is shown in greater detail in FIG. 13 and comprises 8 units 480*a–h*. Each OR/exclusive-OR unit can perform an OR or exclusive-OR (as determined by bits 4 and 5 of the function generator register 274) on a pixel data bit from the flopper and from the display RAM and can store the resultant pixel data bit in the display RAM.

Figure 25:
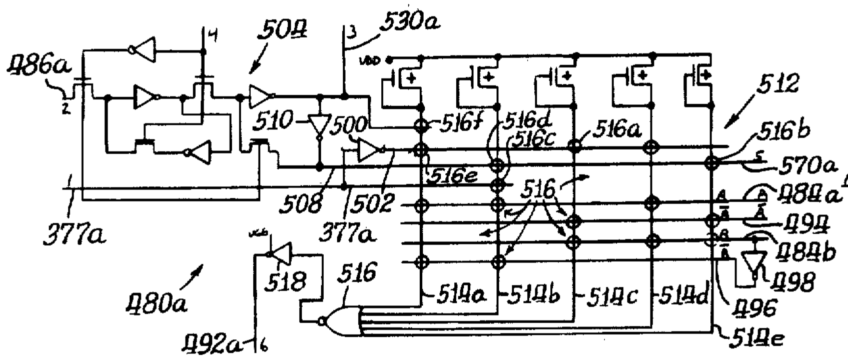

A typical unit 480*a* is shown in greater detail in FIG. 25. The unit 480*a* has an input connected to the output line 377*a* (which is one of the input lines 482*a* in FIG. 11C) which carries the pixel data bit PDB0 output of the flopper 324*a* and an input 486*a* which carries the pixel data bit PDB0 from the display RAM. The unit has an input 484*a* connected to the output of the NOR gate 344*e* of the latch 334 associated with bit 4 of the function generator register 274. Bit 4 determines whether or not the OR function is performed. The input line 484*a* is also connected to an inverter (not shown) having an output connected to an input 494. The unit has an input 484*b* connected to the output of the NOR gate 344*f* associated with bit 5 of the expand register which controls whether or not the exclusive-OR function is performed. The input line 384*b* is also connected to an input line 496 by an inverter 498.

The input line 377*a* (the PDB0 bit from the flopper) is connected by an inverter 500 which is connected to a line 502. The input line 486*a* (for the PDB0 bit from the display RAM) is connected to a latch indicated generally at 504 which latches up the pixel data bit from the display RAM until the pixel data bit from the flopper arrives for the OR or exclusive-OR function. The latch 504 has an output line 506 which is connected to a line 508 by an inverter 510.

The unit 480*a* further comprises a programmed logic array indicated generally at 512 which performs either the OR function or exclusive-OR function (or neither) as determined by bits 4 and 5 of the function generator register. The PLA 512 has output lines 514*a–e* selectively coupled by a plurality of pull-down transistors 516 to the lines 500, 502, 508, 377*a*, 494*a*, 494, 484*b*, and 496. The lines 514*a–e* are connected to a NOR gate 516 having an output connected to an inverter 518 which has an output 492*a* (of lines 492 FIG. 11C).

To illustrate the operation of the unit 480*a*, it will be assumed that bits 4 and 5 of the function generator register have the values 0 and 1, respectively, which indicates an OR function is to be performed. When bit 4 is a logical 0, line 484*a* is a logical 1 which pulls-down the lines 514*a*, 514*b* and 514*d* to a logical 0. The PDB0 bit from the flopper carried on the line 377*a* is inverted by the inverter 500 and recomplemented by the pull-down transistor 516*a* so that line 514*c* carries the PDB0 bit from the flopper in the uncomplemented form. The PDB0 bit from the display RAM is complemented by the inverter 510 and recomplemented by the pull-down transistor 516*b* so that the line 514*e* carries the PDB0 bit from the display RAM in the uncomplemented form. Thus, if either the line 514*c* or line 514*e* is a logical 1, the output of the NOR gate 516 will be a logical 0 which is inverted by the inverter 518 to a logical 1 on line 492*a*. However, if both the lines 514*c* and *e* are logical 0, the output of the NOR gate 516 is a logical 1 and the output of the inverter 518 is a logical 0. Thus, the logical OR function is performed on the PDB0 bits from the display RAM and from the CPU transmitted through the flopper.

To perform an exclusive-OR function, bits 4 and 5 of the function generator register are set to 1 and 0, respectively. The input line 494 then is a logical 1 which pulls the lines 514*c* and 514*e* to a logical 0. Also, the line 484*b* is a logical 1 which pulls the line 514*d* in addition to a logical 0. The line 377*a* which carries the PDB0 bit from the CPU (transmitted through the flopper 324*a*) is coupled to the line 514*b* by a pull-down transistor 516*c*. The line 508 which carries the complemented PDB0 bit from the display RAM is coupled to the line 514*b* by a pull-down transistor 516*d*. Thus, if the PDB0 bit from the CPU is a logical 0 and the complemented PDB0 bit from the display RAM is a logical 0 (i.e., the PDB0 bit from the display RAM is a logical 1) the logic state of the line 514*b* will be a logical 1 resulting in the output of the NOR gate 516 being a logical 0 and the output line 492*a* of the OR/exclusive-OR unit 480*a* being a logical 1. Otherwise, the logic state of the 514*b* line is a logical 0 and the logic state of the output line 492*a* depends upon the logic state of the line 514*a*.

The line 502 which carries the complemented PDB0 bit from the CPU is coupled to the line 514*a* by a pull-down transistor 516*e*. The line 506 which carries the PDB0 bit from the display RAM is coupled to the line 514*a* by a pull-down transistor 516*f*. Thus, if the complemented PDB0 bit from the CPU is a logical 0 (i.e., the PDB0 bit from the CPU is a logical 1) and the PDB0 bit from the display RAM is a logical 0, the logic state of the line 514*a* will be a logical 1 causing the output of the NOR gate 516 to be a logical 0 and the output of the OR/exclusive-OR unit 480*a* at the output line 492*a* to be a logical 1.

If both the PDB0 bit from the display RAM and from the CPU are both 0 or alternatively are both 1, the logic state of both lines 514*a* and *b* will be a logical 0 causing the output of the NOR gate 516 to be a logical 1 and the output line 492*a* of the OR/exclusive-OR unit 480*a* to be a logical 0. Thus, the exclusive-OR function may be performed on the PDB0 bits from the display RAM and the CPU.

In a similar manner, a logical OR or exclusive-OR function can be performed on the PDB1-PDB7 bits from the CPU and the display RAM by the units 480*b–h* shown in FIG. 13. The output line 492 of each OR/exclusive-OR unit 480*a–h* is connected to the tri-state buffer indicated generally at 488 which is in turn connected to the memory data bus 490. The tri-state buffer 488 has 8 units 488*a–h*.

Figure 26:
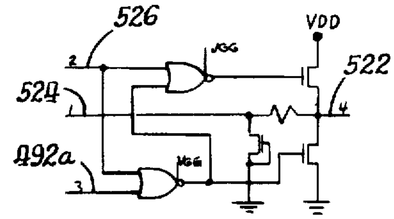
Figure 37:
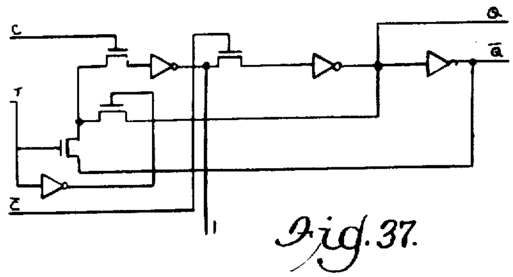

A typical tri-state buffer unit 488*a* is shown in greater detail in FIG. 26. The unit 488*a* has an input/output line 522 connected to the MD0 bit of the memory data bus 490. The tri-state buffer unit 488*a* also has an output line 524, and an input line 526 connected to the $\overline{\text{DATEN}}$ control signal. When the $\overline{\text{DATEN}}$ control signal is low, the logic state of the output line 522 is the same as the data bit carried on the input line 492*a* from the OR/exclusive-OR unit 480*a*. In this manner, the pixel data outputted from the OR/exclusive-OR unit may be transmitted to the display RAM at an address supplied through the address chip.

The CPU may read an intercept register 528 (FIG. 11C) having address 8H to determine if an intercept occurred during a write to the display RAM in which the OR or exclusive-OR function is utilized. An "intercept" is defined as the writing of a non-zero pixel data value at a location in the display RAM that previously contained a non-zero pixel data value. The intercept register 528 has an input connected to the 4-bit output line 482*b* of the flopper 324*b* and an input connected to the 4 bit output line 482*a* of the flopper 324*a* by which the pixel data bits from the CPU may be inputted. The intercept register 528 also has an 8-bit input line 530 connected to the OR/exclusive-OR circuit 480 by an 8-bit line 530. The output of the intercept register 528 is connected by an 8-bit output line 532 to the input of a 2-to-1 multiplexer 534.

The intercept register 528, shown in greater detail in FIG. 13, comprises 8 units 528*a–h*. A 1 in a particular intercept register unit means that an intercept has occurred. Since a pixel is represented by 2 bits of data, a byte of pixel data represents 4 pixels and thus has 4 pixel positions. Intercept register units 528*a–d* indicate whether an intercept has occurred in any of the 4 pixel positions in the last write to the display RAM in which the OR or exclusive-OR functions were utilized. The unit 528*a* indicates whether an intercept has occurred in the first pixel position with the unit 528*b* indicating whether an intercept has occurred in a second pixel position, etc.

Figure 27:
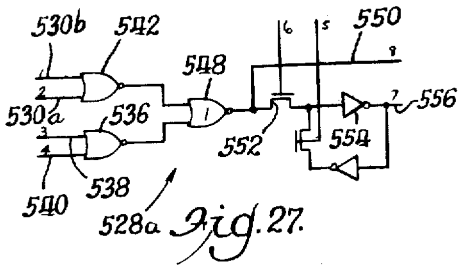
Figure 18:
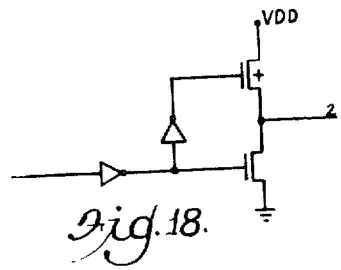

The unit 528*a*, typical of the units 528*a–d*, is shown in greater detail in FIG. 27. The unit 528*a* comprises a NOR gate 536 having an input 538 (connected to one of the lines 482*a*, FIG. 11C) for the PDB0 pixel data bit and an input 540 (connected to one of the lines 482*b*, FIG. 11C) for the PDB1 pixel data bit from the CPU. PDB0 and PDB1 represent a pixel that is being ORed or exclusive-ORed with pixel data contained in the display RAM. The unit 528*a* further comprises a NOR gate 542 having an input 530*a* for the PDB0 bit from the display RAM latched up in the unit 480*a* of the OR/exclusive-OR circuit 480 and an input 530*b* for the PDB1 pixel data bit from the display RAM latched in the unit 480*b* of the OR/exclusive-OR circuit.

The output of the NOR gate 536 and the NOR gate 542 are connected to NOR gate 548 having an output line 550. Line 550 is connected by a transistor switch 552 to an inverter 554 having an output line 556.

If the pixel transmitted from the CPU via the flopper 524*a* and *b* and represented by pixel data bits PDB0 and PDB1 is a non-zero pixel, that is, the logic state of the lines 538 or 540 is a logical 1, then the output of the NOR gate 536 is a logical 0. Similarly, if the pixel from the display memory latched up in the OR/exclusive-OR unit is a non-zero pixel, the output of the NOR gate 542 is a logical 0. If the output of both NOR gates 536 and 542 is a logical 0 (i.e., an intercept has occurred in the OR or exclusive-OR operation) the output of the NOR gate 538 is a logical 1 at the line 550. The other intercept register units 528*b–d* operate in a similar manner to indicate whether an intercept has occurred in the other 3 pixel positions.

The intercept register units 528*e–h* give the intercept information for all OR and exclusive-OR writes since the last read or input from the intercept register 528 by the CPU. An input from the intercept register resets the outputs of these units. Thus, each of the 4 intercept register units 528*e–h* is set to 1 if an intercept occurs in the corresponding pixel position and will not be reset until the next intercept register input.

Figure 28:
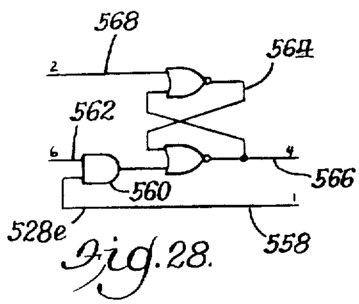
Figure 23:
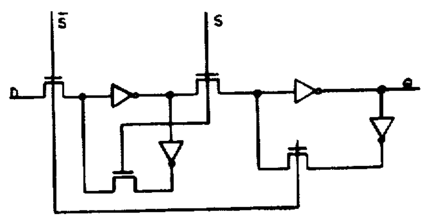
Figure 38:
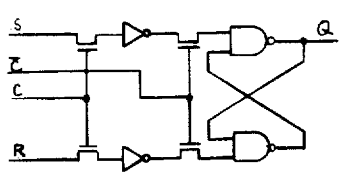

The unit 528*e*, typical of the units 528*e–h*, is shown in FIG. 28 to have an input 558 which is connected to the output 550 of the unit 528*a*. The input 558 is connected to the input of an AND gate 560 which has another input 562 for a clock signal. The output of the AND gate 560 is connected to the input "S" of an SR flip-flop indicated generally at 564 and having an output line 566 (which is one of the lines 532 of FIG. 11C). The SR flip-flop 564 has a reset input "R" line 568 connected to input 2.

If an intercept occurs in the first pixel position, the input line 558 will assume a logical 1 state since it is connected to the output of the intercept register unit 528*a*. When the clock signal on line 562 is a logical 1 the flip-flop 564 will be set. The flip-flop will remain set even though subsequent OR or exclusive-OR operations do not result in an intercept in the first pixel position. The unit 528*e* will remain set until the flip-flop is reset when the data is input from the intercept register 528. The intercept register select line 222 is connected to a delay indicated at 569 (FIG. 13) whose output is connected to the reset input '2' of each unit 528*e–h*.

Referring back to FIG. 11C, the output of the intercept register 528 is connected by the 8-bit output line 532 to the multiplexer 534. The 8-bit line 532 comprises the output lines 556 from the intercept register units 528*a–d* and the output lines 566 from the intercept register units 528*e–h* (FIG. 13). The multiplexer 534 has a select input connected to the select line 222 from the address decoder 214 (FIG. 11B) so that when the line 222 is enabled (corresponding to address 8H) the input lines from the intercept register 528 are selected. The multiplexer further has inputs connected to outputs of the OR/exclusive-OR circuit 480 by an 8 bit line 570. The OR/exclusive-OR circuit latches up data as it is read from the display RAM which may be data other than pixel data for OR or exclusive-OR operations such as instructions to be executed from the display RAM which are to be transmitted to the CPU.

The output of the multiplexer 534 is connected to the tri-state buffer 273. [As seen in FIG. 25, the line 570*a* of the input line 570 (FIG. 11C) is connected to the line 506 of each unit of the OR/exclusive-OR unit by the inverter 510].

The multiplexer 534 is shown to comprise 8 units 534*a–h* in FIG. 13. Each unit selects either a bit of data from the intercept register 528 or a bit of data from the display RAM latched up in the OR/exclusive-OR circuit 480 depending upon the logic state of input select signals.

Figure 29:
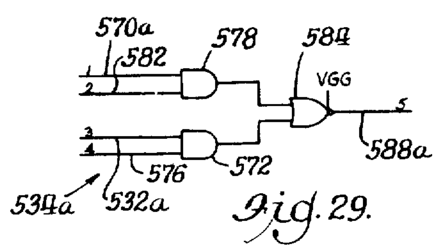

A typical multiplexer unit 534*a* is shown in FIG. 29 to comprise an AND gate 572 having an input 532*a* (one of the 8 bit input lines indicated as 532 in FIG. 11C) connected to the complemented output of the intercept register unit 528*a* at line 556 (FIG. 27) and a select input 576 connected to the intercept registers select line 222. An AND gate 578 has an input 570*a* (which is one of the input lines indicated as 570 in FIG. 11C) connecting the complemented latch output of exclusive-OR unit 480*h* and a select input 582. The outputs of the AND gate 572 and 578 are connected to a NOR gate 584 having an output line 588*a* which is the output line of the unit 534*a* (and is one of the 8 lines indicated at 588 in FIG. 11C connecting the multiplexer 534 to the tri-state buffer 273).

If the select signal line 582 is a logical 0, then the output of the AND gate 578 is a logical 0. And, if the intercept register select line 222 is a logical 1, then the input line 576 is also a logical 1 and the output of the AND gate 572 will be the same as the logic state of the input line 532*a* carrying the complemented data bit from the intercept register. The NOR gate 584 will then recomplement the data. Since the data from the intercept register is in complemented form, the data appearing on the output line 588 will be uncomplemented. Conversely, if the intercept register select line 221 is a logical 0 and the select input 582 is a logical 1, then the complemented data from the display RAM latched up in the OR/exclusive-OR circuit 480 will appear in uncomplemented form on the output line 588. The data on the output line 588 will be transmitted to the CPU via the microcycle data bus 66.

The select line 582 is shown in FIG. 13 to be connected to a line 583 which carries the select signal MENB1 which generated by the logic elements indicated generally at 585. The inputs to the elements 585 include the CPU control signal $\overline{\mathbf{M1}}$.

The Z-80 CPU requires instruction data to arrive in an $\overline{\mathbf{M1}}$ cycle (instruction fetch) at a different time than data during non-$\overline{\mathbf{M1}}$ cycles. The data latched up in the OR/exclusive-OR circuit may be instructions that were stored in a scratchpad portion of the display RAM. The elements 585 which generate MENB1 which loads the instruction onto the microcycle data bus 66 (via the output lines 588 and tri-state buffer 273), insert a delay so that the instructions arrive at the CPU at the proper time.

It should be noted that non-$\overline{\mathbf{M1}}$ cycle data from the RAM may be transferred directly from the memory data bus 490 to the microcycle data bus 66 via tri-state buffer 273 on the clock signal $\overline{\mathrm{ZIP}}$. $\overline{\mathrm{ZIP}}$ is a function (as is MENB1) of the CPU control signals $\overline{\mathrm{MREQ}}$, $\overline{\mathrm{RD}}$ and some address bits (so that it can be determined that RAM is being accessed) and is generated by the logic elements indicated generally at 589 and 591 which include a latch 593 (FIG. 13 with each bit of the latch logically similar to that shown in FIG. 15) for the address bits.

Briefly summarizing the operation of the function generator of the data chip, the CPU can update the pixel data stored in the display RAM by transferring pixel data from the ROMs to the display RAM at addresses sent to the display RAM via the address chip. However, numerous modifications to this pixel data can be performed by the function generator before the pixel data is stored in the display RAM. Thus, depending upon the data sent to the function generator registor 274, the pixel data may be expanded, shifted or rotated, flopped, and exclusive-ORed or ORed with the data already stored in the memory location being addressed.

Referring back briefly to FIG. 2, the display RAM 42 has stored therewithin, pixel data representative of the pixels of a picture displayed on the screen of the TV 28. Each pixel is represented by two bits of data which select a color register which defines the color and intensity of the associated pixel. An additinal function of the video processor 52 is to sequentially read the pixel data stored in the display RAM 42, decode the pixel data into color and intensity data signals, convert these signals to analog signals, and supply the signals to the RF modulator 58 which converts the signals to a form suitable for the TV set 28. The address chip 56 sequentially reads the pixel data from the display RAM 42 synchronously with the raster scan of the TV 28 which will be more fully described later.

Each byte of pixel data read is conducted on the memory data bus 490 (FIG. 11C) to the tri-state buffer 488. The 8-bit output line 486 of the buffer 488 is connected to an 8-bit line 590 which divides into two 4-bit lines 592*a* and 592*b*. The line 592*a* is connected to a 4-bit shift register 594 with the line 592*b* connected to a 4-bit shift register 595. The shift register 594 stores the low pixel data bits PDB0, PDB2, PDB4 and PDB6 and shift register 595 stores the high pixel data bits PDB1, PDB3, PDB5 and PDB7, of the 4 pixels represented by a byte of pixel data read from the display RAM. The output of the shift registers 594 and 595 are connected by lines 596*a* and 596*b*, respectively, to the inputs of a multiplexer 598.

The multiplexer 598 has inputs "SERIAL 1" and "SERIAL 0" and two inputs from a background color register 600. The multiplexer 598 has 2 select inputs 602 and 604 to output 2 pixel data bits from either the shift registers 594 and 595 or the SERIAL 0 and SERIAL 1 inputs, or the background color register 600. The multiplexer 598 will operate to select pixel data bits from the background color register 600 when the pixels to be displayed on the display screen are located in the background area indicated at 608 (FIG. 5) of the display screen. The multiplexer 598 will select the pixel data bits from the shift register 594 and 595 (low resolution mode) when the pixels being displayed are located in the area indicated at 610 of the display screen (FIG. 5). Pixel data bits SERIAL 1 and SERIAL 0 will be selected for the area 610 when the video processor is operated in the high resolution mode.

The inter-connection of the shift registers 594 and 595 within the data chip is shown in FIG. 13. Each bit of the shift registers 594*a*–*d* and 595*a*–*d* has an input P connected to the tri-state buffer 488 by a buffer indicated at 611. (The buffers 611 are logically similar to that shown in FIG. 18). Also each bit has clock inputs C and C, a load input L, and an input D from the previous register bit (except bits 594*a* and 595*a* which have their D input grounded) and an output Q to the succeeding register bit. The shift register 594 latches up the low pixel data bits of the 4 pixels represented by a byte of pixel data read from the display RAM and the shift register 594*b* latches up the high pixel data bits. Thus, register bits 594*a*–*d* latch up pixel data bits PDB0, PDB2, PDB4 and PDB6.

The output of the register bit 594*d* is connected by the line 596*a* to the multiplexer 598. The data stored in the shirt register 594 is shifted one bit position upon the activation of the clock signals such that pixel data bit PDB0 is shifted to the register bit 594*b*, pixel data bit PDB2 is shifted to the register bit 594*c*, pixel data bit PDB4 is shifted to the register bit 594*d* and PDB6 is shifted to the multiplexer 598. The high pixel data bits are loaded and shifted in the shift register 595 at the same time as the low pixel data bits in a similar manner. (A typical shift register bit is shown in greater detail in FIG. 30).

The clock signals for the clock inputs C and $\overline{C}$ of the shift registers are PXCLK and $\overline{PXCLK}$ which are the outputs of the buffer shown at 621 in FIG. 13. The input signal of the buffer 621 is a clock signal PX which is generated by the clock generator in FIG. 11D. PX occurs synchronously with the display of the pixels on the display screen. The generation of the clock signal PX will be described more fully later.

The load signal for loading pixel data into the shift registers 594 and 595 occurs once every four PX pulses since a byte of data from the display RAM represents four pixels. The generation of the load signal will also be more fully described later.

The multiplexer 598 is shown in FIG. 13 to have the input lines 596*a* and *b* from the shift registers 594 and 595, the input lines 608 and 610 for the SERIAL 0 and SERIAL 1 pixel data bits and the input lines 612 and 614 from the background color register 600 selectively coupled by pull-down transistors 616 to transistor switches 618. The output of the transistor switches 618 are selectively coupled to the output lines 620 and 622 by the two buffers 385. (A typical buffer 385 is shown in FIG. 22.) The output lines 620 and 622 carry the pixel data bits "Z" and "Y", respectively, which (together with the left/right bit) select a color register. The gates of the transistor switches 618 are selectively coupled to the outputs of a plurality of logic gates 623. The inputs of the logic elements 623 are selectively coupled to the input line 604 so that when the logic state of the line 604 is a logical 0, the pixel data bits from the background color register are conducted to the output lines 620 and 622. The logic elements 623 are also selectively coupled to the input line 602 from the low/high resolution mode flip-flop 606 (FIG. 13) such that when the logic state of the line 602 is a logical 0 (and the logic state of the input line 604 is a logical 1) the pixel data bits on the input lines 596*a* and *b* from the shift registers are conducted to the output lines 620 and 622. Otherwise, the pixel data bits SERIAL 0 and SERIAL 1 are conducted to the output lines 620 and 622 when the logic state of the input line 602 is a logical 1.

Referring back to FIG. 11C, the background color register 600 is a 2 bit register having inputs connected to the data bus 66*a* by a 2-bit line 624. The 2 bits stored therewithin (together with the left/right bit) identify one of the 8 color registers which determines the color and intensity of the background area indicated as area 608 in FIG. 5. The background color register 600 has the address 9H which activates the register select line 220 by which these 2 bits may be changed. (The circuitry of the storage unit for each bit of the background color registers is logically similar to that shown for the latch in FIG. 15).

In order to determine when the multiplexer 604 should select the pixel data bits from the background color registers 600, the data chip further comprises a vertical position counter 626 and a horizontal position counter 628 shown in FIG. 11B. The vertical position counter 626 counts the number of lines of pixels as they are displayed in a raster scan. A "HORIZONTAL DRIVE" signal occurs with each line of pixels displayed. A "VERTICAL DRIVE" signal occurs once every field. Both the HORIZONTAL DRIVE and VERTICAL DRIVE signals are generated in another portion of the data chip circuitry to be discussed later. The vertical position counter 626 has inputs for the HORIZONTAL DRIVE and VERTICAL DRIVE signals and counts each HORIZONTAL DRIVE signal (corresponding to a line of pixels displayed) and resets with each VERTICAL DRIVE signal. There is further provided a vertical "blank" register 630 having an 8-bit input line 632 connected to the data bus 66*a*. The vertical blank register 630 has address AH and contains the line number at which the background color (indicated by the background color register 600) will be displayed to the bottom of the screen. Through inputting this vertical line number to the vertical blank register 630, the bottom border line 634 (FIG. 5) may be set.

The vertical position counter 626 continues counting even after the raster scan has reset to the top of the screen. Hence the pixels at the top of the screen will continue to be defined by the background register. When the counter 626 reaches 162, it will reset which causes the next line of pixels to be defined by the display RAM and defines the top border of the background area.

The vertical blank register 630 further allows display RAM that would normally be utilized to store pixel data for the area 610 to be used for scratch pad memory. Thus, if the vertical blank register is set to 0, the entire display RAM can be used for scratch pad. In the low resolution embodiment, the register should be set to 101 or less in bits 1–7; in the high resolution system it should be set to 203 or less in bits 0–7.

The line number contained within the vertical blank register 630 is compared to the current line number indicated by the vertical position counter 626 by a "less-than-compare" 634 having inputs connected by lines 636 to the output and complemented output of each bit of the vertical blank register 630 and also has inputs connected to the output and complement of the output of each bit of the vertical position counter 626 by the lines 638. The output of the less-than-compare 634 goes to a logical 0 when the vertical position counter 626 reaches the number contained within the vertical blank register 630. The output of the less-than-compare is connected by a line 640 to a decoder 642. The decoder 642 further has inputs selectively coupled by a line 644 to the output and complemented output of the bits of the horizontal position counter 628.

The horizontal position counter 628 counts the pixel positions of a line as the pixels are being displayed. The horizontal position counter 628 has an input for the clock signal Φ which changes synchronously with the scanning of the pixel positions of the raster scan. The horizontal position counter 628 has an additional input for the HORIZONTAL DRIVE signal and resets utilizing the HORIZONTAL DRIVE signal. The decoder 642 has set and reset lines 646 connected to the inputs of a flip-flop 648. The flip-flop 648 has an output line 604 which is connected to a select input of the multiplexer 598 (FIG. 11C).

The decoder 642 decodes the output from the horizontal position counter 628 such that the flip-flop 648 is set when the horizontal position counter reaches a first number which defines the left margin of the background area. The output of the flip-flop 648 when set, causes the multiplexer 598 to switch from background color register 600 to either the shift register 594 and 595 or the SERIAL 0 to SERIAL 1 inputs. When the horizontal position counter 628 reaches a preset second number (corresponding to a second position in each line of pixels on the display screen and defining the right margin) the decoder 642 resets the flip-flop 648 causing the multiplexer 598 to switch back to the background color register 600 such that the pixels being displayed on the screen are then defined by the background color register 600.

In this manner, the pixel data defining the pixels of each horizontal line may be drawn from first the background color register then from the shift registers which shift data from the display RAM and then back to the background color register as shown in FIG. 5. When the vertical position counter 626 reaches the line number stored in the vertical blank register 636, the less-than-compare 634 inhibits the decoder 642 from setting the flip-flop 648 for the remaining lines of the frame. Since the flip-flop 648 is not reset, the multiplexer 598 (FIG. 11C) will not switch from the background color register so that the remaining pixels to be displayed will be defined by the pixel data bits stored within the background color register 600. Since the vertical position counter does not reset until after the top background area has been scanned, these pixels will also be defined by the background register.

Figure 24:
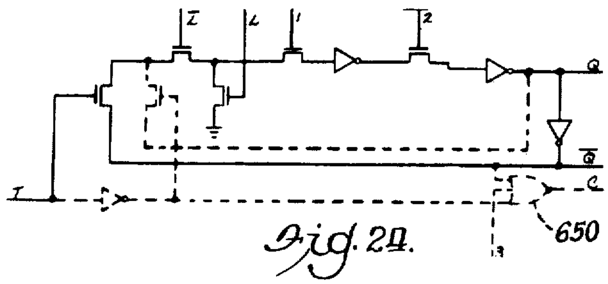

FIG. 13 details the interconnection of the vertical position counter 626 within the data chip and shows the counter 626 to comprise a 9 bit counter. (The logic circuitry of the least significant bit **626*a* is shown in FIG. 24). Logic circuitry typical of the bits 626*b–h* is similar to that shown in FIG. 24 with the addition of the elements shown in phantom. Logic circuitry typical of the 626*i* is similar to that for bits 626*b–h* excluding the NOR gate 650**.

Figure 15:
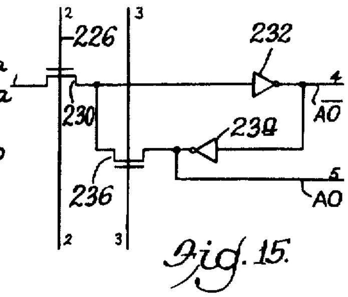

The vertical blank register 630 is shown in FIG. 13 to comprise an 8-bit register (with the logic circuitry of each bit similar to that shown in FIG. 15.) The logic circuitry of the less-than-compare 634 is indicated generally at 634 and comprises a plurality of NOR gates 652 and a PLA comprising pull-down transistors 654 and pull-up transistors 656 selectively coupled to the vertical blank register 630, vertical position counter 626, and output line 640 connected to the decoder indicated generally as 642.

The horizontal position counter indicated generally at 628 comprises an 8-bit latch **658*a–h* and a plurality of pull-down transistors 660 and a plurality of pull-up transistors 662. (The logic circuitry of the least significant bit 658*a* of the binary counter 628 is shown in greater detail in FIG. 31 with the logic circuitry of bit 658*b*, typical of bits 658*b–h*, shown in greater detail in FIG. 32.) The horizontal position counter 628 is connected by 10 output lines indicated generally at 644 to the decoder 642 which comprises a plurality of pull-down transistors 664 and pull-up transistors 666. The decoder 642 has additional inputs "PX" and Φ2 clock signals. The set and reset output lines 646 are connected to the inputs of the flip-flop indicated generally at 648. Flip-flop 648 has an output line 604 which is connected to a select input of the multiplexer 598 (FIG. 11C**).

The $\overline{Q}$ output of the least significant bit **658*a* of the horizontal position counter 628 is connected to the output of a NOR gate 667 whose output is the load signal for the shift registers 594 and 595. The other input of the NOR gate 667 is connected to the clock signal Φ2. Since the counter 28 is clocked by the clock signals Φ1 and Φ2 which have half the frequency of PX, the output of bit 658*a*** has one fourth the frequency of PX. Therefore, a load signal will occur for every four PX pulses, or for every four pixels displayed.

The output of 6 bits of the horizontal position counter 628 is shown in FIG. 11B to be connected by line 668 to the inputs of a "compare" circuit 670. The other inputs of the compare 670 are connected to the output of a 6 bit horizontal color boundary register 672 by the line 674. The horizontal color boundary register 672 has inputs connected to the data bus **66*a* by the line 676. The output of the compare 670 is connected to a flip-flop 678 by a line 680 with the flip-flop 678 having an output 682** which carries the "left/right" bit.

The horizontal color boundary register 672 defines the horizontal position of the imaginery vertical line 64 on the screen 32 of FIG. 5. As noted before, for pixel positions associated with a byte of pixel data to the left of the boundary, the left/right bit of the four pixels associated with that byte is set to one. The left/right bit is set to zero for pixels to the right of the boundary line 64. Color registers 0–3 are selected by a left/right bit equal to 0 and registers 4–7 are selected for the pixels to the left of the boundary.

The address sent to the horizontal color boundary register 672 is compared with the current address of the byte of pixel data being displayed as indicated by the horizontal position counter 628. If the state of the counter 628 is less than the address contained within the register 672, the pixel locations to be displayed are to the left of the horizontal boundary line and the flip-flop 678 is set such that the left/right bit is a logical 1, otherwise the pixel locations are to the right and the left/right bit is reset to 0.

The inter-connection of the horizontal color boundary register 672 is shown in FIG. 13 wherein the register comprises a 6-bit register having the address 9H (the same as the background color register). (A bit of the horizontal color boundary register is logically similar to that shown for the latch in FIG. 15.)

Figure 33:
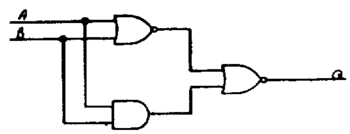
Figure 31:
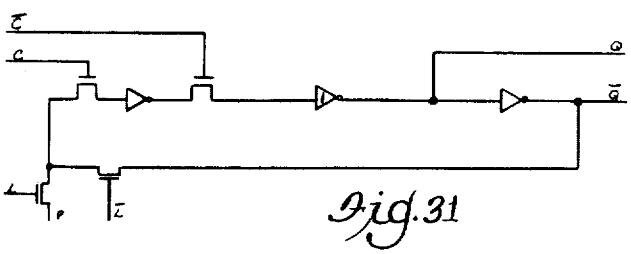

The "compare" circuit connected to the horizontal color boundary register 672 and horizontal position counters 628 is indicated generally at 670 and comprises 6 exclusive-OR units **684*a–f* (with the logic circuitry of a typical exclusive-OR unit 684*a* shown in greater detail in FIG. 33.) The output of each exclusive-OR unit is coupled to an output line 686 by a plurality of pull-down transistors indicated generally at 688. The line 686 is coupled to the voltage source VDD by a pull-up transistor 690 and to the left/right output line 682 by an inverter 692**.

As previously discussed, two pixel bits are used to represent each pixel on the screen. These bits, referred to as Y and Z, may be read from the display RAM or from the background color register. These two bits, along with the left/right bit which is set by crossing the horizontal color boundary, map each pixel to one of the 8 different color registers. The value in the color register then defines the color and intensity of the pixel on the screen associated with the pixel data bits. The intensity of the pixels is defined by the 3 least significant bits of each color register, 000 for darkest and 111 for lightest. The colors are defined by the 5 most significant bits.

The color registers have addresses 0-7H; register 0 having address 0H, register 1 having address 1H, etc.

Referring back to FIG. 11B, a serial data decoder 694 decodes the bits Y and Z, and the left/right bit to determine to which of the color registers 224 the bits point. The serial data decoder 694 comprises a gate indicated generally at 696 in FIG. 13 and has the Z input line 620, the Y input line 622 and the left/right input 682 with the clock signal inputs $\overline{7M}$ and 7M. The serial data decoder 694 further comprises a PLA 698 having pull-down transistors 700 and pull-up transistors 702. The PLA 698 and 8 output lines indicated generally at 704 with one each connected to one of the color registers 224. A particular logic state of the pixel data bits Y, Z, and left/right activates a particular output line 704 which enables the corresponding color register to output its contents. In this manner, these pixel data bits point to a unique color register.

When a color register is selected or identified, the contents of the color register is outputted to a latch 706 shown in FIG. 11B which has five output lines 708 connected to a color decoder 710 for the five color bits and 3 outputs connected to serially connected latches 712 and 714 by the line 716, for the 3 intensity bits. The output of the latch 714 is connected to an intensity decoder 718.

The intensity decoder 718 has further inputs for the "SYNC" and "BLANK" NTSC standard signals. These signals, together with the 3 intensity bits from the selected color register, determine the analog values of the signal "VIDEO" at output line 720 together with a reference voltage of 2.5 volts at line 722.

The color decoder 710 further has inputs for the NTSC standard signals "BURST" and "BLANK" which, together with the 5 color bits from the selected color register, determine the analog values of the "R-Y" signal on line 724 and the "B-Y" signal on line 726.

The 8 color registers, shown in greater detail and indicated at *224a–h*, each comprise an 8 bit register having register select lines *216a–h*, respectively, and output enable lines *704a–h*, respectively. Each color register is connected to the 8-bit data bus *66a* so that any particular register may be addressed when its corresponding register select line is enabled in order to load the register with the color and intensity data. (A register bit *240b0*, typical of the other register bits of the color registers 224 is shown in greater detail in FIG. 34.)

The Q output of each bit of the color registers is connected to the 8 bit latch indicated generally at 706. The latch 706 has five outputs connected by a buffer 728 to the color decoder indicated generally at 710. (The unit *728a* typical of the five units of the buffer 728 is shown in greater detail in FIG. 35.)

The color decoder 710 converts the 5 digital bits from a color register into the analog color video signals R-Y and B-Y. The color decoder 710 comprises a PLA 730 (for the R-Y signal) and a PLA 740 (for the B-Y video signal) the outputs of which are coupled to the gates of a plurality of transistor switches 742 and 744, respectively. The inputs of the switches 742 and 744 are selectively coupled to a plurality of series-connected resistors 746. The output of the switches 742 are connected to the output line 724 for the R-Y color video signal and the switches 744 are connected to the output line 726 for the B-Y color video signal.

The 3 outputs of the latch 706 for the 3 intensity bits from the color registers 224 are connected to the latch indicated at 712 whose outputs are connected to the latch 714. The output of the latch 714 is connected to the intensity decoder indicated generally at 718. The additional latches 712 and 714 provide a timing delay. The intensity decoder 718 decodes the 3 intensity bits from a color register and converts them into the analog intensity signal "VIDEO". The intensity decoder 718 comprises a PLA indicated generally at 748 whose output is coupled to the gates of the plurality of transistor switches 750. The input of the transistor switches 750 are selectively coupled to the series-connected resistors 752 with the output of these switches 750 connected to the VIDEO signal line 720. The intensity decoder 718 further supplies a 2.5 reference voltage on the line 722 from the series-connected resistors 752.

A clock generator 754 shown in FIG. 11D uses the 7M and $\overline{7M}$ clock signals (7.159090 MHz square waves) to generate ΦG and $\overline{PX}$. These are the clock signals for the system. The frequency of $\overline{PX}$ is half that of 7M and the frequency of ΦG is half that of $\overline{PX}$.

The clock generator 754, shown in greater detail in FIG. 13, comprises a divide-by-2 counter indicated generally at 756 having inputs 7M and $\overline{7M}$. The divide-by-2 counter 756 has an output line 758 which carries the clock signal PX. The clock generator 754 further comprises a second divide-by-2 counter indicated generally at 760 which has inputs 7M and $\overline{7M}$ and the input PX from the divide-by-2 counter 756. The output of the divide-by-2 counter 760, line 762, is connected to a buffer indicated generally at 764 which has the output line 766 which carries the clock signal ΦG. The output line 762 is also connected to an inverter and buffer indicated generally at 768 which has the output line 770 for the clock signal Φ1 which is the same as ΦG and the output 772 for the clock signal Φ2 which is the inverse of clock signal ΦG.

The clock generator 754 has an input 774 connected to the output of a third signal generator indicated generally at 776 which has inputs 7M, $\overline{7M}$ and the HORIZONTAL DRIVE signal on the input line 778. The generator 776 generates a clear signal as a function of the HORIZONTAL DRIVE, 7M and $\overline{7M}$ clock signals which clears the clock generator 764.

The relationship between 7M, HORIZONTAL DRIVE, ΦG and $\overline{PX}$ is illustrated in FIG. 41. The frequency of $\overline{PX}$ is half that of 7M and the ΦG clock signal is $\frac{1}{4}$ of 7M. There are 455 cycles of 7M per horizontal line of pixels displayed and 113 and $\frac{3}{4}$ of ΦG cycles per horizontal line. Because of the extra $\frac{3}{4}$ cycle, ΦG must be resynchronized at the beginning of each line. This is done by the clear signal generator 776 which "stalls" ΦG for 3 cycles of 7M and is initiated by clock signal HORIZONTAL DRIVE. $\overline{PX}$ is also stalled for the same amount of time.

FIG. 11E shows a television sync generator 780 which also uses the clock signal 7M and $\overline{7M}$ to generate NTSC, SYNC, BURST and BLANK signals to be sent to the intensity decoder 718 and color decoder 710 (FIG. 11B). Also generated are the HORIZONTAL and VERTICAL DRIVE signals. The TV sync generator comprises a ΦA and ΦB generator 782 having the 7M and $\overline{7M}$ clock inputs. The generator 782 has output lines 784 and 786 for the ΦA and ΦB clock signals, respectively, connected to a horizontal counter 788. The counter 788 has output lines 790 connected to input of a vertical counter 792 and outputs 794 connected to the inputs of a decoder 796. The horizontal counter 788 counts the ΦA and ΦB clock pulses and the decoder 794 decodes the output of the counter 788 to provide a HORIZONTAL BLANK signal on a line 800, a BURST signal on a line 802 and a HORIZONTAL DRIVE signal on a line 804. A decoder 806 is connected to the output of the vertical counter 792 and provides a VERTICAL BLANK signal on a line 808, two signals related to a VERTICAL SYNC signal on lines 810 and 811 connected to inputs of the decoder 796 and a VERTICAL DRIVE signal on a line 812.

An OR gate 818 has inputs connected to the HORIZONTAL BLANK signal line 800 and to the VERTICAL BLANK signal line 808 and has an output line 820 for the BLANK signal. The decoder 786 decodes the input lines 810 and 811 as well as the count of the counter 788 to produce the SYNC signal on line 798.

The SYNC, BLANK and BURST signals are NTSC standard timing signals and are utilized to generate the R-Y, B-Y and VIDEO signals. The HORIZONTAL DRIVE and VERTICAL DRIVE signals are used to synchronize the data chip with the address chip as well as to provide clock signals for the vertical position counter 626 and horizontal position counter 628 (FIG. 11B). The HORIZONTAL DRIVE signal occurs once every horizontal raster scan line (63.5 microseconds), and VERTICAL DRIVE occurs once every field (16.6 milliseconds).

Figure 36:
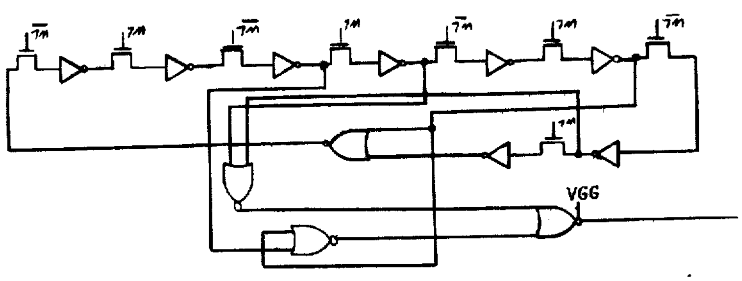

The ΦA and ΦB generator 782 is shown in FIG. 13 to comprise a counter 822 which is connected to an output buffer (indicated generally at 824) having output line 826 for the ΦA clock signal and output line 828 for the ΦB output signal, which are 2.045 MHz. (The counter 822 is shown in FIG. 36 to comprise a "divide by 3½" counter having the input clock signal 7M and $\overline{7M}$.)

The counter 788 has 8 bits, 788*a–h*, and a programmed logic array, or PLA indicated generally at 830. (The logic circuitry of the counter bits 788*a–g* are logically similar to those shown in FIGS. 31 and 32 for the horizontal position counter 628 with the logic circuitry of the bit 788*h* shown in greater detail in FIG. 37.) The horizontal counter 788 is a divide-by-130 counter and has a frequency of 63.5 microseconds. The Q and $\overline{Q}$ outputs of the bits 628*a–h* of the counter 788 are connected to the decoder indicated generally at 786 which comprises a programmed logic array 832. The output of the PLA 832 is selectively coupled to 3 flip-flops 834–836 either directly or by logic elements 838. (The flip-flop 834 is typical of the flip-flop 834–836 and is shown in greater detail in FIG. 38.)

The flip-flop 836 has an output line 800 which carries the HORIZONTAL BLANK signal and is connected to the OR gate 818 which comprises a NOR gate 840 and an inverter 842. An output line 802 of the flip-flop 835 (via a buffer 385) carries the BURST signal with the output line 798 of the flip-flop 834 (via a buffer 385 carrying the SYNC signal.) An output line 804 of the delay elements 839 from the decoder PLA 786 carries the HORIZONTAL DRIVE signal.

Figure 39:
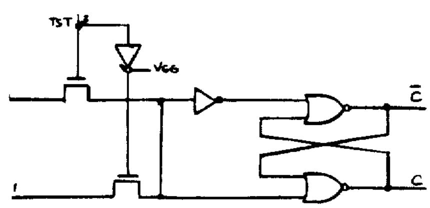
Figure 19:
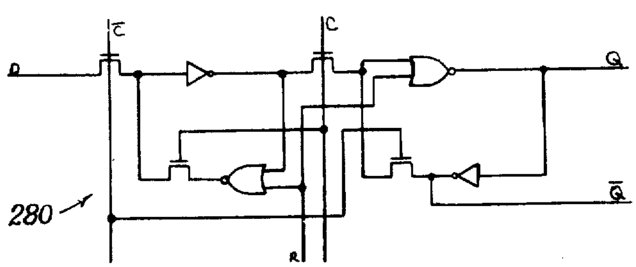

The Q output of the bit 788*b* of the counter 788 is connected to the input 2 of a flip-flop 850 (shown in greater detail in FIG. 39.) The outputs C and $\overline{C}$ of the flip-flop 850 have a frequency of half that of the horizontal counter 788 and are connected to the clock inputs of the counter 792 having bits 792*a–j*. The counter 792 is a divide-by-512 counter and has a period of 1/30 of a second. (The counter bits 792*b–j* are logically similar to those shown in FIG. 24 with the bit 792*a* also logically similar but excluding those elements shown in phantom.) The Q and $\overline{Q}$ outputs of the bits of the counter 792 are selectively coupled to a programmed logic array indicated generally at 852 of the decoder 806. An output line 853 of the PLA 852 is connected to a flip-flop 856 (shown in greater detail in FIG. 38) having an output line 857. The output line 857 carries the VERTICAL BLANK signal and is connected to an input of the NOR gate 840. An output line 854 is connected to a shift register bit 858 (shown in greater detail in FIG. 23). The output of the shift register 858 is connected to a plurality of logic elements 859 having additional clock signal inputs Φ1 and Φ2 and an output line 860 which carries the VERTICAL DRIVE signal. The line 860 is connected by a buffer 862 to the VERTICAL DRIVE pad 864.

FIG. 42 illustrates the relationship between SYNC, VERTICAL BLANK and VERTICAL DRIVE signals. Each division represents 1 horizontal scan of the raster scan.

FIG. 43 illustrates the relationship between the signals HORIZONTAL DRIVE, HORIZONTAL BLANK, SYNC and color BURST with each horizontal division equal to 3½ cycles of the clock 7M. The pattern repeats every 455 cycles of 7M. The shaded area voltages are determined by the pixel data bits from the display RAM. The color BURST signal time occurs when B-Y is at 1.7 v and the SYNC signal time occurs when VIDEO is at 0 v. The relationship between the HORIZONTAL DRIVE and VERTICAL DRIVE signals is illustrated in FIG. 41.

In memory write cycles, in which data is written to the display RAM, a control signal $\overline{WRCTL}$ (generated by the address chip) is activated and a memory control circuit 882 (FIG. 11F) of the data chip generates the $\overline{DATEN}$ control signal. The function generator (FIG. 11C) takes the data from the CPU from the microcycle data bus 66 and transfers it to the memory data bus in conjunction with the $\overline{DATEN}$ control signal. Of course, if the data is to be modified, the function generator will modify the data as required as it places the data on the memory data bus. The memory control circuit 882 has an additional input for another address chip generated control signal LTCHDO and an output line 884 at which the memory control circuit 882 outputs a second control signal which is a function of the LTCHDO control signal. The relationship between the data chip control signal $\overline{DATEN}$ and the address chip control signal $\overline{WRCTL}$ is shown for two memory write operations in FIGS. 12A and D.

The memory control circuit is shown in greater detail in FIG. 13 and is indicated generally at 882. The memory control circuit has an input line 886 for the $\overline{WRCTL}$ control signal which is connected by a plurality of logic elements 888 to a flip-flop 890 having an output line 892 which carries the $\overline{DATEN}$ control signal. The logic elements 888 include the transistor switch 889 which has a clock signal line 891 connected to the gate of the switch 889. The clock signal on the line 891 is a function of the clock signals Φ1, PX and $\overline{PX}$. The output line 892 (which carries the $\overline{DATEN}$ control signal is connected to a $\overline{DATEN}$ pad 896 by a buffer 385 and a buffer 894. The buffer 385 also has an output line 898 which also carries the $\overline{DATEN}$ control signal.

The memory control signal 882 further has an input line 900 for the LTCHDO control signal from the address chip. Line 900 is connected by a resistor and an inverter 902 to a NOR gate 904 having an additional input connected to the control signal line 891 and an input connected to the control signal Φ2. The output of the NOR gate 904 is connected by a buffer 385 to an output line 884. The LTCHDO control signal from the address chip indicates to the data chip when valid data from the display RAM is present on the memory data bus. The OR/exclusive-OR circuit 480 (FIG. 13) utilizes the control signal on the output 884 which is a function of the control signal LTCHDO to latch-up data from the memory data bus which is utilized in the OR and exclusive-OR operations.

Referring now to FIG. 13, the data chip generates two further control signals, INPUT on a line 908 and OUTPUT on a line 910. These control signals are generated by the logic elements indicated generally at 912 which have an input line 914 for the $\overline{IORQ}$ CPU control signal, an input line 916 which carries the CPU control signal M1, and an input line 918 which carries the CPU control signal RD. The signals INPUT and OUTPUT indicate when an input or output operation is requested by the CPU and have a duration which is longer than that of the CPU control signals to compensate for delay due to the microcycler.

ADDRESS CHIP

The address chip 56 of the video processor 52 is shown in FIG. 10 to have inputs MXD0-MXD7 from the microcycle data bus 66 with memory address outputs MA0–MA7 connected to a latch 950 whose output is connected to the display RAM address bus 952. The address chip relays addresses transmitted by the CPU whereby the CPU may selectively read the contents of the display RAM, sequentially generates addresses for reading the display RAM synchronously with the display of pixels on the screen represented in the display RAM and handling and generating interrupts.

The address chip further has clock inputs $\phi$ and $\bar{\phi}$ from the buffer 100, CPU control signal inputs $\overline{M1}$, $\overline{RD}$, $\overline{IORQ}$, $\overline{MREQ}$ and $\overline{RFSH}$ and CPU control signal outputs INT and WAIT from and to, respectively, the CPU. Outputs carrying the address chip generated signals LTCHDO and $\overline{WRCTL}$ are connected to the corresponding inputs of the data chip 54 with inputs connected to the data chip outputs VERT. DR. and HOR. DR. The address chip address bit has inputs A12–A14 connected to the CPU address bus 73, input $\overline{LIGHT\ PEN}$ from the light pen 62 (FIG. 2). Finally, inputs TEST, VDD, VGG and VSS are connected to +5 v, +5 v, +10 v, and ground with the row address strobe signal RASO connected to an input of the logic elements indicated generally at 954 which generate the write enable ($\overline{WE}$), column address strobe ($\overline{CAS}$), chip select ($\overline{CS}$) and row address strobe (RAS) signals.

The address chip 56 of the video processor 52 is shown in a block diagram in FIG. 44. The address chip 56 has a microcycle decoder 1000 which selects 12 bits of address from the data from 8-bit data bus 66*b* connected to the microcycle data bus 66 by a buffer 1001. The microcycle decoder 1000 is similar to the microcycle decoder 212 of the data chip and need not be discussed in detail.

A detailed circuit implementing the block diagram of the address chip is shown in FIGS. 45A–J with a composite diagram of FIGS. 45A–J shown in FIG. 46. The interconnection of the microcycle decoder 1000 within the address chip is shown in FIG. 45 (with an address bit unit A0 typical of the units A0–A7, shown in greater detail in FIG. 47 and address bit unit A8, typical of address units A8–A12 shown in greater detail in FIG. 48). The address bit units A0–A7 of the microcycle decoder 1000 have an input line 1002 which carries the control signal LDL1 by which the low address bits A0–A7 are loaded. Similarly, the address bit units A8–A13 of the microcycle decoder 1000 have an input line 1004 which carries the control signal LDH1 by which the high address bits A8–A13 are loaded. The address bits are carried on the address chip data bus 66*b* which is connected to the microcycle data bus 66 by the tri-state buffer 1001 comprising units 1001*a–h* (with buffer unit 1001*a*, typical of the buffer units, shown in greater detail in FIG. 49). The control signals LDL1 and LDH1 are generated by the logic element indicated generally at 1006 in a manner similar to that for the LDL1 and LDH1 control signals generated by the microcycle generator 106 of the data chip shown in FIG. 11A.

Referring back to FIG. 44, the outputs of the addess bit units A0–A7 of the microcycle decoder 1000 are connected to an address decoder 1008 also logically similar to the address decoder 214, (FIG. 11B) of the data chip. Thus the address decoder 1008 decodes the addresses transmitted by the CPU to activate an associated select line 1010–1018. As indicated in Table II, the address decoder 1008 will decode the address FH (when the INPUT control signal is present) which is operably connected to the horizontal feedback input register. As another example, address decoder 1008 will activate the line 1013 which is operably connected to the interrupt enable and mode registers when the address EH and the control signal OUTPUT are present.

The address decoder 1008 is shown in FIG. 45 to comprise a programmed logic array having input lines connected to the complemented and uncomplemented outputs of the address bit units A0–A7 of the microcycle decoder 1000, and input line 1020 for the OUTPUT control signal and an input line 1022 for the control signal INPUT. The select lines 1010–1017 of the address decoder 1008 for the horizontal feedback register, a vertical feedback register, an interrupt line register, the interrupt enable and mode register, an interrupt feedback register, a function generator register, a vertical blank register, a low/high resolution mode register, and an output line 1018 to the memory cycle generator, respectively, are also indicated.

The address bits A0–A7 from the microcycle decoder 1000, together with the address bits A8–A13 are conducted to a multiplexer 1024 which has 12 outputs as shown in FIG. 44. A scan address generator 1026 generates a 12-bit address which is used to read pixel data from the display RAM. The scan address is generated synchronously with the raster scan of the display and incrementally increases from OH to FFFH once every field (1/60 seconds).

The multiplexer 1024 sends either the scan address or the address from the CPU (via microcycle decoder 1000) to its 12 outputs. The outputs of the multiplexer 1024 are connected to a second multiplexer 1026 which multiplexes its 12 inputs to 6 address bits, MA0–MA5, in two "time slices" required for the 4K×1 16 pin RAMs which comprise the display RAM.

When the multiplexer 1024 sends the address bits from the CPU to its 12 outputs, the 12 address bits A0–A11 of the 14 input address bits A0–A13 from the microcycle decoder 1000 are selected in the low-resolution mode. In the high resolution mode, the 12 address bits A2–A13 are selected. The mode of operation, whether low or high resolution, is set by the logic statement of a low/high resolution mode flip-flop or register 1030 shown in FIG. 45. The flip-flop 1030 has the same address as the low/high flip-flop 606 of the data chip. (The logic circuitry of the flip-flop 1030 is shown in greater detail in FIG. 50.) The flip-flop 1030 has an output line 1032 shown in FIG. 44 to be connected to a select input of the multiplexer 1024 so that the proper address bits from the CPU (via the microcycle decoder 1000) are selected when the address from the CPU is to be transmitted to the outputs of the multiplexer 1024.

The scan address generator 1026 which generates the 12-bit address used to read pixel data from the display RAM resets with every other 40 address counts in the low resolution mode (as there are 40 bytes per horizontal display line) so that the scan address generator 1026 counts from 0 to 39 twice and then counts from 40 to 79 twice, etc. This results in each pixel of a field being scanned twice. In other words, each two-bit pixel data is utilized twice in two consecutive horizontal scans. Since a frame consists of two interleaved fields, any particular pixel extends four horizontal scan lines in the vertical direction.

The scan address generator 1026 has inputs for the HORIZONTAL DRIVE and VERTICAL DRIVE signals generated by the data chip to synchronize the scan address generator with the data chip and the TV raster scan.

Figure 53:
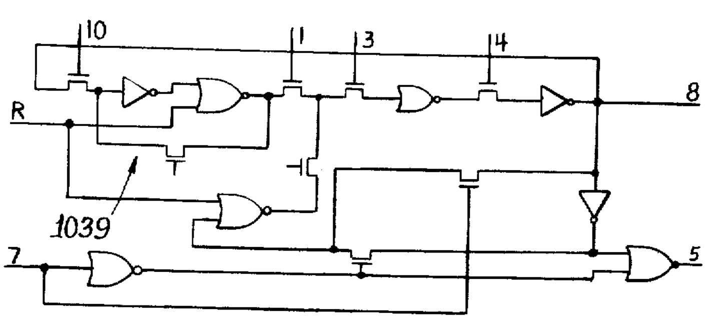

The scan address generator is indicated generally at 1026 in FIG. 45 and comprises a counter 1034 having 12-bits 1034*a*–*l* and flip-flops 1036–1038. (The counter bits 1034*a* and 1034*b* are shown in greater detail in FIGS. 51 and 52 respectively.) Bit 1034*c*, typical of bits 1034*c*–*l* is also shown in greater detail in FIG. 53. As seen in FIG. 53, each of the bits 1034*c*–*l* comprise a latch 1039 which is activated synchronously with the HORIZONTAL DRIVE pulse so that the count is latched up with each HORIZONTAL DRIVE pulse which occurs after each 40 counts.

A line 1040 (FIG. 45) carrying the VERTICAL DRIVE signal from the data chip is connected by the logic elements indicated generally at 1042 to an input of the flip-flop 1038. The output of the flip-flop 1038 is connected to the reset input R of the counter units 1034*a*–*l*. Thus, the VERTICAL DRIVE signal operates to reset the counter 1034 to 0 after each field has been scanned.

Figure 54:
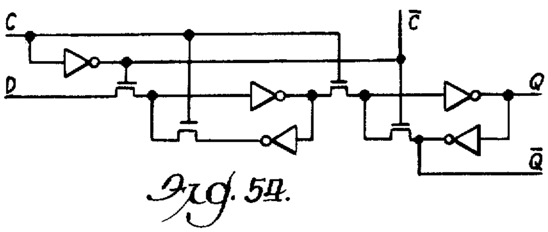
Figure 51:
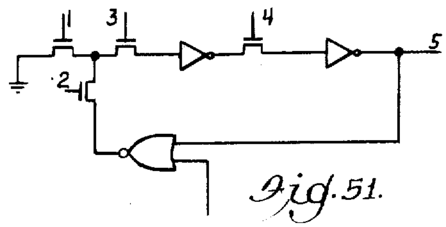
Figure 57:
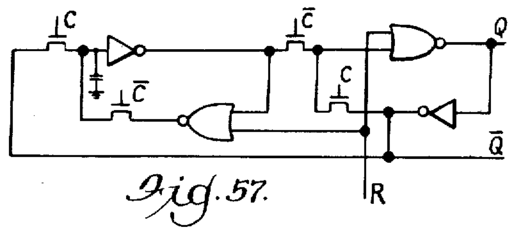

A line 1044 carrying the HORIZONTAL DRIVE signal from the data chip is connected by the logic elements indicated generally at 1046 to the input of the flip-flop 1037 whose output is connected to the D input of the flip-flop 1036 (which is shown in greater detail in FIG. 54.) The Q and $\bar{Q}$ outputs of the flip-flop 1036 are connected to the 10 and 9 inputs, respectively, of the counter bits 1034*d*–*l*.

The other output of the flip-flop 1037 is connected to the input of a NOR gate 1048 having another input connected to the output line 1032 of the low/high resolution flip-flop 1030 and still another input connected to the output of the least significant bit of a line counter to be described later. The output of the NOR gate 1048 is connected to the 1 input of the counter bits 1034*a*–*l* and to the 2 input by an inverter 1050.

The output of the NOR gate 1048 will go low with every other scan line (as determined by the output of the LSB 1138*a* of the line counter 1138) upon a HORZ DR (HORIZONTAL DRIVE) pulse when in the low resolution mode. This causes the counter to be reset to the count that was latched up in the latches 1039. Since the count latched up is 40 less than the current count, the counter will count from 0–39 twice, 40–79 twice, 80–119 twice, etc. Thus a line of pixel data is utilized to define 2 consecutive scan lines in each field in the low resolution mode.

The scan address generator 1026 has an input line 1052 which carries a clock signal which is connected by a transistor switch 1054 and an inverter 1056 to the 4 input of the bits 1034*a*–*l* and to the 3 inputs by an inverter 1058, of the counter 1034. The generation of the clock signal carried by the line 1052 will be described later also.

The multiplexer 1024 and 1028 comprise the NOR gates indicated at 1058, each having an input connected to the address bit outputs A0–A6 of the microcycle decoder 1000, 6 NOR gates 1060, each having an input connected to the address bit outputs A2–A7, respectively, 6 NOR gates indicated at 1062, each having an input connected to the address bit outputs A6–A11, respectively, and 6 NOR gates 1064, each having an input connected to the address bits A8–A13, respectively, of the microcycle decoder 1000.

The output line 1032 of the low/high resolution flip-flop 1030 is connected to the input of a NOR gate 1066 which is connected to the inputs of the NOR gates 1058 by the serially connected transistor switch 1068 and inverter 1070, with the output line 1032 also connected to the input of a NOR gate 1072 whose output is connected to the input of the NOR gate 1062 by the serially connected transistor switch 1074 and an inverter 1076. The output line 1032 is also connected to an inverter 1078 whose output is connected to the input of a NOR gate 1080. The output of the NOR gate 1080 is connected to the inputs of the NOR gates 1060 by a serially connected transistor switch 1082 and inverter 1084, with the output line 1032 also connected to an inverter 1086 whose output is connected to the input of a NOR gate 1088. The output of the NOR gate 1088 is connected to the inputs of the NOR gates 1064 by a serially connected transistor switch 1090 and an inverter 1092.

When the output of the low/high resolution mode flip-flop is a logical 0, (corresponding to the low resolution mode), the output of the inverter 1078 is a logical 1, the output of the NOR gate 1080 is a logical 0, and the output of the inverter 1084 is a logical 1 driving the outputs of the NOR gate 1060 (corresponding to address bits A2–A7) to a logical 0 with the outputs of the NOR gate 1064 (corresponding to the address bits A8–A13) also being driven to a logical 0. In this manner, the NOR gates 1058 corresponding to the address bits A0–A5 and the NOR gates 1062 corresponding to the address bits A6–A11 are selected in the low resolution mode. On the other hand, when the output of the flip-flop 1030 is a logical 1, corresponding to the high resolution mode, the NOR gates 1060 and 1064 are selected which corresponds to the address bits A2–A13.

The multiplexers 1024 and 1028 further comprise 6 NOR gates 1094, each having an input connected to the address bit outputs A0–A6 of the counter bits 1034*a*–*f*, respectively, and the 6 NOR gates 1096, each having an input connected to the address bit outputs A6–A11 of the counter bits 1034*g*–*l*, respectively.

The multiplexers 1024 and 1026 have a VIDNXT2 clock signal input line 1098 which is connected to an input of the NOR gates 1066 and 1080 and to the NOR gate 1072 by a transistor switch 1100 and to the NOR gate 1088 by a transistor switch 1102. The gates of the transistor switches 1100 and 1102 are connected to the clock signal Φ1. The VIDNXT2 clock signal input line 1098 is also connected to the inputs of the NOR gates 1094 by the series-connected transistor switch 1104 and inverter 1106. The VIDNXT2 input line 1098 is also connected by the series-connected inverter 1108, transistor switch 1110, inverter 1112, transistor switch 1114, and inverter 1116 to the inputs of the NOR gate 1096.

The logic state of the clock signal VIDNXT2 determines whether the address bits from the CPU (via the microcycle decoder 1000) or the address bits generated by the scan address generator 1052 are conducted to the memory address bus indicated at 1118 which carries the address bits MA0-MA5. VIDNXT2 occurs 40 times a scan line and indicates that the next RAM access cycle is a "video" cycle. In a video cycle, the system reads pixel data from the display RAM to be displayed on the screen. The generation of VIDNXT2 will be described later.

The outputs of the NOR gates 1058, 1060, 1062, 1064, 1094 and 1096 are selectively coupled to the output lines 1120–1125 by a plurality of transistor switches 1128. The output lines 1120, 1121 and 1122 are each connected by a series-connected NOR gate 1130 and buffer 1132 (shown in greater detail in FIG. 55), to the MA0, MA1 and MA2 bits of the memory address bus 1118. The output lines 1123, 1124 and 1125 are each connected by a series-connected NOR gate 1130 and buffer 1134 (shown in greater detail in FIG. 56) to the MA3, MA4 and MA5 bits of the memory address bus 1118.

If the logic state of VIDNXT2 on line 1098 is a logical 0, the output of the inverters 1106 and 1116 are a logical 1 which drives the outputs of the NOR gates 1096 and 1094 (corresponding to scan address generator bits A0–A11) to a logical 0. Thus, the address bits from the scan address generator are not conducted to the memory address bus 1118 when VIDNXT2 is a logical 0. On the other hand, when the state of VIDNXT2 on line 1098 is a logical 1 indicating the next cycle is a video cycle, the output of the inverters 1070, 1084, 1072 and 1092 are a logical 1 which drives the outputs of the NOR gates 1058, 1060, 1062 and 1064 (corresponding to the address bits from the CPU) to a logical 0.

The NOR gates 1094 have an additional clock signal input Φ1 with the NOR gates 1096 also having an additional clock signal Φ2 which is the inverse of the clock signal Φ1. Thus, when the address bits from the scan address generator are to be transmitted to the memory address bus 1118, the clock signal Φ1 goes low first which allows the address bits A0–A5 to be conducted first, followed by the address bits A6–A11 from the NOR gates 1096 when the clock signal 01 goes high and the clock signal 01 goes low.

Similarly, the NOR gates 1058 (corresponding to the address bits A0–A5 during the low resolution mode) and the NOR gates 1060 (corresponding to the address bits A2-A7 during the high resolution mode) have an additional clock signal input Φ1 and the NOR gates 1062 (for bits A6–A11) and 1064 (for bits A8–A11) have the additional clock signal Φ2. When the address bits from the CPU are to be conducted to the memory address bus 1118, the bits are also transmitted in two 6-bit slices, A0–A5 first, then A6–A11 (low resolution mode) or A2–A7 first, then A8–A13 (high resolution mode).

SCREEN AND LIGHT PEN INTERRUPTS

An additional function of the address chip concerns interrupts, namely a "screen" interrupt and "light pen" interrupt. The purpose of the screen interrupt is to synchronize the system "software" with the video system. The CPU under the direction of the software or programming stored in the ROM's, can send a line number to an interrupt line register 1136 (which has address FH) shown in FIG. 44.

In the low resolution mode, bit 0 of interrupt line register 1136 is set to 0 and the line number is set to bits 1–7. In the high resolution mode, the line number is sent to bits 0–7. If the screen interrupt is enabled, the CPU will be interrupted when the display completes scanning the line which is contained in the interrupt register. A line counter 1138 counts the lines of pixels as they are displayed on the screen and the output of which is compared with the line number stored in the interrupt line register 1136 by a comparator 1140.

The output of the comparator 1140 sets a flip-flop 1142 which utilizes the HORIZONTAL DRIVE signal as a clock signal. The output of the flip-flop 1142 is connected to interrupt circuitry 1144 which generates an interrupt signal $\overline{INT}$ on an output line 1146 when the screen interrupt is enabled. The interrupt signal $\overline{INT}$ is transmitted to the CPU.

This interrupt can be used for timing since each line is scanned 60 times a second. It can also be used in conjunction with the color registers to make as many as 256 color-intensity combinations appear on a screen at the same time. Thus, after a screen interrupt, the data within the 8 color registers which can define 8 different color-intensity combinations may be changed to 8 additional color-intensity combinations with the interrupt line register contents also being changed to a subsequent line number. When this line is reached the process may be repeated until the full 256 possible combinations represented by the 5 color bits and 3 intensity bits in each color register have been displayed.

The light pen interrupt occurs when the light pen trigger is pressed and the video scan of the display crosses the point on the screen were the light pen is located which generates a signal $\overline{LIGHT\ PEN}$ on an input line 1148 to the interrupt circuitry 1144. When the light pen interrupt is enabled, the interrupt circuitry 1148 generates the interrupt signal $\overline{INT}$ and transmits it to the CPU.

The CPU interrupt routine resulting from the $\overline{INT}$ signal can read two registers to determine the position of the light pen. The line number which indicates the vertical position of the light pen is read from a vertical feedback register 1150 which has address EH. In the high resolution system, the line number is in bits 0–7. In the low resolution system, the line number is in bits 1–7, and bit 0 should be ignored.

The horizontal position of the light pen can be determined by reading a horizontal feedback register 1152 having address FH and subtracting 8. In the low resolution system, the resultant value is the pixel position 0 to 159. In the high resolution system, the resultant must be multiplied by 2 to give the pixel position, 0 to 358.

A horizontal position counter 1154 counts the pixel positions as the corresponding pixels are scanned. The counter 1154 is reset by the HORIZ DR signal and is clocked by the clock signal. The output of the horizontal position counter 1154 is connected to the horizontal feedback register 1152. The output of the line counter or vertical position counter 1138 is connected to the vertical feedback register 1150. When the light pen interrupt is enabled, the interrupt circuitry 1144, upon the occurrence of a $\overline{LIGHT\ PEN}$ signal, causes the horizontal feedback register 1152 to latch up the current horizontal position as indicated by the horizontal position counter 1154. Similarly, the vertical feedback register 1150 is caused to latch up the current vertical position or line as indicated by the line counter 1138.

When the CPU acknowledges an interrupt, it reads 8 bits of data from the data bus. It then uses the data as an instruction or an address. This data is determined by the contents of an interrupt feedback register 1156 which has address DH. The contents of the interrupt feedback register 1156 is originally set by the placement of data in it by the CPU. In responding to a screen interrupt, the contents of interrupt feedback register are placed directly onto the data bus 66a. In responding to a light pen interrupt, the lower 4 bits of the data bus are set to 0 and the upper 4 bits are the same as the corresponding bits of the interrupt feedback register 1156. Thus, if the lower 4 bits are 0, the CPU can determine that the light pen initiated the interrupt. Otherwise, the interrupt is a screen interrupt.

In order for the Zilog Z-80 to be interrupted, the internal interrupt enable flip-flop must be set by an EI instruction and one or two of the external interrupt enable bits of an interrupt enable and mode registers 1158 which have address EH must be set. If bit 1 is set, light pen interrupts can occur. If bit 3 is set, screen interrupts can occur. If both bits are set, both interrupts can occur and the screen interrupt has high priority.

The interrupt mode bits of the interrupt enable and mode register 1158 can determine what happens if an interrupt occurs when the Zilog Z-80 CPU interrupt enable flip-flop is not set. Each of the two interrupts may have a different mode. In "mode 0" the Z-80 will continue to be interrupted until it finally enables interrupts and acknowledges the interrupt. In mode 1, the interrupt will be discarded if it is not acknowledged by the next instruction after it occurred. If mode 1 is used, the software should be designed such that the system will not be executing certain Zilog Z-80 instructions when the interrupt occurs. The OP codes of these instructions being with CDH, DDH, EDH and FDH.

The line counter 1138 is shown in greater detail in FIG. 45 and comprises 8 bits 1138*a–h*. (The bit 1138*a* is shown in greater detail in FIG. 57 with the bit 1138*b*, typical of bits 1138*b–h* shown in greater detail in FIG. 58.) The counter 1138 has an input line 1160 which is connected to the output of the logic elements 1046 which have the HORIZONTAL DRIVE signal input. The HORIZONTAL DRIVE signal occurs once for each line of pixels displayed on the screen. The line counter 1138 synchronously counts the lines as they are displayed and indicates the current line number being displayed. The line counter 1138 has a reset input line 1162 which is connected to the output of the logic elements 1042 which have the VERTICAL DRIVE input signal. The line counter 1138 resets on each vertical drive pulse which occurs at the end of each field.

Figure 59:
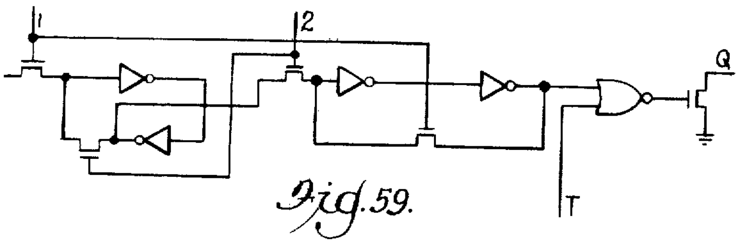

The output of each of the counter bits 1158*a–h* are connected to the inputs of the vertical feedback register indicated generally at 1150 and comprising bits 1150*a–h* (with typical bit 1150*a* shown in greater detail in FIG. 59). The vertical feedback register 1150 has a latch enable line 1164 connected to the output of the interrupt circuitry indicated generally at 1144. When this line is enabled, in response to a $\overline{\text{LIGHT PEN}}$ signal from the light pen, the vertical feedback register 1150 latches up the current count contained in the line counter 1138. The output of each bit 1150*a–h* is connected to the data bus 66b. The vertical feedback register 1150 has an output enable input connected by an inverter 1166 to the register select line 1011 from the address decoder 1008. The CPU may read the contents of the vertical feedback register 1150 by transmitting its address to the address decoder wherein the line number contained within the vertical feedback register 1150 is conducted onto the data bus 66b to the CPU. The CPU will read the contents of the vertical feedback register 1150 in response to an interrupt signal $\overline{\text{INT}}$ after determining that the interrupt is a light pen interrupt by reading the interrupt feedback register. In this manner, the CPU can determine the vertical position of the light pen.

Figure 61:
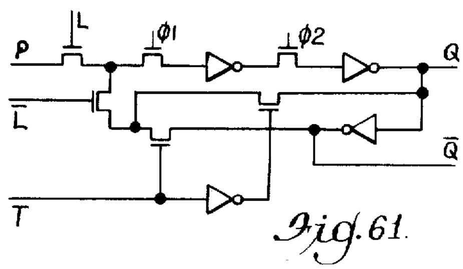
Figure 60:
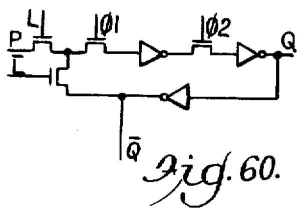
Figure 62:
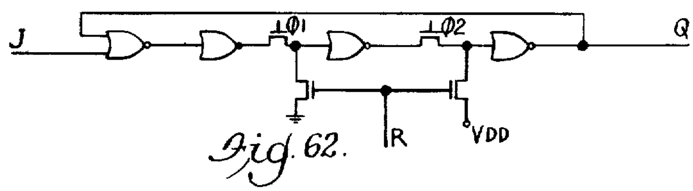

The horizontal position counter is indicated generally at 1154 and comprises bits 1154*a–h* (with bit 1154*a* shown in greater detail in FIG. 60 and bit 1154*b*, typical of bits 1154*b–h*, shown in greater detail in FIG. 61.) The counter 1154 further comprises a programmed logic array indicated generally at 1168. The horizontal position counter 1154 has clock inputs Φ1 and Φ2 and synchronously counts the pixels of the line of pixels being displayed. Thus, the count contained within the counter 1154 corresponds to the horizontal position of the last pixel displayed. The counter 1154 has a reset input line 1170 which is connected to the output of the logic elements 1046 which have the HORIZONTAL DRIVE signal input. The HORIZONTAL DRIVE signal which occurs at the end of each line of the raster scan causes the horizontal position counter 1154 to reset.

The outputs of the bits 1154*a–g* of the horizontal position counter 1154 are connected to the inputs of the bits 1152*a–g*, respectively, of the horizontal feedback register indicated generally at 1152. (Logic circuitry of the bits 1152*a–g* is similar to that shown for bit 1158*a* of the vertical feedback register shown in FIG. 59.) The output of the bits 1152*a–g* are connected to the data bus 66b.

The horizontal feedback register 1152 has a latch enable line connected to the line 1164 from the interrupt circuitry, such that the register 1152 can latch-up the current position count contained within the horizontal position counter 1154 upon a signal from the interrupt circuitry 1144 in response to the signal $\overline{\text{LIGHT PEN}}$ from the light pen. The horizontal feedback register 1152 has an input connected to the register select line 1010 from address decoder 1008 whereby the CPU may read the contents of the horizontal feedback register 1152 by transmitting the address of the horizontal feedback register 1152 to the address decoder. The CPU will read the horizontal feedback register to determine the horizontal position of the light pen in response to a light pen interrupt.

The output of the bits 1154*a–h* of the horizontal position counter 1158 are also connected to a decoder indicated generally at 1171 which includes a PLA 1275, a J-K flip-flop 1276 (shown in greater detail in FIG. 62) and pull-ups 1173 whose outputs are selectively coupled to a NOR gate 1175. The output of the NOR gate 1175 is connected to a plurality of delays and inverters at 1177 which have an output line 1098 which carries the clock signal VIDNXT2.

VIDNXT2 is activated when the horizontal counter 1154 indicates a negative 1 or if bit 0 is a 1 and bit 8 is a 0, which occurs 40 times a scan line. Since the MUX 1024 utilizes VIDNXT2 as a select signal, the addresses generated by the scan address generator 1026 are selected 40 times a line. Furthermore, the scan address generator clock signal input line 1052 is connected to an output of the elements 1177 so that the scan address generator is clocked 40 times a scan line to output 40 sequential addresses synchronously with the MUX 1024. VIDNXT2 is also utilized to generate the RAS (row address strobe) signals at 1179 for the video cycles.

Figure 63:
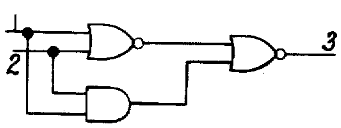
Figure 52:
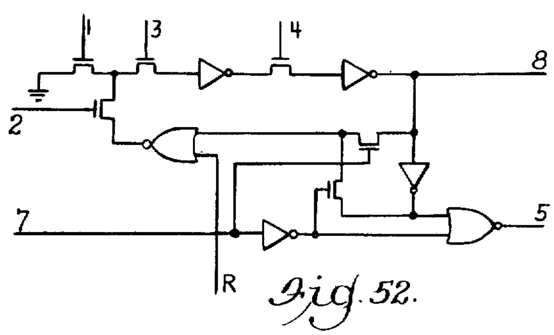
Figure 49:
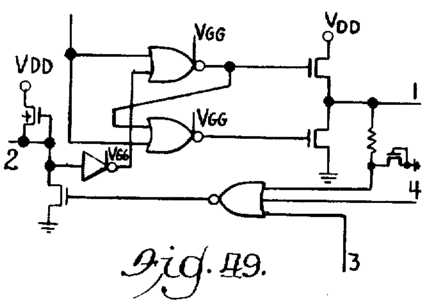

The output of the line counter 1138 is also connected to the inputs of the comparator 1140 shown to comprise 8 exclusive-OR units 1140*a–h* (with unit 1140*a*, typical of the units 1140*a–h*, shown in greater detail in FIG. 63) and a PLA 1172 connected to the outputs of the units 1140*a–h*. The comparator 1140 further comprises the flip-flop 1142 connected to the output of the PLA 1172 by a NOR gate 1174. The comparator 1140 has further inputs connected to the outputs of the interrupt line register 1136 which comprises bits 1136*a–h* (with the bits 1130*a–h* logically similar to that shown in FIG. 50). The interrupt line register 1136 which stores the screen interrupt line number from the CPU, has further input connected to the register select line 1012 from the address decoder 1008 by which the CPU may address the interrupt line register 1136 in order to input the interrupt line number.

The comparator 1140 compares the number of the current line being displayed by the display unit as indicated by the line counter 1138 with the line number stored in the interrupt line register 1136. When the line counter reaches the number in the line register 1136, the flip-flop 1142 (shown in greater detail in FIG. 64) is set. The flip-flop 1142 has an output line 1176 connected to the interrupt circuitry shown at 1144 which carries the screen interrupt signal to the interrupt circuitry.

The interrupt circuitry 1144 has an input line 1178 which carries the $\overline{\text{LIGHT PEN}}$ signal which indicates that the raster scan has crossed the point where the light pen 62 (FIG. 2) is located. The line 1178 is connected by resistor 1180 and NOR gate 1182 to the clock input of a flip-flop 1184. The output of the flip-flop 1184 is connected to the input of a flip-flop 1186 (with flip-flop 1184 logically similar to that shown in FIG. 64 and flip-flop 1186 logically similar to that shown in FIG. 54).

Figure 65:
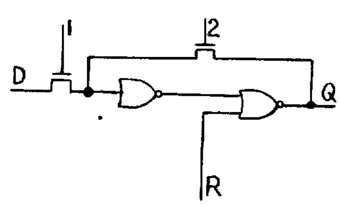
Figure 66:
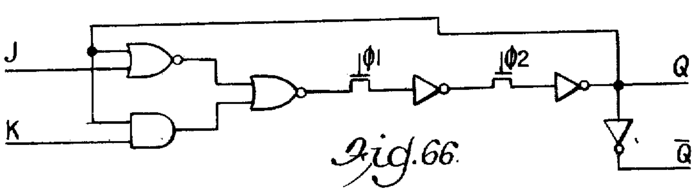
Figure 64:
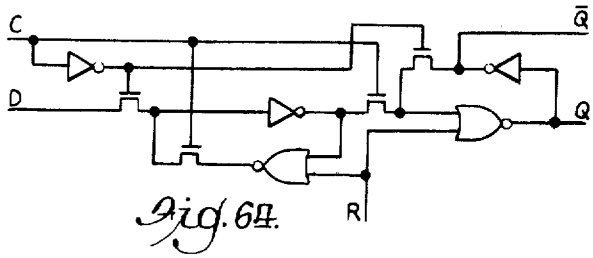
Figure 56:
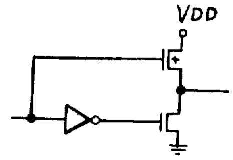
Figure 55:
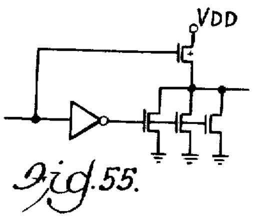
Figure 50:
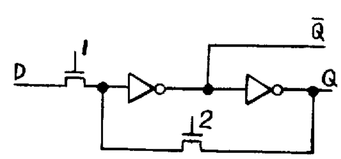

The interrupt mode and enable registers 1158 comprise 5 bits 1158*a–e* (with bit 1158*b* shown in greater detail in FIG. 65 and bits 1158*a* and 1158*c–e* logically similar to that shown in FIG. 50). The output of bit 1158*b* or bit 1 (which is the light pen enable bit) is connected to the input of an AND gate 1188 which is connected to the input of a NOR gate 1190. The other input to NOR gate 1190 is connected to the output of bit 4 or bit 1158*e* of the register 1158. The other input of the AND gate 1188 is connected to the output of a flip-flop 1192 (shown in greater detail in FIG. 66) whose input is connected to the output of a decoder indicated generally at 1194 which decodes the output of the horizontal counter 1154. The output of the NOR gate 1190 is connected by a NOR gate 1196 to the D input of the flip-flop 1184.

The output line 1176 from the flip-flop 1142 (which carries the screen interrupt signal) is connected to the clock input of a flip-flop 1198 (logically similar to that of flip-flop 1184). The output of the flip-flop 1198 is connected to the D input of a flip-flop 1200 (which is logically similar to that shown in FIG. 54 for the flip-flop 1186).

The output of bit 3 or bit 1158*d* (which is the screen interrupt enable bit) of the interrupt enable and mode registers 1158 is connected to the D input of the flip-flop 1198. The output of the flip-flop 1184 is also connected by a line 1202 to the input of a plurality of logic elements 1204 whose output is connected to a plurality of logic elements 1206 having the output line 1164 which is connected to the latch enable inputs of the vertical feedback register 1150 and horizontal feedback register 1152. The output of the flip-flop 1184 is also connected to the input of a NOR gate 1208 whose output is connected to a plurality of logic elements 1210 having an output line 1212. The output line 1212 is connected by a line 1214 to an output buffer 1216 whose output line 1218 carries the control signal $\overline{\text{INT}}$ which is the interrupt control signal to the CPU. The output line 1212 is also connected by a plurality of logic elements indicated generally at 1220 (which includes a flip-flop 1221) to the input of a flip-flop 1222. (The flip-flop 1221 and 1222 are logically similar to the flip-flop shown in FIG. 67.) The $\overline{\text{Q}}$ output of the flip-flop 1222 is connected to the input of NOR gates 1223 and 1224 which have other inputs connected to a line 1225 which carries the CPU control signal M1 from the output of an inverter 1226 whose input is connected by a resistor 1228 to the CPU control signal $\overline{\text{M1}}$ input 1230.

The output of the NOR gate 1223 is connected to the input of a NOR gate 1232 which has an input connected to the output of the NOR gate 1234. The NOR gate 1234 has an input connected to the $\overline{\text{Q}}$ output of the flip-flop 1186 into the Q output of the flip-flop 1200 and an input connected to a line 1236 which is connected to the output of an inverter 1238.

The output of the inverter 1226 is connected to the input of a NOR gate 1240 whose output is connected to a NOR gate 1242. The NOR gate 1242 has another input connected to the CPU control signal $\overline{\text{IORQ}}$ input pad 1244. The output of the NOR gate 1242 is connected by a buffer 1246 to the input of the inverter 1238.

The output of the NOR gate 1232 is connected by an inverter 1248 to the reset input of the flip-flop 1184. The output of the NOR gate 1224 is connected to the input of a flip-flop 1250 which has an input connected to the output of a NOR gate 1252. The NOR gate 1252 has an input connected to the $\overline{\text{Q}}$ output of the flip-flop 1200 and an input connected to the line 1236.

The output of the bit 1158*a* of the interrupt mode and enable register 1158 (which is the mode bit for the light pen interrupt) is connected to the input of the NOR gate 1223. The $\overline{\text{Q}}$ output of the flip-flop 1158*c* (which is the mode bit for the screen interrupt) is connected to an input of the NOR gate 1224.

The output of the AND gate 1188 is a logical 1 when the light pen interrupt enable bit 1158*b* and the output of the flip-flop 1192 from the decoder 1194 are logical 1. The flip-flop 1192 is set to 1 when the pixels being displayed are defined by the display RAM, i.e., they are not background pixels. A logical 1 output of the AND gate 1188 causes the NOR gate 1190 to output a logical 0 causing the NOR gate 1196 to output a logical 1 which is presented to the D input of the flip-flop 1184.

The $\overline{\text{LIGHT PEN}}$ signal on line 1178 goes low when the raster scan crosses the point where the light pen is located causing the output of the NOR gate 1182 to go high which clocks the flip-flop 1184 to a logical 1 when the D input is a 1 which is a function of the light pen enable bit 1158*b*. The flip-flop 1186 will also be clocked to a logical 1. Since the output of the flip-flop 1184 is a logical 1, the output of the NOR gate 1208 is a logical 0 causing the output line 1212 and line 1214 to subsequently become a logical 1. This in turn causes the output line 1218 to become a logical 0 which is the CPU interrupt control signal $\overline{\text{INT}}$ for interrupts.

The logical 1 state on the line 1214 subsequently causes the flip-flop 1222 to assume a logical 1 state and the $\overline{Q}$ output to assume a logical 0. With the light pen mode bit 1158*a* at a logical 0 (mode 0) the $\overline{Q}$ output of the bit 1158*a* is a logical 1 which causes the output of the NOR gate 1223 to be a logical 0 and thus the output of the NOR gate 1232 depends upon the output of the NOR gate 1234. The flip-flop 1193 is set when the line number contained in the interrupt line register equals the current line number as indicated by the line counter (which initiates a screen interrupt). For purposes of illustration, it will be assumed that this condition is not true and that the output of the flip-flop 1198 which is connected to an input of the NOR gate 1234 is a logical 0. The state of the input line 1236 to the NOR gate 1234 is a logical 0 when the CPU acknowledges an interrupt. Thus, if the interrupt is acknowledged, all of the inputs of the NOR gate 1224 are a logical 0 and the output is a logical 1 causing the output of the NOR gate 1232 to be a logical 0. This output is inverted by the inverter 1243 which causes the flip-flop 1184 to be reset which causes the interrupt signal $\overline{INT}$ on output line 1218 to return to a logical 1 state.

If the interrupt has not been acknowledged, the state of the input line 1236 is a logical 1 causing the output of the NOR gate 1234 to be a logical 0, the output of the NOR gate 1232 to be a logical 1, and the output of the inverter 1248 to be a logical 0 and the flip-flop 1184 will not be reset. Thus, the interrupt signal $\overline{INT}$ will remain a logical 0 and the CPU will continue to be interrupted until it acknowledges the interrupt since the light pen interrupt is in mode 0.

If the light pen mode bit 1158*a* contained a logical 1 (mode 1) the $\overline{Q}$ output of bit 1158*a* is a logical 0. Since the $\overline{Q}$ output of the flip-flop 1222 is a logical 0, when the M1 signal also goes low (after the next instruction has been fetched) the output of the NOR gate 1223 will become a logical 1 causing the output of the NOR gate 1232 to be a logical 0 and the output of the inverter 1248 to be a logical 1 which resets the flip-flop 1184. When this flip-flop is reset, the interrupt signal $\overline{INT}$ returns to a logical 1. Thus, the CPU must acknowledge the interrupt upon the next instruction if at all, in Mode 1.

The output of the screen interrupt enable bit 1158*d* is the D input of the flip-flop 1198 which is clocked by the output of the flip-flop 1142. As noted before, the flip-flop 1142 is set when the line number being displayed as indicated by the line counter 1138 reaches the line number stored in the interrupt line register 1136 which initiates a screen interrupt when enabled. If the enable bit 1158*d* contains a 1, the flip-flop 1198 will be clocked to 1 when the flip-flop 1142 is set. Otherwise, it will remain 0 since its D input is 0.

Since the output of the flip-flop 1198 is also connected to an input of the NOR gate 1208, when the flip-flop 1198 is set, the interrupt control signal $\overline{INT}$ subsequently goes low indicating an interrupt just as for the light pen interrupt. Modes 0 and 1 for the screen interrupt are indicated by the bit 1158*c* also operate in a manner similar to that for the light pen interrupt.

Thus, the flip-flop 1222 subsequently assumes a logical 1 state when the $\overline{INT}$ signal is activated due to a screen interrupt as well. With the screen interrupt mode bit 1158*c* at a logical 0 (mode 0), the $\overline{Q}$ output of the bit 1158*c* is a logical 1 which causes the output of the NOR gate 1224 to be a logical 0 and thus the output of the NOR gate 1250 depends upon the output of the NOR gate 1252.

The Q output of the flip-flop 1200 is set to 1 (after being clocked by M1) when the flip-flop 1198 is set and thus the $\overline{Q}$ output of the flip-flop 1200 goes to 0. When the CPU acknowledges the interrupt (i.e., the state of the line 1236 becomes a 0) the output of the NOR gate 1252 becomes a logical 1. This causes the output of the NOR gate 1250 to become a logical 0, the output of the inverter 1251 to become a logical 1 and the flip-flop 1198 to reset. This in turn deactivates the interrupt signal $\overline{INT}$.

Had the screen interrupt mode bit 1158*c* been set to 1 (i.e., mode 1), the output of the NOR gate 1224 would go to 1 when the CPU signal M1 goes to 0 (i.e., after the next instruction). This causes the output of the NOR gate 1250 to become a logical 0, the output of the inverter 1251 to become a logical 1 and the flip-flop 1198 to be reset. Thus, the interrupt will be discarded if not acknowledged by the next instruction in mode 1.

Figure 68:
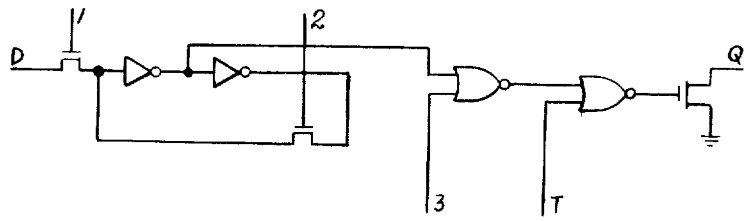
Figure 69:
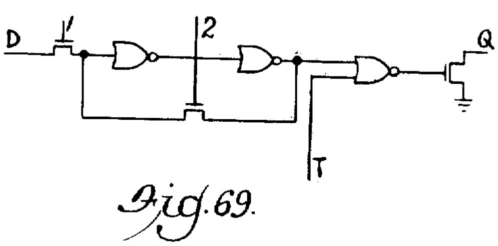
Figure 58:
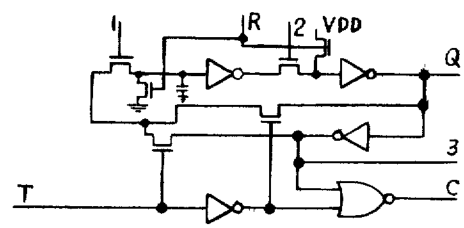

The input feedback register is indicated at 1156 and comprises 8 bits 1156*a–h* (with bit 1156*a* typical of bits 1156*a–d* shown in greater detail in FIG. 68 and bit 1156*e* typical of bits 1156*e–h* shown in greater detail in FIG. 69). The D input and Q output of each bit of the interrupt feedback register 1156 is connected to the data bus 66*b*. The interrupt feedback register 1156 has an input connected to the register select line 1024 from the address decoder 1008 by which the CPU may address the interrupt feedback register and store interrupt data in the register. Each bit also has a latch enable input connected to the line 1236 which goes low when the CPU acknowledges the interrupt. Thus, when the CPU acknowledges an interrupt, the data contained within the interrupt feedback register 1156 is conducted to the data bus 66*b* and transmitted to the CPU. The bits 1156*a–d* have a reset input connected by a line 1260 through the $\overline{Q}$ output of the flip-flop 1200.

When the flip-flop 1200 contains a logical 1 indicating a screen interrupt, the $\overline{Q}$ output is a logical 0 and the data stored in the bits 1156*a–h* by the CPU is conducted back to the CPU on the data bus 66 unmodified when the CPU acknowledges the interrupt. Since the data is unmodified, it indicates to the CPU that the interrupt was a screen interrupt. However, if the flip-flop 1200 contains a logical 0, the $\overline{Q}$ output is a logical 1 which causes the bits 1156*a–d* to all conduct 0's onto the data bus 66 in response to an interrupt acknowledge signal indicating a light pen interrupt. The bits 1156*e–h* are conducted unmodified. Since the flip-flop 1200 is set by the occurrence of a screen interrupt, screen interrupts have priority over light pen interrupts.

The output of the line counter 1138 is shown in FIG. 44 to be also connected to a comparator 1262 which also has inputs from a vertical blank register 1264. The vertical blank register 1264 contains the line number at which pixel data from the display RAM is no longer used to define the pixels displayed on the screen and has the same address as the vertical blank register of the data chip but is utilized for a different purpose. When the line counter 1138 reaches the line number contained within the vertical blank register 1264, the comparator 1262 outputs a signal which is used by a memory cycle generator 1266 to activate a memory refresh cycle.

The memory cycle generator controls memory cycles generated by either CPU initiated reads or scan address generator read operations. The generator inputs include the CPU control signals $\overline{MREQ}$, $\overline{RD}$, $\overline{IORQ}$, $\overline{M1}$ and $\overline{RFSH}$, and address bits A12–A15 which are transmitted directly from the CPU. The RAS0–RAS3 outputs are generated by the memory cycle generator 1266 and are used to activate memory cycles. In the low resolution mode, only RAS0 is used to one bank of RAM (4K by 8). In the high resolution mode, all four RAS signals are used to control four banks of RAM (16k×8). Two other signals generated are WRCTL and LTCHDO which are control signals to the data chip. Also, a $\overline{\text{WAIT}}$ signal is generated to initiate a wait state in the CPU.

The vertical blank register is indicated at 1264 in FIG. 45 and comprises 8 bits 1264*a–h* (with each bit logically similar to that shown in FIG. 50). The vertical blank register 1264 has a register select line 1016 at which the CPU may address the vertical blank register and input data from the data bus 66*b* which is the line number at which "blanking" occurs. The Q and $\overline{\text{Q}}$ output of each bit of the vertical blank register 1264 is connected to the comparator indicated generally at 1262 which comprises a programmed logic array 1268 which includes a plurality of pull-down transistors 1269 and pull-up transistors 1270 and a plurality of NOR gates 1271. The comparator 1262 also has inputs connected to the output of the line counter 1138 as previously mentioned.

The output of the comparator 1262 is connected to the D input of a flip-flop 1272 (shown in greater detail in FIG. 64) which has a reset input connected to the output of a flip-flop 1300 (shown in greater detail in FIG. 58) which has an input connected to the most significant bit 1138*h* circuit of the line counter 1138. The $\overline{\text{Q}}$ output of the flip-flop 1272 is connected by a line 1274 to an input of the memory cycle generator indicated generally at 1266.

Figure 70:
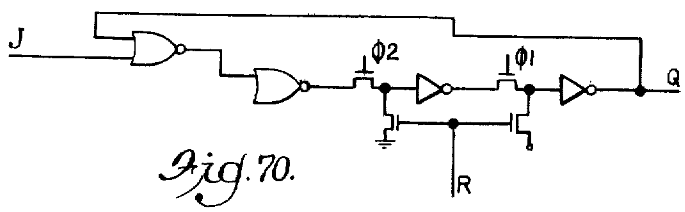
Figure 48:
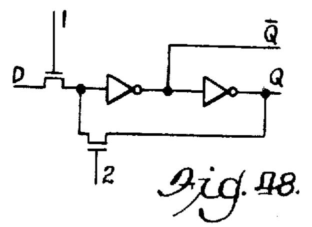
Figure 95:
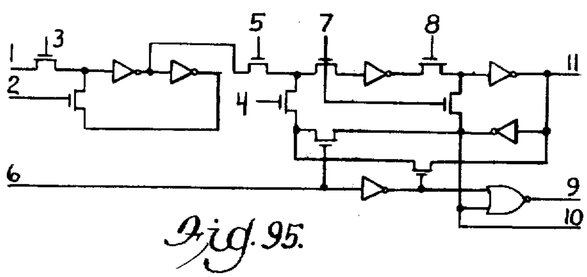

The memory cycle generator comprises a PLA 1275, which includes pull-down transistors 1276 and pull-up transistors 1278, and a J-K flip-flop 1280 (shown in greater detail in FIG. 70). The generator 1266 further comprises J-K flip-flops 1282*a–g* (each of which is logically similar to that shown in greater detail in FIG. 66) and bits 4 and 5 of a function generator register (each of which is logically similar to that shown in FIG. 50) having the same address as the function generator register of the data chip.

A RAS signal is generated for display RAM accesses and thus is the function of $\overline{\text{MREQ}}$, and VIDNXT2 and the address bits A12, A13 and A15 (to determine whether the memory access concerns the display RAM). A $\overline{\text{WAIT}}$ signal is generated to initiate a wait state in the CPU for all input and output operations (IORQ) to compensate for any delay due to the microcycler since the CPU address bus and data bus "time share" the microcycle data bus. Wait states are similarly initiated for CPU read and write operations (for data and instructions). Two wait states from and to the display RAM are generated if the CPU is executing instructions in the display RAM.

An additional wait state is initiated if the CPU and the video processor attempt to access the display RAM at the same time. A $\overline{\text{WAIT}}$ signal is transmitted to the CPU when VIDNXT2 is active (indicating the next memory access cycle is to be a video cycle) and the CPU also requests the display RAM (MREQ). LTCHDO becomes active when data being read from the display RAM is on the display RAM data bus. LTCHDO enables the OR/exclusive-OR circuit of the data chip to latch up the data on the memory data bus. WRCTL indicates that the present memory cycle is a write operation rather than a read.

Figure 12B:
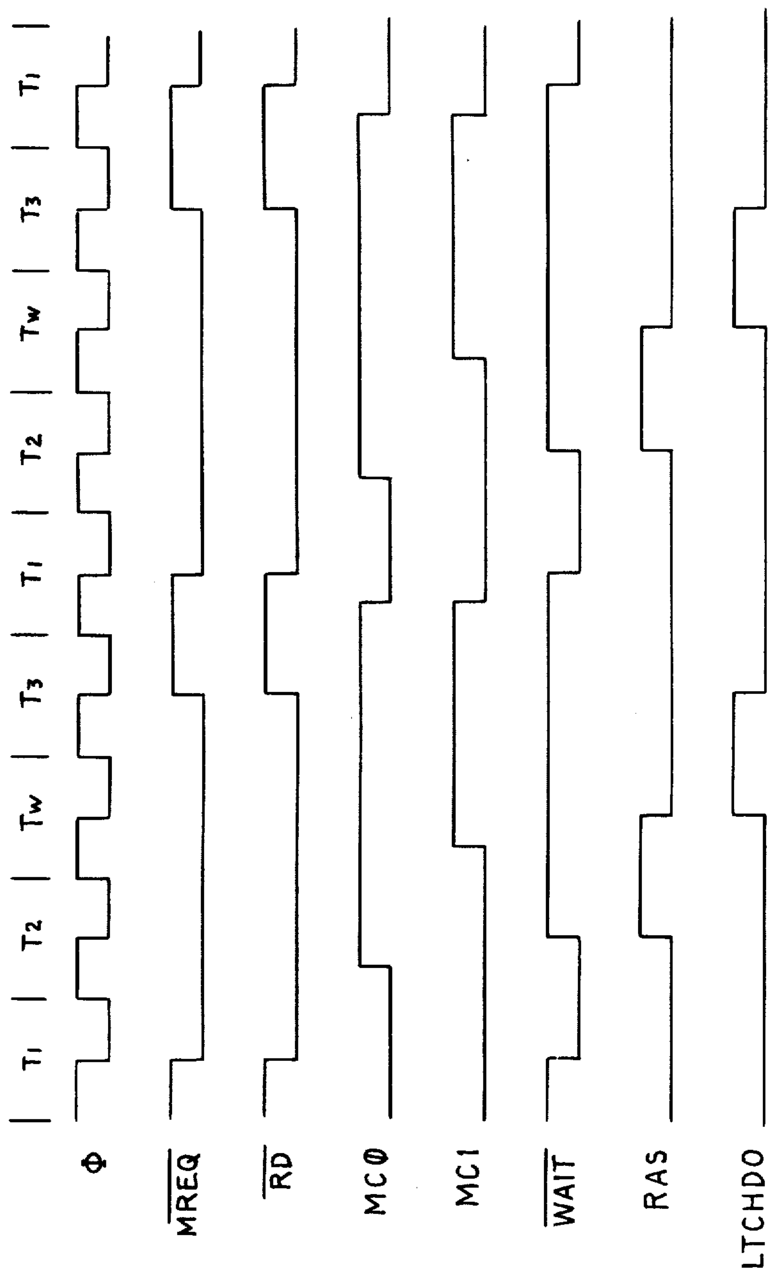
Figure 12C:
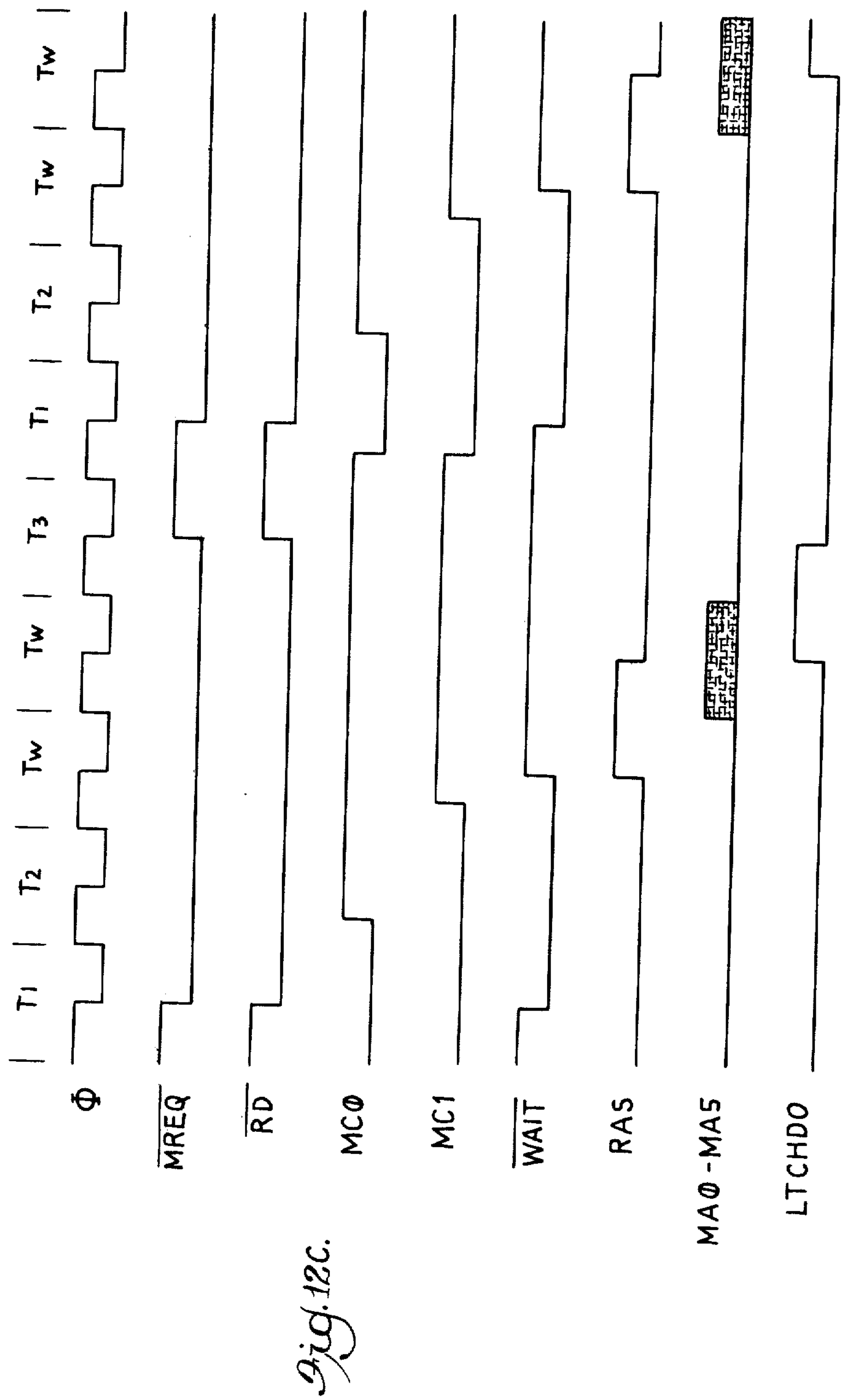
Figure 12D:
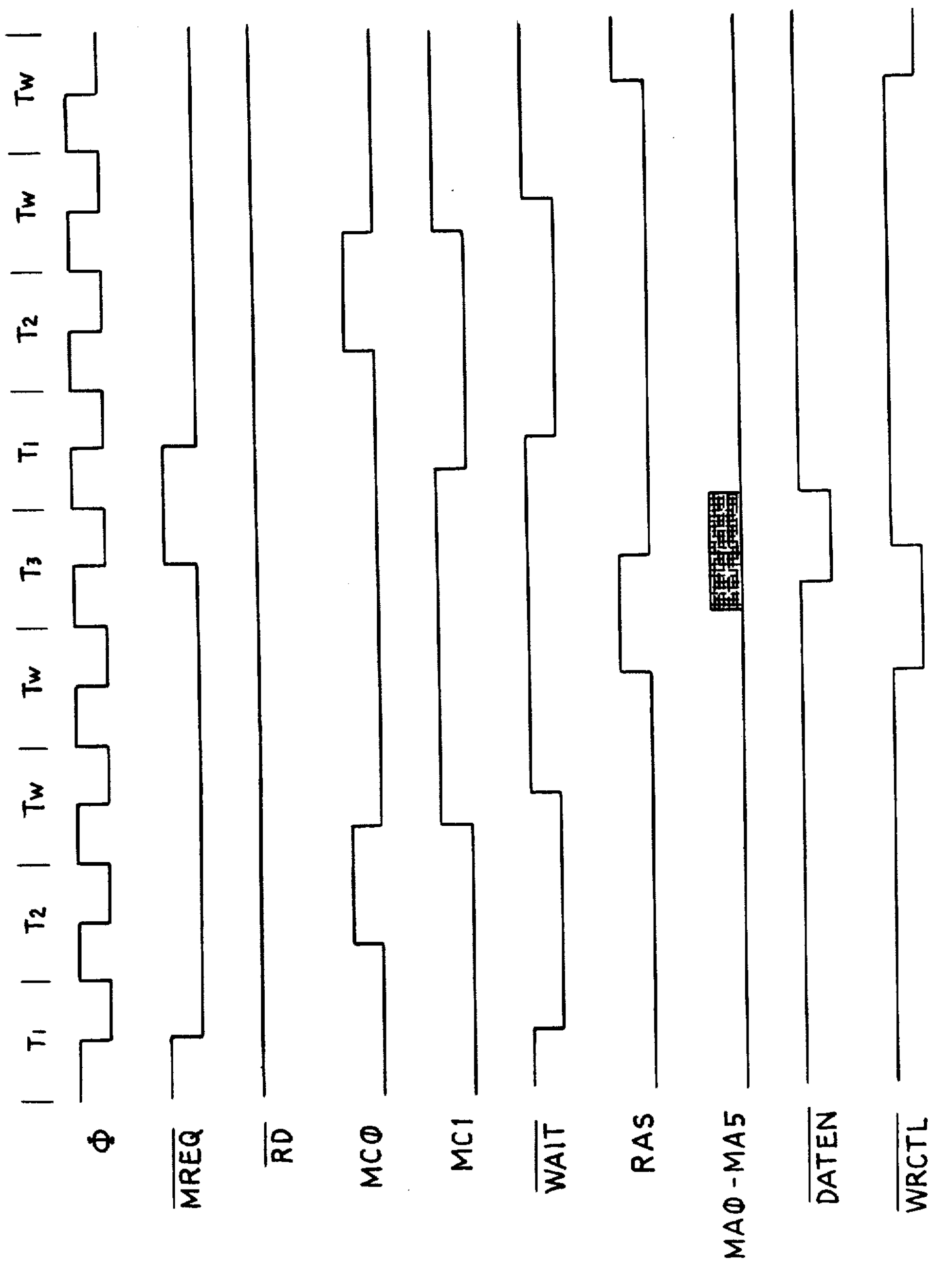

The relationship between the input signals $\overline{\text{MREQ}}$, $\overline{\text{RD}}$ from the CPU and the clock signal Φ to the memory cycle generator outputs $\overline{\text{WAIT}}$, RAS, $\overline{\text{WRCTL}}$ and LTCHDO are shown for CPU read and write operations to the display RAM with FIGS. 12A and D illustrating write operations and FIGS. 12B and C, read operations. FIGS. 12C and D illustrate the extra wait state generated when a CPU read or write conflicts with a video cycle by the video processor. The shaded areas of the MA0–MA5 lines are determined by the address bits MA0–MA5.

Figure 12E:
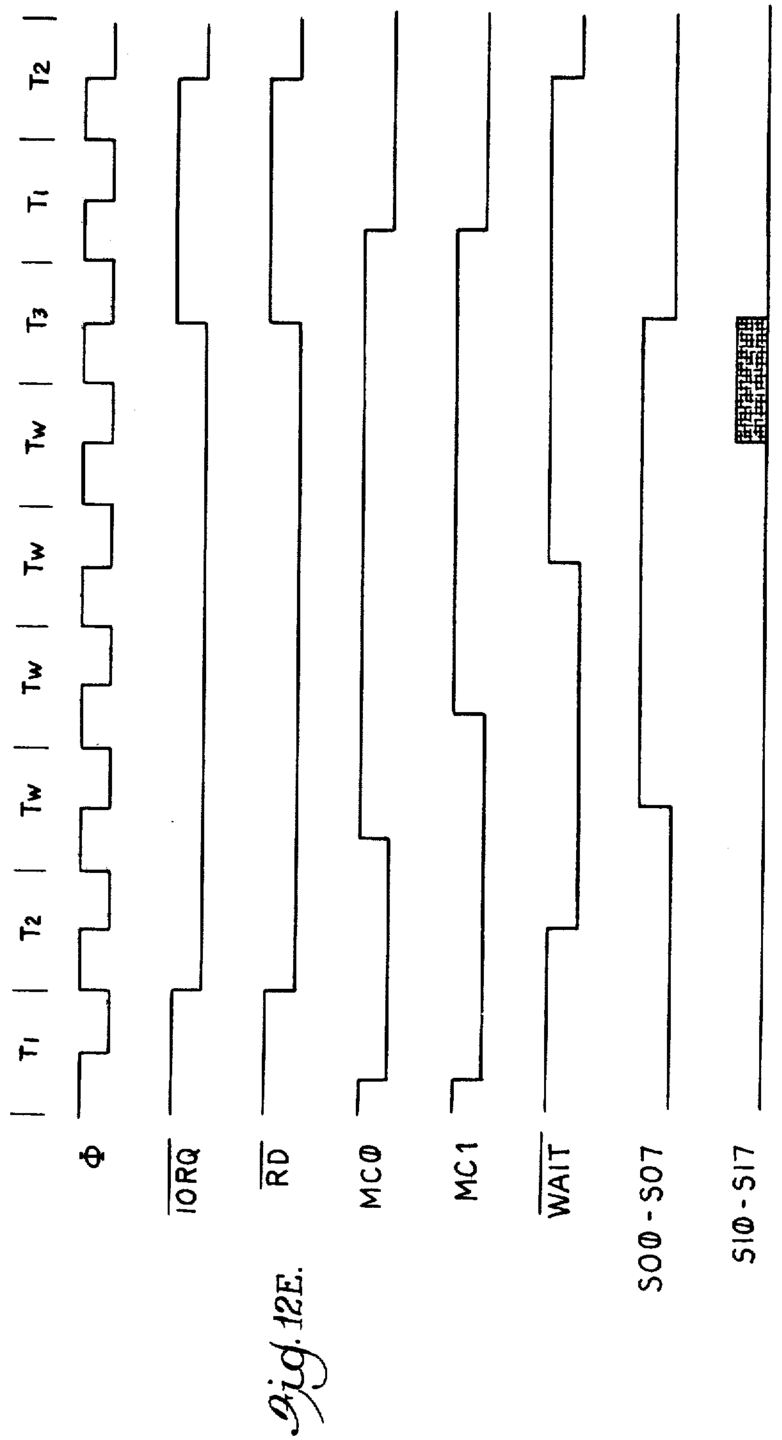

The relationship between the inputs of CPU control signals $\overline{\text{IORQ}}$, $\overline{\text{RD}}$ and the clock signal Φ and the memory cycle output WAIT is shown for input/output read operations in FIGS. 12E and G and input/output write operations in FIG. 12F. FIG. 12E illustrates an I/O read from the switch matrix ports 10H–17H and FIG. 12G illustrates I/O reads from the other ports.

The RAS0 output of the address chip is shown in FIG. 10C to be connected to the D input of a flip-flop 956 of the logic elements 954, whose $\overline{\text{Q}}$ output carries the $\overline{\text{CS}}/\overline{\text{RAS}}$ (chip select and row address strobe) signal for the display RAM 42 and is connected to the RAM control signal bus 958. The clear input of the flip-flop 956 is connected to the output of a NAND gate 960 having inputs connected to the Q output of the flip-flop 956, the clock signal Φ from the buffer 100 and the $\overline{\text{Q}}$ output of a flip-flop 962.

The D input of the flip-flop 962 is connected to the clock signal Φ and the Q output is connected to the clock input of the flip-flop 956. The flip-flop 962 is clocked by the clock signal $\overline{\text{PX}}$. The flip-flop 956 operates to invert the signal RAS0 and to delay it to produce the $\overline{\text{CS}}/\overline{\text{RAS}}$ signal at its $\overline{\text{Q}}$ output, the delay being a function of the clock signal Φ and $\overline{\text{PX}}$ inputs to the logic elements 954.

The $\overline{\text{DATEN}}$ output of the data chip 54 is connected to the input of a NOR gate 964 having a grounded input and an output connected to the enable input of the tri-state drivers 966*a–h* connected to the DO output of the RAM chips 104*a–h*, respectively. The output of the drivers are connected to the memory data bus 102.

The output of the NOR gate 964 is connected to the input of a NAND gate 968 whose output is connected to the control signal bus 958 and carries the write enable signal, $\overline{\text{WE}}$. The other input of the NAND gate 968 is connected to the Q output of a flip-flop 970 whose D input is connected to the Q output of the flip-flop 962. The $\overline{\text{Q}}$ output of the flip-flop 970 is connected to the control signal bus 958 and carries the column address strobe ($\overline{\text{CAS}}$) signal. The flip-flop 970 is clocked by the output of a flip-flop 972 which is enabled by the $\overline{\text{PX}}$ and PX clock signals.

When $\overline{\text{DATEN}}$ goes low, the output of the NOR gate 964 goes high which turns off the drivers 966*a–h*. Subsequently, when the clock signal from the $\overline{\text{Q}}$ output of the flip-flop 970 goes high, the output of the NAND gate 968 goes low which enables the RAM's 104*a–h* to have data written in them.

I/O CHIP

As noted before, the control handles 12*a–d* and the keypad 18 (FIG. 2) are connected to the I/O chip 50 and provide signals in response to manipulation by the players or operators to the I/O chip. The CPU 46 of the digital computer 44 receives the keypad and control handle input signals from the I/O chip 50 in the digital form. The I/O chip has a music processor which provides audio signals to RF modulator 58 in response to output data signals from the computer to play melodies or generate noise through the TV 28.

The interconnection of the I/O chip 50 within the system is shown in FIG. 10C. The I/O chip has inputs MXD0-MXD7 connected to the microcycle data bus 66 and inputs $\overline{RD}$ and $\overline{IORQ}$ for the CPU control signals READ and INPUT/OUTPUT REQUEST, respectively and inputs for the clock signals Φ and $\overline{\Phi}$.

Outputs POT0-POT1 are each operatively connected to one of the potentiometers of the player control handles 12*a-d*. A signal transmitted to one of the potentiometers results in a signal returned to input MONOS which will be more fully explained later. Outputs SO0-SO7 are selectively coupled to the keys and switches of the keypad 18 and player control handles 12*a-d* of the switch matrix shown in FIG. 8. Activation of one of the outputs SO0-SO7 results in signals being received at the switch inputs SI0-SI7 also to be more fully explained later. The I/O chip has power supply inputs VDD, VGG and VSS connected to +5 v, +10 v and ground, respectively, a TEST input connected to the +5 v supply and a $\overline{RESET}$ input connected to the extension plug 77.

The CPU communicates with the I/O chip shown in block diagram in FIGS. 71A-C, through input and output instructions. Each input or output instruction has an address at which data is to be inputted from or outputted to. This address is transmitted to the input/output chip 50 (FIG. 71A) via the microcycle data bus 66, tri-state buffer 1400, and I/O data bus 66*c* to a microcycle decoder 1402 which assembles the address in a manner similar to that described for the microcycle decoder of the data chip. The microcycle decoder 1402 assembles the 11 bit address, A0-A10, which is decoded by an address decoder 1404. The address decoder 1404 has an input for the $\overline{INPUT}$ control signal and input for the $\overline{OUTPUT}$ control signal which are activated in conjunction with an input or an output instruction, respectively. The address decoder 1404 decodes the address from the microcycle decoder 1402 and activates one of the select lines 1406-1415 with select lines 1406 comprising eight select lines SO0-SO7. The particular select line activated depends upon the address transmitted to the address decoder 1404 and the state of the INPUT and OUTPUT control signals.

The select lines SO0-SO7 have addresses 10-17H and are activated with an input instruction. When one of these lines is activated, the switch matrix (shown in FIG. 8) will feedback the associated 8 bits of data on an input bus, SI0-SI7 indicated at 1418 to a multiplexer 1420 which will gate the data to a data bus 66*d* which is connected to the microcycle data bus 66 by the tri-state buffer 1400. Thus for example, if an input instruction transmits the address 12H to the address decoder 1404, the select line SO4 will be activated which will cause the keypad data indicated at 1422 (FIG. 8) of the switch matrix to be conducted to the microcycle data bus on the input data bus 1418.

The select lines 1407-1414 are output register select lines. These lines are activated with the concurrence of the OUTPUT control signal (which is activated by an output instruction) and the associated address (Table II) of a master oscillator, tone A frequency, tone B frequency, tone C frequency, vibrato and noise volume registers. In addition are the tone C volume, noise modulation, and MUX output registers and tone A and tone B volume output registers. These output registers are part of the music processor in which the CPU loads data with output instructions. This data determines the characteristics of the audio signal that is generated.

The CPU can read the positions of the four potentiometers 17 of the four player control handles 12*a-d* (FIG. 1) through an analog-digital converter circuit indicated generally at 1422. The potentiometers are continuously scanned by the analog-digital (A-D) converter circuit and the digital results of the conversion are stored in the pot 0-3 registers 1424. The CPU reads these registers with input instructions.

The CPU can address the registers 1424 by transmitting the address of one of the registers to the address decoder 1404 which activates the select line 1415. A potentiometer (or pot) register address decoder 1426 has an input for the select line 1415 as well as the address bits A0 and A1. The pot register address decoder 1426 decodes these inputs to select one of the four registers, pot 0-pot 3. A selected register feeds back all 0's when the corresponding potentiometer is turned fully counterclockwise and all 1's when turned fully clockwise.

The output of a 2-bit "scan" counter 1428 is connected to the inputs of a scan decoder 1430 which has a 4-bit output line 1432 indicated as POT 0-3 and 4 register select lines connected to the pot 0-3 registers 1424. Each line of the POT 0-3 lines 1432 is operatively connected to an associated potentiometer. Thus, for example, the POT 0 line of the line 1432 is shown connected to the associated potentiometer 17 of the player control handle 12*a* in FIG. 72. The potentiometer is connected to a capacitor 1436 having an output line 1438 which carries the analog signal MONOS.

Referring back to FIG. 71A, a comparator 1440 has an input for the analog signal MONOS which is compared to a reference signal REF. The output of the comparator 1440 is connected to a counter 1442 which counts until the voltage signal MONOS across the capacitor 1436 reaches the reference REF.

The scan decoder 1430 decodes the output of the scan counter 1428 to sequentially activate the POT 0, POT 1, POT 2 and POT 3 lines of the lines 1432. Thus, when the POT 0 line is activated, the capacitor 1436 shown in FIG. 72 will begin to charge and the MONOS analog signal will begin rising. As the MONOS signal rises, the counter 1442 continues counting until the MONOS signal reaches the RAF signal. At that point, the counter 1442 stops. The rate at which the capacitor charges is related to the setting of the associated potentiometer. Thus the count that the counter 1442 reaches is determined by the potentiometer setting.

Synchronously with the sequential activation of the output lines 1432, the register select lines 1434 are activated such that the pot 0 register is selected to input the output of the counter 1442 after the POT 0 line is activated and the output of the counter 1442 is determined by the setting of the potentiometer of the control handle 12*a*. Next, the pot 1 register is selected to input the digital data representing the setting of the potentiometer of the control handle 12*b*, etc.

The CPU may then input this data by sending the corresponding addresses of the potentiometer registers 1424 (Table II) to the address decoder 1404 and pot register address decoder 1426. Each of the pot 0-3 registers 1424 are connected to the multiplexer 1420 by an 8 bit output line 1444. The multiplexer 1420 has an input for the line 1415 such that when an address corresponding to one of the pot 0-3 registers 1424 is sent by the CPU to input the data contained by the registers 1424, the multiplexer 1420 selects the 8 bits of data on the line 1444 from the registers 1424 and conducts them to the data bus 66*d*.

The I/O chip is shown in greater detail in FIGS. 73A–M with a composite diagram of FIGS. 73A–M shown in greater detail in FIG. 74. The microcycle decoder is indicated generally at 1402 in FIG. 73 and comprises 11 bit circuits 1402*a–k* for the address bits A0–A10, respectively, (with the decoder bit circuit 1402*a* typical of the bits 1402*a–k* shown in greater detail in FIG. 75). The low address bits A0–A7 are loaded by the bit circuits 1402*a–h* of the microcycle decoder 1402 on the control signal LDL1, with the high address bits A8–A10 loaded on the control signal LDH1 in a manner similar to that for the microcycle decoders of the address and data chips.

The address decoder is indicated generally at 1404 in FIG. 73 and comprises a PLA just as for the address and data chips. The address decoder 1404 decodes the address bits from the microcycle decoder 1402 and activates one of the switch matrix input port select lines SO0–SO7 indicated at 1406, (each of which is the output of a driver 1704, shown in greater detail in FIG. 76) if the corresponding address is present as well as the control signal $\overline{\text{INPUT}}$ on line 1446. Similarly, the address bits can be decoded to activate the associated music processor output port select lines 1407–1414 if the output control signal $\overline{\text{OUTPUT}}$ on line 1448 is active. All the music processor registers can be loaded with one Z-80 OTIR instruction. The contents of register C should be sent to output port address 18H, register B to 8H and HL should point to the 8 bytes of data. The output lines 1451 are sequentially activated such that the register select lines 1414–1407 are sequentially activated with the data pointed to by HL going to output port 17H (noise volume register) and the next 7 bytes going to output ports 16H–10H.

The pot register input select line 1415 of the address decoder 1404 is also indicated. The switch input lines SI0–SI7 are indicated generally at 1418 and are operatively connected to the multiplexer indicated generally at 1420. The gates of the transistor switches which comprise the multiplexer 1420 are connected to the output of an inverter 1450 whose input is connected to the line 1415. When the logic state of the line 1415 is a logical 1, the pot 0–3 registers 1424 are selected causing output of the inverter 1450 to be a logical 0 which turns off the transistor switches of the multiplexer 1420 thereby turning off the SI0–SI7 inputs.

Figure 77:
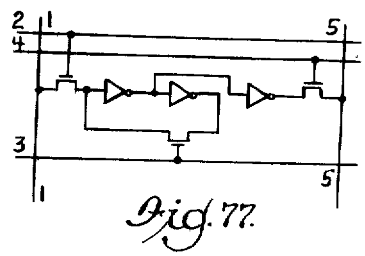
Figure 97:
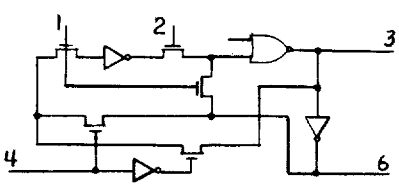
Figure 78:
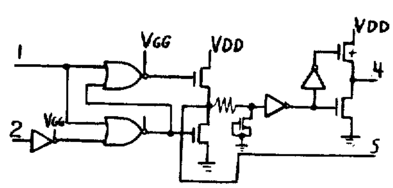

The pot 0–3 registers are indicated generally at 1424 (with the least significant bit 1424*a* of the pot 0 register typical of the bits of the registers 1424, shown in greater detail in FIG. 77.) The output of each of the potentiometer registers 1424 is connected by the 8-bit output line 1444 to the output of the associated transistor switches of the multiplexer 1420. The output of the switches of the multiplexer 1420 are also connected to the 2 input of the tri-state buffer indicated generally at 1400 (with unit 1400*a*, typical of the 8 units of the tri-state buffer 1400 shown in greater detail in FIG. 78) by the I/O chip data bus 66*d*. The input/output terminal 3 of each unit of the tri-state buffer 1400 is connected to the microcycle data bus 66.

The 1 input of each buffer unit is connected to the output of an inverting gate 1553 (shown in greater detail in FIG. 79) which has an input line 1555 and an input line 1557, both from the address decoder 1404. The line 1555 is activated by addresses 10H–17H (the switch matrix input ports) and the line 1557 is activated by addresses 1CH-1FH (the potentiometer input registers). The activation of either line allows the tri-state buffer 1400 to transmit the data from the switch matrix or the potentiometer registers to the microcycle data bus 66.

Figure 80:
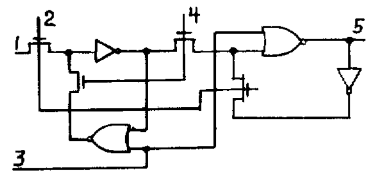
Figure 92:
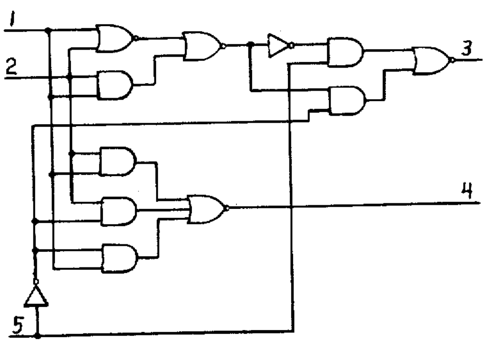

The scan counter is indicated generally at 1428 in FIG. 73 and comprises a 2-bit counter (with the least significant bit 1428*a* shown in greater detail in FIG. 80). The inputs of the counter 1428 are connected to the output of a flip-flop 1452, the output of which is connected to an input line 1454 which carries the clock signal. The output of the scan counter 1428 is connected to the scan decoder indicated generally at 1430 which comprises a PLA having four output lines 1432 and four output lines 1434.

Figure 81:
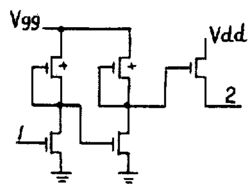

The output lines 1432 are connected to the POT 0, POT 1, POT 2 and POT 3 output pins of the I/O chip, respectively, by a buffer 1456 (shown in greater detail in FIG. 81). Each of the output lines 1434 of the PLA of the decoder 1430 are connected to a register select input 4 of each bit of a register of the pot 0–3 registers 1424.

As the counter 1428 cycles through its 4 output states (as it is a 2-bit counter) the POT 0–3 lines of the output lines 1432 are sequentially activated. As each output line is activated, a capacitor operatively connected to the potentiometer associated with that particular output line charges at a rate as determined by the setting of the potentiometer. The output of each capacitor is operatively connected to the MONOS input 1658 of the I/O chip which is connected by a resistor 1660 to the input of the comparator 1440. The comparator 1440 has another input connected to the junction of a voltage divider 1662 which generates the voltage reference signal REF.

Figure 82:
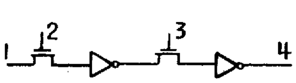
Figure 83:
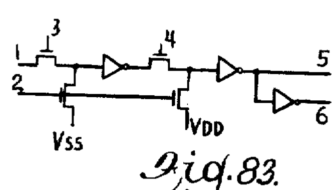

The output of the comparator 1440 is connected to the input of a plurality of logic elements indicated at 1664 which includes gates 1666–1669, with gate 1666, typical of gates 1666–1669 (shown in greater detail in FIG. 82). Also included are gates 1670–1672 (with gates 1670 and 1672 shown in greater detail in FIG. 83.) (The gate 1671 is also logically similar to that shown in FIG. 83, but VDD and VSS are interchanged.)

Figure 84:
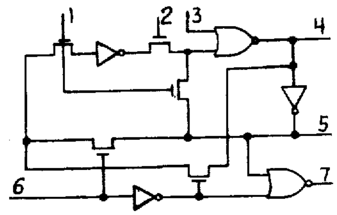

The output 4 of the gate 1666 is connected to a stop input 6 of each bit of the counter indicated generally at 1442 (with bit 1442*a* typical of the bits of the counter 1442 shown in greater detail in FIG. 84). The counter 1442 is clocked by a 2-bit counter 1678 (with bit 0 or 1678*a*, and bit 1, or 1678*b*, shown in greater detail in FIGS. 85 and 86, respectively, and buffer 1679 shown in greater detail in FIG. 87). The counter 1678 has an input for the clock signal Φ from a buffer 1681 (also shown in greater detail in FIG. 87.) The output of the counter 1678 at the buffer 1568 is the clock signal Φ divided by four. The counter 1442 counts until the MONOS signal reaches that of the REF reference signal such that the count contained within the counter 1442 is proportional to the potentiometer setting of the potentiometer associated with the particular output line of the output lines 1432.

Synchronously with the activation of the output lines 1432, the pot register select lines 1434 are sequentially enabled such that pot 0 of the registers 1424 is selected and enabled to latch up the data output of the counter 1442 when the counter 1442 indicates the positional setting of the potentiometer ("pot 0") associated with control handle 12*a*, etc. Accordingly, the output of each bit of the counter 1442 is connected by the logic gates indicated generally at 1468 to the 1 input of a bit of each register of the potentiometer registers 1424.

When a particular pot line of the POT0–POT3 lines 1432 is activated, the associated capacitor begins charging until the MONOS signal on the line 1658 reaches the REF voltage as determined by the comparator 1440. One delay later (gate 1666), the counter 1442 is stopped. If IORQ is not active, one delay later (gate 1667) the output lines 1434 of the scan decoder are enabled so that one of the pot registers 1424, corresponding to the count of the scan counter 1430, can latch up the count output of the counter 1442. One delay later (gate 1671), the output lines 1432 are turned off. Also one delay after gate 1667 (gate 1668), the scan counter is incremented and the counter 1442 is reset.

One delay later (gate 1670), a DISCHARGE signal on a line 1674 (which is the output of a buffer 1676 shown in greater detail in FIG. 88) discharges the capacitor. When the counter 1442 reaches 64, one delay later (gate 1670) the DISCHARGE signal is turned off. Two delays (gates 1669 and 1671) after the counter 1442 reaches 64, the POT0–POT3 lines 1432 are enabled so that the particular pot line of the lines 1432 corresponding to the incremented count of the scan counter 1428 is activated to start the cycle all over.

The pot register address decoder is indicated generally at 1426 in FIG. 73 and comprises a PLA having an input line 1415 from the address decoder 1404 and input lines 1469 and 1471 for the address bits A0 and A1, respectively. The CPU can read the contents of any particular potentiometer register 1424 by transmitting the appropriate address to the address decoder which activates the line 1415. The address bits A0 and A1 come directly from the microcycle decoder 1402 and determine which of the 4 registers, pot 0–3, is selected.

Figure 89:
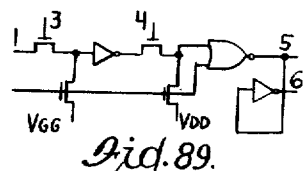
Figure 96:
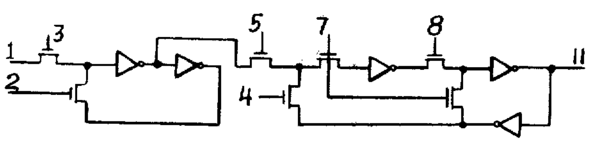

The $\overline{\text{INPUT}}$ and $\overline{\text{OUTPUT}}$ control signals are generated on the output lines 1446 and 1448, respectively, of a generator indicated generally at 1680 and includes gates 1682–1686 (and are logically similar to that shown in FIG. 89). Also included is counter bit 1688 (shown in greater detail in FIG. 86).

MUSIC PROCESSOR

A block diagram of the music processor of the I/O chip is shown in FIG. 71B and C. The music processor can be divided into two sections. The first section (shown in FIG. 71B) generates a master oscillator frequency and the second section (shown in FIG. 71C) uses the master oscillator frequency to generate tone frequencies and the analog AUDIO output.

The frequency of the master oscillator is determined by the contents of several output registers. The contents of all registers in the music processor are set by output instructions from the CPU.

The master oscillator frequency is a square wave whose frequency is determined by 8 binary inputs to a master oscillator 1470 and a clock signal. This 8 bit input word is the sum of the contents of a master oscillator register 1472 (having address 10H which activates the register select line 1407) and the output of a multiplexer 1474. The multiplexer 1474 is controlled by the output of a one bit multiplexer register 1476 (having address 15H which activates the register select line 1412). The addition of the contents of the master oscillator register 1472 and the output of the multiplexer 1474 is performed by an 8 bit adder 1478 which has an 8 bit output connected to the master oscillator 1470.

If the multiplexer register 1476 contains a logical 0, then the data from a "vibrato" system, indicated generally at 1480, will be conducted through the multiplexer 1474. The 2 bits from a 2-bit vibrato frequency register 1482 (having address 14H) determine the frequency of the square wave output of a low frequency oscillator 1484. The output of the low frequency oscillator 1484 is operatively connected to the input of a set of logic gates 1486 represented by an AND gate. The vibrato system 1480 further comprises a 6-bit vibrato register 1488 (also having address 14H) which is operatively connected by a 6 bit output line to the "AND" gate 1486. The 6-bit word at the output of the AND gate oscillates between 0 and the contents of the vibrato register 1488 since the contents of the vibrato register 1488 are being "ANDed" with the output of the low frequency oscillator 1484, with the frequency of oscillation determined by the contents of the vibrato frequency register 1482. The 6-bit output word of the AND gate 1486, along with 2 logical 0 bits (when the MUX register 1476 contains a logical 0) are conducted through the multiplexer 1474 to the 8 bit adder 1478 to be added to the contents of the master oscillator register. This causes the master oscillator frequency to be modulated between two values since the frequency is a function of alternatively the contents of the master oscillator register and the sum of the contents of the master oscillator register and the output of AND gates 1486 thus giving a vibrato effect.

If the multiplexer register 1476 contains a logical 1, the data from a "noise" system, indicated generally at 1490, will be conducted through the multiplexer 1474 to the 8-bit adder 1478. An 8-bit "noise volume" register 1492 is operatively connected to the input of a set of gates 1494 also represented by an AND gate. An 8-bit noise generator 1496 is also operatively connected to the inputs of the "AND" gate 1494. The output of the noise generator is an 8-bit word that constantly varies. The gate 1494 functions as 8 AND gates so that each output bit of the noise volume register 1492 is ANDed with an output bit of the noise generator 1496. Thus the 8 bit output word from the noise volume register determines which bits from the noise generator will be present at the output of the gates 1494. Accordingly, if a bit in the noise volume register 1492 is 0, the corresponding bit at the output of the gates 1494 will also be 0. If a bit in the noise volume register is 1, the corresponding bit at the output of the AND gate will be a noise bit from the noise generator. This 8 bit word from the gates 1494 is conducted through the multiplexer 1474 (when the multiplexer register 1476 contains a 1) to the 8-bit adder 1478. Thus, the master oscillator frequency can be modulated by noise. Modulation can be completely disabled by setting the noise volume register 1492 to 0 if noise modulation is being used, or by setting the vibrato register 1488 to 0 when vibrato is used.

In the second part of the music processor shown in FIG. 71C, the square wave from the master oscillator on the output line 1498 of the master oscillator 1470 (FIG. 71B) is conducted to the clock input of 3 tone generator circuits, tone generators A, B, and C indicated at 1500, 1502 and 1504, respectively, which produce square waves at their outputs. The frequency of the outputs of each tone generator is determined by the contents of an associated tone generator register and the master oscillator frequency. Accordingly, a tone generator "A" register 1506 is connected to the input of the tone generator A, a tone generator "B" register 1508 is connected to the input of the tone generator B and a tone generator "C" register 1510 is connected to the inputs of the tone generator C.

The output of the tone generator A which carries the square wave output is operatively connected to the inputs of a set of gates indicated at 1512 which function as 4 AND gates, with the other 4 inputs of the "AND" gates 1512 operatively connected to the outputs of a tone volume "A" register 1514. The 4-bit output word of the AND gate 1512 oscillates between 0 and the contents of the tone volume "A" register 1514 at the frequency of the output of the tone generator A.

Similarly, the output of the tone generator B is operatively connected to the inputs of 4 "AND" gates indicated at 1516 with the other 4 inputs operatively connected to the outputs of a 4-bit tone volume "B" register 1518 and the output of the tone generator C operatively connected to the inputs of 4 "AND" gates 1520 with the other 4 inputs of the AND gates 1520 operatively connected to the outputs of a 4 bit tone volume "C" register 1522. The four-bit output of each set of AND gates oscillates between 0 and the contents of the associated tone volume register.

The output of the AND gates 1512 is operatively connected to a digital-analog converter 1524 whose output oscillates between ground and a positive analog voltage determined by the contents of the tone volume "A" register 1514 at a frequency determined by the tone generator A. Similarly, the output of the AND gates 1516 are operatively connected to a digital-analog converter 1526 and the outputs of the AND gates 1520 are operatively connected to a digital-analog converter 1528.

A 4th tone generator comprises a set of gates indicated at 1530 which function as 4 AND gates which each have an input operatively connected to a line 1532 which carries a bit from the noise generator 1496 (FIG. 71B). The output of this bit of the noise generator 1496 is a square wave having a constantly varying frequency. The input 1532 is ANDed with 4 volume bits on lines 1534 from the noise volume register 1492 (FIG. 71B). The set of AND gates 1530 operate the same way as the AND gates for the tones A–C, except that a noise modulation register 1536 (having address 15H which activates register select line 1412) must contain a logical 1 for the outputs of the AND gate 1530 to oscillate.

The outputs of the AND gates 1530 are operatively connected to a digital-analog converter 1538. The analog outputs of the 4 D-A converters 1524, 1526, 1528 and 1538 are summed to produce a single audio output, AUDIO. This output is transmitted to the RF modulator 58 (FIG. 2).

The master oscillator is indicated generally at 1470 in FIG. 73 and comprises a programmable counter which can count up to FFH from the number presented at its program input. The programmable counter includes 8 units **1542*a–h* (with unit 1542*a*, typical of units 1542*a–g*, shown in greater detail in FIG. 90 and unit 1542*h* shown in greater detail in FIG. 91) and a PLA indicated generally at 1544. The units 1542*a–h* have inputs 4 and 5 for the clock signal Φ from the buffer 1681. The frequency, Fm, of the master oscillator 1470 is a function of the contents of the master oscillator register and the clock signal and is given by the following formula (in the absence of any modulation by the vibrato system 1480 or noise system 1490**):

$$Fm = \frac{1789}{(\text{contents of Master Osc. Reg. } 1472) + 1} \text{ Khz}$$

The master oscillator register is indicated generally at 1472 and comprises 8 bits (with each bit circuit logically similar to that shown in FIG. 75), each having an input for the register select line 1407. The output of the master oscillator register 1472 is connected to the inputs of the 8-bit adder indicated at 1478 which comprises 8 bits **1478*a–h*. (Bit 1478*b*, typical of bits 1478*a–g* is shown in greater detail in FIG. 92 with bit 1478*h* shown in greater detail in FIG. 93.) The outputs of the adder are connected to the program inputs 1 of the master oscillator 1470**.

The other inputs of the 8-bit adder 1478 are connected to the outputs of the multiplexer indicated generally at 1474. The output of the 8 bit adder 1478 is the sum of the contents of the master oscillator register 1472 and the output of the multiplexer 1474, which determines the frequency of which the master oscillator 1470 oscillates.

The multiplexer 1474 is shown in FIG. 73 to comprise a plurality of transistor switches 1546 and 1547. The gates of switches 1547 are connected by an inverter 1548 to an input line 1550 with the gates of the switches 1546 connected to the output of the inverter 1548 by an inverter 1549. The input line 1550 is connected to the output of the multiplexer register 1476 which is bit 4 of the output register having address 15H shown in FIG. 73 (with bit 4 shown in greater detail in FIG. 75).

Figure 75:
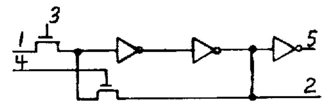
Figure 86:
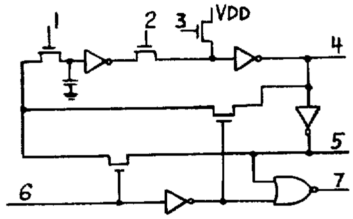
Figure 18:
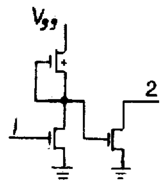

The "AND" gates 1486 are shown to comprise a plurality of NOR gates indicated at 1486 whose inputs are connected to the 6 outputs of the bits **1488*a–f* of the vibrato register 1488 (each bit being logically similar to that shown in FIG. 75). The vibrato register 1488 is the first 6 bits of the output register having the address 14H and the register select line 1411. The last 2 bits 1482*a* and *b* (also shown in greater detail in FIG. 75) comprise the vibrato frequency register 1482. The output of the 2 bits 1482*a* and *b* are connected to the inputs of the low frequency oscillator indicated generally at 1484**.

The low frequency oscillator 1484 comprises a 4-to-1 multiplexer in which the outputs from the vibrato frequency register 1482 are connected by a plurality of logic gates 1552 to the gates of four transistor switches 1554 of the multiplexer. The inputs of the transistor switches 1554 are connected to the 4 most significant bits **1556*a–d* of a counter comprising 13 bits 1556*a–m*. (The bit 1556*a*, typical of the bits 1556*a–l*, is shown in greater detail in FIG. 83 with the bit 1556*m* shown in greater detail in FIG. 85**.)

The output of the transistor switches 1554 are connected to one another and to the other inputs of the NOR gates 1486. The logic state of the bits of the vibrato frequency register 1482 determine which of the outputs of the bits **1556*a–d* are selected which determines the frequency of oscillation of the output of the low frequency oscillator 1484. The value 00 of the bits of the vibrato frequency register correspond to the lowest frequency and the value 11 corresponds to the highest. When the output of the low frequency oscillator 1484 is a logical 1, the NOR gates 1486 are each a logical 0, otherwise the contents of the vibrato frequency register 1482 are inverted and conducted to the multiplexer 1474. In this manner, the contents of the vibrato register 1488 are "ANDed" (negative logic) by the NOR gates 1486 with the output of the low frequency oscillator 1484**.

The set of "AND" gates 1494 are shown to comprise a plurality of NOR gates indicated at 1494 in FIG. 73. The noise generator comprises a number generator and is indicated generally at 1496. The number generator comprises a 15-bit shift register 1558 (with each bit logically similar to that shown in FIG. 94) and an exclusive-OR gate indicated at 1560. The inputs of the NOR gates 1494 are connected to the outputs of the 8 most significant bits of the shift register 1558. The output of the two most significant bits are connected to the inputs of the exclusive-OR gate 1560 whose output is connected to the input of the least significant bit of the shift register 1558. The output of the 8 most significant bits of the shift register 1558 is a binary number that constantly changes with each clock signal to the shift register 1558. The other inputs of the NOR gates 1494 are connected to the outputs of noise volume register indicated at 1492 (each bit being logically similar to that shown in FIG. 75) and having an input connected to the register select line 1414. The shift register 1558 is clocked by a 4 bit counter 1559, having bits 1559*a–d* and an input connected to the output of the buffer 1679 of the counter 1678, which also provides the clock signal for counter 1556 of the low frequency oscillator 1484. (The bit 1559*a* is shown in greater detail in FIG. 85 with bit 1559*b*, typical of the bits 1559*b–d*, shown in greater detail in FIG. 86.)

If any particular bit of the noise volume register 1492 is a logical 1, the output of the corresponding NOR gate of the NOR gates 1494 is a logical 0. Otherwise, the output of the corresponding NOR gate 1494 is the inverse of the associated bit from the noise generator 1496. In this manner, the output of the noise generator 1496 is "ANDed" (negative logic) with the output of the 8 bits of the noise volume register 1492. The contents of the multiplexer register 1476 on line 1550 determines whether the multiplexer 1474 conducts the output of the NOR gates 1486 from the vibrato system or the output of the NOR gates 1494 from the noise system, to be summed with the contents of the master oscillator register 1472 by the 8 bit adder 1478.

Figure 87:
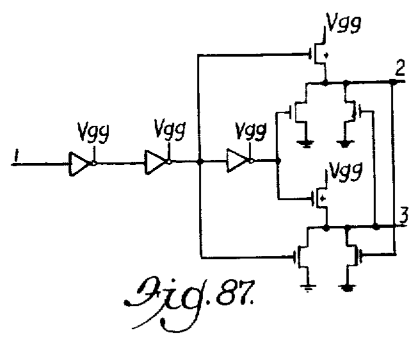
Figure 90:
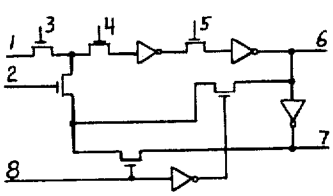
Figure 93:
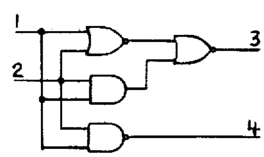
Figure 79:
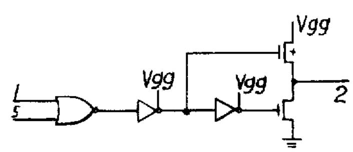
Figure 91:
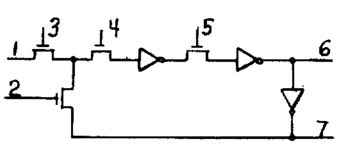
Figure 94:
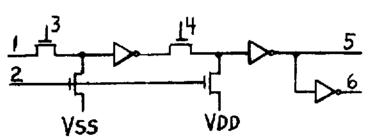
Figure 76:
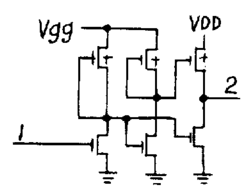

The master oscillator 1470 further comprises a plurality of logic elements indicated at 1562 (which include gates 1564 and 1566 which are logically similar to the gates shown in FIG. 82 and a buffer 1568 shown in greater detail in FIG. 87) having an input connected to the output of the PLA 1544 of the master oscillator 1470. The outputs of the buffer 1568 are connected to the clock inputs of the tone generators A, B and C, by the lines 1498. The tone generator "A" register 1506 and the tone generator A are shown to comprise an 8-unit circuit, which include a programmable counter, indicated at 1570 (with a unit 1570*a*, typical of the units of the circuit 1570, with the exception of the unit 1570*b*, shown in greater detail in FIG. 95 and the unit 1570*b* shown in greater detail in FIG. 96). The frequency of tone A is a function of the master oscillator frequency and the contents of the tone generator A register and is given by the following formula:

$$Fa = \frac{Fm}{2(\text{contents of tone gen. } A \text{ reg } 1506)}$$

The output line of the unit 1570*a* of the tone A circuit 1570 is connected to the input of a toggle flip-flop 1572 (shown in greater detail in FIG. 92) which has an output line 1574 which carries the output of the tone generator A. The tone generator B register 1508 and tone generator B as well as the tone generator C register 1510 and tone generator C are logically similar to the tone A circuit 1570 and toggle flip-flop 1572. The tone generator B register and tone generator B are indicated generally at the circuit 1576 and toggle flip-flop 1578 with the tone generator C register and tone generator C indicated generally at circuit 1580 and toggle flip-flop 1582.

The output 1574 of the toggle flip-flop 1572 of the tone generator A is connected to an input of a PLA 1584 which also has inputs connected to the outputs of the tone volume "A" register 1514 (which are the four lower bits of the output register having address 16H and register select line 1414 with a bit shown in greater detail in FIG. 75). The PLA 1584 has a plurality of output lines which are connected to a resistor network 1586, the outputs of which are connected to a single output line 1588 which carries the analog signal AUDIO.

The PLA 1584 includes a plurality of pull-down transistors 1590 which couple each of the output lines of the PLA 1584 to the line 1574 which carries the output of the tone generator A. Thus, the output lines of the PLA 1584 all go to a logical 0 when the line 1574 goes to a logical 1 whereby the output of the PLA 1584 oscillates at the same frequency as the output of the tone generator A. The remaining portion of the PLA 1592 decodes the output of the tone A volume register 1514 to selectively activate one of the output lines of the PLA 1584 (when the line 1574 from the tone generator A register is low). The resistor network 1586 produces an analog voltage in dependence upon the particular output line of the PLA 1584 activated.

Since the output of the PLA 1584 goes low each time the line 1574 goes low, the output of the tone A volume register 1514 is in a sense, ANDed with the output of the tone A generator. Thus the "AND" gates 1512 comprise the pull-down transistors 1590. The D-A converter 1524 (FIG. 71C) comprises the PLA 1584 and resistor network 1586.

The output of the tone generators B and C are connected in a similar manner to PLAs 1594 and 1596, respectively. The outputs of each bit of the tone volume B register 1518 (with each bit shown in greater detail in FIG. 75) are connected to the inputs of the PLA 1594. The outputs of the tone volume C register 1522 (with each bit also shown in greater detail in FIG. 75) are connected to the inputs of the PLA 1596. The outputs of the PLA 1596 and the PLA 1586 are connected to the inputs of the resistor network 1586.

The output of the most significant bit of the shift register 1558 of the noise generator 1496 is connected to the input of a NOR gate 1598 whose output is connected by an inverter 1600 to a PLA 1602. The other input of the NOR gate 1598 is connected to the noise modulation register 1536 which is the most significant bit (shown in greater detail in (FIG. 75) of the output register having address 15H and register select line 1412. The PLA 1602 has inputs connected to the output of the 4 most significant bits of the noise volume register 1492 and the output of the PLA 1602 is also connected to the resistor network 1586. The set of "AND" gates 1530 comprise the plurality of pull-down transistors 1604 of the PLA 1602 with the digital-analog converter 1538 comprising the remainder of the PLA 1602 and resistor network 1586 in a manner similar to the tone generators. The resistor network 1586 has a common summing point 1540 which is connected to the output line 1588 which carries the analog signal AUDIO. In this manner, the AUDIO signal is the sum of the tones A, B and C, generated by the tone generators A, B and C (at their respective volumes), and the noise generator (at its respective volume).

The LDL1 and LDH1 signals for the microcycle decoder 1402 are generated by a generator indicated generally at 1690. The generator has inputs for the clock signals Φ and $\overline{\Phi}$ and the CPU control signal $\overline{IORQ}$ and outputs 1692 and 1694 for the signals LDL1 and LDH1, respectively. The generator comprises gates 1696 and 1698 (each of which is logically similar to the gate shown in FIG. 82) and NOR gate 1700 and 1702. The address bits A0–A7 are latched up in the microcycle decoder 1402 on the signal LDL1 with the address bits A8–A10 latched on the signal LDH1, just as for the address and data chips.

The video processor allows the easy manipulation of pixel data to be written to the display RAM. With one memory write instruction, pixel data can be taken from the CPU, modified by the video processor and sent to the display RAM. The modifications include expanding, shifting or rotating, flopping, and ORing or exclusive-ORing the pixel data. This allows a greater amount of data to be handled in a given time which in turn allows greater complexity in the games and computer functions to be performed.

Furthermore, although only 2 bits of memory space in the display RAM are used to define a pixel on the display screen, the present system allows the associated pixel to be presented in one of 32 colors and one of eight different intensities. Color registers of a greater capacity than 8 bits would provide an even larger selection of colors and intensities.

The colors and intensities of the entire or portions of the screen may be changed with one instruction without changing the contents of the display RAM by changing the horizontal color boundary. The colors and intensities may also be changed by changing the data in the color registers. The screen interrupt is programmable to allow these registers to be changed after any particular scan line so that 256 color/intensity combinations may be on the screen at one time in any one field of the raster scan.

The music processor is fully digital and adapted to produce a variety of sounds including melodies and noises by loading a plurality of registers. The tones produced can be modulated to produce a vibrato effect or can be modulated by noise.

Since the cassette ROM is removable and replaceable, the programming of the system is easily modified to allow the particular game or function performed to also be changed.

The system has a basic program the listing for which is set out in Appendix A. Each game or function has a separate program (with the program listing for representative games, "Gunfight" set out in Appendix B). Each game or function can utilize the basic program routines which include routines for creating screen images including initialization, character display, coordinate conversion and object vectoring. Other routines decrement timers, play music and produce sounds. There are routines to read the keypad and control handles and input game selections and options. There are also math routines for manipulating floating binary coded decimal (BCD) numbers.

A "flow chart" for the power up sequence is given below in Table IV:

TABLE IV

```
POWER UP SEQUENCE
Disable interrupts
Set CONSUMER/COMMERCIAL port to CONSUMER
IF              Address 2000H=C3H
                Jump to address 2000H
ENDIF
Clear all system RAM
Clear shifter
Set timeout count to max
Clear music ports
Set vertical blank
Set interrupt mode
Set horizontal color boundary
Set color ports
Activate system interrupt routine
IF              Address 2000H=55H
                Menu Inx←Cassette menu
ELSE
                Menu Inx←On board menu
ENDIF
Call system menu routine
```

A flow chart describing the sequence performed to allow the user to select a game from the "menu" is set out in Table V below:

TABLE V

```
                SYSTEM MENU ROUTINE
                Clear Screen
                Paint Banner
                Display 'SELECT GAME' on banner
                Line number ← 1
Display line:   Display line number at screen (character 1,
                line number)
                Display '-' at screen (character 2,
                line number)
                Display title (menu inx) at screen (character 3,
                line number)
                Line number ← line number + 1
                Menu inx ← menu inx + 1
                IF  title (menu inx) ≠ zero
                    Go to display line
                ENDIF
Wait:           Call system get number routine
                IF  number = 0 or number ≧ line number
                    Display '?' at screen (character 1, line 11)
                    Go to wait
                ENDIF
                Go to game (number)
```

Finally, a flow chart outlining the program for the "Gunfight" game is set out in Table VI:

TABLE VI

```
                Get Max. Score
                Clear Ram
                Set vertical blank, horz. color boundary,
                 interrupt mode
                Set colors
                Play Streets of Laredo
STRND:          Start round
                Init Bullets and timers
                Set up screen
                Display scores
                Display "Get Ready"
                Put up proper number of Cacti, Trees & Wagon
                Set up vectors so cowboys walk out
                Start interrupts
                Pause until cowboys walk out
                Erase "Get Ready"
LOOP:           Call sentry (check for a change of input)
                Call DOIT
                If bullet hit anything
                    kill object and set death flag if cowboy killed
                Go to LOOP
                DOIT:
```

TABLE VI-continued

```
        If time up for round
              Exit
              Go to STRND
        Else
        If Death Flag SET
              Exit
              Go to STRND
        Else
        If Player 1 or Player 2 Pot moved
              Update new arm angle
        Else
        If Player 1 or Player 2 Joystick moved
              Update new velocity
        Else
        If key depressed
              Coffee break
        Else
        If Player 1 or Player 2 trigger pulled
              Fire Bullet
        Else
        If 1 second has elapsed
              Update new time
        ENDIF
Exit
Interrupt Routine:
        Bump all time bases
        Erase all active bullets
        Vector bullets
        Write bullets to new location
        Set each bullets hit flag if it
        hit something
        Erase next object in write QUEUE
        Vector that object
        Write that object to new location
        Put object back in QUEUE
        SCHED next interrupt
        EXIT
```

It should be noted that the computer or processor may form a part of the video processor and/or a part of the music processor so that the video processor and/or music processor may stand alone, with only minimal instructions from a central processor. This likewise may be employed for input/output processors. Thus, the term "computer" as used herein, together with its associated hardware, may be in the video, music and/or input/output processors. The so-called intelligence of the system may thus be split or divided between the individual processors and the central processor.

It will, of course, be understood that modifications of the present invention, in its various aspects, will be apparent to those skilled in the art, some being apparent only after study, and others being matters of routine electronic and logic design. As such, the scope of the invention should not be limited by the particular embodiment and specific construction herein described, but should be defined only by the appended claims, and equivalents thereof.

Various features of the invention are set forth in the following claims.

```
*MODCOMP Z-80 CROSS ASSEMBLER HOME VIDEO GAME SYSTEM
ADDR OBJECT   STMT  LABEL    OPCD OPERAND      COMMENT

              30   ; ****************************
              31   ; * HOME VIDEO GAME EQUATES *
              32   ; ****************************
              33   ;
              34   ; ASSEMBLY CONTROL
              35   ;
>0001         36   XPANDN  EQU  1          ; ** SET TO 1 WHEN HARDWARE EXPAND IMPLEMENTED
>0001         37   NWHDWR  EQU  1          ; ** SET TO 1 WHEN NEW HARDWARE IS READY
              38   ;
              39   ; GENERAL GOODIES
>4000         40   NORMEM  EQU  4000H
>2000         41   FIRSTC  EQU  2000H      ; FIRST ADDRESS IN CASSETTE
>0000         42   SCREEN  EQU  0
>0028         43   BYTEPL  EQU  40         ; BYTES PER LINE
>00A0         44   BITSPL  EQU  160        ; BITS PER LINE
              45   ; STUFF IN SYSTEM DOPE VECTOR
>0200         46   STIMER  EQU  200H       ; SECONDS AND GAME TIME, MUSIC
>0203         47   CTIMER  EQU  203H       ; CUSTOM TIMERS
>0206         48   FNTSYS  EQU  206H       ; SYSTEM FONT DESCRIPTOR
>020D         49   FNTSML  EQU  20DH       ; SMALL FONT DESCRIPTOR
>0214         50   ALKEYS  EQU  214H       ; KEYMASK OF ALL KEYS
>0218         51   MENUST  EQU  218H       ; HEAD OF ONBOARD MENU
>021E         52   MXSCR   EQU  21EH       ; ADDRESS OF 'MAX SCORE'
>0228         53   NOPLAY  EQU  228H       ; ADDRESS OF '# OF PLAYERS'
>0235         54   NOGAME  EQU  235H       ; ADDRESS OF '# OF GAMES'
              55   ; BITS IN PROCESSOR FLAG BYTE
>0007         56   PSWSGN  EQU  7          ; SIGN BIT
```

```
>0006     PSWZRO  EQU  6           ; ZERO BIT
>0002     PSWPV   EQU  2           ; PARITY        OVERFLOW
>0000     PSWCY   EQU  0           ; CARRY
            ; BITS IN GAME STATUS BYTE
>0000     GSBTIM  EQU  0
>0001     GSBSCR  EQU  1
>0007     GSBEND  EQU  7
            ; STANDARD VECTOR DISPLACEMENTS AND BITS
>0000     VBMR    EQU  0           ; MAGIC REGISTER
>0001     VBSTAT  EQU  1           ; STATUS
>0002     VBTIMB  EQU  2           ; TIME BASE
>0003     VBDXL   EQU  3           ; DELTA X LO
>0004     VBDXH   EQU  4           ; DELTA X HI
>0005     VBXL    EQU  5           ; X COORD LO
>0006     VBXH    EQU  6           ; X COORD HI
>0007     VBXCHK  EQU  7           ; X CHECK FLAGS
>0008     VBDYL   EQU  8           ; DELTA Y LO
>0009     VBDYH   EQU  09H         ; DELTA Y HI
>000A     VBYL    EQU  0AH         ; Y COORD LO
>000B     VBYH    EQU  0BH         ; Y COORD HI
>000C     VBYCHK  EQU  0CH         ; Y CHECK FLAGS
>000D     VBOAL   EQU  0DH         ; OLD ADDRESS L.O.
>000E     VBOAH   EQU  0EH         ; OLD ADDRESS H.O.
            ; DISPLACEMENTS FROM START OF COORDINATE AREA
>0000     VCDCL   EQU  0           ; LO DELTA
>0001     VCDCH   EQU  1           ; HI DELTA
>0002     VCCL    EQU  2           ; LO COORD
>0003     VCCH    EQU  3           ; HI COORD
>0004     VCCHK   EQU  4           ; CHECK BITS
            ; BITS IN STATUS BYTE
>0007     VBSACT  EQU  7           ; VECTOR ACTIVE STATUS
>0006     VBBLNK  EQU  6           ; BLANK STATUS
            ; BITS IN CHECK BIT MASK
>0000     VBCLMT  EQU  0           ; DO LIMIT CHECKING
>0001     VBCREV  EQU  1           ; REVERSE DELTA ON LIMIT ATTAINED
>0003     VBCLAT  EQU  3           ; COORDINATE IS AT LIMIT
            ; FONT TABLE DISPLACEMENTS FOR NEW CHARACTER DISPLAY ROUTINE
>0000     FTBASE  EQU  0           ; BASE CHARACTER
>0001     FTFSX   EQU  1           ; X FRAME SIZE
>0002     FTFSY   EQU  2           ; Y FRAME SIZE
>0003     FTBYTE  EQU  3           ; X SIZE OF CHAR IN BYTES
>0004     FTYSIZ  EQU  4           ; Y SIZE IN BITS
>0005     FTPTL   EQU  5           ; PATTERN TABLE ADDRESS LO
>0006     FTPTH   EQU  6           ; PATTERN TABLE ADDRESS HI
            ; BITS FOR MAGIC REGISTER     WRITE OPTION BYTE
>0006     MRFLOP  EQU  6           ; WRITE WITH FLOP
>0005     MRXOR   EQU  5           ; WRITE WITH EXCLUSIVE OR
>0004     MROR    EQU  4           ; WRITE WITH OR
>0003     MRXPND  EQU  3           ; WRITE WITH EXPAND
>0002     MRROT   EQU  2           ; WRITE WITH ROTATE
>0003     MRSHFT  EQU  03H         ; MASK OF SHIFT AMOUNT
            ; BITS OF CONTROL HANDLE INPUT PORT
>0004     CHTRIG  EQU  4           ; TRIGGER
>0003     CHRIGH  EQU  3           ; JOYSTICK RIGHT
>0002     CHLEFT  EQU  2           ; JOYSTICK LEFT
>0001     CHDOWN  EQU  1           ; DOWN
>0000     CHUP    EQU  0           ; UP
            ; CONTEXT BLOCK REGISTER DISPLACEMENTS
>0000     CBIYL   EQU  0           ; IY
```

```
>0001   CBIYH   EQU  1
>0002   CBIXL   EQU  2          ; IX
>0003   CBIXH   EQU  3
>0004   CBE     EQU  4          ; DE
>0005   CBD     EQU  5
>0006   CBC     EQU  6          ; BC
>0007   CBB     EQU  7
>0008   CBFLAG  EQU  8          ; AF
>0009   CBA     EQU  9
>000A   CBL     EQU  0AH        ; HL
>000B   CBH     EQU  0BH
        ; SENTRY RETURN CODE EQUATES:
>0000   SNUL    EQU  0          ; NOTHING HAPPENED
>0001   SCT0    EQU  1          ; COUNTER-TIMER 1 THRU 8
>0002   SCT1    EQU  2
>0003   SCT2    EQU  3
>0004   SCT3    EQU  4
>0005   SCT4    EQU  5
>0006   SCT5    EQU  6
>0007   SCT6    EQU  7
>0008   SCT7    EQU  8
>0009   SF0     EQU  9          ; FLAG BIT 0
>000A   SF1     EQU  0AH
>000B   SF2     EQU  0BH
>000C   SF3     EQU  0CH
>000D   SF4     EQU  0DH
>000E   SF5     EQU  0EH
>000F   SF6     EQU  0FH
>0010   SF7     EQU  10H
>0011   SSEC    EQU  11H        ; SECONDS TIMER HAS COUNTED DOWN
>0013   SKYD    EQU  13H        ; KEY IS DOWN
>0012   SKYU    EQU  12H        ; KEY IS UP
>001C   SP0     EQU  1CH        ; POT 0
>001D   SP1     EQU  1DH        ; POT 1
>001E   SP2     EQU  1EH        ; POT 2
>001F   SP3     EQU  1FH        ; POT 3
>0014   ST0     EQU  14H        ; TRIGGER 0
>0015   SJ0     EQU  15H        ; JOYSTICK 0
>0016   ST1     EQU  16H        ; SIMILARLY FOR 1-3
>0017   SJ1     EQU  17H
>0018   ST2     EQU  18H
>0019   SJ2     EQU  19H
>001A   ST3     EQU  1AH
>001B   SJ3     EQU  1BH

        ; ********************************
        ; * HOME VIDEO GAME PORT EQUATES *
        ; ********************************
        ; OUTPUT PORTS FOR VIRTUAL COLOR
>0000   COL0R   EQU  0          ; COLOR 0 RIGHT
>0001   COL1R   EQU  1          ; COLOR 1 RIGHT
>0002   COL2R   EQU  2          ; COLOR 2 RIGHT
>0003   COL3R   EQU  3          ; COLOR 3 RIGHT
>0004   COL0L   EQU  4          ; COLOR 0 LEFT
>0005   COL1L   EQU  5          ; COLOR 1 LEFT
>0006   COL2L   EQU  6          ; COLOR 2 LEFT
>0007   COL3L   EQU  7          ; COLOR 3 LEFT
>0008   COLBX   EQU  08H        ; COLOR BLOCK OUTPUT PORT
>0009   HORCB   EQU  9          ; HORIZONTAL COLOR BOUNDARY
```

```
>0006   VERBL   EQU  0AH        ; VERTICAL BLANKING LINE
          ; OUTPUT PORTS FOR MUSIC AND SOUNDS
>0010   TONMO   EQU  10H        ; TONE MASTER OSCILLATOR
>0011   TONEA   EQU  11H        ; TONE A OSC.
>0012   TONEB   EQU  12H        ; TONE B OSC.
>0013   TONEC   EQU  13H        ; TONE C OSC.
>0014   VIBRA   EQU  14H        ; VIBRATO
>0016   VOLAB   EQU  16H        ; TONES A/B VOLUME
>0015   VOLC    EQU  15H        ; TONE C VOLUME
>0017   VOLN    EQU  17H        ; NOISE VOLUME
>0018   SNDBX   EQU  18H        ; SOUND BLOCK OUTPUT PORT
          ; INTERRUPT AND CONTROL OUTPUT PORTS
>000D   INFBK   EQU  0DH        ; INTERRUPT FEEDBACK
>000E   INMOD   EQU  0EH        ; INTERRUPT MODE
>000F   INLIN   EQU  0FH        ; INTERRUPT LINE
>0008   CONCM   EQU  8          ; CONSUMER      COMMERCIAL
>000C   MAGIC   EQU  0CH        ; THE NOTORIOUS MAGIC REGISTER
>0019   XPAND   EQU  19H        ; EXPANDER PIXEL DEFINITION PORT
          ; INTERRUPT AND INTERCEPT INPUT PORTS
>0008   INTST   EQU  8          ; INTERCEPT STATUS
>000E   VERAF   EQU  0EH        ; VERTICAL ADDRESS FEEDBACK
>000F   HORAF   EQU  0FH        ; HORIZONTAL ADDRESS FEEDBACK
          ; HAND CONTROLS INPUT PORTS
>0010   SW0     EQU  10H        ; PLAYER 0 HAND CONTROL
>0011   SW1     EQU  11H        ; PLAYER 1 HAND CONTROL
>0012   SW2     EQU  12H        ; PLAYER 2 HAND CONTROL
>0013   SW3     EQU  13H        ; PLAYER 3 HAND CONTROL
>001C   POT0    EQU  1CH        ; PLAYER 0 POT
>001D   POT1    EQU  1DH        ; PLAYER 1 POT
>001E   POT2    EQU  1EH        ; PLAYER 2 POT
>001F   POT3    EQU  1FH        ; PLAYER 3 POT
          ; KEYBOARD INPUT PORTS
>0014   KEY0    EQU  14H        ; KEYBOARD COLUMN 0
>0015   KEY1    EQU  15H        ; KEYBOARD COLUMN 1
>0016   KEY2    EQU  16H        ; KEYBOARD COLUMN 2
>0017   KEY3    EQU  17H        ; KEYBOARD COLUMN 3

          ; ****************************************
          ; * HOME VIDEO GAME SYSTEM CALL INDEXES *
          ; ****************************************
          ; USER PROGRAM INTERFACE
>0000   UPISTR  EQU  0
>0000   INTPC   EQU  UPISTR     ; INTERPRET WITH CONTEXT CREATE
>0002   XINTC   EQU  INTPC+2    ; EXIT INTERPRETER WITH CONTEXT RESTORE
>0004   RCALL   EQU  XINTC+2    ; CALL ASM LANG. SUBROUTINE
>0006   MCALL   EQU  RCALL+2    ; CALL INTERPRETER SUBROUTINE
>0008   MRET    EQU  MCALL+2    ; RETURN FROM INTERPRETER SUBROUTINE
>000A   MJUMP   EQU  MRET+2     ; MACRO JUMP
>000C   SUCK    EQU  MJUMP+2    ; SUCK INLINE ARGS INTO CB
          ; SCHEDULER ROUTINES
>000C   SCHEDR  EQU  SUCK
>000E   ACTINT  EQU  SCHEDR+2   ; SET SUB TIMER
>0010   DECCTS  EQU  ACTINT+2   ; DEC CT'S UNDER MASK
          ; MUSIC AND SOUNDS
>0012   MUZAK   EQU  DECCTS+2
>0012   BMUSIC  EQU  MUZAK      ; BEGIN PLAYING MUSIC
>0014   EMUSIC  EQU  BMUSIC+2   ; STOP PLAYING MUSIC
          ; SCREEN HANDLER ROUTINES
>0016   SCRSTR  EQU  EMUSIC+2
```

```
>0016    SETOUT  EQU  SCRSTR     ; SET SCREEN SIZE
>0018    COLSET  EQU  SETOUT+2   ; SET COLORS
>001A    FILL    EQU  COLSET+2   ; FILL MEMORY WITH CONSTANT DATA
>001C    RECTAN  EQU  FILL+2     ; PAINT RECTANGLE
>001E    VWRITR  EQU  RECTAN+2   ; WRITE RELATIVE FROM VECTOR
>0020    WRITR   EQU  VWRITR+2   ; WRITE RELATIVE
>0022    WRITP   EQU  WRITR+2    ; WRITE WITH PATTERN SIZE LOOKUP
>0024    WRIT    EQU  WRITP+2    ; WRITE WITH SIZES PROVIDED
>0026    WRITA   EQU  WRIT+2     ; WRITE ABSOLUTE
>0028    VBLANK  EQU  WRITA+2    ; BLANK AREA FROM VECTOR
>002A    BLANK   EQU  VBLANK+2   ; BLANK AREA
>002C    SAVE    EQU  BLANK+2    ; SAVE AREA
>002E    RESTOR  EQU  SAVE+2     ; RESTORE AREA
>0030    SCROLL  EQU  RESTOR+2   ; SCROLL AREA OF SCREEN
         ;
>0032    CHRDIS  EQU  SCROLL+2   ; NEW DISPLAY CHARACTER
>0034    STRDIS  EQU  CHRDIS+2   ; NEW DISPLAY STRING
>0036    DISNUM  EQU  STRDIS+2   ; DISPLAY NUMBER
         ;
>0038    RELABS  EQU  DISNUM+2   ; RELATIVE TO ABSOLUTE CONVERSION
>003A    RELAB1  EQU  RELABS+2   ; NONMAGIC RELABS
>003C    VECT1   EQU  RELAB1+2   ; VECTOR SINGLE COORDINATE
>003E    VECT    EQU  VECT1+2    ; VECTOR COORDINATE PAIR
         ; HUMAN INTERFACE ROUTINES
>0040    HUMANR  EQU  VECT+2
>0040    KCTASC  EQU  HUMANR     ; KEY CODE TO ASCII
>0042    SENTRY  EQU  KCTASC+2   ; SENSE TRANSITION
>0044    DOIT    EQU  SENTRY+2   ; BRANCH TO TRANSITION HANDLER
>0046    DOITB   EQU  DOIT+2     ; USE B INSTEAD OF A
>0048    PIZBRK  EQU  DOITB+2    ; TAKE A BREAK
>004A    MENU    EQU  PIZBRK+2   ; DISPLAY A MENU
>004C    GETPAR  EQU  MENU+2     ; GET GAME PARAMETER FROM USER
>004E    GETNUM  EQU  GETPAR+2   ; GET NUMBER FROM USER
>0050    PAWS    EQU  GETNUM+2   ; PAUSE
>0052    DISTIM  EQU  PAWS+2     ; DISPLAY TIME
>0054    INCSCR  EQU  DISTIM+2   ; INC SCORE
         ; MATH ROUTINES
>0056    MATH    EQU  INCSCR+2
>0056    INDEXN  EQU  MATH       ; INDEX NIBBLE
>0058    STOREN  EQU  INDEXN+2
>005A    INDEXW  EQU  STOREN+2   ; INDEX WORD
>005C    INDEXB  EQU  INDEXW+2   ; INDEX BYTE
>005E    MOVE    EQU  INDEXB+2   ; BLOCK TRANSFER
>0060    SHIFTU  EQU  MOVE+2     ; SHIFT UP A DIGIT
>0062    BCDADD  EQU  SHIFTU+2   ; BCD ADD
>0064    BCDSUB  EQU  BCDADD+2   ; BCD SUBTRACT
>0066    BCDMUL  EQU  BCDSUB+2   ; BCD MULTIPLY
>0068    BCDDIV  EQU  BCDMUL+2   ; BCD DIVIDE
>006A    BCDCHS  EQU  BCDDIV+2   ; BCD CHANGE SIGN
>006C    BCDNEG  EQU  BCDCHS+2   ; BCD NEGATE
>006E    DADD    EQU  BCDNEG+2   ; DECIMAL ADD
>0070    DSMG    EQU  DADD+2     ; CONVERT TO SIGN MAGNITUDE
>0072    DABS    EQU  DSMG+2     ; DECIMAL ABSOLUTE VALUE
>0074    NEGT    EQU  DABS+2     ; NEGATE
>0076    RANGED  EQU  NEGT+2     ; RANGED RANDOM NUMBER
>0078    QUIT    EQU  RANGED+2   ; QUIT CASSETTE EXECUTION
>007A    SETB    EQU  QUIT+2     ; SET BYTE
>007C    SETW    EQU  SETB+2     ; SET WORD
>007E    MSKTD   EQU  SETW+2     ; MASK TO DELTAS
```

```
        ; **********
        ; * MACROS *
        ; **********
        ; MACROS TO DEFINE PATTERNS
DEF2    MACR #AA,#AB
        DEFB #AA
        DEFB #AB
        ENDM
DEF3    MACR #BA,#BB,#BC
        DEFB #BA
        DEFB #BB
        DEFB #BC
        ENDM
DEF4    MACR #CA,#CB,#CC,#CD
        DEFB #CA
        DEFB #CB
        DEFB #CC
        DEFB #CD
        ENDM
DEF5    MACR #DA,#DB,#DC,#DD,#DE
        DEFB #DA
        DEFB #DB
        DEFB #DC
        DEFB #DD
        DEFB #DE
        ENDM
DEF6    MACR #EA,#EB,#EC,#ED,#EE,#EF
        DEFB #EA
        DEFB #EB
        DEFB #EC
        DEFB #ED
        DEFB #EE
        DEFB #EF
        ENDM
DEF8    MACR #GA,#GB,#GC,#GD,#GE,#GF,#GG,#GH
        DEFB #GA
        DEFB #GB
        DEFB #GC
        DEFB #GD
        DEFB #GE
        DEFB #GF
        DEFB #GG
        DEFB #GH
        ENDM
        ; MACROS TO COMPUTE CONSTANT SCREEN ADDRESSES
XYREL   MACR #R,#X,#Y       ;RELATIVE LOAD
        LD   #R,RES.(#Y).SHL.8+(#X)
        ENDM
        ; MACRO TO GENERATE SYSTEM CALL
SYSTEM  MACR #NUMBR
        RST  56
        DEFB #NUMBR
        IF   #NUMBR.EQ.INTPC
INTPC   DEFL 1
        ENDIF
        ENDM
        ; MACRO TO GENERATE SYSTEM CALL WITH SUCK OPTION ON
SYSSUK  MACR #UMBR
        RST  56
```

```
          DEFB #UMBA+1
          IF   #UMBA EQ INTPC
INTP@     DEFL 1
          ENDIF
          ENDM
  ; MACROS TO GENERATE MACRO INSTRUCTION CALLS
  ; FILL SCREEN WITH CONSTANT DATA
FILL?     MACR #START,#NBYTES,#DATA
          DEFB FILL+1
          DEFW #START
          DEFW #NBYTES
          DEFB #DATA
          ENDM
  ; EXIT INTERPRETER WITH CONTEXT RESTORE
EXIT      MACR
          DEFB XINTC
INTP@     DEFL 0
          ENDM
  ;INTERPRET WITH INLINE SUCK
DO        MACR #CID
          DEFB #CID+1
          ENDM
; INTERPRET WITHOUT INLINE SUCK
DONT      MACR #CID
          DEFB #CID
          ENDM
  ;MACRO CALL FROM DOIT TABLE
X00C0 END       EQU  0C0H
MC        MACR #A,#B,#E
          DEFB #A+80H
          DEFW #B
          IF   0#E
          DEFB 0#E
          ENDIF
          ENDM
  ;REAL CALL FROM DOIT TABLE
RC        MACR #A,#B,#E
          DEFB #A+40H
          DEFW #B
          IF   0#E
          DEFB 0#E
          ENDIF
          ENDM
  ;REAL JUMP FROM DOIT TABLE
JMP       MACR #A,#B,#E
          DEFB #A
          DEFW #B
          IF   0#E
          DEFB 0#E
          ENDIF
          ENDM
  ;DISPLAY A STRING
TEXT      MACR #A,#B,#C,#D
          DEFB STRDIS+1
          DEFB #B
          DEFB #C
          DEFB #D
          DEFW #A
          ENDM
```

```
	;**************
	; MUSIC MACROS
	; NOTE DURATION,FREQ(S)
NOTE1	MACR #DUR,#N1
	DEFB #DUR&7FH
	DEFB #N1
	ENDM
NOTE2	MACR #DUR,#N1,#N2
	DEFB #DUR&7FH
	DEFB #N1
	DEFB #N2
	ENDM
NOTE3	MACR #DUR,#N1,#N2,#N3
	DEFB #DUR
	DEFB #N1
	DEFB #N2
	DEFB #N3
	ENDM
NOTE4	MACR #DUR,#N1,#N2,#N3,#N4
	DEFB #DUR
	DEFB #N1
	DEFB #N2
	DEFB #N3
	DEFB #N4
	ENDM
NOTE5	MACR #DUR,#N1,#N2,#N3,#N4,#N5
	DEFB #DUR
	DEFB #N1
	DEFB #N2
	DEFB #N3
	DEFB #N4
	DEFB #N5
	ENDM
MASTER	MACR #OFFSET
	DEFB 80H
	DEFB #OFFSET
	ENDM
	; STUFF OUTPUT PORT#,DATA  OR
	; OUTPUT SNDBX,DATA10,D11,...,DATA17
OUTPUT	MACR #PORT,#D0,#D1,#D2,#D3,#D4,#D5,#D6,#D7
	IF	.NOT.(#PORT=18H)
	DEFB 80H+(#PORT&7FH)
	DEFB #D0
	ENDIF
	IF	#PORT=18H
	DEFB 88H
	DEFB #D7,#D6,#D5,#D4,#D3,#D2,#D1,#D0
	ENDIF
	ENDM
	; SET VOICE BYTE
	; THE FORMAT OF THE VOICE BYTE IS
	; *1*A*1*B*1*C*V*N*
	; WHERE N = LOAD NOISE WITH DATA AT PC AND INC PC
	; V = LOAD VIBRATO AND INC PC
	; I = INC PC
	; A,B,C = LOAD TONE A,B,C WITH DATA AT PC
VOICES	MACR #MASK
	DEFB 90H
	DEFB #MASK
```

```
                    ENDM
          ; PUSH NUMBER ONTO STACK
          PUSHN     MACR #NUMB
                    DEFB 0A0H+((#NUMB-1).AND.0FH)
                    ENDM
          ; SET VOLUMES
          VOLUME    MACR #BA,#MC
                    DEFB 0B0H
                    DEFB #BA
                    DEFB #MC
                    ENDM
          ; CAL;L RELATIVE 0-15 BEYOND SELF+1
          CREL      MACR #RY
                    DEFB 0D0H+(#RY.AND.0FH)
                    ENDM
          ; DEC STACK TOP AND JNZ
          DSJNZ     MACR #ADD
                    DEFB 0C0H
                    DEFW #ADD
                    ENDM
          ; FLIP LEGATO   STACATO
          LEGSTA    MACR
                    DEFB 0E0H
                    ENDM
          REST      MACR #TIME
                    DEFB 0E1H
                    DEFB #TIME
                    ENDM
          QUIET     MACR
                    DEFB 0F0H
                    ENDM
          ; *****************
          ; * MUSIC EQUATES *
          ; *****************
          ; NOTE VALUES
>00FD     G0        EQU  253
>00EE     GS0       EQU  238
>00E1     A0        EQU  225
>00D4     AS0       EQU  212
>00C8     B0        EQU  200
>00BD     C1        EQU  189
>00B2     CS1       EQU  178
>00A8     D1        EQU  168
>009F     DS1       EQU  159
>0096     E1        EQU  150
>008D     F1        EQU  141
>0085     FS1       EQU  133
>007E     G1        EQU  126
>0077     GS1       EQU  119
>0070     A1        EQU  112
>006A     AS1       EQU  106
>0064     B1        EQU  100
>005E     C2        EQU  94
>0059     CS2       EQU  89
>0054     D2        EQU  84
>004F     DS2       EQU  79
>004A     E2        EQU  74
>0046     F2        EQU  70
>0042     FS2       EQU  66
```

```
>003E      G2      EQU  62
>003B      GS2     EQU  59
>0037      A2      EQU  55
>0034      AS2     EQU  52
>0031      B2      EQU  49
>002E      C3      EQU  46
>002C      CS3     EQU  44
>0029      D3      EQU  41
>0027      DS3     EQU  39
>0025      E3      EQU  37
>0022      F3      EQU  34
>0020      FS3     EQU  32
>001F      G3      EQU  31
>001D      GS3     EQU  29
>001B      A3      EQU  27
>001A      AS3     EQU  26
>0018      B3      EQU  24
>0017      C4      EQU  23
>0015      CS4     EQU  21
>0014      D4      EQU  20
>0013      DS4     EQU  19
>0012      E4      EQU  18
>0011      F4      EQU  17
>0010      FS4     EQU  16
>000F      G4      EQU  15
>000E      GS4     EQU  14
>000D      A4      EQU  13
>000B      C5      EQU  11
>000A      CS5     EQU  10
>0009      DS5     EQU  9
>0008      F5      EQU  8
>0007      G5      EQU  7
>0006      A5      EQU  6
>0005      C6      EQU  5
>0004      DS6     EQU  4
>0003      G6      EQU  3
>0002      C7      EQU  2
>0001      G7      EQU  1
>0000      G8      EQU  0
                  ; MASTER OSCILLATOR OFFSETS
>00FE      OB0     EQU  254
>00F1      OC1     EQU  241
>00D6      OD1     EQU  214
>00BF      OE1     EQU  191
>00B4      OF1     EQU  180
>00A0      OG1     EQU  160
>008F      OA1     EQU  143
>0047      OA2     EQU  71
>0023      OA3     EQU  35
>0011      OA4     EQU  17
>0008      OA5     EQU  8

                  ; *********************************
                  ; * SYSTEM MALE GOAT MEMORY CELLS *
                  ; *********************************
>0FFF      URINAL  EQU  0FFFH
>0FFF      MASTER  EQU  URINAL       ; ** LOU HARPS CLEAN AND WHOLESOME TAG **
                  ;
                  ; THE FOLLOWING ORG SHOULD BE SET TO THE VALUE OF
```

```
            ; THE TAG 'SYSRAM', THIS WILL CAUSE SYSTEM RAM
            ; TO RESIDE AT THE HIGHEST POSSIBLE ADDRESS
            ;
                    ORG  4FC8H
4FC8                DEFS 6          ; GOT SOME LEFT STILL
>4FCE       BEGRAM  EQU  $
            ; USED BY MUSIC PROCESSOR
4FCE        MUZPC:  DEFS 2          ; MUSIC PROGRAM COUNTER
4FD0        MUZSP:  DEFS 2          ; MUSIC STACK POINTER
4FD2        PVOLAB: DEFS 1          ; PRESET VOLUME FOR TONES A AND B
4FD3        PVOLMC: DEFS 1          ; PRESET VOLUME FOR MASTER OSC AND TONE C
4FD4        VOICES: DEFS 1          ; MUSIC VOICES
            ; COUNTER TIMERS (USED BY DECCTS,ACTINT,CTIMER)
4FD5        CT0:    DEFS 1          ; COUNTER TIMER 0
4FD6        CT1:    DEFS 1          ; 1
4FD7        CT2:    DEFS 1          ; 2
4FD8        CT3:    DEFS 1          ; 3
4FD9        CT4:    DEFS 1          ; 4
4FDA        CT5:    DEFS 1          ; 5
4FDB        CT6:    DEFS 1          ; 6
4FDC        CT7:    DEFS 1          ; 7
            ; USED BY SENTRY TO TRACK CONTROLS
4FDD        CUNT:   DEFS 1          ;COUNTER UPDATE&NUMBER TRACKING
4FDE        SEMI4S: DEFS 1          ; FLAG BITS
4FDF        OPOT0:  DEFS 1          ; POT 0 TRACKING
4FE0        OPOT1:  DEFS 1          ; POT 1 TRACKING
4FE1        OPOT2:  DEFS 1          ; POT 2 TRACKING
4FE2        OPOT3:  DEFS 1          ; POT 3 TRACKING
4FE3        KEYSEX: DEFS 1          ; KEYBOARD TRACKING BYTE
4FE4        OSW0:   DEFS 1          ; SWITCH 0 TRACKING
4FE5        OSW1:   DEFS 1          ; SWITCH 1 TRACKING
4FE6        OSW2:   DEFS 1          ; SWITCH 2 TRACKING
4FE7        OSW3:   DEFS 1          ; SWITCH 3 TRACKING
4FE8        COLLST: DEFS 2          ; COLOR LIST ADDRESS FOR P.B. AND TIMEOUT
            ; USED BY STIMER
4FEA        DURAT:  DEFS 1          ; NOTE DURATION
4FEB        TMR60:  DEFS 1          ; SIXTITHS OF SEC
4FEC        TIMOUT: DEFS 1          ; BLAKOUT TIMER
4FED        GTSECS: DEFS 1          ; GAME TIME SECONDS
4FEE        GTMINS: DEFS 1          ; GAME TIME MINUTES
            ; USED BY MENU
4FEF        RANSHT: DEFS 4          ; RANDOM NUMBER SHIFT REGISTER
4FF3        NUMPLY: DEFS 1          ; NUMBER OF PLAYERS
4FF4        ENDSCR: DEFS 3          ; SCORE TO 'PLAY TO'
4FF7        MRLOCK: DEFS 1          ; MAGIC REGISTER LOCK OUT FLAG
4FF8        GAMSTB: DEFS 1          ; GAME STATUS BYTE
4FF9        PRIOR:  DEFS 1          ; MUSIC PROTECT FLAG
4FFA        SENFLG: DEFS 1          ; SENTRY CONTROL SEIZURE FLAG
4FFB        UMARGT: DEFS 2
4FFD        USERTB: DEFS 2
>4FCF       SYSRAM  EQU  (5000H-($-BEGRAM+1))

                    LIST S
            ; **********
            ; * HVGSYS *
            ; **********
            ; ** MODIFIED TO CORRECT CALCULATOR BUG AND ASTERISK
            ; ** AND INCSCR AND CLRNUM BUGS
```

```
>0008          PFUG    EQU  08H          ; POT FUDGE FACTOR
>17DE          GFSTRT  EQU  17DEH        ; GUN FIGHT START ADDRESS
>1328          CMSTRT  EQU  1328H        ; CHECKMATE START ADDRESS
>1020          CALCST  EQU  1020H        ; CALCULATOR START ADDRESS
>0E19          SCBST:  EQU  0E19H        ; SCRIBBLING START ADDRESS

                ; *******************
                ; * POWER UP RESTART *
                ; *******************
                        ORG  0
0000 00                 NOP               ; WAIT FOR THINGS TO SETTLE DOWN
0001 F3                 DI
0002 AF                 XOR  A
0003 D308               OUT  (CONCM),A    ; *** SET CONSUMER MODE ***
0005 C3610C             JP   PWRUP

                        ORG  8
                ; TRANSFER CONTROL TO RESTART HANDLER
0008 C30720             JP   2007H        ; VECTOR OUT

000B 1C        NUMBRS: DEFB 1CH
000C 3C                DEFB 3CH
000D 1C                DEFB 1CH
000E 20                DEFB 20H

                        ORG  16
0010 C30A20             JP   200AH        ; RESTART 2
0013 06        MENUCL: DEFB 06H           ; MENU COLORS
0014 FB                DEFB 0FBH
0015 07                DEFB 07H
0016 52                DEFB 52H

                        ORG  24
0018 C30D20             JP   200DH        ; RESTART 3

               ; NAME:          PAUSE
               ; PURPOSE:       HALT # OF INTERRUPTS
               ; INPUT:         B = # OF INTERRUPTS
001B FB        MPAUSE: EI
001C 76                HALT
001D 10FD              DJNZ -1
001F C9                RET

                        ORG  32
0020 C31020             JP   2010H        ; RESTART 4

               ; NAME: SET WORD
                ; (HL)=DE
0023 73        MSETW:  LD   (HL),E
0024 23                INC  HL
0025 72                LD   (HL),D
0026 C9                RET

                        ORG  40
0028 C31320             JP   2013H        ; RESTART 5

002B 210000    CONC2:  LD   HL,0          ; ZERO OUT HL
002E C9                RET

                        ORG  48
0030 C31620             JP   2016H        ; RESTART 6

0033 00        CKSUM0: DEFB 0             ; CHECKSUM
```

```
0034 0001         ITAB:  DEFW MACTIN         ; INTERRUPT TRANSFER
0036 01                  DEFB 1              ; ** SYSTEM REVISION LEVEL

                         ORG  56
                  ; NAME:          USER PROGRAM INTERFACE
                  ; PURPOSE:       TRANSFER OF CONTROL FROM USER TO SYSTEM
                  ; INPUT:         ROUTINE # FOLLOWS INLINE AFTER RST INSTR.
                  ;                IF L.O. BIT SET, LOAD ARGUMENTS INLINE FOLLOWING CALL
                  ; OUTPUT:               NONE
                  ; STACK USE:     18 BYTES TOTAL, 16 BYTES ON EXIT
                  ; SIDE EFFECTS: REGISTERS AF,BC,DE,HL,IX, AND OLD IY SAVED
                  ; EXPLAINATION:
                  ;  REGISTERS AF,BC,DE,HL,IX, AND PREVIOUS IY ARE PUSHED
                  ; THE NUMBER FOLLOWING THE RST 56 INSTRUCTION IS USED TO
                  ; INDEX A JUMP VECTOR GIVING THE STARTING ADDRESS OF THE
                  ; SYSTEM ROUTINE TO CALL.  IF OPTIONED, INLINE ARGUMENTS
                  ; ARE COPIED INTO THE CONTEXT AREA  FOR ARGUMENT ORDERING
                  ; SEE INTERPRETER DOCUMENTATION AND APPROP. TABLES
                  ; A DUMMY RETURN IS INSERTED WHICH, WHEN RETURNED TO BY THE
                  ; SYSTEM ROUTINE, WILL RESTORE THE REGISTER CONTENTS AND
                  ; RETURN TO THE USER PROGRAM
                  ;
                  ;    *** THE UPI HAS BEEN EXTENDED TO SUPPORT USER SUPPLIED
                  ;    ROUTINES.  IF THE CALL INDEX PROVIDED IS NEGATIVE
                  ;    THEN THE USERS DISPATCH TABLE POINTER (USERTB) IS USED.
                  ;    NOTE THAT THE SIGN BIT ISN'T ZAPPED BEFORE BEING
                  ;    USED AS AN INDEX. THIS MEANS THAT THE USERS DISPATCH
                  ;    TABLE POINTER SHOULD POINT 128 BYTES BEFORE THE FIRST ENTRY.
0038 E3                    EX   (SP),HL      ; RETURN ADDRESS TO HL
0039 F5                    PUSH AF           ; CREATE CONTEXT
003A C5                    PUSH BC
003B D5                    PUSH DE
003C DDE5                  PUSH IX
003E FDE5                  PUSH IY
0040 FD210000              LD   IY,0         ; POINT IY AT CONTEXT
0044 FD39                  ADD  IY,SP
0046 7E                    LD   A,(HL)       ; LOAD OPCODE
0047 23                    INC  HL
0048 117A02                LD   DE,RETN      ; DE = RETURN POINT
004B 1F                    RRA               ; SUCK WANTED?
004C 3836                  JR   C,MINT0-$    ; JUMP IF YES
004E E5           INTPE:   PUSH HL           ; SAVE PC
004F D5                    PUSH DE           ; SAVE DUMMY RETURN
0050 210B00                LD   HL,SYSDPT
0053 07                    RLCA
0054 5F                    LD   E,A
0055 1600                  LD   D,0
0057 17                    RLA               ; USER TABLE WANTED?
0058 3003                  JR   NC,PUSH1-$
005A 2AFD4F                LD   HL,(USERTB)  ; YES - LOAD IT
005D 19           PUSH1:   ADD  HL,DE
005E 5E                    LD   E,(HL)
005F 23                    INC  HL
0060 56                    LD   D,(HL)
0061 D5                    PUSH DE
0062 FD660B                LD   H,(IY+CBH)
0065 FD6E0A                LD   L,(IY+CBL)
0068 FD5603       RELD:    LD   D,(IY+CB1XH)
006B FD5E02                LD   E,(IY+CB1XL)
```

```
006E D5                  PUSH DE
006F DDE1                POP  IX
0071 FD7E09              LD   A,(IY+CBA)
0074 FD5605     DELOAD:  LD   D,(IY+CBD)
0077 FD5E04              LD   E,(IY+CBE)
007A C9                  RET              ; CALL VIA RETURN

                ; NAME:          MACRO INTERPRETER
                ; PURPOSE:       INTERPRETING SEQUENCES OF SYSTEM CALLS
                ; INPUT:         ADDRESS OF STRING TO INTERPRET PASSED ON STACK
                ; STACK USE:     NO INCREASE IN DEPTH
                ; EXPLAINATION: IF OPTIONED (BIT 0 OF CALL INDEX SET) THE
                ; ARGUMENT TABLE (MARGT) IS INDEXED GIVING A MASK WHICH
                ; SPECIFIES HOW TO TRANSFER INLINE ARGUMENTS INTO THE CONTEXT
                ; BLOCK.  THIS MASK IS FORMATED AS FOLLOWS:
                ;
                ;
                ; *********************************
                ; * 7 * 6 * 5 * 4 * 3 * 2 * 1 * 0 *
                ; *********************************
                ; * H * L * A * IX* B * C * D * E *
                ; *********************************
                ; ARGUMENTS MUST FOLLOW THE CALL INDEX IN THE FOLLOWING ORDER
                ; (OMITTING UNUSED ARGUMENTS, OF COURSE)
                ; (INDEX),IXL,IXH,E,D,C,B,A,L,H
                ;
                ;       THE SIMULATED PC IS SAVED AND A DUMMY RETURN IS
                ; INSERTED ON THE STACK.  THE UPI DISPATCHING ROUTINE IS
                ; THEN ENTERED AT 'INTPE', WHICH EFFECTS A CONTROL TRANSFER
                ; TO THE CALLED ROUTINE.  WHEN THE CALLED ROUTINE RETURNS
                ; IT WILL COME BACK HERE TO INTERPRET THE NEXT MACRO INSTRUCTION
                ; NOTE THAT THIS ROUTINE IS REENTRANT, THEREFORE THE CALLED
                ; ROUTINE MAY RECUR BACK THRU HERE, IF IT FEELS LIKE IT.
                ; ** THE UPI HAS BEEN EXTENDED TO SUPPORT USER PROVIDED
                ; SYSTEM ROUTINES.  IF A NEGATIVE CALL INDEX IS ENCOUNTERED
                ; BY THE INTERPRETER, AND 'SUCK INLINE' IS OPTIONED, THE
                ; USER MACRO ROUTINE ARGUMENT TABLE IS INDEXED FOR A
                ; PARAMETER MASK.  THE ADDRESS OF THIS TABLE IS ASSUMED
                ; TO BE IN (UMARGT),(UMARGT+1).  THIS POINTER SHOULD
                ; POINT 64 BYTES BEFORE THE FIRST REAL ENTRY.
                ; I.E. LD      HL,USERMT-64    ; WHERE USERMT POINTS AT FIRST ENTRY
                ;      LD      (UMARGT),HL
007B D1         MINTPC: POP  DE           ; DISCARD DUMMY RETURN FROM UPI
007C            RENTER:
007C E1                 POP  HL           ; POP OFF PC


                ; NAME: MCALL
                ; PURPOSE:       CALL INTERPRETER SUBROUTINE
                ; INPUT:         HL = ROUTINE ADDRESS
                ; NOTES:         ROUTINE MAY BE CALLED FROM MACHINE LANGUAGE OR
                ;                ANOTHER INTERPRETED SEQUENCE
                ;                STACK DEPTH INCREASED BY 4 BY CALL
007D 7E         MMCALL: LD   A,(HL)       ; GET OPCODE
007E 23                 INC  HL
007F CB3F               SRL  A
0081 117C00             LD   DE,RENTER    ; LOAD INTERPRETER DUMMY RETURN
0084 D5         MINTO:  PUSH DE           ; SAVE DUMMY RETURN
0085 4F                 LD   C,A          ; INDEX TO C
```

```
0086 2012                 JR   NC,MINT2-$   ; JUMP IF NO LOAD WANTED
0088 EB                   EX   DE,HL
0089 0600                 LD   B,0
008B 214A00               LD   HL,MKARGT    ; LOAD SYSTEM ARG TABLE
008E CB77                 BIT  6,A          ; USE USER TABLE?
0090 2803                 JR   Z,MINT1-$    ; JUMP IF NO
0092 2AFB4F               LD   HL,(UMARGT)
0095 09           MINT1:  ADD  HL,BC        ; INDEX TABLE
0096 46                   LD   B,(HL)
0097 CDA800               CALL MSUCK1       ; CALL SUCK ROUTINE
009A D1           MINT2:  POP  DE           ; DUMMY RETURN TO DE, HL = PC
009B 79                   LD   A,C          ; GET CALL INDEX BACK
009C FD4607               LD   B,(IY+CBB)   ; RESTORE CLOBBERED REGISTERS
009F FD4E06               LD   C,(IY+CBC)
00A2 18AA                 JR   INTPE-$      ; JOIN NORMAL UPI DISPATCH SEQUENCE

                  ; NAME:          SUCK INLINE ARGUMENTS
                  ; PURPOSE:       TRANSFER OF INLINE ARGS INTO CONTEXT BLOCK
                  ; INPUT:         B = ARG LOAD MASK (SEE INTERPRETER COMMENTS)
                  ; OUTPUT:        HL = UPDATED PC
                  ; EXPLAINATION: THIS ROUTINE IMPLEMENTS A MACRO LOAD INSTRUCTION
                  ; IT IS USED BY THE INTERPRETER AS WELL.  A ONE BIT IN THE
                  ; INLINE LOAD MASK MEANS TRANSFER THE NEXT INLINE BYTE INTO THE CB
                  ; A ZERO BIT MEANS 'ADVANCE CONTEXT BLOCK POINTER'
                  ; TWO ENTRY POINTS ARE DEFINED, ONE FOR THE SUCK MACRO INSTRUCTION
                  ; THE OTHER FOR THE INTERPRETER TO USE
                  ; SUCK MACRO ENTRY:
00A4 E1           MSUCK:  POP  HL           ; RETURN ADDRESS TO HL
00A5 D1                   POP  DE           ; POP OFF PC
                   ; *** BYTE SAVING TRICK *** REPLACE WITH LD HL,REENTRY IF THINGS CHANGE
00A6 23                   INC  HL           ; ADVANCE TO REENTRY (MINT0)
00A7 E5                   PUSH HL
                   ; FALL INTO ...
00A8 CB60         MSUCK1: BIT  4,B          ; IX LOAD WANTED?
00AA 280A                 JR   Z,MSUCK2-$   ; MSUCK2 IF NOT
00AC 1A                   LD   A,(DE)
00AD 13                   INC  DE
00AE FD7702               LD   (IY+CBIXL),A
00B1 1A                   LD   A,(DE)
00B2 13                   INC  DE
00B3 FD7703               LD   (IY+CBIXH),A
00B6 FDE5         MSUCK2: PUSH IY           ; LET HL = IY
00B8 E1                   POP  HL
00B9 23                   INC  HL           ; + 4
00BA 23                   INC  HL
00BB 23                   INC  HL
00BC 23                   INC  HL
00BD CBA0                 RES  4,B          ; KILL IX BIT
                   ; THE FAMOUS SUCK IN LOOP
00BF CB38         MSUCK3: SRL  B
00C1 3003                 JR   NC,MSUCK5-$  ; MSUCK5 IF NOT THIS TIME
00C3 1A                   LD   A,(DE)       ; GET INLINE BYTE
00C4 13                   INC  DE
00C5 77                   LD   (HL),A       ; STUFF INTO CB
00C6 23           MSUCK5: INC  HL           ; BUMP CB POINTER
                   ; ** THIS CODE ASSUMES THAT STATUS OF 'SRL' IS PRESERVED
00C7 20F6                 JR   NZ,MSUCK3-$  ; JUMP BACK IF MORE TO DO
00C9 EB                   EX   DE,HL        ; HL = PC
00CA C9                   RET               ; THEN QUIT
```

```
                ; ****************************
                ; * UPI ROUTINE ADDRESS TABLE *
                ; ****************************
00CB 7B00       SYSDPT: DEFW MINTPC
00CD 7902               DEFW MXINTC
00CF 3206               DEFW MKCALL
00D1 7D00               DEFW MMCALL
00D3 7300               DEFW MMRET
00D5 C400               DEFW MMJUMP
00D7 A400               DEFW MSUCK
00D9 8801               DEFW MACTIN
00DB 7E04               DEFW TIMEY
00DD 8805               DEFW MUZSET
00DF FC05               DEFW MUZSTP
00E1 CF03               DEFW MSETUP
00E3 DB01               DEFW MCOLOR
00E5 EE04               DEFW MFILL
00E7 B206               DEFW MPAINT
00E9 FE06               DEFW MVWRIT
00EB 0E07               DEFW MWRITR
00ED 1507               DEFW MWRITP
00EF 1907               DEFW MWRIT
00F1 1C07               DEFW MWRITA
00F3 7D07               DEFW MVBLAN
00F5 9E07               DEFW MBLANK
00F7 B903               DEFW MSAVE
00F9 AD07               DEFW MREST
00FB 6A02               DEFW MSCROL
00FD E107               DEFW DISPCH
00FF C407               DEFW STRNEW
0101 EB0B               DEFW BCDISP
0103 F60B               DEFW MRELAB
0105 FA0A               DEFW MRELA1      ; RELAB1
0107 5606               DEFW MVECTC
0109 3306               DEFW MVECT
010B C90A               DEFW MKCTAS
010D AC01               DEFW MENTRY      ; SENTRY
010F 0C06               DEFW MDOIT       ; DOIT
0111 0E06               DEFW MDOITR
0113 BA01               DEFW MPIZBK      ; PIZBRK
0115 970C               DEFW MMENU
0117 FB0C               DEFW MGETP
0119 310D               DEFW MGETN
011B 1B00               DEFW MPAUSE      ;PAUSE
011D CC0B               DEFW MDISTI      ;DISPLAY TIME
011F 150C               DEFW MINCSC      ;INC SCORE
0121 760B               DEFW INXNIB      ; INDEXN
0123 900B               DEFW PUTNIB      ; STOREN
0125 AC0B               DEFW MINDW       ; INDEXW
0127 BD0B               DEFW MINDB       ; INDEXB
0129 4B0B               DEFW MMOVE       ; MOVE
012B AA0D               DEFW MSHFTU
012D 2103               DEFW BCDAD
012F 1F03               DEFW BCDSB
0131 DE02               DEFW BCDMI
0133 8402               DEFW BCDDV
0135 6403               DEFW BCDCS
0137 4103               DEFW BCDNG
0139 6E03               DEFW SDXOD
```

```
013B 2903          DEFW SDSMG
013D 5603          DEFW SDABS
013F 4C03          DEFW SNEGT
0141 7F03          DEFW MRANGE
0143 410C          DEFW MQUIT
0145 6C03          DEFW MSETB
0147 2300          DEFW MSETW
0149 4002          DEFW MMTD

          ; MACRO ROUTINES ARGUMENT MASK TABLE
          ; FORMAT:
          ; *********************************
          ; * 7 * 6 * 5 * 4 * 3 * 2 * 1 * 0 *
          ; *********************************
          ; * H * L * A * IX* B * C * D * E *
          ; *********************************
          ; ARGUMENTS MUST FOLLOW THE CALL INDEX IN THE FOLLOWING ORDER
          ; (OMITTING UNUSED ARGUMENTS, OF COURSE)
          ; (INDEX),IXL,IXH,E,D,C,B,A,L,H
014B 00   MRARGT: DEFB 0           ; INTPC
014C 00           DEFB 0           ; XINTC
014D C0           DEFB 11000000B   ; RCALL
014E C0           DEFB 11000000B   ; MCALL
014F 00           DEFB 0           ; MRET
0150 C0           DEFB 11000000B   ; MJUMP
0151 08           DEFB 00001000B   ; SUCK
0152 00           DEFB 0           ; ACTINT
0153 04           DEFB 00000100B   ; DECCTS
0154 F0           DEFB 11110000B   ; BMUSIC
0155 00           DEFB 0           ; EMUSIC
0156 2A           DEFB 00101010B   ; SETOUT
0157 C0           DEFB 11000000B   ; COLSET
0158 2F           DEFB 00101111B   ; FILL
0159 2F           DEFB 00101111B   ; RECTAN
015A D0           DEFB 11010000B   ; VWRITR
015B E3           DEFB 11100011B   ; WRITR
015C E3           DEFB 11100011B   ; WRITP
015D EF           DEFB 11101111B   ; WRIT
015E EF           DEFB 11101111B   ; WRITA
015F 13           DEFB 00010011B   ; VBLANK
0160 CB           DEFB 11001011B   ; BLANK
0161 CF           DEFB 11001111B   ; SAVE
0162 C3           DEFB 11000011B   ; RESTORE
0163 CF           DEFB 11001111B   ; SCROLL
0164 27           DEFB 00100111B   ; NEW DISCHR
0165 C7           DEFB 11000111B   ; NEW DISSTR
0166 CF           DEFB 11001111B   ; DISNUM
0167 20           DEFB 00100000B   ; RELABS
0168 20           DEFB 00100000B   ; RELAB1
0169 D4           DEFB 11010100B   ; VECTC
016A D0           DEFB 11010000B   ; VECT
016B 00           DEFB 0           ; KCTASC
016C 03           DEFB 00000011B   ; SENTRY
016D C0           DEFB 11000000B   ; DOIT
016E C0           DEFB 11000000B   ; DOITB
016F 00           DEFB 0           ; PIZBRK
0170 C3           DEFB 11000011B   ; MENU
0171 EC           DEFB 11101100B   ; GET PARAMETER
0172 CF           DEFB 11001111B   ; GET NUMBER
```

```
0173 08          DEFB 00001000B    ; PAUSE
0174 07          DEFB 00000111B    ; DISTIM
0175 C0          DEFB 11000000B    ; INCSCR
0176 C0          DEFB 11000000B    ; INDEXN
0177 C0          DEFB 11000000B    ; STOREN
0178 C0          DEFB 11000000B    ; INDEXN
0179 C0          DEFB 11000000B    ; INDEXB
017A CF          DEFB 11001111B    ; MOVE
017B C8          DEFB 11001000B    ; SHIFTU
017C CB          DEFB 11001011B    ; BCDADD
017D CB          DEFB 11001011B    ; BCDSUB
017E CB          DEFB 11001011B    ; BCDMUL
017F CB          DEFB 11001011B    ; BCDDIV
0180 C8          DEFB 11001000B    ; BCDCHS
0181 0B          DEFB 00001011B    ; BCDNEG
0182 CB          DEFB 11001011B    ; DADD
0183 0B          DEFB 00001011B    ; DSMG
0184 0B          DEFB 00001011B    ; DABS
0185 C8          DEFB 11001000B    ; NEGT
0186 20          DEFB 00100000B    ; RANGED
0187 00          DEFB 00000000B    ; QUIT
0188 E0          DEFB 11100000B    ; SET BYTE
0189 C3          DEFB 11000011B    ; SET WORD
018A C7          DEFB 11000111B    ; MASK TO DELTAS

                 ; INTERUPT ROUTINE FOR EVERYBODY
                 ; WHO DOESN'T WANT TO WRITE THEIR OWN
                 ; DOES 4 60TH SEC COUNTERS IN CT0-3
018B F3          MACTIN: DI                ; MAKE DAMN SURE WE IS OFF
018C F5                  PUSH AF
018D C5                  PUSH BC
018E D5                  PUSH DE
018F E5                  PUSH HL
0190 ED5E                IM   2
0192 3E00                LD   A,ITAB.SHR.8
0194 ED47                LD   I,A
0196 3EC8                LD   A,200
0198 D30F                OUT  (INLIN),A
019A 3E34                LD   A,ITAB&0FFH
019C D30D                OUT  (INFBK),A
019E CD0004              CALL TIMEZ          ; UPDATE TIMOUT,MUSIC AND SECONDS
01A1 0E0F                LD   C,0FH          ; USE CT0-3
01A3 CD7E04              CALL TIMEY          ; DEC CT0-3
01A6 E1                  POP  HL
01A7 D1                  POP  DE
01A8 C1                  POP  BC
01A9 F1                  POP  AF
01AA FB                  EI
01AB C9                  RET

                 ; ROUTINE: SENTRY
                 ; PURPOSE: TO WAIT FOR CHANGE OF PROGRAM STATUS
                 ; IN EITHER THE PORTS OR THE TIMER-COUNTERS.
                 ; IN ADDITION IT CHECKS TIMOUT FOR LONG PERIODS OF IN-
                 ; ACTIVITY.
                 ; ** IS VECTOR OUT FLAG SET??
01AC 3AFA4F      MENTRY: LD   A,(SENFLG)
01AF FEAA                CP   0AAH
01B1 CA1920              JP   Z,2019H       ; YES - JUMP OUT
01B4 3AFC4F              LD   A,(TIMOUT)    ; CHECK IF TIME TO BLAKOUT
```

```
01B7 B7                 OR   A
01B8 202B               JR   NZ,TTEST-$
01BA AF        MPIZBK:  XOR  A              ; TIME TO SHUT DOWN
01BB F3                 DI
01BC D315               OUT  (VOLC),A       ; TURN OFF SOUNDS
01BE D316               OUT  (VOLAB),A
01C0 010808             LD   BC,COLBX+8*256
01C3 ED79               OUT  (C),A          ; PAINT IT BLACK
01C5 10FC               DJNZ -2
01C7 111402    PKLP:    LD   DE,AKEYS
01CA CDF40C             CALL FINDL3         ; CALL STORE DE INTO CONTEXT ROUTINE
01CD CDE501             CALL TTEST          ; WAIT FOR SOMETHING TO HAPPEN
01D0 3C                 INC  A
01D1 20E7               JR   NZ,MPIZBK-$
01D3 FD360900           LD   (IY+CBA),0
01D7 FB                 EI
01D8 2AE84F             LD   HL,(COLLST)    ;  GET SAVED COLORS
01DB 22E84F    MCOLOR:  LD   (COLLST),HL    ; SAVE COLORS FOR FUTURE
01DE 010808             LD   BC,800H+COLBX
01E1 EDB3               OTIR                ; RESET THE COLORS
01E3 AF                 XOR  A
01E4 C9                 RET
01E5 CDEC03    TTEST    CALL TRCHK
01E8 FD7709             LD   (IY+CBA),A
01EB FD7007             LD   (IY+CBB),B
01EE FE13               CP   SKYD
01F0 D8                 RET  C
01F1 FE1C               CP   POT0
01F3 D0                 RET  NC
01F4 3EFF               LD   A,0FFH
01F6 32EC4F             LD   (TIMOUT),A
01F9 C9                 RET

01FA C40D      CALCL:   DEFW SCBL
01FC DD0D               DEFW PNCALC
01FE 2010               DEFW CALCST         ; START OF CALCULATOR

                ; SYSTEM ROUTINES JUMP VECTOR
                        ORG  200H
0200 C3A004             JP   TIMEZ          ; DO TIMER & MUSIC
0203 C37B04             JP   TIMEX          ; DECTMR

0206 20        SYSFNT:  DEFB 20H
0207 08                 DEFB 8
0208 08                 DEFB 8
0209 01                 DEFB 1
020A 07                 DEFB 7
020B E408               DEFW LRGCHR

020D A0        SMLFNT:  DEFB 0A0H
020E 04                 DEFB 4
020F 06                 DEFB 6
0210 01                 DEFB 1
0211 05                 DEFB 5
0212 BF0A               DEFW SMLCHR

                ; ALLKEYS MASK
0214 3F        AKEYS    DEFB 3FH
0215 3F                 DEFB 3FH
```

```
0216 3F                     DEFB 3FH
0217 3F                     DEFB 3FH

                 ; HEAD OF ONBOARD MENU
0218 BEAD        GUNLNK:    DEFW CML
021A CA0D                   DEFW PNGF
021C DE17                   DEFW GESTRT
021E 4D41584 0              DEFM 'MAX SCORE'
0227 00                     DEFB 0
0228 23204F46               DEFM '# OF PLAYERS'
0234 00                     DEFB 0
0235 23204F46               DEFM '# OF GAMES'
023F 00                     DEFB 0

                 ; NAME:          CONVERT MASK TO DELTAS
                 ; INPUT:         B = JOYSTICK MASK
                 ;                C = FLOP STATUS (MR FLOP BIT SET IF FLOP WANTED)
                 ;                DE = X POSITIVE DELTA
                 ;                HL = Y POSITIVE DELTA
0240 CD5602      MMTD:      CALL CONCPL       ; HANDLE Y
0243 EB                     EX   DE,HL
0244 CB71                   BIT  MRFLOP,C     ; FLOP SET?
0246 2807                   JR   Z,MMTD2-$    ; YES - DOIT
0248 78                     LD   A,B          ; NO - GET MASK
0249 E603                   AND  3
024B 2801                   JR   Z,MMTD1-$
024D 2F                     CPL               ; INVERT IF NOT ZERO
024E 47          MMTD1:     LD   B,A
024F CD5602      MMTD2:     CALL CONCPL       ; PROCESS X
0252 EB                     EX   DE,HL
0253 C3E800                 JP   STHLDE       ; STORE HL,DE AND QUIT


                 ; SUBROUTINE TO CONDITIONALLY COMPLEMENT OR ZERO HL
0256 CB08        CONCPL:    RRC  B
0258 300A                   JR   NC,CONC1-$   ; JUMP IF NOT UP
025A 7D                     LD   A,L
025B 2F                     CPL
025C 6F                     LD   L,A
025D 7C                     LD   A,H
025E 2F                     CPL
025F 67                     LD   H,A
0260 23                     INC  HL
0261 CB08                   RRC  B
0263 C9                     RET
0264 CB08        CONC1:     RRC  B            ; DOWN SET?
0266 D8                     RET  C            ; QUIT IF SO
0267 C32B00                 JP   CONC2        ; JUMP TO ZERO OUT


                 ; NAME:          SCROLL MEMORY BLOCK
                 ; INPUT:         B = NUMBER OF LINES TO SCROLL
                 ;                C = NUMBER OF BYTES ON LINE TO SCROLL
                 ;                DE = LINE INCREMENT
                 ;                HL = FIRST LINE TO SCROLL
026A AF          MSCROL:    XOR  A
026B C5          MSCRL1:    PUSH BC           ; SAVE COUNTERS
026C D5                     PUSH DE
026D 47                     LD   B,A
```

```
026E EB                  EX   DE,HL
026F 19                  ADD  HL,DE        ; ADD INCREMENT TO LINE
0270 E5                  PUSH HL
0271 EDB0                LDIR              ; ZZZAP!
0273 E1                  POP  HL
0274 D1                  POP  DE
0275 C1                  POP  BC
0276 10E3                DJNZ MSCRL1-$
0278 C9                  RET

            ; NAME:         MACRO INTERPRETER EXIT WITH CONTEXT RESTORE
            ; PURPOSE:      QUIT INTERPRETING AND GO HOME
0279 E1     MXINTC: POP  HL                ; THROW OUT DUMMY RETURN
            ; NAME:         RETURN FROM SYSTEM CALL
            ; PURPOSE:      RETURNING TO USER AND RESTORATION OF REGISTERS
027A E1     RETN:   POP  HL                ; RETURN ADDRESS TO HL
027B FDE1           POP  IY
027D DDE1           POP  IX
027F D1             POP  DE
0280 C1             POP  BC
0281 F1             POP  AF
0282 E3             EX   (SP),HL           ; STK=RETURN, HL=OLD HL
0283 C9             RET


            ; NAME:         BCD DIVIDE
            ;
0284 CDC002 BCDDV:  CALL GNACC             ; GENERATE ACCUMULATOR
0287 E3             EX   (SP),HL           ; HL = ACC, TOP = ARG2
0288 C5             PUSH BC
0289 0600           LD   B,0
028B 79             LD   A,C
028C CB39           SRL  C
028E 09             ADD  HL,BC
028F 4F             LD   C,A
0290 EB             EX   DE,HL             ; HL = ARG1, DE = ACC
0291 EDB0           LDIR                   ; HL = ARG1 FLAG+1
0293 C1             POP  BC
0294 D1             POP  DE
0295 2B             DEC  HL                ; ** FIX **
0296 E3             EX   (SP),HL           ; HL = ARG2, TOP = ARG1 FLAG
0297 C5             PUSH BC
0298 0600           LD   B,0
029A 09             ADD  HL,BC             ; HL = ACC+SIZE/2
029B C1             POP  BC
029C 0D             DEC  C                 ; ** FIX ** DECREMENT SIZE
029D EB             EX   DE,HL             ; HL = ARG2, DE = ACC, TOP = ARG1FLAG
029E 1B             DEC  DE                ; ** FIX **
029F 1B     DIV1:   DEC  DE
02A0 AF             XOR  A
02A1                SYSTEM NEGT            ; ARG2 = -ARG2 (10S COMP)
02A3        DIV2:   SYSTEM DADD            ; SUBTRACT UNTIL BORROW
02A5 3804           JR   C,DIV3-$
02A7 3C             INC  A                 ; OR UNTIL LOOP COUNT > 99
02A8 27             DAA
02A9 20F8           JR   NZ,DIV2-$
02AB E1             POP  HL
02AC 36FF           LD   (HL),0FFH
02AE C1             POP  BC
```

```
02AF 186A          JR   MUL16-$
02B1        DIV3:  SYSTEM NEG1
02B3               SYSTEM DADD
02B5 E3            EX   (SP),HL      ; HL = ARG1
02B6 2B            DEC  HL
02B7 77            LD   (HL),A       ; SAVE ANSWER IN ARG1
02B8 E3            EX   (SP),HL
02B9 0D            DEC  C
02BA 20E3          JR   NZ,DIV1-$
02BC E1            POP  HL
02BD C1            POP  BC
02BE 1855          JR   DIV4-$
            ; SURROUTINE TO GENERATE ACCUMULATOR ON THE STACK
02C0 DDE1   GNACC: POP  IX
02C2 AF            XOR  A
02C3 4F            LD   C,A
02C4               SYSTEM DABS       ;ARG1=ABS VALUE
02C6 EB            EX   DE,HL
02C7               SYSTEM DABS       ;ARG2=ABS VALUE
02C9 EB            EX   DE,HL        ;FLAG=1 IF NEG ANS, ELSE POS
02CA 67            LD   H,A
02CB 6F            LD   L,A
02CC 78            LD   A,B
02CD E5     MULT1  PUSH HL           ;GENERATE ACC ON STACK
02CE 10FD          DJNZ MULT1-$
02D0 47            LD   B,A          ;RESTORE SIZE
02D1 39            ADD  HL,SP
02D2 C5            PUSH BC           ; SAVE SIGN
02D3 E5            PUSH HL           ;SAVE STACK POINTER
02D4 E5            PUSH HL           ;SAVE ACC POINTER
02D5 FD660A        LD   H,(IY+CBH)   ;RESTORE ARG2 POINTER
02D8 FD6E0A        LD   L,(IY+CBL)
02DB 48            LD   C,B
02DC DDE9          JP   (IX)
                   ;DECIMAL MULTIPLY
                   ;GIVEN:     DE>ARG1, HL>ARG2, B=SIZE/2
                   ;            (SIZE/2-1 ASSUMED EVEN)
                   ;RETURNED: ARG1=ANSWER, C>0 ON OVERFLOW
                   ;
                   ;
02DE CDC002 BCDML: CALL GNACC        ; GENERATE ACCUM
02E1 7E     MULT2  LD   A,(HL)       ;A=MULT LOOP COUNT
02E2 23            INC  HL
02E3 E3            EX   (SP),HL      ;HL>DEC ACC
02E4 A7            AND  A            ;IF A=0, SKIP MULT LOOP
02E5 2809          JR   Z,MULT4-$
02E7 EB            EX   DE,HL
02E8        MULT3: SYSTEM DADD       ; ELSE MULTIPLY
02EA A7            AND  A            ; CLEAR THE CARRY BIT
02EB 3D            DEC  A            ;DECIMAL DECREMENT
02EC 27            DAA
02ED 20F9          JR   NZ,MULT3-$
02EF EB            EX   DE,HL
02F0 23     MULT4: INC  HL           ;INCREMENT DECIMAL ACC
02F1 E3            EX   (SP),HL      ;HL>ARG2
02F2 0D            DEC  C
02F3 20EC          JR   NZ,MULT2-$
02F5 E1            POP  HL
02F6 E1            POP  HL           ;RESTORE STACK POINTER
```

```
02F7 C1            POP  BC          ; RESTORE SIGN
02F8 D5            PUSH DE
02F9 C5            PUSH BC
02FA 48            LD   C,B
02FB 0600          LD   B,0
02FD CB39          SRL  C
02FF 09            ADD  HL,BC
0300 CB21          SLA  C
0302 EDB0          LDIR
0304 C1            POP  BC
0305 C5            PUSH BC          ;CHECK FOR OVERFLOW
0306 CB38          SRL  B
0308 AF            XOR  A
0309 B6     MULT5: OR   (HL)
030A 23            INC  HL
030B 10FC          DJNZ MULT5-$
030D A7            AND  A           ; SET FLAGS
030E 2803          JR   Z,MULT7-$
0310 3EFF          LD   A,0FFH
0312 12            LD   (DE),A
0313 C1     MULT7: POP  BC          ;CHECK SIGN AND
0314 E1            POP  HL
0315 CB41   DIV4:  BIT  0,C         ;NEGATE ARG1 IF NECESSARY
0317 2802          JR   Z,MULT6-$
0319               SYSTEM BCDCHS
031B E1     MULT6: POP  HL          ;RESTORE ORIGINAL STACK POINTER
031C 10FD          DJNZ MULT6-$
031E C9            RET
                   ;BCD SUBTRACT & ADD
                   ;
                   ;GIVEN:     DE>ARG1, HL>ARG2
                   ;           B=SIZE/2+1
                   ;RETURNED: ARG1=ANSWER
031F        BCDSB: SYSTEM BCDCHS
0321        BCDAD: SYSTEM BCDNEG
0323 EB            EX   DE,HL
0324               SYSTEM BCDNEG
0326 EB            EX   DE,HL
0327               SYSTEM DADD
            ; AND FALL INTO
                   ;
                   ;
                   ;DECIMAL SIGNED MAGNITUDE
                   ;
                   ;GIVEN:     DE>ARG (10'S COMPLEMENT)
                   ;           B=SIZE/2+1
                   ;RETURNED: ARG (SIGNED MAGNITUDE)
                   ;
0329 68     SDMG:  LD   L,B         ;HL>ARG+B-1 (SIGN BYTE)
032A 2D            DEC  L
032B 2600          LD   H,0
032D 19            ADD  HL,DE
032E 7E            LD   A,(HL)      ;IF POS (SIGN NIBBLE<5)
032F FE50          CP   50H
0331 D8            RET  C           ;EXIT
0332 EB            EX   DE,HL
0333 3E00   SDSMG1: LD  A,0         ;ELSE 10'S COMPLEMENT
0335 96            SBC  A,(HL)
0336 27            DAA
```

```
0337 77              LD   (HL),A
0338 23              INC  HL
0339 10F8            DJNZ SDSHG1-4
033B 2B              DEC  HL           ;AND SET SIGN BIT
033C 7E              LD   A,(HL)
033D F680            OR   80H
033F 77              LD   (HL),A
0340 C9              RET
                     ;
                     ;
                     ;BCD NEGATE
                     ;
                     ;GIVEN:    DE>ARG (SIGNED MAGNITUDE)
                     ;          B=SIZE/2+1
                     ;RETURNED: ARG (10'S COMPLEMENT)
                     ;
0341 68      BCDNG:  LD   L,B          ;HL>ARG+B-1 (SIGN BYTE)
0342 2D              DEC  L
0343 2600            LD   H,0
0345 19              ADD  HL,DE
0346 CB7E            BIT  7,(HL)       ;EXIT IF POS
0348 C8              RET  Z
0349 3600            LD   (HL),0       ; CLEAR SIGN BYTE
034B EB              EX   DE,HL
034C AF      SNEG1:  XOR  A            ; CLEAR CARRY
034D 3E00    BCDNG1: LD   A,0          ;ELSE 10'S COMPLEMENT
034F 9E              SBC  A,(HL)
0350 27              DAA
0351 77              LD   (HL),A
0352 23              INC  HL
0353 10F8            DJNZ BCDNG1-4
0355 C9              RET
                     ;
                     ;
                     ;DECIMAL ABSOLUTE
                     ;
                     ;GIVEN:    DE>ARG (SIGNED MAGNITUDE)
                     ;          B=SIZE/2+1
                     ;RETURNED: C=C+1 IF SIGN BIT CLEARED
                     ;
0356 68      SDABS:  LD   L,B
0357 2600            LD   H,0
0359 2D              DEC  L
035A 19              ADD  HL,DE
035B CB7E            BIT  7,(HL)
035D C8              RET  Z
035E 3600            LD   (HL),0
0360 FD3406          INC  (IY+CRC)
0363 C9              RET
                     ;
                     ;
                     ;BCD CHANGE SIGN
                     ;
                     ;GIVEN:    HL>ARG, B=SIZE/2+1
                     ;          (SIGNED MAGNITUDE)
                     ;RETURNED: ARG SIGN BIT COMPLEMENTED
                     ;
0364 48      BCDCS:  LD   C,B
0365 0600            LD   B,0
```

```
0367 0D              DEC  C
0368 09              ADD  HL,BC
0369 7E              LD   A,(HL)
036A EE80            XOR  80H
                  ; NAME:         SET BYTE
036C 77       MSETB: LD   (HL),A
036D C9              RET
                     ;
                     ;
                     ;DECIMAL ADD
                     ;
                     ;GIVEN:    DE>ARG1  HL>ARG2 (10'S COMPLEMENT)
                     ;               B=SIZE/2+1
                     ;RETURNED: ARG1=ANSWER (10'S COMPLIMENT)
                     ;
036E AF       SDADD: XOR  A
036F 1A       SDADD1: LD  A,(DE)
0370 8E              ADC  A,(HL)
0371 27              DAA
0372 12              LD   (DE),A
0373 13              INC  DE
0374 23              INC  HL
0375 10F8            DJNZ SDADD1-$
0377 FE99            CP   99H          ; ** FIX **
0379 17              RLA               ; ** FIX **
037A 2F              CPL               ; ** FIX **
037B FD7708          LD   (IY+CRFLAG),A ; SEND BACK STATUS FROM DADD
037E C9              RET


                  ; NAME:          RANGED RANDOM NUMBER
                  ; INPUT:         A = RANGE
                  ; OUTPUT:        A = RANDOM NUMBER (0 TO RANGE-1)
037F F5       MRANGE: PUSH AF
0380 2AEF4F          LD   HL,(RANSHT)
0383 CDAC03          CALL SHIFTR
0386 011700          LD   BC,23
0389 09              ADD  HL,BC
038A 8A              ADC  A,D
038B 22EF4F          LD   (RANSHT),HL
038E 2AF14F          LD   HL,(RANSHT+2)
0391 5F              LD   E,A
0392 CDAC03          CALL SHIFTR
0395 19              ADD  HL,DE
0396 22F14F          LD   (RANSHT+2),HL
0399 5A              LD   E,D
039A EB              EX   DE,HL
039B F1              POP  AF
039C A7              AND  A
039D 4F              LD   C,A
039E 7A              LD   A,D
039F 2808            JR   Z,R3-$
03A1 AF              XOR  A
03A2 19       R1:    ADD  HL,DE
03A3 3001            JR   NC,R2-$
03A5 3C              INC  A
03A6 0D       R2:    DEC  C
03A7 20F9            JR   NZ,R1-$
03A9 C3010A   R3:    JP   GOPROG
```

```
03AC 44         SHIFTR: LD    B,H
03AD 4D                 LD    C,L
03AE AF                 XOR   A
03AF 1607               LD    D,7
03B1 29         SH1:    ADD   HL,HL
03B2 17                 RLA
03B3 15                 DEC   D
03B4 20FB               JR    NZ,SH1-$
03B6 09                 ADD   HL,BC
03B7 8A                 ADC   A,D
03B8 C9                 RET

                ; NAME:         SAVE AREA
                ; INPUT:        HL = SCREEN ADDRESS
                ;               DE = SAVE AREA ADDRESS
                ;               BC = Y,X SIZE OF AREA TO SAVE
                ; NOTES:        THE SIZES OF THE OBJECT ARE SAVED IN THE
                ;               THE FIRST TWO BYTES OF THE SAVE AREA.
03B9 EB         MSAVE:  EX    DE,HL
03BA 71                 LD    (HL),C      ; SET X SIZE
03BB 23                 INC   HL
03BC 70                 LD    (HL),B      ; SET Y SIZE
03BD 23                 INC   HL
03BE AF                 XOR   A
03BF EB                 EX    DE,HL
03C0 CBF4               SET   6,H         ; SET NONMAGIC ADDRESS
03C2 C5         MSAVE1: PUSH  BC
03C3 E5                 PUSH  HL
03C4 47                 LD    B,A
03C5 EDB0               LDIR
03C7 E1                 POP   HL
03C8 0E28               LD    C,BYTEPL
03CA 09                 ADD   HL,BC
03CB C1                 POP   BC
03CC 10F4               DJNZ  MSAVE1-$
03CF C9                 RET

                ; NAME: PROGRAM OUTPUT PORT SETUP
                ; PURPOSE: TO SET CONCOM,VERBL ETC
                ; INPUTS:  B=HORCB, D=VERBL, A=INMOD
03D1 0E09       MSETUP: LD    C,HORCB     ; GET BASE PORT NUMBER
03D1 ED41               OUT   (C),B       ; HORBD
03D3 0C                 INC   C           ;
03D4 ED51               OUT   (C),D       ; VERBL
03D6 D30E               OUT   (INMOD),A
03D8 C9                 RET

                ; NAME: TEST FOR TRANSITIONS
                ; FUNCTION: TO LOOK FOR CHANGES IN THE PORTS ATC.
                ; RETURNS : A= 0 NO CHANGE
                ; 1-8 COUNTER TIMER#N HIT 0
                ; 9-C = POT0-3 CHANGED
                ; D = A SECONDS UP
                ; E= KEYBOARD CHANGED (B=0-24)
                ; F-16 : TRIG0!JOY0 - T3!J3
                ; RETURNS NEW VALUE IN B
03D9 5E         CTLP    LD    E,(HL)
```

```
03DA 010108          LD   BC,801H
03DD 79      CCTLP   LD   A,C          ; GET MASK
03DE 0F              RRCA
03DF 4F              LD   C,A
03E0 A3              AND  E            ; CHECK IF CT BIT =1
03E1 2003            JR   NZ,CCT1-$
03E3 10F8            DJNZ CCTLP-$
03E5 C9              RET
03E6 AB      CCT1:   XOR  E            ; MASK OUT BIT IN QUESTION
03E7 77              LD   (HL),A       ; PUT BACK THE CTFLAGS OR SEMI4S
03E8 78              LD   A,B
03E9 82              ADD  A,D
03EA E1              POP  HL           ; OLD RET ADDR
03EB C9              RET
03EC 2825    TRCHK:  JR   Z,TSEX-$     ; SKIP COUNTER-TIMERS AND POTS?
03EE 21DD4F          LD   HL,CUNT      ; GET COUNTER   TIMERS STATUS
03F1 1600            LD   D,0
03F3 CDD903          CALL CTLP         ; COUNTER TIMERS
03F6 1608            LD   D,8
03F8 23              INC  HL
03F9 CDD903          CALL CTLP         ; SEMI4S
03FC 011C04          LD   BC,400H+POT0
03FF 23      TPLOP   INC  HL           ; -> MPOT0
0400 ED78            IN   A,(C)
0402 5E              LD   E,(HL)       ; GET OPOT
0403 93              SUB  E
0404 3805            JR   C,PHOT-$     ; NEW ONE LESS THAN OLD
0406 D608            SUB  PFUG         ; FUDGE BOUNCE FACTOR
0408 3806            JR   C,FPLOP-$    ; NEW MORE THAN OLD+4
040A 3C              INC  A
040B 83      PHOT:   ADD  A,E
040C 77              LD   (HL),A
040D 47              LD   B,A
040E 79              LD   A,C
040F C9              RET
0410 0C      FPLOP   INC  C
0411 10EC            DJNZ TPLOP-$
                     ; NON TEST SECONDS
0413 21E?4F  TSEX:   LD   HL,KEYSEX    ; HL = KEYSEX
0416 7E              LD   A,(HL)
0417 CB7F            BIT  7,A
0419 2806            JR   Z,TKEYS-$
041B CBBF            RES  7,A
041D 77              LD   (HL),A
041E 3E11            LD   A,SSEC       ; SECS
0420 C9              RET
                     ; NON TEST KEYBOARD
0421 E5      TKEYS:  PUSH HL
0422 CD7400          CALL DELOAD
0425 EB              EX   DE,HL
0426 011704          LD   BC,400H+KEY3
0429 1100FF          LD   DE,0FF00H    ; SET BIT COUNTER+COLUMN
042C ED78    MSK1:   IN   A,(C)
042E A6              AND  (HL)         ; CHECK AGAINST MASK
042F 200A            JR   NZ,MSENK2-$
0431 0D              DEC  C            ; NEXT PORT
0432 1C              INC  E            ; AND COLUMN
0433 23              INC  HL           ; AND MASK
0434 10F6            DJNZ MSK1-$
```

```
0436 78                  LD    A,B           ; NOTHING DOWN
0437 1E12                LD    E,SKYU
0439 180B                JR    MSENKE-$
043B 14        MSENK2    INC   D             ; BIT COUNTER
043C 0F                  RRCA
043D 30FC                JR    NC,MSENK2-$
043F 7A                  LD    A,D
0440 07                  RLCA                ; KEY=BIT*4
0441 07                  RLCA
0442 83                  ADD   A,E           ; + COLUMN
0443 3C                  INC   A             ; PLUS 1
0444 1E13                LD    E,SKYD
0446 E1        MSENKE    POP   HL
0447 AE                  XOR   (HL)          ; KEY=OKEY?
0448 E67F                AND   7FH
044A 2807                JR    Z,HANDLE-$
044C AE                  XOR   (HL)
044D 77                  LD    (HL),A
044E E67F                AND   07FH
0450 47                  LD    B,A
0451 7B                  LD    A,E           ; KEYBOARD RETURN CODE
0452 C9                  RET
               ; NOW TEST HANDLES
0453 010004    HANDLE:   LD    BC,400H+SW0
0456 23        SHLOP     INC   HL            ; -> OSW0
0457 ED78                IN    A,(C)
0459 AE                  XOR   (HL)          ; COMPARE THE 2
045A 2005                JR    NZ,SWHIT-$
045C 0C                  INC   C
045D 10F7                DJNZ  SHLOP-$       ; NO CHANGE
045F 78                  LD    A,B           ; RETURN 0
0460 C9                  RET
0461 CB67      SWHIT:    BIT   4,A           ; TEST TRIGGER
0463 280C                JR    Z,JOYS-$      ; NO TRIG MUST BE JOYSTICK
0465 E610                AND   10H           ; FILTER OUT TRIGGER
0467 AE                  XOR   (HL)          ; UPDATE VALUE
0468 77                  LD    (HL),A
0469 E610                AND   10H
046B 47                  LD    B,A
046C 79                  LD    A,C           ; GET PORT NUMBER
046D 07                  RLCA                ; *2
046E D60C                SUB   0CH
0470 C9                  RET
0471 AE        JOYS:     XOR   (HL)
0472 77                  LD    (HL),A        ; NO CHANGE IN TRIG SO STORE STRAIGHT
0473 E60F                AND   0FH           ; TAKE OFF TRIGGER
0475 47                  LD    B,A
0476 79                  LD    A,C
0477 07                  RLCA                ; *2
0478 D608                SUB   08H
047A C9                  RET

               ; TIMEX
               ; INPUTS HL-> TIME BASE IN RAM
               ; B=TIME BASE MODULUS
               ; C=MASK AS IN DECCTS
               ; PURPOSE: TO DECR TIMEBASE AND IF 0 RESET IT AND DECR
               ;  COUNTER      TIMERS
```

```
047B 35        TIMEX:  DEC   (HL)          ; DEC TIMEBASE
047C C0                RET   NZ
047D 70                LD    (HL),B        ; RESET TIMEBASE

               ; NAME: DECREMENT COUNTER       TIMERS
               ; INPUTS: C=MASK
               ; USED BY ACTINT AND DECCTS TO DECREMENTS CTS UNDER MASK
               ; MASK= *76543210* , IF BIT=1 THEN DEC CORESPONDING
               ; CT# , IF BIT=0 LEAVE CT# ALONE
               ; NOTE: ALL COUNTERS ARE RUN IN BCD FOR EASY DISPLAY
047E 0608      TIMEY:  LD    B,8           ; NO OF BITS
0480 21D54F            LD    HL,CT0        ; -> TO COUNTER TIMERS
0483 1600              LD    D,0           ; RESULTS
0485 CB39      TIMLP:  SRL   C             ; CHANGE THIS TIMER?
0487 300A              JR    NC,ETLP-$
0489 7E                LD    A,(HL)        ; GET THE TIMER
048A B7                OR    A             ; IS IT ZERO ALREADY?
048B 2806              JR    Z,ETLP-$
048D 3D                DEC   A
048E 27                DAA
048F 2001              JR    NZ,+3
0491 37                SCF
0492 77                LD    (HL),A        ; STORE NEW VALUE
0493 23        ETLP:   INC   HL
0494 CB1A              RR    D             ; ROTATES IN CARRY FLAG
0496 10ED              DJNZ  TIMLP-$
0498 3ADD4F            LD    A,(CUNT)      ; COUNTER UPDATE&NUMBER TRACKER
049B B2                OR    D
049C 32DD4F            LD    (CUNT),A
049F C9                RET

               ; NAME: TIMER ROUTINE
               ; PURPOSE: TO UPDATE GAME TIME,TIMOUT AND MUSIC
               ; INPUTS         OUTPUTS: NONE
               ; NOTE: PUSH YOUR REGISTERS (AF,BC,DE,HL)
               TIMEZ:                      ; ASSUMES YOU PUSH DA REGS
04A0 21E94F            LD    HL,PRIOR      ; PRIORITY=TICKS
04A3 CB4E              BIT   1,(HL)        ;CHECK IF TICKS OVERRUN
04A5 C0                RET   NZ            ; RETURN
04A6 CBCE              SET   1,(HL)
04A8 EB                EX    DE,HL
               ;  *SIXTYITH OF A SECOND INTERUPT*
04A9 21EA4F            LD    HL,DURAT      ; NOTE TIMER
04AC 7E                LD    A,(HL)        ; =0 SKIP
04AD B7                OR    A
04AE 280C              JR    Z,SIXY-$
04B0 35                DEC   (HL)
04B1 200B              JR    NZ,STAKO-$
04B3 E5                PUSH  HL
04B4 DDE5              PUSH  IX
04B6 CD1405            CALL  MUZCPU        ; =0 DO NEXT NOTE
04B9 DDE1              POP   IX
04BB E1                POP   HL
04BC 180E              JR    SIXY-$
04BE EB        STAKO:  EX    DE,HL
04BF CB7E              BIT   7,(HL)
04C1 EB                EX    DE,HL
```

```
04C2 2008            JR   NZ,SIXY-$
04C4 3D              DEC  A
04C5 3D              DEC  A            ; =1 QUIET NOTE
04C6 2004            JR   NZ,SIXY-$
              ; A=0
04C8 D316            OUT  (VOLAB),A
04CA D315            OUT  (VOLC),A
04CC 23       SIXY:  INC  HL
04CD 35              DEC  (HL)         ;IF(--TMR60<0)
04CE F20205          JP   P,GOUT       ; ELZ ONWARD
04D1 363B            LD   (HL),59      ;THEN TMR60=59
04D3 23              INC  HL           ; -> TIMOUT
04D4 EB              EX   DE,HL
04D5 21E34F          LD   HL,KEYSEX    ; SET SECONDS UP
04D8 CBFE            SET  7,(HL)
04DA EB              EX   DE,HL
04DB 7E              LD   A,(HL)       ; CHECK IF ZERO
04DC B7              OR   A
04DD 2801            JR   Z,GTIMER-$
04DF 35              DEC  (HL)         ; DEC TIMOUT
              ; *GAME TIMER ONCE A SECOND ROUTINE*
              ; IF (SEC != 0 & MIN !=0)
              ;     IF (SEC == 0)
              ;         SEC=59; --MIN
              ;     ELSE --SEC
              ; ELSE GAMETIMEUP=1
04E0 23       GTIMER: INC HL           ;->GTSECS
04E1 7E              LD   A,(HL)       ;IF (SEC!=0
04E2 23              INC  HL           ;->GTMINS
04E3 B6              OR   (HL)         ; & MIN!=0)
04E4 2813            JR   Z,GT02-$
04E6 2B              DEC  HL           ;->GTSECS AGAIN
04E7 7E              LD   A,(HL)       ;IF (SEC ==0)
04E8 B7              OR   A
04E9 2009            JR   NZ,GT01-$
04EB 3659            LD   (HL),59H     ; THEN SEC=59BCD
04ED 23              INC  HL           ;->GTMINS AGAIN
04EE 7E              LD   A,(HL)       ; --MIN
04EF 3D              DEC  A
04F0 27              DAA
04F1 77              LD   (HL),A
04F2 180E            JR   GOUT-$
04F4 3D       GT01:  DEC  A            ; ELSE --SEC
04F5 27              DAA
04F6 77              LD   (HL),A
04F7 1809            JR   GOUT-$
04F9 21F84F   GT02:  LD   HL,GAMSTB    ; ELSE GAMETIMEUP=1
04FC CB46            BIT  GSBTIM,(HL)
04FE 2802            JR   Z,GOUT-$
0500 CBFE            SET  GSBEND,(HL)
0502 21F94F   GOUT   LD   HL,PRIOR
0505 CB8E            RES  1,(HL)
0507 C9              RET               ;RETURN TO BACKGND OR LO LEVEL

              ; NAME: START MUZCPU
              ; PURPOSE  TO START MUSIC PLAYING (ALSO NOISES)
              ; INPUTS: HL -> SCORE
              ; A=VOICES
              ; NOTE: YOU SHOULD LOAD MUZSP IF YOU DO CALLS
```

```
050B 32D44F   MUCSET  LD    (VOICES),A
050E DD22D04F         LD    (MUZSP),IX
0512 CDFC05           CALL  MUZSTP
0512 1803             JR    MUZCP1-$
              ; NAME: MUZCPU
              ; PURPOSE: PLAYING MUSIC AND NOISES
              ; NOTE: DURAT=0 WHEN CALLED
              ; OUTPUT: NONE
               ; *MUSIC PROCESSOR*
               ;  FETCH OPCODE
               ;  IF (OPCODE < 80H)
               ;      SET NOTE DURATION ETC
               ;  ELSE
               ;  SWITCH (OPCODE & 0F0H)
               ;  CASE 80H:
               ;      IF (MASK=8) STUFF SNDBX,PC=PC+9
               ;      ELSE OUTPUT(MASK)=DATA
               ;  CASE 90H:
               ;      VOICES=DATA
               ;  CASE A0H:
               ;       (--SP)=DATA IN NIBBLE OF OP +1
               ;  CASE B0H:
               ;      SET VOLUMES = DATA,DATA
               ;  CASE C0H:
               ;      SWITCH (MASK)
               ;          CASE 9: MPCL=(MSP++); MPCH=(MSP++); BREAK
               ;          CASE D: (--MSP)=MPCH; (--MSP)=MPCL
               ;          CASE 0: IF --(SP)==0 THEN SP++
               ;          CASE 3: MPC=DATA16
               ;  CASE D0H: CALL RELATIVE
               ;  CASE E0: DURAT=DATA
               ;  CASE F0: VOICES=0,PORTS=0
0514 2AD14F   MUZCPU  LD    HL,(MUZPC)    ; LOOK LIKE NORMAL LOOP RETURN
0517 DD2AD04F MUZCP1  LD    IX,(MUZSP)    ; FETCH STACK POINTER
051B 7E       OPLOOP  LD    A,(HL)        ; OPCODE FETCH
051C 23               INC   HL            ;->OPERAND,DATA
051D B7               OR    A             ; TEST FOR 80H OR MORE
051E FA5E05           JP    M,M00
              ; NORMAL NOTE OPERATOR
0521 32EA4F           LD    (DURAT),A
0524 3AD44F           LD    A,(VOICES)
0527 011808           LD    BC,800H+SNDBX
052A CB3F             SRL   A             ; SET NOISE
052C 3002             JR    NC,+4
052E EDA3             OUTI
0530 0605             LD    B,5           ; -> VIBRATO
0532 CB3F             SRL   A
0534 [illegible]      JR    NC,+4
0536 [illegible]      OUTI                ; SET VIBRATO
0538 0604             LD    B,4           ; -> NOTES
053A CB3F     [illegible] SRL A           ; CHECK C,B,A
053C 3009             JR    NC,M82-$
053E EDA3             OUTI
0540 CB3F     M815    SRL   A             ; CHECK IF INC PC WAS ON
0542 3807             JR    C,M83-$
0544 2B               DEC   HL            ; RESTORE PC
0545 1804             JR    M83-$
0547 05       M82     DEC   B
0548 23               INC   HL
```

```
0549 18F5                 JR    M815-$
054B B7          M83:     OR    A
054C 20EC                 JR    NZ,M81-$
                 ; PLAY NOTE
054E 3AD24F               LD    A,(PVOLAB)
0551 D316                 OUT   (VOLAB),A
0553 3AD34F               LD    A,(PVOLMC)
0556 D315                 OUT   (VOLC),A
0558 C3F405               JP    MUZ999
055B FE90        M00:     CP    90H
055D 3015                 JR    NC,M01-$
                 ; STUFF PORT OR SOUND BLOCK
055F CB5F                 BIT   3,A           ; IF (STUFF SNDBLK)
0561 2808                 JR    Z,M001-$
0563 78                   LD    A,B           ; SAVE B (VSN)
0564 011800               LD    BC,8*256+SNDBX ; B=8,C=SNDBX
0567 EDB3                 OTIR                ; HL->NEXT OPCODE WHEN DONE
0569 1800                 JR    OPLOOP-$
056B E607        M001:    AND   7             ; ISOLATE PORT NUMBER
056D F610                 OR    10H           ; PORTS 10H-17H
056F 4F                   LD    C,A           ; SET PORT REGISTER
0570 EDB3                 OUTI
0572 18A7                 JR    OPLOOP-$
0574 2007        M01:     JR    NZ,M02-$
0576 7E                   LD    A,(HL)        ; GET NEW VOICES
0577 23                   INC   HL
0578 32D44F               LD    (VOICES),A
057B 189E                 JR    OPLOOP-$
057D FEB0        M02:     CP    0B0H
057F 3006                 JR    NC,M03-$
0581 E60F                 AND   0FH
0583 5F                   LD    E,A
0584 1C                   INC   E
0585 183F                 JR    M045-$
0587 FEC0        M03:     CP    0C0H          ; SET VOL ETC
0589 3009                 JR    NC,M04-$
                 ; LOAD PVOLS
058B 11D24F               LD    DE,PVOLAB
058E EDA0                 LDI                 ; DONT CARE ABOUT BC
0590 EDA0                 LDI
0592 1887        OPLP2:   JR    OPLOOP-$
0594 2008        M04:     JR    NZ,M040-$
0596 DD3500               DEC   (IX+0)        ; DEC STACK TOP
0599 2008                 JR    NZ,M041-$
059B DD23                 INC   IX
059D 23                   INC   HL
059E 23                   INC   HL
059F 18F1                 JR    OPLP2-$
05A1 FED0        M040:    CP    0D0H          ; PC SP STUFF
05A3 3027                 JR    NC,M05-$
05A5 E60F        M041:    AND   0FH           ; ISOLATE MASK
05A7 FE09                 CP    9             ; RETURN
05A9 200C                 JR    NZ,M043-$
05AB DD6E00               LD    L,(IX+0)
05AE DD23                 INC   IX
05B0 DD6600               LD    H,(IX+0)
05B3 DD23                 INC   IX
05B5 18DB                 JR    OPLP2-$
05B7 5E          M043:    LD    E,(HL)        ; PCL=
```

```
05B8 23                  INC  HL
05B9 56                  LD   D,(HL)       ; PCH=
05BA 23                  INC  HL
05BB EB                  EX   DE,HL        ; SET THE PC
05BC FE04                CP   4            ; IS IT A JMP?
05BE 3802                JR   C,OPLP2-$    ; IT IS
05C0 DD2B        MO44    DEC  IX           ; ITS A CALL
05C2 DD7200              LD   (IX+0),D     ; (--SP)=PCH
05C5 DD2B        MO45    DEC  IX
05C7 DD7300              LD   (IX+0),E     ; (--SP)=PCL
05CA 18C6                JR   OPLP2-$
05CC FEE0        MO5:    CP   0E0H
05CE 300A                JR   NC,MO6-$
05D0 E60F                AND  0FH
05D2 0600                LD   B,0
05D4 4F                  LD   C,A
05D5 54                  LD   D,H
05D6 5D                  LD   E,L
05D7 09                  ADD  HL,BC
05D8 18E6                JR   MO44-$       ; CALL
05DA 200A        MO6     JR   NZ,MO61-$
05DC 3AF94F              LD   A,(PRIOR)    ; LEGSTA
05DF EE80                XOR  80H
05E1 32F94F              LD   (PRIOR),A
05E4 18AC                JR   OPLP2-$
05E6 FEF0        MO61    CP   0F0H         ; REST VOICE (OR SUSTAIN)
05E8 2812                JR   Z,MUZSTP-$
05EA 7E                  LD   A,(HL)
05EB 32EA4F              LD   (DURAT),A    ; SET DURATION OF QUIET
05EE 23                  INC  HL
05EF AF                  XOR  A
05F0 D316                OUT  (VOLAB),A
05F2 D315                OUT  (VOLC),A
                         ; END OF MUZIC PROCESSOR
05F4 22EF4F      MUZ999: LD   (MUZPC),HL   ; SAVE THE PC
05F7 DD22ED4F            LD   (MUZSP),IX   ; SAVE THE STACK POINTER
05FB C9                  RET
                 ; NAME MUZSTP
                 ; PURPOSE: STOP MUZCPU,SET PORTS TO 0
05FC AF          MUZSTP: XOR  A
05FD 32EA4F              LD   (DURAT),A
0600 32F94F              LD   (PRIOR),A
0603 011908              LD   BC,900H+SNDBX
0606 ED79                OUT  (C),A
0608 10FC                DJNZ
060A C9                  RET
                 ; NAME: DOIT
                 ; PURPOSE:      TRANSFER CONTROL TO USER STATE TRANSITION HANDLER
                 ; INPUT:        A - RETURN CODE FROM SENTRY ROUTINE
                 ;               HL - DO IT TABLE ADDRESS
                 ; OUTPUT:
                 ; DESCRIPTION:  THIS ROUTINE IS USED WITH THE SENTRY ROUTINE.
                 ;               IT IS USED FOR DISPATCHING TO A STATE TRANSITION HANDLER
                 ;               ROUTINE.  THE RETURN CODE FROM SENTRY IS USED TO LINEAR
                 ;               SEARCH THE DOIT TABLE.  IF A MATCH IS FOUND, CONTROL IS
                 ;               TRANSFERRED.  IF NO MATCH IS FOUND, THE ROUTINE RETURNS TO CALLER
                 ;               THE DOIT TABLE IS MADE UP OF THREE BYTE ENTRYS:
                 ;               BYTE 0 BIT 7: IF SET - DO A RESET TO THIS HANDLER
                 ;               BYTE 0 BIT 6: IF SET - DO A PCALL TO THIS HANDLER
```

```
                ;       BYTE 0 BITS 5-0: RETURNCODE THIS ROUTINE IS TO PROCESS
                ;       BYTE 1 AND 2: THE ADDRESS TO TRANSFER TO.
                ;       THE LIST IS TERMINATED BY A BYTE WHICH IS .GE. 0C0H
060B 78         MDOITB: LD   A,B
060C D5         MDOIT:  PUSH DE
060D 57                 LD   D,A
060E 7E         MDOIT0: LD   A,(HL)         ; GET RETURN CODE FOR THIS ENTRY
060F 4F                 LD   C,A            ; C = CURRENT ENTRY
0610 FEC0               CP   0C0H           ; LIST TERMINATOR?
0612 3802               JR   C,MDOIT1-$     ; NO - JUMP
0614 D1                 POP  DE             ; YES - RETURN
0615 C9                 RET
0616 23         MDOIT1: INC  HL
0617 E63F               AND  3FH
0619 BA                 CP   D              ; NORMAL MATCH?
061A 2804               JR   Z,MDOIT2-$     ; JUMP IF SO
061C 23         MDOIA:  INC  HL             ; NO MATCH - SKIP OVER
061D 23                 INC  HL             ; GO TO ADDRESS
061E 18EE               JR   MDOIT0-$
0620 D1         MDOIT2: POP  DE
0621 5E         MDOIT3: LD   E,(HL)         ; DE = GOTO ADDR
0622 23                 INC  HL
0623 56                 LD   D,(HL)
0624 EB                 EX   DE,HL
0625 CB79               BIT  7,C            ; MCALL?
0627 C27D00             JP   NZ,MMCALL      ; JUMP IF SO
062A CB71               BIT  6,C            ; RCALL?
062C 2004               JR   NZ,MRCALL-$
062E D1                 POP  DE             ; MUST BE JUMP
062F F1                 POP  AF
0630 E5                 PUSH HL
0631 EB                 EX   DE,HL
                ; RCALL ROUTINE
0632 E9         MRCALL: JP   (HL)
                ; **********************
                ; * VECTORING ROUTINES *
                ; **********************
                ; NAME:          VECTOR X AND Y COORDINATES
                ; PURPOSE:       UPDATE X,Y COORDINATES AND LIMIT CHECK
                ; INPUT          IX = VECTOR PACKET
                ;                HL = LIMITS TABLE
                ; OUTPUT         C = TIME BASE USED
                ;                NONZERO STATUS SET IF OBJECT MOVED
                ; NOTES:
                ;   THIS ROUTINE WORKS WITH A 'VECTOR PACKET', WHICH LOOKS LIKE THIS:
                ; ********************************
                ; *BYTE*    CONTENTS    * NAME   *
                ; ********************************
                ; * 00 * MAGIC REGISTER * VBMR   *
                ; ********************************
                ; * 01 * VECTOR STATUS  * VBSTAT *
                ; ********************************
                ; * 02 * TIME BASE      * VBTIMB *
                ; ********************************
                ; * 03 * DELTA X        * VBDXL  *
                ; * 04 *                * VBDXH  *
                ; ********************************
                ; * 05 * X COORDINATE   * VBXL   *
                ; * 06 *                * VBXH   *
                ; ********************************
```

```
              ; * 07 * X CHECKS MASK  * VBXCHK *
              ; ********************************
              ; * 08 * DELTA Y        * VBDYL  *
              ; * 09 *                * VBDYH  *
              ; ********************************
              ; * 0A * Y COORDINATE   * VBYL   *
              ; * 0B *                * VBYH   *
              ; ********************************
              ; * 0C * Y CHECKS MASK  * VBYCHK *
              ; ********************************

              ; OPTIONS BYTE:
              ; BIT  MEANING
              ; ---  -------
              ;  7   VECTOR IS ACTIVE
              ;
              ; CHECKS BYTE:
              ; BIT  MEANING
              ; ---  -----
              ;  0   DO LIMIT CHECKS
              ;  1   REVERSE COORDINATES ON LIMIT ATTAINMENT
              ;  3   TARGET ATTAINED (OUTPUT)
              ;   IF THE VECTOR IS ACTIVE, AND THE TIME BASE IS NONZERO
              ; THEN THE UPDATE COORDINATE ROUTINE IS CALLED FOR THE X
              ; AND Y PORTIONS OF THE PACKET.
0633 FDCB00F6 MVECT:  SET  PSNZRO,(IY+CBFLAG) ; SET ZERO FLAG
0637 DDCB007E         BIT  VBSACT,(IX+VBSTAT) ; IS VECTOR ACTIVE?
063B DD4E02           LD   C,(IX+VBTIMB) ; TIME BASE TO C
063E DD360200         LD   (IX+VBTIMB),0 ; ZERO TIME BASE
0642 FD7106           LD   (IY+CBC),C   ; PASS BACK TIME BASE
0645 C8               RET  Z
0646 79               LD   A,C
0647 A7               AND  A            ; IS TIME BASE ZERO?
0648 C8               RET  Z            ; QUIT IF SO
0649 110300           LD   DE,VBDXL     ; ADVANCE TO FIRST
064C DD19             ADD  IX,DE
064E CD5606           CALL MVECTC       ; UPDATE FIRST COORDINATE
0651 110500           LD   DE,VBDYL-VBDXL ; TO Y
0654 DD19             ADD  IX,DE
              ; AND FALL INTO ...
              ; NAME:        VECTOR COORDINATE
              ; PURPOSE:     UPDATE OF SINGLE COORDINATE
              ; INPUT:       IX = POINTER TO L.O. DELTA BYTE OF VECTOR PACKET
              ;              C = TIME BASE
              ;              HL = LIMITS PACKET (IF USED)
              ; OUTPUT:      NONZERO STATUS SET IF MOTION OCCURED
              ;              (SHOULD BE SET ON CALL, SINCE IT IS NOT SET BY ROUTINE)
              ; NOTES:
              ;   THIS ROUTINE OPERATES ON A SUBSET OF THE VECTOR PACKET
              ; (BETWEEN L.O. DELTA BYTE AND CHECKS BYTE).
              ;   THE DELTA IS ADDED TO THE COORDINATE TIME-BASE TIMES.
              ; IF OPTIONED, LIMIT CHECKING IS DONE.  IF THE CHECK FAILS
              ; THE COORDINATE IS SET TO THE LIMIT.
              ; WHEN THIS HAPPENS, THE LIMIT ATTAINED BIT IS SET
0656 E5       MVECTC: PUSH HL
0657 DD5601           LD   D,(IX+VBDCH) ; LOAD DELTA
065A DD5E00           LD   E,(IX+VBDCL)
065D DD6603           LD   H,(IX+VBCH)  ; LOAD COORDINATE
0660 DD6E02           LD   L,(IX+VBCL)
```

```
0663 7C            LD   A,H          ; SAVE OLD COORDINATE FOR MOTION TEST
0664 41            LD   B,C
0665 19    MVECT1: ADD  HL,DE        ; ADD DELTA TO COORD
0666 10FD          DJNZ MVECT1-$     ; TIME-BASE TIMES
           ; HAS MOTION OCCURED?
0668 BC            CP   H
0669 2804          JR   Z,MVCT1A-$   ; JUMP TO SKIP TESTS IF SO
066B FDCB0086      RES  PSWZRO,(IY+CBFLAG) ; SET MOVED STATUS
           ; IS LIMIT CHECK WANTED?
066F DDCB0446 MVCT1A: BIT VBCLMT,(IX+VBCCHK)
0673 2831          JR   Z,MVECT6-$   ; MVECT6 IF NOT
           ; PERFORM LIMIT CHECK
0675 7C            LD   A,H
0676 E3            EX   (SP),HL
0677 46            LD   B,(HL)       ; LIMIT TO B
0678 23            INC  HL
; HANDLE SLIGHTLY LESS THAN ZERO CASE
0679 FECF          CP   207          ; MIDPOINT BETWEEN 160 AND 0
067B 3007          JR   NC,MVECT2-$  ; JUMP TO FAIL IF >207
067D B8            CP   B            ; DO COMPARE
067E 3804          JR   C,MVECT2-$   ; JUMP ON FAIL
0680 46            LD   B,(HL)       ; UPPER LIMIT CHECK
0681 B8            CP   B
0682 3820          JR   C,MVECT3-$   ; JUMP ON PASS
0684 23    MVECT2: INC  HL
           ; A LIMIT WAS EXCEEDED - SET COORDINATE AT LIMIT
0685 DD7003        LD   (IX+VBCH),B
0688 DD360200      LD   (IX+VBCL),0
068C DDCB04DE      SET  VBCLAT,(IX+VBCCHK) ; SET LIMIT ATTAINED
           ; IS REVERSE DELTA OPTION SET?
0690 F1            POP  AF           ; CLEAN UP STACK
0691 DDCB044E      BIT  VBCREV,(IX+VBCCHK)
0695 C8            RET  Z            ; QUIT IF NOT
           ; REVERSE THE [illegible]
0696 7A            LD   A,D
0697 2F            CPL
0698 57            LD   D,A
0699 7B            LD   A,E
069A 2F            CPL
069B 5F            LD   E,A
069C 13            INC  DE
069D DD7300        LD   (IX+VBDCL),E ; STORE BACK
06A0 DD7201        LD   (IX+VBDCH),D
06A3 C9            RET
06A4 23    MVECT3: INC  HL           ; STEP PAST LIMIT
06A5 E3            EX   (SP),HL      ; HL = COORDINATE AGAIN
06A6 DD7502 MVECT6: LD  (IX+VBCL),L  ; STORE BACK COORDINATES
06A9 DD7403        LD   (IX+VBCH),H
06AC E1            POP  HL           ; RESTORE LIMITS POINTER
06AD DDCB049E      RES  VBCLAT,(IX+VBCCHK) ; CLEAR ATTAINED BIT
06B1 C9            RET
           ; ****************************
           ; * PAINT RECTANGLE ROUTINE *
           ; ****************************
           ; NAME:        PAINT RECTANGLE
           ; INPUT:       A = COLOR MASK TO WRITE
           ;              B = Y SIZE
           ;              C = X SIZE
           ;              D = Y COORDINATE
           ;              E = X COORDINATE
```

```
06B2 AF          MPAINT: XOR  A
06B3 CD4E08              CALL RELTAB
06B6 EB                  EX   DE,HL
06B7 CBF4                SET  6,H           ; UNMAGIC THE G** D*** ADDR
06B9 D30C                OUT  (MAGIC),A
                 ;       XOR     A
                 ;       LD      (URINAL),A       ; PRIME THE SOB
06BB FD5E09              LD   E,(IY+CBA)
06BE 79                  LD   A,C
06BF 0F                  RRCA
06C0 0F                  RRCA
06C1 E63F                AND  3FH
06C3 3C                  INC  A
06C4 57                  LD   D,A
06C5 15          MP11:   DEC  D
06C6 2807                JR   Z,MP12-$
06C8 3EFF                LD   A,0FFH
06CA CDE206              CALL STRIPE
06CD 18F6                JR   MP11-$
06CF 79          MP12:   LD   A,C
06D0 E603                AND  03H
06D2 3C                  INC  A
06D3 4F                  LD   C,A
06D4 AF                  XOR  A
06D5 0D          MP13:   DEC  C
06D6 2806                JR   Z,MP14-$
06D8 0F                  RRCA
06D9 0F                  RRCA
06DA C6C0                ADD  A,11000000B
06DC 18F7                JR   MP13-$
06DE CDE206      MP14:   CALL STRIPE
06E1 AF                  XOR  A
                 ; AND FALL INTO ...
                 ; STRIPE PAINTER
                 ; HL = ADDRESS OF STRIPE A = DATA E =MASK B = ITERATIONS
                 ; OUT HL=HL+1 A = CLOBBERED
06E2 E5          STRIPE: PUSH HL
06E3 C5                  PUSH BC
06E4 32FF0F              LD   (URINAL),A
06E7 3AFF4F              LD   A,(URINAL+4000H)
06EA 4F                  LD   C,A
06EB 7B          STRP1:  LD   A,E
06EC AE                  XOR  (HL)
06ED A1                  AND  C
06EE AE                  XOR  (HL)
06EF 77                  LD   (HL),A
06F0 7D                  LD   A,L
06F1 C628                ADD  A,BYTEPL
06F3 6F                  LD   L,A
06F4 7C                  LD   A,H
06F5 CE00                ADC  A,0
06F7 67                  LD   H,A
06F8 10F1                DJNZ STRP1-$
06FA C1                  POP  BC
06FB E1                  POP  HL
06FC 23                  INC  HL
06FD C9                  RET
                 ; *****************
                 ; * WRITE ROUTINES *
                 ; *****************
```

```
                ; NOTES:       THE GENERAL CALLING SEQUENCE FOR THE WRITE ROUTINES IS:
                ; INPUT:       HL = PATTERN ADDRESS
                ;              D = Y COORDINATE
                ;              E = X COORDINATE
                ;              B = Y SIZE
                ;              C = X SIZE
                ;              A = MAGIC REGISTER
                ; OUTPUT:      DE = SCREEN ADDRESS USED
                ;                THESE ROUTINES ARE NESTED, FOR EXAMPLE WRITR FALLS INTO
                ;              WRITP, WHICH FALLS INTO WRIT, WHICH FALLS INTO WRITA
                ; ENTRY:       WRITE FROM VECTOR
                ; INPUT:       HL = PATTERN ADDRESS
                ;              IX = VECTOR ADDRESS
                ; OUTPUT:      DE,A
                ; SIDE EFFECTS: BLANK BIT SET IN VECTOR STATUS BYTE
06FE DD7E00     MVWRIT: LD    A,(IX+VBMR)   ; LOAD MR
0701 DD5600           LD    D,(IX+VBYH)   ; LOAD Y
0704 DD5E06           LD    E,(IX+VBXH)   ; LOAD X
0707 DDCB01F6         SET   VBBLNK,(IX+VBSTAT) ; SET BLANK BIT
                ; ENTRY:       WRITE RELATIVE
                ; PURPOSE:     WRITING RELATIVE PATTERNS
                ; INPUT:       HL,DE,A
                ; OUTPUT:      DE
                ; NOTES:       PATTERN IS PRECEEDED BY RELATIVE DISPLACEMENTS
                ;              (X FIRST, THEN Y) AND PATTERN SIZE
070B F5         MWRITR: PUSH AF           ; SAVE MR
070C 7E               LD    A,(HL)        ; GET REL X
070D 23               INC   HL
070E 83               ADD   A,E           ; ADD TO SUPERIOR X
070F 5F               LD    E,A
0710 7E               LD    A,(HL)        ; SAME STORY FOR Y
0711 23               INC   HL
0712 82               ADD   A,D
0713 57               LD    D,A
0714 F1               POP   AF
                ; ENTRY:       WRITE WITH PATTERN SIZE SCARE-UP
                ; PURPOSE:     WRITING VARIABLE SIZED PATTERNS
                ; INPUT:       HL,DE,A
                ; OUTPUT:      DE
                ; NOTES:       FIRST TWO BYTES POINTED AT BY HL ARE TAKEN
                ;              TO BE PATTERN SIZES (X SIZE FIRST)
0715 4F         MWRITP: LD    C,(HL)        ; GET X SIZE
0716 23               INC   HL
0717 46               LD    B,(HL)        ; AND Y
0718 23               INC   HL
                ; ENTRY:       WRITE WITH COORDINATE CONVERSION
                ; INPUT:       HL,DE,BC,A
                ; OUTPUT:      DE
0719 CD[illegible]  MWRIT:  CALL  MRELAB:       ; DO CONVERSION
                ; ENTRY:       WRITE ABSOLUTE
                ; INPUT:       HL,BC,A AS ABOVE
                ;              DE = ABSOLUTE SCREEN ADDRESS
071C CB77       MWRITA: BIT   MRFLOP,A      ; FLOP WRITE WANTED?
071E 202C             JR    NZ,MWRTFL-$   ; MWRTFL IF SO
0720 CB5F             BIT   MRXPND,A      ; EXPAND WANTED?
0722 2011             JR    NZ,MWX-$      ; JUMP IF SO
                ; DO NORMAL? WRITE
0724 AF               XOR   A
0725 C5         MWRT:   PUSH  BC
```

```
0726 D5               PUSH DE
0727 47               LD   B,A        ; ZERO REGISTER B
0728 EDB0             LDIR            ; WRITE A LINE
072A 12               LD   (DE),A     ; FLUSH THE SHIFTER
072B D1               POP  DE
072C EB               EX   DE,HL      ; ADVANCE TO NEXT LINE
072D 0E28             LD   C,BYTEPL
072F 09               ADD  HL,BC
0730 EB               EX   DE,HL
0731 C1               POP  BC
0732 10F1             DJNZ MWR1-$     ; LOOP IF MORE GOODIES
0734 C9               RET
                ; WRITE EXPANDED
0735 EB         MWX:  EX   DE,HL
0736 C5         MWX1: PUSH BC
0737 E5               PUSH HL
0738 41               LD   B,C
0739 1A         MWX2: LD   A,(DE)
073A 13               INC  DE
073B 77               LD   (HL),A
073C 23               INC  HL
073D 77               LD   (HL),A
073E 23               INC  HL
073F 10F8             DJNZ MWX2-$
0741 70               LD   (HL),B
0742 23               INC  HL
0743 70               LD   (HL),B
0744 E1               POP  HL
0745 0E28             LD   C,BYTEPL
0747 09               ADD  HL,BC
0748 C1               POP  BC
0749 10EB             DJNZ MWX1-$
074B C9               RET
                 ; ROUTINE TO HANDLE FLOPPED CASE
074C CB5F       MWRTFL: BIT  MRXPND,A    ; EXPANDED FLOPPED WRITE WANTED?
074E 2016               JR   NZ,MWXF-$   ; JUMP IF YEP
0750 AF                 XOR  A
0751 C5         WRFL1:  PUSH BC
0752 D5                 PUSH DE
0753 47                 LD   B,A
0754 EDA0       WRFL2:  LDI
0756 1B                 DEC  DE
0757 1B                 DEC  DE
0758 EA5407             JP   PE,WRFL2
075B 12                 LD   (DE),A      ; FLUSHETH
075C D1                 POP  DE
075D EB                 EX   DE,HL       ; SAME AS NORMAL NON ON
075E 0E28               LD   C,BYTEPL
0760 09                 ADD  HL,BC
0761 EB                 EX   DE,HL
0762 C1                 POP  BC
0763 10EC               DJNZ WRFL1-$
0765 C9                 RET
                ; WRITE EXPANDED FLOPPED ROUTINE
0766 EB         MWXF:   EX   DE,HL
0767 C5         MWXF1:  PUSH BC
0768 E5                 PUSH HL
0769 41                 LD   B,C
076A 1A         MWXF2:  LD   A,(DE)
```

```
076B 13              INC  DE
076C 77              LD   (HL),A
076D 2B              DEC  HL
076E 77              LD   (HL),A
076F 2B              DEC  HL
0770 10F8            DJNZ MWXF2-$
0772 70              LD   (HL),B
0773 2B              DEC  HL
0774 70              LD   (HL),B
0775 E1              POP  HL
0776 0E28            LD   C,BYTEPL
0778 09              ADD  HL,BC
0779 C1              POP  BC
077A 10EB            DJNZ MWXF1-$
077C C9              RET
                ; NAME:       BLANK FROM VECTOR
                ; PURPOSE:    BLANK WITH INFO LOAD FROM VECTOR
                ; INPUT:      IX = VECTOR
                ;             E = X SIZE
                ;             D = Y SIZE
                ; NOTES:      THIS ROUTINE BLANKS TO 00
                ;             THIS ROUTINE INTERROGATES THE BLANK BIT
                ;             AND REFRAINS FROM BLANKING IF NOT SET
                ;             IF IT WAS SET, IT IS THEN RESET
077D DDCB0176   MVBLAN: BIT  VBBLNK,(IX+VBSTAT) ; IS BLANK BIT SET?
0781 C8              RET  Z              ; QUIT IF NOT
0782 DDCB01B6        RES  VBBLNK,(IX+VBSTAT) ; KILL BLANK BIT
0786 DD660E          LD   H,(IX+VBOAH) ; LOAD BLANK ADDRESS
0789 DD6E0D          LD   L,(IX+VBOAL)
078C DDCB0076        BIT  MRFLOP,(IX+VBMR) ; IS FLOP SET?
0790 2808            JR   Z,MVBLA1-$    ; JUMP IF NOT
0792 7B              LD   A,E           ; X SIZE TO A
0793 ED44            NEG                ; TWOS COMPLEMENT AND ADD 1
0795 3C              INC  A
0796 4F              LD   C,A
0797 06FF            LD   B,0FFH
0799 09              ADD  HL,BC         ; USE TO BACK UP SCREEN ADDRESS
                ; UNMAGIC THE BLANK ADDRESS
079A            MVBLA1:
079A CBF4            SET  6,H
079C 0600            LD   B,0           ; ASSUME BLANK TO ZERO
                ; NAME:       BLANK AREA
                ; PURPOSE:    SETTING N X M REGION TO CONSTANT
                ; INPUT:      HL = BLANK ADDRESS
                ;             E = X SIZE
                ;             D = Y SIZE
                ;             B = DATA TO FILL WITH
079E 3E28       MBLANK: LD   A,BYTEPL     ; COMPUTE LINE INCREMENT
07A0 93              SUB  E
07A1 4F              LD   C,A
07A2 78              LD   A,B           ; A = DATA TO FILL WITH
07A3 43         MBLAN1: LD   B,E
07A4 77         MBLAN2: LD   (HL),A
07A5 23              INC  HL
07A6 10FC            DJNZ MBLAN2-$
07A8 09              ADD  HL,BC
07A9 15              DEC  D
07AA 20F7            JR   NZ,MBLAN1-$
07AC C9              RET
```

```
                ; NAME:          RESTORE AREA
                ; INPUT:         HL = SCREEN ADDRESS TO RESTORE TO
                ;                DE = SAVE AREA ADDRESS
                ; NOTE:          SIZES ARE LOADED FROM THE SAVE AREA
07AD EB         MREST:  EX   DE,HL
07AE 4E                 LD   C,(HL)
07AF 23                 INC  HL
07B0 46                 LD   B,(HL)
07B1 23                 INC  HL
07B2 CBF2               SET  6,D          ; MAKE SURE WE ARE NONMAGIC
07B4 AF                 XOR  A
07B5 C5         MREST1: PUSH BC
07B6 D5                 PUSH DE
07B7 47                 LD   B,A
07B8 EDB0               LDIR
07BA EB                 EX   DE,HL
07BB E1                 POP  HL
07BC 0E28               LD   C,BYTEPL
07BE 09                 ADD  HL,BC
07BF EB                 EX   DE,HL
07C0 C1                 POP  BC
07C1 10F2               DJNZ MREST1-$
07C3 C9                 RET
                ; ******************************
                ; * CHARACTER DISPLAY ROUTINES *
                ; ******************************
                ; NAME:          DISPLAY STRING
                ; PURPOSE:       MESSAGE DISPLAY
                ; INPUT:         E,D = X, Y COORDINATES
                ;                HL = STRING ADDRESS
                ;                IX = FONT DESCRIPTOR
                ; OUTPUT:        D,E ALTERED AS IN DISPLAY CHARACTER
                ; STACK USE:     4 BYTES (EXCLUDING USE BY SYSPCH)
                ; EXPLAINATION: AS EACH CHARACTER IS BROUGHT IN, IT
                ; IS TESTED FOR BEING A LIST TERMINATOR ( CHAR = 0)
                ; IF IT ISN'T, DISPLAY CHARACTER IS CALLED AND THE
                ; TEST IS REPEATED FOR THE NEXT CHARACTER.  THUS
                ; A NULL STRING IS HANDLED PROPERLY.
07C4 7E         STRNEW: LD   A,(HL)       ; GET CHARACTER
07C5 A7                 AND  A            ; BE IT A TERMINATOR?
07C6 C8                 RET  Z            ; QUIT IF SO
07C7 FACE07             JP   M,STRD1      ; DISPLAY IF ALT FONT
07CA FE64               CP   64H          ; SUCK IN STRING?
07CC 3006               JR   NC,STRD2-$   ; JUMP IF YES
07CE CDE107     STRD1:  CALL DISPCH       ; SHOW CHAR
07D1 23                 INC  HL           ; ADVANCE TO NEXT CHAR
07D2 18F0               JR   STRNEW-$     ; AND LOOP
07D4 E617       STRD2:  AND  10111B       ; MAKE SUCK MASK
07D6 47                 LD   B,A
07D7 23                 INC  HL
07D8 EB                 EX   DE,HL
07D9 CDA900             CALL MSUCK1
07DC CD6500             CALL RELD
07DF 18E3               JR   STRNEW-$     ; GO AFTER NEXT CHARACTER
                ; *****************************
                ; * CHARACTER DISPLAY ROUTINE *
                ; *****************************
                ; INPUT:         A = CHARACTER
                ;                C = OPTIONS
```

```
     ;               D = Y COORDINATE
     ;               E = X COORDINATE
     ;               IX = FONT DESCRIPTOR
     ;               (ONLY IF ALTERNATE FONT USED)
     ; OUTPUT:       DE UPDATED TO POINT AT NEXT CHARACTER FRAME
     ; NOTES:        THE OPTION BYTE IS FORMATTED AS FOLLOWS:
     ;         BITS  CONTENTS
     ;         ----  --------
     ;         0-1   OFF COLOR FOR EXPANSION
     ;         2-3   ON COLOR FOR EXPANSION
     ;         4     OR OPTION
     ;         5     XOR OPTION
     ;         6-7   ENLARGEMENT FACTOR (N+1)X
     ;
     ; CHARACTERS BETWEEN 1 AND 1FH, AND BETWEEN 81H AND 9FH
     ; ARE INTERPRETED AS TAB CHARACTERS. THEY CAUSE THE
     ; CURSOR REPRESENTED BY D AND E TO BE SPACED OVER N
     ; CHARACTER POSITIONS, WHERE N = CHAR AND 7FH
     ; CHARACTERS BETWEEN 20H AND 7FH ARE TAKEN AS REFERENCES TO
     ; THE SYSTEM STANDARD 5 X 7 CHARACTER FONT. CHARACTERS
     ; BETWEEN 0A0H AND 0FFH REFER TO THE USER SUPPLIED ALTERNATE
     ; CHARACTER FONT. THIS FONT IS DESCRIBED BY A FONT
     ; DESCRIPTOR TABLE OF THE FOLLOWING FORMAT:
     ; ******************************
     ; * 0 * BASE CHARACTER VALUE   *
     ; ******************************
     ; * 1 * X FRAME SIZE          *
     ; ******************************
     ; * 2 * Y FRAME SIZE          *
     ; ******************************
     ; * 3 * X PATTERN SIZE (BYTES) *
     ; ******************************
     ; * 4 * Y PATTERN SIZE        *
     ; ******************************
     ; * 5 *  PATTERN TABLE        *
     ; * 6 *     ADDRESS           *
     ; ******************************
07E1 C5          DISPCH: PUSH BC
07E2 E5                  PUSH HL
07E3 DDE5                PUSH IX
07E5 A7                  AND  A
07E6 FAED07              JP   M,DISCH1      ; JUMP IF YES
07E9 DD210602            LD   IX,SYSFNT
07ED FE20        DISCH1: CP   20H           ; IS CHAR < 20H?
07EF 300D                JR   NC,DISC1B-$   ; JUMP IF NOT
07F1 F5          DISC1A: PUSH AF            ; LOOP TO SPACE OVER
07F2 CD4E08              CALL NXTFRM
07F5 CDF40C              CALL FINDL3        ; STORE IT BACK
07F8 F1                  POP  AF
07F9 3D                  DEC  A
07FA 20F5                JR   NZ,DISC1A-$
07FC 183B                JR   DISCH5-$      ; JUMP TO EXIT
07FE DD9600      DISC1B: SUB  (IX+FTBASE)   ; SUBTRACT BASE CHAR
0801 5F                  LD   E,A
0802 1600                LD   D,0
0804 210000              LD   HL,0
0807 DD4E03              LD   C,(IX+FTBYTE) ; MULTIPLY CHARACTER
080A DD4604      DISCH2: LD   B,(IX+FTYSIZ) ; BY PATTERN SIZE
080D 19          DISCH3: ADD  HL,DE
```

```
080E 10FD          DJNZ DISCH3-$
0810 0D            DEC  C
0811 20F7          JR   NZ,DISCH2-$
0813 DD5606        LD   D,(IX+F1PTH) ; ADD TO TABLE START
0816 DD5E05        LD   E,(IX+F1PTL)
0819 19            ADD  HL,DE
                ; COMPUTE POSITION WHERE NEXT CHARACTER WOULD GO
                ; AND SAVE
081A CD4E08        CALL NXTFRM       ; STEP COORDINATES TO NEXT FRAME
081D D5            PUSH DE           ; SAVE
081E DD4604        LD   B,(IX+F1YSIZ)
0821 C5    DISCH4: PUSH BC
0822 E5            PUSH HL
0823 CD[illegible] CALL WRITIN
0826 E1            POP  HL
0827 DD4E03        LD   C,(IX+F1BYTE) ; STEP TO NEXT LINE OF PATTERN
082A 09            ADD  HL,BC
082B C1            POP  BC
082C FD7E05        LD   A,(IY+CRD)    ; ADVANCE Y COORDINATE
082F 81            ADD  A,C
0830 FD7705        LD   (IY+CRD),A
0833 10EC          DJNZ DISCH4-$
0835 D1            POP  DE           ; RESTORE NEW POSITION
0836 CDF40C        CALL FINDL3       ; STUFF DE BACK INTO CONTEXT
0839 DDE1  DISCH5: POP  IX
083B E1            POP  HL
083C C1            POP  BC
083D C9            RET
                ; SUBROUTINE TO CONVERT ENLARGEMENT FACTOR TO ITERATION COUNT
                ; INPUT:        MODE BYTE FROM CONTEXT SAVE AREA
                ; OUTPUT:       B,A = ITERATION COUNT
083E FD7E06 DCLCTB: LD  A,(IY+CRC)    ; GET MODE BYTE
0841 07            RLCA
0842 07            RLCA
0843 E603          AND  03           ; ISOLATE ENLARGEMENT FACTOR
0845 3C            INC  A
0846 47            LD   B,A
0847 AF            XOR  A
0848 37            SCF
0849 8F    DCLCT1: ADC  A,A
084A 10FD          DJNZ DCLCT1-$
084C 47            LD   B,A
084D C9            RET
                ; SUBROUTINE TO UPDATE COORDINATES TO POINT AT NEXT CHARACTER
                ; FRAME:
                ; INPUT:        COORDINATES TAKEN FROM CRD,CRE IN CONTEXT BLOCK
                ; OUTPUT:       UPDATED COORDINATES RETURNED IN D AND E
                ;               A,B = CLOBBERED, C=ENLARGE FACTOR CONVERTED
084E CD3E08 NXTFRM: CALL DCLCTB      ; GET ITERATION COUNT
0851 48            LD   C,B          ; SAVE
0852 FD5605        LD   D,(IY+CRD)   ; GET Y COORD
0855 FD7E04        LD   A,(IY+CRE)   ; GET X COORD
0858 DD8601 NXTFR1: ADD A,(IX+F1FSX) ; ADD X FRAME SIZE
085B 10FB          DJNZ NXTFR1-$     ; 2**ENLARGE TIMES
085D FEA0          CP   160          ; PAST RIGHT EDGE OF SCREEN?
085F 3809          JR   C,NXTFR3-$
0861 7A            LD   A,D
0862 41            LD   B,C
0863 DD8602 NXTFR2: ADD A,(IX+F1FSY) ; YEP - ADVANCE VERTICAL
```

```
0866 10FB            DJNZ NXTFR2-$
0868 57              LD   D,A
0869 AF              XOR  A
086A 5F      NXTFR3: LD   E,A
086B C9              RET
             ; SUBROUTINE TO WRITE ONE LINE OF A PATTERN WITH ENLARGE
             ; AND EXPAND
             ; ENTRY: HL = SOURCE  IX = FONT TABLE
086C DD4E03  WRTLIN: LD   C,(IX+FTBYTE)
086F 0600            LD   B,0
0871 DDE5            PUSH IX            ; CAPTURE STACK POINTER
0873 DD210000        LD   IX,0
0877 DD39            ADD  IX,SP
0879 DDE5            PUSH IX            ; SAVE CAPTURED STACK
087B D1              POP  DE            ; DE = CAPTURED STACK
087C 3E0C            LD   A,0CH         ; SET EXPAND TO 00,11
087E D319            OUT  (XPAND),A
0880 3E08            LD   A,08H         ; SET EXPAND BIT
0882 D30C            OUT  (MAGIC),A
0884 FD7E06          LD   A,(IY+CBC)    ; GET CONTROL BYTE
0887 E60C            AND  0CH           ; ISOLATE ENLARGE AMOUNT
0889 2821            JR   Z,WRTL3-$     ; JUMP IF ZERO
088B 07              RLCA
088C 07              RLCA
088D EB      WRTL1:  EX   DE,HL
088E A7              AND  A             ; CLEAR CARRY BIT
088F ED42            SBC  HL,BC         ; COMPUTE STACK FRAME SIZE
0891 ED42            SBC  HL,BC
0893 F9              LD   SP,HL         ; SEIZE STACK SPACE
0894 CBB4            RES  6,H           ; MAGICIFY THE ADDRESS
0896 F5              PUSH AF
0897 41              LD   B,C
0898 1A      WRTL2:  LD   A,(DE)        ; GET SOURCE BYTE
0899 13              INC  DE
089A 77              LD   (HL),A        ; EXPAND IT
089B 23              INC  HL
089C 77              LD   (HL),A        ; FLUSHETH
089D 23              INC  HL
089E 10F8            DJNZ WRTL2-$
08A0 CB21            SLA  C
08A2 F1              POP  AF
08A3 210000          LD   HL,0          ; CAPTURE STACK TOP AGAIN
08A6 39              ADD  HL,SP
08A7 54              LD   D,H           ; SET DE=HL
08A8 5D              LD   E,L           ; FOR NEXT DEST COMBO
08A9 3D              DEC  A
08AA 20E1            JR   NZ,WRTL1-$
             ; NOW DO WRITE TO SCREEN
08AC CD3F08  WRTL3:  CALL DCLCTR        ; GET ITERATION COUNTER
08AF CD7400          CALL DELOAD
08B2 FD7E06          LD   A,(IY+CBC)
08B5 D319            OUT  (XPAND),A
08B7 E630            AND  030H
08B9 F608            OR   8
08BB CD0000          CALL RELTA
08BE EB              EX   DE,HL
08BF F5      WRTL4:  PUSH AF
08C0 C5              PUSH BC
08C1 D5              PUSH DE
```

```
08C2 E5                       PUSH HL
08C3 41                       LD   B,C
08C4 1A             WRIT5:    LD   A,(DE)
08C5 13                       INC  DE
08C6 77                       LD   (HL),A
08C7 23                       INC  HL
08C8 77                       LD   (HL),A
08C9 23                       INC  HL
08CA 10F8                     DJNZ WRIT5-$
08CC FD7E04                   LD   A,(IY+CHE)      ; IS FLUSHOUT NEEDED?
08CF E602                     AND  02
08D1 2801                     JR   Z,WRIT6-1       ; JUMP IF NO
08D3 70                       LD   (HL),B
08D4 E1             WRIT6:    POP  HL              ; STEP TO NEXT LINE
08D5 0E28                     LD   C,BYTEPL
08D7 09                       ADD  HL,BC
08D8 D1                       POP  DE
08D9 C1                       POP  BC
08DA F1                       POP  AF
08DB D30C                     OUT  (MAGIC),A
08DD 10EA                     DJNZ WRIT4-$
08DF DDF9                     LD   SP,IX           ; RESTORE STACK
08E1 DDE1                     POP  IX
08E3 C9                       RET

                    ; MACRO TO GENERATE CHARACTER PATTERN TABLE ENTRY
                    DEFCHR    MACR #A,#B,#C,#D,#E,#F,#G
                              DEFB #A
                              DEFB #B
                              DEFB #C
                              DEFB #D
                              DEFB #E
                              DEFB #F
                              DEFB #G
                              ENDM

                    ; LARGE CHARACTER SET (8 X 8)
08E4                LRGCHR
08E4                          DEFCHR 000H,000H,000H,000H,000H,000H,000H ; SPACE
08EB                          DEFCHR 020H,020H,020H,020H,020H,000H,020H ; !
08F2                          DEFCHR 050H,050H,050H,000H,000H,000H,000H ; "
08F9                          DEFCHR 048H,048H,0FCH,048H,0FCH,048H,048H ; #
0900                          DEFCHR 020H,078H,080H,070H,008H,0F0H,020H ; $
0907                          DEFCHR 0C0H,0C8H,010H,020H,040H,098H,018H ; %
090E                          DEFCHR 060H,090H,0A0H,040H,0A8H,090H,068H ; &
0915                          DEFCHR 060H,060H,060H,000H,000H,000H,000H ; '
091C                          DEFCHR 010H,020H,020H,020H,020H,020H,010H ; (
0923                          DEFCHR 040H,020H,020H,020H,020H,020H,040H ; )
092A                          DEFCHR 000H,0A8H,070H,0D8H,070H,0A8H,000H ; *
0931                          DEFCHR 000H,020H,020H,0F8H,020H,020H,000H ; +
0938                          DEFCHR 000H,000H,000H,060H,060H,020H,040H ; ,
093F                          DEFCHR 000H,000H,000H,0F8H,000H,000H,000H ;
0946                          DEFCHR 000H,000H,000H,000H,000H,060H,060H ; .
094D                          DEFCHR 000H,008H,010H,020H,040H,080H,000H ;
0954                          DEFCHR 070H,088H,098H,0A8H,0C8H,088H,070H ; 0
095B                          DEFCHR 020H,060H,020H,020H,020H,020H,070H ; 1
0962                          DEFCHR 070H,088H,008H,070H,080H,080H,0F8H ; 2
```

```
0969          DEFCHR 070H,088H,008H,030H,008H,088H,070H ; 3
0970          DEFCHR 010H,030H,050H,090H,0F8H,010H,010H ; 4
0977          DEFCHR 0F8H,080H,0F0H,008H,008H,088H,070H ; 5
097E          DEFCHR 030H,040H,080H,0F0H,088H,088H,070H ; 6
0985          DEFCHR 0F8H,008H,010H,020H,040H,040H,040H ; 7
098C          DEFCHR 070H,088H,088H,070H,088H,088H,070H ; 8
0993          DEFCHR 070H,088H,088H,078H,008H,010H,060H ; 9
099A          DEFCHR 000H,060H,060H,000H,060H,060H,000H ; :
09A1          DEFCHR 060H,060H,000H,060H,060H,020H,040H ; ;
09A8          DEFCHR 010H,020H,040H,080H,040H,020H,010H ; <
09AF          DEFCHR 000H,000H,0F8H,000H,0F8H,000H,000H ; =
09B6          DEFCHR 040H,020H,010H,008H,010H,020H,040H ; >
09BD          DEFCHR 070H,088H,008H,010H,020H,000H,020H ; ?
09C4          DEFCHR 070H,088H,0A8H,0B8H,0B0H,080H,078H ; @
09CB          DEFCHR 070H,088H,088H,0F8H,088H,088H,088H ; A
09D2          DEFCHR 0F0H,088H,088H,0F0H,088H,088H,0F0H ; B
09D9          DEFCHR 070H,088H,080H,080H,080H,088H,070H ; C
09E0          DEFCHR 0F0H,088H,088H,088H,088H,088H,0F0H ; D
09E7          DEFCHR 0F8H,080H,080H,0E0H,080H,080H,0F8H ; E
09EE          DEFCHR 0F8H,080H,080H,0E0H,080H,080H,080H ; F
09F5          DEFCHR 070H,088H,080H,080H,098H,088H,078H ; G
09FC          DEFCHR 088H,088H,088H,0F8H,088H,088H,088H ; H
0A03          DEFCHR 070H,020H,020H,020H,020H,020H,070H ; I
0A0A          DEFCHR 008H,008H,008H,008H,008H,088H,070H ; J
0A11          DEFCHR 088H,090H,0A0H,0C0H,0A0H,090H,088H ; K
0A18          DEFCHR 080H,080H,080H,080H,080H,080H,0F8H ; L
0A1F          DEFCHR 088H,0D8H,0A8H,0A8H,088H,088H,088H ; M
0A26          DEFCHR 088H,0C8H,0A8H,098H,088H,088H,088H ; N
0A2D          DEFCHR 0F8H,088H,088H,088H,088H,088H,0F8H ; O
0A34          DEFCHR 0F0H,088H,088H,0F0H,080H,080H,080H ; P
0A3B          DEFCHR 070H,088H,088H,088H,0A8H,090H,068H ; Q
0A42          DEFCHR 0F0H,088H,088H,0F0H,0A0H,090H,088H ; R
0A49          DEFCHR 070H,088H,080H,070H,008H,088H,070H ; S
0A50          DEFCHR 0F8H,020H,020H,020H,020H,020H,020H ; T
0A57          DEFCHR 088H,088H,088H,088H,088H,088H,070H ; U
0A5E          DEFCHR 088H,088H,088H,050H,050H,020H,020H ; V
0A65          DEFCHR 088H,088H,088H,0A8H,0A8H,0D8H,088H ; W
0A6C          DEFCHR 088H,088H,050H,020H,050H,088H,088H ; X
0A73          DEFCHR 088H,088H,050H,020H,020H,020H,020H ; Y
0A7A          DEFCHR 0F8H,008H,010H,020H,040H,080H,0F8H ; Z
0A81          DEFCHR 070H,040H,040H,040H,040H,040H,070H ; [
0A88          DEFCHR 000H,080H,040H,020H,010H,008H,000H ; \
0A8F          DEFCHR 070H,010H,010H,010H,010H,010H,070H ; ]
0A96          DEFCHR 020H,070H,0A8H,020H,020H,020H,020H ; ^
0A9D          DEFCHR 000H,020H,040H,0F8H,040H,020H,000H ; _
0AA4          DEFCHR 020H,020H,020H,020H,0A8H,070H,020H ; DOWN ARROW
0AAB          DEFCHR 000H,020H,010H,0F8H,010H,020H,000H ; RIGHT ARROW
0AB2          DEFCHR 000H,088H,050H,020H,050H,088H,000H ; MULTIPLY
0AB9 00       DEFB 0
0ABA 20       DEFB 20H
0ABB 00       DEFB 0
0ABC F8       DEFB 0F8H
0ABD 00       DEFB 0
0ABE 20       DEFB 20H
        ; ** LAST BYTE OF DIVIDE IS ZERO, WHICH HAPPENS TO BE FIRST
        ;    BYTE OF ...
        ; SMALL CHARACTERS (4 X 6)
0AB4    SMLCHR
0AB4          DEFS 000H,000H,000H,000H,000H ; SPACE
```

```
0AC4 DDE1      MAJUMP: POP   IX
0AC6 E3                EX    (SP),HL
0AC7 DDE9              JP    (IX)
               ;NAME:  CONVERT KEY CODE TO ASCII
               ;PURPOSE:  SAME
               ;INPUT:  A=KEY CODE
               ;OUTPUT:  A=ASCII EQUIVALENT
               ;HOW:  TABLE LOOKUP
0AC9           MKCTAS:
0AC9 48                LD    C,B
0ACA 0600              LD    B,0
0ACC 21D50A            LD    HL,KCTAIB
0ACF 09                ADD   HL,BC
0AD0 7E                LD    A,(HL)
0AD1 FD7709    AFROG:  LD    (IY+CBA),A
0AD4 C9                RET

0AD5           KCTAIB:
0AD5 20                DEFB ' '           ;SPACE
0AD6 43                DEFB 'C'           ;BULLET
0AD7 5E                DEFB 5EH           ;UP ARROW
0AD8 5C                DEFB 5CH           ;DOWN ARROW
0AD9 25                DEFB '%'           ;
0ADA 52                DEFB 'R'           ;RECALL
0ADB 53                DEFB 'S'           ;STORE
0ADC 3B                DEFB ';'           ;PLUS-MINUS
0ADD 2F                DEFB '/'           ; DIVIDE
0ADE 37                DEFB '7'
0ADF 38                DEFB '8'
0AE0 39                DEFB '9'
0AE1 2A                DEFB '*'           ;TIMES
0AE2 34                DEFB '4'
0AE3 35                DEFB '5'
0AE4 36                DEFB '6'
0AE5 2D                DEFB '-'           ;MINUS
0AE6 31                DEFB '1'
0AE7 32                DEFB '2'
0AE8 33                DEFB '3'
0AE9 2B                DEFB '+'           ;PLUS
0AEA 26                DEFB '&'           ;CE
0AEB 30                DEFB '0'
0AEC 2E                DEFB '.'           ;POINT
0AED 3D                DEFB '='           ;EQUALS


               ; NAME:          FILL AREA
               ; PURPOSE:       SET REGION OF SCREEN TO CONSTANT VALUE
               ; INPUT:         A = DATA TO FILL WITH
               ;                BC = NUMBER OF BYTES TO FILL
               ;                DE = STARTING ADDRESS OF REGION TO FILL
0AEE EB        MFILL:  EX    DE,HL
0AEF 77        MFILL1: LD    (HL),A       ; STUFF BYTE
0AF0 EDA1              CPI                ; BUMP HL, DEC BC
0AF2 EAEF0A            JP    PE,MFILL1
0AF5 C9                RET
               ; NAME:          RELATIVE TO ABSOLUTE
               ; PURPOSE:       COORDINATE CONVERSION
               ; INPUT:         E = X COORDINATE
               ;                D = Y COORDINATE
               ;                A = MAGIC REGISTER VALUE TO USE
```

```
                    ; OUTPUT:        DE = ABSOLUTE ADDRESS
                    ;                A = MAGIC REGISTER TO USE
                    ; MAGIC ENTRY POINT
0AF6 CD080B         MRELAB: CALL RELTA
0AF9 1805                   JR   MRELA2-$
                    ; NONMAGIC ENTRY POINT
0AFB CD4E0B         MRELA1: CALL RELTA1
0AFE CBF2                   SET  6,D            ; NONMAGIC THE ADDRESS
0B00 FD7304         MRELA2: LD   (IY+CBE),E     ; UPDATE CB DE
0B03 FD7205                 LD   (IY+CBD),D
0B06 18C9           MFROG:  JR   GFROG-$
                    ; MAGIC ENTRY POINT
0B08 CD4E0B         RELTA:  CALL RELTA1
0B0B D30C                   OUT  (MAGIC),A
0B0D C9                     RET
0B0E 00             CKSUM2: DEFB 0              ; *** CHECKSUM ***
0B0F                        DEFS 0E0H,0A0H,0A0H,0A0H,0E0H ; 0
0B14                        DEFS 040H,040H,040H,040H,040H ; 1
0B19                        DEFS 0E0H,020H,0E0H,080H,0E0H ; 2
0B1E                        DEFS 0E0H,020H,060H,020H,0E0H ; 3
0B23                        DEFS 0A0H,0A0H,0E0H,020H,020H ; 4
0B28                        DEFS 0E0H,080H,0E0H,020H,0E0H ; 5
0B2D                        DEFS 0E0H,080H,0E0H,0A0H,0E0H ; 6
0B32                        DEFS 0E0H,020H,020H,020H,020H ; 7
0B37                        DEFS 0E0H,0A0H,0E0H,0A0H,0E0H ; 8
0B3C                        DEFS 0E0H,0A0H,0E0H,020H,0E0H ; 9
0B41                        DEFS 000H,040H,000H,040H,000H ; :
0B46                        DEFS 040H,0E0H,0E0H,0E0H,0E0H ; BULLET


                    ; MOVE ROUTINE
0B4B EDB0           MMOVE:  LDIR
0B4D C9                     RET


                    ; SYSTEM ENTRY POINT FOR NONMAGIC ADDRESSES
0B4E E5             RELTA1: PUSH HL
0B4F E6FC                   AND  0FCH           ; TOSS OUT SHIFT AMOUNT
0B51 6F                     LD   L,A            ; SAVE
0B52 7B                     LD   A,E            ; GET X
0B53 E603                   AND  03H            ; ISOLATE SHIFT AMOUNT
0B55 B5                     OR   L              ; COMBINE WITH MR
0B56 F5             RELTA2: PUSH AF
0B57 E640                   AND  040H           ; IS FLOPPED BIT SET?
0B59 7B                     LD   A,E
0B5A 2803                   JR   Z,RELTA3-$     ; JUMP IF NOT
0B5C 2F                     CPL                 ; YEP - UNFLOP THE COORDINATE
0B5D C6A0                   ADD  A,160
0B5F 6A             RELTA3: LD   L,D            ; HL = Y
0B60 2600                   LD   H,0
0B62 29                     ADD  HL,HL          ; SET HL = Y * 8
0B63 29                     ADD  HL,HL
0B64 29                     ADD  HL,HL
0B65 54                     LD   D,H
0B66 5D                     LD   E,L
0B67 29                     ADD  HL,HL          ; SET HL = Y * 32
0B68 29                     ADD  HL,HL
0B69 19                     ADD  HL,DE          ; SET HL = Y * 40
```

```
0B6A CB3F       SRL  A          ; A = X 4
0B6C CB3F       SRL  A
0B6E 5F         LD   E,A
0B6F 1600       LD   D,0
0B71 19         ADD  HL,DE      ; HL = Y * 40 + X        4
                IF   NHHDWR-1
                ENDIF
0B72 EB         EX   DE,HL

                ; NAME:          RETURN FROM MACRO SUBROUTINE
                ; PURPOSE:       RETURN CONTROL TO CALLER
                ; THIS CODE WAS 'STOLEN' FROM RELABS SINCE
                ; IT DOES THE STACK CLEANUP THAT MRET DOES
0B73 F1         MMRET:  POP  AF
0B74 E1                 POP  HL
0B75 C9                 RET

                ; ENTRY FOR USER
0B76 CD7B0B     INXNIB: CALL XNIB
0B79 18E8               JR   MFROG-$

                ; NAME:          INDEX NIBBLE
                ; PURPOSE:       LOAD OF SPECIFIED NIBBLE RELATIVE TO BASE ADDR
                ; INPUT:         C = NIBBLE NUMBER
                ;                HL = BASE ADDRESS
                ; OUTPUT:        NIBBLE RETURNED RIGHT JUSTIFIED IN A
                ; DESCRIPTION:  BYTE = NIBBLE#         2+BASE
                ;  THE LOW ORDER NIBBLE OF A GIVEN BYTE IS ADDRESSED
                ; BY AN EVEN NIBBLE NUMBER
0B7B E5         XNIB:   PUSH HL
0B7C C5                 PUSH BC
0B7D 0600               LD   B,0
0B7F CB39               SRL  C
0B81 09                 ADD  HL,BC
0B82 7E                 LD   A,(HL)
0B83 C1                 POP  BC
0B84 CB41               BIT  0,C
0B86 2804               JR   Z,XNIB1-$
0B88 0F                 RRCA
0B89 0F                 RRCA
0B8A 0F                 RRCA
0B8B 0F                 RRCA
0B8C E60F       XNIB1:  AND  0FH
0B8E E1                 POP  HL
0B8F C9                 RET

                ; NAME:          STORE NIBBLE
                ; PURPOSE:       NIBBLE STORING (!)
                ; INPUT:         A = NIBBLE TO STORE
                ;                C = NIBBLE NUMBER (AS IN XNIB)
                ;        HL = BASE ADDRESS
0B90 E5         PUTNIB: PUSH HL
0B91 C5                 PUSH BC
0B92 0600               LD   B,0
0B94 CB39               SRL  C
```

```
0B96 09            ADD  HL,BC
0B97 C1            POP  BC
0B98 CB41          BIT  0,C
0B9A 2809          JR   Z,PUTNB1-$
          ; H.O. CASE - SHIFT IT
0B9C 07            RLCA
0B9D 07            RLCA
0B9E 07            RLCA
0B9F 07            RLCA
0BA0 AE            XOR  (HL)        ; NEAT COMBINE TRICK (SEE DDJ JUNE 76
0BA1 E6F0          AND  0F0H        ; PG. 9)
0BA3 1803          JR   PUTNB2-$
0BA5 AE   PUTNB1:  XOR  (HL)        ; L.O. CASE
0BA6 E60F          AND  0FH
0BA8 AE   PUTNB2:  XOR  (HL)
0BA9 77            LD   (HL),A
0BAA E1            POP  HL
0BAB C9            RET


          ; NAME : INDEX WORD TABLE (WORD INDEX)
          ; PURPOSE: TO INDEX AN ARRAY OF DEFW'S
          ; INPUTS: A=INDEX NUMBER (0-255)
          ; HL -> TABLE ENTRY 0
          ; OUTPUTS:      DE = ENTRY LOOKED UP
          ;               HL = POINTER TO ENTRY IN TABLE
0BAC 5F   MINDW:   LD   E,A
0BAD 1600          LD   D,0
0BAF CB23          SLA  E
0BB1 CB12          RL   D           ; DE*2
0BB3 19            ADD  HL,DE
0BB4 5E            LD   E,(HL)
0BB5 23            INC  HL
0BB6 56            LD   D,(HL)
0BB7 2B            DEC  HL
0BB8 CDE40C STRIDE: CALL FINDL3
0BBB 1808          JR   MINDB1-$    ; JOIN STORE IN INDEX BYTE
          ; NAME:         INDEX BYTE TABLE
          ; PURPOSE:      TABLE LOOKUP
          ; INPUTS:       A = INDEX NUMBER
          ; OUTPUT:       A = VALUE OF BYTE
          ;               HL = POINTER TO TABLE ENTRY
0BBD 5F   MINDB:   LD   E,A
0BBE 1600          LD   D,0
0BC0 19            ADD  HL,DE
0BC1 7E            LD   A,(HL)
0BC2 FD7709        LD   (IY+CBA),A
0BC5 FD740B MINDB1: LD  (IY+CBH),H
0BC8 FD750A        LD   (IY+CBL),L
0BCB C9            RET


          ; NAME:    DISPLAY TIME
          ; PURPOSE: DISPLAY TIME ON SCREEN
          ; INPUTS:  E = X COORD
          ;          D = Y COORD
          ;          C = SAME AS DISCHR OPTIONS EXCEPT BIT 7 = 1
          ;              TO DISPLAY COLON AND SECONDS
          ; OUTPUTS: NONE
```

```
0BCC                 MDISTI:
0BCC DD21????                LD   IX,SMLFNT
0BD0 0642                    LD   B,42H
0BD2 21EF4F                  LD   HL,GTMINS
0BD5 C5                      PUSH BC
0BD6 FDCB06BE                RES  7,(IY+CBC)
0BD9 CDEB0B                  CALL BCDISP
0BDC C1                      POP  BC
0BDD CB79                    BIT  7,C
0BDF C8                      RET  Z
0BE0 3EBA                    LD   A,80H+3AH
0BE2 CDE107                  CALL DISPCH
0BE5 0642                    LD   B,42H
0BE7 21ED4F                  LD   HL,GTSECS
                     ; AND FALL INTO ...

                     ; NAME:          DISPLAY BCD NUMBER
                     ; INPUT:         B = NUMBER DISPLAY OPTIONS
                     ;                C = CHARACTER DISPLAY OPTIONS
                     ;                DE = Y,X COORDINATES
                     ;                HL = NUMBER ADDRESS (POINTS AT LO BYTE)
                     ;                IX = ALTERNATE FONT (IF USED)
                     ; OUTPUT:        DE UPDATED
                     ; DESCRIPTION:  THIS ROUTINE CONVERTS EACH NIBBLE INTO
                     ; ASCII AND DISPLAYS IT.  THE NORMALLY ILLEGAL BCD
                     ; VALUES ARE DISPLAYED AS CODES 2A THRU 2F RESPECTIVELY.
                     ; THE NUMBER DISPLAY OPTIONS BYTE IS FORMATTED AS FOLLOWS:
                     ; BIT 7          SET IF LEADING ZERO SUPPRESSION WANTED
                     ; BIT 6          SET IF USE OF ALTERNATE FONT WANTED
                     ; BITS 5-0       NUMBER OF DIGITS TO DISPLAY (NOT NUMBER OF BYTES!!!)
0BEA 78              BCDISP: LD   A,B         ; GET OPTIONS
0BEB E63F                    AND  3FH         ; ISOLATE NUMBER OF DIGITS
0BED 3D              BCDD0:  DEC  A
0BEE F8                      RET  M           ; QUIT IF NULL OR NO MORE
0BEF 4F                      LD   C,A         ; SAVE
0BF0 CD7B0B                  CALL XNIB        ; GET NEXT DIGIT
0BF3 2007                    JR   NZ,BCDD1-$  ; JUMP IF NONZERO
0BF5 CB78                    BIT  7,B         ; IS ZERO SUPPRESS ON?
0BF7 2803                    JR   Z,BCDD1-$   ; JUMP IF NOT
0BF9 B1                      OR   C           ; LAST DIGIT?
0BFA 2014                    JR   NZ,BCDD4-$  ; JUMP IF NOT
0BFC CBB8            BCDD1:  RES  7,B         ; CLEAR LEADING ZERO FLAG
0BFE C606                    ADD  A,6
0C00 E60F                    AND  0FH
0C02 C62A                    ADD  A,2AH
0C04 CB70            BCDD2:  BIT  6,B         ; ALTERNATE FONT?
0C06 2802                    JR   Z,BCDD3-$   ; JUMP IF NO
0C08 F680                    OR   80H         ; YEA - SET THE BIT
0C0A CDE107          BCDD3:  CALL DISPCH      ; DISPLAY THE CHAR
0C0D 79                      LD   A,C         ; GET LOOP COUNTER IN A
0C0E 18DD                    JR   BCDD0-$     ; AND GO FOR NEXT
0C10 3E20            BCDD4:  LD   A,' '       ; LEADING ZERO - WRITE A SPACE
0C12 18F0                    JR   BCDD2-$

                     ; NAME:     INCREMENT SCORE
                     ; PURPOSE:  INCREMENT SCORE AND COMPARE TO END SCORE
                     ; INPUTS:   HL -> PLAYER SCORE LOW ADDR OF 3 BYTES
                     ; OUTPUTS:  GSBEND OF GAMSTB SET IF MAX SCORE REACHED
```

```
0C15 0603       MINCSC: LD   B,3
0C17 E5                 PUSH HL
0C18 7E         INCLOP: LD   A,(HL)
0C19 C601               ADD  A,1
0C1B 27                 DAA
0C1C 77                 LD   (HL),A
0C1D 2003               JR   NZ,CMPIT-$
0C1F 23                 INC  HL
0C20 10F6               DJNZ INCLOP-$
0C22 E1         CMPIT:  POP  HL
0C23 23                 INC  HL
0C24 23                 INC  HL
0C25 3A844F             LD   A,(GAMSTB)
0C28 CB4F               BIT  GSBSCR,A
0C2A C8                 RET  Z
0C2B 11F64F             LD   DE,ENDSCR+2
0C2E 0603               LD   B,3
0C30 1A         CMPLOP: LD   A,(DE)
0C31 BE                 CP   (HL)
0C32 2807               JR   Z,REPEAT-$    ;ENDSCR = SCORE
0C34 D0                 RET  NC            ;ENDSCR > SCORE
0C35 21844F     SETEND: LD   HL,GAMSTB     ;ENDSCR < SCORE
0C38 CBFE               SET  GSBEND,(HL)
0C3A C9                 RET
0C3B 1B         REPEAT: DEC  DE
0C3C 2B                 DEC  HL
0C3D 10F1               DJNZ CMPLOP-$
0C3F 18F4               JR   SETEND-$

                ; NAME:         QUIT
                ; PURPOSE:      HOLD PRESENT GAME SCORE UNTIL KEY HIT OR RESET
                ; SAY GAME OVER
0C41            MQUIT:  SYSSUK STRDIS
0C43 30                 DEFB 48
0C44 18                 DEFB 24
0C45 4C                 DEFB 01001100B
0C46 570C               DEFW GMOVR
0C48                    SYSTEM ACTINT      ; ACTIVATE INTERRUPTS
0C4A            MQUIT1: SYSSUK SENTRY      ; WAIT FOR SOMETHING TO HAPPEN
0C4C 1402               DEFW AKEYS
0C4E FE14               CP   ST0
0C50 2804               JR   Z,MQUIT2-$    ; TRIGGER CHANGE?
0C52 FE13               CP   SKYD          ; KEY HIT?
0C54 20F4               JR   NZ,MQUIT1-$   ; NO - KEEP GOING
0C56 C7         MQUIT2: RST  0             ; YES - RESET
0C57 47414D45   GMOVR:  DEFM 'GAME'
0C5B 06                 DEFB 6
0C5C 4F564552           DEFM 'OVER'
0C60 00                 DEFB 0
                ; ****************
                ; * MENU ROUTINES *
                ; ****************
>0060           NOLINE  EQU  96            ; NUMBER OF DISPLAYED LINES
>0000           MNN     EQU  0             ; NEXT FIELD
>0001           MNNH    EQU  1
>0002           MNSAL   EQU  2             ; STRING ADDRESS
>0003           MNSAH   EQU  3
>0004           MNGL    EQU  4             ; GO TO ADDRESS
>0005           MNGH    EQU  5
```

```
                ; SYSTEM POWER UP ROUTINE
0C61 3A0020     PWRUP:  LD    A,(FIRSTC)    ; GET FIRST CASSETTE LOCATION
0C64 FEC3               CP    0C3H          ; IS IT A JUMP??
0C66 CA0020             JP    Z,FIRSTC      ; JUMP TO IT IF SO
0C69 31CE4F             LD    SP,BEGRAM
0C6C                    SYSSUK FILL         ; CLEAR SYSTEM RAM
0C6E CE4F               DEFW BEGRAM
0C70 3200               DEFW 50
0C72 00                 DEFB 0
0C73 32FF0F             LD    (URINAL),A    ; CLEAR SHIFTER
0C76 3D                 DEC   A
0C77 32EC4F             LD    (TIMOUT),A    ; CLEAR TIMEOUT WATCHDOG
0C7A                    SYSTEM INTPC
0C7C                    DO    EMUSIC
0C7D                    DO    SETOUT
0C7E BF                 DEFB (NOLINE*2)-1
0C7F 29                 DEFB 41
0C80 08                 DEFB 8
0C81                    DO    COLSET
0C82 1300               DEFW MENUC1
0C84                    DO    ACTINT
0C85                    EXIT
0C86 11F30D             LD    DE,GAMSTR     ; 'SELECT GAME' AS TITLE
0C89 210020             LD    HL,FIRSTC     ; ASSUME MENU STARTS IN CASSETTE
0C8C 7E                 LD    A,(HL)        ; GET FIRST CASSETTE BYTE
0C8D 23                 INC   HL
0C8E FE55               CP    55H           ; IS SENTINEL THERE?
0C90 2803               JR    Z,PWRUP1-$    ; YEP - JUMP
0C92 211802             LD    HL,GUNLNK     ; WRONG - USE ONBOARD ONLY
0C95            PWRUP1: SYSTEM MENU         ; DISPLAY THE MENU

                ; NAME:          DISPLAY MENU AND BRANCH ON CHOICE
                ; INPUT:         HL = MENU LIST
                ;                DE = MENU TITLE
                ; OUTPUT:        DE = TITLE OF SELECTION MADE
                ; DESCRIPTION:
                ;       THE MENU LIST IS A LINKED LIST OF THE FOLLOWING FORMAT
                ; *************************
                ; * 0 * NEXT ENTRY        *
                ; * 1 *                   *
                ; *************************
                ; * 2 * STRING ADDRESS    *
                ; * 3 *                   *
                ; *************************
                ; * 4 * BRANCH TO ADDRESS *
                ; * 5 *                   *
                ; *************************
                ; THIS LIST IS TERMINATED BY A NEXT ENTRY FIELD OF ZEROS
                ; A MAXIMUM OF EIGHT ENTRYS MAY BE DISPLAYED.
0C97 E5         MMENU:  PUSH HL
0C98 E5                 PUSH HL
0C99 CD190D             CALL MNCLR          ; CLEAR SCREEN AND THROWUP TITLE
0C9C                    XYRELL DE,16,12
0C9F 010900             LD    BC,109H       ; INITIALIZE ENTRY # AND COLOR
0CA2 DDE1       MMENU1: POP   IX            ; FIRST ENTRY TO IX
0CA4 78                 LD    A,B           ; SELECTION NUMBER TO A
0CA5 C630               ADD   A,'0'         ; MAKE IT ASCII
0CA7                    SYSTEM CHRDIS       ; AND SHOW IT
```

```
0CA9 3E2D             LD   A,'-'         ; DISPLAY DASH
0CAB                  SYSTEM CHRDIS
0CAD DD6603           LD   H,(IX+MNSAH)  ; HL = STRING ADDRESS
0CB0 DD6E02           LD   L,(IX+MNSAL)
0CB3                  SYSTEM STRDIS      ; DISPLAY SELECTION
0CB5 3E08             LD   A,8
0CB7 82               ADD  A,D           ; TO NEXT LINE
0CB8 57               LD   D,A
0CB9 1E10             LD   E,16
0CBB 04               INC  B             ; BUMP ENTRY #
0CBC DD6601           LD   H,(IX+MNNH)   ; HL = NEXT ENTRY ADDR
0CBF DD6E00           LD   L,(IX+MNNL)
0CC2 E5               PUSH HL
0CC3 7C               LD   A,H
0CC4 B5               OR   L
0CC5 20DB             JR   NZ,MMENU3-$   ; NO - JUMP BACK
                ; AT THIS POINT HL = 0, (SP) = 0
0CC7 39               ADD  HL,SP         ; HL = STACK POINTER
0CC8 C5       MMENU3: PUSH BC
0CC9 010101           LD   BC,0101H
0CCC                  XYWELL DE,16,77    ; FEEDBACK ADDRESS
0CCF                  SYSTEM GETNUM      ; GET NUMBR
0CD1 C1               POP  BC
0CD2 7E               LD   A,(HL)        ; HOW DOES SHE LOOK?
0CD3 A7               AND  A             ; ZERO ENTERED?
0CD4 2803             JR   Z,MMENU5-$    ; JUMP IF SO
0CD6 B8               CP   B             ; IN RANGE?
0CD7 3806             JR   C,MMENU6-$    ; JUMP IF SO
0CD9 3E3F     MMENU5: LD   A,'?'         ; DUD ENTRY - SHOW ?
0CDB                  SYSTEM CHRDIS
0CDD 18E9             JR   MMENU3-$      ; GO BACK FOR NEXT TRY
0CDF E1       MMENU6: POP  HL            ; THROW OUT ENTRY AREA
0CE0 D1               POP  DE            ; RESTORE HEAD OF MENU LIST
0CE1 47               LD   B,A           ; NUMBER ENTERED TO B
0CE2 EB       MMENU7: EX   DE,HL         ; HL = ENTRY PTR
0CE3 5E               LD   E,(HL)        ; DE = NEXT
0CE4 23               INC  HL
0CE5 56               LD   D,(HL)
0CE6 10FA             DJNZ MMENU7-$      ; COUNT DOWN TO ENTRY
0CE8 23               INC  HL
0CE9 5E               LD   E,(HL)        ; STRING TO DE
0CEA 23               INC  HL
0CEB 56               LD   D,(HL)
0CEC 23               INC  HL
0CED 4E               LD   C,(HL)        ; GO TO ADDRESS TO BC
0CEE 23               INC  HL
0CEF 46               LD   B,(HL)
0CF0 E1               POP  HL            ; HL = RETURN TO PLACE
0CF1 F1               POP  AF            ; THROW OUT OLD PC
0CF2 C5               PUSH BC            ; PUT NEW PC ON STACK
0CF3 E5               PUSH HL            ; AND PUT BACK DUMMY RETURN
0CF4 FD7304   FINDL3: LD   (IY+CBE),E    ; PASS BACK TITLE ADDRESS
0CF7 FD7205           LD   (IY+CBD),D
0CFA C9               RET                ; AND GO BACK

                ; NAME:        GET PARAMETER
                ; PURPOSE:     INPUT OF PROGRAM OPTIONS
                ; INPUT:       A = NUMBER OF DIGITS
                ;              BC = PROMPT STRING ADDRESS
                ;              DE = FRAME TITLE ADDRESS
                ;              HL = PARAMETER ADDRESS
```

```
                ; DESCRIPTION:
                ;       THIS ROUTINE ASKS THE USER TO ENTER A NUMBER
                ; FIRST A MENU FRAME IS CREATED, USING THE STRING
                ; POINTED AT BY DE AS A TITLE.  THE STRING 'ENTER'
                ; IS DISPLAYED, FOLLOWED BY THE PROMPT STRING.
                ; GETNUM IS THEN CALLED TO INPUT THE NUMBER.  FEEDBACK
                ; IS PROVIDED IN DOUBLE SIZED CHARACTERS.
                ; NOTE: ** THIS ROUTINE USES TWO SYSTEM LEVELS AND THE ALTERNATE SET
0CFB F5         MGETP:  PUSH AF         ; SAVE NUMBER OF DIGITS
0CFC E5                 PUSH HL
0CFD C5                 PUSH BC
0CFE CD190D             CALL MNCLR
0D01                    SYSSUK STRDIS   ; DISPLAY 'ENTER'
0D03 08                 DEFB 8
0D04 20                 DEFB 32
0D05 09                 DEFB 1001B
0D06 B70D               DEFW ENTSTG
0D08 E1                 POP  HL
0D09                    SYSTEM STRDIS   ; DISPLAY WHAT TO ENTER
0D0B E1                 POP  HL
0D0C F1                 POP  AF
0D0D 47                 LD   B,A
0D0E CBF1               SET  6,C        ; SET LARGE CHARS
0D10                    XYRELL DE,48,48 ; LOAD FEEDBACK ADDRESS
0D13                    SYSTEM GETNUM   ; GET NUMBER
0D15                    SYSSUK PAWS     ; LET USER READ IT
0D17 0F                 DEFB 15
0D18 C9                 RET
                ; SUBROUTINE TO CLEAR SCREEN FOR MENU AND THROWUP TITLE
0D19 D5         MNCLR:  PUSH DE
0D1A                    SYSSUK FILL
0D1C 0040               DEFW NORMEM
0D1E B801               DEFW 11*BYTEPL
0D20 00                 DEFB 0
0D21                    SYSSUK FILL
0D23 B841               DEFW NORMEM+(11*BYTEPL)
0D25 480D               DEFW (NOLINE-11)*BYTEPL
0D27 55                 DEFB 55H
0D28 E1                 POP  HL
0D29                    XYRELL DE,24,0  ; TITLE
0D2C 0E04               LD   C,0100B
0D2E                    SYSTEM STRDIS
0D30 C9                 RET

                ; NAME:         GET NUMBER
                ; INPUT:        B = DISNUM OPTIONS
                ;               C = CHRDIS OPTIONS FOR FEEDBACK
                ;               DE = COORDINATES OF FEEDBACK AREA
                ;               HL = ADDRESS OF WHERE TO STASH NUMBER
                ; DESCRIPTION:  THIS ROUTINE CAN INPUT A NUMBER FROM
                ;       EITHER THE KEYBOARD OR THE HAND CONTROL.  KEYBOARD
                ;       ENTRY PROCEEDS CONVENTIONALY.  GETNUM EXITS
                ;       WHEN THE EQUALS KEY IS PRESSED OR THE REQUIRED NUMBER
                ;       OF DIGITS IS ENTERED.
                ;               PLAYER ONE HAND CONTROL MAY ALSO BE USED TO
                ;       ENTER A NUMBER.  TO USE THIS OPTION, PULL THE TRIGGER
                ;       THEN ROTATE THE POT UNTIL THE NUMBER YOU WISH TO
                ;       ENTER IS SHOWN IN THE FEEDBACK AREA.  PULL THE TRIGGER
                ;       AGAIN TO REGISTER THE ENTRY.  IF DURING THIS PROCESS
                ;       THE KEYBOARD IS USED - KEYBOARD INPUT WILL OVERRIDE.
```

```
                ;       THIS IS DONE TO PREVENT SOME BIRDO FROM CONFUSING
                ;       LARRY LISKE.
0D31 D9         MGETN:  EXX
0D32 CD990D             CALL CLRNUM         ; CLEAR THE NUMBER
0D35 4F                 LD   C,A            ; SET ZERO DIGITS IN - POT ENABLED
0D36 FD7E07     MGETN0: LD   A,(IY+CRB)     ; ENTRY COMPLETE?
0D39 A9                 XOR  C
0D3A E63F               AND  3FH
0D3C C8                 RET  Z              ; QUIT IF SO
0D3D 21360D             LD   HL,MGETN0
0D40 E5                 PUSH HL
0D41                    SYSTEM RANGED       ; RANDOMIZE WHILE WE WAIT
0D43                    SYSSUK SENTRY
0D45 0A00               DEFW NUMBAS
0D47                    SYSSUK DOIT
0D49 4C0D               DEFW GNUMDO
0D4B C9                 RET                 ; NOTHIN - LOOP ON SENTRY
0D4C            GNUMDO: JMP  SKYD,MGETN6
0D4F                    JMP  STG,MGETN2
0D52                    JMP  SPG,MGETN3
                ; ** NEXT INSTRUCTION MAKES GOOD LIST TERMINATOR, SO WE USED IT **
                ; TRIGGER ROUTINE
0D55 CB60       MGETN2: BIT  4,B            ; 0-1 TRANS?
0D57 C8                 RET  Z              ; NO - IGNORE
0D58 79                 LD   A,C
0D59 3C                 INC  A              ; ARE WE ALREADY IN POT MODE?
0D5A 280A               JR   Z,MGETN3-$     ; YEP - JUMP TO EXIT
0D5C CB79               BIT  7,C            ; POT LEGAL?
0D5E C0                 RET  NZ             ; NO - IGNORE
0D5F 0EFF               LD   C,0FFH         ; SET POT FLAG
                ; POT ROUTINE
0D61 79         MGETN3: LD   A,C            ; QUIT IF NOT IN POT MODE
0D62 3C                 INC  A
0D63 C0                 RET  NZ
                ; HOW MANY DIGITS?
0D64 D9                 EXX                 ; TO NORMAL SET
0D65 78                 LD   A,B            ; SNATCH DIGITS
0D66 D9                 EXX
0D67 FE01               CP   1              ; 1 PRAY TELL?
0D69 060A               LD   B,10
0D6B 2802               JR   Z,MGETN4-$     ; JUMP IF GOOD GUESS
0D6D 0664               LD   B,100          ; WRONG!
0D6F DB1C       MGETN4: IN   A,(POT0)       ; GET CURRENT POT VALUE
0D71 57                 LD   D,A            ; RANGE IT
0D72 AF                 XOR  A
0D73 5F                 LD   E,A
0D74 67                 LD   H,A
0D75 19         MGETN5: ADD  HL,DE
0D76 CE00               ADC  A,0            ; ADD EVERY CARRY TO AC
0D78 27                 DAA
0D79 10FA               DJNZ MGETN5-$
0D7B D9                 EXX                 ; BACK TO NORMAL SET
0D7C 77                 LD   (HL),A
0D7D 1814               JR   MGETN3-$
                ; KEYBOARD ROUTINE
0D7F 0C         MGETN6: INC  C              ; POT MODE?
0D80 2008               JR   NZ,MGETN7-$    ; JUMP IF NOT
```

```
0D82 CD990D          CALL CLRNUM
0D85 0C              INC  C            ; SET ONE DIGIT SO FAR
0D86 CBF9    MGETN7: SET  7,C          ; SET POT LOCKOUT
0D88                 SYSTEM KCTASC
0D8A FE3D            CP   '='          ; EQUALS TYPED?
0D8C 2808            JR   Z,MGETN9-$   ; QUIT IF EQUALS
0D8E E60F            AND  0FH
0D90 D9              EXX
0D91                 SYSTEM SHIFTU     ; SHIFT DIGIT UP
0D93 D5      MGETN8: PUSH DE
0D94                 SYSTEM DISNUM
             ; ENTER HERE FOR EQUAL OR TRIGGER EXIT TO THROW OUT RETURN
0D96 D1      MGETN9: POP  DE
0D97 D9              EXX               ; BACK TO NORMAL
0D98 C9              RET


             ; SUBROUTINE TO CLEAR NUMBER
0D99 C5      CLRNUM: PUSH BC
0D9A D9              EXX               ; TO NORMAL SET
0D9B E5              PUSH HL
0D9C 78              LD   A,B
0D9D 3C              INC  A
0D9E E63E            AND  3EH
0DA0 1F              RRA               ; LIEU HARP MEMORIAL PATCH#2
0DA1 D9              EXX               ; BACK TO ALTERNATE SET
0DA2 4F              LD   C,A
0DA3 AF              XOR  A
0DA4 47              LD   B,A
0DA5 D1              POP  DE
0DA6                 SYSTEM FILL
0DA8 C1              POP  BC
0DA9 C9              RET


             ; NAME:          SHIFT UP
             ; INPUT:         A = DATA TO SHIFT UP
             ;                B = SIZE IN DIGITS
             ;                HL = AREA TO SHIFT ADDRESS
0DAA F5      MSHFTU: PUSH AF
0DAB 78              LD   A,B
0DAC 3C              INC  A
0DAD E63E            AND  3EH
0DAF 47              LD   B,A
0DB0 F1              POP  AF
0DB1 ED6F    SHFTU1: RLD
0DB3 23              INC  HL
0DB4 10FB            DJNZ SHFTU1-$
0DB6 C9              RET

0DB7 454E5445 ENTSTG: DEFM 'ENTER '
0DBD 00              DEFB 0
0DBE FA00    CML:    DEFW CALCL
0DC0 D30D            DEFW PNCM
0DC2 2813            DEFW CMSTRT       ; CHECKMATE START
0DC4 0000    SCRL:   DEFW 0
0DC6 F80D            DEFW PNSCB
0DC8 190E            DEFW SCRST
0DCA 47554E46 PNGI:  DEFM 'GUNFIGHT'
```

```
0DD2 00          DEFB 0
0DD3 43484543  PNCM:   DEFM 'CHECKMATE'
0DDC 00          DEFB 0
0DDD 43414C43  PNCALC: DEFM 'CALCULATOR'
0DE7 00          DEFB 0
0DE8 53435249  PNSCR:  DEFM 'SCRIBBLING'
0DF2 00          DEFB 0
0DF3 53454C45  GAMSTR: DEFM 'SELECT GAME'
0DFE 67          DEFB 67H
0DFF 08          DEFB 8
0E00 58          DEFB 88
0E01 0D          DEFB 1101B
0E02 28432920    DEFM '(C) BALLY MFG 1977'
0E14 00          DEFB 0
0E15             END

TOTAL ASSEMBLER ERRORS =    0
```

FITCH, EVEN, TABIN & LUEDEKA
135 S. La Salle St., Chicago, Ill. 60603
*File 36897*

```
Z-80 ASSEMBLER* HOME VIDEO GAME SYSTEM          PAGE   1
ADDR  OBJECT  STMT  LABEL   OPCD OPERAND       COMMENT

                            LIST S
                            ORG  1700H
                            JP   INIT

                    ; ***********************
                    ; * GUN FIGHT EQUATES *
                    ; ***********************
                    ; GUNFIGHT BACKGROUND JOB
                    ; CONSISTING OF INITIALIZATION, PRE-ROUND DISPLAY,
                    ; MONITORING OF CONTROLS AND VECTOR DELTA CHANGING
                    ; DEATH, POST ROUND STUFF AND END GAME

                    ;EQUATES
>0008               LNX     EQU  8          ; LEFT NUMBER X
>0002               BSY     EQU  2          ; BANNER STRINGS Y
>0088               RNX     EQU  136        ; RIGHT NUMBER X
>0020               LBULX   EQU  32         ; LEFT BULLETS X
>0068               RBULX   EQU  104        ; RIGHT " "
>004C               STMRX   EQU  76         ; SUB TIMER X
>002C               GRX     EQU  44         ; GET READY X
>0001               GRY     EQU  1          ; " Y
>0040               DRX     EQU  64         ; DRAW X
>0014               TCACY   EQU  20         ; TOP CACTUS Y
>000F               TTREEY  EQU  TCACY-5
>002A               MCACY   EQU  42         ; MID CACTUS Y
>0046               BCACY   EQU  70         ; BOTTOM CACTUS Y
>0041               BTREEY  EQU  BCACY-5
>0040               LCACX   EQU  64         ; LEFT CACTUS X
>0058               RCACX   EQU  88         ; RIGHT CACTUS X
>004C               CCACX   EQU  76         ; CENTER CACTUS X
>0048               WAGX    EQU  72         ; WAGON X
>0060               COWX    EQU  RCACX+8    ; OTHER COWBOYS WINDOW X
                    ;
>000A               TLINE   EQU  10         ; TOP LINE OF GUNSPACE
>0009               ALINE   EQU  TLINE-1
>005C               BLINE   EQU  92         ; BOTTOM LINE OF "
                    ;
>0012               BULVSZ  EQU  18         ; BULLET VECTOR SIZE
>0017               GFVSIZ  EQU  23
>0012               WAGVSZ  EQU  18         ; WAGON VECTOR SIZE
                    ;
>0032               WINBND  EQU  50         ; TOP-BOTTOM WINDOW BOUNDARY
```

```
0064        TOPLIN  EQU   53*2          ; TOP WINDOW LINE
0000        BOTLIN  EQU   00            ; BOTTOM WINDOW LINE
00C8        LFRLIN  EQU   100*2         ; LOW PRIORITY FOREGROUND LINE
            ;
FFFF        NEXT    EQU   -1            ; NEXT LINK FOR QUEUES
000F        VBARM   EQU   VBOAH+1       ; ARM STATE
0010        VBOARM  EQU   VBARM+1       ; LAST ARM PATTERN WRITTEN
0011        VBLEGT  EQU   VBOARM+1      ; LEG TIMER
0012        VBLEG   EQU   VBLEGT+1      ; LEG LINK
0013        VBCOMP  EQU   VBLEG+1       ; TIMER FOR COMPUTER CONTROL
            ; BITS
```

© BALLY MANUFACTURING CORPORATION 1977 APPENDIX B

```
0000        VBWAG   EQU   0             ; WAGON BIT
0003        VBCHG   EQU   3             ; CHANGE STATUS BIT
0004        VBNOM   EQU   4             ; NOT MOVING STATUS
0005        VBINT   EQU   5             ; INTERCEPTED/DEAD STATUS

            ; ***************
            ; * SUBROUTINES *
            ; ***************
            ; DISPLAY CLOCK AND UPDATE CT4
17E1 F3        DCLOCK  DI
17E2                   SYSSUK DECCTS
17E4 80                DEFB 10000000B
17E5 DD210D02          LD   IX,FNTSML
17E9 3ADC4F            LD   A,(CT7)
17EC B7                OR   A
17ED 2808              JR   Z,DCOUT-$
17EF                   SYSSUK DISNUM
17F1 40                DEFB STMRX
17F2 0?                DEFB BSY
17F3 0?                DEFB TIME
17F4 42                DEFB 42H
17F5 DC4F              DEFW CT7
17F7 AF        DCOUT   XOR  A
17F8 D30C              OUT  (MAGIC),A
17FA 32FFOF            LD   (URINAL),A
17FD FB                EI
17FE C9                RET
            ; FIRE BULLETS
            ; LEFT COWBOY
17FF           FIREO   SYSSUK SUCK
1801 DC                DEFB 11011100B
1802 ?14F              DEFW LCOWB
1804 D64F              DEFW LBULS
1806 1?4F              DEFW BULV1+1
1808 1809              JR   ZORE-$
180A           FIRE1   SYSSUK SUCK
180C DC                DEFB 11011100B
180D 704F              DEFW RCOWB
180F DE4F              DEFW RBULS
1811 ?44F              DEFW BULV3+1
1813 FD7E07    ZORE:   LD   A,(IY+CBB)
1816 B7                OR   A
1817 C8                RET  Z
1818 0A                LD   A,(BC)      ; GET BULIT COUNT
1819 B7                OR   A
181A C8                RET  Z
181B 7E                LD   A,(HL)      ; CHECK IF BULLET IS AVAILABLE
181C B7                OR   A
181D 2809              JR   Z,ZOK-$
181F 111200            LD   DE,BULVSZ   ; DELTA TO NEXT BULLET
1822 19                ADD  HL,DE
1823 7E                LD   A,(HL)
1824 B7                OR   A
18[illegible] [illegible]1            JR   Z,ZOK-$
18[illegible] [illegible]             RET
            ; [illegible] BULLET
```

```
                     ;         IX= COWBOY
                     ; SUB 1 FROM BULLET COUNT
1828 0A              ZOK     LD    A,(BC)
1829 3D                      DEC   A
182A 02                      LD    (BC),A
                     ; SET SUB TIMER IF OUT OF BULLETS
182B 200D                    JR    NZ,BERASE-$
182D 3A0C4F                  LD    A,(CT7)
1830 B7                      OR    A
1831 3E10                    LD    A,10H
1833 2802                    JR    Z,STSEC-$
1835 3E02                    LD    A,2
1837 320C4F          STSEC   LD    (CT7),A
183A E5              BERASE  PUSH HL
183B DDE5                    PUSH IX
183D 0A                      LD    A,(BC)
183E 6F                      LD    L,A
183F 2600                    LD    H,0
1841 29                      ADD   HL,HL
1842 29                      ADD   HL,HL       ;*4
1843 110802                  LD    DE,BSY*256+RBULX
1846 DDCB0076                BIT   MRFLOP,(IX+VBMR)
184A 3E40                    LD    A,40H       ; FLOPED MR
184C 2801                    JR    Z,RITB-$
184E AF                      XOR   A           ; NORMAL MR
                     ; NOW POSITION AND ERASE
184F 19              RITB    ADD   HL,DE
1850 EB                      EX    DE,HL
1851                         SYSTEM RELAB1
1853 EB                      EX    DE,HL
1854 0605                    LD    B,5
1856 112800                  LD    DE,40       ; INC TO NEXT LINE
1859 36FF            BELP    LD    (HL),0FFH   ;ERASE A LINE
185B 19                      ADD   HL,DE       ; GO DOWN A LINE
185C 10FB                    DJNZ BELP-$
185E 1600                    LD    D,0
1860 DD5E0F                  LD    E,(IX+VBARM) ; GET CURRENT ARM POS
1863 62                      LD    H,D
1864 6B                      LD    L,E
1865 29                      ADD   HL,HL       ;*2
1866 19                      ADD   HL,DE       ; *3
1867 11931D                  LD    DE,BULTAB
186A 19                      ADD   HL,DE       ; -> BULTAB(ARM)
186B EB                      EX    DE,HL
186C C1                      POP   BC          ; BC<==IX
186D E1                      POP   HL          ; BUL [STAT]
186E E5                      PUSH HL           ; SAVE FOR ACTIVATE
186F 23                      INC   HL          ; BUL [DEL TIME]
1870 3601                    LD    (HL),1      ; MAKE BULIT JUMP OUT
1872 23                      INC   HL          ; BUL [DEL XLOW]
1873 03                      INC   BC          ; COW [STAT]
1874 03                      INC   BC          ; COW [DEL TIME]
1875 03                      INC   BC          ; COW [DX LO]
1876 CDD319                  CALL PUTVEC
1879 03                      INC   BC          ; COW [XCHK]
187A 03                      INC   BC          ; COW [DY LO]
187B 23                      INC   HL          ; BUL [XCHK]
187C 3601                    LD    (HL),1      ; LIMIT CHECK
187E 23                      INC   HL          ; BUL [DY LO]
187F CDD319                  CALL PUTVEC
1882 E1                      POP   HL          ; BUL [STAT]
1883 3680                    LD    (HL),80H    ; ACTIVE
1885                         SYSSUK BMUSIC
1887 124F                    DEFW MSTACK
1889 01                      DEFB 00000001B    ; JUST NOISE
188A DB1F                    DEFW GUNSHOT
188C C9                      RET
                     ; TAKE A PISS BREAK
188D                 PISS:   DONT PIZBRK       ; SEE IF I CARE
188E                         DO    MRET
                     ; CONVERT JOYSTICKS
188F DD21614F        JOY0    LD    IX,LCOWB
1893 1804                    JR    PJOY-$
1895 DD21784F        JOY1    LD    IX,RCOWB
                     ;   CONVERT   JOYSTICKS
```

```
1899 DD4E00    PJOY:   LD    C,(IX+VBMR)
189C 110000            LD    DE,128
189F 210000            LD    HL,128
18A2                   SYSTEM MSKTD        ; COMPUTE DELTAS
18A4 DD7409    STHN    LD    (IX+VBDYH),H
18A7 DD7508            LD    (IX+VBDYL),L
18AA DD7204            LD    (IX+VBDXH),D
18AD DD7303            LD    (IX+VBDXL),E
18B0 C9                RET
18B1 DD21784F  PPOT1:  LD    IX,RCOWB
18B5 78                LD    A,B            ; POT MUST BE FLOPPED CUZ
18B6 2F                CPL                  ; ARM IS FLOPPED
18B7 1805              JR    PPOT-$
18B9 DD21614F  PPOTO:  LD    IX,LCOWB
18BD 78                LD    A,B
               ; CONVERT POT AND STORE
18BE E6F0      PPOT    AND   OEOH
18C0 0F                RRCA
18C1 0F                RRCA
18C2 0F                RRCA
18C3 0F                RRCA
18C4 FE0E              CP    OEH
18C6 2002              JR    NZ,KART-$
18C8 3E0C              LD    A,OCH          ; IF KNOB=7 THEN SET TO 6
18CA DD770F    KART    LD    (IX+VBARM),A ; SET ARM POSITION
18CD C9                RET
               ; CHECK IF BULLET HIT ANYTHING
18CF DD7E01    HITCHK: LD    A,(IX+VBSTAT)
18D1 E660              AND   060H
18D3 FE20              CP    20H            ; CHECK ONLY IF BLANKED
18D5 280F              JR    Z,HIT-$
18D7 D0                RET   NC             ; RETURN IF NOT BLANKED YET
18D8 DDCB075E          BIT   VBCLAT,(IX+VBXCHK)
18DC C8                RET   Z
18DD DD360100          LD    (IX+VBSTAT),0 ; BULLET HIT WALL
18E1 DD360701          LD    (IX+VBXCHK),1 ; SET LIMIT CHECK
18E5 C9                RET
18E6 DD7E06    HIT:    LD    A,(IX+VBXH)   ;CHECK WHAT PART OF SCR ITS IN
18E9 FE48              CP    WAGX
18EB 300E              JR    NC,HIT1-$
18ED DD360202          LD    (IX+VBTIMB),2 ;MAKE IT JUMP OUT
18F1 DD360180          LD    (IX+VBSTAT),80H ;RE ACTIVATE
18F5 218F1D            LD    HL,BULLMT
18F8                   SYSTEM VECT
18FA C9                RET
18FB DD360100  HIT1:   LD    (IY+VBSTAT),0 ; BULIT DIES FROM WAGON ON
18FF FE58              CP    RCACX
1901 301D              JR    NC,HIT2-$
1903 3A904F            LD    A,(WAGON)
1906 B7                OR    A              ; IS IT A CACTII?
1907 C0                RET   NZ             ; NOPE ITS A WAGON
1908 1E4C              LD    E,CCACX        ; LOAD X
               ; ERASE OBJECT BULLET HITS
190A DD560B    ERASE   LD    D,(IX+VBYH)   ; LOAD Y
190D 15                DEC   D
190F                   SYSSUK RELAB1
1910 00                DEFB  0
1911 EB                EX    DE,HL
1912 11D7FF            LD    DE,-41
1915 0600              LD    B,0
1917 7E        ELOP    LD    A,(HL)
1918 70                LD    (HL),B         ;ZERO THE SCREEN BYTE
1919 23                INC   HL
191A B6                OR    (HL)
191B 70                LD    (HL),B
191C 19                ADD   HL,DE
191D 20F8              JR    NZ,ELOP-$
191F C9                RET
1920 FE60      HIT2:   CP    RCACX+8        ; GUNFTR SAPCE
1922 300C              JR    NC,DIE-$
1924 1E40              LD    E,LCACX
1926 DDCB0076          BIT   MRFLOP,(IX+VBMR)
192A 20DE              JR    NZ,ERASE-$
192C 1E58              LD    E,RCACX
192E 18DA              JR    ERASE-$
```

```
1930 DDCB0076  DIE:    BIT  MRFLOP,(IX+VBMR) ; WHO DIED?
1934 280C              JR   Z,DLEFT-$
1936                   SYSSUK SUCK
1938 DD                DEFB 11011101B
1939 A14F              DEFW LCOWB
193B 08                DEFB 8
193C B11F              DEFW TAPS
193E A64F              DEFW RSCORE
1940 180A              JR   DIE1-$
1942           DLEFT   SYSSUK SUCK
1944 DD                DEFB 11011101B
1945 784F              DEFW RCOWB
1947 64                DEFB 100
1948 C11F              DEFW FUNERL
194A A74F              DEFW LSCORE
194C DD361106  DIE1:   LD   (IX+VBLEGT),6 ; SET FIRST CELL TIME
1950 DD361284          LD   (IX+VBLEG),KIL1.AND.OFFH ;??
1954 DD360168          LD   (IX+VBSTAT),068H ; KILL THE SOB
1958 DD7E0B            LD   A,(IX+VBYH)   ;  WHERE TO WRITE GOT ME
195B D608              SUB  8
195D [illegible]       CP   ILINE+9
195F 3002              JR   NC,DIE4-$
1961 C620              ADD  A,32
1963 57        DIE4    LD   D,A            ; LOAD Y
1964                   SYSTEM INCSCR
1966 2B                DEC  HL
1967 7E                LD   A,(HL)         ; FIELD
1968 FE05              CP   5              ; INC IF LESS THAN 5
196A CE00              ADC  A,0
196C 77                LD   (HL),A
               ; PLAY DEATH SONG
196D 60                LD   H,B
196E 69                LD   L,C
196F DD21124F          LD   IX,MSTACK
1973 3EC0              LD   A,11000000B
1975                   SYSTEM BMUSIC
1977 0E0C              LD   C,LARG2
1979 21061F            LD   HL,GOTME
197C F3                DI
197D                   SYSTEM STRDIS
197F                   SYSSUK PAWS
1981 FA                DEFB 250
1982 3E01              LD   A,1
1984 32DE4F            LD   (SEMI4S),A    ; SET FLAGO
1987 C9                RET
               ; FIELD PUTS UP THE CACTII APPROP TO SCORE
               ; A=SCORE OF OPP PLAYER UPTO 6
               ; BC -> ARRAY OF Y POSITIONS
1988 21F81E    FIELD:  LD   HL,CACTUS      ; -> CACTUS PATTERN
198B F5                PUSH AF
198C 3E08              LD   A,1000B
198E D319              OUT  (XPAND),A
1990 F1                POP  AF
1991 FE01              CP   1
1993 D8                RET  C
1994 FE04              CP   4
1996 3003              JR   NC,TCAC-$
1998 CDC819            CALL CACW
199B 03        TCAC    INC  BC
199C FE02              CP   2
199E D8                RET  C
199F FE05              CP   5
19A1 3003              JR   NC,MCAC-$
19A3 CDC819            CALL CACW
19A6 FE03      MCAC    CP   3
19A8 D8                RET  C
19A9 03                INC  BC
19AA 08                EX   AF,AF'
19AB 3E81              LD   A,81H          ; ACTIVATE WAGON
19AD [illegible]04F    LD   (WAGON),A
19B0 08                EX   AF,AF'
19B1 CDC819            CALL CACW
19B4 FE04              CP   4
19B6 D8                RET  C
19B7 03                INC  BC
```

```
19B8 21??1D              LD   HL,TREE
19BB F5                  PUSH AF
19BC 3E0C                LD   A,1100B
19BE D319                OUT  (XPAND),A
19C0 F1                  POP  AF
19C1 CDC819              CALL CACW
19C4 FE05                CP   5
19C6 D8                  RET  C
19C7 03                  INC  BC
19C8 F5         CACW:    PUSH AF
19C9 D5                  PUSH DE
19CA 0A                  LD   A,(BC)
19CB 57                  LD   D,A
19CC 3E08                LD   A,8          ; EXPANDOMATIC
19CE                     SYSTEM WRITP
19D0 D1                  POP  DE
19D1 F1                  POP  AF
19D2 C9                  RET
                ; PUT DEL X,Y INTO BULLET VECTORS
19D3 1A         PUTVEC   LD   A,(DE)       ; TABLE [D LO]
19D4 77                  LD   (HL),A       ; BUL [D LO]
19D5 13                  INC  DE           ; TAB [D HI]
19D6 03                  INC  BC           ; COW [D HI]
19D7 23                  INC  HL           ; BUL [D HI]
19D8 1A                  LD   A,(DE)
19D9 77                  LD   (HL),A
19DA 23                  INC  HL           ; BUL [LO]
19DB 13                  INC  DE           ; TAB [HI]
19DC 03                  INC  BC           ; COW [LO]
19DD 3600                LD   (HL),0
19DF 03                  INC  BC           ; COW [HI]
19E0 23                  INC  HL           ; BUL [HI]
19E1 0A                  LD   A,(BC)
19E2 EB                  EX   DE,HL
19E3 86                  ADD  A,(HL)
19E4 EB                  EX   DE,HL
19E5 77                  LD   (HL),A       ; BUL [HI]=COW [HI]+TAB [HI]
19E6 13                  INC  DE           ; TAB [D HI]
19E7 C9                  RET
                ; GUNFIGHT START UP ROUTINE (ONCE PER GAME)
19E8            INIT     SYSSUK GETPAR
19EA 1F0?                DEFW MXSCR
19EC 84                  DEFB 84H
19ED F41F                DEFW ENDSCR
19EF 31064F              LD   SP,STACK
19F2                     SYSTEM INTPC
19F4                     DO   FILL
19F5 064F                DEFW STACK
19F7 D600                DEFW CT7-STACK
19F9 00                  DEFB 0
19FA                     DO   SETB
19FB 02                  DEFB 2**GSBSCR
19FC F84F                DEFW GAMSTB
19FE                     DO   SETOUT       ; SET UP GAME PORTS
19FF B8                  DEFB BLINE*2      ; BOTTOM LINE - VERT BLK
1A00 D6                  DEFB RCACX/4+0C0H ; HORZ BOUNDS
1A01 08                  DEFB 8            ; INMOD
1A02                     DO   COLSET
1A03 C?1D                DEFW GFCOLS
1A05                     DO   BMUSIC       ; PLAY STREETS OF LOR
1A06 ??1F                DEFW MSTACK
1A08 C0                  DEFB 11000000B    ; ON VOICE A
1A09 ??1F                DEFW HOME
1A0B                     EXIT
                ; *****
                ; ONCE A ROUND START UP ROUTINE
                ; *****
1A0C F3         STRND:   DI
1A0D                     SYSTEM INTPC
                ; INIT HANDLES,BULLETS,TIMERS
1A0F                     DO   MOVE
1A10 DA1F                DEFW CT5
1A12 0C00                DEFW 12
1A14 CE1D                DEFW SINIT
                ; COLOR BANNER
1A16                     FILL? NORMEM,BYTEPL*ALINE,0FFH
```

```
                ; ERASE SCREEN
1A1C                    FILL? NORMEM+BYTEPL*ALINE,BYTEPL*(BLINE-ALINE),0
                ; RESET VECTORS
1A22                    FILL? STRRAM,ENDRAM-STRRAM,0
                ; SHOW SCORES
1A28                    DO    SUCK
1A29 10                 DEFB 00010000B      ; IX
1A2A 0002               DEFW FNTSML
1A2C                    DO    DISNUM
1A2D 08                 DEFB LNX
1A2E 07                 DEFB BSY
1A2F 0B                 DEFB TIME
1A30 C4                 DEFB OC4H           ;ZERO SUPRS,SMALL
1A31 A24F               DEFW LSCORE
1A33                    DO    DISNUM
1A34 88                 DEFB RNX
1A35 07                 DEFB BSY
1A36 0B                 DEFB TIME
1A37 C4                 DEFB OC4H
1A38 A44F               DEFW RSCORE
                ; CHECK FOR END GAME
1A3A                    DO    RCALL
1A3B 301B               DEFW ENDGAM
1A3D                    TEXT GETRDY,GRX,GRY,LARGE
1A43                    EXIT
1A44 AF                 XOR   A             ; SET UP WAGON
1A45 32904F             LD    (WAGON),A     ; STOP WAGON
                ; PUT UP PLAY FIELD:
1A48 3AA14F             LD    A,(RFIELD)    ; NUMBER OF CACTII
1A4B 1E58               LD    E,RCACX       ; RIGHT CAC COLUMN
1A4D 01C21D             LD    BC,RFTAB      ; POSITIONS TABLE FOR CACTII
1A50 CD8819             CALL FIELD          ; PUT THE CACTII UP
1A53 3AA54F             LD    A,(LFIELD)
1A56 1E40               LD    E,LCACX
1A58 01BD1D             LD    BC,LFTAB
1A5B CD8819             CALL FIELD
                ; INITIALIZE Q POINTERS
1A5E 3E4F       INITQ   LD    A,LCOWB.SHR.8
1A60 32144F             LD    (WRITQ+2),A
1A63 32174F             LD    (VECQ+2),A
                ; SET UP VECTORS SO COWBOYS WALK OUT
1A66 DD21614F           LD    IX,LCOWB      ; LEFT COMBOY VECTOR
1A6A DD360010           LD    (IX+VBMR),10H
1A6E 21154F             LD    HL,VECQ
1A71 CD341D             CALL COWINT
1A74 DD21784F           LD    IX,RCOWB      ; RIGHT COWBOY VECTOR
1A78 DD360050           LD    (IX+VBMR),50H
1A7C CD341D             CALL COWINT
1A7F 3A904F             LD    A,(WAGON)     ; IF WAGON IS ON
1A82 B7                 OR    A
1A83 281D               JR    Z,MIDC-$
1A85 DD218F4F           LD    IX,WAGVEC     ; THEN ACTIVATE WAGON
1A89 DD360010           LD    (IX+VBMR),10H
1A8D DD360C03           LD    (IX+VBYCHK),3
1A91 DD360840           LD    (IX+VBDYL),40H
1A95 DD360648           LD    (IX+VBXH),72
1A99 DD360B0A           LD    (IX+VBYH),TLINE
1A9D CD541D             CALL ADDTQ
1AA0 180B               JR    BORG-$
1AA2 3E08       MIDC:   LD    A,8
1AA4 D319               OUT   (XPAND),A
1AA6                    SYSSUK WRITP        ; ELSE PUT UP A CACTUS
1AA8 4C                 DEFB CCACX
1AA9 2A                 DEFB MCACY
1AAA 08                 DEFB 8              ; EXPAND
1AAB F81E               DEFW CACTUS
                ; INITIALIZE BULLET VECTORS
1AAD 111700     BORG:   LD    DE,BULVSZ
1AB0 DD21184F           LD    IX,BULV1
1AB4 012004             LD    BC,4*256+20H
1AB7 3E02               LD    A,2
1AB9 B8         BULLP   CP    B
1ABA 2002               JR    NZ,TIYU-$
1ABC 0E60               LD    C,60H
1ABE DD7100     TIYU    LD    (IX+VBMR),C
1AC1 DD360701           LD    (IX+VBXCHK),1
```

```
1AC5 DD360C03          LD    (IX+VBYCHK),3
1AC9 DD19              ADD   IX,DE
1ACB 10E0              DJNZ  BULLP $
                ; FIRE UP INTERRUPTS
1ACD 3E1D              LD    A,INTTBL.SHR.8
1ACF ED47              LD    I,A
                ;      IM      2          ;DONE IN MENU
1AD1 3E78              LD    A,LFRVEC.AND.0FFH
1AD3 D30D              OUT   (INFBK),A
                ; ***
                ; LET COWBOYS WALK OUT
                ; ***
1AD5            WALK:  SYSSUK PAWS
1AD7 64                DEFB 100
1AD8 F3                DI
1AD9 DD210D02          LD    IX,FNTSML
1ADD                   SYSTEM INTPC
                ; ERASE GET READY
1ADF                   DO    BLANK
1AE0 12                DEFB 18
1AE1 08                DEFB 8
1AE2 FF                DEFB 0FFH
0 1AE3 00000000        XYDEFW (GRX/4)+4000H,GRY
1AE7                   TEXT DRAW,DRX,GRY,LARGE
1AED                   DO    CHRDIS
1AEE 24                DEFB LBULX
1AEF 02                DEFB BSY
1AF0 0E                DEFB BULT
1AF1 BB                DEFB 0BBH         ; BULLET
1AF2                   DO    MCALL        ; 5 MORE
1AF3 5D1B              DEFW BULRIT
1AF5                   DO    SUCK
1AF6 01                DEFB 00000001B
1AF7 22                DEFB RBULX         ; DO THE RIGHT ONES
1AF8                   DONT CHRDIS        ; DISPLAY FIRST ONE
1AF9                   DO    MCALL        ; DISP THE OTHER 5
1AFA 5D1B              DEFW BULRIT
1AFC                   DO    PAWS
1AFD 3C                DEFB 60
1AFE                   DO    BLANK
1AFF 08                DEFB 8
1B00 08                DEFB 8
1B01 FF                DEFB 0FFH
0 1B02 00000000        XYDEFW (DRX/4)+4000H,GRY
1B06                   EXIT
                ; *****
                ; MAIN LOOP DURING ROUND
                ; GETS HANDLES, SETS VECTORS AND CHECKS BULLETS
1B07            LOOP:  SYSTEM INTPC
1B09                   DO    SENTRY
1B0A 1402              DEFW ALKEYS
1B0C                   DO    DOIT
1B0D 381B              DEFW DTAB
1B0F                   EXIT

                ; CHECK FOR DEATHS
1B10 DD21184F   DEATH  LD    IX,BULV1
1B14 111200            LD    DE,BULVSZ
1B17 0604              LD    B,4
1B19 C5         LPPP2  PUSH  BC
1B1A D5                PUSH  DE
1B1B CDCE18            CALL  HITCHK
1B1E D1                POP   DE
1B1F C1                POP   BC
1B20 DD19              ADD   IX,DE
1B22 3A0E4F            LD    A,(SEMI4S)    ; CHECK IF DEATH MODE
1B25 3D                DEC   A
1B26 28DF              JR    Z,LOOP-$
1B28 10EF              DJNZ  LPPP2-$
1B2A 18DB              JR    LOOP-$
                ;
1B2C            ENDRND EXIT
1B2D C3D01A            JP    STRND
                ;
```

```
1B30 3A004F      ENDGAM: LD    A,(GAMSTB)
1B33 CB7F                BIT   GSBEND,A
1B35 C8                  RET   Z
1B36                     SYSTEM QUIT

1B38             DTAB:   JMP   SCT7,ENDRND
1B3B                     JMP   SFO,ENDRND
1B3E                     RC    SPO,PPOTO
1B41                     RC    SP1,PPOT1
1B44                     RC    SJ0,JOYO
1B47                     RC    SJ1,JOY1
1B4A                     MC    SKYD,PISS
1B4D                     RC    STO,FIREO
1B50                     RC    ST1,FIRE1
1B53                     RC    SSEC,DCLOCK,+END

1B57             BULRIT  DONT CHRDIS
1B58                     DONT CHRDIS
1B59                     DONT CHRDIS
1B5A                     DONT CHRDIS
1B5B                     DONT CHRDIS
1B5C                     DONT MRET

                 ; ***********************************
                 ; * GUNFIGHT WRITE INTERRUPT ROUTINE *
                 ; ***********************************
1B5D 08          GFWRIT: EX    AF,AF'
1B5E D9                  EXX
1B5F DDE5                PUSH IX
1B61 3E78        BEGINT: LD    A,LFRVEC.AND.OFFH ;  ESTABLISH TICKS INT
1B63 D30D                OUT   (INFBK),A
1B65 3EC8                LD    A,LFRLIN
1B67 D30F                OUT   (INLIN),A
1B69 21124F              LD    HL,WRITQ        ; GET FIRST WRITE Q ENTRY
1B6C CD6B1D              CALL  FIRST
1B6F CD791D              CALL  DELQ            ; DROP FROM WRITE Q
1B72 AF                  XOR   A
1B73 32EF0F              LD    (URINAL),A
1B76 DDCB0146            BIT   VBSWAG,(IX+VBSTAT) ; WAGON?
1B7A 2018                JR    NZ,GFWRT1-$   ; JUMP IF YEP
                 ; GUNFIGHTER - BLANKETH HIM
1B7C 110514              LD    DE,1405H       ; LOAD BLANKING PARMS
1B7F                     SYSTEM VBLANK        ; CALL BLANKER
1B81 261F                LD    H,LEGO.SHR.8 ; WRITE LEG PATTERN
1B83 DD6E12              LD    L,(IX+VBLEG)
1B86 2C                  INC   L              ; SKIP OVER LINK AND TIME
1B87 2C                  INC   L
1B88                     SYSTEM VWRITR        ; AND WRITE LEG
                 ; IS GUNFIGHTER DEAD?
1B8A DDCB016E            BIT   VBSINT,(IX+VBSTAT)
1B8F 2030                JR    NZ,GFWRT5-$   ; JUMP IF SO
1B90 21DB1D              LD    HL,ARMTBL      ; LOOKUP ARM PATTERN
1B93 1600                LD    D,0
1B95 DD5E0F              LD    E,(IX+VBARM)
1B98 19                  ADD   HL,DE
1B99 5E                  LD    E,(HL)
1B9A 23                  INC   HL
1B9B 56                  LD    D,(HL)
1B9C EB                  EX    DE,HL
1B9D                     SYSTEM VWRITR        ; WRITE ARM PATTERN
1B9F 21101F              LD    HL,GFBODY      ; LOAD BODY PATTERN
1BA2 18                  JR    GFWRT2-$       ; JOIN WAGON WRITE
                 ; BLANK THE WAGON
1BA4 110416      GFWRT1: LD    DE,1604H       ; LOAD WAGON SIZE
1BA7                     SYSTEM VBLANK
1BA9 21401F              LD    HL,WAGPAT
```

```
1BAC                GFWRT2: SYSTEM VWRITR      ; NOW WRITE
1BAF DD720E         GFWRT4: LD    (IX+VBOAH),D
1BB1 DD730D                 LD    (IX+VBOAL),E
1BB4 21154F         GFWRT3: LD    HL,VECQ      ; ADD VECTOR TO VECTOR Q
1BB7 CD          CALL  ADDTQ
1BBA DDE1                   POP   IX
1BBC 08                     EX    AF,AF'
1BBD D9                     EXX
1BBE FB             EIRE    EI
1BBF C9                     RET
1BC0 21001F         GFWRT5: LD    HL,NULPAT
1BC3 18E7                   JR    GFWRT2-$
                    ; ***********************************
                    ; * GUNFIGHT LOW FOREGROUND ROUTINE *
                    ; ***********************************
1BC5 F5             GFLFR:  PUSH  AF
1BC6 C5                     PUSH  BC
1BC7 D5                     PUSH  DE
1BC8 E5                     PUSH  HL
1BC9 DDE5                   PUSH  IX
                    ; BUMP TIME BASES OF ACTIVE OR INTERCEPTED VECTORS
1BCB 21  4F                 LD    HL,BULV1+VBSTAT
1BCE 111100                 LD    DE,BULVSZ-1
1BD1 0604                   LD    B,4
1BD3 CD  1D                 CALL  TBUMP
1BD6 23                     INC   HL           ; SKIP LINK FIELD
1BD7 11  00                 LD    DE,GFVSIZ-1
1BDA 0603                   LD    B,3
1BDC CD  1D                 CALL  TBUMP
                    ; LOOP TO UNWRITE, THEN WRITE ALL 4 BULLETS
                    ; BUT FIRST, A WORD TO OUR SHIFTER
1BDF AF                     XOR   A
1BE0 32  4F                 LD    (URINAL),A
1BE3 0604                   LD    B,4
1BE5 DD21184F               LD    IX,BULV1
                    ; UNWRITE THIS GUY?
1BE9 DDCB0176       WRBUL1: BIT   VBBLNK,(IX+VBSTAT)
1BED 28                     JR    Z,WRBUL2-$   ; JUMP IF NOT
1BEF DD660E                 LD    H,(IX+VBOAH)
1BF2 DD6E0D                 LD    L,(IX+VBOAL)
1BF5 DD7E0F                 LD    A,(IX+VBARM) ; GET LAST MR
1BF8 D30C                   OUT   (MAGIC),A
1BFA 36C0                   LD    (HL),0C0H    ; UNWRITE BULLET
1BFC DDCB01B6               RES   VBBLNK,(IX+VBSTAT) ; CLEAR BLANK BIT
                    ; SHALL WE WRITE THIS GUY?
1C00 DDCB017E       WRBUL2: BIT   VBSACT,(IX+VBSTAT)
1C04 28                     JR    Z,WRBUL4-$
1C06 DD560B                 LD    D,(IX+VBYH)
1C09 DD5E06                 LD    E,(IX+VBXH)
1C0C DD7E0C                 LD    A,(IX+VBMR)
1C0F                        SYSTEM RELABS
1C11 DD720E                 LD    (IX+VBOAH),D
1C14 DD730D                 LD    (IX+VBOAL),E
1C17 DD770F                 LD    (IX+VBARM),A
1C1A 21  40                 LD    HL,NORMEM-SCREEN
1C1D 19                     ADD   HL,DE
24FFF               DIFER   EQU   URINAL-SCREEN+NORMEM
1C1E 7E                     LD    A,(HL)
1C1F EB                     EX    DE,HL
1C20 36C0                   LD    (HL),0C0H
1C22 B7                     OR    A
1C23 28                     JR    Z,WRBUL3-$   ; JUMP IF NOT
1C25 DDCB01BE               RES   VBSACT,(IX+VBSTAT) ; KILL ACTIVE BIT
1C29 DDCB01EE               SET   VBSINT,(IX+VBSTAT) ; SET INTERCEPT BIT
1C2D DDCB01F6       WRBUL3: SET   VBBLNK,(IX+VBSTAT) ; SET BLANK BIT
                    ; STEP TO NEXT BULLET VECTOR, LOOP BACK IF NOT DONE
1C31 111200         WRBUL4: LD    DE,BULVSZ
1C34 DD19                   ADD   IX,DE
1C36 10B1                   DJNZ  WRBUL1-$
                    ; GET NEXT PATTERN TO WRITE, AND SCHEDULE HIM
1C38 21124F                 LD    HL,WRITQ
1C3B CD  1D                 CALL  FIRST
1C3E 2812                   JR    Z,WRBL5A-$   ; JUMP IF EMPTY Q
1C40 3E7A                   LD    A,WRTVEC.AND.0FFH ; SET FEEDBACK REG
1C42 D30D                   OUT   (INFBK),A
```

```
1C44 DD7E0B              LD   A,(IX+VBYH)   ; WHICH WINDOW TO USE?
1C47 FE[illegible]       CP   WINBND        ; COMPARE TO WINDOW BOUNDARY
1C49 [illegible]         LD   A,BOTLIN      ; ASSUME BOTTOM LINE
1C4B [illegible]         JR   NC,WRBUL5-$   ; JUMP IF GOOD GUESS
1C4D [illegible]         LD   A,TOPLIN      ; WRONG - USE TOP
1C4F [illegible]  WRBUL5: OUT (INLIN),A     ; SET LINE REGISTER
1C51 [illegible]         EI
                  ; LOOP THRU VECTORING THOSE DAMN BULLETS
1C5[illegible] [illegible]184F WRBL5A LD IX,BULV1
1C5[illegible] [illegible]     LD   B,4
1C5[illegible] [illegible]1D   LD   HL,BULLMT     ; HL = BULLET LIMITS TABLE
1C5[illegible] [illegible]     LD   DE,BULVSZ
1C5[illegible] [illegible]017E WRBUL6: BIT VBSACT,(IX+VBSTAT) ; ACTIVE BULLET?
1C6[illegible] [illegible]     JR   Z,WRBUL7-$
1C6[illegible]                 SYSTEM VECT
1C6[illegible] [illegible]075F BIT  VBCLAT,(IX+VBXCHK) ; DID Y HIT EDGE?
1C6[illegible] [illegible]     JR   Z,WRBUL7-$    ; NOPE
1C6[illegible] [illegible]01BE RES  VBSACT,(IX+VBSTAT) ; DEACTIVATE BULLET
1C7[illegible] [illegible] WRBUL7: ADD IX,DE
1C7[illegible] [illegible]     DJNZ WRBUL6-$      ; LOOP BACK
                  ; NOW PUT SOMETHING ON THE WRITE Q
1C7[illegible] [illegible]     LD   B,2           ; MAX 2 TIMES THRU
1C7[illegible] [illegible]4F   LD   HL,VECQ
1C7[illegible] [illegible]1D GVECT: CALL FIRST    ; GET VECTOR Q ENTRY
1C7[illegible] [illegible]1C   JP   Z,GVECT4      ; JUMP IF Q EMPTY
1C7[illegible] [illegible]1D   CALL DELQ          ; DROP FROM VECTOR Q
1C8[illegible] [illegible]     EI
                  ; WAGON?
1C8[illegible] [illegible]0146 BIT VBSWAG,(IX+VBSTAT)
1C8[illegible] [illegible]1D   JP   NZ,GVECT5     ; JUMP ON WAGON
                  ; DEAD?
1C8[illegible] [illegible]016E BIT VBSINT,(IX+VBSTAT)
1C8[illegible] [illegible]     JR   NZ,GVECT1-$   ; JUMP IF DEAD
                  ; ZERO VELOCITY?
1C9[illegible] [illegible]     LD   A,(IX+VBDXL)
1C9[illegible] [illegible]04   OR   (IX+VBDXH)
1C9[illegible] [illegible]     OR   (IX+VBDYL)
1C9[illegible] [illegible]     OR   (IX+VBDYH)
1C9[illegible] [illegible]17   JR   NZ,GVECT1-$   ; GVECT1 IF NONZERO
1C9F DD[illegible]07           LD   (IX+VBTIMB),A ; ZERO TIME BASE
1CA1 DD[illegible]0166         BIT  VBSNOM,(IX+VBSTAT) ; ALREADY STATIONARY?
1CA[illegible] [illegible]     JR   NZ,GVEC3A-$
                  ; SET STATIONARY LEGS
1CA[illegible] [illegible]34F  LD   (IX+VBLEG),LEGO.AND.OFFH
1CA[illegible] [illegible]01DE SET  VBSCHG,(IX+VBSTAT) ; SET CHANGED
1CA[illegible] [illegible]01E6 SET  VBSNOM,(IX+VBSTAT) ;AND STATIONARY
1CB[illegible] [illegible]     JR   GVEC3A-$      ; JUMP TO ARM CHECK
                  ; MOVING GUNFIGHTER
                  ; VECTOR
1CB5 21[illegible]71D GVECT1: LD HL,GUNLMT        ; LOAD GF LIMITS
1CB8                           SYSTEM VECT
1CBA [illegible]               JR   Z,GVECT2-$    ; JUMP IF HE DIDN'T MOVE
1CB[illegible] DD[illegible]01DE SET VBSCHG,(IX+VBSTAT) ; SET CHANGED BIT
1CC[illegible] DD[illegible]01A6 RES VBSNOM,(IX+VBSTAT) ; CLEAR NOT MOVING STATUS
                  ; NEED WE GO TO NEXT CELL IN ANIMATION SEQUENCE?
1CC4 DD7E11      GVECT2: LD   A,(IX+VBLEGT) ; A = ANIMATION TIMER
1CC7 91                  SUB  C             ; SUBTRACT TIME BASE
1CC8 F[illegible]DA1C    JP   P,GVECT3      ; JUMP IF NOT COUNTED DOWN
                  ; GET NEXT CELL
1CCB DD[illegible]12           LD   E,(IX+VBLEG) ; GET LINK
1CCE [illegible]               LD   D,LEGO.SHR.8 ; SET H.O. PART
1CD0 [illegible]               LD   A,(DE)      ; A = NEXT
1CD1 DD[illegible]12           LD   (IX+VBLEG),A
1CD[illegible] [illegible]     INC  DE          ; STEP TO TIMER
1CD[illegible] [illegible]     LD   A,(DE)      ; GET NEW TIMER
1CD[illegible] [illegible]01DE SET  VBSCHG,(IX+VBSTAT) ; SET CHANGED BIT
1CD[illegible] [illegible]11 GVECT3: LD (IX+VBLEGT),A ; STORE BACK TIMER
                  ; DID ARM CHANGE?
1CD[illegible] [illegible] GVEC3A: LD A,(IX+VBARM)
1CE[illegible] [illegible]10   CP   (IX+VBOARM)   ; COMPARE TO OLD ARM
1CE[illegible] [illegible]     JR   Z,GVEC3B-$    ; JUMP IF NO CHANGE
1CE5 DD[illegible]01DE         SET  VBSCHG,(IX+VBSTAT) ; SET CHANGED BIT
1CE[illegible] [illegible]10   LD   (IX+VBOARM),A
                  ; ADD ITEM TO WRITE Q?
1CE[illegible] DD[illegible]015E GVEC3B: BIT VBSCHG,(IX+VBSTAT)
```

```
         JR    NZ,GVECT6-$   ; YES GVECT6
; NO CHANGE - LINK TO VECTOR Q
         LD    HL,VECQ
         CALL  ADDTQ
         DEC   B
         JP    NZ,GVECT      ; SUB FOR DJNZ
GVECT4:  EI
         CALL  STIMER
         POP   IX
         POP   HL
         POP   DE
         POP   BC
         POP   AF
         RET
; VECTOR AND Q WAGON
GVECT5:  LD    HL,WAGLMT
         SYSTEM VECT
         LD    HL,VECQ
         CALL  DELQ          ; REMOVE FROM VECTOR Q
GVECT6:  RES   VBSCHG,(IX+VBSTAT)
         LD    HL,WRITQ
         CALL  ADDTQ
         JR    GVECT4-$      ; JUMP BACK TO QUIT
; ROUTINE TO BUMP TIME BASES OF VECTORS
TBUMP:   LD    A,(HL)        ; GET STATUS
         INC   HL
         AND   0A0H          ; ACTIVE OR INTERCEPTED?
         JR    Z,TBUMP1-$    ; NO - TBUMP1
         INC   (HL)          ; BUMP THE TIME BASE
TBUMP1:  ADD   HL,DE
         DJNZ  TBUMP-$
         RET
; SUBROUTINE TO DELETE ENTRY AT FRONT OF Q
; ENTRY:         HL = HEAD-TAIL, IX = OBJECT, A = CLOBBERE
DELQ:    DI
         LD    A,(IX+NEXT)   ; HEAD = NEXT(OBJECT)
         LD    (HL),A
         AND   A             ; IS HEAD NOW NIL?
         RET   NZ            ; QUIT IF NOT
         INC   HL            ; YES - SET TAIL = NIL TOO
         LD    (HL),A
         DEC   HL
         RET
COWINT:  LD    (IX+VBDXL),50 ; SLOW WALK OUT
         LD    (IX+VBSTAT),80H ; ACTIVATE
         LD    (IX+VBXCHK),1
         LD    (IX+VBYCHK),1
         LD    (IX+VBXH),4
         LD    (IX+VBYH),40
         LD    (IX+VBARM),6 ; SET ARM STRAIGHT
         LD    (IX+VBLEG),LEGO.AND.OFFH
;        JP       ADDTQ
; SUBROUTINE TO APPEND ENTRY TO END OF Q
; ENTRY:          HL = HEAD-TAIL BYTES, IX = OBJECT, A,DE C
ADDTQ:   PUSH  IX            ; DE = ENTRY
         POP   DE
         DI
         LD    (IX+NEXT),0   ; NEXT(OBJ)=NIL
         INC   HL
         LD    A,(HL)        ; A = OLD TAIL
         LD    (HL),E        ; SET TAIL = .OBJ
         AND   A             ; WAS OLD TAIL NIL?
         JR    Z,ADDTQ1-$    ; JUMP IF SO
; NONNIL OLD TAIL, SET NEXT(OLDTAIL)=.OBJ
         LD    E,A           ; DE = .NEXT(OLDTAIL)
         LD    A,(HL)        ; A = .OBJ (FROM NEW TAIL)
         DEC   HL
         DEC   DE
         LD    (DE),A
         RET
; NIL OLD TAIL CASE
ADDTQ1:  DEC   HL            ; BACKUP TO HEAD
         LD    (HL),E        ; HEAD = .OBJ
         RET
; SUBROUTINE TO POINT IX AT FIRST ENTRY ON A Q
```

```
                  ; ENTRY:          HL = Q HEAD-TAIL
                  ; EXIT:           IX,DE = OBJECT, A = L.O. BYTE OF OBJECT
                  ;                 NONZERO STATUS SET IF Q NOT EMPTY
1D6A              FIRST:  DI
1D6B                      LD   E,(HL)
1D6C                      INC  HL
1D6D                      INC  HL
1D6E                      LD   D,(HL)       ; D = H.O. ADDR. BYTE
1D6F                      DEC  HL
1D70                      DEC  HL
1D71                      LD   A,E          ; E = HEAD OF Q
1D72 A7                   AND  A
1D74 D5                   PUSH DE
1D75 DDE1                 POP  IX
1D77 C9                   RET

                  ; **********************
                  ; * GUNFIGHT CONSTANTS *
                  ; **********************
                          ORG  ($+1).AND.0FFFEH
1D78              INTTBL:
1D78              LFRVEC: DEFW GFLFR
1D7A              WRTVEC: DEFW GFWRIT
                  ; WAGON LIMITS TABLE
1D7C              WAGLMT: DEFB TLINE
1D7D                      DEFB BLINE-24
1D7E              GETRDY: DEFM 'GET READY'
                  ; GUNFIGHTER LIMITS
1D87              GUNLMT: DEFB 0
1D88                      DEFB LCACX-17
1D89                      DEFB TLINE
1D8A                      DEFB BLINE-20
1D8B 44524157     DRAW:   DEFM 'DRAW'
                  ; BULLET LIMITS
1D8F              BULLMT  DEFB 0
1D90                      DEFB 159
1D91                      DEFB ALINE
1D92                      DEFB BLINE-1
                  BN      MACR #DX,#ARMX,#DY,#ARMY
                          DEFW #DX
                          DEFB #ARMX
                          DEFW #DY
                          DEFB #ARMY
                          ENDM
1D93              BULTAB  BN   768,15,768,15
1D99                      BN   1024,15,512,12
1D9F                      BN   1024,15,256,11
1DA5                      BN   1024,15,0,8
1DAB                      BN   1024,15,-256,6
1DB1                      BN   1024,15,-512,4
1DB7                      BN   768,15,-768,3
1DBD              LFTAB:  DEFS 72,22,44,67,14
1DC2              RFTAB:  DEFS 18,68,40,13,63
1DC7              GFCOLS: DEFB 9DH
1DC8                      DEFB 76H
1DC9                      DEFB 0FCH
1DCA                      DEFB 87H
1DCB                      DEFB 9DH
1DCC                      DEFB 76H
1DCD                      DEFB 6CH
1DCE                      DEFB 87H
1DCF              SINIT.  DEFS 6,6,0,0,0,30H,30H,0
1DD7                      DEFS 0,80H,0FH,0FH
>0007             NUMB:   EQU  00000111B    ; COLOR MASK
>000B             BULT    EQU  00001011B
>000B             TIME    EQU  00001011B
>000B             LARGE:  EQU  00001011B
>000C             LARG2   EQU  00001100B

                  ; **********************
                  ; * GUN FIGHT PATTERNS *
                  ; **********************
                  ;
```

```
                 ; PATTERN TABLES:
1DDB     ARMTBL: DEFW ARM0
1DDD             DEFW ARM1
1DDF             DEFW ARM2
1DE1             DEFW ARM3
1DE3             DEFW ARM4
1DE5             DEFW ARM5
1DE7             DEFW ARM6
                 ; PATTERN DEFINITION MACROS
         DEF02   MACR #A,#B
                 DEFB 0#AH
                 DEFB 0#BH
                 ENDM
         DEF03   MACR #A,#B,#C
                 DEFB 0#AH
                 DEFB 0#BH
                 DEFB 0#CH
                 ENDM
         DEF04   MACR #A,#B,#C,#D
                 DEFB 0#AH
                 DEFB 0#BH
                 DEFB 0#CH
                 DEFB 0#DH
                 ENDM
1DE9     TREE    DEF2 1,17
1DEB             DEFB 00001000B
1DEC             DEFB 00011100B
1DED             DEFB 00111110B
1DEE             DEFB 01101011B
1DEF             DEFB 00001000B
1DF0             DEFB 00001000B
1DF1             DEFB 00111100B
1DF2             DEFB 01111110B
1DF3             DEFB 10101001B
1DF4             DEFB 00001000B
1DF5             DEFB 00111100B
1DF6             DEFB 01111110B
1DF7             DEFB 11101011B
1DF8             DEFB 10001001B
1DF9             DEFB 00001000B
1DFA             DEFB 00011100B
1DFB             DEFB 10101110B
1DFC     ARM0:   DEF04 0A,0A,2,5
1E00             DEF02 40,00,
1E02             DEF02 51,00,
1E04             DEF02 04,00,
1E06             DEF02 01,00,
1E08             DEF02 00,40,
1E0A     ARM1:   DEF04 0A,0A,2,3
1E0E             DEF02 50,00,
1E10             DEF02 14,00,
1E12             DEF02 01,40,
1E14     ARM2:   DEF04 0A,0A,2,2
1E18             DEF02 54,00,
1E1A             DEF02 55,40,
1E1C     ARM3:   DEF04 0A,7,2,4
1E20             DEF02 10,00,
1E22             DEF02 05,40,
1E24             DEF02 54,00,
1E26             DEF02 50,00,
1E28     ARM4:   DEF04 0A,6,2,5
1E2C             DEF02 00,40,
1E2E             DEF02 45,00,
1E30             DEF02 10,00,
1E32             DEF02 50,00,
1E34             DEF02 40,00,
1E36     ARM5:   DEF04 0A,5,2,6
1E3A             DEF02 00,40,
1E3C             DEF02 01,00,
1E3E             DEF02 05,00,
1E40             DEF02 14,00,
1E42             DEF02 54,00,
1E44             DEF02 50,00,
1E46     ARM6:   DEF04 0A,5,1,5
1E4A             DEFB 01H
```

```
1E4B 44              DEFB 44H
1E4C 10              DEFB 10H
1E4D 40              DEFB 40H
1E4E 40              DEFB 40H
                ; **** NOTE ****
                ; THE FOLLOWING PATTERNS ARE CONSTRAINED TO EXIST ON THE
                ; PAGE.  THE FOLLOWING 'ORG' WILL DO IT FOR EXPERIMENTAL
                ; PATTERNS ARE: LEGO,LEG1,LEG2,KIL1,KIL2
                ;        ORG     ($+255).AND.OFF00H      ; *** TEMP ***
1E4F 23         LEGO:   DEFB LEG1.AND.OFFH
1E50 04                 DEFB 4
1E51                    DEF04 0,0F,3,5
1E55                    DEF03 01,55,00,
1E58                    DEF03 05,45,40,
1E5B                    DEF03 15,01,40,
1E5E                    DEF03 50,01,40,
1E61                    DEF03 15,00,54,
1E64 74         LEG1:   DEFB LEG2.AND.OFFH
1E65 04                 DEFB 4
1E66                    DEF04 2,0F,2,5
1E6A                    DEF02 15,50,
1E6C                    DEF02 54,50,
1E6E                    DEF02 50,50,
1E70                    DEF02 50,50,
1E72                    DEF02 55,15,
1E74 4F         LEG2:   DEFB LEGO.AND.OFFH
1E75 04                 DEFB 4
1E76                    DEF04 3,0F,2,5
1E7A                    DEF02 55,00,
1E7C                    DEF02 15,00,
1E7E                    DEF02 15,00,
1E80                    DEF02 14,00,
1E82                    DEF02 05,40,
1E84 DA         KIL1:   DEFB KIL2.AND.OFFH
1E85 14                 DEFB 20
1E86                    DEF04 0,1,4,13
1E8A                    DEF04 01,10,00,00,
1E8E                    DEF04 45,54,40,00,
1E92                    DEF04 55,55,40,00,
1E96                    DEF04 0A,A8,00,00,
1E9A                    DEF04 0A,A2,00,01,
1E9E                    DEF04 0A,AA,80,14,
1EA2                    DEF04 02,AA,00,50,
1EA6                    DEF04 00,A8,05,40,
1EAA                    DEF04 05,55,54,00,
1EAE                    DEF04 15,55,50,00,
1EB2                    DEF04 54,55,50,00,
1EB6                    DEF04 50,05,54,00,
1EBA                    DEF04 50,01,55,00,
1EBE                    DEF04 10,01,55,40,
1EC2                    DEF04 10,00,05,50,
1EC6                    DEF04 00,00,01,50,
1ECA                    DEF04 00,00,00,40,
1ECE                    DEF04 00,00,01,40,
1ED2                    DEF04 00,00,00,54,
1ED6 DA         KIL2:   DEFB KIL2.AND.OFFH
1ED7 3C                 DEFB 60
1ED8                    DEF04 0,D,4,7
1EDC                    DEF04 01,10,00,00,
1EE0                    DEF04 45,54,40,00,
1EE4                    DEF04 55,55,40,00,
1EE8                    DEF04 0A,A8,00,00,
1EEC                    DEF04 0A,88,15,01,
1EF0                    DEF04 16,A5,55,41,
1EF4                    DEF04 15,55,55,55,
1EF8            CACTUS  DEF2 1,12
1EFA 20                 DEFB 00100000B
1EFB 30                 DEFB 00110000B
1EFC 38                 DEFB 00111000B
1EFD 30                 DEFB 00110000B
1EFE B2                 DEFB 10110010B
1EFF F2                 DEFB 11110010B
1F00 F6                 DEFB 11110110B
1F01 3C                 DEFB 00111100B
1F02 3C                 DEFB 00111100B
```

```
1F02 30          DEFB 00110000B
1F04 30          DEFB 00110000B
1F05 30          DEFB 00110000B
1F06 474F5420    GOTME:   DEFM 'GOT ME'
1F0C 00          NULPAT:  DEFB 0
1F0D 00                   DEFB 0
1F0E 01                   DEFB 1
1F0F 01                   DEFB 1
1F10             GEBODY:  DEF04 0,0,3,F
1F14                      DEF03 00,44,00,
1F17                      DEF03 11,55,10,
1F1A                      DEF03 15,55,50,
1F1D                      DEF03 02,AA,00,
1F20                      DEF03 02,A2,00,
1F23                      DEF03 02,AA,80,
1F26                      DEF03 00,AA,00,
1F29                      DEF03 00,A8,00,
1F2C                      DEF03 15,55,00,
1F2F                      DEF03 55,55,50,
1F32                      DEF03 51,55,50,
1F35                      DEF03 41,55,00,
1F38                      DEF03 41,55,00,
1F3B                      DEF03 45,55,00,
1F3E 01                   DEFB 01H
1F3F 55                   DEFB 55H
1F40             WAGPAT:  DEF04 0,0,4,16
1F44                      DEF04 00,05,50,00,
1F48                      DEF04 00,55,55,00,
1F4C                      DEF04 01,55,55,40,
1F50                      DEF04 05,55,55,50,
1F54                      DEF04 15,54,15,54,
1F58                      DEF04 15,50,05,54,
1F5C                      DEF04 15,40,01,54,
1F60                      DEF04 15,40,01,54,
1F64                      DEF04 15,50,05,54,
1F68                      DEF04 05,54,15,50,
1F6C                      DEF04 01,55,55,40,
1F70                      DEF04 00,55,55,00,
1F74                      DEF04 00,15,54,00,
1F78                      DEF04 02,AA,AA,80,
1F7C                      DEF04 00,AA,AA,00,
1F80                      DEF04 12,AA,AA,84,
1F84                      DEF04 10,A8,2A,04,
1F88                      DEF04 10,20,08,04,
1F8C                      DEF04 52,AA,AA,85,
1F90                      DEF04 10,20,08,04,
1F94                      DEF04 10,00,00,04,
1F98                      DEF04 10,00,00,04,
                 ;
1F9C 00          FUDG4:   DEFB 0
                 ;
1F9D             MSET     MASTER 0A4
1F9F                      VOLUME 09H,0H
1FA2                      RET
                   ; HOME ON DA RANGE
1FA3 CD9D1F      HOME     CALL MSET
1FA6                      NOTE1 36,G1
1FA8                      NOTE1 12,F1
1FAA                      NOTE1 18,E1
1FAC                      NOTE1 6,D1
1FAE                      NOTE1 36,E1
1FB0                      QUIET
                   ; TAPS
1FB1             TAPS
1FB1 CD9D1F               CALL MSET
1FB4                      NOTE1 18,C1
1FB6                      NOTE1 6,C1
1FB8                      NOTE1 36,F1
1FBA                      NOTE1 18,C1
1FBC                      NOTE1 6,F1
1FBE                      NOTE1 36,A1
1FC0                      QUIET
                   ; FUNERAL
1FC1             FUNERL
1FC1 CD9D1F               CALL MSET
1FC4                      NOTE1 24,A0
```

```
1FC6                NOTE1  18,A0
1FC8                NOTE1  6,A0
1FCA                NOTE1  24,A0
1FCC                NOTE1  18,C1
1FCE                NOTE1  6,B0
1FD0                NOTE1  18,B0
1FD2                NOTE1  6,A0
1FD3                NOTE1  18,A0
1FD4                NOTE1  6,GS0
1FD6                NOTE1  18,A0
1FD6                QUIET
1FDB      GUNSHOT   OUTPUT  18H,OF0H,OF5H,OFDH,OFFH,0,3FH,OFFH,OEFH
1FE1                LEGSTA
1FE5                VOLUME  OFFH,03FH
1FE8                REST 5
1FEA                NOTE1  5,8FH
1FEC                NOTE1  5,4CH
1FEE                QUIET
>1FEF     LASTB     EQU   $


                ;  *************
                ;  * RAM CELLS *
                ;  *************
                          ORG   NORMEM+0E70H
4E70                      DEFS 150           ; ALLOW BIG STACK
>4F06     STACK           EQU   $            ; START STACK HERE
4F06                      DEFS 12
>4F12     MSTACK          EQU   $
>4F12     STRRAM          EQU   $
4F12      WRITQ:          DEFS 3             ; WRITE Q HEADER
4F15      VECQ:           DEFS 3             ; VECTOR Q HEADER
>4F18     VECSTR          EQU   $
4F18      BULV1:          DEFS BULVSZ        ; BULLET VECTOR 1
4F2A      BULV2:          DEFS BULVSZ        ; BULLET VECTOR 2
4F3C      BULV3:          DEFS BULVSZ        ; BULLET VECTOR 3
4F4E      BULV4:          DEFS BULVSZ        ; BULLET VECTOR 4
4F60                      DEFS 1             ; LEFT COWBOY LINK
4F61      LCOWB:          DEFS GFVSIZ-1      ; LEFT GUNFIGHTER
4F77                      DEFS 1             ; RIGHT COWBOY LINK
4F78      RCOWB:          DEFS GFVSIZ-1      ; RIGHT GUNFIGHER
4F8E                      DEFS 1             ; WAGON LINK
4F8F      WAGVEC:         DEFS WAGVSZ        ; WAGON VECTOR
4F90      WAGON           EQU   WAGVEC+VBSTAT
>4FA1     ENDRAM          EQU   $
>4FDA     LBULS           EQU   CT5
>4FDB     RBULS           EQU   CT6
4FA1      RFIELD          DEFS 1
4FA2      LSCORE          DEFS 3
4FA5      LFIELD          DEFS 1
4FA6      RSCORE          DEFS 3
                          LIST S
>1FEF     LEND            EQU   LASTB
4FA9                      END

;TOTAL ASSEMBLER ERRORS =     2

$WEOF 3
$REW 2
$END DO
$$
$MOSTEK,HVGSYS,ASL,HVGLIB,USG,,MT1
$ASS SI ASL
$NOP
$EXE SED,,NOLO
POS HVGSYS
EXIT
$MOVE SI,5
$NOP
$EXE SED,,NOLO
ASS SI USG
POS HVGLIB
```

```
EXI
$MOVE SI,7
$AVR CI,4
$ASS 2 MT1 3 SCA 4 SCB 6 LO RAD NO
$EXE MOSTEK,LMG
```

```
*MODCOMP Z-80 CROSS ASSEMBLER* HOME VIDEO GAME SYSTEM
ADDR OBJECT   STMT  LABEL    OPCD OPERAND        COMMENT

                                 LIST S
                          ; **********
                          ; * HVGSYS *
                          ; **********
                          ; ** MODIFIED TO CORRECT CALCULATOR BUG AND ASTERISK
                          ; ** AND INCSCR AND CLRNUM BUGS

>0008                    PFUG     EQU  08H            ; POT FUDGE FACTOR
>17DE                    GFSTRT   EQU  17DEH          ; GUN FIGHT START ADDRESS
>1328                    CMSTRT   EQU  1328H          ; CHECKMATE START ADDRESS
>1020                    CALCST   EQU  1020H          ; CALCULATOR START ADDRESS
>0E19                    SCBST:   EQU  0E19H          ; SCRIBBLING START ADDRESS

                          ; ********************
                          ; * POWER UP RESTART *
                          ; ********************
                                  ORG  0
0000 [illegible]                  NOP                 ; WAIT FOR THINGS TO SETTLE DOW
0001 [illegible]                  DI
0002 [illegible]                  XOR  A
0003 [illegible]                  OUT  (CONCM),A      ; *** SET CONSUMER MODE ***
0005 [illegible]10C               JP   PWRUP

                                  ORG  8
                          ; TRANSFER CONTROL TO RESTART HANDLER
0008 [illegible]20                JP   2007H          ; VECTOR OUT

000B [illegible]          NUMBAS: DEFB 1CH
000C [illegible]                  DEFB 3CH
000D [illegible]                  DEFB 1CH
000E [illegible]                  DEFB 20H

                                  ORG  16
0010 [illegible]20                JP   200AH          ; RESTART 2
0013 [illegible]          MENUCL: DEFB 06H            ; MENU COLORS
0014 [illegible]                  DEFB 0FAH
0015 [illegible]                  DEFB 07H
0016 [illegible]                  DEFB 62H

                                  ORG  24
0018 [illegible]                  JP   200DH          ; RESTART 3
                          ; NAME:          PAUSE
                          ; PURPOSE:       HALT # OF INTERRUPTS
                          ; INPUT:         B = # OF INTERRUPTS
001B FB                   HPAUSE: EI
001C 76                           HALT
001D 10FD                         DJNZ -1
001F C9                           RET
                                  ORG  32
[illegible]1020                   JP   2010H          ; RESTART 4

                          ; NAME. SET WORD
                          ; (HL)=DE
0023 73                   HSETW:  LD   (HL),E
0024 23                           INC  HL
0025 72                           LD   (HL),D
0026 [illegible]                  RET
```

```
                        ORG  40
0028 C31320             JP   2013H          ; RESTART 5

002B 210000     CONC2:  LD   HL,0           ; ZERO OUT HL
002F C9                 RET

                        ORG  48
0030 C31620             JP   2016H          ; RESTART 6

0033 00         CKSUM1: DEFB 0              ; CHECKSUM

0034 0001       ITAB:   DEFW MACTIN         ; INTERRUPT TRANSFER
0036 01                 DEFB 1              ; ** SYSTEM REVISION LEVEL

                        ORG  56
                ; NAME:          USER PROGRAM INTERFACE
                ; PURPOSE:       TRANSFER OF CONTROL FROM USER TO SYSTEM
                , INPUT:         ROUTINE # FOLLOWS INLINE AFTER RST INSTR
                ;                IF L.O. BIT SET, LOAD ARGUMENTS INLINE F
                ; OUTPUT:                NONE
                ; STACK USE:     18 BYTES TOTAL, 16 BYTES ON EXIT
                ; SIDE EFFECTS:  REGISTERS AF,BC,DE,HL,IX, AND OLD IY SAV
                ; EXPLAINATION:
                ;  REGISTERS AF,BC,DE,HL,IX, AND PREVIOUS IY ARE PUSHED
                ; THE NUMBER FOLLOWING THE RST 56 INSTRUCTION IS USED TO
                ; INDEX A JUMP VECTOR GIVING THE STARTING ADDRESS OF THE
                ; SYSTEM ROUTINE TO CALL.  IF OPTIONED, INLINE ARGUMENTS
                ; ARE COPIED INTO THE CONTEXT AREA. FOR ARGUMENT ORDERIN
                ; SEE INTERPRETER DOCUMENTATION AND APPROP. TABLES
                ; A DUMMY RETURN IS INSERTED WHICH, WHEN RETURNED TO BY
                ; SYSTEM ROUTINE, WILL RESTORE THE REGISTER CONTENTS AND
                ; RETURN TO THE USER PROGRAM
                ;
                ;   *** THE UPI HAS BEEN EXTENDED TO SUPPORT USER SUPPLI
                ;   ROUTINES.  IF THE CALL INDEX PROVIDED IS NEGATIVE
                ;   THEN THE USERS DISPATCH TABLE POINTER (USERTB) IS US
                ;   NOTE THAT THE SIGN BIT ISN'T ZAPPED BEFORE BEING
                ;   USED AS AN INDEX, THIS MEANS THAT THE USERS DISPATCH
                ;   TABLE POINTER SHOULD POINT 128 BYTES BEFORE THE FIRS
0038 E3                 EX   (SP),HL        ; RETURN ADDRESS TO HL
0039 F5                 PUSH AF             ; CREATE CONTEXT
003A C5                 PUSH BC
003B D5                 PUSH DE
003C DDE5               PUSH IX
003E FDE5               PUSH IY
0040 FD210000           LD   IY,0           ; POINT IY AT CONTEXT
0044 FD39               ADD  IY,SP
0046 7E                 LD   A,(HL)         ; LOAD OPCODE
0047 23                 INC  HL
0048 117A02             LD   DE,RETN        ; DE = RETURN POINT
004B 1F                 RRA                 ; SUCK WANTED?
004C 380A               JR   C,MINTO-$      ; JUMP IF YES
004E E5         INTPE:  PUSH HL             ; SAVE PC
004F D5                 PUSH DE             ; SAVE DUMMY RETURN
0050 21CB00             LD   HL,SYSDPT
0053 07                 RLCA
0054 5F                 LD   E,A
0055 1600               LD   D,0
0057 17                 RLA                 ; USER TABLE WANTED?
0058 3003               JR   NC,PUSH1-$
005A 2AFB4F             LD   HL,(USERTB)    ; YES - LOAD IT
005D 19         PUSH1:  ADD  HL,DE
005E 5E                 LD   E,(HL)
005F 23                 INC  HL
0060 56                 LD   D,(HL)
0061 D5                 PUSH DE
0062 FD660B             LD   H,(IY+CBH)
0065 FD6E0A             LD   L,(IY+CBL)
0068 FD5603     RELD:   LD   D,(IY+CBIXH)
006B FD5E02             LD   E,(IY+CBIXL)
```

```
006E D5                          PUSH DE
006F DDE1                        POP  IX
0071 FD7E09                      LD   A,(IY+CBA)
0074 FD5605            DELOAD:   LD   D,(IY+CBD)
0077 FD5E04                      LD   E,(IY+CBE)
007A C9                          RET                ; CALL VIA RETURN
                        ; NAME:           MACRO INTERPRETER
                        ; PURPOSE:        INTERPRETING SEQUENCES OF SYSTEM CALLS
                        ; INPUT:          ADDRESS OF STRING TO INTERPRET PASSED ON
                        ; STACK USE:      NO INCREASE IN DEPTH
                        ; EXPLAINATION: IF OPTIONED (BIT 0 OF CALL INDEX SET) TH
                        ; ARGUMENT TABLE (MRARGT) IS INDEXED GIVING A MASK WHICH
                        ; SPECIFIES HOW TO TRANSFER INLINE ARGUMENTS INTO THE CO
                        ; BLOCK.  THIS MASK IS FORMATED AS FOLLOWS:
                        ;
                        ;
                        ; *********************************
                        ; * 7 * 6 * 5 * 4 * 3 * 2 * 1 * 0 *
                        ; *********************************
                        ; * H * L * A * IX* B * C * D * E *
                        ; *********************************
                        ; ARGUMENTS MUST FOLLOW THE CALL INDEX IN THE FOLLOWING
                        ; (OMITING UNUSED ARGUMENTS, OF COURSE)
                        ; (INDEX),IXL,IXH,E,D,C,B,A,L,H
                        ;
                        ;       THE SIMULATED PC IS SAVED AND A DUMMY RETURN IS
                        ; INSERTED ON THE STACK.  THE UPI DISPATCHING ROUTINE IS
                        ; THEN ENTERED AT 'INTPE', WHICH EFFECTS A CONTROL TRANS
                        ; TO THE CALLED ROUTINE.  WHEN THE CALLED ROUTINE RETURN
                        ; IT WILL COME BACK HERE TO INTERPRET THE NEXT MACRO INS
                        ; NOTE THAT THIS ROUTINE IS REENTRANT, THEREFORE THE CAL
                        ; ROUTINE MAY RECUR BACK THRU HERE, IF IT FEELS LIKE IT.
                        ; ** THE UPI HAS BEEN EXTENDED TO SUPPORT USER PROVIDED
                        ; SYSTEM ROUTINES.  IF A NEGATIVE CALL INDEX IS ENCOUNTER
                        ; BY THE INTERPRETER, AND 'SUCK INLINE' IS OPTIONED, THE
                        ; USER MACRO ROUTINE ARGUMENT TABLE IS INDEXED FOR A
                        ; PARAMETER MASK.  THE ADDRESS OF THIS TABLE IS ASSUMED
                        ; TO BE IN (UMARGT),(UMARGT+1).  THIS POINTER SHOULD
                        ; POINT 64 BYTES BEFORE THE FIRST REAL ENTRY.
                        ; I.E. LD        HL,USERMT-64     ; WHERE USERMT POINTS AT
                        ;      LD        (UMARGT),HL
007B D1                MINTPC:   POP  DE            ; DISCARD DUMMY RETURN FROM UPI
007C                   RENTER:
007C E1                          POP  HL            ; POP OFF PC

                        ; NAME:  MCALL
                        ; PURPOSE:         CALL INTERPRETER SUBROUTINE
                        ; INPUT:           HL = ROUTINE ADDRESS
                        ; NOTES:           ROUTINE MAY BE CALLED FROM MACHINE LANGUA
                        ;                  ANOTHER INTERPRETED SEQUENCE
                        ;                  STACK DEPTH INCREASED BY 4 BY CALL
007D 7E                MMCALL:   LD   A,(HL)        ; GET OPCODE
007E 23                          INC  HL
007F CB3F                        SRL  A
0081 117C00                      LD   DE,RENTER     ; LOAD INTERPRETER DUMMY RETURN
0084 D5                MINTO:    PUSH DE            ; SAVE DUMMY RETURN
0085 4F                          LD   C,A           ; INDEX TO C
0086 3012                        JR   NC,MINT2-$    ; JUMP IF NO LOAD WANTED
0088 EB                          EX   DE,HL
0089 0600                        LD   B,0
008B 21B801                      LD   HL,MRARGT     ; LOAD SYSTEM ARG TABLE
008E CB77                        BIT  6,A           ; USE USER TABLE?
0090 2803                        JR   Z,MINT1-$     ; JUMP IF NO
0092 2A104F                      LD   HL,(UMARGT)
0095 09                MINT1:    ADD  HL,BC         ; INDEX TABLE
0096 46                          LD   B,(HL)
0097 CD0800                      CALL MSUCK1        ; CALL SUCK ROUTINE
009A D1                MINT2:    POP  DE            ; DUMMY RETURN TO DE, HL = PC
009B 79                          LD   A,C           ; GET CALL INDEX BACK
009C FD4607                      LD   B,(IY+CBB)    ; RESTORE CLOBBERED REGISTERS
009F FD4E06                      LD   C,(IY+CBC)
00A2 1800                        JR   INTPE-$       ; JOIN NORMAL UPI DISPATCH SEQU

                        ; NAME:            SUCK INLINE ARGUMENTS
```

```
                 ; PURPOSE:       TRANSFER OF INLINE ARGS INTO CONTEXT BLO
                 ; INPUT:         B = ARG LOAD MASK (SEE INTERPRETER COMME
                 ; OUTPUT:        HL = UPDATED PC
                 ; EXPLAINATION:  THIS ROUTINE IMPLEMENTS A MACRO LOAD INS
                 ; IT IS USED BY THE INTERPRETER AS WELL.  A ONE BIT IN T
                 ; INLINE LOAD MASK MEANS TRANSFER THE NEXT INLINE BYTE I
                 ; A ZERO BIT MEANS 'ADVANCE CONTEXT BLOCK POINTER'
                 ; TWO ENTRY POINTS ARE DEFINED, ONE FOR THE SUCK MACRO I
                 ; THE OTHER FOR THE INTERPRETER TO USE
                 ; SUCK MACRO ENTRY:
00A4 E1          MSUCK:   POP   HL            ; RETURN ADDRESS TO HL
00A5 D1                   POP   DE            ; POP OFF PC
                  ; *** BYTE SAVING TRICK *** REPLACE WITH LD HL,REENTRY
00A6 23                   INC   HL            ; ADVANCE TO REENTRY (MINTO)
00A7 E5                   PUSH  HL
                  ; FALL INTO ...
00A8 CB60        MSUCK1:  BIT   4,B           ; IX LOAD WANTED?
00AA 2806                 JR    Z,MSUCK2-$    ; MSUCK2 IF NOT
00AC 1A                   LD    A,(DE)
00AD 13                   INC   DE
00AE FD7702               LD    (IY+CBIXL),A
00B1 1A                   LD    A,(DE)
00B2 13                   INC   DE
00B3 FD7703               LD    (IY+CBIXH),A
00B6 FDE5        MSUCK2:  PUSH  IY            ; LET HL = IY
00B8 E1                   POP   HL
00B9 23                   INC   HL            ; + 4
00BA 23                   INC   HL
00BB 23                   INC   HL
00BC 23                   INC   HL
00BD CBA0                 RES   4,B           ; KILL IX BIT
                  ; THE FAMOUS SUCK IN LOOP
00BF CB38        MSUCK3:  SRL   B
00C1 3003                 JR    NC,MSUCK5-$   ; MSUCK5 IF NOT THIS TIME
00C3 1A                   LD    A,(DE)        ; GET INLINE BYTE
00C4 13                   INC   DE
00C5 77                   LD    (HL),A        ; STUFF INTO CB
00C6 23          MSUCK5:  INC   HL            ; BUMP CB POINTER
                  ; ** THIS CODE ASSUMES THAT STATUS OF 'SRL' IS PRESERVE
00C7 20F6                 JR    NZ,MSUCK3-$   ; JUMP BACK IF MORE TO DO
00C9 EB                   EX    DE,HL         ; HL = PC
00CA C9                   RET                 ; THEN QUIT
                  ; *****************************
                  ; * UPI ROUTINE ADDRESS TABLE *
                  ; *****************************
00CB 7A00        SYSDPT.  DEFW  MINTPC
00CD 7902                 DEFW  MXINTC
00CF 3206                 DEFW  MRCALL
00D1 7D00                 DEFW  MMCALL
00D3 730B                 DEFW  MMRET
00D5 140A                 DEFW  MMJUMP
00D7 A400                 DEFW  MSUCK
00D9 8401                 DEFW  MACTIN
00DB 7F04                 DEFW  TIMEY
00DD 0805                 DEFW  MUZSET
00DF FC05                 DEFW  MUZSTP
00E1 CF03                 DEFW  MSETUP
00E3 DB01                 DEFW  MCOLOR
00E5 FF0A                 DEFW  MFILL
00E7 [illegible]          DEFW  MPAINT
00E9 [illegible]          DEFW  MVWRIT
00EB [illegible]          DEFW  MWRITR
00ED [illegible]          DEFW  MWRITP
00EF [illegible]          DEFW  MWRIT
00F1 [illegible]          DEFW  MWRITA
00F3 [illegible]          DEFW  MVBLAN
00F5 [illegible]          DEFW  MBLANK
00F7 [illegible]          DEFW  MSAVE
00F9 [illegible]          DEFW  MREST
00FB [illegible]          DEFW  MSCROL
00FD [illegible]          DEFW  DISPCH
00FF [illegible]          DEFW  STRNEW
0101 [illegible]          DEFW  BCDISP
0103 [illegible]          DEFW  MRELAB
0105 [illegible]          DEFW  MRELA1        ; RELAB1
```

```
0107 [illegible]          DEFW MVECTC
0109 [illegible]          DEFW MVECT
010B [illegible]          DEFW MKCTAS
010D [illegible]          DEFW MENTRY      ; SENTRY
010F [illegible]          DEFW MDOIT       ; DOIT
0111 [illegible]          DEFW MDOITB
0113 [illegible]          DEFW MPIZBK      ; PIZBRK
0115 [illegible]          DEFW MMENU
0117 [illegible]          DEFW MGETP
0119 [illegible]          DEFW MGETN
011B [illegible]          DEFW MPAUSE      ;PAUSE
011D [illegible]          DEFW MDISTI      ;DISPLAY TIME
011F [illegible]          DEFW MINCSC      ;INC SCORE
0121 [illegible]          DEFW INXNIB      ; INDEXN
0123 [illegible]          DEFW PUTNIB      ; STOREN
0125 [illegible]          DEFW MINDW       ; INDEXW
0127 [illegible]          DEFW MINDB       ; INDEXB
0129 [illegible]          DEFW MMOVE       ; MOVE
012B [illegible]          DEFW MSHFTU
012D [illegible]          DEFW BCDAD
012F [illegible]          DEFW BCDSB
0131 [illegible]          DEFW BCDML
0133 [illegible]          DEFW BCDDV
0135 2403                 DEFW BCDCS
0137 4103                 DEFW BCDNG
0139 2103                 DEFW SDADD
013B 2903                 DEFW SDSMG
013D 5603                 DEFW SDABS
013F 4C03                 DEFW SNEGT
0141 7F03                 DEFW MRANGE
0143 410C                 DEFW MQUIT
0145 2C03                 DEFW MSETB
0147 2300                 DEFW MSETW
0149 4002                 DEFW MMTD

                ; MACRO ROUTINES ARGUMENT MASK TABLE
                ; FORMAT:
                ; *********************************
                ; * 7 * 6 * 5 * 4 * 3 * 2 * 1 * 0 *
                ; *********************************
                ; * H * L * A * IX* B * C * D * E *
                ; *********************************
                ; ARGUMENTS MUST FOLLOW THE CALL INDEX IN THE FOLLOWING
                ; (OMITING UNUSED ARGUMENTS, OF COURSE)
                ; (INDEX), IXL, IXH, E, D, C, B, A, L, H
014B 00         MRARGT: DEFB 0          ; INTPC
014C 00                 DEFB 0          ; XINTC
014D C0                 DEFB 11000000B  ; RCALL
014E C0                 DEFB 11000000B  ; MCALL
014F 00                 DEFB 0          ; MRET
0150 C0                 DEFB 11000000B  ; MJUMP
0151 08                 DEFB 00001000B  ; SUCK
0152 00                 DEFB 0          ; ACTINT
0153 04                 DEFB 00000100B  ; DECCTS
0154 F0                 DEFB 11110000B  ; BMUSIC
0155 00                 DEFB 0          ; EMUSIC
0156 2A                 DEFB 00101010B  ; SETOUT
0157 C0                 DEFB 11000000B  ; COLSET
0158 2F                 DEFB 00101111B  ; FILL
0159 2F                 DEFB 00101111B  ; RECTAN
015A D0                 DEFB 11010000B  ; VWRITR
015B E3                 DEFB 11100011B  ; WRITR
015C E3                 DEFB 11100011B  ; WRITP
015D EF                 DEFB 11101111B  ; WRIT
015E EF                 DEFB 11101111B  ; WRITA
015F 13                 DEFB 00010011B  ; VBLANK
0160 CB                 DEFB 11001011B  ; BLANK
0161 CF                 DEFB 11001111B  ; SAVE
0162 C3                 DEFB 11000011B  ; RESTORE
0163 CF                 DEFB 11001111B  ; SCROLL
0164 27                 DEFB 00100111B  ; NEW DISCHR
0165 C7                 DEFB 11000111B  ; NEW DISSTR
```

```
0166 CF          DEFB 11001111B     ; DISNUM
0167 20          DEFB 00100000B     ; RELABS
0168 20          DEFB 00100000B     ; RELABI
0169 D4          DEFB 11010100B     ; VECTC
016A D0          DEFB 11010000B     ; VECT
016B 00          DEFB 0             ; KCTASC
016C 03          DEFB 00000011B     ; SENTRY
016D C0          DEFB 11000000B     ; DOIT
016E C0          DEFB 11000000B     ; DOITB
016F 00          DEFB 0             ; PIZBRK
0170 C3          DEFB 11000011B     ; MENU
0171 EC          DEFB 11101100B     ; GET PARAMETER
0172 CF          DEFB 11001111B     ; GET NUMBER
0173 08          DEFB 00001000B     ; PAUSE
0174 07          DEFB 00000111B     ; DISTIM
0175 C0          DEFB 11000000B     ; INCSCR
0176 C0          DEFB 11000000B     ; INDEXN
0177 C0          DEFB 11000000B     ; STOREN
0178 C0          DEFB 11000000B     ; INDEXW
0179 C0          DEFB 11000000B     ; INDEXB
017A             DEFB 11001111B     ; MOVE
017B             DEFB 11001000B     ; SHIFTU
017C             DEFB 11001011B     ; BCDADD
017D             DEFB 11001011B     ; BCDSUB
017E             DEFB 11001011B     ; BCDMUL
017F             DEFB 11001011B     ; BCDDIV
0180             DEFB 11001000B     ; BCDCHS
0181             DEFB 00001011B     ; BCDNEG
0182             DEFB 11001011B     ; DADD
0183             DEFB 00001011B     ; DSMG
0184             DEFB 00001011B     ; DABS
0185             DEFB 11001000B     ; NEGT
0186             DEFB 00100000B     ; RANGED
0187             DEFB 00000000B     ; QUIT
0188             DEFB 11100000B     ; SET BYTE
0189             DEFB 11000011B     ; SET WORD
018A             DEFB 11000111B     ; MASK TO DELTAS


                 ; INTERUPT ROUTINE FOR EVERYBODY
                 ; WHO DOESN'T WANT TO WRITE THEIR OWN
                 ; DOES 4 60TH SEC COUNTERS IN CT0-3
018B             MACTIN: DI                       ; MAKE DAMN SURE WE IS OFF
018C                     PUSH AF
018D                     PUSH BC
018E                     PUSH DE
018F                     PUSH HL
0190                     IM   2
0192                     LD   A,ITAB.SHR.8
0194                     LD   I,A
0196                     LD   A,200
0198                     OUT  (INLIN),A
019A                     LD   A,ITAB&0FFH
019C                     OUT  (INFBK),A
019E                     CALL TIMEZ           ; UPDATE TIMOUT,MUSIC AND SECON
01A1 0E0F                LD   C,0FH           ; USE CT0-3
01A3                     CALL TIMEY           ; DEC CT0-3
01A6 E1                  POP  HL
01A7 D1                  POP  DE
01A8 C1                  POP  BC
01A9 F1                  POP  AF
01AA FB                  EI
01AB C9                  RET


                 ; ROUTINE: SENTRY
                 ; PURPOSE: TO WAIT FOR CHANGE OF PROGRAM STATUS
                 ; IN EITHER THE PORTS OR THE TIMER-COUNTERS.
                 ; IN ADDITION IT CHECKS TIMOUT FOR LONG PERIODS OF IN-
                 ; ACTIVITY.
                 ; ** IS VECTOR OUT FLAG SET??
```

```
01AC 3AFA4F     MENTRY:  LD   A,(SENFLG)
01AF FEAA                CP   0AAH
01B1 CA1920              JP   Z,2019H        ; YES - JUMP OUT
01B4 3AFC4F              LD   A,(TIMOUT)     ; CHECK IF TIME TO BLAKOUT
01B7 B7                  OR   A
01B8 2038                JR   NZ,TTEST-$
01BA AF         MPIZBK:  XOR  A              ; TIME TO SHUT DOWN
01BB F3                  DI
01BC D315                OUT  (VOLC),A       ; TURN OFF SOUNDS
01BE D316                OUT  (VOLAB),A
01C0 010B08              LD   BC,COLBX+8*256
01C3 ED79                OUT  (C),A          ; PAINT IT BLACK
01C5 10FC                DJNZ -2
01C7 111402     PBLP:    LD   DE,AKEYS
01CA CDF40C              CALL FINDL3         ; CALL STORE DE INTO CONTEXT RO
01CD CDF501              CALL TTEST          ; WAIT FOR SOMETHING TO HAPPEN
01D0 3C                  INC  A
01D1 20E7                JR   NZ,MPIZBK-$
01D3 FD360900            LD   (IY+CBA),0
01D7 FB                  EI
01D8 2AFC4F              LD   HL,(COLLST)    ;  GET SAVED COLORS
01DB 22FA4F     MCOLOR.  LD   (COLLST),HL    ; SAVE COLORS FOR FUTURE
01DE 010B08              LD   BC,800H+COLBX
01E1 EDB3                OTIR                ; RESET THE COLORS
01E3 AF                  XOR  A
01E4 C9                  RET
01E5 CDCC03     ITEST    CALL TRCHK
01E8 FD7709              LD   (IY+CBA),A
01EB FD7007              LD   (IY+CBB),B
01EE FE13                CP   SKYD
01F0 D8                  RET  C
01F1 FE1C                CP   POTO
01F3 D0                  RET  NC
01F4 3EFF                LD   A,0FFH
01F6 32FC4F              LD   (TIMOUT),A
01F9 C9                  RET
01FA C040       CALCL.   DEFW SCBL
01FC D040                DEFW FNCALC
01FE 2010                DEFW CALCST         ; START OF CALCULATOR


                ; SYSTEM ROUTINES JUMP VECTOR
                         ORG  200H
0200 C30004              JP   TIMEZ          ; DO TIMER & MUSIC
0203 C37B04              JP   TIMEX          ; DECTMR

0206 20         SYSFNT:  DEFB 20H
0207 08                  DEFB 8
0208 08                  DEFB 8
0209 01                  DEFB 1
020A 07                  DEFB 7
020B                     DEFW LRGCHR

020D A0         SMLFNT:  DEFB 0A0H
020E 04                  DEFB 4
020F 06                  DEFB 6
0210 01                  DEFB 1
0211 05                  DEFB 5
0212                     DEFW SMLCHR

                ; ALLKEYS MASK
0214 3F         AKEYS    DEFB 3FH
0215 3F                  DEFB 3FH
0216 3F                  DEFB 3FH
0217 3F                  DEFB 3FH

                ; HEAD OF ONBOARD MENU
0218            GUNLNK:  DEFW CML
021A                     DEFW PNGF
021C                     DEFW GFSTRT
021E 4D415820            DEFM 'MAX SCORE'
0227 00                  DEFB 0
0228 ..4F4A              DEFM '# OF PLAYERS'
```

```
[illegible]                 DEFB 0
[illegible]    [illegible]1F4   DEFM '# OF GAMES'
[illegible]                 DEFB 0
                  ; NAME.        CONVERT MASK TO DELTAS
                  ; INPUT:       B = JOYSTICK MASK
                  ;              C = FLOP STATUS (MR FLOP BIT SET IF FLOP
                  ;              DE = X POSITIVE DELTA
                  ;              HL = Y POSITIVE DELTA
0240 CD5602       MMTD:    CALL CONCPL       ; HANDLE Y
0243 EB                    EX   DE,HL
0244 CB71                  BIT  MRFLOP,C     ; FLOP SET?
0246 2807                  JR   Z,MMTD2-$    ; YES - DOIT
0248 78                    LD   A,B          ; NO - GET MASK
0249 E603                  AND  3
024B 2801                  JR   Z,MMTD1-$
024D 2F                    CPL               ; INVERT IF NOT ZERO
024E 47           MMTD1:   LD   B,A
024F CD5602       MMTD2:   CALL CONCPL       ; PROCESS X
0252 EB                    EX   DE,HL
0253 C3B00B                JP   STHLDE       ; STORE HL,DE AND QUIT

                  ; SUBROUTINE TO CONDITIONALLY COMPLEMENT OR ZERO HL
0254 CB08         CONCPL:  RRC  B
0258 300A                  JR   NC,CONC1-$   ; JUMP IF NOT UP
025A 7D                    LD   A,L
025B 2F                    CPL
025C 6F                    LD   L,A
025D 7C                    LD   A,H
025E 2F                    CPL
025F 67                    LD   H,A
0260 23                    INC  HL
0261 CB08                  RRC  B
0263 C9                    RET
0264 CB08         CONC1:   RRC  B            ; DOWN SET?
0266 D8                    RET  C            ; QUIT IF SO
0267 C3C500                JP   CONC2        ; JUMP TO ZERO OUT

                  ; NAME:          SCROLL MEMORY BLOCK
                  ; INPUT:         B = NUMBER OF LINES TO SCROLL
                  ;                C = NUMBER OF BYTES ON LINE TO SCROLL
                  ;                DE = LINE INCREMENT
                  ;                HL = FIRST LINE TO SCROLL
026A AF           MSCROL:  XOR  A
026B C5           MSCRL1:  PUSH BC           ; SAVE COUNTERS
026C D5                    PUSH DE
026D 47                    LD   B,A
026E EB                    EX   DE,HL
026F 19                    ADD  HL,DE        ; ADD INCREMENT TO LINE
0270 E5                    PUSH HL
0271 EDB0                  LDIR              ; ZZZZAP!
0273 E1                    POP  HL
0274 D1                    POP  DE
0275 C1                    POP  BC
0276 10F3                  DJNZ MSCRL1-$
0278 C9                    RET
                  ; NAME:          MACRO INTERPRETER EXIT WITH CONTEXT REST
                  ; PURPOSE:       QUIT INTERPRETING AND GO HOME
0279 E1           MXINTC:  POP  HL           ; THROW OUT DUMMY RETURN
                  ; NAME:          RETURN FROM SYSTEM CALL
                  ; PURPOSE:       RETURNING TO USER AND RESTORATION OF REG
027A E1           RETN:    POP  HL           ; RETURN ADDRESS TO HL
027B FDE1                  POP  IY
027D DDE1                  POP  IX
027F D1                    POP  DE
0280 C1                    POP  BC
0281 F1                    POP  AF
0282 E3                    EX   (SP),HL      ; STK=RETURN, HL=OLD HL
0283 C9                    RET

                  ; NAME:          BCD DIVIDE
                  ;
0284 CDC002       BCDDV:   CALL GNACC        ; GENERATE ACCUMULATOR
0287 E3                    EX   (SP),HL      ; HL = ACC, TOP = ARG2
```

```
0288 C5                      PUSH BC
0289 0600                    LD   B,0
028B 79                      LD   A,C
028C CB39                    SRL  C
028E 09                      ADD  HL,BC
028F 4F                      LD   C,A
0290 EB                      EX   DE,HL       ; HL = ARG1, DE = ACC
0291 EDB0                    LDIR             ; HL = ARG1 FLAG+1
0293 C1                      POP  BC
0294 D1                      POP  DE
0295 2B                      DEC  HL          ; ** FIX **
0296 E3                      EX   (SP),HL     ; HL = ARG2, TOP = ARG1 FLAG
0297 C5                      PUSH BC
0298 0600                    LD   B,0
029A 09                      ADD  HL,BC       ; HL = ACC+SIZE/2
029B C1                      POP  BC
029C 0D                      DEC  C           ; ** FIX ** DECREMENT SIZE
029D EB                      EX   DE,HL       ; HL = ARG2, DE = ACC, TOP = AR
029E 1B                      DEC  DE          ; ** FIX **
029F 1B           DIV1:      DEC  DE
02A0 [illegible]             XOR  A
02A1                         SYSTEM NEGT      ; ARG2 = -ARG2 (10S COMP)
02A3              DIV2:      SYSTEM DADD      ; SUBTRACT UNTIL BORROW
02A5 [illegible]             JR   C,DIV3-$
02A7 [illegible]             INC  A           ; OR UNTIL LOOP COUNT > 99
02A8 [illegible]             DAA
02A9 [illegible]             JR   NZ,DIV2-$
02AB [illegible]             POP  HL
02AC [illegible]             LD   (HL),0FFH
02AE [illegible]             POP  BC
02AF [illegible]             JR   MULT6-$
02B1              DIV3:      SYSTEM NEGT
02B3                         SYSTEM DADD
02B5 [illegible]             EX   (SP),HL     ; HL = ARG1
02B6 [illegible]             DEC  HL
02B7 [illegible]             LD   (HL),A      ; SAVE ANSWER IN ARG1
02B8 [illegible]             EX   (SP),HL
02B9 [illegible]             DEC  C
02BA 20E3                    JR   NZ,DIV1-$
02BC E1                      POP  HL
02BD C1                      POP  BC
02BF 1855                    JR   DIV4-$
                  ; SUBROUTINE TO GENERATE ACCUMULATOR ON THE STACK
02C0 DDE1         GNACC:     POP  IX
02C2 AF                      XOR  A
02C3 4F                      LD   C,A
02C4                         SYSTEM DABS      ;ARG1=ABS VALUE
02C6 EB                      EX   DE,HL
02C7                         SYSTEM DABS      ;ARG2=ABS VALUE
02C9 EB                      EX   DE,HL       ;FLAG=1 IF NEG ANS, ELSE POS
02CA 67                      LD   H,A
02CB 6F                      LD   L,A
02CC 78                      LD   A,B
02CD E5           MULT1      PUSH HL          ;GENERATE ACC ON STACK
02CE 10FD                    DJNZ MULT1-$
02D0 47                      LD   B,A         ;RESTORE SIZE
02D1 39                      ADD  HL,SP
02D2 C5                      PUSH BC          ; SAVE SIGN
02D3 E5                      PUSH HL          ;SAVE STACK POINTER
02D4 E5                      PUSH HL          ;SAVE ACC POINTER
02D5 [illegible]0B           LD   H,(IY+CBH)  ;RESTORE ARG2 POINTER
02D8 [illegible]0A           LD   L,(IY+CBL)
02DB 18                      LD   C,B
02DC [illegible]             JP   (IX)
                             ;DECIMAL MULTIPLY
                             ;GIVEN:     DE>ARG1, HL>ARG2, B=SIZE/2
                             ;           (SIZE/2-1 ASSUMED EVEN)
                             ;
                             ;RETURNED:  ARG1=ANSWER, C>0 ON OVERFLOW
                             ;
                             ;
02DE [illegible]  BCDML:     CALL GNACC       ; GENERATE ACCUM
02E1 7E           MULT2      LD   A,(HL)      ;A=MULT LOOP COUNT
02E2 23                      INC  HL
02E3 E3                      EX   (SP),HL     ;HL>DEC ACC
02E4 A7                      AND  A           ;IF A=0, SKIP MULT LOOP
```

```
                JR      Z,MULT4-$
                EX      DE,HL
MULT3:          SYSTEM  DADD            ; ELSE MULTIPLY
                AND     A               ; CLEAR THE CARRY BIT
                DEC     A               ;DECIMAL DECREMENT
                DAA
                JR      NZ,MULT3-$
                EX      DE,HL
MULT4:          INC     HL              ;INCREMENT DECIMAL ACC
                EX      (SP),HL         ;HL>ARG2
                DEC     C
                JR      NZ,MULT2-$
                POP     HL
                POP     HL              ;RESTORE STACK POINTER
                POP     BC              ; RESTORE SIGN
                PUSH    DE
                PUSH    BC
                LD      C,B
                LD      B,0
                SRL     C
                ADD     HL,BC
                SLA     C
                LDIR
                POP     BC
                PUSH    BC              ;CHECK FOR OVERFLOW
                SRL     B
                XOR     A
MULT5:          OR      (HL)
                INC     HL
                DJNZ    MULT5-$
                AND     A               ; SET FLAGS
                JR      Z,MULT7-$
                LD      A,0FFH
                LD      (DE),A
MULT7:          POP     BC              ;CHECK SIGN AND
                POP     HL
DIV4:           BIT     0,C             ;NEGATE ARG1 IF NECESSARY
                JR      Z,MULT6-$
                SYSTEM  BCDCHS
MULT6:          POP     HL              ;RESTORE ORIGINAL STACK POINTER
                DJNZ    MULT6-$
                RET
                ;BCD SUBTRACT & ADD
                ;
                ;GIVEN:      DE>ARG1, HL>ARG2
                ;            B=SIZE/2+1
                ;RETURNED:  ARG1=ANSWER
BCDSB:          SYSTEM  BCDCHS
BCDAD:          SYSTEM  BCDNEG
                EX      DE,HL
                SYSTEM  BCDNEG
                EX      DE,HL
                SYSTEM  DADD
; AND FALL INTO
                ;
                ;
                ;DECIMAL SIGNED MAGNITUDE
                ;
                ;GIVEN:      DE>ARG (10'S COMPLEMENT)
                ;            B=SIZE/2+1
                ;RETURNED:  ARG (SIGNED MAGNITUDE)
                ;
SDSMG:          LD      L,B             ;HL>ARG+B-1 (SIGN BYTE)
                DEC     L
                LD      H,0
                ADD     HL,DE
                LD      A,(HL)          ;IF POS (SIGN NIBBLE<5)
                CP      50H
                RET     C               ;EXIT
                EX      DE,HL
SDSMG1:         LD      A,0             ;ELSE 10'S COMPLEMENT
                SBC     A,(HL)
                DAA
```

```
0???  ??              LD    (HL),A
0???  ??              INC   HL
0???  ????            DJNZ  SDSMG1-$
033B  2B              DEC   HL                   ;AND SET SIGN BIT
033C  7E              LD    A,(HL)
033D  F680            OR    80H
033F  77              LD    (HL),A
0340  C9              RET
                      ;
                      ;
                      ;BCD NEGATE
                      ;
                      ;GIVEN:     DE>ARG (SIGNED MAGNITUDE)
                      ;           B=SIZE/2+1
                      ;RETURNED:  ARG (10'S COMPLEMENT)
                      ;
0341  68      BCDNG:  LD    L,B                  ;HL>ARG+B-1 (SIGN BYTE)
0342  2D              DEC   L
0343  ????            LD    H,0
0345  19              ADD   HL,DE
0346  ????            BIT   7,(HL)               ;EXIT IF POS
0348  C8              RET   Z
0349  ????            LD    (HL),0               ; CLEAR SIGN BYTE
034B  EB              EX    DE,HL
034C  AF      SNEGT:  XOR   A                    ; CLEAR CARRY
034D  3E00    BCDNG1: LD    A,0                  ;ELSE 10'S COMPLEMENT
034F  9E              SBC   A,(HL)
0350  27              DAA
0351  77              LD    (HL),A
0352  23              INC   HL
0353  10F8            DJNZ  BCDNG1-$
0355  C9              RET
                      ;
                      ;
                      ;DECIMAL ABSOLUTE
                      ;
                      ;GIVEN:     DE>ARG (SIGNED MAGNITUDE)
                      ;           B=SIZE/2+1
                      ;RETURNED:  C=C+1 IF SIGN BIT CLEARED
                      ;
0356  68      SDABS:  LD    L,B
0357  2600            LD    H,0
0359  2D              DEC   L
035A  19              ADD   HL,DE
035B  CB7E            BIT   7,(HL)
035D  C8              RET   Z
035E  3600            LD    (HL),0
0360  FD??06          INC   (IY+CBC)
0363  C9              RET
                      ;
                      ;
                      ;BCD CHANGE SIGN
                      ;
                      ;GIVEN:     HL>ARG  B=SIZE/2+1
                      ;           (SIGNED MAGNITUDE)
                      ;RETURNED:  ARG SIGN BIT COMPLEMENTED
                      ;
0364  48      BCDCS:  LD    C,B
0365  0600            LD    B,0
0367  0D              DEC   C
0368  09              ADD   HL,BC
0369  7E              LD    A,(HL)
036A  EE80            XOR   80H
              ; NAME:    SET BYTE
036C  77      MSETB:  LD    (HL),A
036D  C9              RET
                      ;
                      ;
                      ;DECIMAL ADD
                      ;
                      ;GIVEN:     DE>ARG1  HL>ARG2 (10'S COMPLEMENT)
                      ;           B=SIZE/2+1
                      ;RETURNED:  ARG1=ANSWER (10'S COMPLIMENT)
                      ;
036E  AF      SDADD:  XOR   A
```

```
036F 1A       SDADD1: LD    A,(DE)
0370 8E               ADC   A,(HL)
0371 27               DAA
0372 12               LD    (DE),A
0373 13               INC   DE
0374 23               INC   HL
0375 10F8             DJNZ  SDADD1-$
0377 FE99             CP    99H           ; ** FIX **
0379 17               RLA                 ; ** FIX **
037A 2F               CPL                 ; ** FIX **
037B FD7708           LD    (IY+CBFLAG),A ; SEND BACK STATUS FROM DADD
037E C9               RET

                      ; NAME:             RANGED RANDOM NUMBER
                      ; INPUT:            A = RANGE
                      ; OUTPUT:           A = RANDOM NUMBER (0 TO RANGE-1)
037F F5       MRANGE: PUSH  AF
0380 2AFE4F           LD    HL,(RANSHT)
0383 CDAC03           CALL  SHIFTR
0386 011700           LD    BC,23
0389 09               ADD   HL,BC
038A 8A               ADC   A,D
038B 22FE4F           LD    (RANSHT),HL
038E 2AF14F           LD    HL,(RANSHT+2)
0391 5F               LD    E,A
0392 CDAC03           CALL  SHIFTR
0395 19               ADD   HL,DE
0396 22F14F           LD    (RANSHT+2),HL
0399 5A               LD    E,D
039A EB               EX    DE,HL
039B F1               POP   AF
039C A7               AND   A
039D 4F               LD    C,A
039E 7A               LD    A,D
039F 2808             JR    Z,R3-$
03A1 AF               XOR   A
03A2 19       R1:     ADD   HL,DE
03A3 3001             JR    NC,R2-$
03A5 3C               INC   A
03A6 0D       R2:     DEC   C
03A7 20F9             JR    NZ,R1-$
03A9 C3D10A   R3:     JP    QFROG
03AC 44       SHIFTR: LD    B,H
03AD 4D               LD    C,L
03AE AF               XOR   A
03AF 1607             LD    D,7
03B1 29       SH1:    ADD   HL,HL
03B2 17               RLA
03B3 15               DEC   D
03B4 20FB             JR    NZ,SH1-$
03B6 09               ADD   HL,BC
03B7 8A               ADC   A,D
03B8 C9               RET

                      ; NAME:             SAVE AREA
                      ; INPUT:            HL = SCREEN ADDRESS
                      ;                   DE = SAVE AREA ADDRESS
                      ;                   BC = Y,X SIZE OF AREA TO SAVE
                      ; NOTES:            THE SIZES OF THE OBJECT ARE SAVED IN THE
                      ;                   THE FIRST TWO BYTES OF THE SAVE AREA.
03B9 EB       MSAVE:  EX    DE,HL
03BA 71               LD    (HL),C        ; SET X SIZE
03BB 23               INC   HL
03BC 70               LD    (HL),B        ; SET Y SIZE
03BD 23               INC   HL
03BE AF               XOR   A
03BF EB               EX    DE,HL
03C0 CBF4             SET   6,H           ; SET NONMAGIC ADDRESS
03C2 C5       MSAVE1: PUSH  BC
03C3 E5               PUSH  HL
03C4 47               LD    B,A
03C5 EDB0             LDIR
03C7 E1               POP   HL
```

```
03C8 0E28                 LD    C,BYTEPL
03CA 09                   ADD   HL,BC
03CB C1                   POP   BC
03CC 10E4                 DJNZ  MSAVE1-$
03CE C9                   RET

                ; NAME: PREGAME OUTPUT PORT SETUP
                ; PURPOSE: TO SET CONCOM,VERBL ETC
                ; INPUTS:   B=HORCB, D=VERBL, A=INMOD
03CF 0E09       MSETUP: LD    C,HORCB          ; GET BASE PORT NUMBER
03D1 ED41                 OUT   (C),B          ; HORBD
03D3 0C                   INC   C              ;
03D4 ED51                 OUT   (C),D          ; VERBL
03D6 D30E                 OUT   (INMOD),A
03D8 C9                   RET
                ; NAME: TEST FOR TRANSITIONS
                ; FUNCTION: TO LOOK FOR CHANGES IN THE PORTS &TC.
                ; RETURNS : A= 0 NO CHANGE
                ; 1-8 COUNTER TIMER#N HIT 0
                ; 9-C = POTO-3 CHANGED
                ; D = A SECONDS UP
                ; E= KEYBOARD CHANGED (B=0-24)
                ; F-16 : TRIGO!JOYO - T3!J3
                ; RETURNS NEW VALUE IN B
03D9 5E         CTLP     LD    E,(HL)
03DA 010108               LD    BC,801H
03DD 79         CCTLP    LD    A,C              ; GET MASK
03DE 0F                   RRCA
03DF 4F                   LD    C,A
03E0 A3                   AND   E               ; CHECK IF CT BIT =1
03E1 2003                 JR    NZ,CCT1-$
03E3 10F8                 DJNZ  CCTLP-$
03E5 C9                   RET
03E6 AB         CCT1:     XOR   E               ; MASK OUT BIT IN QUESTION
03E7 77                   LD    (HL),A          ; PUT BACK THE CTFLAGS OR SEMI4
03E8 78                   LD    A,B
03E9 82                   ADD   A,D
03EA E1                   POP   HL              ; OLD RET ADDR
03EB C9                   RET
03EC 2825       TRCHK:    JR    Z,TSEX-$        ; SKIP COUNTER-TIMERS AND POTS?
03EE 21D04F               LD    HL,CUNT         ; GET COUNTER   TIMERS STATUS
03F1 1600                 LD    D,0
03F3 CDD903               CALL  CTLP            ; COUNTER TIMERS
03F6 1608                 LD    D,8
03F8 23                   INC   HL
03F9 CDD903               CALL  CTLP            ; SEMI4S
03FC 011C04               LD    BC,400H+POTO
03FF 23         TPLOP     INC   HL              ; -> MPOTO
0400 ED78                 IN    A,(C)
0402 5E                   LD    E,(HL)          ; GET OPOT
0403 93                   SUB   E
0404 3806                 JR    C,PHOT-$        ; NEW ONE LESS THAN OLD
0406 D604                 SUB   PFUG            ; FUDGE.BOUNCE FACTOR
0408 3806                 JR    C,EPLOP-$       ; NEW MORE THAN OLD+4
040A 3C                   INC   A
040B 83         PHOT:     ADD   A,E
040C 77                   LD    (HL),A
040D 47                   LD    B,A
040E 79                   LD    A,C
040F C9                   RET
0410 0C         EPLOP     INC   C
0411 10EC                 DJNZ  TPLOP-$
                ; NOW TEST SECONDS
0413 21D34F     TSEX:     LD    HL,KEYSEX       ; HL = KEYSEX
0416 7E                   LD    A,(HL)
0417 CB7F                 BIT   7,A
0419 2806                 JR    Z,TKEYS-$
041B CBBF                 RES   7,A
041D 77                   LD    (HL),A
041E 3E0D                 LD    A,SSEC          ; SECS
0420 C9                   RET
                ; NOW TEST KEYBOARD
0421 E5         TKEYS:    PUSH  HL
0422 CD2400               CALL  DELOAD
```

```
0425 EB                       EX   DE,HL
0426 011704                   LD   BC,400H+KEY3
0429 1100FF                   LD   DE,OFF00H      ; SET BIT COUNTER+COLUMNN
042C ED78          MSK1:      IN   A,(C)
042E A6                       AND  (HL)           ; CHECK AGAINST MASK
042F 200A                     JR   NZ,MSENK2-$
0431 0D                       DEC  C              ; NEXT PORT
0432 1C                       INC  E              ; AND COLUMN
0433 23                       INC  HL             ; AND MASK
0434 10F6                     DJNZ MSK1-$
0436 78                       LD   A,B            ; NOTHING DOWN
0437 1E12                     LD   E,SKYU
0439 180B                     JR   MSENKE-$
043B               MSENK2     INC  D              ; BIT COUNTER
043C                          RRCA
043D                          JR   NC,MSENK2-$
043F                          LD   A,D
0440                          RLCA                ; KEY=BIT*4
0441                          RLCA
0442                          ADD  A,E            ; + COLUMN
0443                          INC  A              ; PLUS 1
0444                          LD   E,SKYD
0446               MSENKE     POP  HL
0447                          XOR  (HL)           ; KEY=OKEY?
0448                          AND  7FH
044A                          JR   Z,HANDLE-$
044C                          XOR  (HL)
044D                          LD   (HL),A
044E                          AND  07FH
0450                          LD   B,A
0451                          LD   A,E            ; KEYBOARD RETURN CODE
0452                          RET
                   ; NOW TEST HANDLES
0453               HANDLE:    LD   BC,400H+SWO
0456               SWLOP      INC  HL             ; -> OSWO
0457                          IN   A,(C)
0459                          XOR  (HL)           ; COMPARE THE 2
045A                          JR   NZ,SWHIT-$
                              INC  C
045D                          DJNZ SWLOP-$        ; NO CHANGE
045F                          LD   A,B            ; RETURN O
0460                          RET
0461               SWHIT:     BIT  4,A            ; TEST TRIGGER
0463                          JR   Z,JOYS-$       ; NO TRIG MUST BE JOYSTICK
0465                          AND  10H            ; FILTER OUT TRIGGER
0467                          XOR  (HL)           ; UPDATE VALUE
0468                          LD   (HL),A
0469                          AND  10H
046B                          LD   B,A
046C                          LD   A,C            ; GET PORT NUMBER
046D                          RLCA                ; *2
046E                          SUB  OCH
0470                          RET
0471 AE            JOYS:      XOR  (HL)
0472 77                       LD   (HL),A         ; NO CHANGE IN TRIG SO STORE ST
0473                          AND  OFH            ; TAKE OFF TRIGGER
0475 47                       LD   B,A
0476 79                       LD   A,C
0477 07                       RLCA                ; *2
0478 D60B                     SUB  OBH
047A C9                       RET

                   ; TIMEX
                   ; INPUTS HL-> TIME BASE IN RAM
                   ; B=TIME BASE MODULUS
                   ; C=MASK AS IN DECCTS
                   ; PURPOSE: TO DECR TIMEBASE AND IF O RESET IF AND DECR
                   ;   COUNTER       TIMERS
047B 35            TIMEX:     DEC  (HL)           ; DEC TIMEBASE
047C                          RET  NZ
047D                          LD   (HL),B         ; RESET TIMEBASE

                   ; NAME: DECREMENT COUNTER        TIMERS
```

```
                    ; INPUTS: C=MASK
                    ; USED BY ACTINT AND DECCTS TO DECREMENTS CTS UNDER MASK
                    ; MASK= *76543210* , IF BIT=1 THEN DEC CORESPONDING
                    ; CT# , IF BIT=0 LEAVE CT# ALONE
                    ; NOTE: ALL COUNTERS ARE RUN IN BCD FOR EASY DISPLAY
047E 0608           TIMEY:  LD   B,8           ; NO OF BITS
0480 21D04F                 LD   HL,CTO        ; -> TO COUNTER TIMERS
0483 1600                   LD   D,0           ; RESULTS
0485 CB39           TIMLP:  SRL  C             ; CHANGE THIS TIMER?
0487 300A                   JR   NC,ETLP-$
0489 7E                     LD   A,(HL)        ; GET THE TIMER
048A B7                     OR   A             ; IS IT ZERO ALREADY
048B 2806                   JR   Z,ETLP-$
048D 3D                     DEC  A
048E 27                     DAA
048F 2001                   JR   NZ,+3
0491 37                     SCF
0492 77                     LD   (HL),A        ; STORE NEW VALUE
0493 23             ETLP:   INC  HL
0494 CB1A                   RR   D             ; ROTATES IN CARRY FLAG
0496 10ED                   DJNZ TIMLP-$
0498 3AD04F                 LD   A,(CUNT)      ; COUNTER UPDATE&NUMBER TRACKER
049B B2                     OR   D
049C 32D04F                 LD   (CUNT),A
049F C9                     RET

                    ; NAME: TIMER ROUTINE
                    ; PURPOSE: TO UPDATE GAME TIME,TIMOUT AND MUSIC
                    ; INPUTS          OUTPUTS: NONE
                    ; NOTE: PUSH YOUR REGISTERS (AF,BC,DE,HL)
                    TIM:                       ; ASSUMES YOU PUSH DA REGS
04A0 21E24F                 LD   HL,PRIOR      ; PRIORITY=TICKS
04A3 CB4E                   BIT  1,(HL)        ;CHECK IF TICKS OVERRUN
04A5 C0                     RET  NZ            ; RETURN
04A6 CBCE                   SET  1,(HL)
04A8 EB                     EX   DE,HL
                    ;    *SIXTYITH OF A SECOND INTERUPT*
04A9 21EA4F                 LD   HL,DURAT      ; NOTE TIMER
04AC 7E                     LD   A,(HL)        ; =0 SKIP
04AD B7                     OR   A
04AE 281C                   JR   Z,SIXY-$
04B0 35                     DEC  (HL)
04B1 200B                   JR   NZ,STAKO-$
04B3 E5                     PUSH HL
04B4 DDE5                   PUSH IX
04B6 CD1405                 CALL MUZCPU        ; =0 DO NEXT NOTE
04B9 DDE1                   POP  IX
04BB E1                     POP  HL
04BC 180F                   JR   SIXY-$
04BE EB             STAKO:  EX   DE,HL
04BF CB7E                   BIT  7,(HL)
04C1 EB                     EX   DE,HL
04C2 2008                   JR   NZ,SIXY-$
04C4 3D                     DEC  A
04C5 3D                     DEC  A             ; =1 QUIET NOTE
04C6 2004                   JR   NZ,SIXY-$
                    ; A=0
04C8 D316                   OUT  (VOLAB),A
04CA D315                   OUT  (VOLC),A
04CC 23             SIXY:   INC  HL
04CD 35                     DEC  (HL)          ;IF(--TMR60<0)
04CE F20205                 JP   P,GOUT        ; ELZ ONWARD
04D1 363B                   LD   (HL),59       ;THEN TMR60=59
04D3 23                     INC  HL            ; -> TIMOUT
04D4 EB                     EX   DE,HL
04D5 21E04F                 LD   HL,KEYSEX     ; SET SECONDS UP
04D8 CBFE                   SET  7,(HL)
04DA EB                     EX   DE,HL
04DB 7E                     LD   A,(HL)        ; CHECK IF ZERO
04DC B7                     OR   A
04DD 2801                   JR   Z,GTIMER-$
04DF 35                     DEC  (HL)          ; DEC TIMOUT
                    ;  *GAME TIMER ONCE A SECOND ROUTINE*
                    ;  IF (SEC != 0 & MIN !=0)
```

```
                      ;      IF (SEC == 0)
                      ;         SEC=59; --MIN
                      ;      ELSE --SEC
                      ; ELSE GAMETIMEUP=1
04E0            GTIMER: INC  HL           ;->GTSECS
04E1 [illegible]        LD   A,(HL)       ;IF (SEC!=0
04E2 [illegible]        INC  HL           ;->GTMINS
04E3 [illegible]        OR   (HL)         ; & MIN!=0)
04E4 [illegible]        JR   Z,GT02-$
04E6 [illegible]        DEC  HL           ;->GTSECS AGAIN
04E7 [illegible]        LD   A,(HL)       ;IF (SEC ==0)
04E8 [illegible]        OR   A
04E9 [illegible]        JR   NZ,GT01-$
04EB [illegible]        LD   (HL),59H     ; THEN SEC=59BCD
04ED [illegible]        INC  HL           ;->GTMINS AGAIN
04EE [illegible]        LD   A,(HL)       ; --MIN
04EF [illegible]        DEC  A
04F0 [illegible]        DAA
04F1 77                 LD   (HL),A
04F2 180E               JR   GOUT-$
04F4 3D         GT01:   DEC  A            ; ELSE --SEC
04F5 27                 DAA
04F6 77                 LD   (HL),A
04F7 [illegible]        JR   GOUT-$
04F9 [illegible]04F GT02: LD HL,GAMSTB    ; ELSE GAMETIMEUP=1
04FC [illegible]        BIT  GSBTIM,(HL)
04FE [illegible]        JR   Z,GOUT-$
0500 [illegible]        SET  GSBEND,(HL)
0502 [illegible]F94F GOUT LD HL,PRIOR
0505 [illegible]        RES  1,(HL)
0507 [illegible]        RET               ;RETURN TO BACKGND OR LO LEVEL
                      ; NAME: START MUZCPU
                      ; PURPOSE: TO START MUSIC PLAYING (ALSO NOISES)
                      ; INPUTS: HL -> SCORE
                      ; A=VOICES
                      ; NOTE: YOU SHOULD LOAD MUZSP IF YOU DO CALLS
0508 32D44F     MUZSET  LD   (VOICES),A
050B DD22D04F           LD   (MUZSP),IX
050F CDFC05             CALL MUZSTP
0512 1803               JR   MUZCP1-$
                      ; NAME: MUZCPU
                      ; PURPOSE: PLAYING MUSIC AND NOISES
                      ; NOTE: DURAT=0 WHEN CALLED
                      ; OUTPUT: NONE
                      ; *MUSIC PROCESSOR*
                      ; FETCH OPCODE
                      ; IF (OPCODE < 80H)
                      ;      SET NOTE DURATION ETC
                      ; ELSE
                      ; SWITCH (OPCODE & 0F0H)
                      ; CASE 80H:
                      ;      IF (MASK=8) STUFF SNDBX;PC=PC+9
                      ;      ELSE OUTPUT(MASK)=DATA
                      ; CASE 90H:
                      ;      VOICES=DATA
                      ; CASE A0H:
                      ;       (--SP)=DATA IN NIBBLE OF OP +1
                      ; CASE B0H:
                      ;      SET VOLUMES = DATA,DATA
                      ; CASE C0H:
                      ;      SWITCH (MASK)
                      ;           CASE 9: MPCL=(MSP++); MPCH=(MSP++); BREAK
                      ;           CASE D: (--MSP)=MPCH; (--MSP)=MPCL
                      ;           CASE 0: IF --(SP)==0 THEN SP++
                      ;           CASE 3: MPC=DATA16
                      ; CASE D0H: CALL RELATIVE
                      ; CASE E0: DURAT=DATA
                      ; CASE F0: VOICES=0,PORTS=0
0514 2ACE4F     MUZCPU  LD   HL,(MUZPC)   ; LOOK LIKE NORMAL LOOP RETURN
0517 DD2AD04F   MUZCP1  LD   IX,(MUZSP)   ; FETCH STACK POINTER
051B 7E         OPLOOP  LD   A,(HL)       ; OPCODE FETCH
051C 23                 INC  HL           ;->OPERAND,DATA
051D B7                 OR   A            ; TEST FOR 80H OR MORE
051E FA5B05             JP   M,M00
                      ; NORMAL NOTE OPERATOR
```

```
0521 32D64F          LD    (DURAT),A
0524 3AD44F          LD    A,(VOICES)
0527 011808          LD    BC,800H+SNDBX
052A CB3F            SRL   A              ; SET NOISE
052C 3002            JR    NC,+4
052E EDA3            OUTI
0530 0605            LD    B,5            ; -> VIBRATO
0532 CB3F            SRL   A
0534 3002            JR    NC,+4
0536 EDA3            OUTI                 ; SET VIBRATO
0538 0604            LD    B,4            ; -> NOTEC
053A CB3F    M81:    SRL   A              ; CHECK C,B,A
053C [illegible]     JR    NC,M82-$
053E EDA3            OUTI
0540 CB3F    M815    SRL   A              ; CHECK IF INC PC WAS ON
0542 3807            JR    C,M83-$
0544 2B              DEC   HL             ; RESTORE PC
0545 1804            JR    M83-$
0547 05      M82     DEC   B
0548 23              INC   HL
0549 18F5            JR    M815-$
054B B7      M83     OR    A
054C 20ED            JR    NZ,M81-$
                     ; PLAY NOTE
054E 3AD24F          LD    A,(PVOLAB)
0551 D316            OUT   (VOLAB),A
0553 3AD34F          LD    A,(PVOLMC)
0556 D315            OUT   (VOLC),A
0558 C3[illegible]405 JP   MUZ999
055B [illegible] M00:   CP    90H
055D [illegible]     JR    NC,M01-$
                     ; STUFF PORT OR SOUND BLOCK
055F [illegible]     BIT   3,A            ; IF (STUFF SNDBLK)
0561 [illegible]     JR    Z,M001-$
0563 [illegible]     LD    A,B            ; SAVE B (VSN)
0564 [illegible]1808 LD    BC,8*256+SNDBX ; B=8, C=SNDBX
0567 [illegible]     OTIR                 ; HL->NEXT OPCODE WHEN DONE
0569 [illegible]     JR    OPLOOP-$
056B [illegible] M001:  AND   7              ; ISOLATE PORT NUMBER
056D [illegible]     OR    10H            ; PORTS 10H-17H
056F [illegible]     LD    C,A            ; SET PORT REGISTER
0570 [illegible]     OUTI
0572 [illegible]     JR    OPLOOP-$
0574 [illegible] M01:   JR    NZ,M02-$
0576 [illegible]     LD    A,(HL)         ; GET NEW VOICES
0577 [illegible]     INC   HL
0578 [illegible]D44F LD    (VOICES),A
057B [illegible]E    JR    OPLOOP-$
057D FEB0    M02:    CP    0B0H
057F [illegible]06   JR    NC,M03-$
0581 [illegible]F    AND   0FH
0583 [illegible]     LD    E,A
0584 [illegible]     INC   E
0585 1[illegible]E   JR    M045-$
0587 FEC0    M03:    CP    0C0H           ; SET VOL ETC
0589 [illegible]     JR    NC,M04-$
                     ; LOAD PVOLS
058B [illegible]4F   LD    DE,PVOLAB
058F [illegible]     LDI                  ; DONT CARE ABOUT BC
0590 [illegible]     LDI
0592 [illegible]7    OPLP2   JR    OPLOOP-$
0594 [illegible]     M04     JR    NZ,M040-$
0596 [illegible]3500 DEC   (IX+0)         ; DEC STACK TOP
0599 [illegible]0A   JR    NZ,M041-$
059B DD23            INC   IX
059D [illegible]     INC   HL
059E [illegible]     INC   HL
059F 18F1            JR    OPLP2-$
05A1 FED0    M040    CP    0D0H           ; PC SP STUFF
05A3 [illegible]27   JR    NC,M05-$
05A5 [illegible]     M041    AND   0FH    ; ISOLATE MASK
05A7 [illegible]     CP    9              ; RETURN
05A9 [illegible]     JR    NZ,M043-$
05AB DD6E00          LD    L,(IX+0)
05AE DD23            INC   IX
```

```
05B0 DD6600         LD   H,(IX+0)
05B3 DD23           INC  IX
05B5 18DB           JR   OPLP2-$
05B7 5E     M043:   LD   E,(HL)         ; PCL=
05B8 23             INC  HL
05B9 56             LD   D,(HL)         ; PCH=
05BA 23             INC  HL
05BB EB             EX   DE,HL          ; SET THE PC
05BC FE04           CP   4              ; IS IT A JMP?
05BE [illegible]02  JR   C,OPLP2-$      ; IT IS
05C0 DD[illegible]B M044 DEC IX             ; ITS A CALL
05C2 [illegible]00  LD   (IX+0),D       ; (--SP)=PCH
05C5 [illegible]    M045 DEC IX
05C7 [illegible]00  LD   (IX+0),E       ; (--SP)=PCL
05CA [illegible]    JR   OPLP2-$
05CC [illegible]    M05. CP  0E0H
05CE [illegible]    JR   NC,M06-$
05D0 [illegible]    AND  0FH
05D2 [illegible]    LD   B,0
05D4 4F             LD   C,A
05D5 [illegible]    LD   D,H
05D6 [illegible]    LD   E,L
05D7 [illegible]    ADD  HL,BC
05D8 [illegible]    JR   M044-$         ; CALL
05DA [illegible]    M06  JR  NZ,M061-$
05DC [illegible]24F LD   A,(PRIOR)      ; LEGSTA
05DF [illegible]    XOR  80H
05E1 [illegible]4F  LD   (PRIOR),A
05E4 [illegible]    JR   OPLP2-$
05E6 [illegible]    M061 CP  0F0H           ; REST VOICE (OR SUSTAIN)
05E8 [illegible]    JR   Z,MUZSTP-$
05EA 4E             LD   A,(HL)
05EB [illegible]4F  LD   (DURAT),A      ; SET DURATION OF QUIET
05EE [illegible]    INC  HL
05EF AF             XOR  A
05F0 [illegible]    OUT  (VOLAB),A
05F2 [illegible]    OUT  (VOLC),A
                    ; END OF MUZIC PROCESSOR
05F4 [illegible]4F  MUZ999: LD (MUZPC),HL   ; SAVE THE PC
05F7 [illegible]4F  LD   (MUZSP),IX     ; SAVE THE STACK POINTER
05FB [illegible]    RET
                    ; NAME MUZSTP
                    ; PURPOSE: STOR MUZCPU,SET PORTS TO 0
05FC AF     MUZSTP: XOR  A
05FD [illegible]4F  LD   (DURAT),A
0600 [illegible]4F  LD   (PRIOR),A
0603 [illegible]08  LD   BC,800H+SNDBX
0606 [illegible]    OUT  (C),A
0608 [illegible]    DJNZ -2
060A [illegible]    RET
                    ; NAME: DO IT
                    ; PURPOSE:       TRANSFER CONTROL TO USER STATE TRANSITION
                    ; INPUT:         A = RETURN CODE FROM SENTRY ROUTINE
                    ;          HL = DO IT TABLE ADDRESS
                    ; OUTPUT:
                    ; DESCRIPTION:  THIS ROUTINE IS USED WITH THE SENTRY ROUT
                    ;          IT IS USED FOR DISPATCHING TO A STATE TRANSITION
                    ;          ROUTINE.  THE RETURN CODE FROM SENTRY IS USED TO
                    ;          SEARCH THE DOIT TABLE.  IF A MATCH IS FOUND, CONT
                    ;          TRANSFERED.  IF NO MATCH IS FOUND, THE ROUTINE RE
                    ;          THE DOIT TABLE IS MADE UP OF THREE BYTE ENTRYS:
                    ;          BYTE 0 BIT 7: IF SET - DO A MCALL TO THIS HANDLER
                    ;          BYTE 0 BIT 6: IF SET - DO A RCALL TO THIS HANDLER
                    ;          BYTE 0 BITS 5-0: RETURNCODE THIS ROUTINE IS TO PR
                    ;          BYTE 1 AND 2: THE ADDRESS TO TRANSFER TO.
                    ;          THE LIST IS TERMINATED BY A BYTE WHICH IS .GE. 0C
060B 78     MDOITB  LD   A,B
060C D5     MDOIT:  PUSH DE
060D 57             LD   D,A
060E 7E     MDOITO: LD   A,(HL)         ; GET RETURN CODE FOR THIS ENTR
060F 4F             LD   C,A            ; C = CURRENT ENTRY
0610 [illegible]    CP   0C0H           ; LIST TERMINATOR?
0612 [illegible]02  JR   C,MDOIT1-$     ; NO - JUMP
0614 D1             POP  DE             ; YES - RETURN
0615 [illegible]    RET
```

```
MDOIT1: INC  HL
        AND  3FH
        CP   D              ; NORMAL MATCH?
        JR   Z,MDOIT2-$     ; JUMP IF SO
MDO1A:  INC  HL             ; NO MATCH - SKIP OVER
        INC  HL             ; GO TO ADDRESS
        JR   MDOIT0-$
MDOIT2: POP  DE
MDOIT3: LD   E,(HL)         ; DE = GOTO ADDR
        INC  HL
        LD   D,(HL)
        EX   DE,HL
        BIT  7,C            ; MCALL?
        JP   NZ,MMCALL      ; JUMP IF SO
        BIT  6,C            ; RCALL?
        JR   NZ,MRCALL-$
        POP  DE             ; MUST BE JUMP
        POP  AF
        PUSH HL
        EX   DE,HL
; RCALL ROUTINE
MRCALL: JP   (HL)
 ; **********************
 ; * VECTORING ROUTINES *
 ; **********************
 ; NAME:          VECTOR X AND Y COORDINATES
 ; PURPOSE:       UPDATE X,Y COORDINATES AND LIMIT CHECK
 ; INPUT:         IX = VECTOR PACKET
 ;                HL = LIMITS TABLE
 ; OUTPUT:        C = TIME BASE USED
 ;                NONZERO STATUS SET IF OBJECT MOVED
 ; NOTES:
 ;   THIS ROUTINE WORKS WITH A 'VECTOR PACKET', WHICH LOO
 ; *********************************
 ; *BYTE*    CONTENTS     * NAME   *
 ; *********************************
 ; * 00 * MAGIC REGISTER * VBMR   *
 ; *********************************
 ; * 01 * VECTOR STATUS  * VBSTAT *
 ; *********************************
 ; * 02 * TIME BASE      * VBTIMB *
 ; *********************************
 ; * 03 * DELTA X        * VBDXL  *
 ; * 04 *                * VBDXH  *
 ; *********************************
 ; * 05 * X COORDINATE   * VBXL   *
 ; * 06 *                * VBXH   *
 ; *********************************
 ; * 07 * X CHECKS MASK  * VBXCHK *
 ; *********************************
 ; * 08 * DELTA Y        * VBDYL  *
 ; * 09 *                * VBDYH  *
 ; *********************************
 ; * 0A * Y COORDINATE   * VBYL   *
 ; * 0B *                * VBYH   *
 ; *********************************
 ; * 0C * Y CHECKS MASK  * VBYCHK *
 ; *********************************
 ;
 ; OPTIONS BYTE:
 ; BIT  MEANING
 ; ---  -------
 ;  7   VECTOR IS ACTIVE
 ;
 ; CHECKS BYTE:
 ; BIT  MEANING
 ; ---  -------
 ;  0   DO LIMIT CHECKS
 ;  1   REVERSE COORDINATES ON LIMIT ATTAINMENT
 ;  3   TARGET ATTAINED (OUTPUT)
 ;   IF THE VECTOR IS ACTIVE, AND THE TIME BASE IS NONZER
 ; THEN THE UPDATE COORDINATE ROUTINE IS CALLED FOR THE X
 ; AND Y PORTIONS OF THE PACKET.
MVECT:  SET  PSWZRO,(IY+CBFLAG) ; SET ZERO FLAG
        BIT  VBSACT,(IX+VBSTAT) ; IS VECTOR ACTIVE?
```

```
                        LD    C,(IX+VBTIMB) ; TIME BASE TO C
                        LD    (IX+VBTIMB),0 ; ZERO TIME BASE
                        LD    (IY+CBC),C    ; PASS BACK TIME BASE
                        RET   Z
                        LD    A,C
                        AND   A             ; IS TIME BASE ZERO?
                        RET   Z             ; QUIT IF SO
                        LD    DE,VBDXL      ; ADVANCE TO FIRST
                        ADD   IX,DE
                        CALL  MVECTC        ; UPDATE FIRST COORDINATE
                        LD    DE,VBDYL-VBDXL ; TO Y
                        ADD   IX,DE
                 ; AND FALL INTO...
                 ; NAME:        VECTOR COORDINATE
                 ; PURPOSE:     UPDATE OF SINGLE COORDINATE
                 ; INPUT:       IX = POINTER TO L.O. DELTA BYTE OF VECTOR
                 ;              C = TIME BASE
                 ;              HL = LIMITS PACKET (IF USED)
                 ; OUTPUT:      NONZERO STATUS SET IF MOTION OCCURED
                 ;              (SHOULD BE SET ON CALL, SINCE IT IS NOT S
                 ; NOTES:
                 ;   THIS ROUTINE OPERATES ON A SUBSET OF THE VECTOR PACK
                 ; (BETWEEN L.O. DELTA BYTE AND CHECKS BYTE).
                 ;   THE DELTA IS ADDED TO THE COORDINATE TIME-BASE TIMES
                 ; IF OPTIONED, LIMIT CHECKING IS DONE.  IF THE CHECK FAI
                 ; THE COORDINATE IS SET TO THE LIMIT.
                 ; WHEN THIS HAPPENS, THE LIMIT ATTAINED BIT IS SET
0656 E5          MVECTC: PUSH HL
0657 DD5601             LD    D,(IX+VBDCH) ; LOAD DELTA
065A DD5E00             LD    E,(IX+VBDCL)
065D DD6603             LD    H,(IX+VBCH)  ; LOAD COORDINATE
0660 DD6E02             LD    L,(IX+VBCL)
0663 7C                 LD    A,H          ; SAVE OLD COORDINATE FOR MOTIO
0664 41                 LD    B,C
0665 19          MVECT1: ADD  HL,DE         ; ADD DELTA TO COORD
0666 10FD               DJNZ  MVECT1-$     ; TIME-BASE TIMES
                 ; HAS MOTION OCCURED?
0668 BC                 CP    H
0669 2804               JR    Z,MVCT1A-$   ; JUMP TO SKIP TESTS IF SO
066B FDCB08B6           RES   PSWZRO,(IY+CBFLAG) ; SET MOVED STATUS
                 ; IS LIMIT CHECK WANTED?
066F DDCB0446    MVCT1A: BIT  VBCLMT,(IX+VBCCHK)
0673 2831               JR    Z,MVECT6-$   ; MVECT6 IF NOT
                 ; PERFORM LIMIT CHECK
0675 7C                 LD    A,H
0676 E3                 EX    (SP),HL
0677 46                 LD    B,(HL)       ; LIMIT TO B
0678 23                 INC   HL
                 ; HANDLE SLIGHTLY LESS THAN ZERO CASE
0679 FECF               CP    207          ; MIDPOINT BETWEEN 160 AND 0
067B 3007               JR    NC,MVECT2-$  ; JUMP TO FAIL IF >207
067D B8                 CP    B            ; DO COMPARE
067E 3804               JR    C,MVECT2-$   ; JUMP ON FAIL
0680 46                 LD    B,(HL)       ; UPPER LIMIT CHECK
0681 B8                 CP    B
0682 3820               JR    C,MVECT3-$   ; JUMP ON PASS
0684 23          MVECT2: INC  HL
                 ; A LIMIT WAS EXCEEDED - SET COORDINATE AT LIMIT
0685 DD7003             LD    (IX+VBCH),B
0688 DD360200           LD    (IX+VBCL),0
068C DDCB04DE           SET   VBCLAT,(IX+VBCCHK) ; SET LIMIT ATTAINED
                 ; IS REVERSE DELTA OPTION SET?
0690 F1                 POP   AF           ; CLEAN UP STACK
0691 DDCB044E           BIT   VBCREV,(IX+VBCCHK)
0695 C8                 RET   Z            ; QUIT IF NOT
                 ; REVERSE THE BIMBO
0696 7A                 LD    A,D
0697 2F                 CPL
0698 57                 LD    D,A
0699 7B                 LD    A,E
069A 2F                 CPL
069B 5F                 LD    E,A
069C 13                 INC   DE
069D DD7300             LD    (IX+VBDCL),E ; STORE BACK
06A0 DD7201             LD    (IX+VBDCH),D
```

```
06A3 C9                     RET
06A4 23           MVECT3:   INC   HL                   ; STEP PAST LIMIT
06A5 E3                     EX    (SP),HL              ; HL = COORDINATE AGAIN
06A6 DD7502       MVECT6:   LD    (IX+VBCL),L          ; STORE BACK COORDINATES
06A9 DD7403                 LD    (IX+VBCH),H
06AC E1                     POP   HL                   ; RESTORE LIMITS POINTER
06AD DDCB049E               RES   VBCLAT,(IX+VBCCHK)  ; CLEAR ATTAINED BIT
06B1 C9                     RET
                  ; ****************************
                  ; * PAINT RECTANGLE ROUTINE *
                  ; ****************************
                  ; NAME:               PAINT RECTANGLE
                  ; INPUT:              A = COLOR MASK TO WRITE
                  ;                     B = Y SIZE
                  ;                     C = X SIZE
                  ;                     D = Y COORDINATE
                  ;                     E = X COORDINATE
06B2 AF           MPAINT:   XOR   A
06B3 CD4E0B                 CALL  RELTA1
06B6 EB                     EX    DE,HL                ; UNMAGIC THE G** D*** ADDR
06B7 CBF4                   SET   6,H
06B9 D30C                   OUT   (MAGIC),A
                  ;         XOR       A
                  ;         LD        (URINAL),A       ; PRIME THE SOB
06BB FD5E09                 LD    E,(IY+CBA)
06BE [illegible]            LD    A,C
06BF [illegible]            RRCA
06C0 [illegible]            RRCA
06C1 [illegible]            AND   3FH
06C3 [illegible]            INC   A
06C4 [illegible]            LD    D,A
06C5 [illegible]  MPT1:     DEC   D
06C6 [illegible]            JR    Z,MPT2-$
06C8 3EFF                   LD    A,0FFH
06CA CD[illegible]          CALL  STRIPE
06CD [illegible]            JR    MPT1-$
06CF [illegible]  MPT2:     LD    A,C
06D0 [illegible]            AND   03H
06D2 [illegible]            INC   A
06D3 [illegible]            LD    C,A
06D4 [illegible]            XOR   A
06D5 [illegible]  MPT3:     DEC   C
06D6 [illegible]            JR    Z,MPT4-$
06D8 [illegible]            RRCA
06D9 [illegible]            RRCA
06DA [illegible]            ADD   A,11000000B
06DC [illegible]            JR    MPT3-$
06DE CD[illegible]  MPT4:   CALL  STRIPE
06E1 [illegible]            XOR   A
                  ; AND FALL INTO ...
                  ; STRIPE PAINTER
                  ; HL = ADDRESS OF STRIPE A = DATA E =MASK B = ITERATIONS
                  ; OUT HL=HL+1 A = CLOBBERED
06E[illegible]    STRIPE:   PUSH  HL
06E[illegible]              PUSH  BC
06E[illegible] [illegible]0F  LD    (URINAL),A
06E[illegible] [illegible]F4F LD    A,(URINAL+4000H)
06E[illegible]              LD    C,A
06E[illegible]    STRP1:    LD    A,E
06E[illegible]              XOR   (HL)
06E[illegible]              AND   C
06E[illegible]              XOR   (HL)
06E[illegible]              LD    (HL),A
06F[illegible]              LD    A,L
[illegible]                 ADD   A,BYTEPL
[illegible]                 LD    L,A
[illegible]                 LD    A,H
06F5 CE00                   ADC   A,0
06F7 67                     LD    H,A
06F8 10F1                   DJNZ  STRP1-$
06FA C1                     POP   BC
06FB E1                     POP   HL
06FC 23                     INC   HL
06FD C9                     RET
```

```
                        ; ******************
                        ; * WRITE ROUTINES *
                        ; ******************
                        ; NOTES:          THE GENERAL CALLING SEQUENCE FOR THE WRI
                        ; INPUT:          HL = PATTERN ADDRESS
                        ;                 D = Y COORDINATE
                        ;                 E = X COORDINATE
                        ;                 B = Y SIZE
                        ;                 C = X SIZE
                        ;                 A = MAGIC REGISTER
                        ; OUTPUT:         DE = SCREEN ADDRESS USED
                        ;                   THESE ROUTINES ARE NESTED, FOR EXAMPLE
                        ;                 WRITP, WHICH FALLS INTO WRIT, WHICH FALL
                        ; ENTRY:          WRITE FROM VECTOR
                        ; INPUT:          HL = PATTERN ADDRESS
                        ;                 IX = VECTOR ADDRESS
                        ; OUTPUT:         DE, A
                        ; SIDE EFFECTS:   BLANK BIT SET IN VECTOR STATUS BYTE
06FF DD7E00             MVWRIT: LD    A,(IX+VBMR)    ; LOAD MR
0701 DD5608                     LD    D,(IX+VBYH)    ; LOAD Y
0704 DD5E06                     LD    E,(IX+VBXH)    ; LOAD X
0707 DDCB01F6                   SET   VBBLNK,(IX+VBSTAT) ; SET BLANK BIT
                        ; ENTRY:          WRITE RELATIVE
                        ; PURPOSE:        WRITING RELATIVE PATTERNS
                        ; INPUT:          HL,DE,A
                        ; OUTPUT:         DE
                        ; NOTES:          PATTERN IS PRECEEDED BY RELATIVE DISPLAC
                        ;                 (X FIRST, THEN Y) AND PATTERN SIZE
070B F5                 MWRITR: PUSH AF               ; SAVE MR
070C 7E                         LD    A,(HL)          ; GET REL X
070D 23                         INC   HL
070E 83                         ADD   A,E             ; ADD TO SUPERIOR X
070F 5F                         LD    E,A
0710 7E                         LD    A,(HL)          ; SAME STORY FOR Y
0711 23                         INC   HL
0712 82                         ADD   A,D
0713 57                         LD    D,A
0714 F1                         POP   AF
                        ; ENTRY:          WRITE WITH PATTERN SIZE SCARE-UP
                        ; PURPOSE:        WRITING VARIABLE SIZED PATTERNS
                        ; INPUT:          HL,DE,A
                        ; OUTPUT:         DE
                        ; NOTES:          FIRST TWO BYTES POINTED AT BY HL ARE TAK
                        ;                 TO BE PATTERN SIZES (X SIZE FIRST)
0715 4E                 MWRITP: LD    C,(HL)          ; GET X SIZE
0716 23                         INC   HL
0717 46                         LD    B,(HL)          ; AND Y
0718 23                         INC   HL
                        ; ENTRY:          WRITE WITH COORDINATE CONVERSION
                        ; INPUT:          HL,DE,BC,A
                        ; OUTPUT:         DE
0719 CD[illegible]0A    MWRIT:  CALL MRELAB          ; DO CONVERSION
                        ; ENTRY:          WRITE ABSOLUTE
                        ; INPUT:          HL,BC,A AS ABOVE
                        ;                 DE = ABSOLUTE SCREEN ADDRESS
071C CB77               MWRITA: BIT   MRFLOP,A        ; FLOP WRITE WANTED?
071E 20[illegible]              JR    NZ,MWRTFL-$     ; MWRTFL IF SO
0720 CB[illegible]              BIT   MRXPND,A        ; EXPAND WANTED?
0722 2011                       JR    NZ,MWX-$        ; JUMP IF SO
                        ; DO NORMAL? WRITE
0724 AF                         XOR   A
0725 C5                 MWRT:   PUSH BC
0726 D5                         PUSH DE
0727 47                         LD    B,A             ; ZERO REGISTER B
0728 EDB0                       LDIR                  ; WRITE A LINE
072A 12                         LD    (DE),A          ; FLUSH THE SHIFTER
072B D1                         POP   DE
072C EB                         EX    DE,HL           ; ADVANCE TO NEXT LINE
072D 0E28                       LD    C,BYTEPL
072F 09                         ADD   HL,BC
0730 EB                         EX    DE,HL
0731 C1                         POP   BC
0732 10F1                       DJNZ MWRT-$           ; LOOP IF MORE GOODIES
0734 C9                         RET
                        ; WRITE EXPANDED
```

```
MWX:     EX   DE,HL
MWX1:    PUSH BC
         PUSH HL
         LD   B,C
MWX2:    LD   A,(DE)
         INC  DE
         LD   (HL),A
         INC  HL
         LD   (HL),A
         INC  HL
         DJNZ MWX2-$
         LD   (HL),B
         INC  HL
         LD   (HL),B
         POP  HL
         LD   C,BYTEPL
         ADD  HL,BC
         POP  BC
         DJNZ MWX1-$
         RET
; ROUTINE TO HANDLE FLOPPED CASE
MWRTFL:  BIT  MRXPND,A      ; EXPANDED FLOPPED WRITE WANTED
         JR   NZ,MWXF-$     ; JUMP IF YEP
         XOR  A
WRFL1:   PUSH BC
         PUSH DE
         LD   B,A
WRFL2:   LDI
         DEC  DE
         DEC  DE
         JP   PE,WRFL2
         LD   (DE),A        ; FLUSHETH
         POP  DE
         EX   DE,HL         ; SAME AS NORMAL NOW ON
         LD   C,BYTEPL
         ADD  HL,BC
         EX   DE,HL
         POP  BC
         DJNZ WRFL1-$
         RET
; WRITE EXPANDED FLOPPED ROUTINE
0766 EB          MWXF:    EX   DE,HL
0767 C5          MWXF1:   PUSH BC
0768 E5                   PUSH HL
0769 41                   LD   B,C
076A 1A          MWXF2:   LD   A,(DE)
076B 13                   INC  DE
076C 77                   LD   (HL),A
076D 2B                   DEC  HL
076E 77                   LD   (HL),A
076F 2B                   DEC  HL
0770 10F8                 DJNZ MWXF2-$
0772 70                   LD   (HL),B
0773 2B                   DEC  HL
0774 70                   LD   (HL),B
0775 E1                   POP  HL
         LD   C,BYTEPL
         ADD  HL,BC
         POP  BC
         DJNZ MWXF1-$
         RET
; NAME:          BLANK FROM VECTOR
; PURPOSE:       BLANK WITH INFO LOAD FROM VECTOR
; INPUT:         IX = VECTOR
;                E = X SIZE
;                D = Y SIZE
; NOTES:         THIS ROUTINE BLANKS TO 00
;                THIS ROUTINE INTERROGATES THE BLANK BIT
;                AND REFRAINS FROM BLANKING IF NOT SET
;                IF IT WAS SET, IT IS THEN RESET
MVBLAN:  BIT  VBBLNK,(IX+VBSTAT) ; IS BLANK BIT SET?
         RET  Z                  ; QUIT IF NOT
         RES  VBBLNK,(IX+VBSTAT) ; KILL BLANK BIT
         LD   H,(IX+VBOAH) ; LOAD BLANK ADDRESS
         LD   L,(IX+VBOAL)
```

```
07??  DDCB0076        BIT   MRFLOP,(IX+VBMR) ; IS FLOP SET?
07??                  JR    Z,MVBLA1-$       ; JUMP IF NOT
07??                  LD    A,E              ; X SIZE TO A
07??                  NEG                    ; TWOS COMPLEMENT AND ADD 1
07??                  INC   A
07??                  LD    C,A
07??                  LD    B,0FFH
07??                  ADD   HL,BC            ; USE TO BACK UP SCREEN ADDRESS
                ; UNMAGIC THE BLANK ADDRESS
07??            MVBLA1:
07??                  SET   6,H
07??                  LD    B,0              ; ASSUME BLANK TO ZERO
                ; NAME:          BLANK AREA
                ; PURPOSE:       SETTING N X M REGION TO CONSTANT
                ; INPUT:         HL = BLANK ADDRESS
                ;                E = X SIZE
                ;                D = Y SIZE
                ;                B = DATA TO FILL WITH
079F            MBLANK: LD    A,BYTEPL       ; COMPUTE LINE INCEMENT
07A0                  SUB   E
07A1  4F              LD    C,A
07A2                  LD    A,B              ; A = DATA TO FILL WITH
07A3            MBLAN1: LD    B,E
07A4  77        MBLAN2: LD    (HL),A
07A5  23              INC   HL
07A6  10FC            DJNZ  MBLAN2-$
07A8  09              ADD   HL,BC
07A9  15              DEC   D
07AA  20F7            JR    NZ,MBLAN1-$
07AC  C9              RET
                ; NAME:          RESTORE AREA
                ; INPUT:         HL = SCREEN ADDRESS TO RESTORE TO
                ;                DE = SAVE AREA ADDRESS
                ; NOTE:          SIZES ARE LOADED FROM THE SAVE AREA
07AD  EB        MREST:  EX    DE,HL
07AE  4E              LD    C,(HL)
07AF  23              INC   HL
07B0                  LD    B,(HL)
07B1                  INC   HL
07B2                  SET   6,D              ; MAKE SURE WE ARE NONMAGIC
07B4                  XOR   A
07B5            MREST1: PUSH  BC
07B6                  PUSH  DE
07B7                  LD    B,A
07B8                  LDIR
07BA                  EX    DE,HL
07BB                  POP   HL
07BC                  LD    C,BYTEPL
07BE                  ADD   HL,BC
07BF                  EX    DE,HL
07C0                  POP   BC
07C1                  DJNZ  MREST1-$
07C3                  RET
                ; ********************************
                ; * CHARACTER DISPLAY ROUTINES *
                ; ********************************
                ; NAME:          DISPLAY STRING
                ; PURPOSE:       MESSAGE DISPLAY
                ; INPUT:         E,D = X, Y COORDINATES
                ;                HL = STRING ADDRESS
                ;                IX = FONT DESCRIPTOR
                ; OUTPUT:        D,E ALTERED AS IN DISPLAY CHARACTER
                ; STACK USE:     4 BYTES (EXCLUDING USE BY SYSPCH)
                ; EXPLAINATION: AS EACH CHARACTER IS BROUGHT IN, IT
                ; IS TESTED FOR BEING A LIST TERMINATOR ( CHAR = 0)
                ; IF IT ISN'T, DISPLAY CHARACTER IS CALLED AND THE
                ; TEST IS REPEATED FOR THE NEXT CHARACTER.  THUS
                ; A NULL STRING IS HANDLED PROPERLY.
07C4  7E        STRNEW: LD    A,(HL)         ; GET CHARACTER
07C5  A7              AND   A                ; BE IT A TERMINATOR?
07C6  C8              RET   Z                ; QUIT IF SO
07C7  FACF07          JP    M,STRD1          ; DISPLAY IF ALT FONT
07CA  FE64            CP    64H              ; SUCK IN STRING?
07CC  3006            JR    NC,STRD2-$       ; JUMP IF YES
07CE  CDF107    STRD1:  CALL  DISPCH         ; SHOW CHAR
```

```
          INC  HL              ; ADVANCE TO NEXT CHAR
          JR   STRNEW-$        ; AND LOOP
STRD2:    AND  10111B          ; MAKE SUCK MASK
          LD   B,A
          INC  HL
          EX   DE,HL
          CALL MSUCK1
          CALL RELD
          JR   STRNEW-$        ; GO AFTER NEXT CHARACTER
; *****************************
; * CHARACTER DISPLAY ROUTINE *
; *****************************
; INPUT:           A = CHARACTER
;                  C = OPTIONS
;                  D = Y COORDINATE
;                  E = X COORDINATE
;                  IX = FONT DESCRIPTOR
;                  (ONLY IF ALTERNATE FONT USED)
; OUTPUT:          DE UPDATED TO POINT AT NEXT CHARACTER FRA
; NOTES:           THE OPTION BYTE IS FORMATTED AS FOLLOWS:
;        BITS      CONTENTS
;        ----      --------
;        0-1       OFF COLOR FOR EXPANSION
;        2-3       ON COLOR FOR EXPANSION
;        4         OR OPTION
;        5         XOR OPTION
;        6-7       ENLARGEMENT FACTOR (N+1)X
;
; CHARACTERS BETWEEN 1 AND 1FH, AND BETWEEN 81H AND 9FH
; ARE INTERPRETED AS TAB CHARACTERS.  THEY CAUSE THE
; CURSOR REPRESENTED BY D AND E TO BE SPACED OVER N
; CHARACTER POSITIONS, WHERE N = CHAR. AND. 7FH
; CHARACTERS BETWEEN 20H AND 7FH ARE TAKEN AS REFERENCES
; THE SYSTEM STANDARD 5 X 7 CHARACTER FONT.  CHARACTERS
; BETWEEN 0A0H AND 0FFH REFER TO THE USER SUPPLIED ALTERN
; CHARACTER FONT.  THIS FONT IS DESCRIBED BY A FONT
; DESCRIPTOR TABLE OF THE FOLLOWING FORMAT:
; ******************************
; * 0 * BASE CHARACTER VALUE   *
; ******************************
; * 1 * X FRAME SIZE           *
; ******************************
; * 2 * Y FRAME SIZE           *
; ******************************
; * 3 * X PATTERN SIZE (BYTES) *
; ******************************
; * 4 * Y PATTERN SIZE         *
; ******************************
; * 5 *   PATTERN TABLE        *
; * 6 *      ADDRESS           *
; ******************************
DISPCH:   PUSH BC
          PUSH HL
          PUSH IX
          AND  A
          JP   M,DISCH1        ; JUMP IF YES
          LD   IX,SYSFNT
DISCH1:   CP   20H             ; IS CHAR < 20H?
          JR   NC,DISC1B-$     ; JUMP IF NOT
DISC1A:   PUSH AF              ; LOOP TO SPACE OVER
          CALL NXTFRM
          CALL FINDL3          ; STORE IT BACK
          POP  AF
          DEC  A
          JR   NZ,DISC1A-$
          JR   DISCH5-$        ; JUMP TO EXIT
DISC1B:   SUB  (IX+FTBASE)     ; SUBTRACT BASE CHAR
          LD   E,A
          LD   D,0
          LD   HL,0
          LD   C,(IX+FTBYTE)   ; MULTIPLY CHARACTER
DISCH2:   LD   B,(IX+FTYSIZ)   ; BY PATTERN SIZE
DISCH3:   ADD  HL,DE
          DJNZ DISCH3-$
          DEC  C
```

```
0811 20E7            JR   NZ,DISCH2-$
0813 DD5606          LD   D,(IX+FTPTH) ; ADD TO TABLE START
0816 DD5E05          LD   E,(IX+FTPTL)
0819 19              ADD  HL,DE
             ; COMPUTE POSITION WHERE NEXT CHARACTER WOULD GO
             ; AND SAVE
081A CD4E08          CALL NXTFRM          ; STEP COORDINATES TO NEXT FRAM
081D D5              PUSH DE              ; SAVE
081E DD4604          LD   B,(IX+FTYSIZ)
0821 C5      DISCH4: PUSH BC
0822 E5              PUSH HL
0823 CD6C08          CALL WRTLIN
0826 E1              POP  HL
0827 DD4E03          LD   C,(IX+FTBYTE) ; STEP TO NEXT LINE OF PATTERN
082A 09              ADD  HL,BC
082B C1              POP  BC
082C FD7E05          LD   A,(IY+CBD)     ; ADVANCE Y COORDINATE
082F 81              ADD  A,C
0830 FD7705          LD   (IY+CBD),A
0833 10EC            DJNZ DISCH4-$
0835 D1              POP  DE              ; RESTORE NEW POSITION
0836 CDF40C          CALL FINDL3          ; STUFF DE BACK INTO CONTEXT
0839 DDE1    DISCH5: POP  IX
083B E1              POP  HL
083C C1              POP  BC
083D C9              RET
             ; SUBROUTINE TO CONVERT ENLARGEMENT FACTOR TO ITERATION C
             ; INPUT:          MODE BYTE FROM CONTEXT SAVE AREA
             ; OUTPUT:         B,A = ITERATION COUNT
083E FD7E06  DCLCTB: LD   A,(IY+CBC)     ; GET MODE BYTE
0841 07              RLCA
0842 07              RLCA
0843 E603            AND  03              ; ISOLATE ENLARGEMENT FACTOR
0845 3C              INC  A
0846 47              LD   B,A
0847 AF              XOR  A
0848 37              SCF
0849 8F      DCLCT1: ADC  A,A
084A 10FD            DJNZ DCLCT1-$
084C 47              LD   B,A
084D C9              RET
             ; SUBROUTINE TO UPDATE COORDINATES TO POINT AT NEXT CHARA
             ; FRAME:
             ; INPUT:          COORDINATES TAKEN FROM CBD,CBE IN CONTEXT
             ; OUTPUT:         UPDATED COORDINATES RETURNED IN D AND E
             ;                 A,B = CLOBBERED, C=ENLARGE FACTOR CONVERT
084E CD3E08  NXTFRM: CALL DCLCTB          ; GET ITERATION COUNT
0851 48              LD   C,B             ; SAVE
0852 FD5605          LD   D,(IY+CBD)      ; GET Y COORD
0855 FD7E04          LD   A,(IY+CBE)      ; GET X COORD
0858 DD8601  NXTFR1: ADD  A,(IX+FTFSX)    ; ADD X FRAME SIZE
085B 10FB            DJNZ NXTFR1-$        ; 2**ENLARGE TIMES
085D FEA0            CP   160             ; PAST RIGHT EDGE OF SCREEN?
085F 3809            JR   C,NXTFR3-$
0861 7A              LD   A,D
0862 41              LD   B,C
0863 DD8602  NXTFR2: ADD  A,(IX+FTFSY)    ; YEP - ADVANCE VERTICAL
0866 10FB            DJNZ NXTFR2-$
0868 57              LD   D,A
0869 AF              XOR  A
086A 5F      NXTFR3: LD   E,A
086B C9              RET
             ; SUBROUTINE TO WRITE ONE LINE OF A PATTERN WITH ENLARGE
             ; AND EXPAND
             ; ENTRY: HL = SOURCE   IX = FONT TABLE
086C DD4E03  WRTLIN: LD   C,(IX+FTBYTE)
086F 0600            LD   B,0
0871 DDE5            PUSH IX              ; CAPTURE STACK POINTER
0873 DD210000        LD   IX,0
0877 DD39            ADD  IX,SP
0879 DDE5            PUSH IX              ; SAVE CAPTURED STACK
087B D1              POP  DE              ; DE = CAPTURED STACK
087C 3E0C            LD   A,0CH           ; SET EXPAND TO 00,11
```

```
                OUT   (XPAND),A
                LD    A,08H         ; SET EXPAND BIT
                OUT   (MAGIC),A
                LD    A,(IY+CBC)    ; GET CONTROL BYTE
                AND   0C0H          ; ISOLATE ENLARGE AMOUNT
                JR    Z,WRTL3-$     ; JUMP IF ZERO
                RLCA
                RLCA
WRTL1:          EX    DE,HL
                AND   A             ; CLEAR CARRY BIT
                SBC   HL,BC         ; COMPUTE STACK FRAME SIZE
                SBC   HL,BC
                LD    SP,HL         ; SEIZE STACK SPACE
                RES   6,H           ; MAGICIFY THE ADDRESS
                PUSH  AF
                LD    B,C
WRTL2:          LD    A,(DE)        ; GET SOURCE BYTE
                INC   DE
                LD    (HL),A        ; EXPAND IT
                INC   HL
                LD    (HL),A        ; FLUSHETH
                INC   HL
                DJNZ  WRTL2-$
                SLA   C
                POP   AF
                LD    HL,0          ; CAPTURE STACK TOP AGAIN
                ADD   HL,SP
                LD    D,H           ; SET DE=HL
                LD    E,L           ; FOR NEXT DEST COMBO
                DEC   A
                JR    NZ,WRTL1-$
; NOW DO WRITE TO SCREEN
WRTL3:          CALL  DCLCTB        ; GET ITERATION COUNTER
                CALL  DELOAD
                LD    A,(IY+CBC)
                OUT   (XPAND),A
                AND   030H
                OR    8
                CALL  RELTA
                EX    DE,HL
WRTL4:          PUSH  AF
                PUSH  BC
                PUSH  DE
                PUSH  HL
                LD    B,C
WRTL5:          LD    A,(DE)
                INC   DE
                LD    (HL),A
                INC   HL
                LD    (HL),A
                INC   HL
                DJNZ  WRTL5-$
                LD    A,(IY+CBE)    ; IS FLUSHOUT NEEDED?
                AND   03
                JR    Z,WRTL6-$     ; JUMP IF NOT
                LD    (HL),B
WRTL6:          POP   HL            ; STEP TO NEXT LINE
                LD    C,BYTEPL
                ADD   HL,BC
                POP   DE
                POP   BC
                POP   AF
                OUT   (MAGIC),A
                DJNZ  WRTL4-$
                LD    SP,IX         ; RESTORE STACK
                POP   IX
                RET

; MACRO TO GENERATE CHARACTER PATTERN TABLE ENTRY
DEFCHR          MACR  #A,#B,#C,#D,#E,#F,#G
                DEFB  #A
                DEFB  #B
                DEFB  #C
                DEFB  #D
```

```
        DEFB #E
        DEFB #F
        DEFB #G
        ENDM

; LARGE CHARACTER SET (8 X 8)
LRGCHR
        DEFCHR 000H,000H,000H,000H,000H,000H,000H ; SPACE
        DEFCHR 020H,020H,020H,020H,020H,000H,020H ; !
        DEFCHR 050H,050H,050H,000H,000H,000H,000H ; "
        DEFCHR 048H,048H,0FCH,048H,0FCH,048H,048H ; #
        DEFCHR 020H,078H,080H,070H,008H,0F0H,020H ; $
        DEFCHR 0C0H,0C8H,010H,020H,040H,098H,018H ; %
        DEFCHR 060H,090H,0A0H,040H,0A8H,090H,068H ; &
        DEFCHR 060H,060H,060H,000H,000H,000H,000H ; '
        DEFCHR 010H,020H,020H,020H,020H,020H,010H ; (
        DEFCHR 040H,020H,020H,020H,020H,020H,040H ; )
        DEFCHR 000H,0A8H,070H,0D8H,070H,0A8H,000H ; *
        DEFCHR 000H,020H,020H,0F8H,020H,020H,000H ; +
        DEFCHR 000H,000H,000H,060H,060H,020H,040H ; ,
        DEFCHR 000H,000H,000H,0F8H,000H,000H,000H ; -
        DEFCHR 000H,000H,000H,000H,000H,060H,060H ; .
        DEFCHR 000H,008H,010H,020H,040H,080H,000H ;
        DEFCHR 070H,088H,088H,088H,088H,088H,070H ; 0
        DEFCHR 020H,060H,020H,020H,020H,020H,070H ; 1
        DEFCHR 070H,088H,008H,070H,080H,080H,0F8H ; 2
        DEFCHR 070H,088H,008H,030H,008H,088H,070H ; 3
        DEFCHR 010H,030H,050H,090H,0F8H,010H,010H ; 4
        DEFCHR 0F8H,080H,0F0H,008H,008H,088H,070H ; 5
        DEFCHR 030H,040H,080H,0F0H,088H,088H,070H ; 6
        DEFCHR 0F8H,008H,010H,020H,040H,040H,040H ; 7
        DEFCHR 070H,088H,088H,070H,088H,088H,070H ; 8
        DEFCHR 070H,088H,088H,078H,008H,010H,060H ; 9
        DEFCHR 000H,060H,060H,000H,060H,060H,000H ; :
        DEFCHR 060H,060H,000H,060H,060H,020H,040H ; ;
        DEFCHR 010H,020H,040H,080H,040H,020H,010H ; <
        DEFCHR 000H,000H,0F8H,000H,0F8H,000H,000H ; =
        DEFCHR 040H,020H,010H,008H,010H,020H,040H ; >
        DEFCHR 070H,088H,008H,010H,020H,000H,020H ; ?
        DEFCHR 070H,088H,0B8H,0A8H,0B8H,080H,078H ; @
        DEFCHR 070H,088H,088H,0F8H,088H,088H,088H ; A
        DEFCHR 0F0H,088H,088H,0F0H,088H,088H,0F0H ; B
        DEFCHR 070H,088H,080H,080H,080H,088H,070H ; C
        DEFCHR 0F0H,088H,088H,088H,088H,088H,0F0H ; D
        DEFCHR 0F8H,080H,080H,0E0H,080H,080H,0F8H ; E
        DEFCHR 0F8H,080H,080H,0E0H,080H,080H,080H ; F
        DEFCHR 070H,088H,080H,080H,098H,088H,078H ; G
        DEFCHR 088H,088H,088H,0F8H,088H,088H,088H ; H
        DEFCHR 070H,020H,020H,020H,020H,020H,070H ; I
        DEFCHR 008H,008H,008H,008H,008H,088H,070H ; J
        DEFCHR 088H,090H,0A0H,0C0H,0A0H,090H,088H ; K
        DEFCHR 080H,080H,080H,080H,080H,080H,0F8H ; L
        DEFCHR 088H,0D8H,0A8H,0A8H,088H,088H,088H ; M
        DEFCHR 088H,0C8H,0A8H,098H,088H,088H,088H ; N
        DEFCHR 0F8H,088H,088H,088H,088H,088H,0F8H ; O
        DEFCHR 0F0H,088H,088H,0F0H,080H,080H,080H ; P
        DEFCHR 070H,088H,088H,088H,0A8H,090H,068H ; Q
        DEFCHR 0F0H,088H,088H,0F0H,0A0H,090H,088H ; R
        DEFCHR 070H,088H,080H,070H,008H,088H,070H ; S
        DEFCHR 0F8H,020H,020H,020H,020H,020H,020H ; T
        DEFCHR 088H,088H,088H,088H,088H,088H,070H ; U
        DEFCHR 088H,088H,088H,050H,050H,020H,020H ; V
        DEFCHR 088H,088H,088H,0A8H,0A8H,0D8H,088H ; W
        DEFCHR 088H,088H,050H,020H,050H,088H,088H ; X
        DEFCHR 088H,088H,050H,020H,020H,020H,020H ; Y
        DEFCHR 0F8H,008H,010H,020H,040H,080H,0F8H ; Z
        DEFCHR 070H,040H,040H,040H,040H,040H,070H ; [
        DEFCHR 000H,080H,040H,020H,010H,008H,000H ; \
        DEFCHR 070H,010H,010H,010H,010H,010H,070H ; ]
        DEFCHR 020H,070H,0A8H,020H,020H,020H,020H ; ^
        DEFCHR 000H,020H,040H,0F8H,040H,020H,000H ; ←
        DEFCHR 020H,020H,020H,020H,0A8H,070H,020H ; DOWN
        DEFCHR 000H,020H,010H,0F8H,010H,020H,000H ; RIGHT
        DEFCHR 000H,088H,050H,020H,050H,088H,000H ; MULTI
```

```
        DEFB 0
        DEFB 20H
        DEFB 0
        DEFB 0F8H
        DEFB 0
        DEFB 20H
; ** LAST BYTE OF DIVIDE IS ZERO, WHICH HAPPENS TO BE FIR
;       BYTE OF ...
; SMALL CHARACTERS (4 X 6)
SMLCHR
        DEFS 000H,000H,000H,000H,000H ; SPACE

NMJUMP: POP  IX
        EX   (SP),HL
        JP   (IX)
;NAME:    CONVERT KEY CODE TO ASCII
;PURPOSE:   SAME
;INPUT:   A=KEY CODE
;OUTPUT:   A=ASCII EQUIVALENT
;HOW:   TABLE LOOKUP
MKCTAS:
        LD   C,B
        LD   B,0
        LD   HL,KCTATB
        ADD  HL,BC
        LD   A,(HL)
QFROG:  LD   (IY+CBA),A
        RET

KCTATB:
        DEFB ' '             ;SPACE
        DEFB 'C'             ;BULLET
        DEFB 5EH             ;UP ARROW
        DEFB 5CH             ;DOWN ARROW
        DEFB '%'             ;
        DEFB 'R'             ;RECALL
        DEFB 'S'             ;STORE
        DEFB ';'             ;PLUS-MINUS
        DEFB '/'             ; DIVIDE
        DEFB '7'
        DEFB '8'
        DEFB '9'
        DEFB '*'             ;TIMES
        DEFB '4'
        DEFB '5'
        DEFB '6'
        DEFB '-'             ;MINUS
        DEFB '1'
        DEFB '2'
        DEFB '3'
        DEFB '+'             ;PLUS
        DEFB '&'             ;CE
        DEFB '0'
        DEFB '.'             ;POINT
        DEFB '='             ;EQUALS

; NAME:          FILL AREA
; PURPOSE:       SET REGION OF SCREEN TO CONSTANT VALUE
; INPUT:         A = DATA TO FILL WITH
;                BC = NUMBER OF BYTES TO FILL
;                DE = STARTING ADDRESS OF REGION TO FILL
MFILL:  EX   DE,HL
MFILL1: LD   (HL),A          ; STUFF BYTE
        CPI                  ; BUMP HL, DEC BC
        JP   PE,MFILL1
        RET
; NAME:          RELATIVE TO ABSOLUTE
; PURPOSE:       COORDINATE CONVERSION
; INPUT:         E = X COORDINATE
;                D = Y COORDINATE
;                A = MAGIC REGISTER VALUE TO USE
; OUTPUT:        DE = ABSOLUTE ADDRESS
;                A = MAGIC REGISTER TO USE
```

```
        ; MAGIC ENTRY POINT
MRELAB: CALL RELTA
        JR   MRELA2-$
        ; NONMAGIC ENTRY POINT
MRELA1: CALL RELTA1
        SET  6,D                   ; NONMAGIC THE ADDRESS
MRELA2: LD   (IY+CBE),E            ; UPDATE CB DE
        LD   (IY+CBD),D
MFROG:  JR   QFROG-$
        ; MAGIC ENTRY POINT
RELTA:  CALL RELTA1
        OUT  (MAGIC),A
        RET
CKSUM2: DEFB 0                     ; *** CHECKSUM ***
        DEFS 0E0H,0A0H,0A0H,0A0H,0E0H ; 0
        DEFS 040H,040H,040H,040H,040H ; 1
        DEFS 0E0H,020H,0E0H,080H,0E0H ; 2
        DEFS 0E0H,020H,060H,020H,0E0H ; 3
        DEFS 0A0H,0A0H,0E0H,020H,020H ; 4
        DEFS 0E0H,080H,0E0H,020H,0E0H ; 5
        DEFS 0E0H,080H,0E0H,0A0H,0E0H ; 6
        DEFS 0E0H,020H,020H,020H,020H ; 7
        DEFS 0E0H,0A0H,0E0H,0A0H,0E0H ; 8
        DEFS 0E0H,0A0H,0E0H,020H,0E0H ; 9
        DEFS 000H,040H,000H,040H,000H ; :
        DEFS 040H,0E0H,0E0H,0E0H,0E0H ; BULLET

        ; MOVE ROUTINE
MMOVE:  LDIR
        RET

        ; SYSTEM ENTRY POINT FOR NONMAGIC ADDRESSES
RELTA1: PUSH HL
        AND  0FCH                  ; TOSS OUT SHIFT AMOUNT
        LD   L,A                   ; SAVE
        LD   A,E                   ; GET X
        AND  03H                   ; ISOLATE SHIFT AMOUNT
        OR   L                     ; COMBINE WITH MR
RELTA2: PUSH AF
        AND  040H                  ; IS FLOPPED BIT SET?
        LD   A,E
        JR   Z,RELTA3-$            ; JUMP IF NOT
        CPL                        ; YEP - UNFLOP THE COORDINATE
        ADD  A,160
RELTA3: LD   L,D                   ; HL = Y
        LD   H,0
        ADD  HL,HL                 ; SET HL = Y * 8
        ADD  HL,HL
        ADD  HL,HL
        LD   D,H
        LD   E,L
        ADD  HL,HL                 ; SET HL = Y * 32
        ADD  HL,HL
        ADD  HL,DE                 ; SET HL = Y * 40
        SRL  A                     ; A = X 4
        SRL  A
        LD   E,A
        LD   D,0
        ADD  HL,DE                 ; HL = Y * 40 + X
        IF   NWHDWR-1
        ENDIF
        EX   DE,HL

        ; NAME:          RETURN FROM MACRO SUBROUTINE
        ; PURPOSE:       RETURN CONTROL TO CALLER
        ; THIS CODE WAS 'STOLEN' FROM RELABS SINCE
        ; IT DOES THE STACK CLEANUP THAT MRET DOES
NMRET:  POP  AF
        POP  HL
        RET
```

```
        ; ENTRY FOR USER
INXNIB: CALL XNIB
        JR   MFROG-$

; NAME:           INDEX NIBBLE
; PURPOSE:        LOAD OF SPECIFIED NIBBLE RELATIVE TO BASE
; INPUT:          C = NIBBLE NUMBER
;                 HL = BASE ADDRESS
; OUTPUT:         NIBBLE RETURNED RIGHT JUSTIFIED IN A.
; DESCRIPTION:    BYTE = NIBBLE#          2+BASE
;  THE LOW ORDER NIBBLE OF A GIVEN BYTE IS ADDRESSED
; BY AN EVEN NIBBLE NUMBER.
XNIB:   PUSH HL
        PUSH BC
        LD   B,O
        SRL  C
        ADD  HL,BC
        LD   A,(HL)
        POP  BC
        BIT  O,C
        JR   Z,XNIB1-$
        RRCA
        RRCA
        RRCA
        RRCA
XNIB1:  AND  OFH
        POP  HL
        RET

; NAME:           STORE NIBBLE
; PURPOSE:        NIBBLE STORING (!)
; INPUT:          A = NIBBLE TO STORE
;                 C = NIBBLE NUMBER (AS IN XNIB)
;       HL = BASE ADDRESS
PUTNIB: PUSH HL
        PUSH BC
        LD   B,O
        SRL  C
        ADD  HL,BC
        POP  BC
        BIT  O,C
        JR   Z,PUTNB1-$
; H.O.  CASE - SHIFT IT
        RLCA
        RLCA
        RLCA
        RLCA
        XOR  (HL)          ; NEAT COMBINE TRICK (SEE DDJ J
        AND  OFOH          ; PG. 9)
        JR   PUTNB2-$
PUTNB1: XOR  (HL)          ; L.O.  CASE
        AND  OFH
PUTNB2: XOR  (HL)
        LD   (HL),A
        POP  HL
        RET

; NAME : INDEX WORD TABLE (WORD INDEX)
; PURPOSE: TO INDEX AN ARRAY OF DEFW'S
; INPUTS: A=INDEX NUMBER (0-255)
; HL -> TABLE ENTRY O
; OUTPUTS:        DE = ENTRY LOOKED UP
;                 HL = POINTER TO ENTRY IN TABLE
MINDW:  LD   E,A
        LD   D,O
        SLA  E
        RL   D             ; DE*2
        ADD  HL,DE
        LD   E,(HL)
        INC  HL
        LD   D,(HL)
        DEC  HL
```

```
STHLDE. CALL FINDL3
        JR   MINDB1-$     ; JOIN STORE IN INDEX BYTE
; NAME:          INDEX BYTE TABLE
; PURPOSE:       TABLE LOOKUP
; INPUTS:        A = INDEX NUMBER
; OUTPUT:        A = VALUE OF BYTE
;                HL = POINTER TO TABLE ENTRY
MINDB:  LD   E,A
        LD   D,0
        ADD  HL,DE
        LD   A,(HL)
        LD   (IY+CBA),A
MINDB1: LD   (IY+CBH),H
        LD   (IY+CBL),L
        RET

; NAME:     DISPLAY TIME
; PURPOSE:  DISPLAY TIME ON SCREEN
; INPUTS.   E = X COORD
;           D = Y COORD
;           C = SAME AS DISCHR OPTIONS EXCEPT BIT 7 = 1
;               TO DISPLAY COLON AND SECONDS
; OUTPUTS:  NONE
MDISTI:
        LD   IX,SMLFNT
        LD   B,42H
        LD   HL,GTMINS
        PUSH BC
        RES  7,(IY+CBC)
        CALL BCDISP
        POP  BC
        BIT  7,C
        RET  Z
        LD   A,80H+3AH
        CALL DISPCH
        LD   B,42H
        LD   HL,GTSECS
; AND FALL INTO ...

; NAME:            DISPLAY BCD NUMBER
; INPUT:           B = NUMBER DISPLAY OPTIONS
;                  C = CHARACTER DISPLAY OPTIONS
;                  DE = Y,X COORDINATES
;                  HL = NUMBER ADDRESS (POINTS AT LO BYTE)
;                  IX = ALTERNATE FONT (IF USED)
; OUTPUT:          DE UPDATED
; DESCRIPTION:     THIS ROUTINE CONVERTS EACH NIBBLE INTO
; ASCII AND DISPLAYS IT.  THE NORMALLY ILLEGAL BCD
; VALUES ARE DISPLAYED AS CODES 2A THRU 2F RESPECTIVELY.
; THE NUMBER DISPLAY OPTIONS BYTE IS FORMATED AS FOLLOWS:
; BIT 7            SET IF LEADING ZERO SURPRESSION WANTED
; BIT 6            SET IF USE OF ALTERNATE FONT WANTED
; BITS 5-0         NUMBER OF DIGITS TO DISPLAY (NOT NUMBER O
BCDISP: LD   A,B             ; GET OPTIONS
        AND  3FH             ; ISOLATE NUMBER OF DIGITS
BCDDO:  DEC  A
        RET  M               ; QUIT IF NULL OR NO MORE
        LD   C,A             ; SAVE
        CALL XNIB            ; GET NEXT DIGIT
        JR   NZ,BCDD1-$      ; JUMP IF NONZERO
        BIT  7,B             ; IS ZERO SURPRESS ON?
        JR   Z,BCDD1-$       ; JUMP IF NOT
        OR   C               ; LAST DIGIT?
        JR   NZ,BCDD4-$      ; JUMP IF NOT
BCDD1:  RES  7,B             ; CLEAR LEADING ZERO FLAG
        ADD  A,6
        AND  0FH
        ADD  A,2AH
BCDD2:  BIT  6,B             ; ALTERNATE FONT?
        JR   Z,BCDD3-$       ; JUMP IF NO
        OR   80H             ; YEA - SET THE BIT
BCDD3:  CALL DISPCH          ; DISPLAY THE CHAR
        LD   A,C             ; GET LOOP COUNTER IN A
```

```
                JR    BCDD0-$          ; AND GO FOR NEXT
BCDD4:          LD    A,' '            ; LEADING ZERO - WRITE A SPACE
                JR    BCDD2-$

        ; NAME:     INCREMENT SCORE
        ; PURPOSE:  INCREMENT SCORE AND COMPARE TO END SCORE
        ; INPUTS:   HL -> PLAYER SCORE LOW ADDR OF 3 BYTES
        ; OUTPUTS:  GSBEND OF GAMSTB SET IF MAX SCORE REACHED
MINCSC: LD      B,3
        PUSH    HL
INCLOP: LD      A,(HL)
        ADD     A,1
        DAA
        LD      (HL),A
        JR      NZ,CMPIT-$
        INC     HL
        DJNZ    INCLOP-$
CMPIT:  POP     HL
        INC     HL
        INC     HL
        LD      A,(GAMSTB)
        BIT     GSBSCR,A
        RET     Z
        LD      DE,ENDSCR+2
        LD      B,3
CMPLOP: LD      A,(DE)
        CP      (HL)
        JR      Z,REPEAT-$     ;ENDSCR = SCORE
        RET     NC             ;ENDSCR > SCORE
SETEND: LD      HL,GAMSTB      ;ENDSCR < SCORE
        SET     GSBEND,(HL)
        RET
REPEAT: DEC     DE
        DEC     HL
        DJNZ    CMPLOP-$
        JR      SETEND-$

        ; NAME:         QUIT
        ; PURPOSE:      HOLD PRESENT GAME SCORE UNTIL KEY HIT OR
        ; SAY GAME OVER
MQUIT:  SYSSUK STRDIS
        DEFB 48
        DEFB 24
        DEFB 01001100B
        DEFW GMOVR
        SYSTEM ACTINT          ; ACTIVATE INTERRUPTS
MQUIT1: SYSSUK SENTRY          ; WAIT FOR SOMETHING TO HAPPEN
        DEFW AKEYS
        CP      STO
        JR      Z,MQUIT2-$     ; TRIGGER CHANGE?
        CP      SKYD           ; KEY HIT?
        JR      NZ,MQUIT1-$    ; NO - KEEP GOING
MQUIT2: RST     0              ; YES - RESET
GMOVR:  DEFM 'GAME'
        DEFB 6
        DEFM 'OVER'
        DEFB 0

        ; ****************
        ; * MENU ROUTINES *
        ; ****************
NOLINE  EQU     96             ; NUMBER OF DISPLAYED LINES
MNNL    EQU     0              ; NEXT FIELD
MNNH    EQU     1
MNSAL   EQU     2              ; STRING ADDRESS
MNSAH   EQU     3
MNGL    EQU     4              ; GO TO ADDRESS
MNGH    EQU     5
```

```
        ; SYSTEM POWER UP ROUTINE
PWRUP:  LD    A,(FIRSTC)     ; GET FIRST CASSETTE LOCATION
        CP    0C3H           ; IS IT A JUMP??
        JP    Z,FIRSTC       ; JUMP TOIT IF SO
        LD    SP,BEGRAM
        SYSSUK FILL          ; CLEAR SYSTEM RAM
        DEFW BEGRAM
        DEFW 50
        DEFB 0
        LD    (URINAL),A     ; CLEAR SHIFTER
        DEC   A
        LD    (TIMOUT),A     ; CLEAR TIMEOUT WATCHDOG
        SYSTEM INTPC
        DO    EMUSIC
        DO    SETOUT
        DEFB (NOLINE*2)-1
        DEFB 41
        DEFB 8
        DO    COLSET
        DEFW MENUCL
        DO    ACTINT
        EXIT
        LD    DE,GAMSTR      ; 'SELECT GAME' AS TITLE
        LD    HL,FIRSTC      ; ASSUME MENU STARTS IN CASSETT
        LD    A,(HL)         ; GET FIRST CASSETTE BYTE
        INC   HL
        CP    55H            ; IS SENTINEL THERE?
        JR    Z,PWRUP1-$     ; YEP - JUMP
        LD    HL,GUNLNK      ; WRONG - USE ONBOARD ONLY
PWRUP1: SYSTEM MENU          ; DISPLAY THE MENU

        ; NAME:          DISPLAY MENU AND BRANCH ON CHOICE
        ; INPUT:         HL = MENU LIST
        ;                DE = MENU TITLE
        ; OUTPUT:        DE = TITLE OF SELECTION MADE
        ; DESCRIPTION:
        ;        THE MENU LIST IS A LINKED LIST OF THE FOLLOWING F
        ; *************************
        ; * 0 * NEXT ENTRY        *
        ; * 1 *                   *
        ; *************************
        ; * 2 * STRING ADDRESS    *
        ; * 3 *                   *
        ; *************************
        ; * 4 * BRANCH TO ADDRESS *
        ; * 5 *                   *
        ; *************************
        ; THIS LIST IS TERMINATED BY A NEXT ENTRY FIELD OF ZEROS
        ; A MAXIMUM OF EIGHT ENTRYS MAY BE DISPLAYED.
MMENU:  PUSH HL
        PUSH HL
        CALL MNCLR           ; CLEAR SCREEN AND THROWUP TITL
        XYRELL DE,16,12
        LD    BC,109H        ; INITIALIZE ENTRY # AND COLOR
MMENU1: POP   IX             ; FIRST ENTRY TO IX
        LD    A,B            ; SELECTION NUMBER TO A
        ADD   A,'0'          ; MAKE IT ASCII
        SYSTEM CHRDIS        ; AND SHOW IT
        LD    A,'-'          ; DISPLAY DASH
        SYSTEM CHRDIS
        LD    H,(IX+MNSAH)   ; HL = STRING ADDRESS
        LD    L,(IX+MNSAL)
        SYSTEM STRDIS        ; DISPLAY SELECTION
        LD    A,8
        ADD   A,D            ; TO NEXT LINE
        LD    D,A
        LD    E,16
        INC   B              ; BUMP ENTRY #
        LD    H,(IX+MNNH)    ; HL = NEXT ENTRY ADDR
        LD    L,(IX+MNNL)
        PUSH HL
        LD    A,H
        OR    L
        JR    NZ,MMENU1-$    ; NO - JUMP BACK
        ; AT THIS POINT HL = 0, (SP) = 0
```

```
0CC7 39                   ADD   HL,SP         ; HL = STACK POINTER
0CC8 C5          MMENU3:  PUSH  BC
0CC9 010101               LD    BC,0101H
0CCC                      XYRELL DE,16,77     ; FEEDBACK ADDRESS
0CCF                      SYSTEM GETNUM       ; GET NUMBA
0CD1 C1                   POP   BC
0CD2 7E                   LD    A,(HL)        ; HOW DOES SHE LOOK?
0CD3 A7                   AND   A             ; ZERO ENTERED?
0CD4 2803                 JR    Z,MMENU5-$    ; JUMP IF SO
0CD6 B8                   CP    B             ; IN RANGE?
0CD7 3806                 JR    C,MMENU6-$    ; JUMP IF SO
0CD9 3E3F        MMENU5:  LD    A,'?'         ; DUD ENTRY - SHOW ?
0CDB                      SYSTEM CHRDIS
0CDD                      JR    MMENU3-$      ; GO BACK FOR NEXT TRY
0CDF E1          MMENU6:  POP   HL            ; THROW OUT ENTRY AREA
0CE0 D1                   POP   DE            ; RESTORE HEAD OF MENU LIST
0CE1 47                   LD    B,A           ; NUMBER ENTERED TO B
0CE2 EB          MMENU7:  EX    DE,HL         ; HL = ENTRY PTR
0CE3 5E                   LD    E,(HL)        ; DE = NEXT
0CE4 23                   INC   HL
0CE5 56                   LD    D,(HL)
0CE6 10FA                 DJNZ  MMENU7-$      ; COUNT DOWN TO ENTRY
0CE8 23                   INC   HL
0CE9 5E                   LD    E,(HL)        ; STRING TO DE
0CEA 23                   INC   HL
0CEB 56                   LD    D,(HL)
0CEC 23                   INC   HL
0CED 4E                   LD    C,(HL)        ; GO TO ADDRESS TO BC
0CEE 23                   INC   HL
0CEF 46                   LD    B,(HL)
0CF0 E1                   POP   HL            ; HL = RETURN TO PLACE
0CF1 F1                   POP   AF            ; THROW OUT OLD PC
0CF2 C5                   PUSH  BC            ; PUT NEW PC ON STACK
0CF3 E5                   PUSH  HL            ; AND PUT BACK DUMMY RETURN
0CF4 FD7304      FINDL3:  LD    (IY+CBE),E    ; PASS BACK TITLE ADDRESS
0CF7 FD7205               LD    (IY+CBD),D
0CFA C9                   RET                 ; AND GO BACK

                 ; NAME:          GET PARAMETER
                 ; PURPOSE:       INPUT OF PROGRAM OPTIONS
                 ; INPUT:         A = NUMBER OF DIGITS
                 ;                BC = PROMPT STRING ADDRESS
                 ;                DE = FRAME TITLE ADDRESS
                 ;                HL = PARAMETER ADDRESS
                 ; DESCRIPTION:
                 ;       THIS ROUTINE ASKS THE USER TO ENTER A NUMBER
                 ; FIRST A MENU FRAME IS CREATED, USING THE STRING
                 ; POINTED AT BY DE AS A TITLE.  THE STRING 'ENTER'
                 ; IS DISPLAYED, FOLLOWED BY THE PROMPT STRING.
                 ; GETNUM IS THEN CALLED TO INPUT THE NUMBER.  FEEDBACK
                 ; IS PROVIDED IN DOUBLE SIZED CHARACTERS.
                 ; NOTE: ** THIS ROUTINE USES TWO SYSTEM LEVELS AND THE AL
0CFB F5          MGETP:   PUSH  AF            ; SAVE NUMBER OF DIGITS
0CFC E5                   PUSH  HL
0CFD C5                   PUSH  BC
0CFE CD190D               CALL  MNCLR
0D01                      SYSSUK STRDIS       ; DISPLAY 'ENTER'
0D03 08                   DEFB  8
0D04 20                   DEFB  32
0D05 09                   DEFB  1001B
0D06 B70D                 DEFW  ENTSTG
0D08 E1                   POP   HL
0D09                      SYSTEM STRDIS       ; DISPLAY WHAT TO ENTER
0D0B E1                   POP   HL
0D0C F1                   POP   AF
0D0D 47                   LD    B,A
0D0E CBF1                 SET   6,C           ; SET LARGE CHARS
0D10                      XYRELL DE,48,48     ; LOAD FEEDBACK ADDRESS
0D13                      SYSTEM GETNUM       ; GET NUMBER
0D15                      SYSSUK PAWS         ; LET USER READ IT
0D17 0F                   DEFB  15
0D18 C9                   RET
                 ; SUBROUTINE TO CLEAR SCREEN FOR MENU AND THROWUP TITLE
0D19 D5          MNCLR:   PUSH  DE
```

```
0D1A                       SYSSUK FILL
0D1C 0030                  DEFW NORMEM
0D1E 2C01                  DEFW 11*BYTEPL
0D20 00                    DEFB 0
0D21                       SYSSUK FILL
0D23 B011                  DEFW NORMEM+(11*BYTEPL)
0D25 480D                  DEFW (NOLINE-11)*BYTEPL
0D27 55                    DEFB 55H
0D28 E1                    POP  HL
0D29                       XYRELL DE,24,0    ; TITLE
0D2C 0E04                  LD   C,0100B
0D2E                       SYSTEM STRDIS
0D30 C9                    RET

                    ; NAME:          GET NUMBER
                    ; INPUT:         B = DISNUM OPTIONS
                    ;                C = CHRDIS OPTIONS FOR FEEDBACK
                    ;               DE = COORDINATES OF FEEDBACK AREA
                    ;               HL = ADDRESS OF WHERE TO STASH NUMBER
                    ; DESCRIPTION:  THIS ROUTINE CAN INPUT A NUMBER FROM
                    ;        EITHER THE KEYBOARD OR THE HAND CONTROL.  KEYBOAR
                    ;        ENTRY PROCEEDS CONVENTIONALY.  GETNUM EXITS
                    ;        WHEN THE EQUALS KEY IS PRESSED OR THE REQUIRED NU
                    ;        OF DIGITS IS ENTERED
                    ;               PLAYER ONE HAND CONTROL MAY ALSO BE USED
                    ;        ENTER A NUMBER.  TO USE THIS OPTION, PULL THE TRI
                    ,        THEN ROTATE THE POT UNTIL THE NUMBER YOU WISH TO
                    ;        ENTER IS SHOWN IN THE FEEDBACK AREA.  PULL THE TR
                    ;        AGAIN TO REGISTER THE ENTRY.  IF DURING THIS PROC
                    ;        THE KEYBOARD IS USED - KEYBOARD INPUT WILL OVERRI
                    ;        THIS IS DONE TO PREVENT SOME BIMBO FROM CONFUSING
                    ,        LARRY LESKE.
0D31 D9             MGETN:   EXX
0D32 CD990D                  CALL CLRNUM        ; CLEAR THE NUMBER
0D35 4F                      LD   C,A           ; SET ZERO DIGITS IN - POT ENAB
0D36 FD7E07         MGETN1:  LD   A,(IY+CBB)    ; ENTRY COMPLETE?
0D39 A9                      XOR  C
0D3A E63F                    AND  3FH
0D3C C8                      RET  Z             ; QUIT IF SO
0D3D 21360D                  LD   HL,MGETN1
0D40 E5                      PUSH HL
0D41                         SYSTEM RANGED      ; RANDOMIZE WHILE WE WAIT
0D43                         SYSSUK SENTRY
0D45 0B00                    DEFW NUMBAS
0D47                         SYSSUK DOIT
0D49 4C0D                    DEFW GNUMDO
0D4B C9                      RET                ; NOTHIN - LOOP ON SENTRY
0D4C                GNUMDO:  JMP  SKYD,MGETN6
0D4F                         JMP  STO,MGETN2
0D52                         JMP  SPO,MGETN3
                    ; ** NEXT INSTRUCTION MAKES GOOD LIST TERMINATOR, SO WE U
                    ; TRIGGER ROUTINE
0D55 CB60           MGETN2:  BIT  4,B           ; 0-1 TRANS?
0D57 C8                      RET  Z             ; NO - IGNORE
0D58 79                      LD   A,C
0D59 3C                      INC  A             ; ARE WE ALREADY IN POT MODE?
0D5A 2836                    JR   Z,MGETN9-$    ; YEP - JUMP TO EXIT
0D5C CB79                    BIT  7,C           ; POT LEGAL?
0D5E C0                      RET  NZ            ; NO - IGNORE
0D5F 0EFF                    LD   C,0FFH        ; SET POT FLAG
                    ; POT ROUTINE
0D61 79             MGETN3:  LD   A,C           ; QUIT IF NOT IN POT MODE
0D62 3C                      INC  A
0D63 C0                      RET  NZ
                    ; HOW MANY DIGITS?
0D64 D9                      EXX                ; TO NORMAL SET
0D65 78                      LD   A,B           ; SNATCH DIGITS
0D66 D9                      EXX
0D67 FE01                    CP   1             ; 1 PRAY TELL?
0D69 060A                    LD   B,10
0D6B 2802                    JR   Z,MGETN4-$    ; JUMP IF GOOD GUESS
0D6D 0664                    LD   B,100         ; WRONG!
0D6F DB1C           MGETN4:  IN   A,(POTO)      ; GET CURRENT POT VALUE
0D71 57                      LD   D,A           ; RANGE IT
```

```
                      XOR   A
                      LD    E,A
                      LD    H,A
            MGETN5:   ADD   HL,DE
                      ADC   A,0           ; ADD EVERY CARRY TO AC
                      DAA
                      DJNZ  MGETN5-$
                      EXX                 ; BACK TO NORMAL SET
                      LD    (HL),A
                      JR    MGETN8-$
            ; KEYBOARD ROUTINE
0D7E        MGETN6:   INC   C             ; POT MODE?
                      JR    NZ,MGETN7-$   ; JUMP IF NOT
                      CALL  CLRNUM
                      INC   C             ; SET ONE DIGIT SO FAR
            MGETN7:   SET   7,C           ; SET POT LOCKOUT
                      SYSTEM KCTASC
0D8A FE3D             CP    '='           ; EQUALS TYPED?
0D8C 2808             JR    Z,MGETN9-$    ; QUIT IF EQUALS
0D8E E60F             AND   0FH
0D90 D9               EXX
0D91                  SYSTEM SHIFTU       ; SHIFT DIGIT UP
0D93        MGETN8:   PUSH  DE
0D94                  SYSTEM DISNUM
            ; ENTER HERE FOR EQUAL OR TRIGGER EXIT TO THROW OUT RETUR
0D96 D1     MGETN9:   POP   DE
0D97 D9               EXX                 ; BACK TO NORMAL
0D98                  RET

            ; SUBROUTINE TO CLEAR NUMBER
            CLRNUM:   PUSH  BC
                      EXX                 ; TO NORMAL SET
                      PUSH  HL
                      LD    A,B
                      INC   A
                      AND   3EH
                      RRA                 ; LIEU HARP MEMORIAL PATCH#2
                      EXX                 ; BACK TO ALTERNATE SET
                      LD    C,A
                      XOR   A
                      LD    B,A
                      POP   DE
                      SYSTEM FILL
                      POP   BC
                      RET

            ; NAME:           SHIFT UP
            ; INPUT:          A = DATA TO SHIFT UP
            ;                 B = SIZE IN DIGITS
            ;                 HL = AREA TO SHIFT ADDRESS
            .MSHFTU:  PUSH  AF
                      LD    A,B
                      INC   A
                      AND   3EH
                      LD    B,A
                      POP   AF
            SHFTU1:   RLD
                      INC   HL
                      DJNZ  SHFTU1-$
                      RET

            ENTSTG:   DEFM  'ENTER '
                      DEFB  0
            CNL:      DEFW  CALCL
                      DEFW  PNCM
                      DEFW  CMSTRT        ; CHECKMATE START
0DC4 0000   SCBL:     DEFW  0
0DC6 E80D             DEFW  PNSCB
                      DEFW  SCBST
0DCA 47554E46 PNGF:   DEFM  'GUNFIGHT'
```

```
ODD2 00        3359              DEFB 0
ODD3 4 4E4543  3360  FNCM:       DEFM 'CHECKMATE'
ODDB 00        3361     .        DEFB 0
ODDC 4 414C43  3362  FNCALC:     DEFM 'CALCULATOR'
ODF7 00        3363              DEFB 0
ODF8 53435249  3364  FNSCB:      DEFM 'SCRIBBLING'
ODF2 00        3365              DEFB 0
ODF3 53454C45  3366  GAMSTR:     DEFM 'SELECT GAME'
ODFF 67        3367              DEFB 67H
ODFF 08        3368              DEFB 8
OE00 58        3369              DEFB 88
OE01 0D        3370              DEFB 1101B
OE02 28432920  3371              DEFM '(C) BALLY MFG 1978'
OE14 00        3372              DEFB 0
OE15           3373              END

TOTAL ASSEMBLER ERRORS =     0
```

What is claimed is:

1. A system for providing a display signal to a raster scan display for displaying thereon a matrix of discrete picture elements, each picture element being defined as a line segment of a horizontal line on the display, the system comprising:

a random access display memory having a unique storage location for each discrete picture element of the display for storage of digital memory data signals representative of the picture elements of the display;

a processor comprising means for receiving a plurality of groups of picture element signals, each picture element signal comprising a memory address signal and a memory data signal which together correspond to one particular picture element of the display, each group of picture element signals corresponding to a plurality of picture elements representing a symbol located at a predetermined location on the display, said processor generating control signals;

first addressing means for sequentially and repetitively addressing the storage locations of the display memory, reading the memory data signals stored therein, and supplying the display signal to the display for displaying thereon the picture elements representative of the memory data signals stored in the display memory;

video processing means operatively coupled to the processor for receiving therefrom both said picture element signals and said control signals, said control signals activating the video processing means for transforming a group of picture element signals to produce a transformed group of picture element signals so that a symbol as displayed on the display corresponding to the transformed group of picture element signals is different than a symbol as displayed on the display corresponding to the original group of picture element signals; and transfer means for transferring picture element signals from the video processing means to the display memory whereby memory data signals corresponding to said picture element signals are stored in memory locations of the display memory as determined by the memory address signals corresponding to said picture element signals, said transfer means for transferring the transformed group of picture element signals from the video processing means to the display memory without processing the transformed group of picture element signals with the processor.

2. The system of claim 1 further comprising third addressing means for addressing the display memory under the direction of the processor reading memory data signals stored therein in selective storage locations and transferring said memory data signals to the video processing means.

3. The system of claim 2 wherein the video processing means includes means for performing a logical OR function with picture element signals from the processor and picture element signals corresponding to memory data signals stored in the display memory.

4. The system of claim 3 wherein the video processing means includes means for performing an exclusive-OR function with the picture element signals from the processor and the picture element signals corresponding to memory data signals stored in the display memory.

5. The system of claim 4 wherein the OR means and the exclusive-OR means comprise a programmed logic array having a plurality of input lines operatively connected to the processor for receiving control signals therefrom, a plurality of input lines operatively connected to the processor for receiving picture element signals therefrom, a plurality of input lines operatively connected to the display memory for receiving picture element signals therefrom and, a plurality of output lines, a plurality of pull-down transistors selectively coupling the input lines of the programmed logic array to the output lines of the programmed logic array, and a plurality of OR gates having inputs selectively connected to the output lines of the programmed logic array and outputs operatively connected to the display memory so that picture element signals from the processor can be ORed or exclusive-ORed with picture element signals from the display memory in response to control signals from the processor.

6. The system of claim 5 wherein the video processing means further comprises a register for storing control signals representative of whether the OR or exclusive-OR function are to be performed, the register having outputs operatively connected to the input lines of the programmed logic array for receiving control signals.

7. The system of claim 2 wherein the video processing means includes means for performing a logical exclusive-OR function with the picture element signals from the processor and picture element signals corresponding to memory data signals stored in the display memory.

8. The system of claim 1 wherein the video processing means includes means for rotating the picture element signals of a group of picture element signals relative to each other to produce rotated picture element signals, whereby the picture elements represented by the rotated picture element signals are displayed rotated relative to each other.

9. The system of claim 8 wherein the group of picture element signals is represented by a sequence of picture element signals transmitted by the processor, the rotating means comprising a shift register for storing the sequence of picture element signals, a programmed logic array having a plurality of input lines connected to outputs of the shift register and a plurality of output lines, a plurality of pull-down transistors selectively coupling the input lines of the programmed logic array to the output lines of the programmed logic array, a plurality of transistor switches having gates and having inputs selectively connected to the output lines of the programmed logic array, and outputs operatively connected to the display memory, the rotating means further comprising means operatively connected to the gates of the transistor switches for selectively activating the transistor switches to produce a sequence of rotated picture element signals at the outputs of the transistor switches such that the picture elements signals represented thereby appear rotated relative to the picture elements represented by the sequence of picture element signals transmitted by the processor.

10. The system of claim 9 wherein the processor has means for addressing the display memory to store a sequence of memory data signals which correspond to rotated picture element signals, the means for selectively activating the transistor switches comprising a second programmed logic array having a second plurality of output lines selectively connected to the gates of the transistor switches, an input line operatively connected to the processor for receiving control signals therefrom, a second plurality of input lines, and a plurality of pull-down transistors selectively coupling the second input lines of the second programmed logic array to the second output lines of the second programmed logic array, the activating means further comprising a counter for counting an address by the processor of the display memory, an output of the counter being selectively connected to the second plurality of input lines of the second programmed logic array so that with an address of the display memory by the processor a selected group of picture element signals stored in the shift register is conducted through the transistor switches whereby memory data signals corresponding thereto are stored in the display memory.

11. The system of claim 10 wherein the video processing means comprises a register operatively connected to the processor for storing control signals which represents whether a group of picture element signals of the processor are to be rotated, the register having an output operatively connected to the input line of the second programmed logic array for transmitting control signals thereto.

12. The system of claim 1 wherein the picture elements are displayed in horizontal lines, the video processing means further having a line register operatively connected to the processor for storage of control signals representing a particular element line, a line counter operatively connected to the first addressing means for generating line counter signals corresponding to the horizontal line of picture elements being read by the first addressing means, means for comparing the control signals from the line register and the line counter signals and for supplying a first comparing signal when the signals have a predetermined relationship, and interrupt means for providing an interrupt signal to the processor in response to the first comparing signal.

13. The system of claim 12 wherein the video processing means further has a position register operatively connected to the processor for storage of control signals representing a picture element position, a position counter operatively connected to the first addressing means for generating position counter signals corresponding to the vertical position of the picture element corresponding to the storage location of the display being read by the first addressing means, means for comparing the control signals from the position register and the position counter signals, and for supplying a second comparing means signal when the signals have a predetermined relationship, the interrupt means also being responsive to the second comparing means signal to supply an interrupt signal to the processor, the interrupt means further having means for supplying condition indicating signals indicative of alternative conditions including the occurrence of a light pen signal and the occurrence of the first or second comparing means signals, the processor being responsive to an interrupt signal to input the condition indicating signals and also being responsive to condition indicating signals indicative of a light pen signal to input the line counter and position counter signals.

14. The system of claim 13 wherein the control signals from the processor include interrupt means enable signals, the interrupt means of the video processing means further having a second register for storage of interrupt means enable signals, the interrupt means being responsive to the interrupt means enable signals so that the interrupt means is responsive to the light pen signal and the first and second comparing means signals only when enabled.

15. The system of claim 13 wherein the control signals include interrupt means mode signals indicating alternative modes of operation including a first mode and a second mode, the processor having means for supplying an interrupt acknowledge signal in response to an interrupt signal and means for executing a sequence of instructions, the interrupt means further having a second register for storage of the interrupt means mode signals and means for controlling the duration of the interrupt signal in response to the interrupt means mode signal and an interrupt acknowledge signal so that the interrupt signal is stopped if the interrupt signal is not acknowledged by the next instruction in the first mode and the interrupt signal continues in the second mode.

16. The system of claim 1 wherein the video processing means includes means for shifting the picture element signals of a group of picture element signals relative to each other to produce shifted picture element signals, whereby the picture elements represented by the shifted picture element signals are displayed shifted relative to each other.

17. The system of claim 16 wherein the shifting means comprises a programmed logic array having a plurality of input lines operatively connected to the processor for receiving the picture element signals therefrom, a plurality of output lines operatively connected to the display memory for supplying picture element signals thereto, a plurality of pull-down transistors for selectively coupling the input lines to the output lines, a second plurality of input lines operatively connected to the processor for receiving control signals therefrom, and a plurality of pull-down transistors selectively coupling the second plurality of input lines to the output lines so that the picture element signals on the output lines can be shifted in relation to the picture element signals on the input lines in response to the control signals from the processor.

18. The system of claim 17 wherein the video processing means comprises a register operatively connected to the processor for storing the control signals which represent the amount of shifting to be performed, the register having outputs connected to the input lines of the programmed logic array for applying the control signals thereto.

19. The system of claim 1 wherein the video processing means includes means for interchanging the picture element signals of a group of picture element signals relative to each other to produce interchanged picture element signals, whereby the picture elements represented by the interchanged picture element signals are displayed interchanged relative to each other.

20. The system of claim 19 wherein the interchanging means comprises a programmed logic array having a plurality of input lines operatively connected to the processor for receiving the picture element signals therefrom, a plurality of output lines for picture element signals, a plurality of pull-down transistors for selectively coupling the input lines to the output lines, a plurality of transistor switches having gates and having inputs selectively connected to the output lines of the programmed logic array and outputs operatively connected to the display memory, said programmed logic array also having an input line operatively coupled to the processor for receiving the control signals therefrom and selectively coupled to the gates of the transistor switches so that picture element signals can be interchanged relative to the picture element signals on the input lines in response to the control signals from the processor.

21. The system of claim 20 wherein the video processing means comprises a register operatively connected to the processor for storing the control signals which represents whether the picture element signals are to be interchanged, the register having an output connected to the input lines of the programmed logic array for the control signals.

22. The system of claim 1 further comprising player operated means including input elements adapted to be operated by a player, and signal means actuated by the input elements for enabling interaction of the player with the symbols on the screen, the player operated means operatively connected to the processor to transfer input signals thereto.

23. The system of claim 22 wherein the processor comprises means for performing calculations based on the input signals, said processor containing means for generating groups of picture element signals indicative of the input signals and said calculations, whereby said groups of picture element signals are transferred to update the display memory so that symbols indicative of said picture element signals are provided on said display.

24. The system of claim 1 wherein said display has a screen on which the picture elements are presented and each picture element displayed has a horizontal and vertical position, the system further comprising a light pen for positioning adjacent to the screen and for supplying a signal when a select picture element in physical proximity to the light pen is presented, the video processing means further having horizontal and vertical picture element position counters for generating signals corresponding to the horizontal and vertical positions of the select picture element, and interrupt means responsive to the light pen signal to supply an interrupt signal to the processor, the processor being responsive to the interrupt signal to input the horizontal and vertical position signals whereby the horizontal and vertical position of the picture element in physical proximity to the light pen may be input to the processor.

25. The system of claim 24 wherein the interrupt means of the video processor further has a horizontal feedback register for latching up the horizontal position signals of the horizontal position counter in response to a signal, a vertical feedback register for latching up the vertical position signals of the vertical position counter in response to a signal, and means for providing a signal to the vertical and horizontal feedback registers in response to the light pen signal so that signals corresponding to the horizontal and vertical position of the select picture element in physical proximity to the light pen may be latched up in the horizontal and vertical feedback registers and the processor may input the horizontal and vertical position signals latched up in the horizontal and vertical feedback registers in response to the interrupt signal.

26. The system of claim 1 wherein a plurality of digital picture element signals represent each picture element, the video processing means further comprising means for selectively performing a plurality of transformations to the picture element signals in response to the control signals for each digital picture element signal of the plurality of picture element signals to produce transformed picture element signals representative of transformed picture elements.

27. The system of claim 1 wherein a picture element is represented by a first and second memory data signal each comprising a bit of digital data, the processor having means for supplying a plurality of memory data signals at a time representing a plurality of picture elements, and the video processing means comprising means for performing a plurality of transformations to the first of each picture element represented by the plurality of digital data bits and a second means for performing a plurality of transformations to the second bit of each picture element.

28. The system of claim 1 wherein the video processing means comprises a register operatively connected to the processor for storage of the control signals identifying a particular transformation to be performed.

29. The system of claim 1 wherein the video processing means includes a programmed logic array having a plurality of inputs operatively connected to the processor and a plurality of outputs operatively connected to the display memory for modifying the group of picture element signals in response to the control signals.

30. The system of claim 1 wherein the memory data signals stored in the display memory are encoded at a first level identifying bits of a register within the system, the video processing means including means for decoding the picture element signals corresponding to said memory data signals to signals representative of picture elements at a second level, the decoding means comprising a register having a plurality of bits for providing digital signals from the register bits representative of picture elements at the second level in response to the picture element signals identifying particular register bits.

31. The system of claim 1 further comprising second addressing means for addressing the display memory, under the direction of the processor, reading memory data signals stored therein in selective storage locations, and transmitting said memory data signals from the display memory to the processor.

32. A system for providing a display signal to a raster scan display for displaying thereon a matrix of discrete picture elements, the system comprising:

a random access display memory having a unique storage location for each discrete picture element of the display for storage of digital memory data signals representative of the picture elements of the display;

a processor containing means for receiving a plurality of groups of picture element signals, each picture element signal comprising a memory address signal and a memory data signal which together correspond to one particular picture element of the display, each group of picture element signals corresponding to a plurality of picture elements representing a symbol located at a predetermined location on the display, said processor generating control signals, said control signals including background data signals representative of background picture elements;

first addressing means for sequentially and repetitively addressing the storage locations of the display memory, reading the memory data signals stored therein, and supplying the display signal to the display for displaying thereon the picture elements representative of the memory data signals stored in the display memory;

transfer means for transferring picture element signals from the processor to the display memory whereby memory data signals corresponding to said picture element signals are stored in memory locations of the display memory as determined by the memory address signals corresponding to said picture element signals; and background signal means having a register operatively coupled to the processor for receiving therefrom background data signals for storage therein, and operatively connected to the first addressing means for supplying the background data signal thereto, the background signal means including selector means operatively coupled to the first addressing means and the register for substituting the background data signals stored in the register for memory data signals when the first addressing means addresses select storage locations of the display memory whereby the first addressing means supplies the display signal to the display representative of the background data signal when the first addressing means addresses the select memory locations of the display memory.

33. The system of claim 32 wherein the picture elements are presented in lines of picture elements by said display, the background signal means having a line counter operatively connected to the first addressing means for storage of a line counter signal indicating the number of the picture element line being presented, a line register for storing a line register signal indicative of a line number and comparing means operatively connected to the line counter and the line register for comparing the line register signal stored in the line register with the line counter signal indicated by the line counter, the selector means being responsive to the comparing means to select between the background data signals stored in the background register and the background data signals in the display memory in accordance with the comparison.

34. The system of claim 32 wherein the picture elements are presented in horizontal lines wherein each picture element has a horizontal position, the video processing means having a counter for indicating the horizontal position of the picture element being displayed, and the selector means being responsive to said horizontal position counter to select between the memory data signals stored in the background register and the memory data signals stored in the display memory in accordance with the horizontal position of the picture elements being displayed.

35. The system of claim 32 further comprising second addressing means for addressing the display memory under the direction of the processor, reading selective memory data stored therein, and transmitting said selective memory data signals from the display memory to the processor.

36. A variable interrupt system for providing a display signal to a raster scan display for displaying thereon a matrix of discrete picture elements, the system comprising:

a random access display memory having a unique storage location for each discrete picture element of the display for storage of digital memory data signals representative of the picture elements of the display;

a processor comprising means for receiving a plurality of groups of picture element signals, each picture element signal comprising a memory address signal and a memory data signal which together correspond to one particular picture element of the display, each group of picture element signals corresponding to a plurality of picture elements representing a symbol located at a predetermined location on the display, said processor generating control signals;

first addressing means for sequentially and repetitively addressing the storage locations of the display memory, reading the memory data signals stored therein, and supplying the display signal to the display for displaying thereon the picture elements representative of the memory data signals stored in the display memory;

transfer means for transferring picture element signals from the processor to the display memory whereby memory data signals corresponding to said picture element signals are stored in memory locations of the display memory as determined by the memory address signals corresponding to said picture element signals; and variable interrupt means operatively connected to the processor for receiving therefrom a control signal representative of a particular row of picture elements on the display, the variable interrupt means generating an interrupt signal for transmission to the processor when the first addressing means addresses predetermined memory locations of the display memory which correspond to the particular row of picture elements.

* * * * *